United States Patent
Monkman et al.

(10) Patent No.: US 10,927,042 B2
(45) Date of Patent: Feb. 23, 2021

(54) METHODS AND COMPOSITIONS FOR CONCRETE PRODUCTION

(71) Applicant: CarbonCure Technologies Inc., Dartmouth (CA)

(72) Inventors: George Sean Monkman, Montreal (CA); Kevin Cail, Sarasota, FL (US); Paul J. Sandberg, Beverly, MA (US); Mark MacDonald, Halifax (CA); Joshua Jeremy Brown, Lower Sackville (CA); Dean Paul Forgeron, White's Lake (CA)

(73) Assignee: CARBONCURE TECHNOLOGIES, INC., Nova Scotia (CA)

( * ) Notice: Subject to any disclaimer, the term of this patent is extended or adjusted under 35 U.S.C. 154(b) by 86 days.

(21) Appl. No.: 15/650,524

(22) Filed: Jul. 14, 2017

(65) Prior Publication Data

US 2018/0029934 A1 Feb. 1, 2018

Related U.S. Application Data

(63) Continuation of application No. 15/649,339, filed on Jul. 13, 2017, now abandoned, which is a (Continued)

(51) Int. Cl.
*C04B 40/00* (2006.01)
*C04B 22/10* (2006.01)
*C04B 28/04* (2006.01)
*C04B 40/02* (2006.01)
*B28C 5/18* (2006.01)
(Continued)

(52) U.S. Cl.
CPC ............ *C04B 22/10* (2013.01); *B28C 5/0806* (2013.01); *B28C 5/1856* (2013.01); *B28C 5/422* (2013.01); *B28C 5/46* (2013.01); *B28C 7/02* (2013.01); *C04B 28/02* (2013.01); *C04B 28/021* (2013.01); *C04B 28/04* (2013.01); *C04B 28/08* (2013.01); *C04B 40/0032* (2013.01);
(Continued)

(58) Field of Classification Search
CPC .............................. B01F 5/02; C04B 40/0032
USPC .......................................................... 366/3–5
See application file for complete search history.

(56) References Cited

U.S. PATENT DOCUMENTS 128,980 A 7/1872 Rowland
170,594 A 11/1875 Richardson
(Continued)

FOREIGN PATENT DOCUMENTS

AU 2397377 A 10/1978
AU 504446 B2 10/1979
(Continued)

OTHER PUBLICATIONS

Cheung et al. Impact of admixtures on the hydration kinetics of Portland cement. Cement and Concrete Research 41:1289-1309 (2011).
(Continued)

*Primary Examiner* — David L Sorkin
(74) *Attorney, Agent, or Firm* — Storella & Witt, LLP

(57) ABSTRACT

The invention provides compositions and methods directed to carbonation of a cement mix during mixing. The carbonation may be in a stationary mixer or a transportable mixer, such as a drum of a ready-mix truck.

12 Claims, 155 Drawing Sheets

Related U.S. Application Data continuation of application No. 15/157,205, filed on May 17, 2016, now Pat. No. 9,738,562, which is a continuation of application No. 14/950,288, filed on Nov. 24, 2015, now abandoned, which is a continuation-in-part of application No. 14/701,456, filed on Apr. 30, 2015, now Pat. No. 9,388,072, which is a continuation of application No. PCT/CA2014/050611, filed on Jun. 25, 2014, which is a continuation-in-part of application No. 14/249,308, filed on Apr. 9, 2014, now Pat. No. 9,108,883.

(60) Provisional application No. 61/839,312, filed on Jun. 25, 2013, provisional application No. 61/847,254, filed on Jul. 17, 2013, provisional application No. 61/879,049, filed on Sep. 17, 2013, provisional application No. 61/925,100, filed on Jan. 8, 2014, provisional application No. 61/938,063, filed on Feb. 10, 2014, provisional application No. 61/980,505, filed on Apr. 16, 2014, provisional application No. 62/083,784, filed on Nov. 24, 2014, provisional application No. 62/096,018, filed on Dec. 23, 2014, provisional application No. 62/160,350, filed on May 12, 2015, provisional application No. 62/165,670, filed on May 22, 2015, provisional application No. 62/240,843, filed on Oct. 13, 2015, provisional application No. 62/086,024, filed on Dec. 1, 2014, provisional application No. 62/146,103, filed on Apr. 10, 2015, provisional application No. 61/847,254, filed on Jul. 17, 2013.

(51) Int. Cl.
  *C04B 28/02* (2006.01)
  *B28C 5/08* (2006.01)
  *C04B 28/08* (2006.01)
  *B28C 7/02* (2006.01)
  *B28C 5/46* (2006.01)
  *B28C 5/42* (2006.01)
  *C04B 111/00* (2006.01)

(52) U.S. Cl.
  CPC . *C04B 40/0231* (2013.01); *C04B 2111/00017* (2013.01); *Y02P 40/18* (2015.11); *Y02W 30/91* (2015.05)

(56) References Cited

U.S. PATENT DOCUMENTS

| | | |
|---|---|---|
| 461,888 A | 10/1891 | Richardson |
| 1,932,150 A | 10/1933 | Tada |
| 2,254,016 A | 8/1941 | Melton et al. |
| 2,259,830 A | 10/1941 | Osborne |
| 2,329,940 A | 9/1943 | Ponzer |
| 2,496,895 A | 2/1950 | Staley |
| 2,498,513 A | 2/1950 | Cuypers |
| 2,603,352 A | 7/1952 | Tromp |
| 3,002,248 A | 10/1961 | Willson |
| 3,184,037 A | 5/1965 | Greaves et al. |
| 3,356,779 A | 12/1967 | Schulze |
| 3,358,342 A | 12/1967 | Spence |
| 3,442,498 A | 5/1969 | Noah |
| 3,468,993 A | 9/1969 | Knud |
| 3,492,385 A | 1/1970 | Branko |
| 3,667,242 A | 6/1972 | Kilburn |
| 3,752,314 A | 8/1973 | Brown et al. |
| 3,757,631 A | 9/1973 | Mc et al. |
| 3,917,236 A | 11/1975 | Hanson |
| 3,957,203 A | 5/1976 | Bullard |
| 3,976,445 A | 8/1976 | Douglas |
| 4,068,755 A | 1/1978 | Parkes et al. |
| 4,069,063 A | 1/1978 | Ball |
| 4,076,782 A | 2/1978 | Yazawa et al. |
| 4,093,690 A | 6/1978 | Murray |
| 4,117,060 A | 9/1978 | Murray |
| 4,257,710 A | 3/1981 | Delcoigne et al. |
| 4,266,921 A | 5/1981 | Murray |
| 4,275,836 A | 6/1981 | Egger |
| 4,350,567 A | 9/1982 | Moorehead et al. |
| 4,362,679 A | 12/1982 | Malinowski |
| 4,420,868 A | 12/1983 | McEwen et al. |
| 4,427,610 A | 1/1984 | Murray |
| 4,436,498 A | 3/1984 | Murray |
| 4,526,534 A | 7/1985 | Wollmann |
| 4,588,299 A | 5/1986 | Brown et al. |
| 4,613,472 A | 9/1986 | Svanholm |
| 4,746,481 A | 5/1988 | Schmidt |
| 4,772,439 A | 9/1988 | Trevino-Gonzalez |
| 4,789,244 A | 12/1988 | Dunton et al. |
| 4,846,580 A | 7/1989 | Oury |
| 4,881,347 A | 11/1989 | Mario et al. |
| 4,917,587 A | 4/1990 | Alpar et al. |
| 4,944,595 A | 7/1990 | Hodson |
| 5,051,217 A | 9/1991 | Alpar et al. |
| 5,158,996 A | 10/1992 | Valenti |
| 5,162,402 A | 11/1992 | Ogawa et al. |
| 5,203,919 A | 4/1993 | Bobrowski et al. |
| 5,220,732 A | 6/1993 | Lee |
| 5,232,496 A | 8/1993 | Jennings et al. |
| 5,244,498 A | 9/1993 | Steinke |
| 5,257,464 A | 11/1993 | Trevino-Gonzales |
| 5,298,475 A | 3/1994 | Shibata et al. |
| 5,352,035 A | 10/1994 | Macaulay et al. |
| 5,356,579 A | 10/1994 | Jennings et al. |
| 5,358,566 A | 10/1994 | Tanaka et al. |
| 5,360,660 A | 11/1994 | Nohlgren |
| 5,393,343 A | 2/1995 | Darwin et al. |
| 5,427,617 A | 6/1995 | Bobrowski et al. |
| 5,451,104 A | 9/1995 | Kleen et al. |
| 5,453,123 A | 9/1995 | Burge et al. |
| 5,458,470 A | 10/1995 | Mannhart et al. |
| 5,494,516 A | 2/1996 | Drs et al. |
| 5,505,987 A | 4/1996 | Jennings et al. |
| 5,518,540 A | 5/1996 | Jones, Jr. |
| 5,583,183 A | 12/1996 | Darwin et al. |
| 5,609,681 A | 3/1997 | Drs et al. |
| 5,612,396 A | 3/1997 | Valenti et al. |
| 5,624,493 A | 4/1997 | Wagh et al. |
| 5,633,298 A | 5/1997 | Arfaei et al. |
| 5,643,978 A | 7/1997 | Darwin et al. |
| 5,650,562 A | 7/1997 | Jones, Jr. |
| 5,660,626 A | 8/1997 | Ohta et al. |
| 5,661,206 A | 8/1997 | Tanaka et al. |
| 5,665,158 A | 9/1997 | Darwin et al. |
| 5,667,298 A | 9/1997 | Musil et al. |
| 5,668,195 A | 9/1997 | Leikauf |
| 5,669,968 A | 9/1997 | Kobori et al. |
| 5,674,929 A | 10/1997 | Melbye |
| 5,676,905 A | 10/1997 | Andersen et al. |
| 5,690,729 A | 11/1997 | Jones, Jr. |
| 5,703,174 A | 12/1997 | Arfaei et al. |
| 5,725,657 A | 3/1998 | Darwin et al. |
| 5,728,207 A | 3/1998 | Arfaei et al. |
| 5,744,078 A | 4/1998 | Soroushian et al. |
| 5,752,768 A | 5/1998 | Assh |
| 5,753,744 A | 5/1998 | Darwin et al. |
| 5,798,425 A | 8/1998 | Albrecht et al. |
| 5,800,752 A | 9/1998 | Charlebois |
| 5,804,175 A | 9/1998 | Ronin et al. |
| 5,840,114 A | 11/1998 | Jeknavorian et al. |
| 5,873,653 A | 2/1999 | Paetzold |
| 5,882,190 A | 3/1999 | Doumet |
| 5,885,478 A | 3/1999 | Montgomery et al. |
| 5,912,284 A | 6/1999 | Hirata et al. |
| 5,935,317 A | 8/1999 | Soroushian et al. |
| 5,947,600 A | 9/1999 | Maeda et al. |
| 5,965,201 A | 10/1999 | Jones, Jr. |
| 6,008,275 A | 12/1999 | Moreau et al. |
| 6,023,941 A | 2/2000 | Rhoades |
| 6,042,258 A | 3/2000 | Hines et al. |

(56) References Cited

U.S. PATENT DOCUMENTS

| | | |
|---|---|---|
| 6,042,259 A | 3/2000 | Hines et al. |
| 6,063,184 A | 5/2000 | Leikauf et al. |
| 6,066,262 A | 5/2000 | Montgomery et al. |
| 6,113,684 A | 9/2000 | Kunbargi |
| 6,136,950 A | 10/2000 | Vickers, Jr. |
| 6,187,841 B1 | 2/2001 | Tanaka et al. |
| 6,264,736 B1 | 7/2001 | Knopf et al. |
| 6,267,814 B1 | 7/2001 | Bury et al. |
| 6,284,867 B1 | 9/2001 | Vickers, Jr. et al. |
| 6,290,770 B1 | 9/2001 | Moreau et al. |
| 6,310,143 B1 | 10/2001 | Vickers, Jr. et al. |
| 6,318,193 B1 | 11/2001 | Brock et al. |
| 6,334,895 B1 | 1/2002 | Bland |
| 6,372,157 B1 | 4/2002 | Krill, Jr. et al. |
| 6,387,174 B2 | 5/2002 | Knopf et al. |
| 6,451,105 B1 | 9/2002 | Turpin, Jr. |
| 6,463,958 B1 | 10/2002 | Schwing |
| 6,517,631 B1 | 2/2003 | Bland |
| 6,648,551 B1 | 11/2003 | Taylor |
| 6,682,655 B2 | 1/2004 | Beckham et al. |
| 6,871,667 B2 | 3/2005 | Schwing et al. |
| 6,890,497 B2 | 5/2005 | Rau et al. |
| 6,936,098 B2 | 8/2005 | Ronin |
| 6,960,311 B1 | 11/2005 | Mirsky et al. |
| 6,997,045 B2 | 2/2006 | Wallevik et al. |
| 7,003,965 B2 | 2/2006 | Auer et al. |
| 7,201,018 B2 | 4/2007 | Gershtein et al. |
| 7,390,444 B2 | 6/2008 | Ramme et al. |
| 7,399,378 B2 | 7/2008 | Edwards et al. |
| 7,419,051 B2 | 9/2008 | Damkjaer et al. |
| 7,549,493 B1 | 6/2009 | Jones |
| 7,588,661 B2 | 9/2009 | Edwards et al. |
| 7,635,434 B2 | 12/2009 | Mickelson et al. |
| 7,704,349 B2 | 4/2010 | Edwards et al. |
| 7,735,274 B2 | 6/2010 | Constantz et al. |
| 7,736,430 B2 | 6/2010 | Barron et al. |
| 7,771,684 B2 | 8/2010 | Constantz et al. |
| 7,815,880 B2 | 10/2010 | Constantz et al. |
| 7,879,146 B2 | 2/2011 | Raki et al. |
| 7,906,086 B2 | 3/2011 | Comrie |
| 7,914,685 B2 | 3/2011 | Constantz et al. |
| 7,922,809 B1 | 4/2011 | Constantz et al. |
| 7,950,841 B2 | 5/2011 | Klein et al. |
| 8,006,446 B2 | 8/2011 | Constantz et al. |
| 8,043,426 B2 | 10/2011 | Mohamed et al. |
| 8,105,558 B2 | 1/2012 | Comrie |
| 8,114,214 B2 | 2/2012 | Constantz et al. |
| 8,114,367 B2 | 2/2012 | Riman et al. |
| 8,118,473 B2 | 2/2012 | Cooley et al. |
| 8,137,455 B1 | 3/2012 | Constantz et al. |
| 8,157,009 B2 | 4/2012 | Patil et al. |
| 8,177,909 B2 | 5/2012 | Constantz et al. |
| 8,192,542 B2 | 6/2012 | Virtanen |
| 8,235,576 B2 | 8/2012 | Klein et al. |
| 8,272,205 B2 | 9/2012 | Estes et al. |
| 8,287,173 B2 | 10/2012 | Khouri |
| 8,311,678 B2 | 11/2012 | Koehler et al. |
| 8,313,802 B2 | 11/2012 | Riman et al. |
| 8,333,944 B2 | 12/2012 | Constantz et al. |
| 8,470,275 B2 | 6/2013 | Constantz et al. |
| 8,491,858 B2 | 7/2013 | Seeker et al. |
| 8,518,176 B2 | 8/2013 | Silva et al. |
| 8,584,864 B2 | 11/2013 | Lee et al. |
| 8,708,547 B2 | 4/2014 | Bilger |
| 8,709,960 B2 | 4/2014 | Riman et al. |
| 8,721,784 B2 | 5/2014 | Riman et al. |
| 8,746,954 B2 | 6/2014 | Cooley et al. |
| 8,845,940 B2 | 9/2014 | Niven et al. |
| 8,989,905 B2 | 3/2015 | Sostaric et al. |
| 9,028,607 B2 | 5/2015 | Ramme |
| 9,061,940 B2 | 6/2015 | Chen et al. |
| 9,108,803 B2 | 8/2015 | Till |
| 9,108,883 B2 | 8/2015 | Forgeron et al. |
| 9,376,345 B2 | 6/2016 | Forgeron et al. |
| 9,388,072 B2 | 7/2016 | Niven et al. |
| 9,448,094 B2 | 9/2016 | Downie et al. |
| 9,463,580 B2 | 10/2016 | Forgeron et al. |
| 9,492,945 B2 | 11/2016 | Niven et al. |
| 9,738,562 B2 | 8/2017 | Monkman et al. |
| 9,758,437 B2 | 9/2017 | Forgeron et al. |
| 9,790,131 B2 | 10/2017 | Lee et al. |
| 10,350,787 B2 * | 7/2019 | Forgeron |
| 10,392,305 B2 | 8/2019 | Wang et al. |
| 10,570,064 B2 | 2/2020 | Monkman et al. |
| 10,654,191 B2 | 5/2020 | Niven et al. |
| 2002/0019459 A1 | 2/2002 | Albrecht et al. |
| 2002/0047225 A1 | 4/2002 | Bruning et al. |
| 2002/0179119 A1 | 12/2002 | Harmon |
| 2003/0070448 A1 | 4/2003 | Gasteyer et al. |
| 2003/0122273 A1 | 7/2003 | Fifield |
| 2005/0131600 A1 | 6/2005 | Quigley et al. |
| 2005/0219939 A1 | 10/2005 | Christenson et al. |
| 2007/0170119 A1 | 7/2007 | Mickelson et al. |
| 2007/0171764 A1 | 7/2007 | Klein et al. |
| 2007/0185636 A1 | 8/2007 | Cooley et al. |
| 2007/0215353 A1 | 9/2007 | Barron et al. |
| 2008/0092957 A1 | 4/2008 | Rosaen |
| 2008/0174041 A1 | 7/2008 | Firedman et al. |
| 2008/0202389 A1 | 8/2008 | Hojaji et al. |
| 2008/0245274 A1 | 10/2008 | Ramme |
| 2008/0308133 A1 | 12/2008 | Grubb et al. |
| 2008/0316856 A1 | 12/2008 | Cooley et al. |
| 2009/0093328 A1 | 4/2009 | Dickinger et al. |
| 2009/0103392 A1 | 4/2009 | Bilger |
| 2009/0143211 A1 | 6/2009 | Riman et al. |
| 2009/0292572 A1 | 11/2009 | Alden et al. |
| 2009/0294079 A1 | 12/2009 | Edwards et al. |
| 2010/0132556 A1 | 6/2010 | Constantz et al. |
| 2010/0239487 A1 | 9/2010 | Constantz et al. |
| 2010/0246312 A1 | 9/2010 | Welker et al. |
| 2011/0023659 A1 | 2/2011 | Nguyen et al. |
| 2011/0067600 A1 | 3/2011 | Constantz et al. |
| 2011/0165400 A1 | 7/2011 | Quaghebeur et al. |
| 2011/0198369 A1 | 8/2011 | Klein et al. |
| 2011/0249527 A1 | 10/2011 | Seiler et al. |
| 2011/0262328 A1 | 10/2011 | Wijmans et al. |
| 2011/0277670 A1 | 11/2011 | Self et al. |
| 2011/0289901 A1 | 12/2011 | Estes et al. |
| 2011/0320040 A1 | 12/2011 | Koehler et al. |
| 2012/0238006 A1 | 9/2012 | Gartner et al. |
| 2012/0298011 A1 | 11/2012 | Silva et al. |
| 2012/0312194 A1 | 12/2012 | Riman et al. |
| 2013/0025317 A1 | 1/2013 | Terrien et al. |
| 2013/0036945 A1 | 2/2013 | Constantz et al. |
| 2013/0122267 A1 | 5/2013 | Riman et al. |
| 2013/0125791 A1 | 5/2013 | Fried et al. |
| 2013/0139727 A1 | 6/2013 | Constantz et al. |
| 2013/0167756 A1 | 7/2013 | Chen et al. |
| 2013/0284073 A1 | 10/2013 | Gartner |
| 2013/0305963 A1 | 11/2013 | Fridman |
| 2014/0034452 A1 | 2/2014 | Lee et al. |
| 2014/0050611 A1 | 2/2014 | Warren et al. |
| 2014/0069302 A1 | 3/2014 | Saastamoinen et al. |
| 2014/0083514 A1 | 3/2014 | Ding |
| 2014/0090415 A1 | 4/2014 | Reddy et al. |
| 2014/0096704 A1 | 4/2014 | Rademan et al. |
| 2014/0104972 A1 | 4/2014 | Roberts et al. |
| 2014/0107844 A1 | 4/2014 | Koehler et al. |
| 2014/0116295 A1 | 5/2014 | Niven et al. |
| 2014/0127450 A1 | 5/2014 | Riman et al. |
| 2014/0197563 A1 | 7/2014 | Niven et al. |
| 2014/0208782 A1 | 7/2014 | Joensson et al. |
| 2014/0216303 A1 | 8/2014 | Lee et al. |
| 2014/0327168 A1 | 11/2014 | Niven et al. |
| 2014/0373755 A1 | 12/2014 | Forgeron et al. |
| 2015/0023127 A1 | 1/2015 | Chon et al. |
| 2015/0069656 A1 | 3/2015 | Bowers et al. |
| 2015/0197447 A1 | 7/2015 | Forgeron et al. |
| 2015/0202579 A1 | 7/2015 | Richardson et al. |
| 2015/0232381 A1 | 8/2015 | Niven et al. |
| 2015/0247212 A1 | 9/2015 | Sakaguchi et al. |
| 2015/0274537 A1 | 10/2015 | Myers et al. |
| 2015/0298351 A1 | 10/2015 | Beaupré |
| 2015/0355049 A1 | 12/2015 | Ait et al. |

(56) References Cited

U.S. PATENT DOCUMENTS

| | | |
|---|---|---|
| 2016/0001462 A1 | 1/2016 | Forgeron et al. |
| 2016/0107939 A1 | 4/2016 | Monkman et al. |
| 2016/0185662 A9 | 6/2016 | Niven et al. |
| 2016/0272542 A1 | 9/2016 | Monkman et al. |
| 2016/0280610 A1 | 9/2016 | Forgeron et al. |
| 2016/0340253 A1 | 11/2016 | Forgeron et al. |
| 2016/0355441 A1 | 12/2016 | Tregger et al. |
| 2016/0355442 A1 | 12/2016 | Niven et al. |
| 2017/0015598 A1 | 1/2017 | Monkman et al. |
| 2017/0028586 A1 | 2/2017 | Jordan et al. |
| 2017/0036372 A1 | 2/2017 | Sandberg et al. |
| 2017/0043499 A1 | 2/2017 | Forgeron et al. |
| 2017/0158549 A1 | 6/2017 | Yamada et al. |
| 2017/0158569 A1 | 6/2017 | Lee et al. |
| 2017/0165870 A1 | 6/2017 | Niven et al. |
| 2017/0217047 A1 | 8/2017 | Leon et al. |
| 2018/0258000 A1 | 9/2018 | Lee et al. |

FOREIGN PATENT DOCUMENTS

| | | |
|---|---|---|
| CA | 970935 A1 | 7/1975 |
| CA | 1045073 A | 12/1978 |
| CA | 1185078 A1 | 4/1985 |
| CA | 2027216 A1 | 4/1991 |
| CA | 2343021 A1 | 3/2000 |
| CA | 2362631 A1 | 8/2000 |
| CA | 2598583 A1 | 9/2006 |
| CA | 2646462 A1 | 9/2007 |
| CA | 2630226 A1 | 10/2008 |
| CA | 2659447 A1 | 12/2008 |
| CA | 2703343 A1 | 4/2009 |
| CA | 2705857 A1 | 5/2009 |
| CA | 2670049 A1 | 11/2009 |
| CA | 2668249 A1 | 12/2009 |
| CA | 2778508 A1 | 6/2011 |
| CA | 2785143 A1 | 7/2011 |
| CA | 2501329 C | 6/2012 |
| CA | 2829320 A1 | 9/2012 |
| CA | 2837832 A1 | 12/2012 |
| CN | 2055815 U | 4/1990 |
| CN | 1114007 A | 12/1995 |
| CN | 1267632 A | 9/2000 |
| CN | 2445047 Y | 8/2001 |
| CN | 1357506 A | 7/2002 |
| CN | 2575406 Y | 9/2003 |
| CN | 2700294 Y | 5/2005 |
| CN | 2702958 Y | 6/2005 |
| CN | 2748574 Y | 12/2005 |
| CN | 1735468 A | 2/2006 |
| CN | 1916332 A | 2/2007 |
| CN | 2893360 Y | 4/2007 |
| CN | 2913278 Y | 6/2007 |
| CN | 200961340 Y | 10/2007 |
| CN | 101099596 A | 1/2008 |
| CN | 101319512 A | 12/2008 |
| CN | 101538813 A | 9/2009 |
| CN | 101551001 A | 10/2009 |
| CN | 201325866 Y | 10/2009 |
| CN | 104045251 A | 9/2014 |
| CN | 105174766 A | 12/2015 |
| CN | 106746828 A | 5/2017 |
| DE | 1817001 A1 | 11/1970 |
| DE | 3139107 A1 | 4/1983 |
| DE | 19506411 A1 | 8/1996 |
| DE | 20305552 U1 | 10/2003 |
| EP | 0047675 A1 | 3/1982 |
| EP | 0218189 A2 | 4/1987 |
| EP | 0151164 B1 | 5/1988 |
| EP | 0218189 A3 | 5/1988 |
| EP | 0629597 A1 | 12/1994 |
| EP | 0573524 B1 | 5/1996 |
| EP | 0701503 B1 | 8/2000 |
| EP | 1429096 A2 | 6/2004 |
| EP | 1785245 A1 | 5/2007 |
| EP | 2012149 A1 | 1/2009 |
| EP | 2012150 A1 | 1/2009 |
| EP | 2039589 A1 | 3/2009 |
| EP | 2040135 A2 | 3/2009 |
| EP | 2042326 A2 | 4/2009 |
| EP | 2043169 A2 | 4/2009 |
| EP | 2048525 A1 | 4/2009 |
| EP | 2096498 A1 | 9/2009 |
| EP | 2098362 A1 | 9/2009 |
| EP | 2116841 A1 | 11/2009 |
| EP | 2123700 A1 | 11/2009 |
| EP | 2123942 B1 | 4/2011 |
| EP | 2123465 B1 | 7/2011 |
| EP | 2042317 B1 | 8/2011 |
| EP | 2162639 B1 | 9/2011 |
| EP | 2162640 B1 | 9/2011 |
| EP | 2042535 B1 | 10/2011 |
| EP | 2042324 B1 | 6/2012 |
| EP | 2039393 B1 | 8/2012 |
| EP | 1749629 B1 | 5/2013 |
| EP | 2123441 B1 | 7/2013 |
| EP | 2107000 B1 | 9/2013 |
| EP | 2031010 B1 | 4/2014 |
| EP | 2123808 B1 | 5/2014 |
| EP | 2036952 B1 | 4/2016 |
| EP | 3013544 A1 | 5/2016 |
| EP | 2387551 B1 | 7/2016 |
| EP | 1985754 B1 | 8/2016 |
| ES | 2140302 A1 | 2/2000 |
| FR | 1259819 A | 4/1961 |
| FR | 2121975 A5 | 8/1972 |
| FR | 2281815 A1 | 3/1976 |
| FR | 2503135 A1 | 10/1982 |
| FR | 2513932 A1 | 4/1983 |
| FR | 2735804 A1 | 12/1996 |
| GB | 217791 A | 6/1924 |
| GB | 574724 A | 1/1946 |
| GB | 644615 A | 10/1950 |
| GB | 851222 A | 10/1960 |
| GB | 1167927 A | 10/1969 |
| GB | 1199069 A | 7/1970 |
| GB | 1337014 A | 11/1973 |
| GB | 1460284 A | 12/1976 |
| GB | 1549633 A | 8/1979 |
| GB | 2106886 A | 4/1983 |
| GB | 2192392 A | 1/1988 |
| GB | 2300631 A | 11/1996 |
| GB | 2302090 A | 1/1997 |
| GB | 2392502 A | 3/2004 |
| GB | 2467005 A | 7/2010 |
| JP | S56115423 A | 9/1981 |
| JP | S5850197 A | 3/1983 |
| JP | S60187354 A | 9/1985 |
| JP | S6150654 A | 3/1986 |
| JP | S62122710 A | 6/1987 |
| JP | S6426403 A | 1/1989 |
| JP | H0218368 A | 1/1990 |
| JP | H0254504 U | 4/1990 |
| JP | H05116135 A | 5/1993 |
| JP | H05117012 A | 5/1993 |
| JP | H0624329 A | 2/1994 |
| JP | H06144944 A | 5/1994 |
| JP | H06263562 A | 9/1994 |
| JP | H0748186 A | 2/1995 |
| JP | H07275899 A | 10/1995 |
| JP | H0835281 A | 2/1996 |
| JP | H0960103 A | 3/1997 |
| JP | H09124099 A | 5/1997 |
| JP | H10194798 A | 7/1998 |
| JP | H11303398 A | 11/1999 |
| JP | H11324324 A | 11/1999 |
| JP | 2000203964 A | 7/2000 |
| JP | 2000247711 A | 9/2000 |
| JP | 2000281467 A | 10/2000 |
| JP | 2002012480 A | 1/2002 |
| JP | 2002127122 A | 5/2002 |
| JP | 3311436 B2 | 8/2002 |
| JP | 2003326232 A | 11/2003 |
| JP | 2005023692 A | 1/2005 |
| JP | 2005273720 A | 10/2005 |

(56) References Cited

FOREIGN PATENT DOCUMENTS

| | | |
|---|---|---|
| JP | 2007326881 A | 12/2007 |
| JP | 2008096409 A | 4/2008 |
| JP | 2009115209 A | 5/2009 |
| JP | 4313352 B2 | 8/2009 |
| KR | 20020006222 A | 1/2002 |
| KR | 20020042569 A | 6/2002 |
| KR | 20020090354 A | 12/2002 |
| KR | 20030004243 A | 1/2003 |
| KR | 20060064557 A | 6/2006 |
| KR | 100766364 B1 | 10/2007 |
| NZ | 183790 A | 9/1980 |
| RU | 2168412 C2 | 6/2001 |
| RU | 2212125 C2 | 9/2003 |
| RU | 2351469 C2 | 4/2009 |
| SE | 8002613 L | 3/1982 |
| SE | 451067 B | 8/1987 |
| SU | 1031728 A2 | 7/1983 |
| TW | I257330 B | 7/2006 |
| WO | WO-7900473 A1 | 7/1979 |
| WO | WO-8500587 A1 | 2/1985 |
| WO | WO-9105644 A1 | 5/1991 |
| WO | WO-9215753 A1 | 9/1992 |
| WO | WO-9319347 A1 | 9/1993 |
| WO | WO-9427797 A1 | 12/1994 |
| WO | WO-2001064348 A1 | 9/2001 |
| WO | WO-0190020 A2 | 11/2001 |
| WO | WO-2004033793 A2 | 4/2004 |
| WO | WO-2004074733 A1 | 9/2004 |
| WO | WO-2005025768 A1 | 3/2005 |
| WO | WO-2006040503 A1 | 4/2006 |
| WO | WO-2006100550 A1 | 9/2006 |
| WO | WO-2006100693 A1 | 9/2006 |
| WO | WO-2008149389 A1 | 12/2008 |
| WO | WO-2008149390 A1 | 12/2008 |
| WO | WO-2009078430 A1 | 6/2009 |
| WO | WO-2009089906 A1 | 7/2009 |
| WO | WO-2009132692 A1 | 11/2009 |
| WO | WO-2010074811 A1 | 7/2010 |
| WO | WO-2012079173 A1 | 6/2012 |
| WO | WO-2012081486 A1 | 6/2012 |
| WO | WO-2013011092 A1 | 1/2013 |
| WO | WO-2014021884 A1 | 2/2014 |
| WO | WO-2014026794 A1 | 2/2014 |
| WO | WO-2014063242 A1 | 5/2014 |
| WO | WO-2014121198 A1 | 8/2014 |
| WO | WO-2014205577 A1 | 12/2014 |
| WO | WO-2015123769 A1 | 8/2015 |
| WO | WO-2015/154174 | 10/2015 |
| WO | WO-2015154162 A1 | 10/2015 |
| WO | WO-2016041054 A1 | 3/2016 |
| WO | WO-2016082030 | 6/2016 |
| WO | WO-2016082030 A1 | 6/2016 |
| WO | WO-2017000075 A1 | 1/2017 |
| WO | WO-2017041176 | 3/2017 |
| WO | WO-2017177324 A1 | 10/2017 |
| WO | WO-2018232507 A1 | 12/2018 |

OTHER PUBLICATIONS

Co-pending U.S. Appl. No. 16/249,012, filed Jan. 16, 2019.
Lobo et al. Recycled Water in Ready Mixed Concrete Operations. Concrete in Focus, Spring 2003 (2003). 10 pages.
Shao, et al. A new CO2 sequestration process via concrete products production. Department of civil engineering. McGill University, Montreal, Canada. 2006.
U.S. Appl. No. 15/304,208 Office Action dated Jan. 24, 2019.
U.S. Appl. No. 15/170,018 Notice of Allowance dated Dec. 19, 2018.
U.S. Appl. No. 15/184,219 Office Action dated Feb. 4, 2019.
U.S. Appl. No. 15/240,954 Ex Parte Quayle Office action dated Feb. 5, 2019.
Abanades, et al. Conversion limits in the reaction of CO2 with lime. Energy and Fuels. 2003; 17(2):308-315.
Author Unknown, "Splicing Solution," Quarry Management, Oct. 2002, 3 pages.
Bhatia, et al. Effect of the Product Layer on the kinetics of the CO2-lime reaction. AlChE Journal. 1983; 29(1):79-86.
Chang, et al. The experimental investigation of concrete carbonation depth. Cement and Concrete Research. 2006; 36(9):1760-1767.
Chen, et al. On the kinetics of Portland cement hydration in the presence of selected chemical admixtures. Advances in Cement Research. 1993; 5(17):9-13.
"Clear Edge Filtration—Screen and Filter, Process Belts, and Screen Print," Mining-Techology.com, no date, [retrieved on May 25, 2010]. Retrieved from: http:/www.mining-technology.com/contractors/filtering/clear-edge/, 2 pages.
Co-pending U.S. Appl. No. 62/096,018, filed Dec. 23, 2014.
Co-pending U.S. Appl. No. 61/839,312, filed Jun. 25, 2013.
Co-pending U.S. Appl. No. 61/847,254, filed Jul. 17, 2013.
Co-pending U.S. Appl. No. 61/879,049, filed Sep. 17, 2013.
Co-pending U.S. Appl. No. 61/925,100, filed Jan. 8, 2014.
Co-pending U.S. Appl. No. 61/938,063, filed Feb. 10, 2014.
Co-pending U.S. Appl. No. 61/941,222, filed Feb. 18. 2014.
Co-pending U.S. Appl. No. 61/992,089, filed May 12, 2014.
Dewaele, et al. Permeability and porosity changes associated with cement grout carbonation. Cement and Concrete Research. 1991; 21(4):441-454.
Dorbian "Nova Scotia-based CarbonCure garners $3.5 min in Series B funds," Reuters PE Hub, Dec. 11, 2013, 6 pages, found at http://www.pehub.com/2013/12/nova-scotia-based-carboncure-garners-3-5-mln-in-series-b-funds/.
Estes-Haselbach. The greenest concrete mixer—carbon sequestration in freshly mixed concrete. Sep. 25, 2012.
European search report and search opinion dated Jan. 14, 2015 for EP 11849437.6.
Fernandez-Bertos, et al. A review of accelerated carbonation technology in the treatment of cement-based materials and sequestration of CO2. Journal of Hazardous Materials B112. 2004; 193-205.
Fluid Hole and Size. Newton: Ask a Scientist. Jan. 24, 2005. Retrieved from http://www.newton.dep.anl.gov/askasci/eng99/eng99365.htm on Jul. 13, 2013.
Freedman, S. Carbonation Treatment of Concrete Masonry Units. Modern Concrete. 1969; 33(5):33-6.
Gager, "Trumbull Corp.: CHARLEROI Lock & Dam," Construction Today, 2010, [retrieved on May 25, 2010]. Retrieved from http://www.construction-today.com/cms1/content/view/1909/104/, 2 pages.
"GLENIUM® 3400 NV: High-Range Water-Reducing Admixture," BASF, Product Data, Jun. 2010, 2 pages.
Goodbrake, et al. Reaction of Hydraulic Calcium Silicates with Carbon Dioxide and Water. Journal of the American Ceramic Society. 1979; 62(9-10):488-491.
Goto, et al. Calcium Silicate Carbonation Products. Journal of the American Ceramic Society. 1995; 78(11):2867-2872.
Goto. Some mineralo-chemical problems concerning calcite and aragonite, with special reference to the genesis of aragonite. Contribution from the department of geology and mineralogy. Faculty of Science. Hokkaido University. 1961. http://eprints.lib.hokudai.ac.jp/dspace/bitstream/2115/35923/1/10(4)_571-640.pdf.
Hesson, et al. Flow of two-phase carbon dioxide through orifices. AlChE Journal 4.2 (1958):207-210.
Huijgen, et al. Mineral CO2 sequestration by steel slag carbonation. Environmental Science and Technology. 2005; 39(24):9676-9682.
Huntzinger, et al. Carbon dioxide sequestration in cement kiln dust through mineral carbonation. Environ Sci Technol. Mar. 15, 2009;43(6):1986-92.
Hurst. Canadian cement plant becomes first to capture CO2 in algae. Earth and Industry. Pond Biofuels press release. Mar. 19, 2010.
Iizuka, et al. Development of a new CO2 sequestration process utilizing the carbonation of waste cement. Industrial & Engineering Chemistry Research. 2004; (43)24:7880-7887.
International search report and written opinion dated Jan. 25, 2016 for PCT Application No. PCTCA2015/051220.
International search report and written opinion dated Mar. 6, 2012 for PCT Application No. CA2011/050774.

(56) References Cited

OTHER PUBLICATIONS

International search report and written opinion dated May 4, 2015 for PCT/CA2015/050118.
International search report and written opinion dated Jul. 16, 2015 for PCT Application No. PCT/CA2015/000158.
International search report and written opinion dated Jul. 16, 2015 for PCT Application No. PCT/CA2015/050318.
International search report and written opinion dated Jul. 18, 2013 for PCT Application No. CA2013/050190.
International Search Report and Written Opinion dated Aug. 30, 2016 for International application No. PCT/CA2016/050773.
International search report and written opinion dated Sep. 18, 2014 for PCT/CA2014/050611.
International Search Report and Written Opinion dated Oct. 19, 2016 for International Application No. PCT/CA2016/051062.
International search report dated May 16, 2014 for PCT Application No. PCT/US14/14447.
Kashef-Haghighi, et al. Accelerated Concrete Carbonation, a CO2 Sequestration Technology. 8th World Congress of Chemical Engineering WCCE8. Aug. 24, 2009.
Kashef-Haghighi, et al. CO2 sequestration in concrete through accelerated carbonation curing in a flow-through reactor. Ind. Eng. Chem. Res. 2010; 49:1143-1149.
Kawashima, et al. Dispersion of CaCO3 Nanoparticles by Sonication and Surfactant Treatment for Application in Fly Ash-Cement Systems. Materials and Structures. May 28, 2013. DOI 10.1617/S11527-013-0110-9.
Lange, et al. Preliminary investigation into the effects of carbonation on cement-solidified hazardous wastes. Environmental Science and Technology. 1996; 30(1):25-30.
Logan, C. Carbon dioxide absorption and durability of carbonation cured cement and concrete compacts. Thesis. Department of Civil Engineering, McGill University. Montreal, QC, Canada. 2006.
Lomboy, et al. Atom Probe Tomography for Nanomodified Portland Cement. Nanotechnology in Construction. Springer International Publishing, 2015. 79-86.
"MB-AETM 90: Air-Entraining Admixture" BASF, Product Data, Apr. 11, 2 pages, found at http://www.basf-admixtures.com/en/products/airentraining/mbae_90/Pages/default.aspx.
Mehta. "Concrete Carbonation". Materials World Magazine. Oct. 1, 2008 [Retrieved on Jul. 13, 2013] Retrieved from http://www.iom3.org/news/concrete-carbonation.
Monkman, et al. Assessing the Carbonation Behavior of Cementitious Materials. J. Mater. Civ. Eng. 2006; 18(6), 768-776.
Monkman, et al. Carbonated Ladle Slag Fines for Carbon Uptake and Sand Substitute. Journal of Materials in Civil Engineering. Nov. 2009;657-665.
Monkman, et al. Carbonation Curing of Slag-Cement Concrete for Binding CO2 and Improving Performance. Journal of Materials in Civil Engineering. Apr. 2010; 296-304.
Monkman, et al. Integration of carbon sequestration into curing process of precast concrete. Can. J. Civ. Eng. 2010; 37:302-310.
Monkman, G. S. Investigating Carbon Dioxide Sequestration in Fresh Ready Mixed Concrete. International Symposium on Environmentally Friendly Concrete—ECO-Crete Aug. 13-15, 2014, Reykjavik, Iceland.
Monkman, S. Maximizing carbon uptake and performance gain in slag-containing concretes through early carbonation. Thesis. Department of Civil Engineering and Applied Mechanics, McGill University. Montreal, QC, Canada. 2008.
Niven, et al. Carbon Dioxide Uptake Rate and Extent during Accelerated Curing of Concrete. International Congress on the Chemistry of Cement 2007. ICCC 2007.
Niven. Industrial pilot study examining the application of precast concrete carbonation curing. Cardon Sense Solutions Inc. Halifax, Canada. ACEME 2008.
Niven. Physiochemical investigation of CO2 accelerated concrete curing as a greenhouse gas mitigation technology. Theses from the Department of Civil Engineering and Applied Mechanics. McGill University, Montreal, Canada. Oct. 2006.

Notice of allowance dated Feb. 26, 2016 for U.S. Appl. No. 14/642,536.
Notice of allowance dated Mar. 29, 2016 for U.S. Appl. No. 14/701,456.
Notice of allowance dated Apr. 22, 2014 for U.S. Appl. No. 13/660,447.
Notice of allowance dated Apr. 24, 2015 for U.S. Appl. No. 14/249,308.
Notice of allowance dated Apr. 24, 2017 for U.S. Appl. No. 15/161,927.
Notice of allowance dated Apr. 25, 2016 for U.S. Appl. No. 14/642,536.
Notice of allowance dated May 6, 2016 for U.S. Appl. No. 14/796,751.
Notice of allowance dated May 11, 2016 for U.S. Appl. No. 14/701,456.
Notice of allowance dated Jun. 22, 2017 for U.S. Appl. No. 15/161,927.
Notice of allowance dated Jun. 24, 2015 for U.S. Appl. No. 14/249,308.
Notice of allowance dated Jun. 30, 2017 for U.S. Appl. No. 15/434,429.
Notice of allowance dated Jul. 5, 2016 for U.S. Appl. No. 14/282,965.
Notice of allowance dated Aug. 5, 2016 for U.S. Appl. No. 14/796,751.
Notice of allowance dated Aug. 16, 2016 for U.S. Appl. No. 14/796,751.
Notice of allowance dated Sep. 14, 2016 for U.S. Appl. No. 14/796,751.
Notice of Allowance dated Dec. 21, 2016 for U.S. Appl. No. 15/161,927.
Notices of allowance dated Mar. 3, 2016 and Mar. 17, 2016 for U.S. Appl. No. 14/701,456.
Office action dated Jan. 25, 2016 for U.S. Appl. No. 14/701,456.
Office action dated Mar. 7, 2016 for U.S. Appl. No. 14/796,751.
Office action dated Mar. 10, 2015 for U.S. Appl. No. 14/249,308.
Office action dated Mar. 28, 2013 for U.S. Appl. No. 13/660,447.
Office action dated Apr. 26, 2016 for U.S. Appl. No. 14/950,288.
Office action dated May 10, 2017 for U.S. Appl. No. 13/994,681.
Office Action dated Jun. 16, 2016 for U.S. Appl. No. 13/994,681.
Office action dated Jul. 3, 2017 for U.S. Appl. No. 14/171,350.
Office action dated Jul. 15, 2013 for U.S. Appl. No. 13/660,447.
Office action dated Jul. 30, 2015 for U.S. Appl. No. 14/282,965.
Office action dated Aug. 12, 2016 for U.S. Appl. No. 14/950,288.
Office action dated Aug. 14, 2015 for U.S. Appl. No. 14/701,456.
Office action dated Aug. 18, 2015 for U.S. Appl. No. 14/642,536.
Office action dated Aug. 22, 2016 for U.S. Appl. No. 15/161,927.
Office action dated Sep. 2, 2016 for U.S. Appl. No. 15/228,964.
Office action dated Oct. 5, 2015 for U.S. Appl. No. 14/701,456.
Office action dated Dec. 2, 2015 for U.S. Appl. No. 14/282,965.
Office action dated Dec. 7, 2015 for U.S. Appl. No. 14/796,751.
Papadakis, et al. A reaction engineering approach to the problem of concrete carbonation. AIChE Journal. 1989; 35(10):1639-1650.
Papadakis, et al. Fundamental Modeling and Experimental Investigation of Concrete Carbonation. ACI Materials Journal. 1991; 88(4):363-373.
Phipps and Macdonald. Sustainability Leads to Durability in the New I-35W Bridge. Concrete International. Feb. 2009; vol. 31 Issue 2, p. 27-32.
"POZZOLITH® 200N: Water-Reducing Admixture," BASF, Product Data, Sep. 2010, 2 pages, found at http://www.basf-admixtures.com/en/products/waterreducingretarding/pozzolith200n/Pages/default.aspx.
"POZZOLITH® 322 N: Water-Reducing Admixture," BASF, Product Data, Mar. 2007, 2 pages.
Preliminary Amendment dated Nov. 1, 2013 for U.S. Appl. No. 13/994,681.
Reardon, et al. High pressure carbonation of cementitious grout. Cement and Concrete Research. 1989; 19(3):385-399.
Sato, et al. Effect of Nano-CaCO3 on Hydration of Cement Containing Supplementary Cementitious Materials. Institute for Research in Construction, National Research Council Canada. Oct. 2010.
Sato, et al. Seeding effect of nano-CaCO3 on the hydration of tricalcium silicate, Transportation Research Record. 2010; 2141:61-67.

(56) References Cited

OTHER PUBLICATIONS

Shao, et al. A new CO2 sequestration process via concrete products production. Department of civil engineering. McGill University, Montreal, Canada. 2007.
Shao, et al. CO2 sequestration using calcium-silicate concrete. Canadian Journal of Civil Engineering. 2006;(33)6:776-784.
Shao, et al. Market analysis of CO2 sequestration in concrete building products. Second International Conference on Sustainable Construction Materials and Technologies. Jun. 28-30, 2010.
Shao, et al. Recycling carbon dioxide into concrete: a feasibility study. Concrete Sustainability Conference. 2010.
Shi, et al. Studies on some factors affecting CO2 curing of lightweight concrete products. Resources, Conservation and Recycling. 2008; (52)8-9:1087-1092.
Shideler, J. Investigation of the moisture-vol. stability of concrete masonry units. Portland Cement Association. 1955. (D3).
Shih, et al. Kinetics of the reaction of Ca(OH)2 with CO2 at low temperature. Industrial and Engineering Chemistry Research. 1999; 38(4):1316-1322.
Sorochkin, et al. Study of the possibility of using carbon dioxide for accelerating the hardening of products made from Portland Cement. J. Appl. Chem. USSR. 1975; 48:1271-1274.
Steinour, H. Some effects of carbon dioxide on mortars and concrete-discussion. Journal of the American Concrete Institute. 1959; 30:905-907.
Technology Roadmap: Cement. International Energy Agency. Dec. 2009 [Retrieved on Jul. 13, 2013]. Retrieved from http://www.iea.org/publications/freepublications/publication/name,3861,en.html.
Teir, et al. Carbonation of Finnish magnesium silicates for CO2 sequestration . Fifth Annual Conference on Carbon Capture and Sequestration. May 8-11, 2006. National Energy Technology Laboratory, Department of Energy, USA.
The Vince Hagan Co., "Stationary, Radial Stacking, and Wet Belt Conveyors—Product Brochure," 4 pages.
Toennies, et al. Artificial carbonation of concrete masonry units. American Concrete Institute Journal. 1960; 31(8):737-755.
Tri-Cast literature, Dry cast machine. Besser Company. Sioux, Iowa, USA. Jun. 2009.
Van Balen, K. Carbonation reaction of lime, kinetics at ambient temperature. Cement and Concrete Research. 2005; 35(4):647-657.
Venhuis, et al. Vacuum method for carbonation of cementitious wasteforms. Environ Sci Technol. Oct. 15, 2001;35(20):4120-5.
Weber, et al. Find carbon dioxide gas under pressure an efficient curing agent for cast stone. Concrete. Jul. 1941; 33-34.
Young, et al. Accelerated Curing of Compacted Calcium Silicate Mortars on Exposure to CO2. Journal of the American Ceramic Society.. 1974; 57(9):394-397.
Co-pending U.S. Appl. No. 15/649,339, filed Jul. 13, 2017.
Co-pending U.S. Appl. No. 15/650,524, filed Jul. 14, 2017.
Co-pending U.S. Appl. No. 15/659,334, filed Jul. 25, 2017.
Co-pending U.S. Appl. No. 15/703,522, filed Sep. 13, 2017.
European search report dated Nov. 7, 2017 for EP Application No. 15776706.
European search report with written opinion dated Feb. 2, 2017 for EP2951122.
European search report with written opinion dated Nov. 14, 2017 for EP Application No. 15777459.
European search report with written opinion dated Jan. 20, 2017 for EP14818442.
International search report with written opinion dated Jun. 15, 2017 for PCT/CA2017/050445.
International search report with written opinion dated Jul. 3, 2016 for PCT/CA2015/050195.
Kim, et al. Properties of cement-based mortars substituted by carbonated fly ash and carbonated under supercritical conditions. IJAER. 9(24), 25525-25534 (2014).
Notice of allowance dated Apr. 14, 2017 for U.S. Appl. No. 15/157,205.
Notice of allowance dated Jun. 15, 2017 for U.S. Appl. No. 15/157,205.
Notice of allowance dated Jul. 28, 2017 for U.S. Appl. No. 15/434,429.
Notice of allowance dated Aug. 2, 2017 for U.S. Appl. No. 15/161,927.
Office action dated Feb. 27, 2017 for U.S. Appl. No. 14/171,350.
Office action dated Mar. 7, 2017 for U.S. Appl. No. 15/434,429.
Office action dated Mar. 14, 2017 for U.S. Appl. No. 15/228,964.
Office action dated Sep. 28, 2016 for U.S. Appl. No. 15/157,205.
Office action dated Oct. 19, 2017 for U.S. Appl. No. 15/228,964.
Office Action dated Nov. 3, 2016 for U.S. Appl. No. 15/161,927.
Office Action dated Dec. 29, 2016 for U.S. Appl. No. 15/157,205.
Office Action dated Dec. 30, 2016 for U.S. Appl. No. 13/994,681.
Yelton, R. Treating Process Water. The Concrete Producer. pp. 441-443. Jun. 1, 1997.
Co-pending U.S. Appl. No. 16/155,013, filed Oct. 9, 2018.
PCT/CA2018/050750 International Search Report and Written Opinion dated Sep. 6, 2018.
EP15862209.2 Extended European Search Report dated Oct. 8, 2018.
U.S. Appl. No. 15/170,018 Office Action dated Oct. 16, 2018.
U.S. Appl. No. 15/184,219 Office Action dated Oct. 16, 2018.
U.S. Appl. No. 15/240,954 Office Action dated Oct. 23, 2018.
Co-pending U.S. Appl. No. 15/911,573, filed Mar. 5, 2018.
Co-pending U.S. Appl. No. 15/284,186, filed Oct. 3, 2016.
Co-pending U.S. Appl. No. 15/304,208, filed Oct. 14, 2016.
Co-pending U.S. Appl. No. 62/083,784, filed Nov. 24, 2014.
Co-pending U.S. Appl. No. 62/086,024, filed Dec. 1, 2014.
Co-pending U.S. Appl. No. 62/146,103, filed Apr. 10, 2015.
Co-pending U.S. Appl. No. 62/160,350, filed May 12, 2015.
Co-pending U.S. Appl. No. 62/165,670, filed May 22, 2015.
Co-pending U.S. Appl. No. 62/215,481, filed Sep. 8, 2015.
Co-pending U.S. Appl. No. 62/240,843, filed Oct. 13, 2015.
Co-pending U.S. Appl. No. 62/321,013, filed Apr. 11, 2016.
Co-pending U.S. Appl. No. 62/522,510, filed Jun. 20, 2017.
Co-pending U.S. Appl. No. 62/554,830, filed Sep. 6, 2017.
Co-pending U.S. Appl. No. 62/558,173, filed Sep. 13, 2017.
Co-pending U.S. Appl. No. 62/559,771, filed Sep. 18, 2017.
Co-pending U.S. Appl. No. 62/560,311, filed Sep. 19, 2017.
Co-pending U.S. Appl. No. 62/570,452, filed Oct. 10, 2017.
Co-pending U.S. Appl. No. 62/573,109, filed Oct. 16, 2017.
Co-pending U.S. Appl. No. 62/652,385, filed Apr. 4, 2018.
Co-pending U.S. Appl. No. 62/675,615, filed May 23, 2018.
Co-pending U.S. Appl. No. 61/423,354, filed Sep. 15, 2010.
Co-pending U.S. Appl. No. 61/760,319, filed Feb. 4, 2013.
Co-pending U.S. Appl. No. 61/976,360, filed Apr. 7, 2014.
Co-pending U.S. Appl. No. 61/980,505, filed Apr. 16, 2014.
EP15862209.2 Partial Supplementary European Search Report dated Jun. 20, 2018.
European search report with written opinion dated Nov. 29, 2017 for EP15780122.
Le et al. Hardened properties of high-performance printing concrete. Cement and Concrete Research, vol. 42, No. 3, Mar. 31, 2012, pp. 558-566.
Mass. Premixed Cement Paste. Concrete International 11(11):82-85 (Nov. 1, 1989).
PCT Application No. PCT/CA2014/050611 as filed Jun. 25, 2014.
Younsi, et al. Performance-based design and carbonation of concrete with high fly ash content. Cement and Concrete Composites, Elsevier Applied Science, Barking, GB, vol. 33, No. 1, Jul. 14, 2011. pp. 993-1000.
Canadian Office Action dated Jul. 7, 2020 for Application No. CA 2,979,471, 3 pages.
Co-Pending U.S. Appl. No. 62/705,130, filed Jun. 12, 2020.
Co-Pending U.S. Appl. No. 16/624,776, filed Dec. 19, 2019.
Co-Pending U.S. Appl. No. 16/683,416, filed Nov. 14, 2019.
Co-Pending U.S. Appl. No. 62/705,617, filed Jul. 7, 2020.
First Written Opinion, issued by the Intellectual Property Office of Singapore, dated Mar. 3, 2020, for Singapore patent application No. 11201810010P.
International Search Report and Written Opinion dated May 14, 2020 for PCT application No. PCT/US2019/066407.
International Search Report and Written Opinion dated Jul. 22, 2020 for PCT/IB2020/053953.

(56) References Cited

OTHER PUBLICATIONS

Shi et al. "Performance Enhancement of Recycled Concrete Aggregate—A Review," Journal of Cleaner Production, 112, pp. 466-472 (2006).
Extended European Search Report dated Aug. 18, 2020, for European patent application No. 19207508.3.

\* cited by examiner

Water adjusted Bomix (2200 ml)
7 day strength

Water adjusted Bomix (2300 ml)
7 day strength

BOMIX slump with varying mix water contents

Figure 32

| Code | Condition | Water | | | Ad-mix | $CO_2$ (% bwc) | | $CO_2$ Efficiency (%) | Strength, psi | | | Absorption | Density ($lb/ft^3$) |
|---|---|---|---|---|---|---|---|---|---|---|---|---|---|
| | | w/c | Final | Bake-off | | Dose | Uptake | | 7 day | 28 day | 56 day | | |
| 0500 | Uncarb | 0.406 | 8.88% | 6.83% | - | - | 0.00 | - | 2646 | 3002 | 3688 | 6.6% | 130.3 |
| 0700 | Uncarb | 0.425 | 7.35% | 6.71% | - | - | 0.00 | - | 3172 | 3529 | 3642 | 6.4% | 131.0 |
| Avg | Uncarb | - | - | - | - | - | 0.00 | - | 2843 | 3199 | 3671 | 6.5% | 130.7 |
| 0601 | CO2 | 0.422 | 8.32% | 6.55% | - | 0.50* | 0.20 | 39% | 3872 | 4175 | 4528 | 3.9% | 134.0 |
| 0602 | CO2 | 0.430 | 8.25% | 6.58% | - | 0.50 | 0.28 | 57% | 3703 | 4171 | 4648 | 4.0% | 133.8 |
| 0603 | CO2 | 0.440 | 8.08% | 6.26% | - | 1.00 | 0.54 | 54% | 3788 | 4121 | 4150 | 4.3% | 131.0 |
| 0604 | CO2 | 0.450 | 8.23% | 6.01% | - | 1.50* | 0.80 | 53% | 3836 | 4377 | 4554 | 5.3% | 130.9 |
| 0605 | CO2 | 0.455 | 8.39% | 6.56% | - | 1.50 | 1.40 | 93% | 3347 | 3804 | 4364 | 5.4% | 130.4 |
| 0701 | CO2 | 0.413 | 8.12% | 5.92% | 0.5% | 1.50 | 1.43 | 95% | 4248 | 4456 | 4569 | 4.4% | 132.7 |
| 0702 | CO2 | 0.413 | 7.85% | 6.24% | 0.4% | 1.50 | 1.43 | 95% | 3539 | 3538 | 3738 | 4.4% | 131.5 |
| 0703 | CO2 | 0.424 | 7.99% | 5.90% | 0.3% | 1.50 | 1.24 | 83% | 3249 | 3720 | 3861 | 4.7% | 129.9 |
| 0704 | CO2 | 0.426 | 7.87% | 6.11% | 0.2% | 1.50 | 1.19 | 79% | 3275 | 3559 | 3788 | 5.5% | 128.1 |
| 0705 | CO2 | 0.433 | 7.81% | 5.48% | 0.1% | 1.50 | 1.19 | 79% | 3216 | 3121 | 3590 | 5.6% | 128.6 |

*The reported $CO_2$ dose for batches 601 and 604 include 0.5% bwc $CO_2$ delivered into the feedbox

Figure 34

| Code | Condition | Water | | | Admix | CO₂ (% bwc) | | CO₂ Efficiency (%) | Strength | | | Absorption | Density (lb/ft³) |
|---|---|---|---|---|---|---|---|---|---|---|---|---|---|
| | | w/c | Final | Bake-off | | Dose | Uptake | | 7 day | 28 day | 56 day | | |
| 0805 | Uncarb | 0.225 | 7.75% | 7.17% | - | - | 0.00 | - | 2518 | 2927 | 3035 | 7.5% | 128.9 |
| 0806 | CO2 | 0.514 | 8.53% | 7.27% | 0.4% | 1.50 | 2.10 | 140% | 2349 | 2518 | 2762 | 8.9% | 125.8 |

Figure 35

| Code | Condition | Water | | | Admix | CO$_2$ (% bwe) | | CO$_2$ Efficiency (%) | Strength | | | Absorption | Density (lb/ft$^3$) |
|---|---|---|---|---|---|---|---|---|---|---|---|---|---|
| | | w/c | Final | Bakeoff | | Dose | Uptake | | 7 day | 28 day | 56 day | | |
| 0801 | Uncarb | 0.745 | 6.96% | 12.20% | - | - | 0.00 | - | 1549 | 1680 | 1803 | 13.0% | 101.7 |
| 0901 | CO2 | 0.691 | 12.25% | 12.53% | - | 1.50 | 2.09 | 139% | 1374 | 1758 | 1980 | 13.6% | 100.1 |
| 0902 | CO2 | 0.703 | 13.79% | 12.14% | 0.35% | 1.50 | 1.69 | 113% | 1893 | 2381 | 2536 | 11.6% | 103.6 |
| 0802 | CO2 | 0.758 | 8.80% | 12.85% | 0.40% | 1.50 | 0.92 | 61% | 2724 | 3260 | 3319 | 8.6% | 108.8 |
| 0903 | CO2 | 0.707 | 13.99% | 12.27% | 0.45% | 1.50 | 1.62 | 108% | 1871 | 2224 | 2398 | 11.8% | 102.8 |

Figure 37

| Code | Condition | Water | | | Admix | $CO_2$ (% bwc) | | $CO_2$ Efficiency (%) | Strength | | | Absorption | Density (lb/ft³) |
|---|---|---|---|---|---|---|---|---|---|---|---|---|---|
| | | w/c | Final | Bake-off | | Dose | Up-take | | 7 day | 28 day | 56 day | | |
| 0803 | Uncarb | 0.672 | 6.55% | 6.99% | - | - | 0.00 | - | 1876 | 1884 | 2200 | 8.9% | 125.5 |
| 0904 | CO2 | 0.697 | 6.93% | 6.58% | - | 1.50 | 1.26 | 84% | 1809 | 1922 | 2086 | 10.0% | 121.4 |
| 0905 | CO2 | 0.736 | 7.00% | 6.65% | 0.35% | 1.50 | 0.35 | 23% | 2004 | 2027 | 2399 | 9.1% | 125.6 |
| 0804 | CO2 | 0.710 | 7.29% | 6.80% | 0.40% | 1.50 | 1.04 | 69% | 2038 | 2292 | 2373 | 8.7% | 126.0 |
| 0906 | CO2 | 0.718 | 7.02% | 6.37% | 0.45% | 1.50 | 1.35 | 90% | 3050 | 3073 | 3483 | 7.2% | 129.3 |

Figure 41

| | Batch | | |
|---|---|---|---|
| | 092509 | 092506 | 092507 |
| Condition | Control | 1% CO2 | 1% CO2 + 0.25% sg |
| Strength (psi) | 3723 | 3510 | 4003 |
| Absorption | 6.5% | 7.0% | 6.2% |
| Shrinkage | 0.044% | 0.051% | 0.046% |
| Strength vs control | - | -6% | +8% |
| Absorption vs control | - | +7% | -4% |
| Shrinkage vs control | - | +14% | +4% |

Figure 74

| | Energy (J/g cement) | | | | | | | |
|---|---|---|---|---|---|---|---|---|
| Mix and Condition | Control No CO2 | Control 30s CO2 | Control 60s CO2 | Control 90s CO2 | CaO doped No CO2 | CaO doped 30s CO2 | CaO doped 60s CO2 | CaO doped 90s CO2 |
| Time after mixing (hrs) 6 | 13.15 | 15.69 | 16.22 | 15.96 | 12.76 | 18.87 | 21.55 | 19.63 |
| 12 | 70.12 | 70.69 | 68.17 | 65.82 | 69.17 | 82.27 | 83.24 | 76.66 |
| 18 | 118.13 | 112.75 | 106.37 | 100.75 | 116.33 | 128.35 | 126.03 | 113.82 |
| 24 | 150.34 | 140.42 | 132.25 | 124.63 | 145.56 | 155.38 | 151.72 | 135.92 |
| $CO_2$ uptake bwc | - | 0.22% | 0.31% | 0.51% | - | 0.35% | 0.78% | 1.18% |

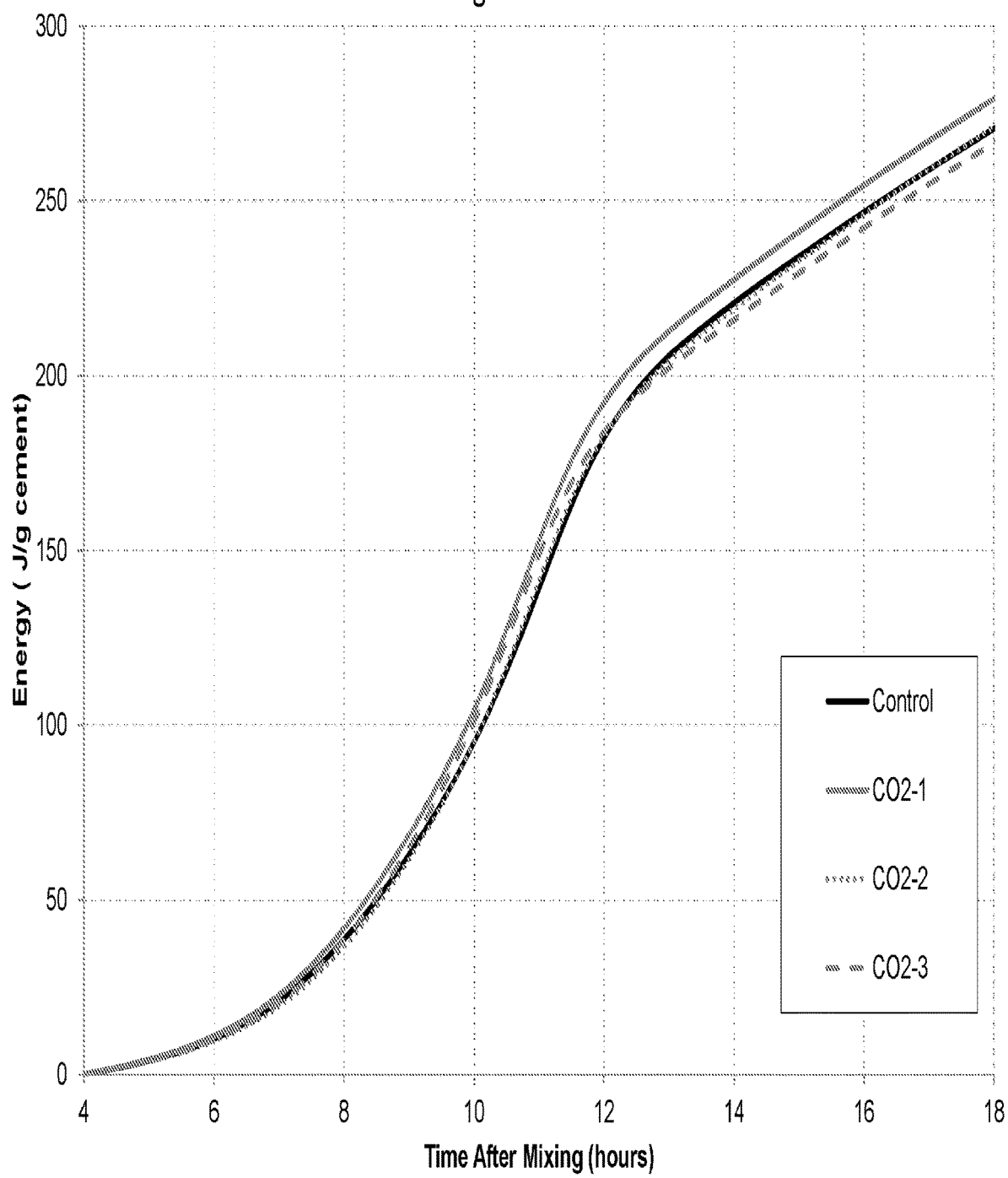

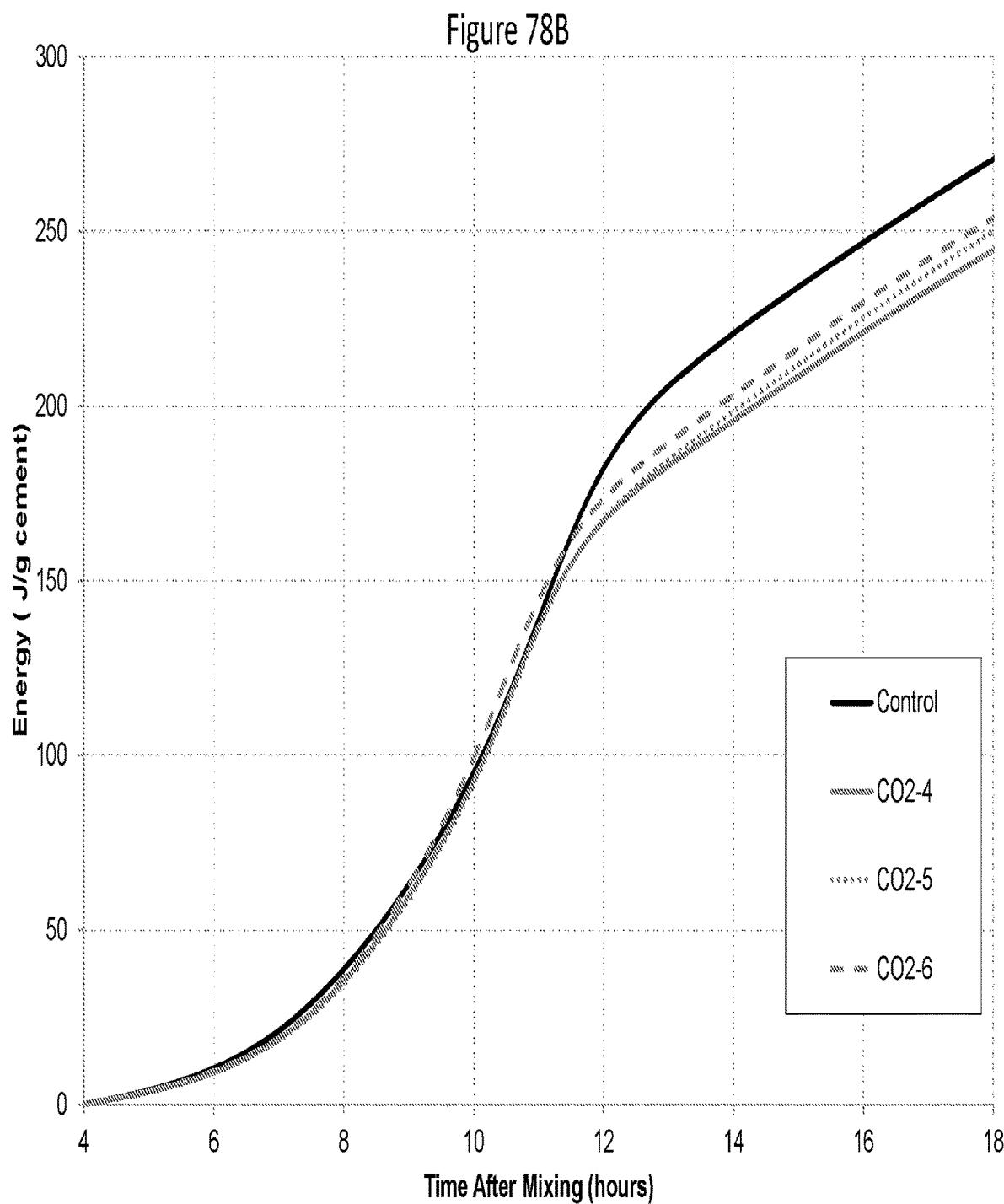

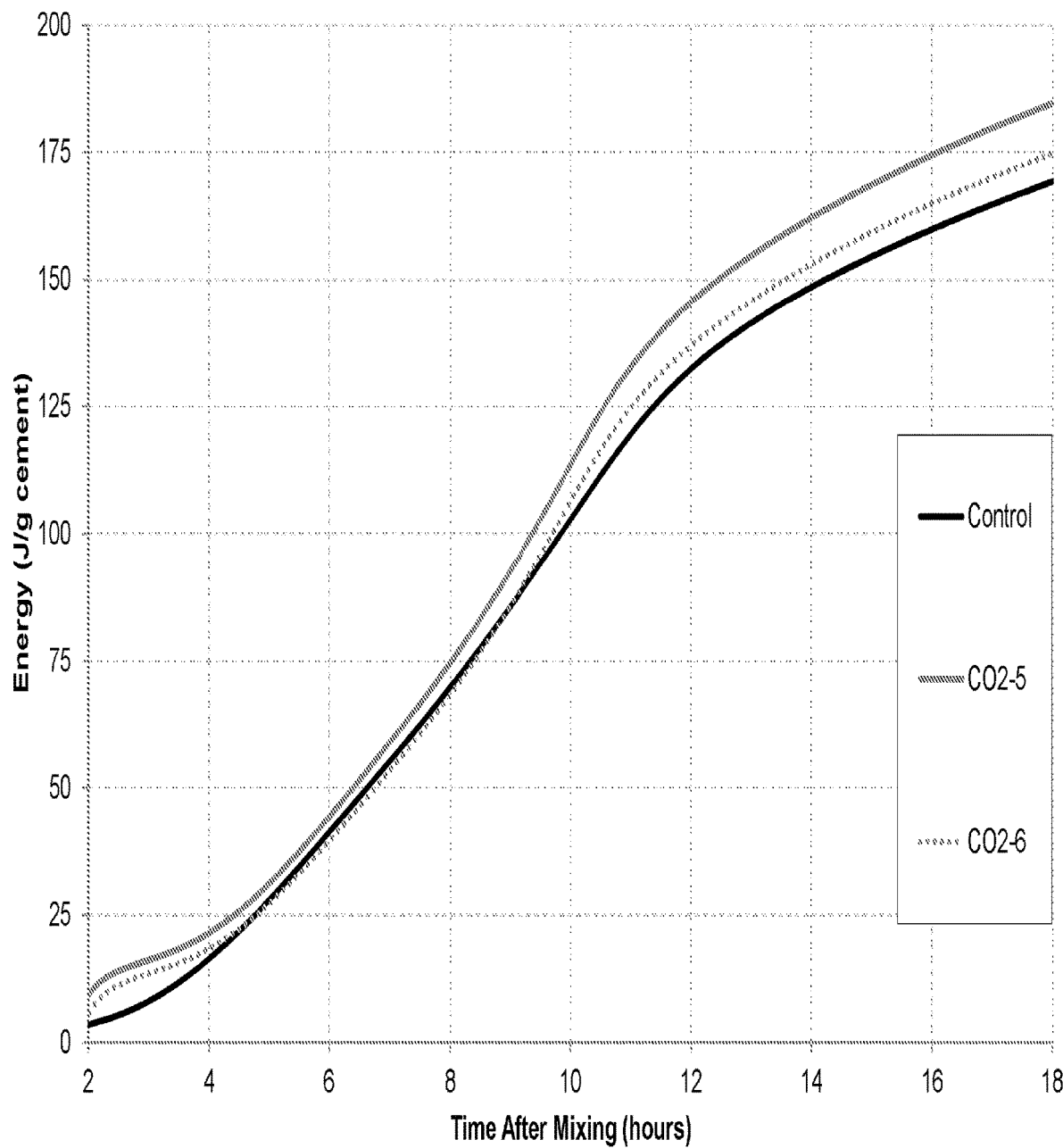

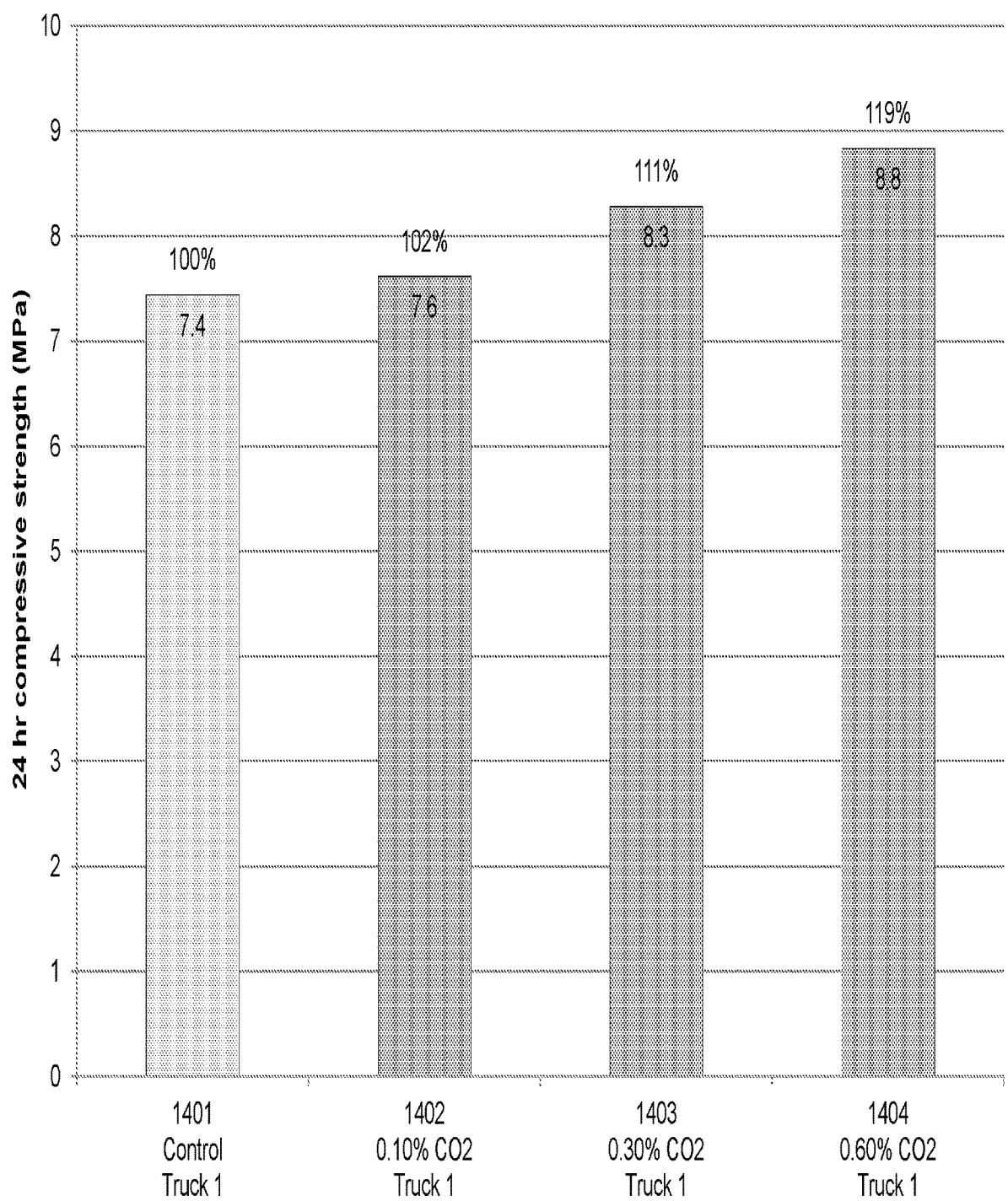

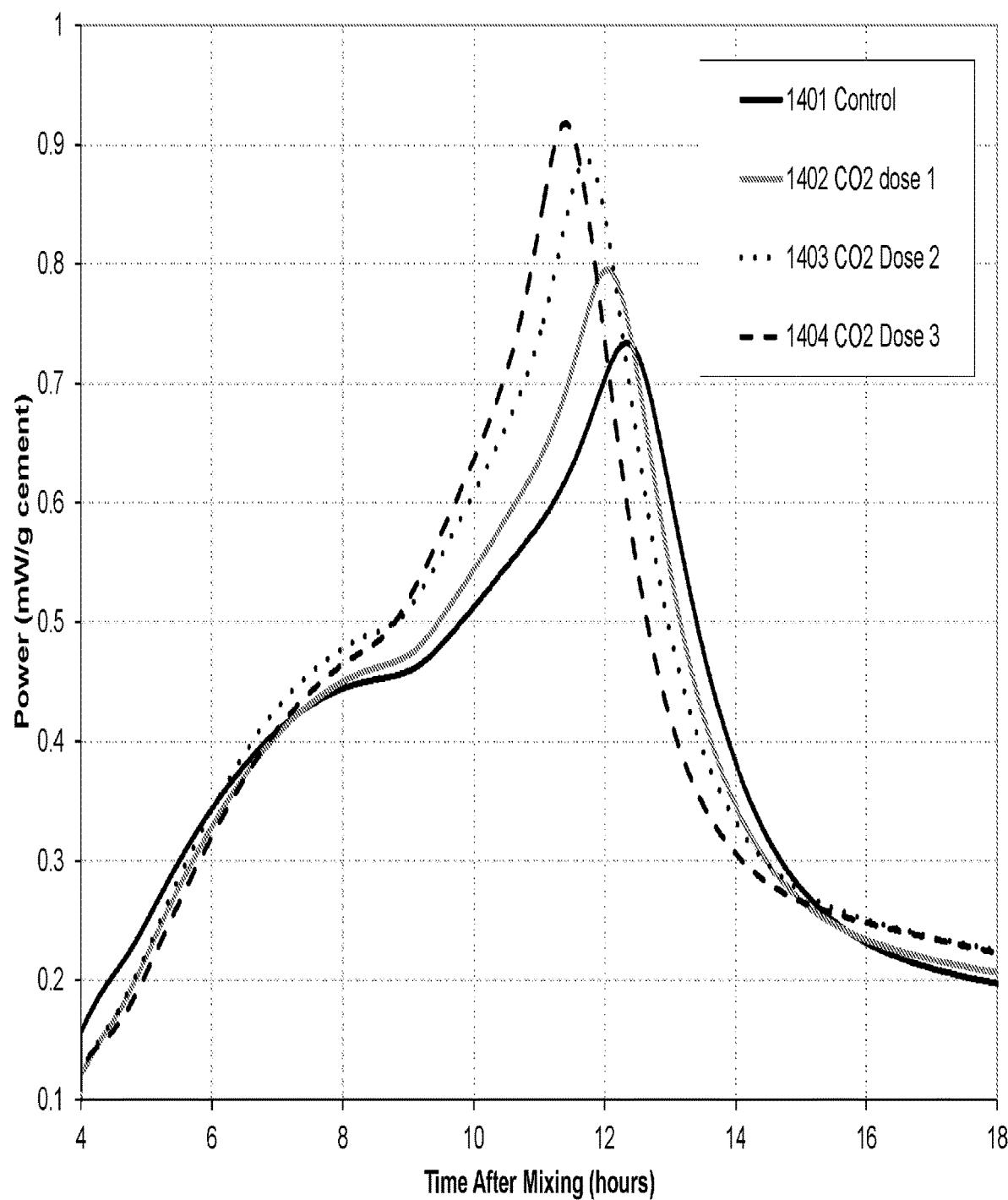

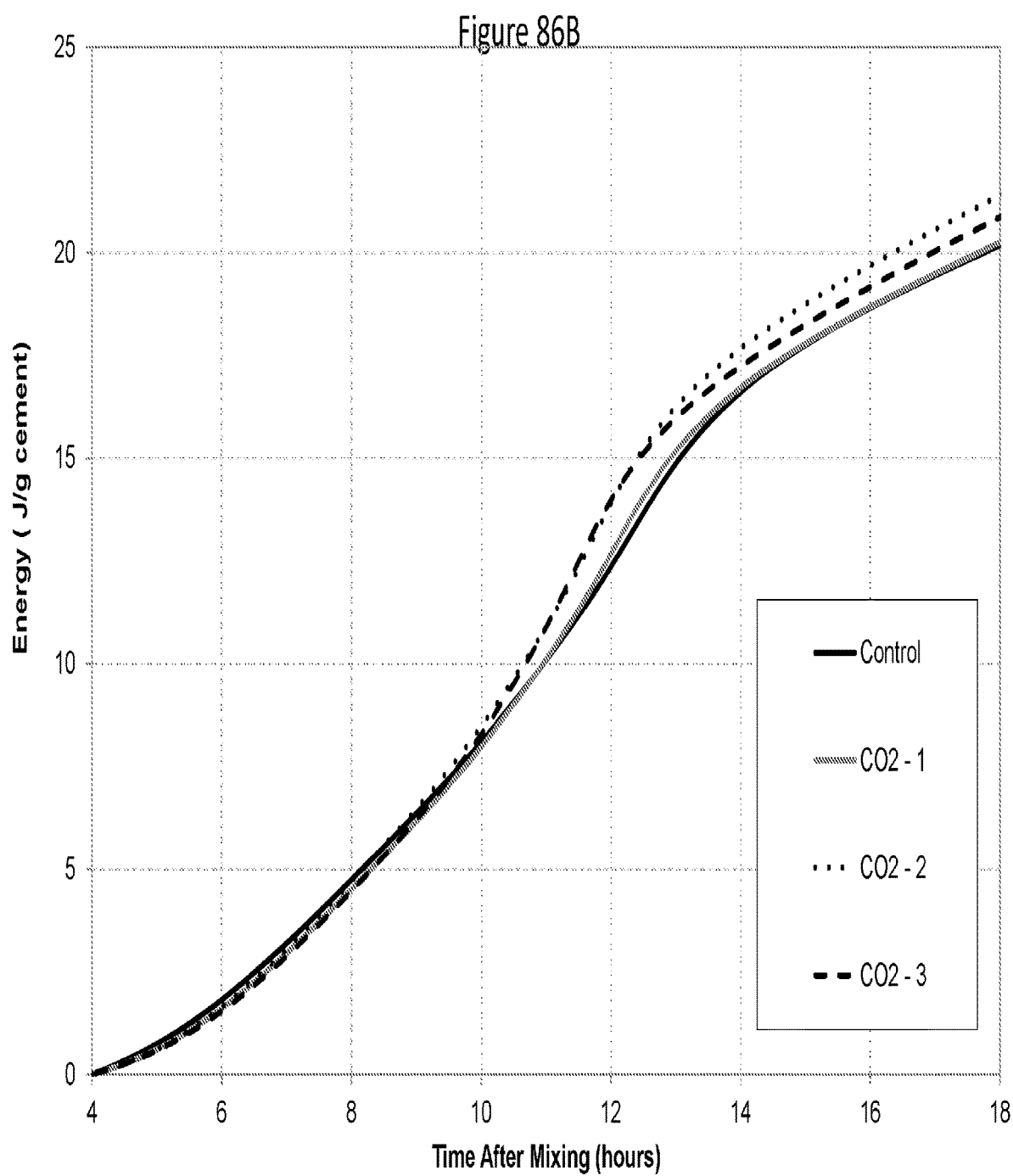

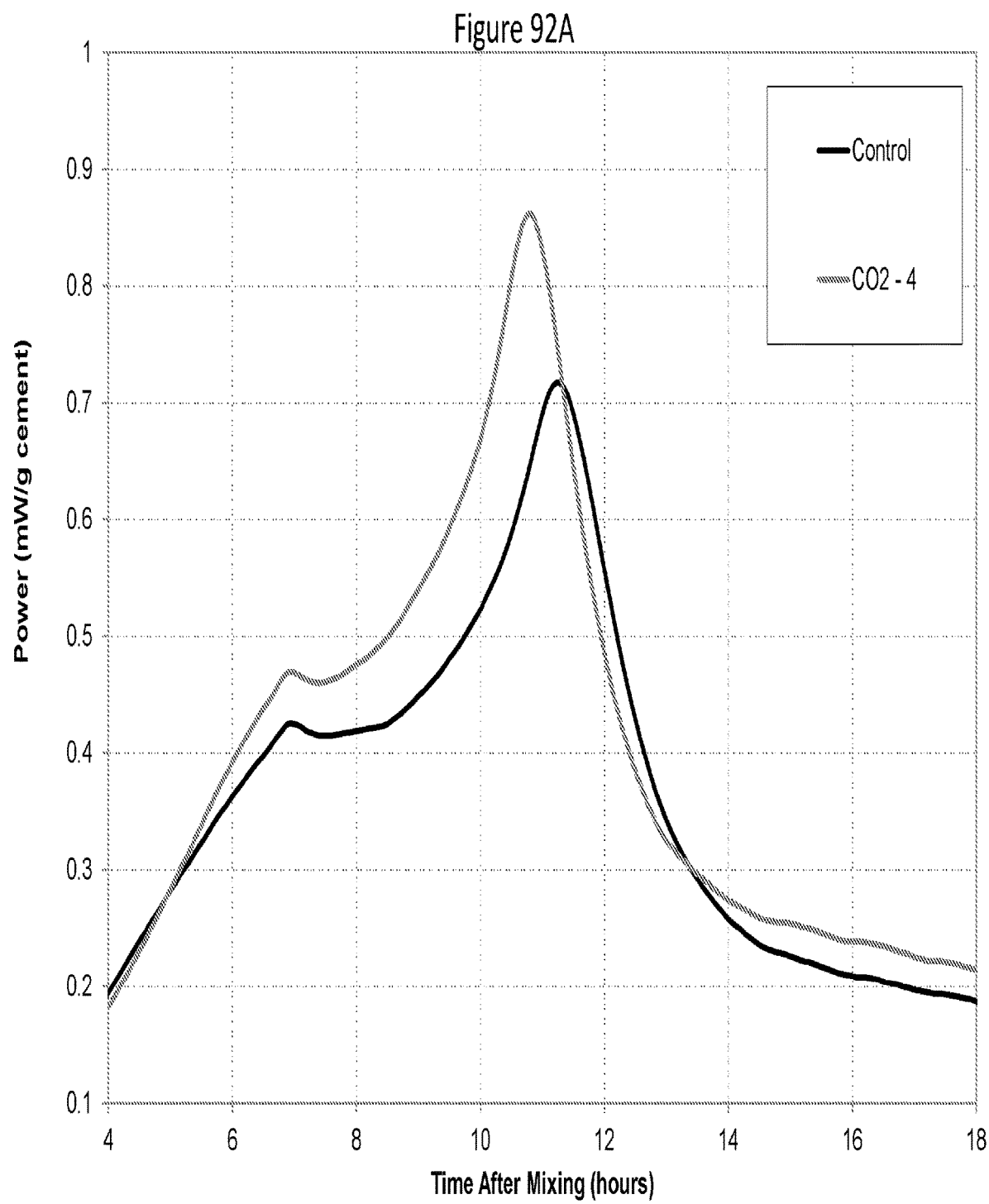

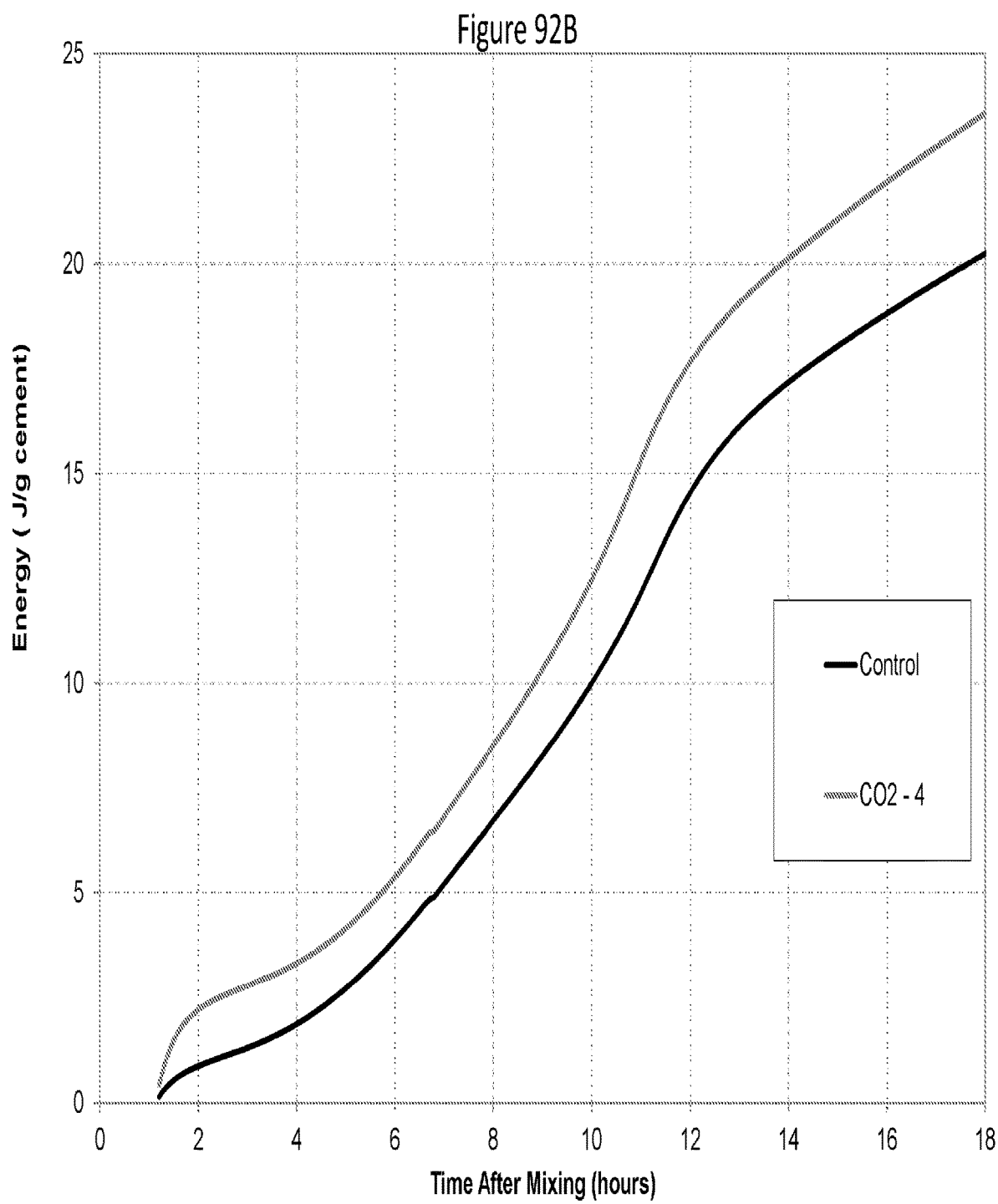

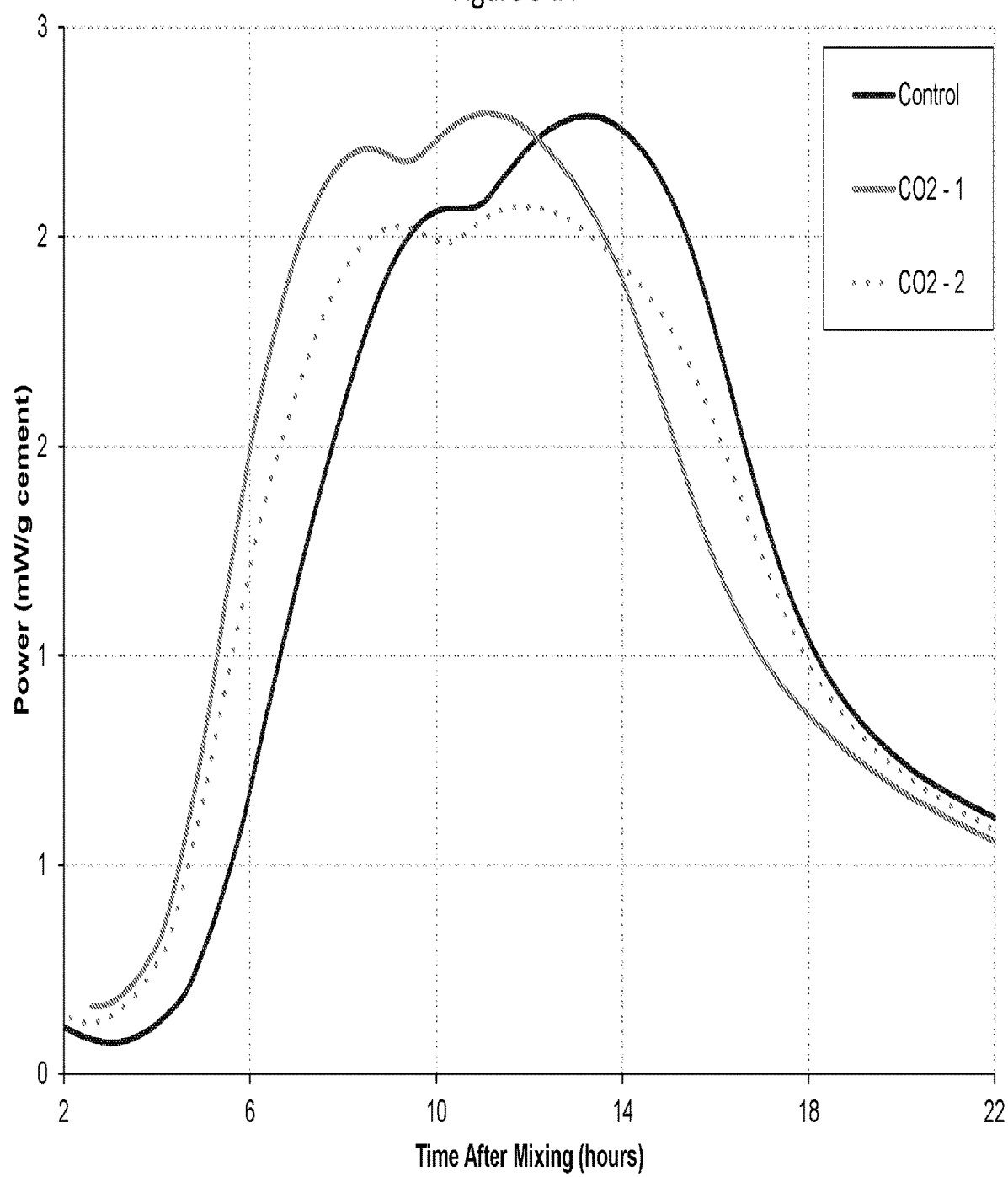

Figure 136
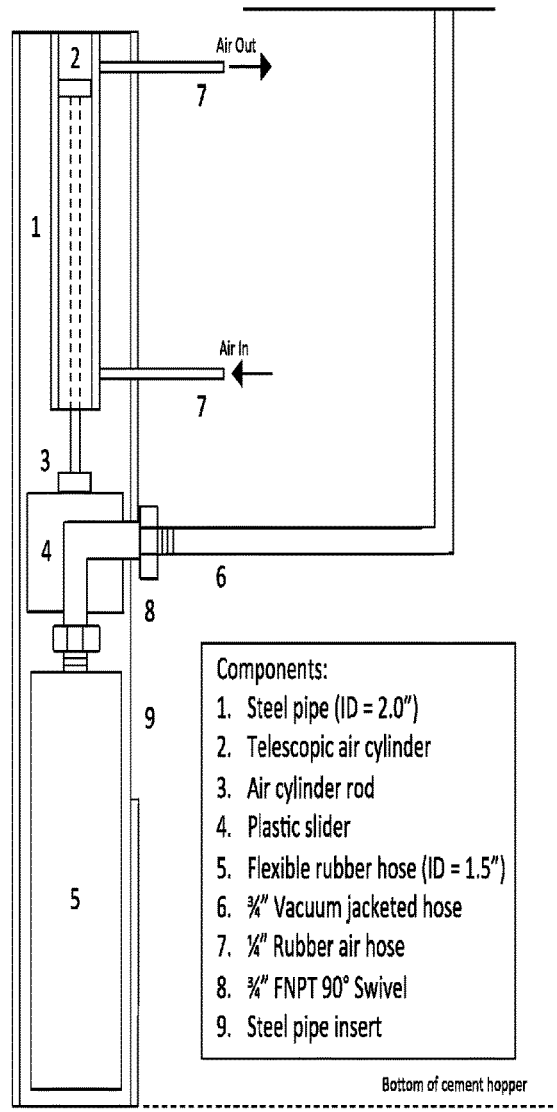
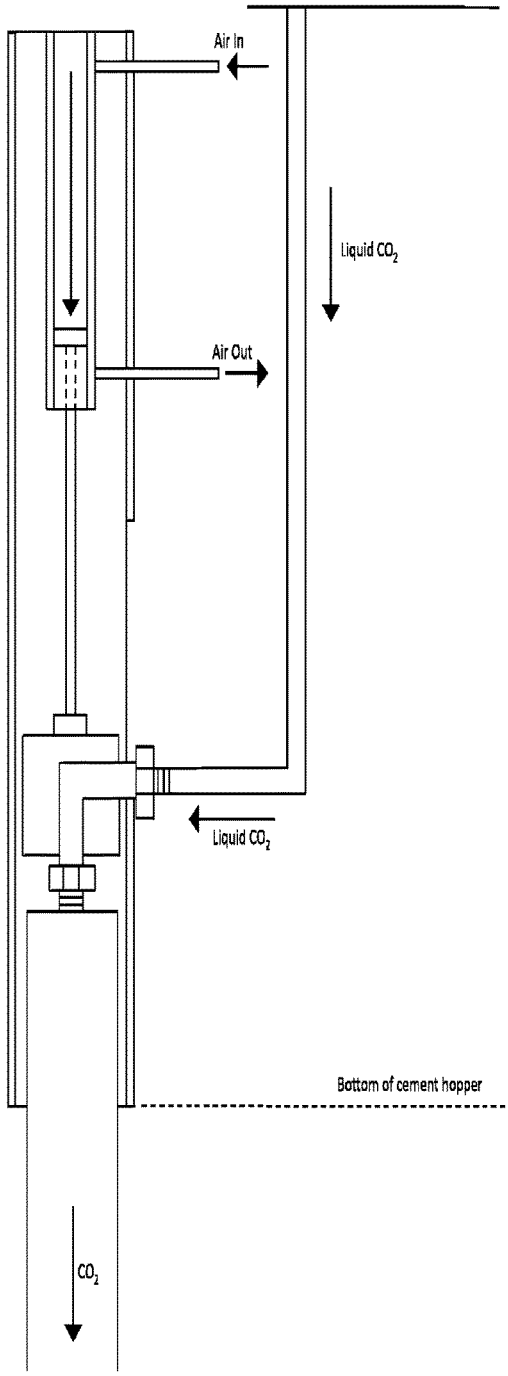

Nano-scale (10-150 nm) rhombohedral calcium carbonate reaction products produced through carbonating freshly hydrating cement

METHODS AND COMPOSITIONS FOR CONCRETE PRODUCTION

CROSS-REFERENCE

This application is a continuation of U.S. patent application Ser. No. 15/649,339, filed on Jul. 13, 2017, which is a continuation of U.S. patent application Ser. No. 15/157,205, filed on May 17, 2016, which is a continuation of U.S. patent application Ser. No. 14/950,288, filed Nov. 24, 2015, which is a continuation-in-part of U.S. patent application Ser. No. 14/701,456, filed Apr. 30, 2015, which is a continuation of PCT Application No. PCT/CA2014/050611 filed Jun. 25, 2014, which claims the benefit of U.S. Provisional Patent Application Ser. No. 61/980,505, filed Apr. 16, 2014 and is a continuation-in-part of U.S. patent application Ser. No. 14/249,308, filed Apr. 9, 2014 (now U.S. Pat. No. 9,108,883 issued Aug. 18, 2015), which claim the benefit of U.S. Provisional Patent Application Ser. No. 61/839,312, filed Jun. 25, 2013, U.S. Provisional Patent Application Ser. No. 61/847,254, filed Jul. 17, 2013, U.S. Provisional Patent Application Ser. No. 61/879,049, filed Sep. 17, 2013, U.S. Provisional Patent Application Ser. No. 61/925,100, filed Jan. 8, 2014, U.S. Provisional Patent Application Ser. No. 61/938,063, filed Feb. 10, 2014. U.S. patent application Ser. No. 14/950,288 also claims the benefit of U.S. Provisional Patent Application Ser. No. 62/083,784, filed Nov. 24, 2014, U.S. Provisional Patent Application Ser. No. 62/096,018, filed Dec. 23, 2014, U.S. Provisional Patent Application Ser. No. 62/160,350, filed May 12, 2015, U.S. Provisional Patent Application Ser. No. 62/165,670 filed May 22, 2015, U.S. Provisional Patent Application Ser. No. 62/240,843, filed Oct. 13, 2015, U.S. Provisional Patent Application Ser. No. 62/086,024, filed Dec. 1, 2014, and U.S. Provisional Patent Application Ser. No. 62/146,103, filed Apr. 10, 2015. Each of the aforemention applications is incorporated herein by reference in its entirety.

BACKGROUND

Cement mixes, such as concrete mixes, are used in a multitude of compositions and procedures throughout the world. In addition, greenhouse gases such as carbon dioxide are a growing concern worldwide. There is a need for methods and compositions to contact cement mixes with carbon dioxide and for cement mixes containing incorporated carbon dioxide and carbonation products.

SUMMARY OF THE INVENTION

In one aspect, the invention provides methods.

In certain embodiments, the invention provides a method for carbonating a concrete mix comprising a type of cement that includes delivering dose of CO2 to the concrete mix while it is mixing in a mixer, where the delivery of the carbon dioxide commences within 3 minutes of the start of mixing of the concrete mix, and wherein the duration of the delivery of the carbon dioxide is 10 seconds to 4 minutes. In certain embodiments, the dose of carbon dioxide is 0.01-1.0% by weight cement (bwc). In certain embodiments, the delivery of the carbon dioxide commences within 1 minute of the start of mixing of the concrete mix. The mixer can be any suitable mixer, such as a stationary mixer or a transportable mixer; in certain embodiments, the mixer comprises a transportable mixer, e.g., a drum of a ready-mix truck. In certain embodiments, the dose of carbon dioxide is based on previous testing of a plurality of doses of carbon dioxide on a plurality of test mixes, wherein the test mixes comprise the type of cement in the concrete mix, for example at least three test doses of carbon dioxide can be used in the previous testing. In certain embodiments, the plurality of doses of carbon dioxide used in the previous testing are all 0.01-1.0% bwc, and the dose of carbon dioxide delivered to the mixing concrete is 0.01-1.0% bwc. The carbon dioxide can be delivered via a conduit to the surface of the mixing concrete, for example, a conduit positioned to be 5-200 cm from the surface of the mixing concrete, on average. In certain embodiments, the carbon dioxide is delivered as a mixture of solid and gaseous carbon dioxide.

In certain embodiments, the invention provides a method for carbonating a concrete mix in a drum of a ready-mix truck comprising (i) positioning a first conduit for delivery of components of the concrete mix to the drum, wherein the first conduit contains a second conduit for delivery of carbon dioxide to the concrete mix, and wherein the components of the concrete mix comprise at least cement and water; (ii) delivering the components of the concrete mix to the drum via the first conduit to provide a concrete mix in the drum; (iii) mixing the concrete mix; and (iv) delivering a dose of carbon dioxide to the mixing concrete via an opening of the second conduit. In certain embodiments, the dose of carbon dioxide is 0.01-1.5% by weight cement. In certain embodiments, the carbon dioxide is a mixture of solid and gaseous carbon dioxide. In certain embodiments, the dose of carbon dioxide is based on previous testing of a plurality of doses of carbon dioxide on a plurality of test mixes, wherein the test mixes comprise the type of cement in the concrete mix. In certain embodiments, at least three test doses of carbon dioxide are used in the previous testing. In certain embodiments, the plurality of doses of carbon dioxide used in the previous testing are all 0.01-1.0% bwc, and the dose of carbon dioxide delivered to the mixing concrete is 0.01-1.0% bwc. In certain embodiments, the opening of the second conduit is positioned to be 5 cm to 200 cm, on average, from a surface of the mixing concrete.

In another aspect, the invention provides apparatus. In certain embodiments, the invention provides an apparatus for delivering carbon dioxide to a drum of a ready-mix truck comprising (i) a first conduit configured for delivery of components of concrete to the drum of the ready-mix truck; and (ii) a second conduit contained within or attached to the first conduit configured for delivery of carbon dioxide to the drum of the ready-mix truck. In certain embodiments the second conduit is made of material that is sufficiently flexible to move with the first conduit. In certain embodiments, the second conduit contains a third conduit, wherein the third conduit is configured to be extended from the second conduit when the first conduit is positioned to deliver the components of the concrete to the drum, and to be retracted when the first conduit is moved from the drum of the ready-mix truck.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 32 provides a table showing the results of tests for carbon dioxide uptake, compressive strength, water absorption, and density for blocks produced in a precast dry cast operation with carbonation at the mixer, feedbox, or both, in a standard block mix.

FIG. 34 provides a table showing the results of tests for carbon dioxide uptake, compressive strength, water absorption, and density for blocks produced in a precast dry cast operation with carbonation at the mixer in a limestone block mix.

FIG. 35 provides a table showing the results of tests for carbon dioxide uptake, compressive strength, water absorption, and density for blocks produced in a precast dry cast operation with carbonation at the mixer in a lightweight block mix.

FIG. 37 provides a table showing the results of tests for carbon dioxide uptake, compressive strength, water absorption, and density for blocks produced in a precast dry cast operation with carbonation at the mixer in a sandstone block mix.

FIG. 41 provides a table of results of third party testing of medium weight blocks produced in a precast operation as uncarbonated, carbonated, and carbonated+0.25% sodium gluconate, as strength, absorption, and shrinkage.

FIG. 74 shows a summary of calorimetry data for mortars prepared with and without added CaO and exposed to carbon dioxide for various lengths of time while mixing, as well as carbon dioxide uptake.

FIG. 77B shows calorimetry data for the CO2-1, -2, and -3 mixes of Example 28, and uncarbonated control, energy vs. time.

FIG. 78B shows calorimetry data for the CO2-4, -5, and -6 mixes of Example 28, and uncarbonated control.

FIG. 80B shows calorimetry data for the CO2-5,and 6 mixes of Example 29, and uncarbonated control.

FIG. 81 shows compressive strengths at 24 hours for control and three different doses of carbon dioxide of the first day of the trial of Example 30.

FIG. 86A shows calorimetry data for the CO2-1 (1402), -2 (1403), and -3 (1404) mixes of the first day of the trial of Example 30, and uncarbonated control (1401), power vs. time.

FIG. 86B shows calorimetry data for the CO2-1 (1402), -2 (1403), and -3 (1404) mixes of the first day of the trial of Example 30, and uncarbonated control (1401), energy vs. time.

FIG. 92A shows calorimetry data for the CO2-1 and -2 mixes of the second day of the trial of Example 30, and uncarbonated controls 1 and 2, power vs. time.

FIG. 92B shows calorimetry data for the CO2-1 and -2 mixes of the second day of the trial of Example 30, and uncarbonated controls 1 and 2, energy vs. time.

FIG. 94A shows calorimetry data for the two doses of carbon dioxide of Example 32, and uncarbonated control, power vs. time.

FIG. 110 shows calorimetry as power vs. time for a mortar mix made with a Roanoake cement-Trenton Class F fly ash 80/20 blend, carbonated for 2, 4, or 6 min, as described in Example 36.

FIG. 111 shows calorimetry as energy released vs. time for a mortar mix made with a Roanoake cement-Trenton Class F fly ash 80/20 blend, carbonated for 2, 4, or 6 min, as described in Example 36.

FIG. 112 shows calorimetry as power vs. time for a mortar mix made with a STMB cement-Trenton Class F fly ash 80/20 blend, carbonated for 2, 4, or 6 min, as described in Example 36.

FIG. 113 shows calorimetry as energy released vs. time for a mortar mix made with a STMB cement-Trenton Class F fly ash 80/20 blend, carbonated for 2, 4, or 6 min, as described in Example 36.

FIG. 114 shows calorimetry as power vs. time for a mortar mix made with a STMB cement and three different doses of sodium bicarbonate, as described in Example 37.

FIG. 115 shows calorimetry as energy released vs. time for a mortar mix made with a STMB cement and three different doses of sodium bicarbonate, as described in Example 37.

FIG. 116 shows calorimetry as power vs. time for a mortar mix made with a LAFB cement and three different doses of sodium bicarbonate, as described in Example 37.

FIG. 117 shows calorimetry as energy released vs. time for a mortar mix made with a LAFB cement and three different doses of sodium bicarbonate, as described in Example 37.

FIG. 118 shows calorimetry as power vs. time for a mortar mix made with a STMB cement and two different times for addition of carbonated mix water, as described in Example 38.

FIG. 119 shows calorimetry as energy released vs. time for a mortar mix made with a STMB cement and two different times for addition of carbonated mix water, as described in Example 38.

FIG. 120 shows calorimetry as power vs. time for a mortar mix made with a LAFB cement and two different times for addition of carbonated mix water, as described in Example 38.

FIG. 121 shows calorimetry as energy released vs. time for a mortar mix made with a LAFB cement and two different times for addition of carbonated mix water, as described in Example 38.

Figure 122:
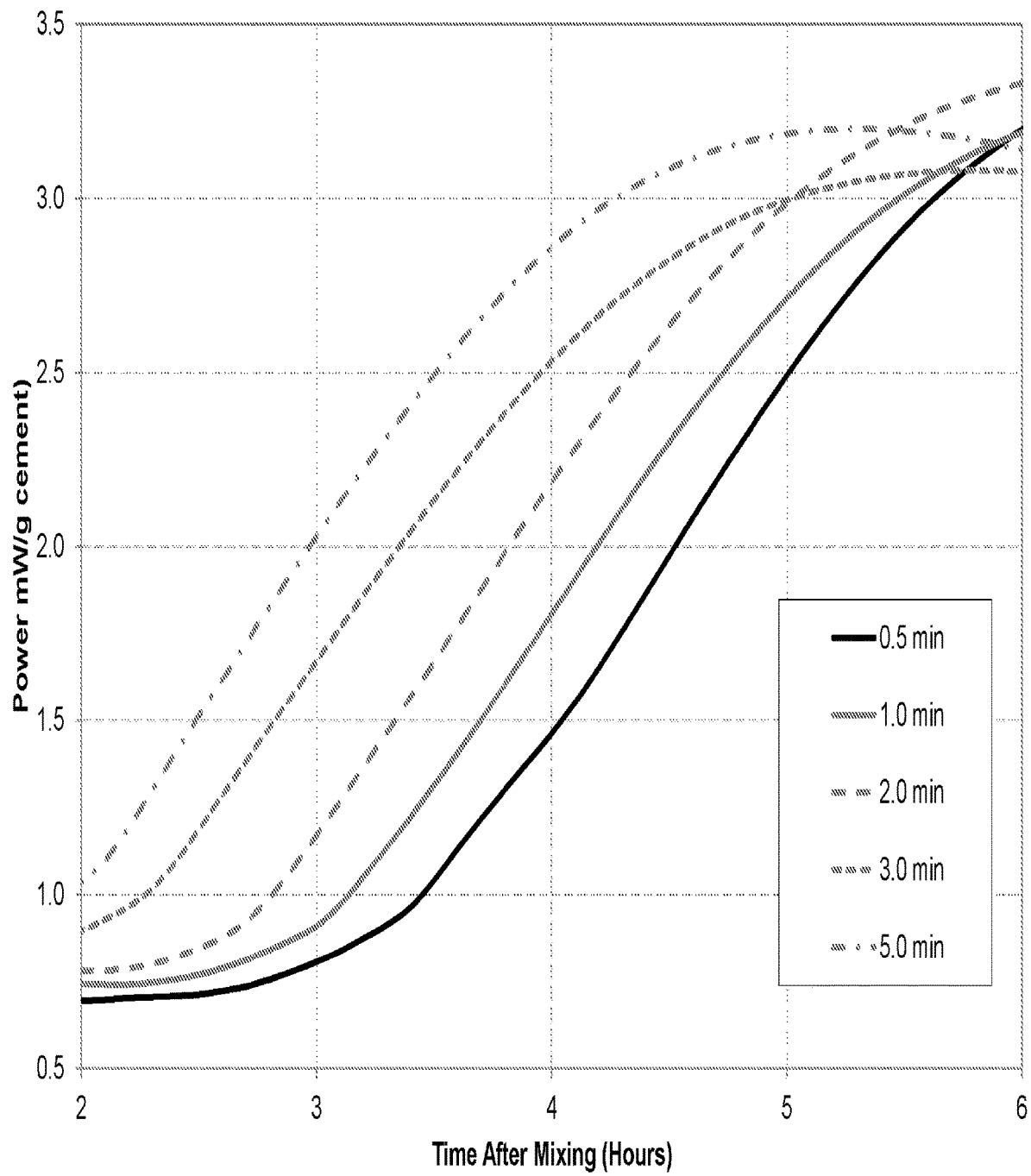

FIG. 122 shows calorimetry as power vs. time for a mortar mix made with a LAFB cement and 5 different durations for addition of carbonated mix water, as described in Example 38.

Figure 123:
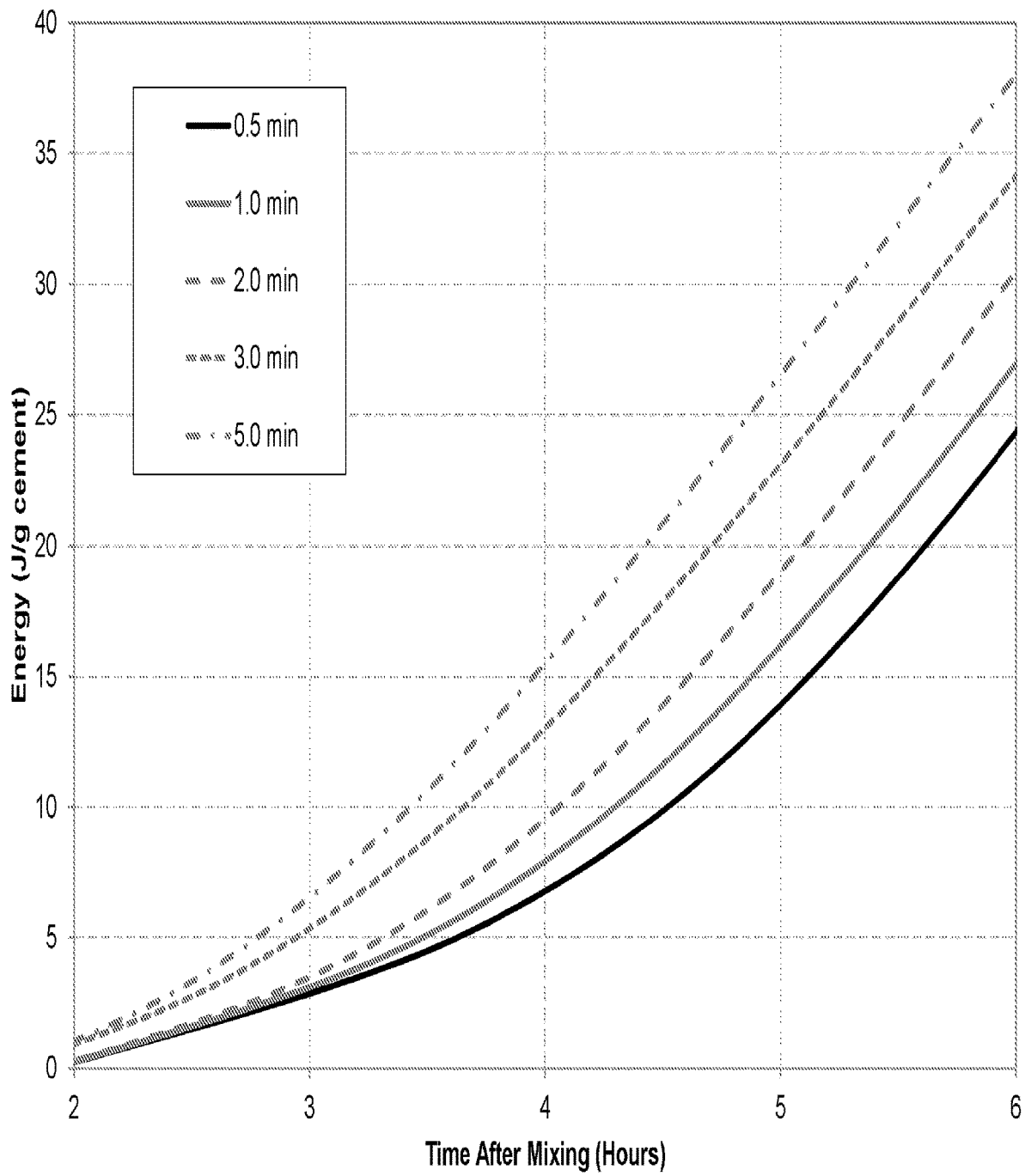

FIG. 123 shows calorimetry as energy released vs. time for a mortar mix made with a LAFB cement and 5 different durations for addition of carbonated mix water, as described in Example 38.

Figure 124:
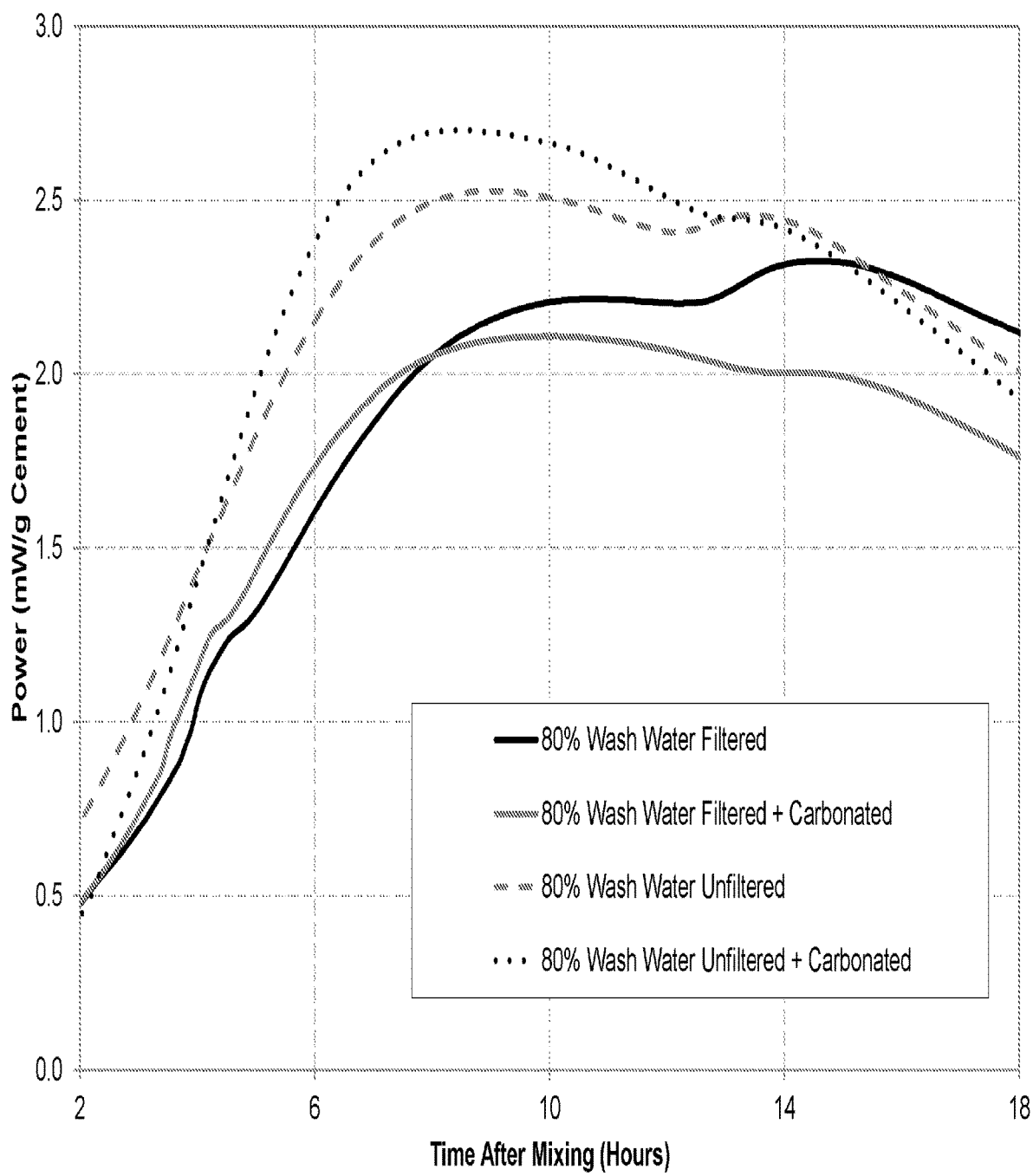

FIG. 124 shows calorimetry as power vs. time for a mortar mix made with a STMB cement and a carbonated synthetic wash water, filtered or unfiltered, as described in Example 39.

Figure 125:
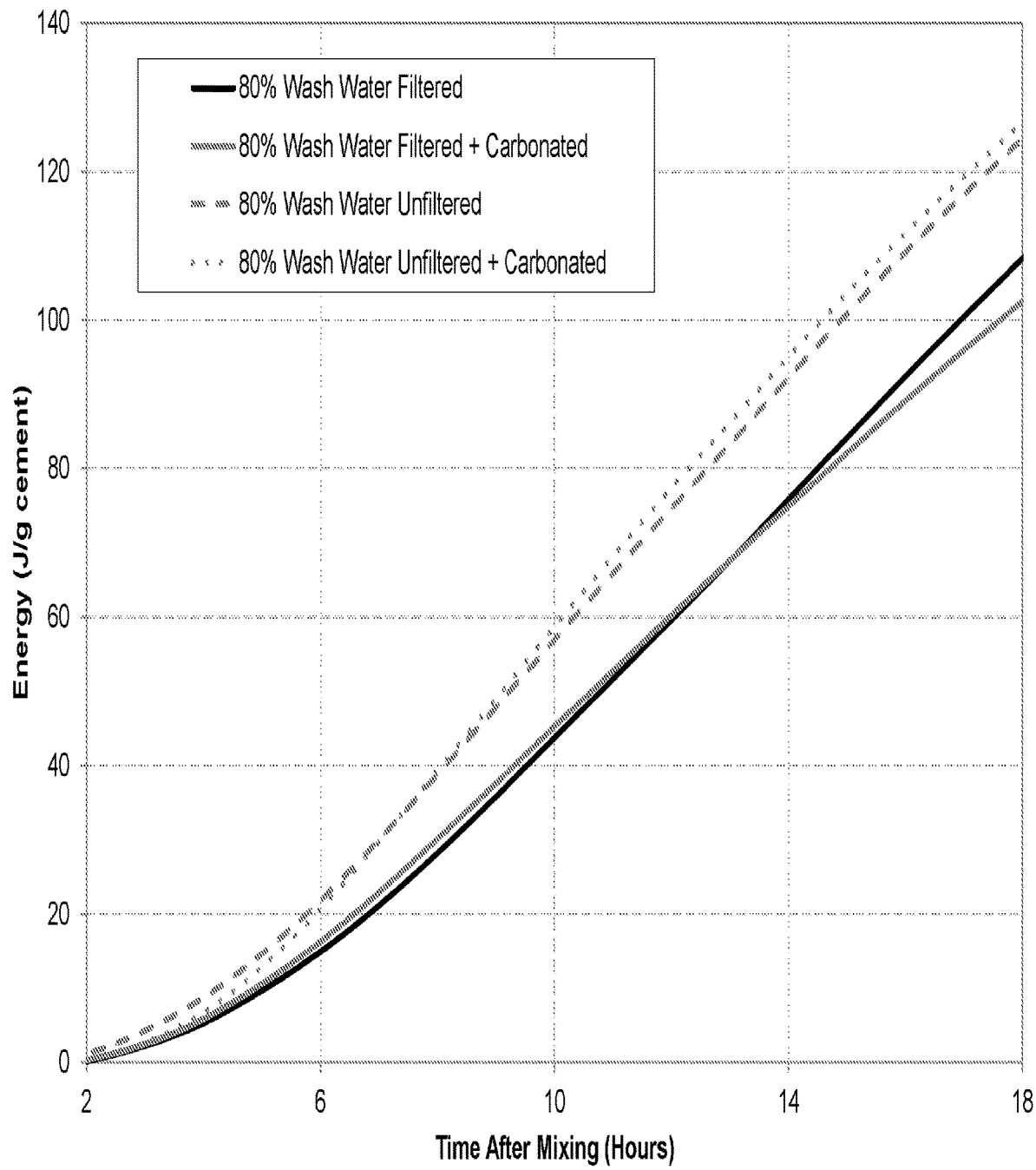

FIG. 125 shows calorimetry as energy released vs. time for a mortar mix made with a STMB cement and a carbonated synthetic wash water, filtered or unfiltered, as described in Example 39.

Figure 126:
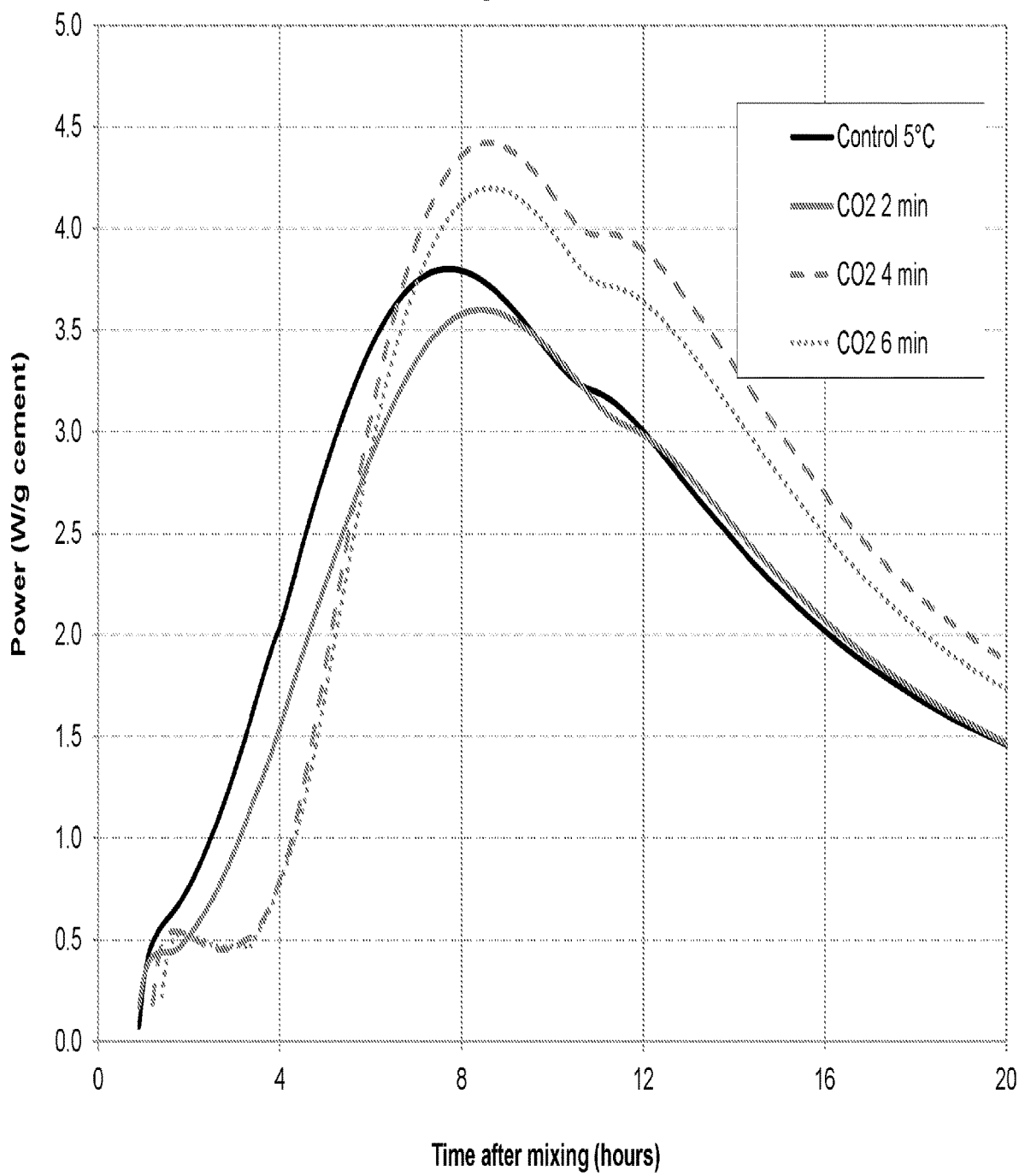

FIG. 126 shows calorimetry as power vs. time for a mortar mix made with a LAFB cement and carbonated for 2, 4, or 6 minutes, at 5 to 10° C., as described in Example 40.

Figure 127:
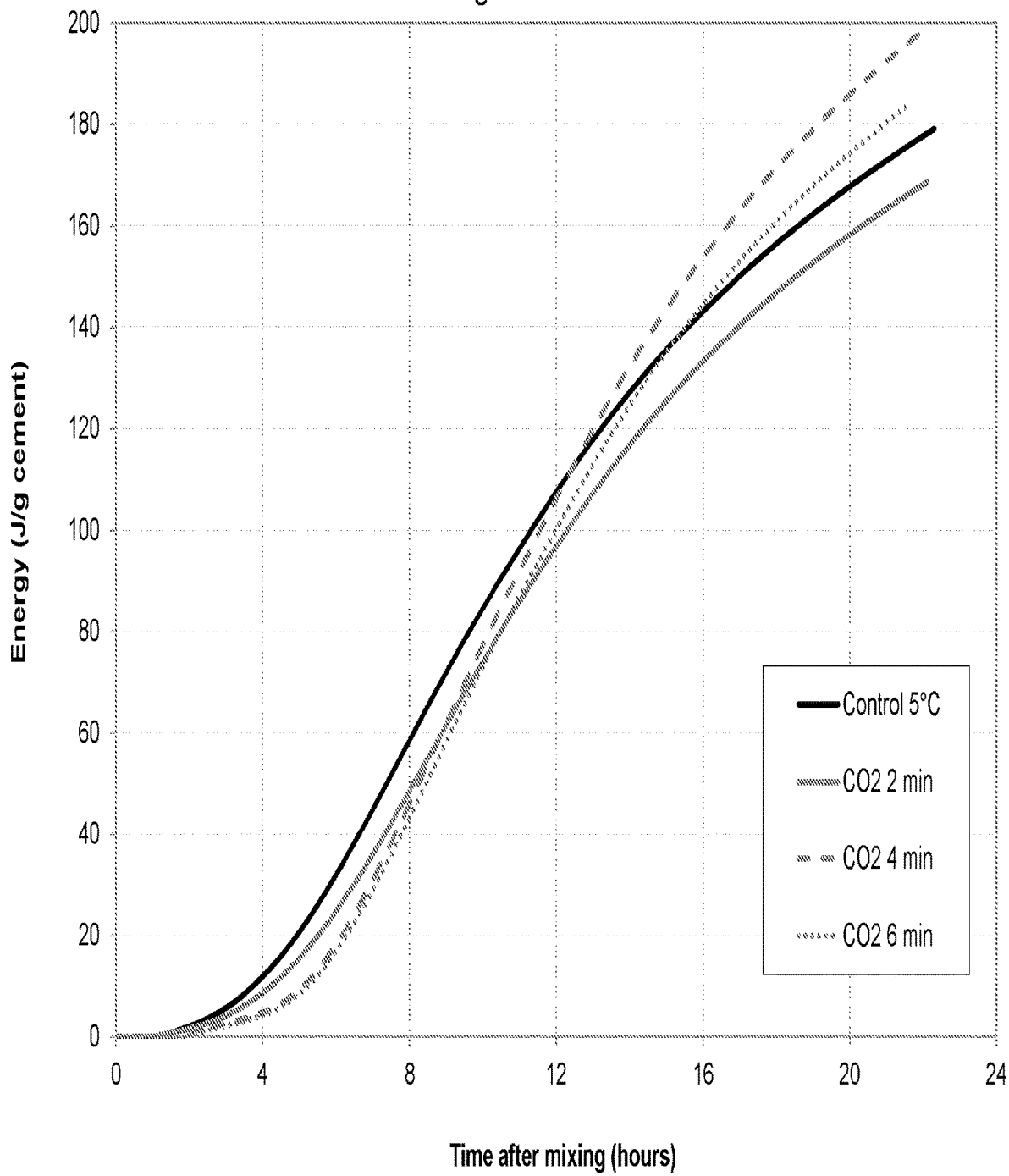

FIG. 127 shows calorimetry as energy released vs. time for a mortar mix made with a LAFB cement and carbonated for 2, 4, or 6 minutes, at 5 to 10° C., as described in Example 40.

Figure 128:
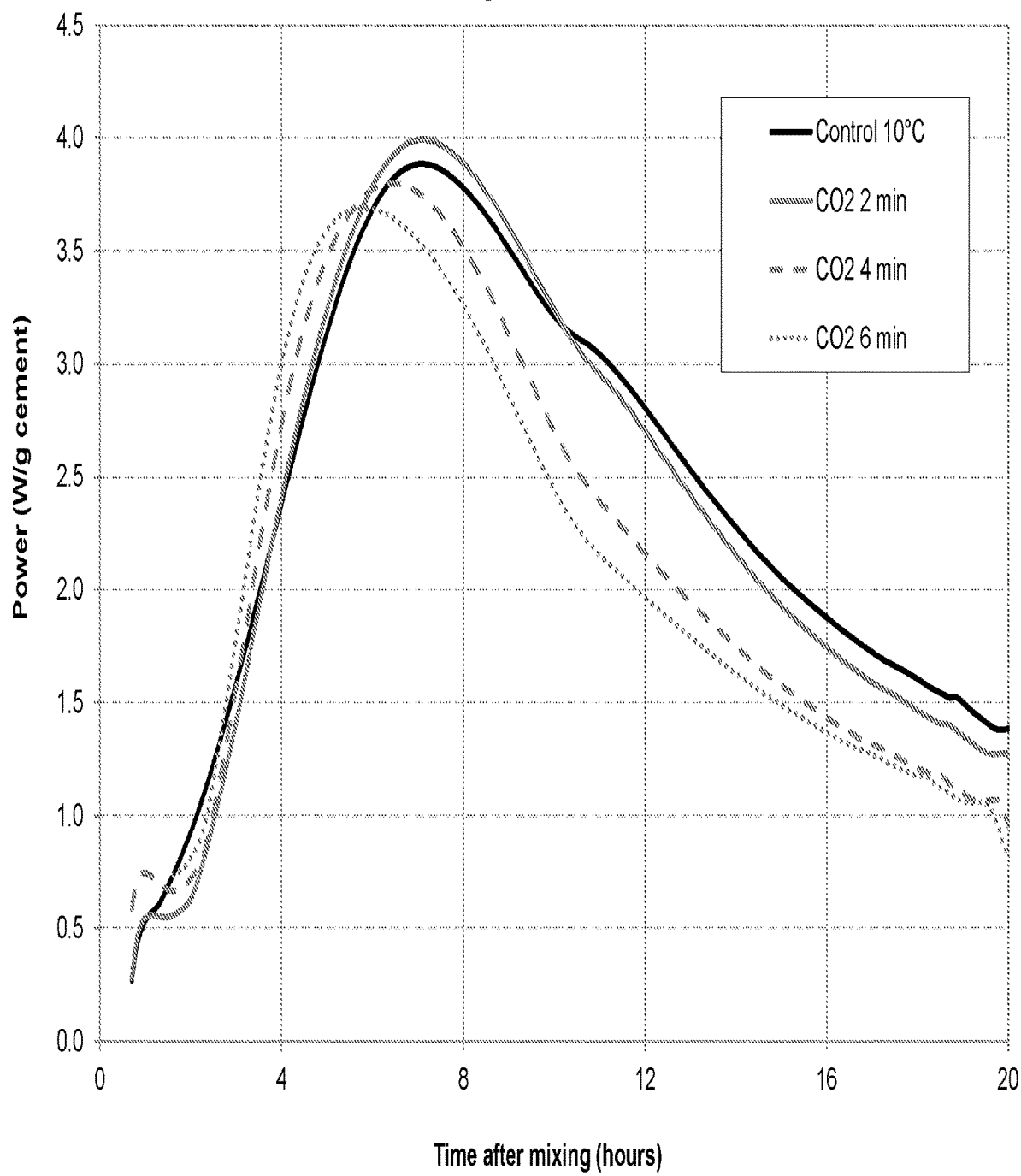

FIG. 128 shows calorimetry as power vs. time for a mortar mix made with a LAFB cement and carbonated for 2, 4, or 6 minutes, at 10 to 15° C., as described in Example 40.

Figure 129:
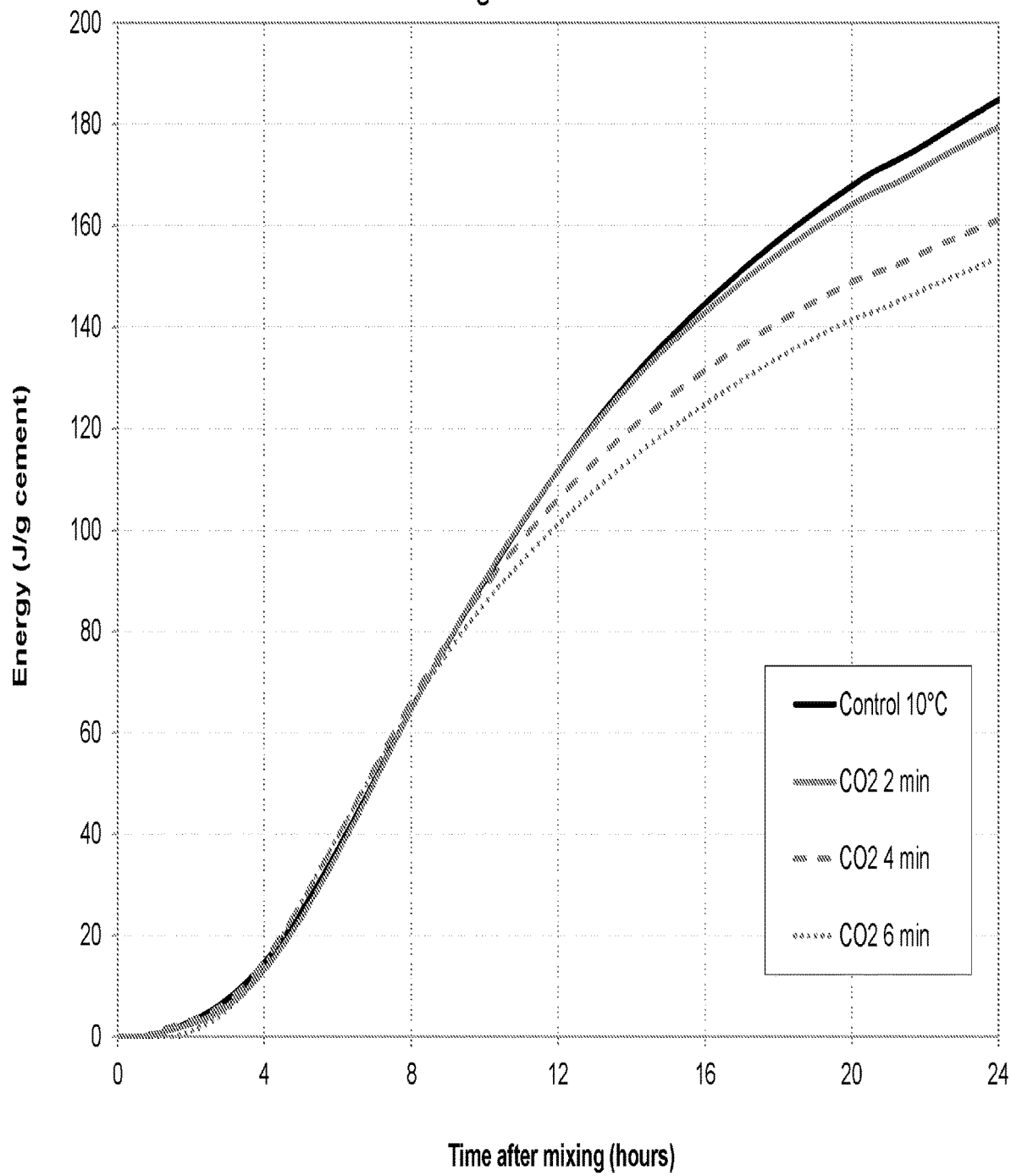

FIG. 129 shows calorimetry as energy released vs. time for a mortar mix made with a LAFB cement and carbonated for 2, 4, or 6 minutes, at 10 to 15° C., as described in Example 40.

Figure 130:
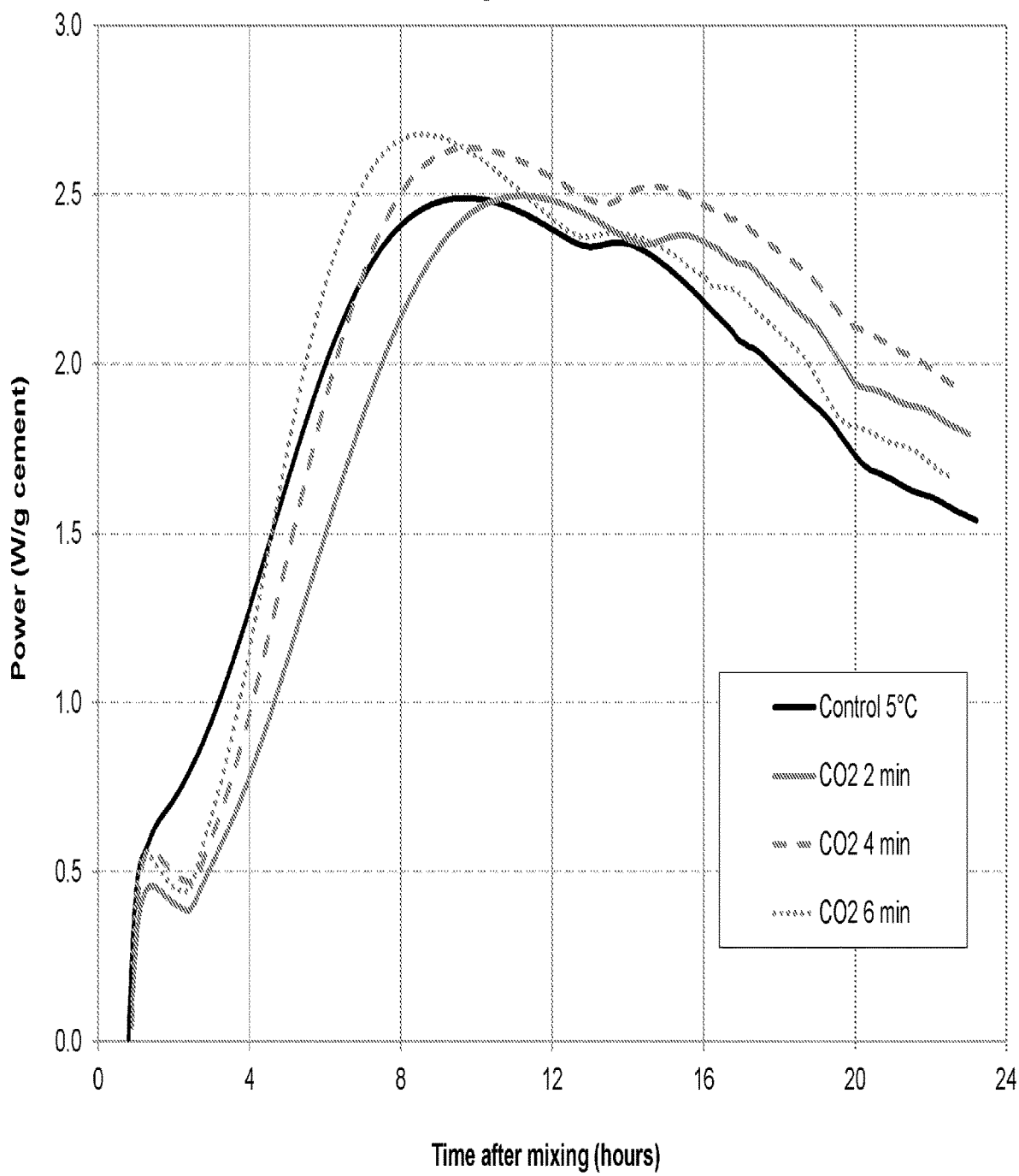

FIG. 130 shows calorimetry as power vs. time for a mortar mix made with a STMB cement and carbonated for 2, 4, or 6 minutes, at 5 to 10° C., as described in Example 40.

Figure 131:
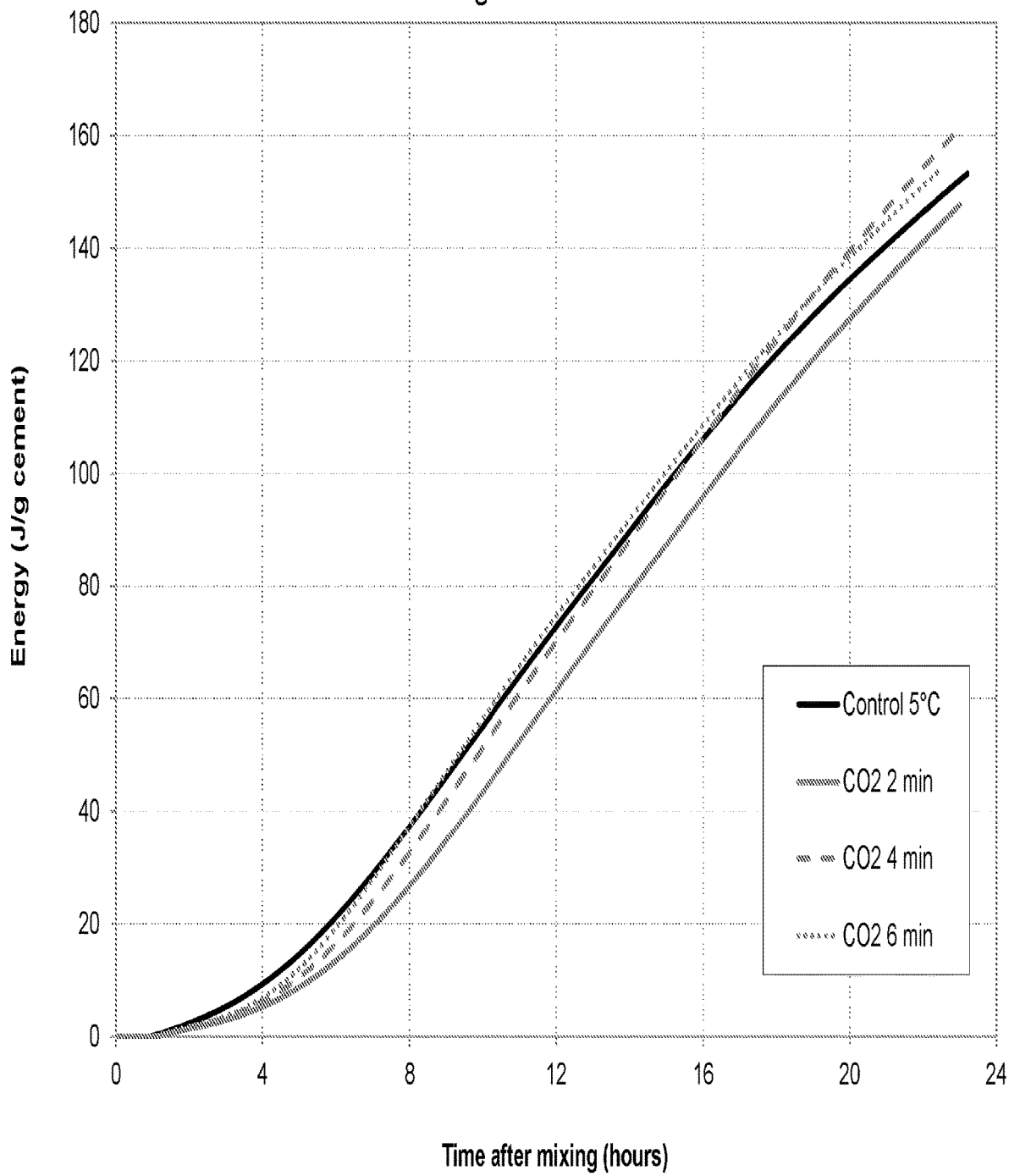

FIG. 131 shows calorimetry as energy released vs. time for a mortar mix made with a STMB cement and carbonated for 2, 4, or 6 minutes, at 5 to 10° C., as described in Example 40.

Figure 132:
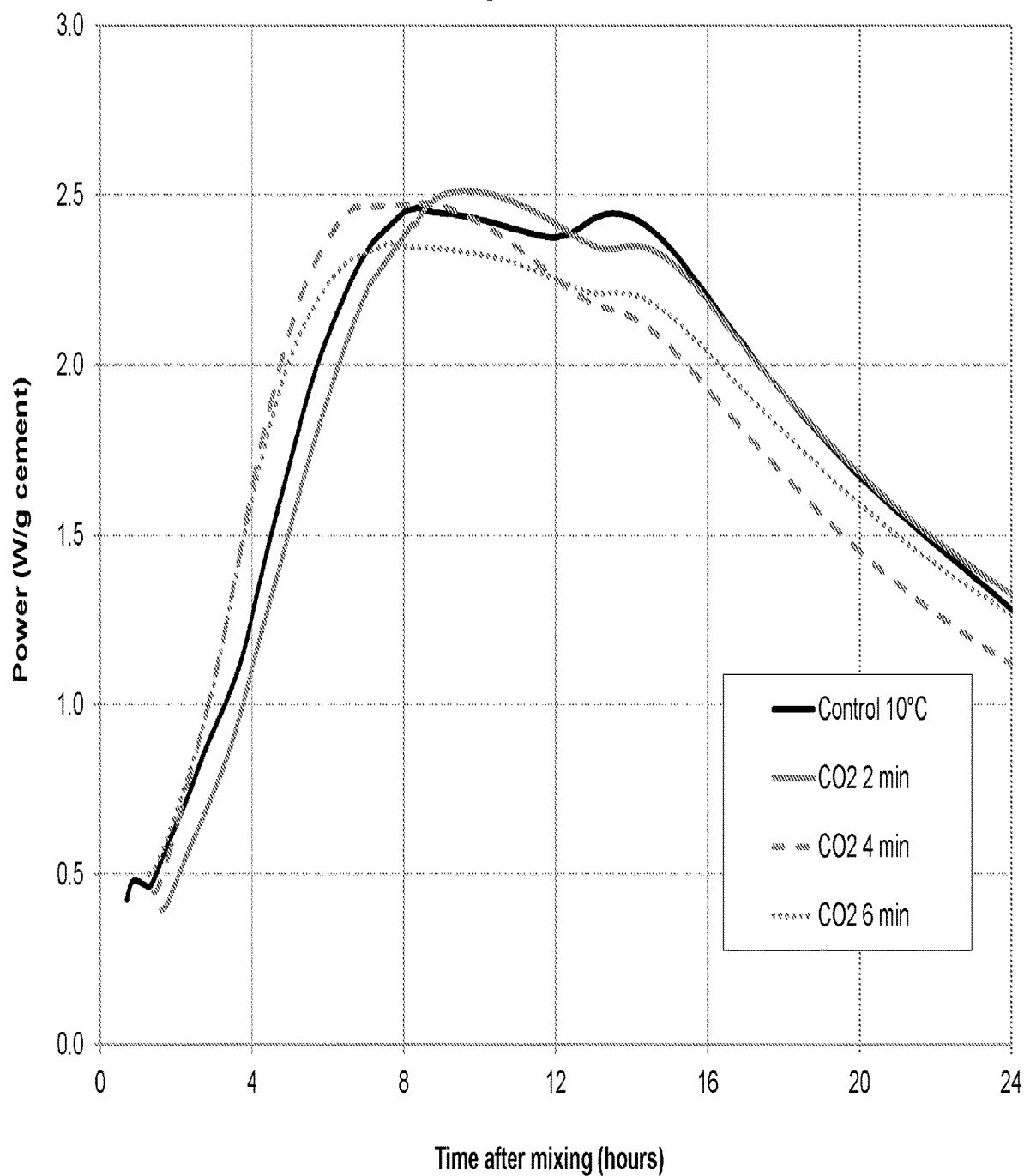

FIG. 132 shows calorimetry as power vs. time for a mortar mix made with a STMB cement and carbonated for 2, 4, or 6 minutes, at 10 to 15° C., as described in Example 40.

Figure 133:
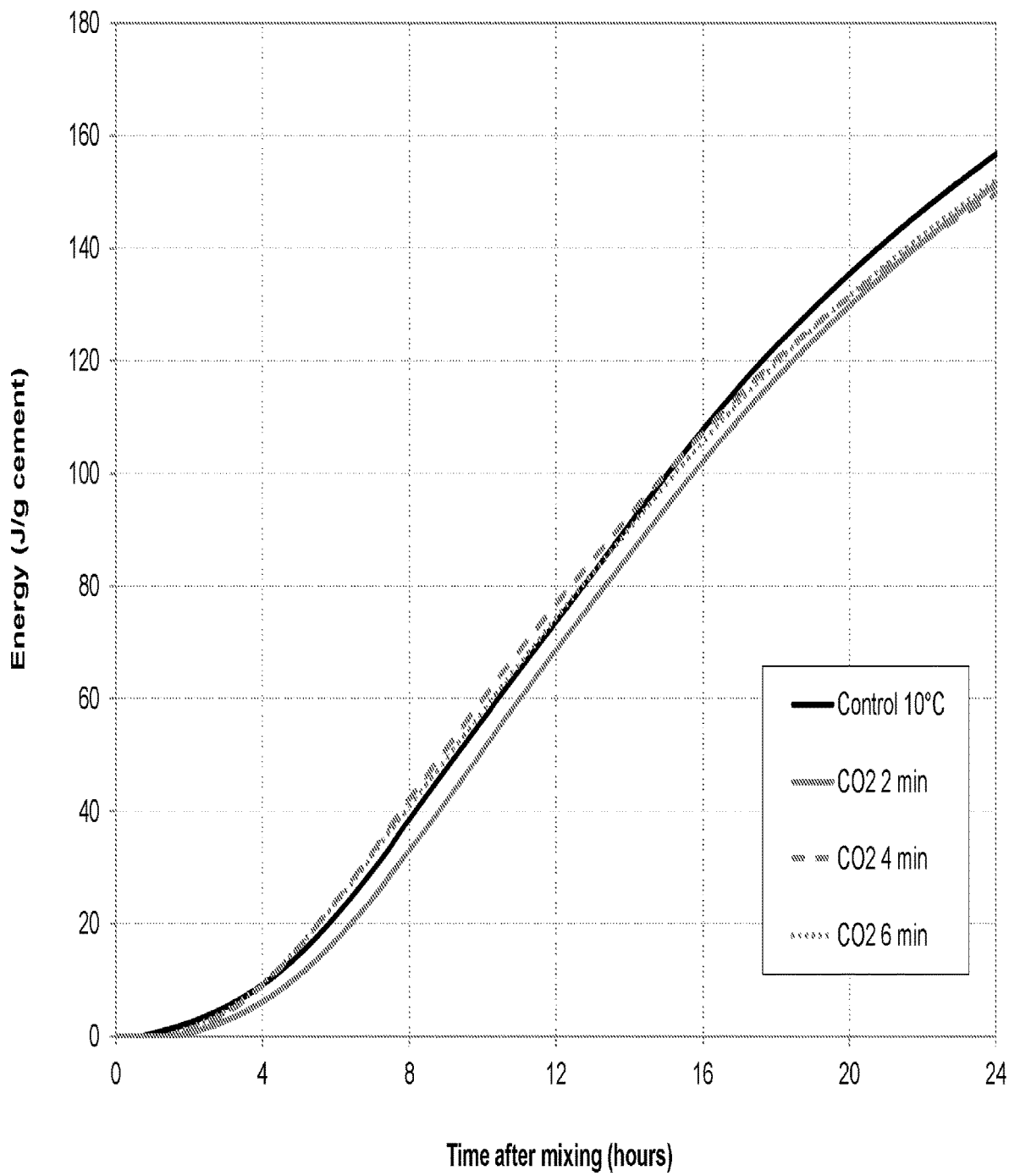

FIG. 133 shows calorimetry as energy released vs. time for a mortar mix made with a STMB cement and carbonated for 2, 4, or 6 minutes, at 10 to 15° C., as described in Example 40.

Figure 134:
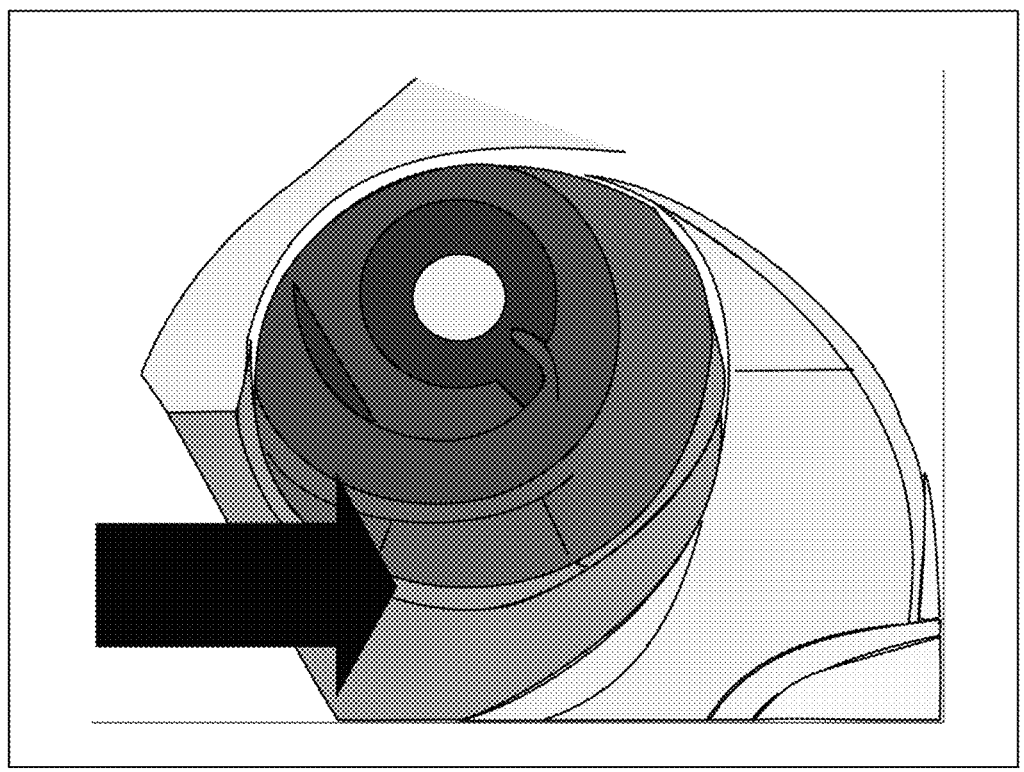

FIG. 134 shows the position at which the wand for carbon dioxide delivery is aimed in the drum of a ready mix truck, at the second fin in the truck on the bottom side of the drum.

Figure 135:
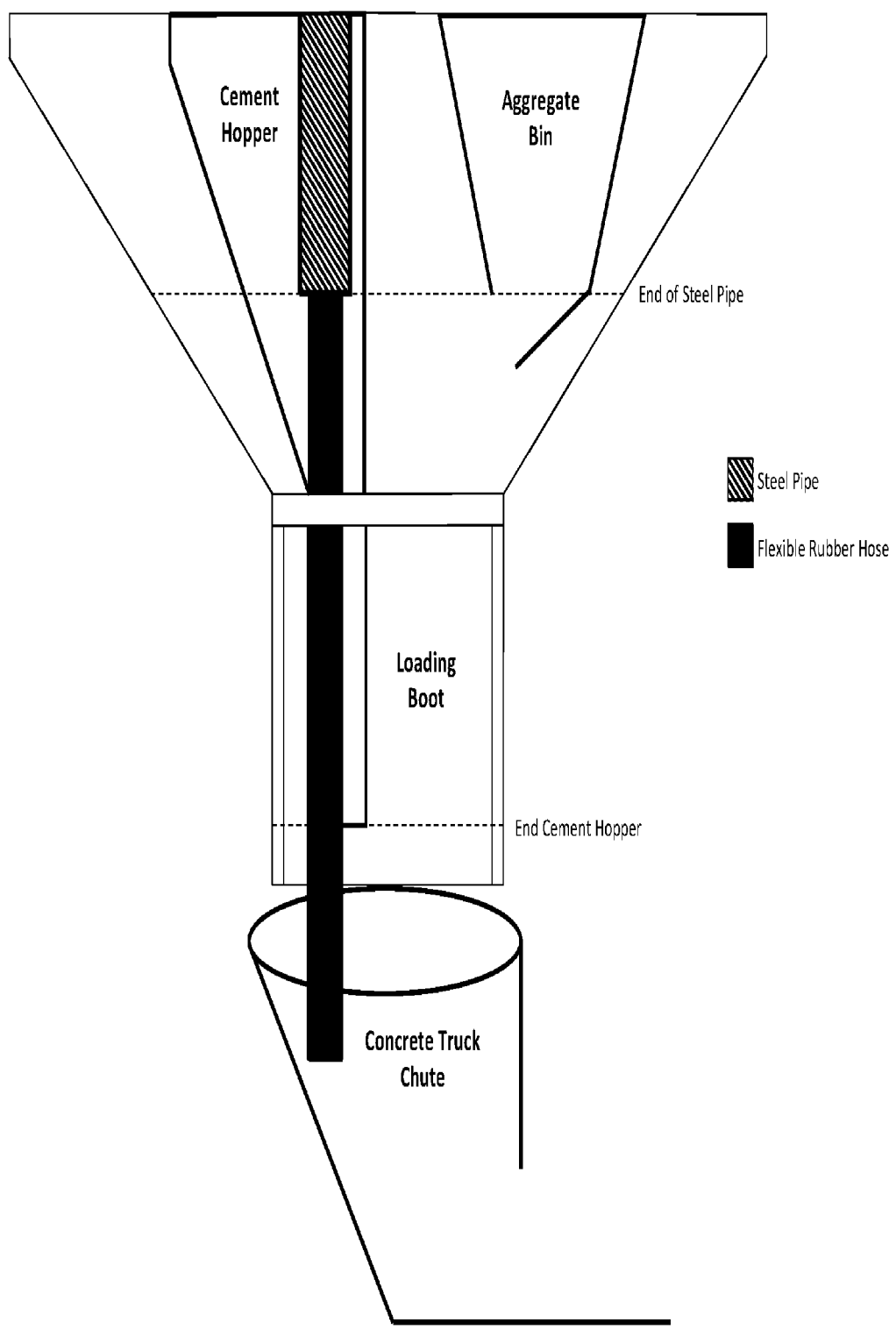

FIG. 135 shows an extendable system for supplying carbon dioxide, such as gaseous and solid carbon dioxide derived from liquid carbon dioxide, to the drum of a ready mix truck, where the system is attached to a flexible boot that delivers materials to the drum of the truck.

FIG. 136 shows the system of FIG. 135 in retracted and extended positions.

Figure 137:
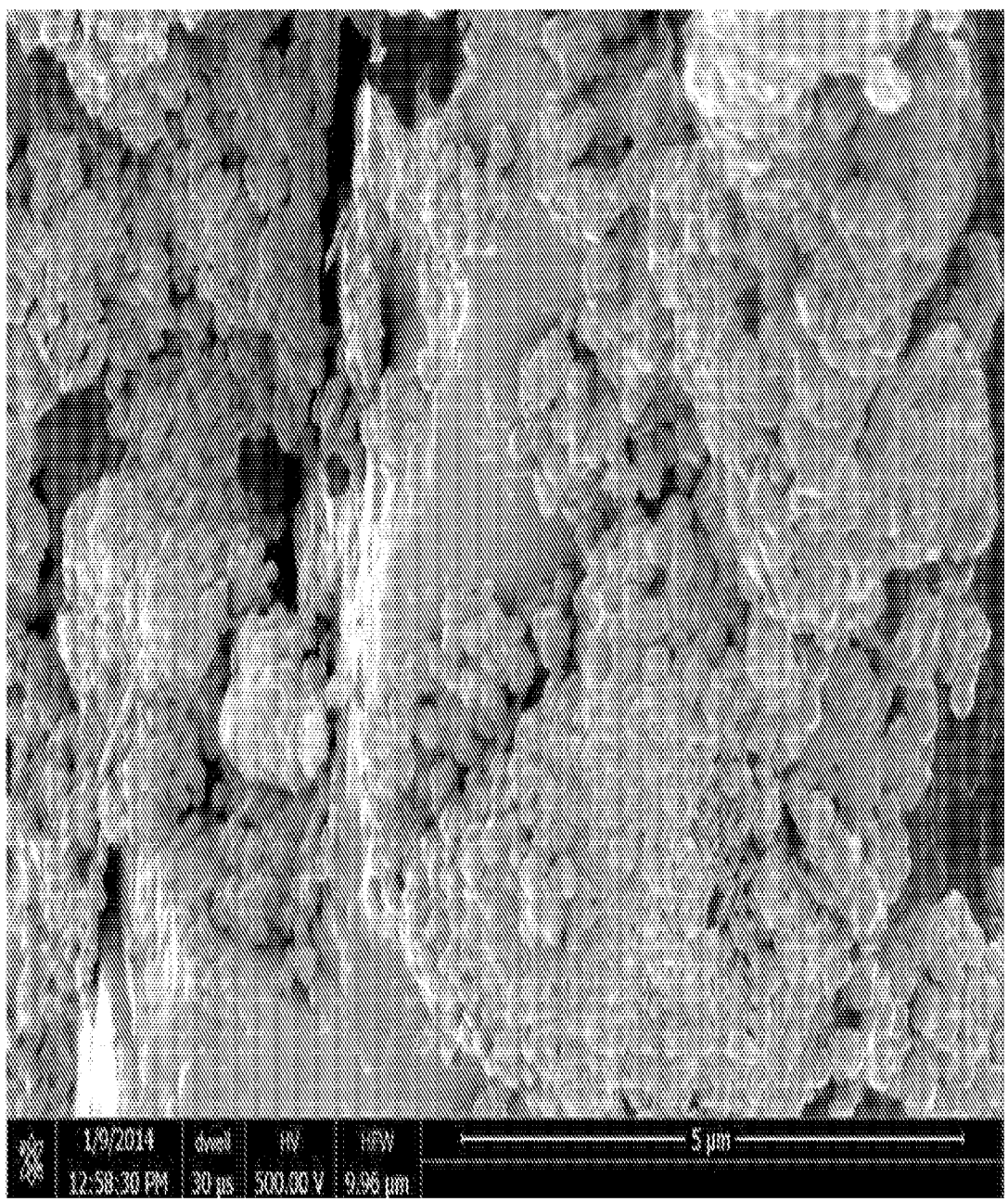

FIG. 137 shows an electron micrograph as described in Example 41.

Figure 138:
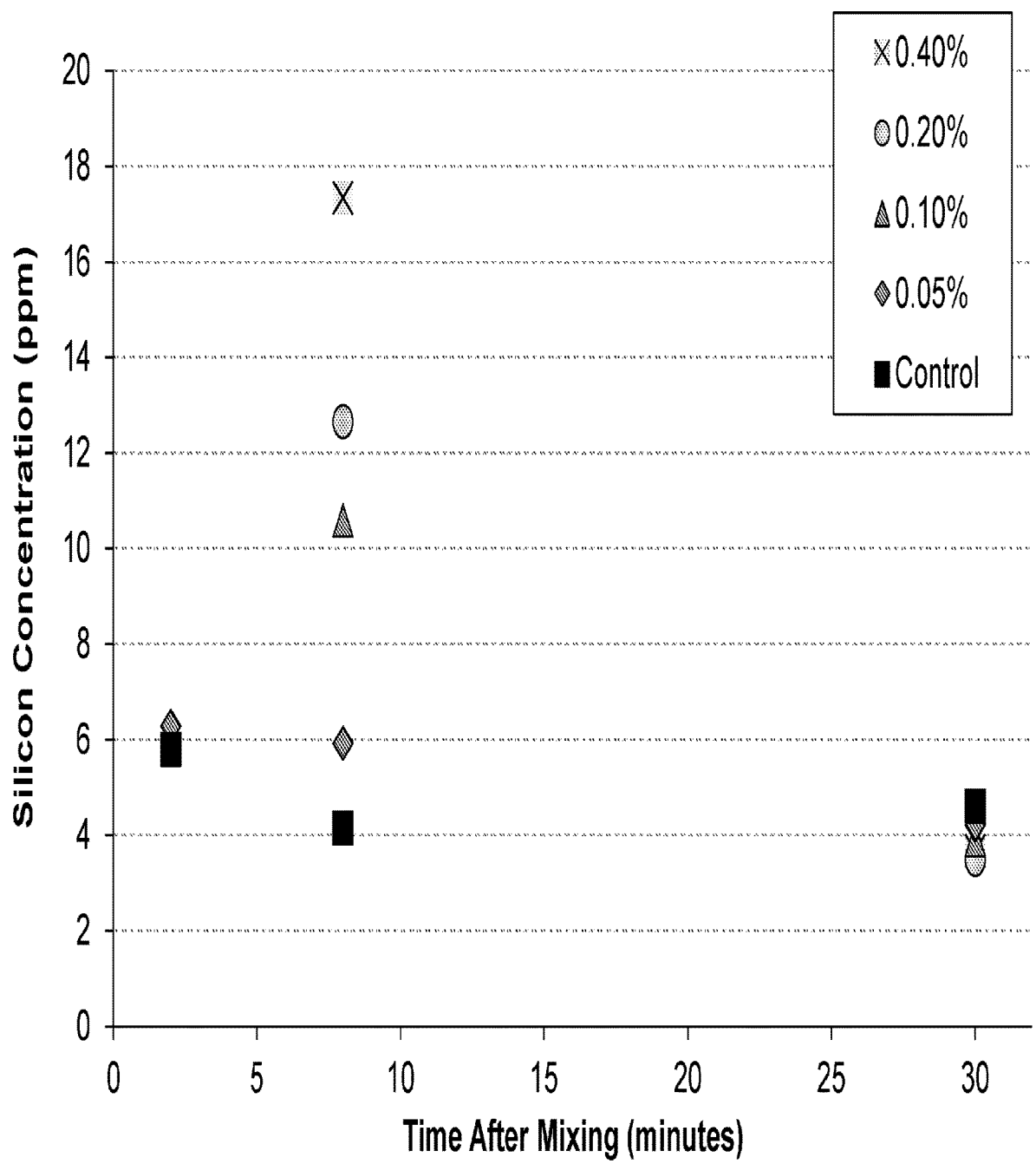

FIG. 138 shows pore silicon concentration in cement mixes carbonated at different levels of carbonation at 8 minutes and 30 minutes after carbonation.

Figure 139:
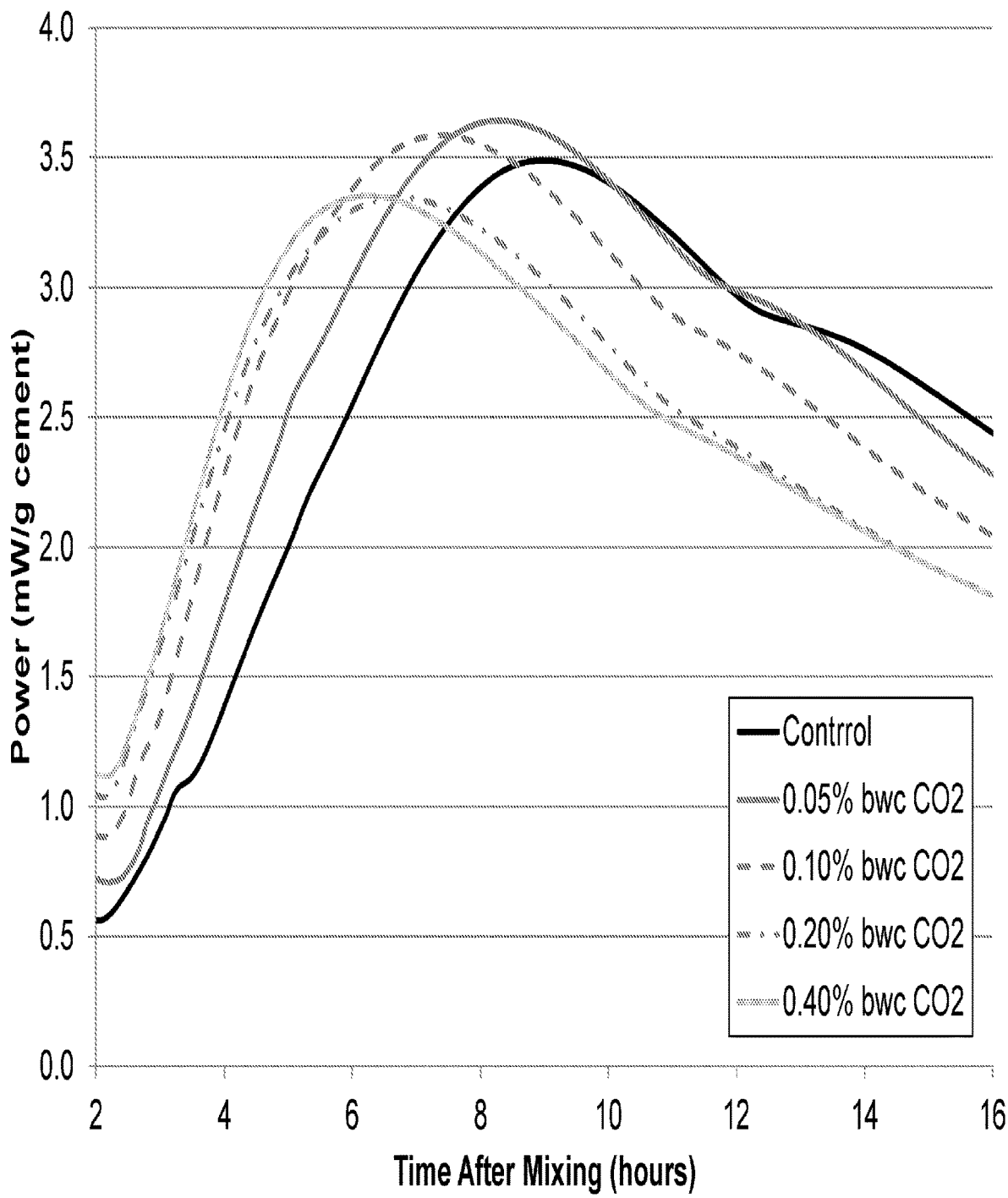

FIG. 139 shows power curves for the carbonated mixes of FIG. 138.

Figure 140:
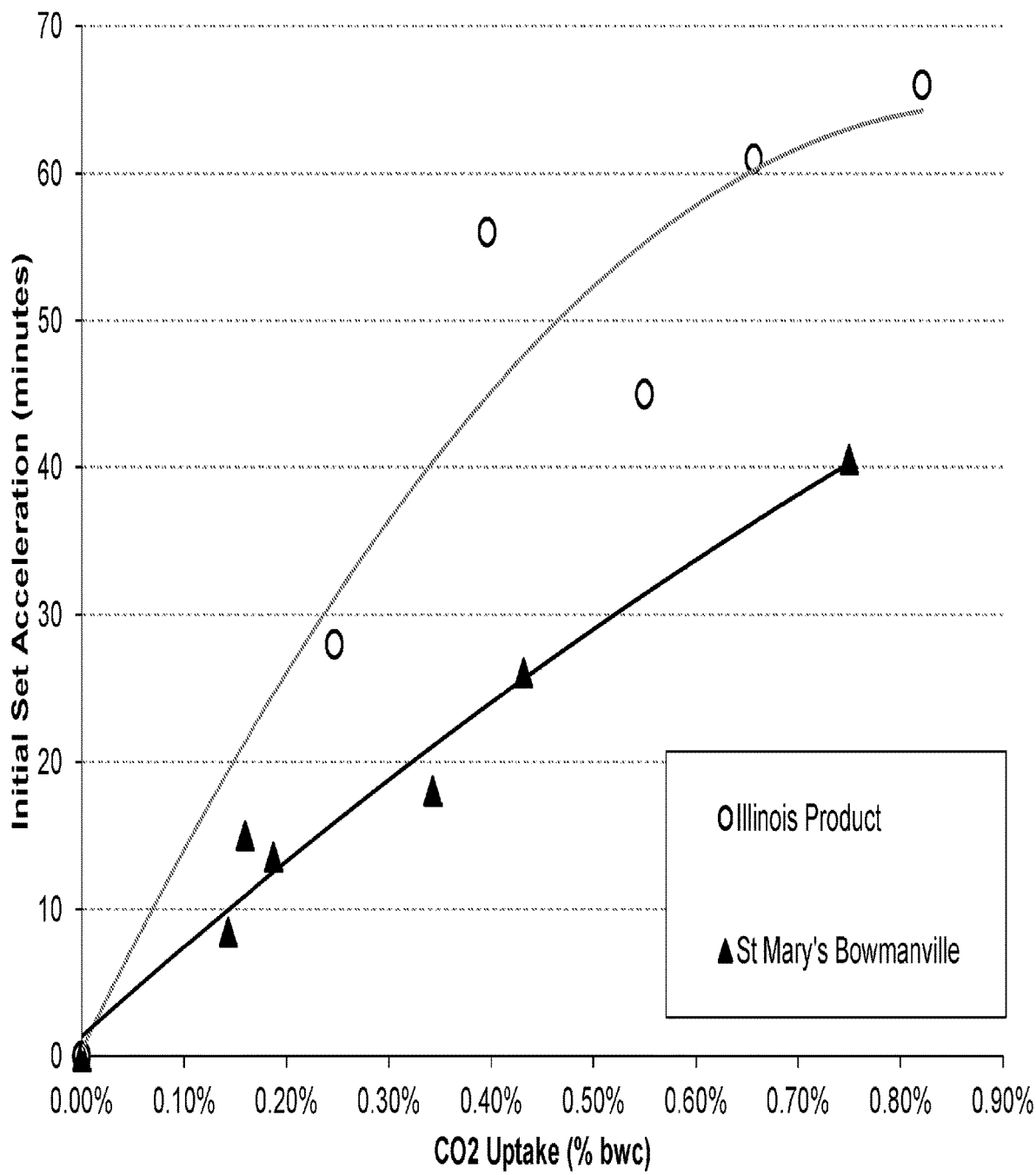

FIG. 140 shows the effect of carbonation on initial set in cement mixes prepared with two different types of cement.

Figure 141:
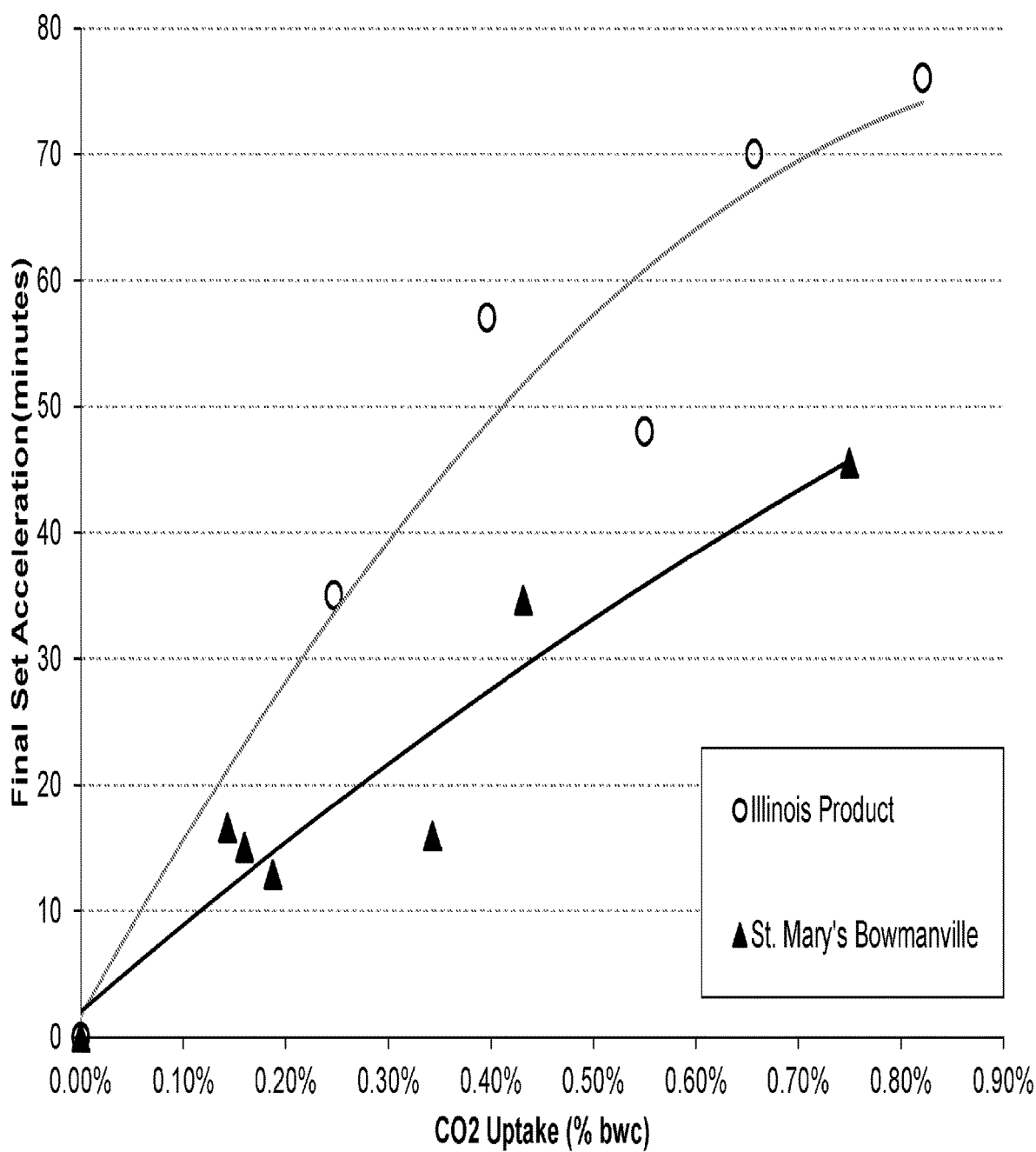

FIG. 141 shows the effect of carbonation on final set in cement mixes prepared with two different types of cement.

Figure 142:
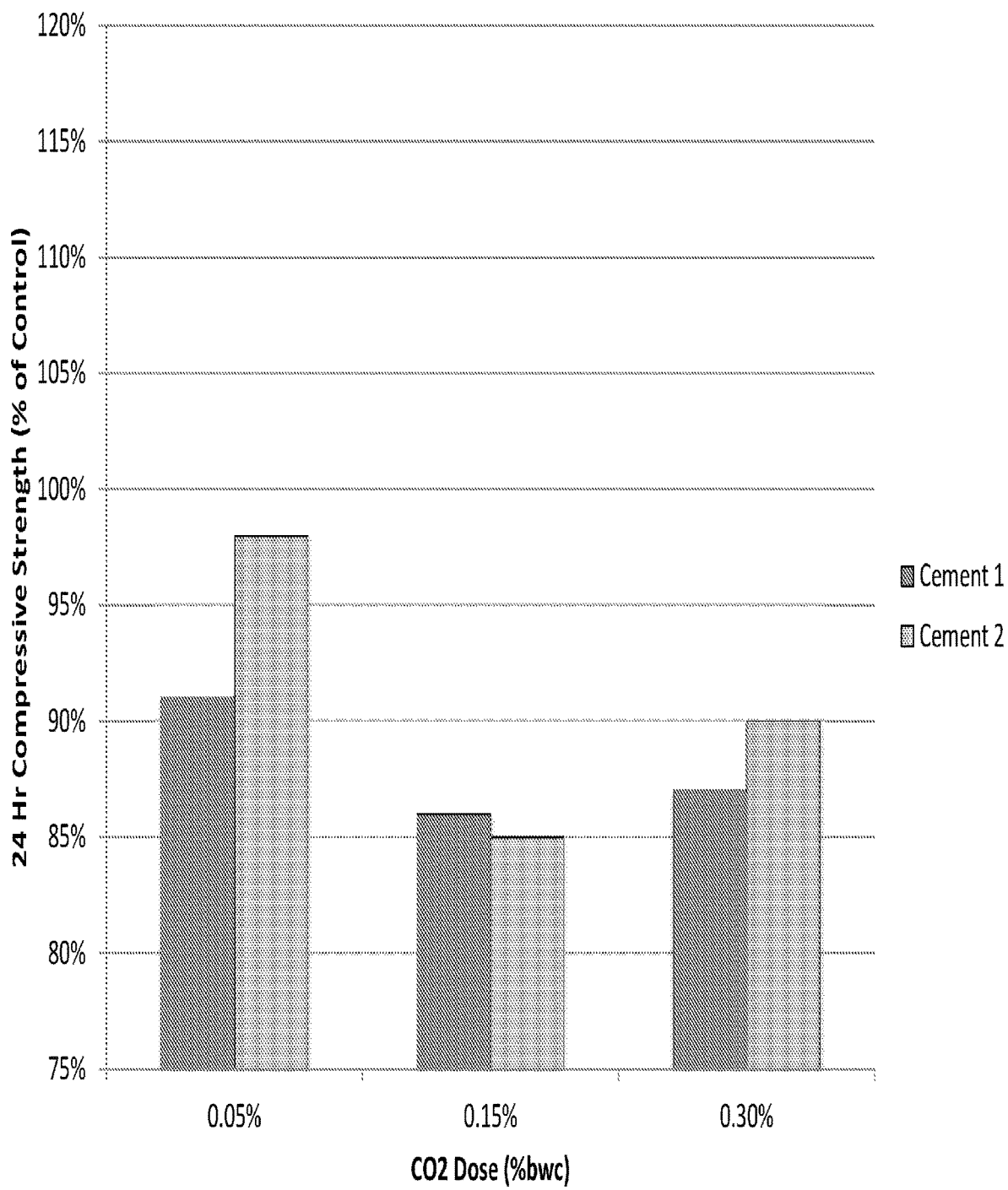

FIG. 142 shows 24-hour compressive strength in carbonated mortar mixes compared to control (uncarbonated) mortar mixes, where the only binder was cement.

Figure 143:
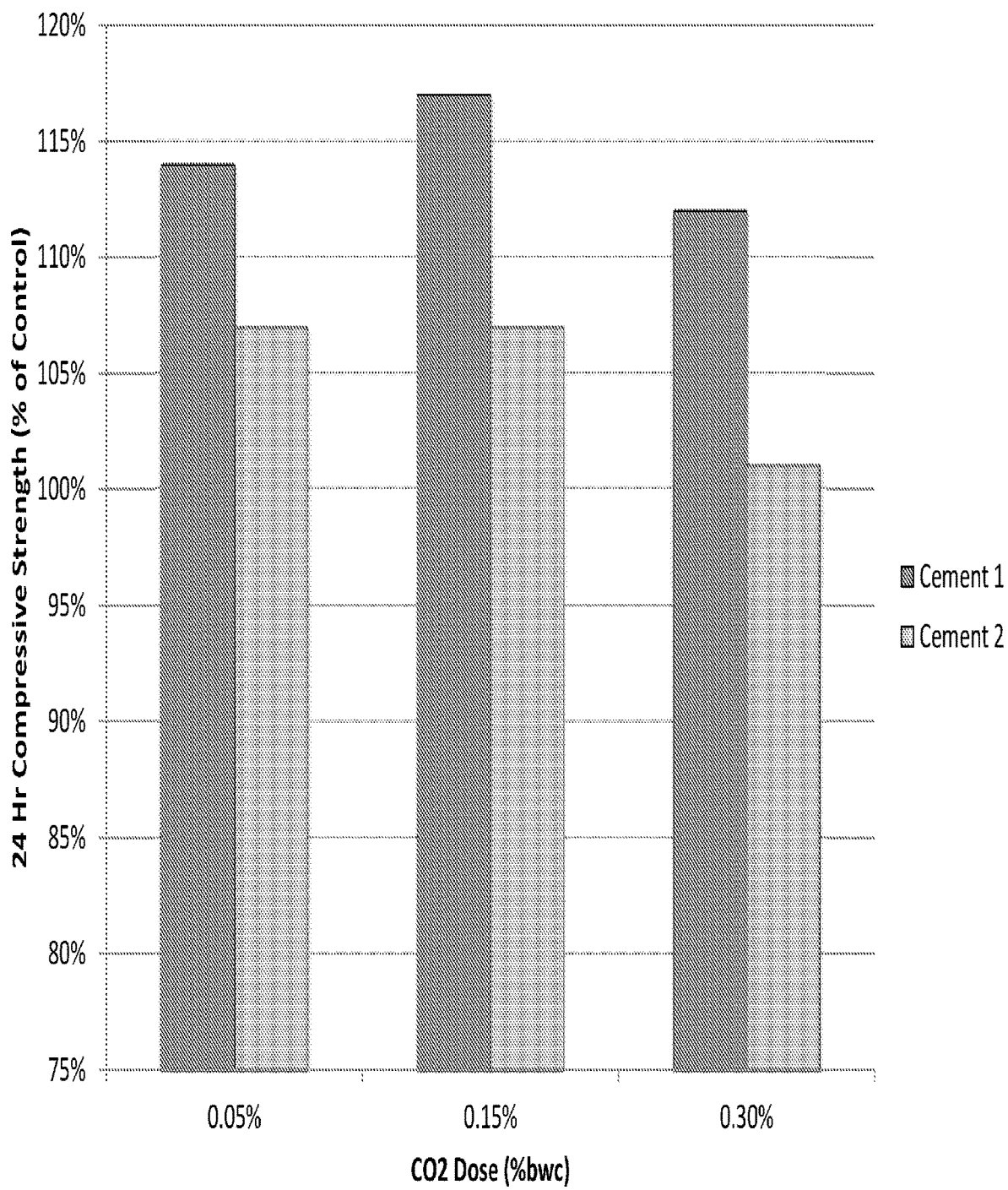

FIG. 143 shows 24-hour compressive strength in carbonated mortar mixes compared to control (uncarbonated) mortar mixes, where the binder was cement and class C fly ash.

Figure 144:
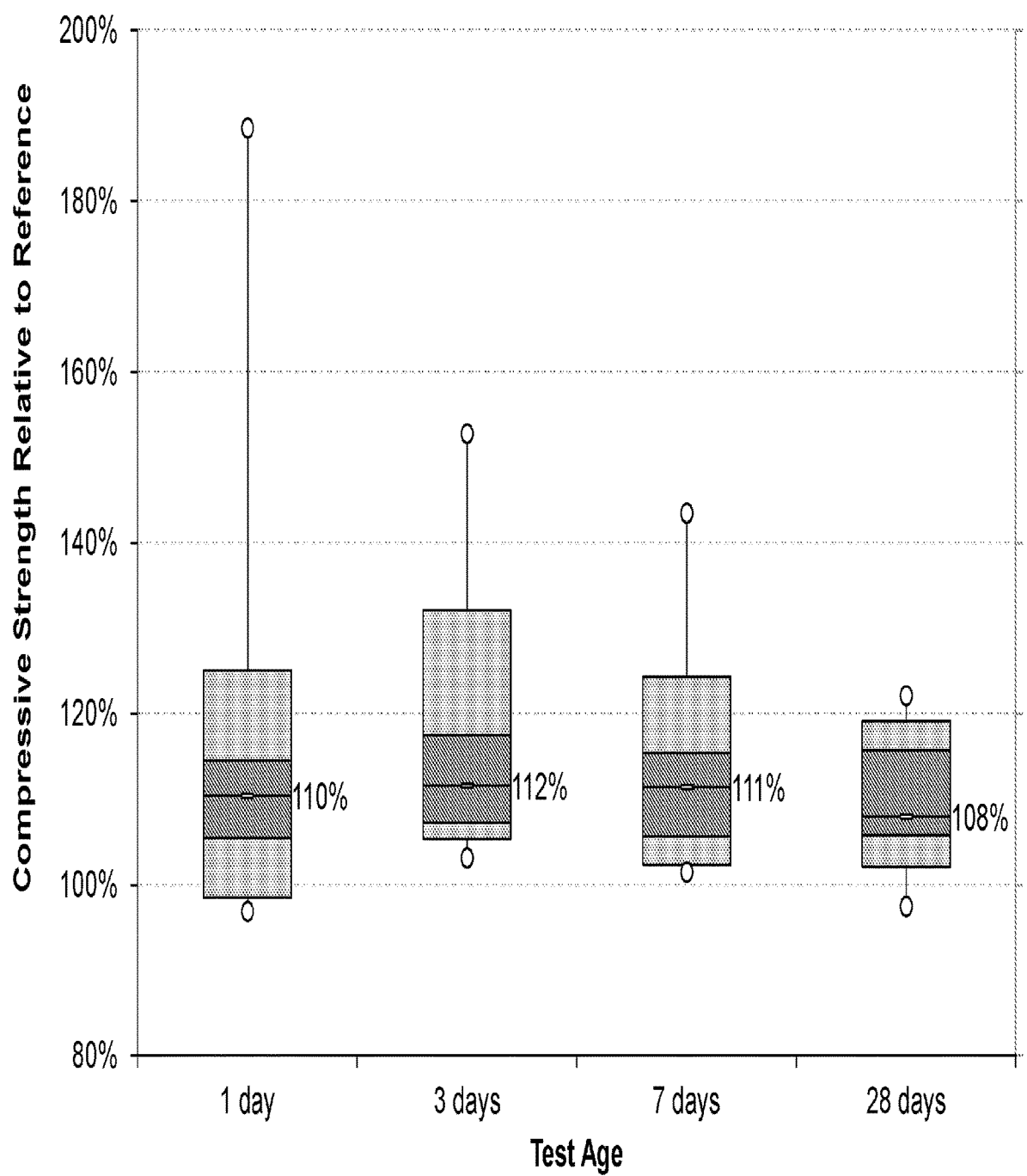

FIG. 144 shows compressive strength results for 1, 3, 7, and 28 days for samples in 12 different industrial trials of carbonation of concrete mixes.

Figure 145:
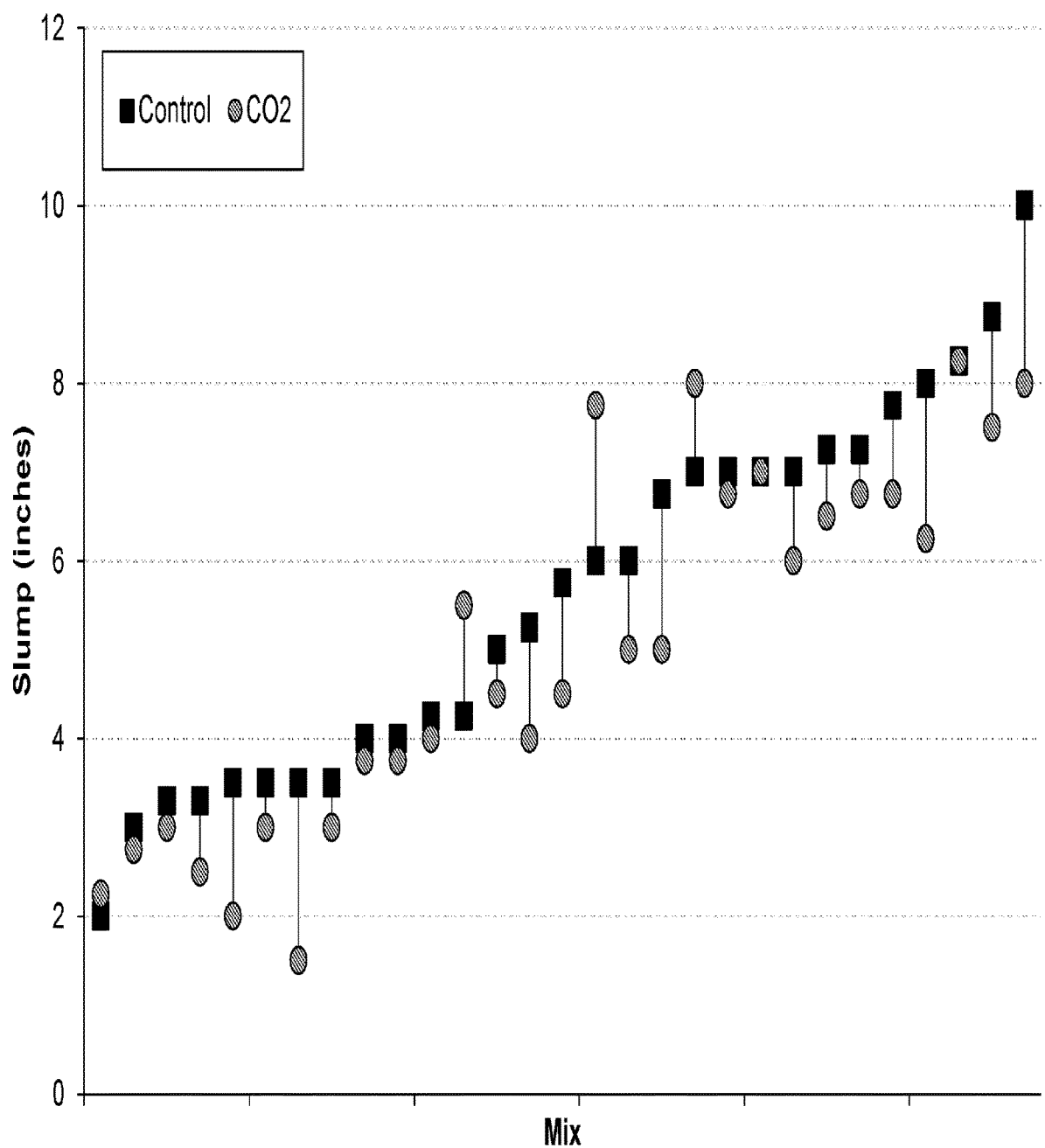

FIG. 145 shows slump results for samples in 12 different industrial trials of carbonation of concrete mixes.

Figure 146:
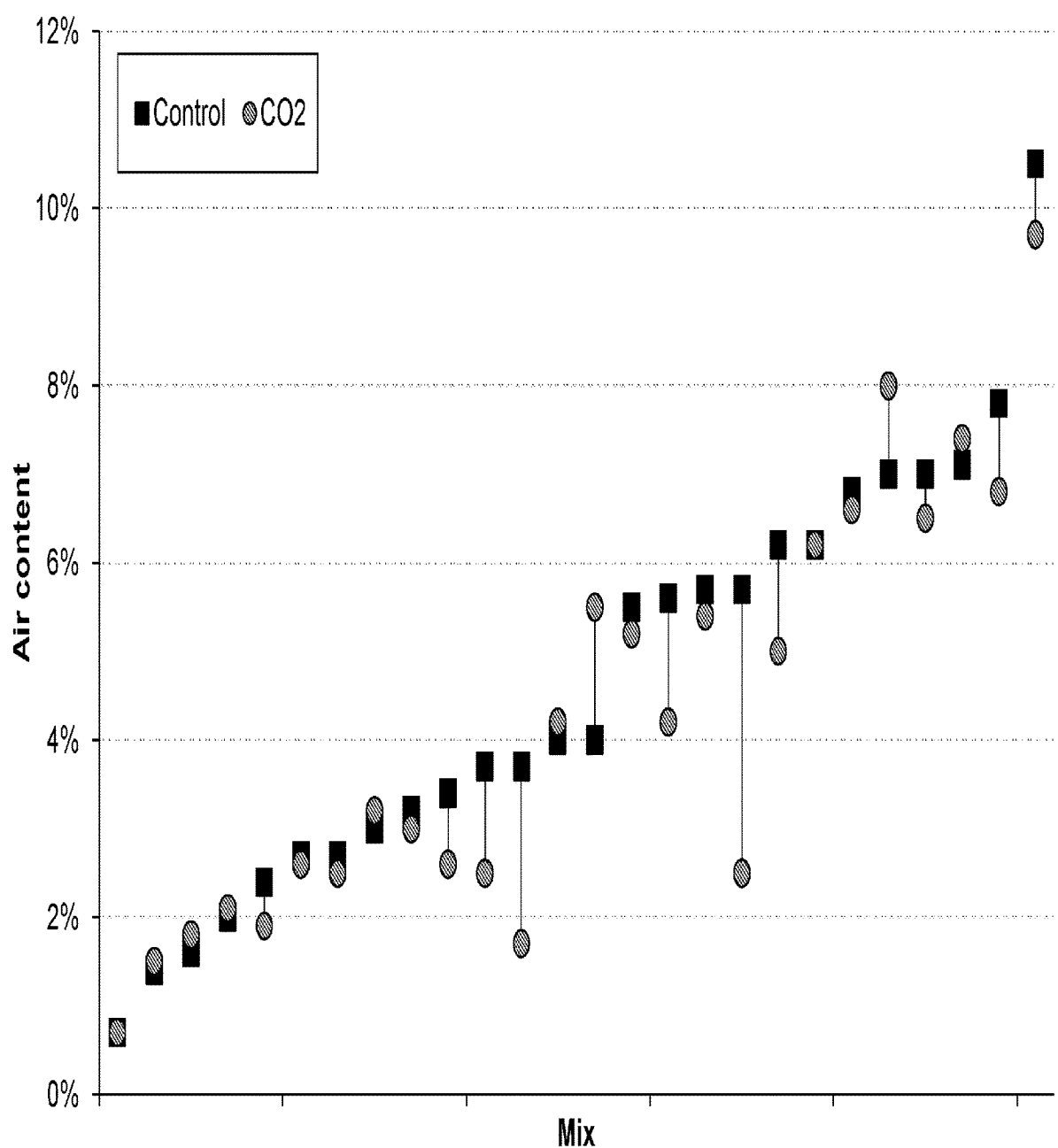

FIG. 146 shows air results for samples in 12 different industrial trials of carbonation of concrete mixes.

Figure 147:
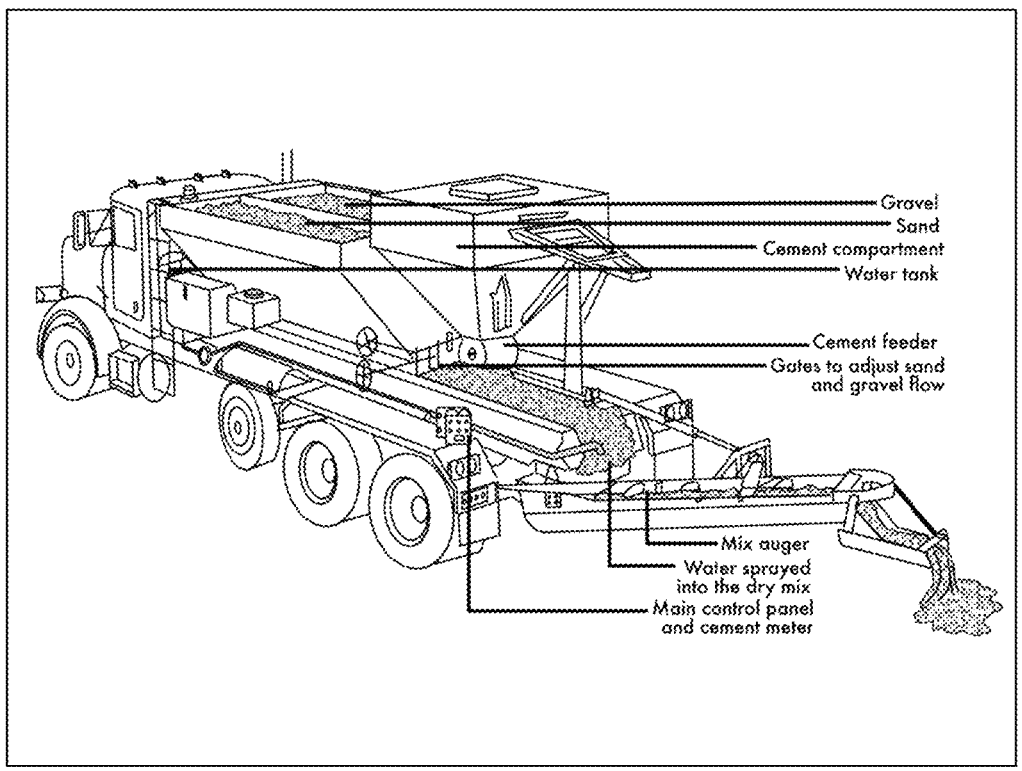

FIG. 147 provides a schematic illustration of a typical volumetric concrete truck.

DETAILED DESCRIPTION

I. Introduction

Carbon dioxide emissions are recognized as a significant issue relating to cement production and the use of concrete as a building material. It is estimated that 5% of the world's annual $CO_2$ emissions are attributable to cement production. The industry has previously recognized a number of approaches to reduce the emissions intensity of the cement produced and used. The most significant improvements in efficiency and cement substitution are likely to be already known and available. Future emissions improvements will likely be incremental. Innovative approaches are sought that can be a part of a portfolio strategy. Thus, a range of further approaches will also have to be pursued.

One potential method is to up cycle captured carbon dioxide into concrete products. The mechanism of the carbonation of freshly hydrating cement was systematically studied in the 1970s at the University of Illinois. The main cement phases, tricalcium silicate and dicalcium silicate, were shown to react with carbon dioxide in the presence of water to form calcium carbonate and calcium silicate hydrate gel as shown in equations 1 and 2:

$$3CaO \cdot SiO_2 + (3-x)CO_2 + yH_2O \rightarrow xCaO \cdot SiO_3 \cdot yH_2O + (3-x)CaCO_3 \quad (1)$$

$$2CaO \cdot SiO_2 + (2-x)CO_2 + yH_2O \rightarrow xCaO \cdot SiO_3 \cdot yH2O + (2-x)CaCO_3 \quad (2)$$

Further any free calcium hydroxide present in the cement paste will rapidly hydrate and react with carbon dioxide, as show in equation 3:

$$Ca(OH)_2 + CO_2 + H_2O \rightarrow CaCO_3 + 2H_2O \quad (3)$$

The carbonation reactions are exothermic. The reaction proceeds in the aqueous state when $Ca^{2+}$ ions from the cementitious phases meet $CO_3^{2-}$ ions from the applied gas. The carbonation heats of reaction for the main calcium silicate phases are 347 kJ/mol for C3S and 184 kJ/mol for β-C2S and 74 kJ/mol for $Ca(OH)_2$.

When the calcium silicates carbonate, the calcium silicate hydrate (C—S—H) gel that forms is understood to be intermixed with $CaCO_3$. C—S—H gel formation occurs even in an ideal case of β-C25 and C3S exposed to a 100% $CO_2$ at 1 atm given the observation that the amount of carbonate that forms does not exactly correspond to the amount of calcium silicate involved in the reaction.

The reaction of carbon dioxide with a mature concrete microstructure is conventionally acknowledged to be a durability issue due to such effects as shrinkage, reduced pore solution pH, and carbonation induced corrosion. In contrast, a carbonation reaction integrated into concrete production reacts $CO_2$ with freshly hydrating cement, rather than the hydration phases present in mature concrete, and does not have the same effects. Rather, by virtue of adding gaseous $CO_2$ to freshly mixing concrete the carbonate reaction products are anticipated to form in situ, be of nano-scale and be homogenously distributed.

The invention provides methods, apparatus, and compositions for production of materials comprising a cement binder, e.g., a hydraulic cement or non-hydraulic cement. "Cement mix," as that term is used herein, includes a mix of a cement binder, e.g., a hydraulic cement, such as a Portland cement, and water; in some cases, "cement mix" includes a cement binder mixed with aggregate, such as a mortar (also termed a grout, depending on consistency), in which the aggregate is fine aggregate; or "concrete," which includes a coarse aggregate. The cement binder may be a hydraulic or non-hydraulic cement, so long as it provides minerals, e.g. calcium, magnesium, sodium, and/or potassium compounds such as CaO, MgO, $Na_2O$, and/or $K_2O$ that react with carbon dioxide to produce stable or metastable products containing the carbon dioxide, e.g., calcium carbonate. An exemplary hydraulic cement is Portland cement. In general herein the invention includes descriptions of hydraulic cement binder and hydraulic cement mixes, but it will be appreciated that any cement mix is envisioned, whether containing a hydraulic or non-hydraulic cement binder, so long as the cement binder is capable of forming stable or metastable products when exposed to carbon dioxide, e.g., contains calcium, magnesium, sodium, and/or potassium compounds such as CaO, MgO, $Na_2O$, and/or $K_2O$. In certain embodiments, the invention provides methods, apparatus, and compositions for production of a cement mix (concrete) containing cement, such as Portland cement, treated with carbon dioxide. As used herein, the term "carbon dioxide" refers to carbon dioxide in a gas, solid, liquid, or supercritical state where the carbon dioxide is at a concentration greater than its concentration in the atmosphere; it will be appreciated that under ordinary conditions in the production of cement mixes (concrete mixes) the mix is exposed to atmospheric air, which contains minor amounts of carbon dioxide. The present invention is directed to production of cement mixes that are exposed to carbon dioxide at a concentration above atmospheric concentrations.

Cement mix operations are commonly performed to provide cement mixes (concrete) for use in a variety of applications, the most common of which is as a building material. Such operations include precast operations, in which a concrete structure is formed in a mold from the cement mix and undergoes some degree of hardening before transport and use at a location separate from the mix location, and ready mix operations, in which the concrete ingredients are supplied at one location and generally mixed in a transportable mixer, such as the drum of a ready mix truck, and transported to a second location, where the wet mix is used, typically by being poured or pumped into a temporary mold. Precast operations can be either a dry cast operation or a wet cast operation, whereas ready mix operations are wet cast. Any other operation in which a concrete mix is produced in a mixer and exposed to carbon dioxide during mixing is also subject to the methods and compositions of the invention.

Without being bound by theory, when the cement mix (concrete) is exposed to carbon dioxide, the carbon dioxide first dissolves in mix water and then forms intermediate species, before precipitating as a stable or metastable species, e.g., calcium carbonate. As the carbonate species are removed from solution, further carbon dioxide may dissolve in the water. In certain embodiments, the mix water contains carbon dioxide before exposure to the cement binder. All of these processes are encompassed by the term "carbonation" of the cement mix, as that term is used herein.

II. Components

In certain embodiments the invention provides methods for preparing a mix containing cement, by contacting a mixture of a cement binder, e.g., hydraulic cement and water, and, optionally, other components such as aggregate (a "cement mix", or "concrete," e.g., a "hydraulic cement mix") with carbon dioxide during some part of the mixing of the cement mix, e.g., hydraulic cement mix.

In certain embodiments, a hydraulic cement is used. The term "hydraulic cement," as used herein, includes a composition which sets and hardens after combining with water or a solution where the solvent is water, e.g., an admixture solution. After hardening, the compositions retain strength and stability even under water. An important characteristic is that the hydrates formed from the cement constituents upon reaction with water are essentially insoluble in water. A hydraulic cement used may be any hydraulic cement capable of forming reaction products with carbon dioxide. The hydraulic cement most commonly used is based upon Portland cement. Portland cement is made primarily from limestone, certain clay minerals, and gypsum, in a high temperature process that drives off carbon dioxide and chemically combines the primary ingredients into new compounds. In certain embodiments, the hydraulic cement in the hydraulic cement mix is partially or completely composed of Portland cement.

A "hydraulic cement mix," as that term is used herein, includes a mix that contains at least a hydraulic cement and water. Additional components may be present, such as aggregates, admixtures, and the like. In certain embodiments the hydraulic cement mix is a concrete mix, i.e., a mixture of hydraulic cement, such as Portland cement, water, and aggregate, optionally also including an admixture.

The methods in certain embodiments are characterized by contacting carbon dioxide with wet cement binder, e.g., hydraulic cement, in a mixer at any stage of the mixing, such as during mixing of the cement with water, or during the mixing of wetted cement with other materials, or both. The cement may be any cement, e.g., hydraulic cement capable of producing reaction products with carbon dioxide. For example, in certain embodiments the cement includes or is substantially all Portland cement, as that term is understood in the art. The cement may be combined in the mixer with other materials, such as aggregates, to form a cement-aggregate mixture, such as mortar or concrete. The carbon dioxide may be added before, during, or after the addition of the other materials besides the cement and the water. In addition or alternatively, in certain embodiments the water itself may be carbonated, i.e., contain dissolved carbon dioxide.

In certain embodiments, the contacting of the carbon dioxide with the cement mix, e.g., hydraulic cement mix, may occur when part but not all of the water has been added, or when part but not all of the cement has been added, or both. For example, in one embodiment, a first aliquot of water is added to the cement or cement aggregate mixture, to produce a cement or cement-aggregate mixture that contains water in a certain water/cement (w/c) ratio or range of w/c ratios. In some cases one or more components of the cement mix, e.g., hydraulic cement mix, such as aggregate, may be wet enough that is supplies sufficient water so that the mix may be contacted with carbon dioxide. Concurrent with, or after, the addition of the water, carbon dioxide is introduced to the mixture, while the mixture is mixing in a mixer.

The carbon dioxide may be of any purity and/or form suitable for contact with cement, e.g., hydraulic cement during mixing to form reaction products. As described, the carbon dioxide is at least above the concentration of atmospheric carbon dioxide. For example, the carbon dioxide may be liquid, gaseous, solid, or supercritical, or any combination thereof. In certain embodiments, the carbon dioxide is gaseous when contacted with the cement, e.g., hydraulic cement, though it may be stored prior to contact in any convenient form, e.g., in liquid form. In alternative embodiments, some or all of the carbon dioxide may be in liquid form and delivered to the cement or cement mix (concrete), e.g., in such a manner as to form a mixture of gaseous and solid carbon dioxide; the stream of liquid carbon dioxide can be adjusted by, e.g., flow rate and/or orifice selection so as to achieve a desired ratio of gaseous to solid carbon dioxide, such as ratio of approximately 1:1, or within a range of ratios. The carbon dioxide may also be solid when delivered to the concrete, i.e., as dry ice; this is useful when a controlled or sustained release of carbon dioxide is desired, for example, in a ready mix truck in transit to a mix site, or other wet mix operations, as the dry ice sublimates over time to deliver gaseous carbon dioxide to the mix; the size and shape of the dry ice added to the mix may be manipulated to ensure proper dose and time of delivery. In certain embodiments the carbon dioxide is dissolved in water and delivered to the cement or cement mix (concrete). The carbon dioxide may also be of any suitable purity for contact with the cement or cement mix (concrete), e.g., hydraulic cement during mixing under the specified contact conditions to form reaction products. In certain embodiments the carbon dioxide is more than 5, 10, 20, 30, 40, 50, 60, 70, 80, 90, 95, or 99% pure. In certain embodiments, the carbon dioxide is more than 95% pure. In certain embodiments, the carbon dioxide is more than 99% pure. In certain embodiments, the carbon dioxide is 20-100% pure, or 30-100% pure, or 40-100% pure, or 50-100% pure, or 60-100% pure, or 70-100% pure, or 80-100% pure, or 90-100% pure, or 95-100% pure, or 98-100% pure, or 99-100% pure. In certain embodiments, the carbon dioxide is 70-100% pure. In certain embodiment, the carbon dioxide is 90-100% pure. In certain embodiment, the carbon dioxide is 95-100% pure. The impurities in the carbon dioxide may be any impurities that do not substantially interfere with the reaction of the carbon dioxide with the wet cement mix, e.g., hydraulic cement mix. Commercial sources of carbon dioxide of suitable purity are well-known.

The carbon dioxide, e.g., carbon dioxide gas, liquid, or solid, may be commercially supplied high purity carbon dioxide. In this case, the commercial carbon dioxide, e.g., gas, liquid, or solid, may be sourced from a supplier that processes spent flue gasses or other waste carbon dioxide so that sequestering the carbon dioxide in the cement mix, e.g., hydraulic cement mix sequesters carbon dioxide that would otherwise be a greenhouse gas emission.

In addition, because carbonation of a cement mix, e.g., a concrete mix, often produces an improvement in strength compared to uncarbonated mix, less cement can be used in the production of a concrete that is equal in strength. In some cases, the amount of carbon dioxide absorbed is modest but if a consistent strength benefit can be realized then there is motivation to optimize the process and reduce the cement content. For example, masonry producers generally do not have any internal or external motivation to produce product that has a strength 119% of the conventional product. Instead, an economic gain can be realized by using a mix design that contains less cement and achieves, through help of the carbonation process, 100% of the uncarbonated product strength. A reduced cement mix design would additionally have clear environmental benefits given that Portland cement clinker typically has embodied $CO_2$ on the order of 866 kg $CO_{2e}$/tonne of clinker. If 5% of the cement was removed from the block mix design (about 333 kg/m$^3$) then the emissions savings would be around 14 kg/m$^3$ concrete before including any net offset related to the $CO_2$ absorption. Thus, in certain embodiments, the invention provides a carbonated concrete composition comprising an amount of cement that is less than the amount of cement needed in an uncarbonated concrete composition of the same or substantially the same mix design, e.g., at least 1, 2, 3, 4, 5, 6, 7, 8, 9, 10, 12, 15, 17, 20, 25, 30, 40, or 50% less cement, but with a strength, e.g., compressive strength, that is within 20, 15, 10, 5, 3, 2, or 1% of the compressive strength of the uncarbonated concrete mix at a given time or times after mixing, such as 24 hours, 2 days, 7 days, 14 days, 21 days, 56 days, or 91 days, or a combination thereof. These times are merely exemplary and any time or combination of times that gives meaningful information about the strength of the mix as related to its intended use may be used. Such compositions realize a net savings in $CO_2$ emissions that includes the amount of carbon dioxide taken up by the composition, and the amount of carbon dioxide emission avoided because less cement is needed in the production of the composition. For example, the net emission savings may be at least 1, 2, 3, 4, 5, 7, 10, 12, 15, 17, 20, 25, 30, 35, 40, 45, 50, 60, 70, 80, 90, 100, 125, or 150 kg $CO_2/m^3$ of concrete for the carbonated compared to the uncarbonated concrete. The concrete may be in the form of a precast object, such as a block, pipe, brick, paver, or the like; the concrete may be in the form of a ready-mix concrete that is poured into molds at a job site. The carbonation of the concrete may produce nanocrystals of calcium carbonate as described elsewhere herein. Substantial cost savings can also be realized by decreasing the amount of cement for a given concrete mix without sacrificing strength.

The carbon dioxide is contacted with the cement mix, e.g., hydraulic cement mix during mixing by any suitable route, such as over part or all of the surface of the mixing cement mix, e.g., hydraulic cement mix, under the surface of the cement mix, e.g., hydraulic cement mix, or any combination thereof. In certain embodiments where concrete is mixed in a first container and then introduced into a second container, such as at a ready-mix batching facility where concrete is first mixed in a mixer then transferred to the drum of a ready-mix truck, carbon dioxide is introduced into the second container prior to pre-mixed concrete being introduced into that container. Additionally or alternatively, the concrete may be contacted with carbon dioxide as it is being transferred from the first mix container to the second container. The carbon dioxide may be in any form as described herein, e.g., gas, solid, or a mix of gas and solid. In certain embodiments, the carbon dioxide is introduced into the second container as a solid, or a mixture of gas and solid; for example, the carbon dioxide may be supplied in a conduit as liquid carbon dioxide and on exiting an opening or orifice of the conduit, be converted to solid and gaseous carbon dioxide, as described elsewhere herein; the stream of gaseous and solid carbon dioxide may be directed to the second container before introduction of the concrete, and/or directed to the stream of concrete introduced into the second container. As it is advantageous to have a greater amount of solid carbon dioxide to avoid escape of gaseous carbon dioxide to the atmosphere, conditions of the introduction may be adjusted to achieve a high ratio of solid to gaseous carbon dioxide. Alternatively or additionally, carbon dioxide may be introduced into the second container as dry ice, as described elsewhere herein. The carbon dioxide in the second container is then contacted with the pre-mixed concrete as it is poured into the second container and as the second container continues to mix the concrete.

For example, in a ready-mix operation, concrete is often mixed in a mixer at the batching site and poured into the drums of ready-mix trucks for transport to the job site. The concrete continues to mix in the drum of the ready-mix truck. Carbon dioxide can be introduced into the drum of the ready-mix truck, e.g., as gaseous and solid carbon dioxide formed from liquid carbon dioxide, or as solid dry ice, or a combination thereof, prior to the concrete being poured from the mixer into the drum. Additionally or alternatively, carbon dioxide may be directed to the stream of concrete as it is being poured from the mixer to the drum. When the carbon dioxide is a mixture of gas and solid, e.g., produced from a liquid carbon dioxide, the stream of gas and solid may be directed to contact the stream of concrete being poured from the mixer, as well as entering the drum of the ready-mix truck. Thus the stream of solid and gaseous carbon dioxide may be positioned in such a way as to introduce carbon dioxide into the stream of concrete entering the drum of the truck, and also to introduce carbon dioxide into the drum itself. Carbon dioxide, e.g., solid carbon dioxide or a mixture of solid and gaseous carbon dioxide, may also be introduced into the drum of the truck prior to the pouring of the concrete into the drum. It will be appreciated that any combination of the above approaches may be used in order to contact the concrete in the drum of the truck with carbon dioxide. Such approaches are especially useful with low doses of carbon dioxide, such as doses no greater than 2%, or no greater than 1.5%, or no greater than 1% bwc, as described elsewhere herein.

In certain embodiments, the carbon dioxide is contacted with the cement mix, e.g., hydraulic cement mix during mixing by contact with the surface of the mixing cement mix, e.g., hydraulic cement mix. Without being bound by theory, it is believed that the carbon dioxide contacted with the surface of the cement mix, e.g., hydraulic cement mix dissolves and/or reacts in the water, and is then subsumed beneath the surface by the mixing process, which then exposes different cement mix, e.g., cement mix, to be contacted, and that this process continues for as long as the wetted hydraulic cement is exposed to the carbon dioxide. It will be appreciated that the process of dissolution and/or reaction may continue after the flow of carbon dioxide is halted, since carbon dioxide will likely remain in the gas mixture in contact with the cement mix, e.g., hydraulic cement mix. In embodiments in which liquid carbon dioxide is used to produce gaseous and solid carbon dioxide, the solid carbon dioxide will sublimate and continue to deliver gaseous carbon dioxide to the cement mix, e.g., hydraulic cement mix after the flow of liquid carbon dioxide has ceased. This is particularly useful in ready mix truck operations, where there may be insufficient time at the batching facility to allow uptake of the desired amount of carbon dioxide; the use of liquid carbon dioxide which converts to gaseous and solid carbon dioxide allow more carbon dioxide to be delivered to the mix even after the truck leaves the batching facility.

In particular, in a ready-mix operation, the concrete may be mixed in a stationary mixer, then transferred to the drum of the ready-mix truck, or the components of the concrete may be delivered to the drum of the ready-mix truck and the mixing of the components to provide concrete occurs in the drum. In the former case, carbon dioxide may be delivered to the stationary mixer, and in such a case, the delivery may be similar or identical to that used in, e.g., a precast operation, i.e., carbon dioxide is delivered via a conduit which opens to the mixer and delivers the carbon dioxide to the surface of the mixing concrete. The carbon dioxide may be any form as described herein; in certain embodiments, the carbon dioxide is delivered as liquid which, upon exiting the opening of the conduit, converts to a solid and a gas, as described herein. Further carbonation of the concrete may be achieved, if desired, by delivery of additional carbon dioxide to the drum of the ready mix truck after the concrete is delivered to it. Alternatively, all carbon dioxide may be delivered to the drum of the ready-mix truck; this will clearly be the case if the mixing of the concrete occurs in the drum. In this case, a delivery system for carbon dioxide to the drum of the ready-mix truck is needed.

The carbon dioxide can be delivered after the components of the concrete mix are placed in the drum; for example, in some ready-mix operations, the truck is moved to a wash rack where it is washed down prior to leaving the yard. When such a delivery system is used, the positioning of the conduit for the carbon dioxide, also referred to as a wand or lance herein, so that the opening is in a certain position and attitude relative to the drum can be important; one aspect of some embodiments of the invention is positioning the wand, and/or apparatus for doing so, to facilitate efficient mixing of the gaseous and solid carbon dioxide with the cement mix as the drum rotates. Any suitable positioning method and/or apparatus may be used to optimize the efficiency of uptake of carbon dioxide into the mixing cement as long as it positions the wand in a manner that provides efficient uptake of the carbon dioxide, for example, by positioning the wand so that the opening is directed to a point where a wave of concrete created by fins of the ready mix drum folds over onto the mix; without being bound by theory it is thought that the wave folding over the fin immediately subsumes the solid carbon dioxide within the cement mix so that it releases gaseous carbon dioxide by sublimation into the mix rather than into the air, as it would do if on the surface of the mix. One exemplary positioning is shown in FIG. 134, where the wand is aimed at the second fin in the drum of the truck, on the bottom side of the fin. In a ready mix truck carrying a full load, the opening of the wand may be very close to the surface of the mixing concrete, as described below, to facilitate the directional flow of the carbon dioxide mix into the proper area. Part or all of the wand may be made of flexible material so that if a fin or other part of the drum hits the wand it flexes then returns to its original position.

In certain embodiments, the invention provides a system for positioning a carbon dioxide delivery conduit on a ready mix truck so that the opening of the conduit is directed to a certain position in the drum of the truck, for example, as described above. The conduit may deliver gaseous carbon dioxide or a mixture of gaseous and solid carbon dioxide through the opening. In the latter case, the conduit is constructed of materials that can withstand the liquid carbon dioxide carried by the conduit to the opening. The system can include a guide, which may be mounted on the truck, for example permanently mounted, or that may be part of the lance assembly, that is configured to allow the reversible positioning of the conduit, for example, by providing a cylinder or holster into which the conduit can be inserted, so that the conduit is positioned at the desired angle for delivery of the carbon dioxide to a particular point, and a stop to ensure that the conduit is inserted so that the opening is at the desired distance from the concrete. This is merely exemplary and one of skill in the art will recognize that any number of positioning devices may be used, so long as the angle and position of the opening relative to a desired point in the drum is obtained. The wand is positioned in the guide, for example, manually by the driver, or automatically by an automated system that senses the positions of the various components. A sensor may be tripped when the wand is positioned properly and a system controller may then begin carbon dioxide delivery, either at that time or after a desired delay. The controller can be configured so that if the conduit is not positioned properly, e.g., the sensor does not send the signal, the delivery will not start. The system may also be configured so that if one or more events occur during before, during, or after delivery, an alarm sounds and/or delivery is modulated, for example, stopped, or not initiated. For example, an alarm can sound if the wand loses signal from the positioning sensor during injection, the pressure is greater than 25 psi when both valves for delivery of gaseous and liquid carbon dioxide to the conduit is closed, e.g., when both are closed (which determines if a valve sticks open), or if the next truck in the queue has not been initiated in a certain amount of time. Exemplary logic for a controller can include:

If the wand loses signal during injection, an alarm light comes on and a message can pop on a HMI, for example, a screen, informing an operator that the injection wand is disconnected and to reconnect and press Start button to continue. There can also be an indicator, e.g., a button that indicates "Injection Complete" which would end that batch and record what was actually injected vs the target. In a batching facility in which a plurality of different trucks are being batched, a system controller may be configured to receive input regarding the identity of each truck at the carbon dioxide delivery site and select the appropriate action, e.g., delivery/no delivery, timing, flow, and amount of carbon dioxide delivered, and the like. For example, for entering a truck number that corresponds to the current truck being batched (signal being sent to plc), a dialog box can pop up when the system controller gets the signal from the customer PLC asking an operator to "Please input Identification Number" (e.g., a 1-10 digit number), alternatively, the truck identifier numbers can be in a predetermined order, e.g., sequential. To choose the option, there may be a selector switch on the maintenance screen. Feedback may also be provided to an operator, e.g., a batcher, showing relevant information for the batches run, such as Identification Number, Time Batched, Time Injected, Dose Required and Dose Injected, and the like. The units of the dose can be any suitable units, for example either lbs or kgs depending on the units selected. A "spreadsheet" can be provided that shows all batches from the current day (or makes the date selectable) so that the batcher can review it and scroll though, for example a printable spreadsheet.

In certain embodiments, carbon dioxide is added to the drum of a ready-mix truck while the truck is positioned to receive the components of the concrete; this allows earlier contact of the carbon dioxide with the concrete mix and also allows all components—concrete and carbon dioxide—to be added at once, avoiding the necessity for the truck operator to perform an additional step to add the carbon dioxide. Generally, in an operation where the components of the concrete are added to the drum of the ready-mix truck for mixing, a flexible large conduit, generally referred to as a loading boot, such as a rubber boot, is positioned to direct materials (cement, aggregate, etc.) from loading hopper/bin into the concrete truck chute; this system minimizes spillage. See FIG. 135. In this case, a smaller conduit for delivery of carbon dioxide can be positioned within the larger conduit (boot) to move with the boot and be configured to direct the carbon dioxide into the drum of the ready-mix truck. Thus, an example another method and apparatus for positioning a wand for delivery of carbon dioxide to a ready-mix truck is described in Example 42 and FIGS. 135 and 136. In this system, a flexible hose housed in a pipe, where the hose is extended through a loading boot and into a concrete truck's chute by the action of an apparatus suitable for extending the hose, such as a telescopic air cylinder rod or a rotary device. One or more components of the apparatus may be suitably configured to direct the carbon dioxide to a desired location or area in the drum, such as by a bend in the apparatus.

In embodiments in which carbon dioxide is directed as a solid/gas mixture into a mixer, such as into a ready-mix truck or into a stationary mixer, it may be desirable to modulate the flow, e.g., slow the flow, so that the solid carbon dioxide particles can clump together into larger particles before contacting the cement mix, e.g., hydraulic cement mix such as concrete, in the mixer. Without being bound by theory, it is thought that by allowing larger conglomerations to form, the rate of sublimation is slowed and the released gaseous carbon dioxide is more likely to be taken up by the cement mix rather than escaping to the atmosphere.

One method modulating the flow of the solid/gas carbon dioxide mixture is to expand the diameter of the conduit through which the solid/gas mixture flows, and/or to introduce a bend into the conduit. Both the increase in diameter and the bend in the conduit serve to slow the velocity; however, in certain embodiments only an increase in diameter is used; in certain embodiments, only a bend is used. Any suitable step-up in size may be used, with or without a bend, so long as the rate of flow of the gas/solid carbon dioxide mix is slowed sufficiently to provide the desired clumping of solid particles before contact with the cement mix; in general it is preferred that the velocity remain high enough that the solid carbon dioxide does not stick inside the conduit.

A larger diameter, with or without a bend, may also be used for a conduit used to deliver a gas/solid mixture of carbon dioxide to a non-stationary mixer, e.g., a ready-mix truck. The increase in diameter of the conduit may be any increase that produces the desired clumping of the solid carbon dioxide, preferably with no or very little buildup of solid carbon dioxide in the conduit.

It will be appreciated that other systems of positioning a conduit for delivery of carbon dioxide to a ready-mix truck may be used, such as systems wherein the conduit, or lance, is attached to a stand and is positioned into the drum of the truck without being temporarily attached to the truck. Such systems are included in embodiments of the invention. For descriptions of exemplary systems, see, e.g., U.S. Patent Application Publication No. 2014/0216303, and U.S. Pat. No. 8,235,576.

In embodiments in which carbon dioxide is contacted with the surface of the cement mix, e.g., hydraulic cement mix, the flow of carbon dioxide may be directed from an opening or plurality of openings (e.g., manifold or conduit opening) that is at least 5, 10, 20, 30, 40, 50, 60, 70, 80, 90, or 100 cm from the surface of the cement mix, e.g., hydraulic cement mix during carbon dioxide flow, on average, given that the surface of the mix will move with mixing, and/or not more than 10, 20, 30, 40, 50, 60, 70, 80, 90, 100, 120, 140, 170, or 200 cm from the surface of the cement mix, e.g., hydraulic cement mix during carbon dioxide flow, on average. In certain embodiments, the opening is 5-100 cm from the surface, on average, such as 5-60 cm, for example 5-40 cm.

Other methods of increasing carbon dioxide delivery, such as using carbon dioxide-charged water in the mix, may also be used. In addition, or alternatively, solid carbon dioxide, i.e., dry ice, may be used directly by addition to the concrete mix. This allows for controlled delivery as the dry ice sublimates, as described. For example, dry ice may be added to a cement mix in a ready mix truck. The amount of dry ice added may be enough to provide a dose of 0.01-5% carbon dioxide bwc, for example, 0.01-1%, or 0.01-0.5%, or 0.01-0.2%, or 0.1-2% or 0.1-1%, or 0.2-3%, or 0.5-3%. The dry ice may be added in one or more batches. The shape of the dry ice may be selected depending on, e.g., the speed of gaseous carbon dioxide delivery desired; for example, if rapid delivery is desired, the dry ice may be added as small pellets, thus increasing surface/volume ratio for carbon dioxide sublimation, or if a slower delivery is desired, the dry ice may be added as a larger mass, e.g., slab, with a correspondingly smaller surface/volume ratio and slower sublimation, or any combination of shapes and masses to achieve the desired dose of carbon dioxide and rate of delivery. The dry ice may be added at any convenient stage in mixing, for example, at the start of mixing or within 5 or 10 minutes of the start of mixing, or later in the mixing, for example, as a ready mix truck approaches a job site or the time of delivery of its concrete load. In addition, solid carbon dioxide may be added before or after a first, second, or third addition of water where water addition to the concrete mix is divided into two or more doses. Mixing speed for the concrete mix may also be modulated to achieve a desired rate of dosing or other desired results. For example, in certain embodiments, the invention provides a method for delivering carbon dioxide to concrete mixing in a ready mix truck by adding solid carbon dioxide to the concrete mix during the mixing, where at least 20, 30, 40, 50, 60, 70, 80, 90, 95, or 99% of the carbon dioxide delivered to the concrete is added in the form of solid carbon dioxide.

In embodiments in which the carbon dioxide is contacted under the surface of the cement mix, e.g., hydraulic cement mix, any suitable route of providing the carbon dioxide may be used. In some embodiments, the flow of carbon dioxide may be both under the surface and over the surface, either by use of two different openings or plurality of openings or by movement of the openings relative to the mix, e.g., under the surface at one stage and over the surface at another, which may be useful to prevent clogging of the openings.

The carbon dioxide may be contacted with the cement mix, e.g., hydraulic cement mix such that it is present during mixing by any suitable system or apparatus. In certain embodiments, gaseous or liquid carbon dioxide is supplied via one or more conduits that contain one or more openings positioned to supply the carbon dioxide to the surface of the mixing cement mix, e.g., hydraulic cement mix. The conduit and opening may be as simple as a tube, e.g., a flexible tube with an open end. The conduit may be sufficiently flexible so as to allow for movement of various components of the cement mix, e.g., hydraulic cement mixing apparatus, the conduit opening, and the like, and/or sufficiently flexible to be added to an existing system as a retrofit. On the other hand, the conduit may be sufficiently rigid, or tied-off, or both, to insure that it does not interfere with any moving part of the cement mix, e.g., hydraulic cement mixing apparatus. In certain embodiments, part of the conduit can be used for supplying other ingredients to the cement mix, e.g., water, and configured such that either the other ingredient or carbon dioxide flows through the conduit, e.g., by a T-junction.

In certain embodiments, the carbon dioxide exits the conduit or conduits via one or more manifolds comprising a plurality of openings. The opening or openings may be positioned to reduce or eliminate clogging of the opening with the cement mix, e.g., hydraulic cement mix. The manifold is generally connected via the conduit to at least one fluid (gas or liquid) supply valve, which governs flow of pressurized fluid between a carbon dioxide source, e.g. a pressurized gas or liquid supply, and the manifold. In some embodiments, the fluid supply valve may include one or more gate valves that permit the incorporation of calibration equipment, e.g., one or more mass flow meters.

The mass of carbon dioxide provided to the cement mix, e.g., hydraulic cement mix via the conduit or conduits may be controlled by a mass flow controller, which can modulate the fluid supply valve, e.g., close the valve to cease supply of carbon dioxide fluid (liquid or gas).

Carbon dioxide may also be delivered to the cement mix, e.g., hydraulic cement mix as part of the mix water, i.e., dissolved in some or all of the mix water. Methods of charging water with carbon dioxide are well-known, such as the use of technology available in the soda industry. Some or all of the carbon dioxide to be used may be delivered this way. The mix water may be charged to any desired concentration of carbon dioxide achievable with the available technology, such as at least 1, 2, 4, 6, 8, 10, 12, 14, or 16 g of carbon dioxide/L of water, and/or not more than 2, 4, 6, 8, 10, 12, 14, 18, 20, 22, or 24 g of carbon dioxide/L of water, for example 1-12, 2-12, 1-10, 2-10, 4-12, 4-10, 6-12, 6-10, 8-12, or 8-10 g of carbon dioxide/L of water. It will be appreciated that the amount of carbon dioxide dissolved in the mix water is a function of the pressure of the carbon dioxide and the temperature of the mix water; at lower temperatures, far more carbon dioxide can be dissolved than at higher temperatures. Without being bound by theory, it is thought that the mix water so charged contacts the cement mix, e.g., hydraulic cement mix and the carbon dioxide contained therein reacts very quickly with components of the cement mix, e.g., hydraulic cement mix, leaving the water available to dissolve additional carbon dioxide that may be added to the system, e.g., in gaseous form.

In certain embodiments, a cement mix such as a concrete mix is carbonated with carbon dioxide supplied as carbonated water, for example, in the drum of a ready mix truck. The carbonated water serves as a portion of the total mix water for the particular mix. The carbonated water can provide at least 1, 5, 10, 15, 20, 25, 30, 35, 40, 50, 60, 70, 80, or 90% of the total mix water, and/or no more than 10, 20, 30, 40, 50, 60, 70, 80, 90, 95, or 100% of the mix water. The carbonated water may be added at the start of mixing of the cement mix, or it may be added after the start of mixing, i.e., after a first addition of water to wet the cement mix. It can be added as one batch or in stages, for example, as 2, 3, 4, 5 or more than 5 batches. The batches may be equal in volume or different volumes, and have the same carbonation or different carbonations. In certain embodiments, the carbonated water is less than 100% of the total mix water, for example, less than 80%, or less than 70%, or less than 60%, or less than 50%. In certain of these embodiments, embodiments, non-carbonated water is first added to the mix, and the cement mix, e.g., concrete, is allowed to mix for a certain period before carbonated water is added, for example, for at least 5, 10, 15, 20, 30, 40, or 50 seconds, or at least 1, 2, 3, 4, 5, 6, 8, 10, 15, 20, 25, 30, 40, 50, or 60 minutes before addition of the carbonated water, and/or not more than 10, 15, 20, 30, 40, or 50 seconds, or 1, 2, 3, 4, 5, 6, 8, 10, 15, 20, 25, 30, 40, 50, 60, 90, 120, 240, or 360 minutes before addition of carbonated water. In certain embodiments, the delay before carbonated water is added to the mix is between 10 seconds and 5 minutes, for example, between 20 seconds and 40 minutes, such as between 30 seconds and 3 minutes. See Example 38. The flow rate of the carbonated water may be adjusted so that a certain duration is required for complete addition, such as a duration of at least 10, 20, 30, 40, or 50 seconds, or at least 1, 2, 3, 4, 5, 6, 7, 8, 9, 10, 12, 15, 20, or 30 minutes, and/or not more than 10, 20, 30, 40, or 50 seconds, or not more than 1, 2, 3, 4, 5, 6, 7, 8, 9, 10, 12, 15, 20, or 30 minutes. In certain embodiments, the duration of addition of carbonated water is between 30 seconds and 8 minutes, for example, between 30 seconds and 6 minutes, such as between 30 second and 4 minutes. See Example 38. The carbonated water may contribute all of the carbon dioxide used to carbonate a cement mix, e.g., concrete (neglecting atmospheric carbon dioxide); this is especially true for low-dose carbonation, for example, carbonation with a dose of carbon dioxide of less than 1.5% bwc, or less than 1.0% bwc, or less than 0.8% bwc. The carbonated water may contribute part or all of the carbon dioxide used to carbonate a cement mix, e.g., concrete, such as not more than 10, 20, 30, 40, 50, 60, 70, 80, 90, 95, or 100% of the carbon dioxide and/or at least 5, 10, 20, 30, 40, 50, 60, 70, 80, 90, or 95% of the carbon dioxide. In certain embodiments, the remaining carbon dioxide is supplied as a gas. In certain embodiments, the remaining carbon dioxide is supplied as a solid. In certain embodiments, the remaining carbon dioxide is supplied as a mixture of a gas and a solid, for example, carbon dioxide delivered to an orifice directed into the mixer in liquid form, which becomes gas and solid when passing through the orifice. The exact mix of carbonated water and other carbon dioxide source will be determined based on the dose of carbon dioxide to be delivered and other factors, such as delivery time, temperature (lower temperatures allow greater carbon dioxide delivery via carbonated water), and the like. The carbonated water may be produced by any suitable method, as described herein, and may be delivered to the mixer, e.g., the ready mix truck, via the normal water line or via a dedicated line. In certain embodiments, some or all of the carbonated water is produced from process water that is produced during, e.g., a ready mix operation, such as carbonated wash water that has been filtered, or unfiltered carbonated wash water, or a combination thereof. The wash water may be carbonated by any suitable method. See Example 39. The carbonated wash water can provide at least 1, 5, 10, 15, 20, 25, 30, 35, 40, 50, 60, 70, 80, or 90% of the total carbonated mix water, and/or no more than 10, 20, 30, 40, 50, 60, 70, 80, 90, 95, or 100% of the total carbonated mix water. In certain embodiments carbonated water is delivered to the mix at the batch site and/or during transportation, and an optional dose is delivered at the job site, depending on the characteristics of the mix measured at the job site. The use of carbonated water can allow for very high efficiencies of carbon dioxide uptake, as well as precise control of dosage, so that highly efficient and reproducible carbon dioxide dosing can be achieved. In certain embodiments in which carbonated mix water is used, the efficiency of carbonation can be greater than 60, 70, 80, 90, or even 95%, even when operating in mixers, such as ready mix drums, which are open to the atmosphere.

The carbon dioxide is supplied from a source of carbon dioxide, such as, in the case of gaseous carbon dioxide, a pressurized tank filled with carbon dioxide-rich gas, and a pressure regulator. The tank may be re-filled when near empty, or kept filled by a compressor. The regulator may reduce the pressure in the tank to a maximum feed pressure. The maximum feed pressure may be above atmospheric, but below supercritical gas flow pressure. The feed pressure may be, for example, in a range from 120 to 875 kPa. A pressure relief valve may be added to protect the carbon dioxide source components. The carbon dioxide supplied by the carbon dioxide source may be about room temperature, or it may be chilled or heated as desired. In certain embodiments, some or all of the carbon dioxide is supplied as a liquid. In some cases the liquid is converted to gas before delivery to the mixer; in other cases, the remains a liquid in storage and movement to the mixer, and when released at the mixer forms a mixture comprising solid and gaseous carbon dioxide. In the latter case, one or more pressure sensors may be used; e.g., for the nozzle system to control dry ice formation between the nozzle and solenoid as well as to confirm pre-solenoid pressure is maintained to ensure the line remains liquid.

Carbon dioxide may be introduced to the mixer such that it contacts the hydraulic cement mix before, during, or after addition of water, or any combination thereof, so long as it is present during some portion of the mixing of some or all of the cement mix, e.g., hydraulic cement mix. In certain embodiments, the carbon dioxide is introduced during a certain stage or stages of mixing. In certain embodiments, the carbon dioxide is introduced to a cement mix, e.g., hydraulic cement mix during mixing at one stage only. In certain embodiments, the carbon dioxide is introduced during one stage of water addition, followed by a second stage of water addition. In certain embodiments, the carbon dioxide is introduced to one portion of cement mix, e.g., hydraulic cement mix, followed by addition of one or more additional portions of cement mix, e.g., hydraulic cement mix.

In certain embodiments, the carbon dioxide is introduced into a first stage of mixing of water in the cement mix, e.g., hydraulic cement mix, then, after this stage, additional water is added without carbon dioxide. For example, water may be added to a cement mix, e.g., hydraulic cement mix, e.g., a Portland cement mix, until a desired w/c ratio is achieved, then carbon dioxide may be contacted during mixing of the cement mix, e.g., hydraulic cement mix for a certain time at a certain flow rate or rates (or as directed by feedback, described further herein), then after carbon dioxide flow has stopped, additional water may be added in one or more additional stages to reach a desired w/c content, or a desired flowability, in the cement mix, e.g., hydraulic cement mix. The cement mixes contain aggregates, and it will be appreciated that the available aggregate may already have a certain water content and that little or no additional water need be added to achieve the desired w/c ratio for the first stage and that, in some environments, it may not be possible to achieve the desired w/c ratio because aggregate may be too wet, in which case the closest w/c ratio to the optimum is achieved. In certain embodiments, the w/c ratio for the first stage is less than 0.5, or less than 0.4, or less than 0.3, or less than 0.2, or less than 0.18, or less than 0.16, or less than 0.14, or less than 0.12, or less than 0.10, or less than 0.08, or less than 0.06. In certain embodiments, the w/c ratio for the first stage is less than 0.4. In certain embodiments, the w/c ratio for the first stage is less than 0.3. In certain embodiments, the w/c ratio for the first stage is less than 0.2. In certain embodiments, the w/c ratio for the first stage is less than 0.18. In certain embodiments, the w/c ratio for the first stage is less than 0.14. In certain embodiments, the w/c ratio for the first stage is 0.04-0.5, or 0.04-0.4, or 0.04-0.3, or 0.04-0.2, or 0.04-0.18, or 0.04-0.16, or 0.04-0.14, or 0.04-0.12, or 0.04-0.10, or 0.04-0.08. In certain embodiments, the w/c ratio for the first stage is 0.06-0.5, or 0.06-0.4, or 0.06-0.3, or 0.06-0.24, or 0.06-0.22, or 0.06-0.2, or 0.06-0.18, or 0.06-0.16, or 0.06-0.14, or 0.06-0.12, or 0.06-0.10, or 0.06-0.08. In certain embodiments, the w/c ratio for the first stage is 0.08-0.5, or 0.08-0.4, or 0.08-0.3, or 0.08-0.24, or 0.08-0.22, or 0.08-0.2, or 0.08-0.18, or 0.08-0.16, or 0.08-0.14, or 0.08-0.12, or 0.08-0.10. In certain embodiments, the w/c ratio for the first stage is 0.06-0.3. In certain embodiments, the w/c ratio for the first stage is 0.06-0.2. In certain embodiments, the w/c ratio for the first stage is 0.08-0.2. Addition of additional water in subsequent stages to the first stage, when, in general, no further carbon dioxide is introduced, may be done to achieve a certain final w/c ratio, or to achieve a certain flowability. For example, for a ready-mix truck, a certain amount of water is added to the mixture at the ready-mix production site, then further water may be added at the work site to achieve proper flowability at the work site. Flowability may be measured by any suitable method, for example, the well-known slump test.

In some embodiments, carbon dioxide is added during mixing to a portion of a cement mix, e.g., hydraulic cement mix in one stage, then additional portions of materials, e.g., further cement mix, e.g., hydraulic cement mix, are added in one or more additional stages.

The carbon dioxide, e.g., gaseous carbon dioxide or liquid carbon dioxide, is introduced in the mixing cement mix, e.g., hydraulic cement mix, for example, in the first stage of mixing, at a certain flow rate and for a certain duration in order to achieve a total carbon dioxide exposure. The flow rate and duration will depend on, e.g., the purity of the carbon dioxide gas, the total batch size for the cement mix, e.g., hydraulic cement mix and the desired level of carbonation of the mix. A metering system and adjustable valve or valves in the one or more conduits may be used to monitor and adjust flow rates. In some cases, the duration of carbon dioxide flow to provide exposure is at or below a maximum time, such as at or below 100, 50, 20, 15, 10, 8, 5, 4, 3, 2, or one minute. In certain embodiments, the duration of carbon dioxide flow is less than or equal to 5 minutes. In certain embodiments, the duration of carbon dioxide flow is less than or equal to 4 minutes. In certain embodiments, the duration of carbon dioxide flow is less than or equal to 3 minutes. In certain embodiments, the duration of carbon dioxide flow is less than or equal to 2 minutes. In certain embodiments, the duration of carbon dioxide flow is less than or equal to 1 minutes. In some cases, the duration of carbon dioxide flow to provide exposure is within a range of times, such as 0.5-20 min, or 0.5-15 min, or 0.5-10 min, or 0.5-8 min, or 0.5-5 min, or 0.5-4 min, or 0.5-3 min, or 0.5-2 min, or 0.5-1 min, or 1-20 min, or 1-15 min, or 1-10 min, or 1-8 min, or 1-5 min, or 1-4 min, or 1-3 min, or 1-2 min. In certain embodiments, the duration of carbon dioxide flow is 0.5-5 min. In certain embodiments, the duration of carbon dioxide flow is 0.5-4 min. In certain embodiments, the duration of carbon dioxide flow is 0.5-3 min. In certain embodiments, the duration of carbon dioxide flow is 1-5 min. In certain embodiments, the duration of carbon dioxide flow is 1-4 min. In certain embodiments, the duration of carbon dioxide flow is 1-3 min. In certain embodiments, the duration of carbon dioxide flow is 1-2 min.

The flow rate and duration of flow may be set or adjusted to achieve a desired level of carbonation, as measured by weight of cement (bwc). It will be appreciated that the precise level of carbonation will depend on the characteristics of a given mix and mix operation. In certain embodiments, the level of carbonation is more than 0.5, 1, 2, 3, 4, 5, 6, 7, 8, 9, or 10% bwc. In certain embodiments, the level of carbonation is more than 1% by weight. In certain embodiments, the level of carbonation is more than 2% bwc. In certain embodiments, the level of carbonation is more than 3% bwc. In certain embodiments, the level of carbonation is more than 4% bwc. In certain embodiments, the level of carbonation is more than 5% bwc. In certain embodiments, the level of carbonation is more than 6% bwc. In certain embodiments, the level of carbonation is 1-20%, or 1-15%, or 1-10%, or 1-8%, or 1-6%, or 1-5%, or 1-4%, or 1-3%, or 1-2%, or 2-20%, or 2-15%, or 2-10%, or 2-8%, or 2-6%, or 2-5%, or 2-4%, or 2-3%, or 0.5-20%, or 0.5-15%, or 0.5-10%, or 0.5-8%, or 0.5-6%, or 0.5-5%, or 0.5-4%, or 0.5-3%, or 0.5-2%. In certain embodiments, the level of carbonation is 0.5-3%. In certain embodiments, the level of carbonation is 0.5-2%. In certain embodiments, the level of carbonation is 1-6%. In certain embodiments, the level of carbonation is 1-4%. In certain embodiments, the level of carbonation is 2-8%. In certain embodiments, the level of carbonation is 2-6%. In certain embodiments, the level of carbonation is 2-4%. In certain embodiments, the level of carbonation is 3-10%. In certain embodiments, the level of carbonation is 3-8%. In certain embodiments, the level of carbonation is 3-6%. In certain embodiments, the level of carbonation is 4-10%. In certain embodiments, the level of carbonation is 4-8%. In certain embodiments, the level of carbonation is 4-6%. In certain embodiments, the level of carbonation is 5-10%. In certain embodiments, the level of carbonation is 5-8%. In certain embodiments, the level of carbonation is 5-6%. The level of carbonation may be ascertained by any suitable method, such as by the standard combustion analysis method, e.g. heating sample and quantifying the composition of the off gas. An instrument such as the Eltra CS-800 (KR Analytical, Cheshire, UK), or instrument from LECO (LECO Corporation, St. Joseph, Mich.) may be used.

It will be appreciated that the level of carbonation also depends on the efficiency of carbonation, and that inevitably some of the carbon dioxide delivered to the mixing cement mix will be lost to the atmosphere; thus, the actual amount of carbon dioxide delivered can be adjusted based on the expected efficiency of carbonation. Thus for all the desired levels of carbonation as listed, an appropriate factor may be added to determine the amount of carbon dioxide that is to be delivered as a dose to the cement mix; e.g., if the expected efficiency is 50% and the desired carbonation level is 1% bwc, then a dose of 2% bwc would be delivered to the mix. Appropriate doses may be calculated for desired carbonations at an efficiency of 5, 10, 20, 30, 40, 50, 60, 65, 70, 75, 80, 85, 90, 95, 96, 97, 98, or 99%.

Low Dose Carbonation

In certain embodiments, a relatively low level of carbonation is used, e.g., a level of carbonation below 1%, 0.8%, 0.7%, 0.6%, 0.5%, 0.4%, 0.3%, 0.2%, 0.1%, or 0.05% bwc. It has been found that certain properties, e.g., early strength development and set, may be accelerated in cement mixes, such as hydraulic cement mixes, that are exposed to relatively low levels of carbon dioxide during mixing. It is possible that, in some cases, the exposure may be low enough that the degree of carbonation is not measurably above that of a similar cement mix that has not been exposed to carbon dioxide; nonetheless, the exposure may lead to the desired enhanced properties. Thus, in certain embodiments, the mixing cement mix is exposed to a certain relatively low dose of carbon dioxide (in some cases regardless of final carbonation value); in this sense, carbon dioxide is used like an admixture whose final concentration in the cement mix is not important but rather its effects on the properties of the mix. In certain embodiments, the mix may be exposed to a dose of carbon dioxide of not more than 1.5%, 1.2%, 1%, 0.8%, 0.7%, 0.6%, 0.5%, 0.4%, 0.3%, 0.2%, 0.1%, or 0.05% bwc and/or at least 0.01, 0.05, 0.1, 0.2, 0.3, 0.4, 0.5, 0.6, 0.7, 0.8, 0.9, 1.0, or 1.2% bwc, such as a dose of 0.01-1.5%, 0.01-1.2%, 0.01-1%, 0.01-0.8%, 0.01-0.6%, 0.01-0.5%, 0.01-0.4%, 0.01-0.3%, 0.01-0.2%, or 0.01-0.1% bwc, or a dose of 0.02-1.5%, 0.02-1.2%, 0.02-1%, 0.02-0.8%, 0.02-0.6%, 0.02-0.5%, 0.02-0.4%, 0.02-0.3%, 0.02-0.2%, or 0.02-0.1% bwc, or a dose of 0.04-1.5%, 0.04-1.2%, 0.04-1%, 0.04-0.8%, 0.04-0.6%, 0.04-0.5%, 0.04-0.4%, 0.04-0.3%, 0.04-0.2%, or 0.04-0.1% bwc, or a dose of 0.06-1.5%, 0.06-1.2%, 0.06-1%, 0.06-0.8%, 0.06-0.6%, 0.06-0.5%, 0.06-0.4%, 0.06-0.3%, 0.06-0.2%, or 0.06-0.1% bwc, or a dose of 0.1-1.5%, 0.1-1.2%, 0.1-1%, 0.1-0.8%, 0.1-0.6%, 0.1-0.5%, 0.1-0.4%, 0.1-0.3%, or 0.1-0.2% bwc. The choice of exposure level will depend on factors such as efficiency of carbonation in the process being used, degree of modulation of one or more properties desired (e.g., early strength development or early set), type of operation (e.g., dry cast vs. wet cast), and type of cement, as different types of cement may produce mixes with different degrees of modulation with a given carbon dioxide exposure. If an unfamiliar cement or mix type is being used, preliminary work may be done to find one or more suitable carbon dioxide doses to produce the desired results. Especially in the case of accelerated strength and/or set development, the use of an appropriate dose of carbon dioxide can allow work to progress faster, e.g., vertical pours may move upward more quickly, surfaces may be finished earlier, molds removed earlier, and the like.

Tailoring Carbonation to Mix and Conditions at Site

In all dosing settings, for example, in low dose, the dose chosen for a given mix as well as dosing conditions, for example, to produce a desired increase in early strength or set, or to produce an optimal increase in early strength or set, can be dependent on the mix and especially on the cement used in the mix, as well as conditions in the field where dosing and use actually occur. Cements used in mixes are generally produced locally and vary from one geographic location to another, and the particular chemistry of a cement can determine whether or not it will benefit from carbonation, as well as optimal dosing parameters, such as overall dose, time to add carbon dioxide, rate of addition, and the like. Other components of a particular mix, e.g. SCMs such as fly ash or slag, may also provide one or more reactive species that also influence carbonation. See, e.g., Example 45.

In certain embodiments, the invention provides methods for determining whether or not to carbonate a given cement mix, and/or to determine a level of carbonation and/or dose of carbon dioxide and/or dosing conditions to achieve a desired result from carbonation of a cement mix, e.g., early strength development, or strength development in a particular time frame, reduced amount of cement required, or the like. The determination may be made by predictions for a given mix, e.g., based on the chemistry of the components, or testing, or a combination thereof. In testing, any suitable characteristic or combination of characteristics may be monitored in the testing, such as strength, flowability, and other characteristics that are important for the particular batch design being tested. In certain embodiments the invention provides a method of carbonating a cement mix, e.g., concrete, during mixing, where carbon dioxide is added to the mix at a certain dose or range of doses, where the certain dose or range of doses is determined by testing one or more components of the mix, for example, the concrete, to determine a dose or a range of doses that produces optimal or desired increase in early strength and/or set.

The composition of the cement mix for testing can be any suitable composition, for example, as simple as cement and water, or a mortar also including fine aggregate, e.g., sand, as well as optional additional components, such as admixtures and the like. See Examples for compositions used in testing. In certain embodiments the concrete mix to be used in a given operation is tested.

Carbonation of the test cement mix can be achieved by any of the methods described herein, for example by delivery of carbon dioxide to the cement mix under controlled conditions to achieve a certain dose of carbon dioxide to the mix. In certain embodiments, the carbonation is achieved by using a bicarbonate solution, rather than carbon dioxide. It is thought that essentially all of the bicarbonate delivered to a concrete mix will be converted to carbonate so it is possible to control the exact level of carbonation of the mix achieved, and thus to first determine a desired level of carbonation, e.g., by testing a plurality of levels of carbonation to find the level or range of levels that produces the desired effect or effects. See, e.g., Example 37.

No matter what method of carbonation is used, if pre-testing is used to determine a dose or range of doses, in general a plurality of tests is conducted, i.e., using at least two, or at least three, or at least four different doses of carbon dioxide. For low-dose carbon dioxide delivery, the doses may all be below 1.5%, or 1.2%, or 1.0%, or 0.8%, or 0.6% carbon dioxide bwc. A dose or range of doses to be used in the field is determined from one or more test results from the test mixes, for example, calorimetry results, as described herein, and/or compressive strength results, and/or set results, and/or slump results. Methods of measuring strength, set, slump, and other characteristics of concrete mixes are well-known in the art and described, e.g., in the appropriate ASTM testing protocols. In certain embodiments, the test mix comprises the type of cement to be used in the concrete mix, and water; additional components may include one or more aggregates, admixtures, SCM, and any other suitable component, for example, as will be used in the concrete mix; generally, components are used at or near the proportion that will be used in the concrete mix. In certain embodiments, the test mix comprises all the components to be used in the concrete mix, in the same proportions as will be used.

The focus can then shift to consistently achieving the desired level of carbonation under the conditions in which the carbon dioxide will actually be delivered to the cement mix to be used in the field. For example, in a ready mix operation, a certain efficiency may be achieved, e.g., by using techniques described herein, so that the dose of carbon dioxide actually delivered may be adjusted according to the efficiency of carbonation. Factors such as the likely temperature at the batching facility and/or job site can also affect carbonation and can also be taken into account. See Example 40. It will be appreciated that the methods and composition of the invention can be used to allow concrete mixes to be used at temperatures lower than they would otherwise be able to be used by virtue of the effects of carbonation on early strength development, for example, at a temperature at least 1, 2, 3, 4, 5, 6, 7, 8, 9, or 10° C. below the temperature at which a non-carbonated mix of the same or substantially the same design could be used.

Other factors that can affect efficiency of carbonation and/or the effect of carbonates can include factors such as shear rate of mixing, timing after water is added to the mix at which the carbon dioxide is added to the mix, e.g., delayed addition, and temperature as described above. Without being bound by theory, it is thought that these factors can affect the formation of nano-sized calcium carbonate, which can in turn affect the resulting influence of calcium carbonate formation on, e.g., strength development and/or other characteristics of the cement mix. A high shear rate can prevent aggregation of particles and thus promotes formation of nanoparticles. Delaying addition of carbon dioxide can allow calcium to come into solution and allow solution chemistry to develop.

In certain embodiments, the invention provides methods for determining whether or not to carbonate a given cement mix, and/or to determine a level of carbonation and/or dose of carbon dioxide and/or dosing conditions to achieve a desired result from carbonation of a cement mix, e.g., early strength development, or strength development in a particular time frame, or reduced amount of cement needed in the mix, or the like, is determined, in whole or in part, from the chemistry of the cement to be used in the cement mix. In certain embodiments, one or more of free CaO, total CaO, alkali content, loss on ignition, one or more oxides, ratio of calcium to silica, fineness, iron content, or combinations thereof can be used to determine a dose or range of doses for carbonation, and/or dosing conditions for a particular cement mix.

It will be appreciated that, in the case of low dose carbonation, a carbonation value may not be able to be determined, and that in all cases strength tests can require multiple samples and days to weeks to complete. Thus in some embodiments, a predetermined dose of carbon dioxide is determined using an alternative marker, such as isothermal calorimetry. Heat release during hydration is related to two somewhat overlapping peaks. The main heat release is related to the hydration of silicates, while a second heat release, observed as a hump on the downslope of the silicate peak, is associated with the hydration of the aluminates. Isothermal calorimetry testing is easy to carry out in mortar or even cement paste with very minimal sample preparation compared to the making of concrete samples, thus allowing for a rapid and convenient method of determining an optimal $CO_2$ dose and timing for a given cement, by testing a range of doses and delivery times. The results obtained are either in the form of heat flow rate over time (also referred to as power vs. time herein), which describes the rate of cement hydration, or in the form of heat of hydration over time, which is the integrated heat flow rate (also referred to as energy vs. time herein). See, e.g., Example 30, which describes several different doses of carbon dioxide added to concrete in the drum of a ready mix truck, in trials conducted on two separate days. FIGS. 81-85 show the absolute and relative compressive strengths of samples from the different doses of carbon dioxide, at different time points, for the first day; it can be seen that as carbon dioxide dose increased, strength at all time points generally increased. The isothermal calorimetry curves shown in FIGS. 86A and 86B mirror this, with the highest dose of carbon dioxide causing the greatest shift in the curve, and second and third highest doses giving the second and third greatest shifts in the curves. Similar results can be seen in other Examples, e.g., Example 30 and others.

Cements that are suitable for carbonation—with respect to accelerated set and/or early strength development—can be readily identified, and/or a dose or doses selected, as well as time of dosing, from the isocalorimetry curves using any suitable procedure, such as a procedure in which a cement paste, mortar, or concrete is produced using the cement being tested. Admixtures may also be tested, either separately or as part of an overall protocol, to determine their effects on workability and other desired characteristics, as well as optimal doses.

An exemplary procedure is as follows:
1. Prepare a "control-control" sample with no carbonation and no admixture.
2. Prepare a control sample with no carbonation and admixture for desired "control" workability, if admixture is used.
3. $CO_2$ uptake dosage ramp: Prepare one or more carbonated samples with incrementally higher $CO_2$ dosages. A chemical admixture may be included to restore workability, and/or to enhance early strength development. Admixtures themselves may be optimized by preparing carbonated samples with fixed CO2 dose and variable admixture type and dosing (e.g. compare gluconate vs fructose, before and after $CO_2$, with dispersant)
4. Plot the power/heat flow rate for each mix as a function of time 5. Plot the integrated power/heat flow rate, energy/heat of hydration, as a function of time, excluding the initial exotherm occurring prior to the onset of the main hydration peak in the heat flow plot. See ASTM C 1679 for the definition of the main hydration peak.

The following features from the heat flow rate plot and the heat of hydration are indicative of accelerated development of set or early strength:
   a) If the onset of the main hydration peak in the power/heat flow rate plot occurs sooner for a carbonated mix then this indicates accelerated set and early strength development
   b) If the energy/heat of hydration for a carbonated mix exceeds the heat of hydration for the control mix then this indicates a continuously higher early strength during the time that the heat of hydration stays above the control.
   c) If the results from several different $CO_2$ dosages and/or admixture dosages are obtained then one can use the results not only to identify cements that responds favorably to carbonation, but also to "dial-in" the optimum $CO_2$ uptake and admixture dose for said cement with respect to the development of mechanical properties at early age.

The information obtained is especially useful for evaluating cements suitable for carbonation in pre-cast applications and any other application where accelerated set and early strength is of value. Optionally, samples can be prepared for testing of strength development, to verify the calorimetry results. In general, admixtures are used to restore workability in order to generate well compacted samples with reliable strength data. Doses for carbon dioxide and, optionally, types and doses of admixture, for a given mix may thus be determined rapidly and efficiently, then the dose determined in the testing is used in the actual carbonation.

In low dose carbonation, as in all cement mix, e.g., concrete, carbonation, various factors may be manipulated to produce optimal or desired results. These include one or more of: time after beginning of mixing at which carbon dioxide is applied; number of doses of carbon dioxide; rate at which carbon dioxide is supplied to the mixing chamber; form of the carbon dioxide (gas, solid, and/or dissolved in water); and the like. Mixing is said to have commenced upon addition of the first aliquot of water to the cement-containing mix. It will be appreciated that in certain instances, components of a concrete mix, e.g., aggregate, may be wet and that "the first mix water" may be the water on the aggregate. Carbon dioxide can be supplied to a mix before the first addition of water, for example by flooding a chamber or head space with carbon dioxide before water addition, but in this case the application of carbon dioxide is considered to occur when the first water is added, since virtually no reaction will occur until the carbon dioxide dissolves in the mix water.

In certain operations, e.g., precast operations, there is little flexibility as to when carbon dioxide is added to the mixing concrete, as mix times are generally very short and the concrete is typically used very quickly after mixing. In these operations, addition of carbon dioxide to the mixing concrete generally begins simultaneously with the commencement of mixing or within seconds or, at most, minutes of the commencement of mixing. In other operations, e.g., ready-mix operations, there are several times at which carbon dioxide can be added to the mixing concrete. Carbon dioxide can be added during batching, which can occur either in a fixed mixer or in the drum of the ready-mix truck; in this case, the carbon dioxide contacts the hydrating cement at a time very close to the commencing of mixing, as in the precast case. Some ready-mix operations include one or more additional operations after batching but before the truck has left the batching facility, e.g., a wash station for washing the truck after batching, and in these operations carbon dioxide may be alternatively or additionally added at the batching facility after batching, e.g., at a wash station, which will involve carbon dioxide addition at a time several minutes after mixing commences. Additionally or alternatively, carbon dioxide may be added at the job site after the concrete has been transported, and in these cases carbon dioxide addition will be added to mixing concrete at a time up to several hours after mixing commences. Any suitable combination of these approaches may be used.

Thus, in certain embodiments, carbon dioxide is applied to the mix at 0 minutes, that is, carbon dioxide is present to the mix chamber when the first mix water is supplied, or supplying carbon dioxide to the mix chamber commences when the first mix water is applied, or both. In certain embodiments, carbon dioxide is applied at least 0, 1, 5, 10, 20, 30, 40, or 50 seconds, or 1, 2, 5, 10, 15, 20, 30, 40, 50, 60, 70, 80, or 90 minutes after mixing commences, and/or not more than 1, 2, 5, 10, 15, 20, 30, 40, 50, 60, 70, 80, 90, 120, 180, 240, or 300 minutes after mixing commences. The duration of carbon dioxide delivery can be less than or equal to 10, 8, 7, 6, 5, 4, 3, 2, or 1 minute, or less than or equal to 50, 40, or 30 seconds, and/or more than or equal to 5, 10, 20, 30, 40, or 50 seconds, or more than or equal to 1, 2, 3, 4, 5, 6, 7, or 8 minutes. In certain embodiments, the duration of carbon dioxide delivery is 5 seconds to 5 minutes. In certain embodiments, the duration of carbon dioxide delivery is 10 seconds to 4 minutes. In certain embodiments, the duration of carbon dioxide delivery is 20 seconds to 3 minutes. In certain embodiments, carbon dioxide delivery commences not more than 1 minute after mixing commences. For example, in the case of carbon dioxide supplied to a concrete mix in a ready mix truck, the mix components, including at least part of the mix water, may be added to the truck, and it may be desirable that carbon dioxide addition not commence until at least 2, 3 or 4 minutes or more after mixing has commenced. Such addition could occur, e.g., at a wash station, where the driver stops to wash the truck before commencing delivery; the truck is usually stopped at the wash station for at least 5-10 minutes, and an on-site carbon dioxide delivery system can be used to supply carbon dioxide to the drum of the truck during the wash station stop. Part or all of the dose of carbon dioxide can be delivered in this manner, for example by delivering carbon dioxide to the truck through the water line (though any suitable route may be used); in embodiments where a carbon dioxide source is attached to the truck there may be some mechanism to remind the driver to detach it before departing, such as an alarm. Alternatively, or additionally, the desirable time for addition of carbon dioxide to the mix may be later in the mix time, such as at a time that the truck is normally en route to the job site, or at the job site. In this case, a portable source of carbon dioxide may be attached to the truck, with suitable valving and tubing, so as to deliver one or more doses of carbon dioxide to the drum of the truck at a later time, such as at least 15, 30, or 60 minutes after mixing commences. A controller, which may be self-contained or may be remotely activated and which may send signals to a remote site regarding dosing and other information, may be included in the system so that dosing commences at a predetermined time after mixing commences and continues for a predetermined time, or continues until some predetermined characteristic or characteristics of the concrete mix is detected. Alternatively, the time and/or duration of dosing may be manually controlled, or subject to manual override. The carbon dioxide source can be as simple as a pressurized tank of gaseous carbon dioxide, which can be topped off periodically, for example when the truck returns to the batching site, to ensure a sufficient supply of carbon dioxide for any ensuing round of carbonation, e.g., without the need to ascertain carbon dioxide levels in the tank. In these embodiments, some or all of the carbonation may occur at the job site, for example, based on determination of one or more characteristics of the concrete.

The rate of delivery of the carbon dioxide may be any desired rate and the rate may be controlled. A slower rate of delivery may be desired, especially in wet mix operations such as ready mix operations, where the higher w/c ratio is known to slow carbonation compared to lower w/c operations, e.g., some precast operations. One example for controlling the rate of delivery is to divide the total dose of carbon dioxide into two or more smaller doses. Thus, the carbon dioxide may be delivered as a single dose, or as multiple doses, for example, as at least 2, 3, 4, 5, 6, 7, 8, 9, or 10 doses, and/or not more than 3, 4, 5, 6, 7, 8, 9, 10, 12, 15, or 20 doses; such as 2-10 doses, or 2-5 doses. Each dose may be equal in size to the others or different, and the interval between doses may be timed equally or not, as desired. The exact number and size of the doses may be predetermined, or it may be dictated by one or more characteristics of the mix that are monitored. The carbon dioxide may be in any suitable form, such as gas, or a gas/solid mix.

In addition or alternatively, for slower rates of delivery where the rate is controlled, gaseous carbon dioxide carbon dioxide may be delivered at a controlled, relatively slow rate. Thus, in some embodiments, the carbon dioxide is delivered at least in part as a gas at a controlled rate, where the rate may be not more than 5, 10, 20, 30, 40, 50, 60, 70, 80, 90, 100, 120, 150, 200, 300, 400, 500, 600, 700, or 800 SLPM (standard liters per minute), and or not less than 10, 20, 30, 40, 50, 60, 70, 80, 90, 100, 120, 150, 200, 300, 400, 500, 600, 700, 800, or 900 SLPM. For example, in a ready mix truck en route to a job site, the carbon dioxide may be delivered at a rate such that the full dose is delivered while the truck is in transit, e.g., by a portable dosing system as described above, over a period of many minutes or even an hour or more, such as at a rate of 100 to 600 SLPM, or even lower rates. The rate of delivery may be constant, or it may be varied according to a predetermined schedule, or as dictated by one or more characteristics of the concrete mix that are monitored. Either or both of divided doses and controlled rate dosing may be used, as desired or dictated by the particular mix and job requirements.

The methods and compositions of the invention allow for very high levels of efficiency of uptake of carbon dioxide into the mixing concrete, where the efficiency of uptake is the ratio of carbon dioxide that remains in the mixing concrete as stable reaction products to the total amount of carbon dioxide to which the mixing concrete is exposed. In certain embodiments, the efficiency of carbon dioxide uptake is at least 40, 50, 60, 70, 80, 90, 95, 96, 97, 98, 99, or 99%, or 40-100, 50-100, 60-100, 70-100, 80-100, 90-100, 40-99, 50-99, 60-99, 70-99, 80-99, or 90-99%.

In a wet cast operation, the addition of carbon dioxide, components of the cement mix, e.g., hydraulic cement mix, such as one or more admixtures, described more fully below, may be adjusted so that flowability of the final cement mix, e.g., hydraulic cement mix is within 10% of the flowability that would be achieved without the addition of carbon dioxide, In certain embodiments, the addition of carbon dioxide, components of the cement mix, e.g., hydraulic cement mix, such as one or more admixtures, described more fully below, are adjusted so that flowability of the final cement mix, e.g., hydraulic cement mix is within 50, 40, 30, 20, 15, 10, 8, 5, 4, 3, 2, or 1% of the flowability that would be achieved without the addition of carbon dioxide, or of a predetermined flowability. In certain embodiments, the addition of carbon dioxide, components of the cement mix, e.g., hydraulic cement mix, such as one or more admixtures, described more fully below, are adjusted so that flowability of the final cement mix, e.g., hydraulic cement mix is within 20% of the flowability that would be achieved without the addition of carbon dioxide, or a predetermined flowability. In certain embodiments, the addition of carbon dioxide, components of the cement mix, e.g., hydraulic cement mix, such as one or more admixtures, described more fully below, are adjusted so that flowability of the final cement mix, e.g., hydraulic cement mix is within 10% of the flowability that would be achieved without the addition of carbon dioxide, or a predetermined flowability. In certain embodiments, the addition of carbon dioxide, components of the cement mix, e.g., hydraulic cement mix, such as one or more admixtures, described more fully below, are adjusted so that flowability of the final cement mix, e.g., hydraulic cement mix is within 5% of the flowability that would be achieved without the addition of carbon dioxide, or a predetermined flowability. In certain embodiments, the addition of carbon dioxide, components of the cement mix, e.g., hydraulic cement mix, such as one or more admixtures, described more fully below, are adjusted so that flowability of the final cement mix, e.g., hydraulic cement mix is within 2% of the flowability that would be achieved without the addition of carbon dioxide, or a predetermined flowability. In certain embodiments, the addition of carbon dioxide, components of the cement mix, e.g., hydraulic cement mix, such as one or more admixtures, described more fully below, are adjusted so that flowability of the final cement mix, e.g., hydraulic cement mix is within 1-50%, or 1-20%, or 1-10%, or 1-5%, or 2-50%, or 2-20%, or 2-10%, or 2-5% of the flowability that would be achieved without the addition of carbon dioxide, or a predetermined flowability.

A. Admixtures

Admixtures are often used in cement mix, e.g., hydraulic cement mixes, such as concrete mixes, to impart desired properties to the mix. Admixtures are compositions added to a cement mix, e.g., hydraulic cement mix such as concrete to provide it with desirable characteristics that are not obtainable with basic cement mix, e.g., hydraulic cement mixes, such as concrete mixtures or to modify properties of the cement mix, e.g., hydraulic cement mix, i.e., concrete to make it more readily useable or more suitable for a particular purpose or for cost reduction. An admixture is any material or composition, other than the hydraulic cement, aggregate and water, that is used as a component of the cement mix, e.g., hydraulic cement mix, such as concrete or mortar to enhance some characteristic, or lower the cost, thereof. In some instances, the desired cement mix, e.g., hydraulic cement mix, e.g., concrete performance characteristics can only be achieved by the use of an admixture. In some cases, using an admixture allows for the use of less expensive construction methods or designs, the savings from which can more than offset the cost of the admixture.

In certain embodiments, the carbonated cement mix, e.g., hydraulic cement mixture, e.g., concrete, may exhibit enhanced characteristics when compared with the same mixture that was not exposed to carbon dioxide. This can depend on the type of cement used in the carbonated cement mix and/or the dose of carbon dioxide used and final carbonation achieved. In this sense, carbon dioxide can itself act as an admixture. For example, in certain embodiments, the carbonated cement mix, e.g., concrete mixture, has superior properties such as greater strength, such as greater 1-, 7-, or 28-day strength, e.g., at least 1, 2, 3, 4, 5, 7, 10, 15, 20, 30, or 40% greater strength than the non-carbonated concrete mixture at 1-, 7-, or 28-days. In general herein, "strength" refers to compressive strength, as that term is generally understood in the art. In certain embodiments, the carbonated cement mix, e.g. concrete, may exhibit accelerated set compared to non-carbonated mix, such as a faster time to initial set (for example, penetrometer measurement of 500 psi according to ASTM C403) or a faster time to final set (for example, penetrometer measurement of 4000 psi according to ASTM C403), or both, such as less than 95, 90, 85, 80, 75, 70, 65, 60, 55, 50, 40, 30, or 20% of the initial or final set time compared to uncarbonated mix. Carbonated cement mix, e.g., hydraulic cement mixes may also provide final concrete mixtures that have lower water absorption as compared to non-carbonated, such as at least 1, 2, 3, 4, 5, 7, 10, 15, 20, 30, or 40% lower water absorption. The carbonated cement mix, e.g., hydraulic cement mix, i.e., concrete, may also produce a final product that is lower in density but of comparable strength compared to non-carbonated, such as at least 1, 2, 3, 4, 5, 7, 10, 15, 20, 30, or 40% lower density with a compressive strength within 1, 2, 3, 4, 5, 7, 10, 15, or 20% of the non-carbonated, e.g., at least 5% lower density with a compressive strength within 2%.

However, depending on the mix design, the carbonated cement mix, e.g., hydraulic cement mixture, i.e., concrete, may alternatively or in addition, exhibit properties that it is desired to modulate, such as by the addition of an admixture. For example, carbonated cement mix, e.g., hydraulic cement mix for use in a wet cast operation may have workability/flow characteristics that are not optimum for a wet cast operation without addition of an admixture or other manipulation of the mix, e.g., addition of extra water. As another example, carbonated mixes may have strength characteristics, e.g., compressive strength at one or more time points, that are not optimum without addition of an admixture or other manipulation of the mix. In some cases, the mix design will already call for an admixture, whose effect on the properties of the mix may be affected by the carbonation, requiring coordination of the timing of the admixture in relation to the carbon dioxide addition, or other manipulation. In addition, an admixture may be used to modulate one or more aspects of the carbonation itself, for example, to increase the rate of uptake of the carbon dioxide.

Concrete may be used in wet cast operations, such as in certain precast operations or in ready mix trucks that transport the concrete to a job site where it is used, e.g., poured into molds or otherwise used at the site, or in dry cast operations, which are precast operations. In the case of a wet cast operation, the flowability of the concrete should be maintained at a level compatible with its use in the operation, e.g., in the case of a ready mix truck, at the job site; whereas for a dry cast operation concrete that does not flow (zero slump) is desirable. In both dry cast and wet cast operations, strength, e.g., compressive strength, is important, both in the short term so that the concrete can be allowed to stand alone, e.g., molds can be removed, cast objects can be manipulated, etc., in the shortest possible time, and also in the long term so that a required final strength is reached. Flowability of a mix may be evaluated by measuring slump; strength may be evaluated by one or more strength tests, such as compressive strength. Other properties that may be affected by carbonation; in some cases the effect is a positive one, but if the effect is a negative one, corrected through the use of one or more admixtures. Such properties include shrinkage and water absorption.

In certain cases carbonation of the cement mix, e.g., hydraulic cement mix may affect flowability of a cement mix, e.g., hydraulic cement mix, i.e., a concrete mix, to be used in a wet cast operation, such as in a ready mix truck transporting the mix to a job site. Thus in certain embodiments in which a carbonated mix is produced (such as for use with a readymix truck), one or more admixtures may be added to modulate the flowability of the carbonated mixture, either before, during, or after carbonation, or any combination thereof, such that it is within a certain percentage of the flowability of the same mixture without carbonation, or of a certain predetermined flowability. The addition of carbon dioxide, components of the mix, e.g., concrete mix, and/or additional components such as one or more admixtures, may be adjusted so that flowability of the final mix is within 50, 40, 30, 20, 10, 8, 5, 4, 3, 2, 1, 0.5, or 0.1% of the flowability that would be achieved without the addition of carbon dioxide, or of a certain predetermined flowability. In certain embodiments, the addition of carbon dioxide, components of the mix, and/or additional components such as one or more admixtures, may be adjusted so that flowability of the final mix is within 20% of the flowability that would be achieved without the addition of carbon dioxide, or within 20% of a predetermined desired flowability. In certain embodiments, the addition of carbon dioxide, components of the mix, and/or additional components such as one or more admixtures, may be adjusted so that flowability of the final mix is within 10% of the flowability that would be achieved without the addition of carbon dioxide, or within 10% of a predetermined desired flowability. In certain embodiments, the addition of carbon dioxide, components of the mix, and/or additional components such as one or more admixtures, may be adjusted so that flowability of the final mix is within 5% of the flowability that would be achieved without the addition of carbon dioxide, or within 5% of a predetermined desired flowability. In certain embodiments, the addition of carbon dioxide, components of the mix, and/or additional components such as one or more admixtures, may be adjusted so that flowability of the final mix is within 2% of the flowability that would be achieved without the addition of carbon dioxide, or within 2% of a predetermined desired flowability. Any suitable measurement method for determining flowability may be used, such as the well-known slump test. Any suitable admixture may be used, as described herein, such as carbohydrates or carbohydrate derivatives, e.g., fructose, sucrose, glucose, sodium glucoheptonate, or sodium gluconate, such as sodium glucoheptonate or sodium gluconate.

In certain embodiments, one or more admixtures may be added to modulate the mix so that a desired strength, either early strength, late strength, or both, may be achieved. Strength of the carbonated cement mix can be dependent on mix design, thus, although with some mix designs carbonation may increase strength at one or more time points, in other mix designs carbonation may decrease strength at one or more time points. See Examples for various mix designs in which carbonation increased or decreased strength at one or more time points. In some cases, carbonation decreases strength at one or more time points and it is desired to return the strength at the time point to within a certain acceptable limit. In certain cases, one or more admixtures is added to increase strength beyond that seen in non-carbonated concrete of the same density. This may be done, e.g., to produce a lightweight concrete with strength comparable to the denser, non-carbonated concrete. In other cases, one or more admixtures added to a carbonated cement itself causes or exacerbates strength loss, and it is desired to recover the loss. Thus, in certain embodiments an admixture is added to the carbonated mix, either before, during, or after carbonation, or a combination thereof, under conditions such that the carbonated mix exhibits strength, e.g., 1-, 7-, 28 and/or 56-day compressive strength, within a desired percentage of the strength of the same mix without carbonation, or of a predetermined strength, e.g., within 50, 40, 30, 20, 15, 12, 10, 9, 8, 7, 6, 5, 4, 3, 2, 1, 0.5, or 0.1%. In certain embodiments, the addition of carbon dioxide, components of the mix, and/or additional components such as one or more admixtures, may be adjusted so that strength at a given time point of the final mix is within 20% of the strength that would be achieved without the addition of carbon dioxide, or within 20% of a predetermined desired strength. In certain embodiments, the addition of carbon dioxide, components of the mix, and/or additional components such as one or more admixtures, may be adjusted so that strength at a given time point of the final mix is within 10% of the strength that would be achieved without the addition of carbon dioxide, or within 10% of a predetermined desired strength. In certain embodiments, the addition of carbon dioxide, components of the mix, and/or additional components such as one or more admixtures, may be adjusted so that strength at a given time point of the final mix is within 5% of the strength that would be achieved without the addition of carbon dioxide, or within 5% of a predetermined desired strength. In certain embodiments, the addition of carbon dioxide, components of the mix, and/or additional components such as one or more admixtures, may be adjusted so that strength at a given time point of the final mix is within 2% of the strength that would be achieved without the addition of carbon dioxide, or within 2% of a predetermined desired strength. In certain embodiments the strength is a compressive strength. Any suitable method to test strength, such as flexural or compressive strength, may be used so long as the same test is used for samples with and without carbonation. Any suitable admixtures to achieve the desired strengths may be used, such as the admixtures described herein.

Other properties, such as water absorption, shrinkage, chloride permeability, and the like, may also be tested and adjusted in a similar manner, and to similar percentages, as for flowability and/or shrinkage.

It will be appreciated that more than one admixture may be used, for example, 2, 3, 4, 5, or more than 5 admixtures. For example, certain admixtures have desirable effects on flowability but undesirable effects on strength development; when such an admixture is used, a second admixture that accelerates strength development may also be used.

Any suitable admixture that has the desired effect on the property or properties of the carbonated cement that it is desired to modified may be used. TABLE 1 lists exemplary classes and examples of admixtures that can be used, e.g., to modulate the effects of carbonation.

TABLE 1

Admixtures for use with carbonated cement

| Chemical Class | Sub Class | Cement Application | Examples |
|---|---|---|---|
| Saccharides | Sugars | Retarder | Fructose, glucose, sucrose |
| | Sugar Acids/bases | Retarder | Sodium Gluconate, sodium glucoheptonate |
| Organic Polymers | Polycarboxylic Ethers | Plasticizer | Many commercial brands |
| | Sulfonated Napthalene Formaldehyde | Plasticizer | Many commercial brands |
| | Sulphonated Melamine formaldehyde | Plasticizer | Many commercial brands |
| | Ligno sulphonates | Plasticizer | Many commercial brands |
| Inorganic Salts | Alkaline Earth Metal Containing | Accelerant | $Ca(NO_3)_2$, $Mg(OH)_2$ |
| | Alkali Metal Containing | Accelerant | NaCl, KOH |
| | Carbonate containing | — | $NaHCO_3$, $Na_2CO_3$ |
| Alkanolamines | Tertiary alkanolamines | Accelerants/Grinding aids | Triethanolamine, Triisopropylamine |
| Phosphonates | — | Retarders | Nitrilotri(methylphosphonic acid), 2-phosphonobutane-1,2,4-tricarboxylic acid |
| Surfactants | Vinsol Resins, synthetic surfactants | Air Entraining Agents | Many commercial brands |
| Chelating Agents | Various Chemistries | Retarders | EDTA, Citric Acid, nitrilotriacetic acid |

In certain embodiments, one or admixtures is added to a cement mix, e.g., hydraulic cement mix, before, during, or after carbonation of the mix, or a combination thereof, where the admixture is a set retarder, plasticizer, accelerant, or air entraining agent. Where it is desired to modulate flowability, set retarders and plasticizers are useful. Where it is desired to modulate strength development, accelerants are useful. If it is desired to increase the rate of carbon dioxide uptake, certain air entraining agents may be useful.

Set retarders include carbohydrates, i.e., saccharides, such as sugars, e.g., fructose, glucose, and sucrose, and sugar acids/bases and their salts, such as sodium gluconate and sodium glucoheptonate; phosphonates, such as nitrilotri (methylphosphonic acid), 2-phosphonobutane-1,2,4-tricarboxylic acid; and chelating agents, such as EDTA, Citric Acid, and nitrilotriacetic acid. Other saccharides and saccharide-containing admixes include molasses and corn syrup. In certain embodiments, the admixture is sodium gluconate. Other exemplary admixtures that can be of use as set retarders include sodium sulfate, citric acid, BASF Pozzolith XR, firmed silica, colloidal silica, hydroxyethyl cellulose, hydroxypropyl cellulose, fly ash (as defined in ASTM C618), mineral oils (such as light naphthenic), hectorite clay, polyoxyalkylenes, natural gums, or mixtures thereof, polycarboxylate superplasticizers, naphthalene HRWR (high range water reducer). Additional set retarders that can be used include, but are not limited to an oxy-boron compound, lignin, a polyphosphonic acid, a carboxylic acid, a hydroxycarboxylic acid, polycarboxylic acid, hydroxylated carboxylic acid, such as fumaric, itaconic, malonic, borax, gluconic, and tartaric acid, lignosulfonates, ascorbic acid, isoascorbic acid, sulphonic acid-acrylic acid copolymer, and their corresponding salts, polyhydroxysilane, polyacrylamide. Illustrative examples of retarders are set forth in U.S. Pat. Nos. 5,427,617 and 5,203,919, incorporated herein by reference.

Accelerants include calcium-containing compounds, such as CaO, $Ca(NO_2)_2$, $Ca(OH)_2$, calcium stearate, or $CaCl_2$, and magnesium-containing compounds, such as magnesium hydroxide, magnesium oxide, magnesium chloride, or magnesium nitrate. Without being bound by theory, it is thought that, in the case of carbonated cement, the added calcium or magnesium compound may provide free calcium or magnesium to react with the carbon dioxide, providing a sink for the carbon dioxide that spares the calcium in the cement mix, or providing a different site of carbonation than that of the cement calcium, or both, thus preserving early strength development. In certain embodiments, CaO (lime) may be added to the mix, or a high-free lime cement may be the preferred cement for the mix. For example, in certain embodiments, the free lime (CaO) content of the cement used in a particular cement mixture, such as mortar or concrete, may be increased by the addition of CaO to the mixture, generally before the mixture is exposed to carbon dioxide, such as by addition of 0.01-50%, or 0.01-10%, or 0.01-5%, or 0.01-3%, or 0.01-2%, or 0.01-1% CaO, or 0.1-50%, or 0.1-10%, or 0.1-5%, or 0.1-3%, or 0.1-2%, or 0.1-1%, or 0.2-50%, or 0.2-10%, or 0.2-5%, or 0.2-3%, or 0.2-2% CaO, or 0.2-1%, or 0.5-50%, or 0.5-10%, or 0.5-5%, or 0.5-3%, or 0.5-2% CaO, or 0.5-1% CaO bwc. Alternatively, CaO may be added so that the overall CaO content of the cement mixture reaches a desired level, such as 0.5-10%, or 0.5-5%, or 0.5-3%, or 0.5-2%, or 0.5-1.5%, or at least 0.5, 0.6, 0.7, 0.8, 0.9, 1.0, 1.1, 1.2, 1.3, 1.4, 1.5, 1.6, 1.7, 1.8, 1.9, 2.0, 2.2, 2.5, 3.0, 4.0, 5.0, 6.0, 7.0, 8.0, 9.0, 10%, 20%, 30%, 40%, or 50% CaO bwc. The added CaO will generally also increase the rate of uptake of carbon dioxide by the mix during mixing, thus allowing a greater carbon dioxide uptake for a given time of exposure, or a lower time of exposure to achieve a given level of uptake. Other set accelerators include, but are not limited to, a nitrate salt of an alkali metal, alkaline earth metal, or aluminum; a nitrite salt of an alkali metal, alkaline earth metal, or aluminum; a thiocyanate of an alkali metal, alkaline earth metal or aluminum; an alkanolamine; a thiosulfate of an alkali metal, alkaline earth metal, or aluminum; a hydroxide of an alkali metal, alkaline earth metal, or aluminum; a carboxylic acid salt of an alkali metal, alkaline earth metal, or aluminum (preferably calcium formate); a polyhydroxylalkylamine; a halide salt of an alkali metal or alkaline earth metal (e.g., chloride).

The admixture or admixtures may be added to any suitable final percentage (bwc), such as in the range of 0.01-0.5%, or 0.01-0.3%, or 0.01-0.2%, or 0.01-0.1%, or 0.01-1.0%, or 0.01-0.05%, or 0.05% to 5%, or 0.05% to 1%, or 0.05% to 0.5%, or 0.1% to 1%, or 0.1% to 0.8%, or 0.1% to 0.7% per weight of cement. The admixture may be added to a final percentage of greater than 0.01, 0.02, 0.03, 0.04, 0.05, 0.06, 0.07, 0.08, 0.09, 0.1, 0.15, 0.2, 0.3, 0.4, or 0.5%; in certain cases also less than 5, 4, 3, 2, 1, 0.9, 0.8, 0.7, 0.6, 0.5, 0.4, 0.3, 0.2, 0.1, 0.09, 0.08, 0.07, 0.06, 0.05, 0.04, 0.03, or 0.02%.

It has been observed that the timing of addition of a given admixture relative to carbonation of a cement mix, e.g., hydraulic cement mix may alter the effects of the admixture on the properties of the cement mix, e.g., hydraulic cement mix, e.g., effects on flowability or strength. For example, in certain mix designs, the addition of sodium gluconate after carbonation restores flowability to desired levels, but may adversely affect early strength development; whereas the addition of sodium gluconate before carbonation maintains early strength development but does not optimally restore flowability. As another example, in mix designs in which an air entrainer is desired, it has been found that if the air entrainer is added before carbonation, the density of the mix is increased compared to if the air entrainer is added after carbonation. The admixture or admixtures thus may be added before, during, or after carbonation of the cement mix, e.g., hydraulic cement mix, or any combination thereof. For example, in certain embodiments, the admixture is added after carbonation; in other embodiments, the admixture is added before carbonation; in yet other embodiments, the admixture is added in two split doses, one before carbonation and one during and/or after carbonation. It will be apparent that if more than one admixture is used, one may be added at one time while another is added at another time, for example, in a mix where an air entrainer is used and sodium gluconate is also added to affect flowability, the sodium gluconate may be added in split doses, one before carbonation and one during/after carbonation, and the air entrainer may be added after carbonation. The latter is exemplary only, and any suitable combination of admixtures and timing to achieve the desired effect or effects may be used.

It has been observed that the effects of carbonation and of admixtures on carbonated cement mix, e.g., hydraulic cement mixes is highly mix-specific. In some cases carbonation actually improves the properties of a mix, especially in dry cast situations where flowability is not an issue, and no admixture is required. In other cases, especially in wet cast situations where flowability is an issue, one or more admixtures may be required to restore one or more properties of the mix. Whether or not admixture is added, and/or how much is added, to a given batch may be determined by pre-testing the mix to determine the properties of the carbonated mix and the effects of a given admixture. In some cases the admixture and/or amount may be predicted based on previous tests, or on properties of the cement used in the mix, or on theoretical considerations. It has been found that different cements have different properties upon carbonation, and also react differently to a given admixture, and the invention includes the use of a library of data on various cement types and admixtures so as to predict a desired admixture/amount for a mix design, which may be a mix that is the same as or similar to a mix in the library, or a new mix whose properties can be predicted from the library. In addition, for a given batch, rheology (flowability) may be monitored during the carbonation of the batch and the exact timing and/or amount of admixture added to that particular batch, or to subsequent batches, may be adjusted based on the feedback obtained. A combination of predicted value for admixture type, timing, and/or amount, and modification of the value based on real-time measurements in a given batch or batches may be used.

In certain embodiments, an admixture comprising a carbohydrate or carbohydrate derivative is added to a cement mix, e.g., hydraulic cement mix before, during, and/or after carbonation of the mix, or a combination thereof. In certain embodiments, the admixture is added after carbonation of the cement mix, e.g., hydraulic cement mix, or during and after carbonation. The carbonation may be accomplished as described herein, for example, by delivering carbon dioxide to the surface of the cement mix, e.g., hydraulic cement mix during mixing. The carbohydrate or derivative may be any carbohydrate as described herein, for example sucrose, fructose, sodium glucoheptonate, or sodium gluconate. In certain embodiments, the carbohydrate is sodium gluconate. The carbohydrate or derivative, e.g., sodium gluconate may be used at a suitable concentration; in some cases, the concentration is greater than 0.01%, 0.015%, 0.02%, 0.025%, 0.03%, 0.035%, 0.04%, 0.05%, 0.06%, 0.07%, 0.08%, 0.09%, 0.1%, 0.15%, 0.2%, 0.3%, 0.4%, or 0.5% bwc. The concentration may also be less than 2, 1.5, 1, 0.9, 0.8, 0.7, 0.6, 0.5, 0.4, 0.3, 0.2, or 0.1%. For example, in certain embodiments, sodium gluconate is used as an admixture at a dose of between 0.01 and 1% bwc, or between 0.01 and 0.8%, or between 0.01 and 0.5%, or between 0.01 and 0.4% bwc, or between 0.01 and 0.3%, or between 0.01 and 0.2% bwc, or between 0.01 and 0.1%, or between 0.01 and 0.05%, or between 0.03 and 1% bwc, or between 0.03 and 0.8%, or between 0.03 and 0.5%, or between 0.03 and 0.4% bwc, or between 0.03 and 0.3%, or between 0.03 and 0.2% bwc, or between 0.03 and 0.1%, or between 0.03 and 0.08%, or between 0.05 and 1% bwc, or between 0.05 and 0.8%, or between 0.05 and 0.5%, or between 0.05 and 0.4% bwc, or between 0.05 and 0.3%, or between 0.05 and 0.2% bwc, or between 0.05 and 0.1%, or between 0.05 and 0.08%, or between 0.1 and 1% bwc, or between 0.1 and 0.8%, or between 0.1 and 0.5%, or between 0.1 and 0.4% bwc, or between 0.1 and 0.3%, or between 0.1 and 0.2% bwc. The sodium gluconate may be added before, during, or after carbonation of the mix, or any combination thereof, and may be added as one, two, three, four, or more than four divided doses. The carbohydrate or derivative may be added in two or more doses, such as one dose before carbonation and one dose during and/or after carbonation. In certain embodiments, calcium stearate is used as an admixture.

In certain embodiments, a second admixture is also used, such as any of the admixtures described herein. In certain embodiments, the second admixture is a strength accelerator. In certain embodiments, a third admixture is also used, such as any of the admixtures described herein. In certain embodiments, a fourth admixture is also used, such as any of the admixtures described herein.

In certain embodiments, an admixture is used that modulates the formation of calcium carbonate so that one or more polymorphic forms is favored compared to the mixture without the admixture, e.g., modulates the formation of amorphous calcium carbonate, e.g., aragonite, or calcite. Exemplary admixtures of this type include organic polymers such as polyacrylate and pol ycarboxylate ether, phosphate esters such as hydroxyarnino phosphate ester, phosphonate and phosphonic acids such as nitrilotri(methylphosphonic acid), 2-phosphonobutane-1,2,4-tricarboxylic acid, chelators, such as sodium gluconate, ethylenediaminetetraacetic acid (EDTA), and citric acid, or surfactants, such as calcium stearate.

Other admixtures useful in methods and compositions of the invention are described in U.S. Pat. No. 7,735,274, hereby incorporated by reference herein in its entirety.

B. Supplementary Cementitious Materials and Cement Replacements

In certain embodiments, one or more supplementary cementitious materials (SCMs) and/or cement replacements are added to the mix at the appropriate stage for the particular SCM or cement replacement. In certain embodiments, an SCM is used. Any suitable SCM or cement replacement may be used; exemplary SCMs include blast furnace slag, fly ash, silica fume, natural pozzolans (such as metakaolin, calcined shale, calcined clay, volcanic glass, zeolitic trass or tuffs, rice husk ash, diatomaceous earth, and calcined shale), and waste glass. Further cement replacements include interground limestone, recycled/waste plastic, scrap tires, municipal solid waste ash, wood ash, cement kiln dust, foundry sand, and the like. In certain embodiments, an SCM and/or cement replacement is added to the mix in an amount to provide 0.1-50%, or 1-50%, or 5-50%, or 10-50%, or 20-50%, or 1-40%, or 5-40%, or 10-50%, or 20-40% bwc. In certain embodiments, an SCM is used and the SCM is fly ash, slag, silica fume, or a natural pozzolan. In certain embodiment, the SCM is fly ash. In certain embodiments, the SCM is slag.

It is well-known that addition of an SCM such as fly ash or slag to a cement mix, e.g., concrete mix, can retard early strength development; indeed, when weather becomes cold enough, the use of SCM in mixes is curtailed because the early strength development is sufficiently retarded as to make the use of the mix problematic. In addition, the maximum amount of SCM that may be added to a mix can be limited by its effect on early strength development. The present inventors have found that even very low doses of carbon dioxide, when added to a concrete mix containing SCM, can accelerate early strength development and thus could allow such mixes to be used under circumstances where they otherwise might not be used, e.g., in cold weather, or in greater amounts, thus extending the usefulness of such mixes, such as extending the useful season for such mixes, or increasing the proportion of SCM in a given mix, or both.

In certain embodiments the invention provides methods and compositions for the expanding the range of conditions under which an SCM may be used in a concrete mix by carbonating the mix. The range of conditions may include the temperature at which the SCM-containing mix may be used, or the amount of SCM that may be added while maintaining adequate early strength development, or the early strength for a given amount of SCM in a mix.

In certain embodiments, the invention provides a method for decreasing the minimum temperature at which an SCM-concrete mix may be used, thus increasing the overall acceptable temperature range for the SCM-concrete mix, by exposing the SCM-concrete mix to a dose of carbon dioxide sufficient to modulate, e.g., accelerate, early strength development and/or set of the mix to a level at which the mix may be used at a temperature below that at which it could have been used without the carbon dioxide exposure. The dose can be such that the early strength development of the mix allows its use in a desired manner at a temperature that is at least 1, 2, 3, 4, 5, 6, 8, 9, or 10° C. below the temperature at which it could be used without the carbon dioxide treatment and/or not more than 2, 3, 4, 5, 6, 8, 9, 10, or 12° C. below the temperature at which it could be used without the carbon dioxide treatment. The dose of carbon dioxide added to the mix to achieve the desired increase in early strength development can be not more than 2.0, 1.5, 1.2, 1.0, 0.9, 0.8, 0.7, 0.6, 0.5, 0.4, 0.3, 0.2, 0.1, or 0.05% carbon dioxide bwc. The dose can be such that the early strength development of the mix, e.g., the strength at 8, 12, 16, 20, or 24 hours, or any other suitable time point for early strength development, is, on average, at least 1, 2, 5, 7, 10, 12, 15, 20, or 25% greater than the strength without the carbon dioxide dose, and is sufficient for the use for which the mix is intended. In certain embodiments, an alternative or additional marker other than early strength development, such as a value from calorimetry as described elsewhere herein, may be used instead of or in addition to early strength measurements, for example, to determine the desired or optimal dose of carbon dioxide and/or dosing conditions. The carbon dioxide may be delivered as a single dose or multiple doses, and at any suitable rate or in any suitable form, as described elsewhere herein. The SCM can be any suitable SCM. In certain embodiments, the SCM is fly ash. In certain embodiments, the SCM is slag. In certain embodiments, the SCM-concrete mix is delivered to a job site in a ready mix truck, and the carbon dioxide is applied to the mix at the batching site, en route to the job site, or at the job site, or any combination thereof. In certain embodiments, the carbon dioxide is gaseous carbon dioxide. In certain embodiments, the carbon dioxide is dissolved in mix water. In certain embodiments, the carbon dioxide is solid carbon dioxide. In certain embodiments, a combination of gaseous carbon dioxide and carbon dioxide dissolved in mix water is used.

In certain embodiments, the invention provides a method for increasing the maximum amount (proportion) of SCM that may be used in an SCM-concrete mix, thus increasing the overall acceptable range of amounts (proportions) of SCM for the SCM-concrete mix, by exposing an SCM-concrete mix that contains a proportion of SCM that would normally be higher than the acceptable proportion due to effects on early strength development, to a dose of carbon dioxide sufficient to modulate, e.g., accelerate, early strength development of the mix to a level at which the mix may be used for its normal purposes. In certain embodiments, the maximum acceptable proportion of SCM in the mix is increased by carbonation by at least 0.5, 1, 1.5, 2, 2.5, 3, 3.5, 4, 5, 6, 7, 8, 9, 10, 11, 12, 13, 14, 15, 16, 17, 18, 19, or 20% bwc and/or not more than 1, 1.5, 2, 2.5, 3, 3.5, 4, 5, 6, 7, 8, 9, 10, 11, 12, 13, 14, 15, 16, 17, 18, 19, 20, or 25% bwc, over the maximum acceptable proportion of SCM without carbonation. The dose of carbon dioxide to the mix can be not more than 2.0, 1.5, 1.2, 1.0, 0.9, 0.8, 0.7, 0.6, 0.5, 0.4, 0.3, 0.2, 0.1, or 0.05% carbon dioxide bwc, and/or not less than 2.5, 2.0, 1.5, 1.2, 1.0, 0.9, 0.8, 0.7, 0.6, 0.5, 0.4, 0.3, 0.2, or 0.1% carbon dioxide bwc. The SCM can comprises at least 1, 2, 3, 4, 5, 6, 7, 8, 9, 10, 12, 15, 20, or 30% of the mix, and/or not less than 2, 3, 4, 5, 6, 7, 8, 9, 10, 12, 15, 20, 30, 40, or 50% of the mix. The dose can be such that the early strength development of the mix, e.g., the strength at 8, 12, 16, 20, or 24 hours, or any other suitable time point for early strength development, is, on average, at least 1, 2, 5, 7, 10, 12, 15, 20, or 25% greater than the strength without the carbon dioxide dose. In certain embodiments, an alternative or additional marker other than early strength development, such as a value from calorimetry as described elsewhere herein, may be used instead of or in addition to early strength measurements, for example, to determine the desired or optimal dose of carbon dioxide and/or dosing conditions. The carbon dioxide may be delivered as a single dose or multiple doses, and at any suitable rate or in any suitable form, as described elsewhere herein. The SCM can be any suitable SCM. In certain embodiments, the SCM is fly ash. In certain embodiments, the SCM is slag. In certain embodiments, the SCM-concrete mix is delivered to a job site in a ready mix truck, and the carbon dioxide is applied to the mix at the batching site, en route to the job site, or at the job site, or any combination thereof. In certain embodiments, the carbon dioxide is gaseous carbon dioxide. In certain embodiments, the carbon dioxide is dissolved in mix water. In certain embodiments, the carbon dioxide is solid carbon dioxide. In certain embodiments, a combination of gaseous carbon dioxide and carbon dioxide dissolved in mix water is used.

In certain embodiments, the invention provides a method for accelerating the early strength development of an SCM-concrete mix, thus accelerating aspects of a job in which the SCM-concrete mix is used that require a certain strength before a next step may be taken (such as removing molds, adding a level of concrete, and the like), by exposing the SCM-concrete mix to a dose of carbon dioxide sufficient to modulate, e.g., accelerate, early strength development of the mix to a level at which the aspect of the job may be accelerated. The dose of carbon dioxide to the mix can be not more than 2.0, 1.5, 1.2, 1.0, 0.9, 0.8, 0.7, 0.6, 0.5, 0.4, 0.3, 0.2, 0.1, or 0.05% carbon dioxide bwc, and/or not less than 2.5, 2.0, 1.5, 1.2, 1.0, 0.9, 0.8, 0.7, 0.6, 0.5, 0.4, 0.3, 0.2, or 0.1% carbon dioxide bwc. The dose can be such that the early strength development of the mix, e.g., the strength at 8, 12, 16, 20, or 24 hours, or any other suitable time point for early strength development, is, on average, at least 1, 2, 5, 7, 10, 12, 15, 20, 25, 30, 35, or 40% greater than the strength without the carbon dioxide dose. The SCM can comprises at least 1, 2, 3, 4, 5, 6, 7, 8, 9, 10, 12, 15, 20, or 30% of the mix, and/or not less than 2, 3, 4, 5, 6, 7, 8, 9, 10, 12, 15, 20, 30, 40, or 50% of the mix. In certain embodiments, an alternative or additional marker than early strength development, such as a value from calorimetry as described elsewhere herein, may be used instead of or in addition to early strength measurements, for example, to determine the desired or optimal dose of carbon dioxide and/or dosing conditions. The carbon dioxide may be delivered as a single dose or multiple doses, and at any suitable rate or in any suitable form, as described elsewhere herein. The SCM can be any suitable SCM. In certain embodiments, the SCM is fly ash. In certain embodiments, the SCM is slag. In certain embodiments, the SCM-concrete mix is delivered to a job site in a ready mix truck, and the carbon dioxide is applied to the mix at the batching site, en route to the job site, or at the job site, or any combination thereof. In certain embodiments, the carbon dioxide is gaseous carbon dioxide. In certain embodiments, the carbon dioxide is dissolved in mix water. In certain embodiments, the carbon dioxide is solid carbon dioxide. In certain embodiments, a combination of gaseous carbon dioxide and carbon dioxide dissolved in mix water is used.

C. Control Mechanisms

The methods and apparatus described herein may include one or more control mechanisms, e.g., automatic control mechanisms, to modulate one or more aspects of the mix and carbonation operation, such as to modulate the contact of the cement mix, e.g., hydraulic cement mix with carbon dioxide and/or other components, such as one or more admixtures or water, as well as other aspects of the operation of the mixer, such as worker safety requirements, cooling of the cement mix, e.g., hydraulic cement mix, and the like. It will be appreciated that modulation may be achieved by human operators who control the necessary valves and the like to achieve a desired carbon dioxide exposure and/or other characteristic of the carbonated cement mix, but in general automatic control mechanisms are employed. The control may be based on any suitable parameter, such as feedback regarding one or more characteristics of the mix operation, timing, which may be a predetermined timing, or a combination thereof.

Control systems and mechanisms can apply to a stationary mixer in a precast concrete plant or other central mixing facility. Alternatively, it can apply to a ready mix concrete truck that facilitates mixing through rotation of its drum. The mix operation can be a dry cast or wet cast operation; for example, the ready mix concrete truck will be a wet cast, while precast may be wet cast or dry cast.

A simple form of control is based on timing alone. Thus, in certain embodiments, the methods include modulating the flow of carbon dioxide to the cement mix, e.g., hydraulic cement mix according to a certain timing. The timing may be controlled by a controller that is connected to a cement mix, e.g., hydraulic cement mix apparatus and that senses when the apparatus has begun or stopped a stage of operation, and that modulates carbon dioxide flow accordingly, e.g., starts or stops flow. Thus in certain embodiments, carbon dioxide flow is begun when one or more components of a cement mix, e.g., hydraulic cement mix have been deposited in a mixer, continues for a certain predetermined time at a certain predetermined flow rate, then stops. The stage of operation of the cement mix, e.g., hydraulic cement mix apparatus may be determined by the programming of the controller or of another controller to which the controller is operably connected, or it may be determined by one or more sensors which monitor positions of components of the apparatus, flow, and the like, or a combination thereof.

Typically, however, control systems and mechanisms of the invention include feedback mechanisms where one or more characteristics of the cement mix, e.g., hydraulic cement mixture and/or apparatus or its environment is monitored by one or more sensors, which transmit the information to a controller which determines whether one or more parameters of the mix operation requires modulation and, if so, sends the appropriate output to one or more actuators to carry out the required modulation. The controller may learn from the conditions of one batch to adjust programming for subsequent batches of similar or the same mix characteristics to optimize efficiency and desired characteristics of the mix.

In order to achieve a desired efficiency of carbon dioxide uptake in the cement mix, e.g., hydraulic cement mix, to ensure desired characteristics such as flow characteristics, strength, and appearance, and/or to ensure worker safety, various aspects of the mix operation, the mixer, the cement mix, e.g., hydraulic cement mix, and the environment of the mixer may be monitored, the information from the monitoring processed, and adjustments made in one or more aspects of the mix operation in order to achieve the desired result. Thus, in certain embodiments, one or more sensors may be used to provide input to a controller as to various conditions related to the desired characteristics; the controller processes the inputs and compares them to predetermined parameters of operation and, if corrections in the process are necessary, the controller then sends output to one or more actuators in order to bring the system back toward the desired condition.

In particular embodiments, the invention provides control systems for controlling the carbonation of a cement mix, e.g., hydraulic cement mix in a mixer by use of one or more sensors monitoring one or more of weight of the cement used in the mix, carbon dioxide concentration of the atmosphere inside and/or outside the mixer, temperature of the cement mix, e.g., hydraulic cement mix or a component in contact with the cement mix, e.g., hydraulic cement mix, rheology of the mix, and/or moisture content of the mix, where the one or more sensors send input to a controller which processes the information received from the one or more sensors by comparing the input to one or more predetermined parameters and, if necessary, sends output to one or more actuators to adjust carbon dioxide flow rate, water addition, or admixture addition, or to perform other functions such as to sound an alarm if carbon dioxide levels exceed safe levels. In addition, certain operations, such as cooling of the cement mix, e.g., hydraulic cement mix, may be performed after the mixing is complete. The controller can learn from one batch to adjust conditions for a subsequent batch of the same or similar composition. Further levels of control may be used, such as a central controller that receives information from a plurality of mix operations in a plurality of locations regarding one or more aspects of each operation, and processes the information received from all mix operations to improve performance at the various operations; thus, large amounts of information can be used to improve performance at a variety of sites.

In the mixing operation, components of the cement mix, e.g., hydraulic cement mix, e.g., cement, aggregate, and water, are added to the mixer, and mixing commences. In some cases some components, such as aggregate, may have a sufficient water content, e.g., from exposure to wet weather conditions, that additional water is not added before mixing commences. In some cases, as described elsewhere herein, water or other components may be added in a staged manner. At some point before, during, or after the process of addition of components or mixing, carbon dioxide flow is initiated from a source of carbon dioxide to the mixer. In some cases, part or all of the carbon dioxide will be included in the mix water. In some cases, the carbon dioxide flow will be gaseous; in other cases, the carbon dioxide flow comprises a mixture of gaseous and solid carbon dioxide. Additional components, such as admixtures, may be added to the cement mix, e.g., hydraulic cement mix as well at any point in the operation. The carbon dioxide is subsumed into the mixing cement mix, e.g., hydraulic cement mix and begins reaction with the mix components; any carbon dioxide that is not taken up by the cement mix, e.g., hydraulic cement mix fills the head space of the mix container. Since typical mixers are not airtight, if the rate of carbon dioxide flow to the mixer exceeds the rate of uptake into the cement mix, e.g., hydraulic cement mix, at some point the head space in the mixer will be full of carbon dioxide and excess carbon dioxide will exit the mixer from one or more leak points. Thus, the carbon dioxide content of the atmosphere inside the mixer or, more preferably, outside the mixer, e.g., at one or more leak points, may be monitored to provide an indication that the rate of carbon dioxide addition is exceeding the rate of carbon dioxide uptake. In addition, carbon dioxide levels in areas where workers are likely to be may also be monitored as a safety precaution. The reaction of carbon dioxide with the hydraulic cement is exothermic, thus the temperature of the cement mix, e.g., hydraulic cement mix rises; the rate of temperature rise is proportional to the rate of carbon dioxide uptake and the overall temperature rise is proportional to total carbon dioxide uptake for a given mix design. Thus, the temperature of the cement mix, e.g., hydraulic cement mix, or the temperature of one or more portions of the mix container or other equipment that are in contact with the mix, may be monitored as an indication of rate and extent of carbon dioxide uptake into the cement mix, e.g., hydraulic cement mix. Carbonation of components of the cement mix, e.g., hydraulic cement mix may produce a change in the flow characteristics, i.e., rheology, of the cement mix, e.g., hydraulic cement mix, which can be undesirable in certain applications, e.g., in wet cast applications such as in a ready mix truck. Thus, the rheology of the cement mix, e.g., hydraulic cement mix may be monitored. In addition, carbonation may affect the moisture characteristics of the cement mix, e.g., hydraulic cement mix, which may lead to undesirable characteristics, and moisture content of the mix may be monitored as well.

The invention also provides a network of mix systems with one or more sensors and, optionally, controllers, that includes a plurality of mix systems, such as 2, 3, 4, 5, 6, 7, 8, 9, 10, or more than 10 mix systems with one or more sensors and, optionally, controllers, each of which transmits data from their respective locations and mix conditions to a central controller, which learns from the overall data from all the mix systems and provides updated and modified mix instructions to the various mix systems in the network based on this information. In this way the operation of each individual mix system within the network can be optimized based on information from all the other mix systems in the network. Thus, timing and extent of carbon dioxide delivery, admixture type and amount, water amount and timing and delivery, and other factors may be optimized for one site before it has even begun its first batch, based on historical information from other sites, and all sites may undergo continual improvement in optimization as the sensors, and, optionally, controllers in the network continually gain more information and feed it to the central controller.

Thus, in certain embodiments the methods and/or apparatus may include feedback mechanisms by which one or more characteristics of the type of mixer apparatus, cement mix, e.g., hydraulic cement mix, a gas mixture in contact with the cement mix, e.g., hydraulic cement mix and inside or outside of the mixer, a component of the cement mix, e.g., hydraulic cement mix production apparatus, a component exposed to the cement mix, e.g., hydraulic cement mix, or the environment of the mixer, is monitored and the information is used to modulate the exposure of the cement mix, e.g., hydraulic cement mix to carbon dioxide, one or more admixtures, water, or other components, in the current mix and/or in subsequent mixes. Characteristics such as carbon dioxide content monitored inside and/or outside the mixer, and/or temperature of the mix monitored inside the mixer or outside of the mixer, of a component in contact with the cement mix, e.g., hydraulic cement mix, e.g., a surface of the mixer such as the outer surface of the mixer, and/or position or state of operation of a component of the cement mix, e.g., hydraulic cement mix production apparatus, may be used to determine when to modulate carbon dioxide addition, e.g., to start or to stop or slow carbon dioxide addition. Certain safety monitoring may also be done, e.g., monitoring of areas outside the mixer for carbon dioxide levels to ensure worker safety.

In general, feedback systems include one or more sensors for monitoring one or more characteristics and sending input to a controller, which receives the input from the sensors, processes it, and, if necessary, sends output, based on the processing, to one or more actuators that is configured to alter some aspect of the exposure of the cement mix, e.g., hydraulic cement mix to carbon dioxide, water, admixture, or some other aspect of the operation of the cement mix, e.g., hydraulic cement mix apparatus. In the simplest case, a human operator may manually begin carbon dioxide exposure by adjusting a valve, then may monitor a characteristic by using one or more sensors, e.g., a handheld temperature sensor that is pointed at the drum of a readymix truck, and/or a simple timer, and halt the supply of carbon dioxide gas when a certain temperature or a certain time is reached. However, in general automatic feedback mechanisms are used.

Sensors

Suitable sensors for use in control systems include temperature sensors, carbon dioxide sensors, rheology sensors, weight sensors (e.g., for monitoring the exact weight of cement used in a particular batch), moisture sensors, other gas sensors such as oxygen sensors, pH sensors, and other sensors for monitoring one or more characteristics of a gas mixture in contact with the cement mix, e.g., hydraulic cement mix, a component of the cement mix, e.g., hydraulic cement mix production apparatus, a component exposed to the cement mix, e.g., hydraulic cement mix, or some other aspect of the mix operation. Sensors also include sensors that monitor a component of the cement mix, e.g., hydraulic cement mix apparatus, such as sensors that detect when mixing has begun, when components of a cement mix, e.g., hydraulic cement mix have been added to a mixer, mass flow sensors, flow rate or pressure meter in the conduit, or other suitable sensors.

Cement Weight Scale Sensor

A cement weight scale sensor can be used to transmit information to the controller concerning the mass of cement that will be in a given mixture in the mixer. Since the $CO_2$ is dosed in proportion to the mass of cement, this weight is important for determining the correct dose to achieve the desired outcomes. The cement mass is also used to scale the size of a given batch, given that a mixture could vary in relation to a default size such as a full batch (100%) or a quarter batch (25%), or any other batch size. In some cases the batch could even exceed 100%. This batch size can also be used to determine the head (free) space in the mixer so that it can be rapidly filled with $CO_2$ without creating an overpressure by delivering more than the headspace will allow. Once the head space is full, the flow rate can be reduced to match the uptake rate of the cement.

Carbon Dioxide Sensors

One or more $CO_2$ sensors may be used to minimize waste, i.e., to increase the efficiency of carbon dioxide uptake, and/or to ensure worker safety. The $CO_2$ sensors work by measuring the $CO_2$ content of the air around the outside of the mixer and/or inside the mixer. Alternatively, or additionally, one or more sensors may be located inside the mixer and sense the carbon dioxide content of the gas in the mixer and send a signal to a controller. The sensors may be any sensor capable of monitoring the concentration of carbon dioxide in a gas and transmitting a signal to the controller based on the concentration, and may be located in any convenient location or locations inside or outside the mixer; if inside, preferably in a location such that the sensor is not subject to fouling by the cement mix, e.g., hydraulic cement mix as it is being mixed or poured. In addition to, or instead of, carbon dioxide sensors inside the mixer, one or more such sensors may be located outside the mixer to sense the carbon dioxide content of overflow gas escaping the mixer and send a signal to a controller. In either case, a certain range or ranges, or a cutoff value, for carbon dioxide content may be set, and after the carbon dioxide content of the mixer and/or overflow gas reaches the desired range, or goes above the desired threshold, carbon dioxide delivery, or some other aspect of the cement mix, e.g., hydraulic cement mix apparatus, may be modulated by a signal or signals from the controller to an actuator or actuators. For example, in certain embodiments a carbon dioxide sensor may be located outside the mixer and when carbon dioxide content of the overflow gas reaches a certain threshold, such as a carbon dioxide concentration that indicates that the gas mixture in contact with the cement mix, e.g., hydraulic cement mix is saturated with carbon dioxide, carbon dioxide delivery to the cement mix, e.g., hydraulic cement mix, e.g., inside the mixer is halted or slowed by closing a valve, partially or completely, in the conduit from the carbon dioxide source to the mixer.

In particular, for minimizing waste, one or more sensors can be placed in the areas where leaks are most likely to occur (e.g., around doors, etc.). The sensor or sensors may be positioned so that leaking carbon dioxide is most likely to pass in their vicinity, e.g., since carbon dioxide is more dense than air, positioning below a likely leak point is more desirable than positioning above a likely leak point. When the gas is delivered at a rate much greater than capacity of the cement to absorb the $CO_2$ it is more likely to spill out of the mixer at a leak point and be detected by a gas sensor. Leaks would be a normally occurring event when there is too much gas delivered to the mixer given that the mixer is not completely gas tight according to the nature of the machine. A $CO_2$ leak would occur when the $CO_2$ has been delivered too quickly. Given that $CO_2$ is heavier than air there would be, in general, a certain amount of $CO_2$ that can be delivered to the mixer wherein the incoming $CO_2$ gas would displace air that initial was sitting in the mixer. Once the air has been displaced an delivery of additional gas would displace previously delivered carbon dioxide or otherwise be immediately spilled from the mixer. Sensors that feed into a dosing logic system would preferably be placed in locations immediately beside the mixer leak points. If the one or more sensors read that the $CO_2$ content in the vicinity exceeds a preset threshold level (e.g. a defined baseline), the system will adjust the $CO_2$ flow rate and/or delivery time, e.g., to decrease or eliminate additional overspill in the present batch or to eliminate the overspill in a future mixing cycle. The logic can co-ordinate a filling rate of the mixer space that is proportional to the uptake rate of $CO_2$ by the cement.

For worker safety, if a carbon dioxide delivery causes the carbon dioxide concentration in areas around the mixer normally accessed by workers to exceed a maximum value (such as indicated by OSHA), the controller can signal for a system shut down wherein all the valves can be closed and, typically, an alarm can be sounded as a safety measure. Sensors that feed into a safety system can be placed at various distances from the mixer depending on the proximity requirements for workers to the mixer.

Temperature Sensors

One or more sensors may be used to monitor the temperature of the mix inside or outside of the mixer and/or of a component in contact with the cement mix, e.g., hydraulic cement mix and/or of the mixer, which is indicative of carbonation and/or other reactions due to the addition of the carbon dioxide, and carbon dioxide addition modulated based on this temperature or temperatures monitored by the sensor(s). One or more temperature sensors may be located to monitor the temperature of the cement mix, e.g., hydraulic cement mix, for example, within the mixer, or at a site distal to the mixer such as a holding site or transport site for the cement mix, e.g., hydraulic cement mix. Such a site may be, e.g., a feedbox for a pre-cast operation, or a belt or other transport mode, or a wheelbarrow or other site for transporting or storing concrete from a ready-mix truck. One or more temperature sensors may be located to monitor the temperature of a component that is in contact with the cement mix, e.g., hydraulic cement mix, e.g., the drum of the mixer. Any suitable temperature sensor may be used. For example, an infrared temperature sensor, such as a mounted or handheld sensor, may be used to monitor the temperature of the drum of a ready-mix truck to which carbon dioxide is added, and when a certain temperature is reached or range of temperatures achieved, the addition of the carbon dioxide inside the drum may be modulated.

The temperature or range of temperatures at which the carbon dioxide exposure is modulated may be a predetermined temperature or range, based on a temperature known to be associated with one or more undesirable characteristics, e.g., reduced strength, workability loss, poor compactability performance, hardening in the mixer, etc. In some cases it may be an absolute temperature or range. More preferably, it is a temperature or range that is determined in reference to an initial temperature, such as an initial temperature of the cement mix, e.g., hydraulic cement mix or a component in contact with the mix before addition of carbon dioxide. In certain embodiments, the temperature or range is at least 10, 15, 20, 21, 22, 23, 24, 25, 26, 27, 28, 29, 30, 35, 40, 45, or 50° C. above the initial temperature, or 10-50, 10-40, 10-30° C. above the initial temperature, and with that range a threshold may be set, which may vary from batch to batch depending on the desired carbonation of the concrete mix or other characteristics. In certain cases, e.g., where warm starting materials are used, the temperature is kept unchanged from the starting temperature, or kept within 0-5° C. of the starting temperature. In some case, an absolute maximum temperature is set and the control system is configured to keep the mix below the maximum temperature. The sensor can also be used to monitor rate of temperature rise and the controller can adjust the flow rate and/or delivery time if the rate is too high or too low. Test data indicates that, for a constant flow, the carbon uptake is proportional to temperature increase detected immediately after carbonation for a given mix. An in-situ temperature measurement may be used to model the real-time total carbon dioxide uptake of the cement mix, e.g., hydraulic cement mix with respect to previously collected calibration data.

Rheology Sensors

In an operation in which flowability of the cement mix is important, e.g., a wet cast operation, one or more rheology sensors may be used. A rheometer can be mounted inside the mixer to measure the workability of the cement mix, e.g., hydraulic cement mix. $CO_2$ can reduce the workability of the fresh cement mix, e.g., hydraulic cement mix, and the rheometer can be used to monitor the workability loss. At a certain preset minimum threshold of workability, one or more actions may be triggered, such as modulation of the rate of $CO_2$ flow to the mixer, addition of admixture, and/or addition of additional water, to restore workability to a desired level. A rheometer can also monitor the workability of concrete in a ready mix concrete truck while it is in transit and adjust $CO_2$/admixture doses on subsequent mixtures produced at the batching plant, or even adjust an admixture dose delivered in the drum truck itself.

Moisture Sensors

One or more moisture sensors may be used. The moisture sensor is used to monitor the moisture in the cement mix, e.g., hydraulic cement mix during the mixing cycle. As $CO_2$ is taken up by the cement mix, e.g., hydraulic cement mix, the apparent moisture can be reduced and result in a drier looking product. Therefore the mix moisture may need to be increased to maintain the desired product appearance. If the moisture reaches a minimum threshold value, the $CO_2$ can be modulated, e.g., reduced or shut off so the mix is not released in an unacceptably dry condition. The sensor also monitors the moisture decrease with respect to $CO_2$ uptake and can adjust the flow rate and/or delivery time if the rate becomes too high or too low. The moisture sensor can also trigger the addition of supplemental mix water at any point in the mixing process. In addition, one or more moisture sensors may be used to determine the moisture content of one or more components of the cement mix, e.g., hydraulic cement mix before the components are mixed; for example, a moisture sensor may be used to determine the moisture content of aggregate, which may be exposed to weather conditions leading to water pickup. In the case of an operation where carbon dioxide is added via mix water as well as by gas or liquid, such information may be used to adjust the relative amount of carbon dioxide added via gas or liquid, to compensate for the fact that less mix water will be used due to the moisture content of the aggregate.

Other Sensors

One or more sensors may monitor conditions of the cement mix, e.g., hydraulic cement mix apparatus and send a signal to a controller. For example, one or more sensors may monitor when all desired components of the cement mix, e.g., hydraulic cement mix are in the mixer and mixing, and the controller may send a signal to an actuator, such as a controllable valve, to begin flow of carbon dioxide. The carbon dioxide flow may continue for a predetermined time, or may be modulated according to further feedback, such as described above.

Other conditions may be monitored, as well, such as pressure conditions in one or more lines; for example, in a system where liquid carbon dioxide is delivered to the mixer, sensors may be employed to control dry ice formation between the nozzle and solenoid as well as to confirm pre-solenoid pressure is maintained to ensure the line remains liquid.

Any combination of one or more sensors inside or outside the mixer, and/or inside or outside the mix, may be used to monitor cement binder weight, cement binder location, carbon dioxide content, temperature, rheology, moisture content, pH, other characteristics, or a combination thereof, and feedback loops to modulate the addition of carbon dioxide based on the information provided by these sensors may be used; such loops may include automatic or manual adjustments, or both. In certain embodiments, sensors monitor the cement binder addition time and/or dust collector system operation time, as in some mixers a fan is run after the powders go in to prevent excessive dust, and these should be turned off so that added carbon dioxide is not removed during this time.

Thus, in certain embodiments the invention provides a method or apparatus for producing carbonated cement mix, e.g., hydraulic cement mix that includes a control system that includes at least one sensor selected from the group consisting of a carbon dioxide sensor, a temperature sensor, a rheology sensor, and a moisture sensor. In certain embodiments the invention provides a method or apparatus for producing carbonated cement mix, e.g., hydraulic cement mix that includes a control system that includes at least two sensors selected from the group consisting of a carbon dioxide sensor, a temperature sensor, a rheology sensor, and a moisture sensor. In certain embodiments the invention provides a method or apparatus for producing carbonated cement mix, e.g., hydraulic cement mix that includes a control system that includes at least three sensors selected from the group consisting of a carbon dioxide sensor, a temperature sensor, a rheology sensor, and a moisture sensor. In certain embodiments the invention provides a method or apparatus for producing carbonated cement mix, e.g., hydraulic cement mix that includes a control system that includes a carbon dioxide sensor, a temperature sensor, a rheology sensor, and a moisture sensor. The methods and apparatus can further include one or more actuators for adjusting some aspect of the mix operation, for example carbon dioxide flow to the mixer, or admixture flow to the mixer, and a controller that receives signals from the sensor or sensors, processes them to determine if modulation of the mix operation is required, and, if so, transmits a signal to an actuator or actuators to carry out the modulation.

Actuators

The actuator or actuators may be, e.g., one or more valves, such as solenoid valve, in one or more conduits supplying a component, such as carbon dioxide, to the mixer, as described elsewhere herein. An actuator for $CO_2$ delivery can be, e.g., a delivery manifold with, e.g. gas temperature sensor, gas pressure gauge, modulating control valve, open/close solenoid and orifice plate assembly. These components can all be combined in a singular unit, i.e. a flow controller. In certain embodiments, in addition to or alternatively to, a gas delivery system, one or more actuators for controlling delivery of carbonated mix water, as described herein, may be used. Such actuators may include, e.g., actuators to control charging mix water with carbon dioxide and/or actuators to control delivery of carbon dioxide-charged water to the mixer. Similarly, an actuator controlling water delivery to the mix may be under the control of the controller, as may be an actuator controlling delivery of one or more admixtures to the mix. In addition, an actuator may include a relay switch attached to dust collector power source to shut off mixer dust collector during $CO_2$ delivery (if necessary). In general, the modulation of the carbon dioxide exposure will be an increase or decrease in exposure, such as a decrease in flow rate of carbon dioxide gas to the mixer. In certain embodiments, the modulation is halting the flow of carbon dioxide gas to the mixer.

Thus, in certain embodiments the invention provides a method or apparatus for producing carbonated cement mix, e.g., hydraulic cement mix that includes a control system that includes at least one actuator for controlling at least one action selected from the group consisting of a carbon dioxide flow to the mixer, water flow to the mixer, and admixture flow to the mixer. In certain embodiments the invention provides a method or apparatus for producing carbonated cement mix, e.g., hydraulic cement mix that includes a control system that includes at least two actuators for controlling at least two actions selected from the group consisting of a carbon dioxide flow to the mixer, water flow to the mixer, and admixture flow to the mixer. In certain embodiments the invention provides a method or apparatus for producing carbonated cement mix, e.g., hydraulic cement mix that includes a control system that includes an actuator for controlling carbon dioxide flow to the mixer, an actuator for controlling water flow to the mixer, and an actuator for controlling admixture flow to the mixer.

Other actuators, such as actuators that control one or more aspects of hydraulic cement production, such as timing of mixing, delivery of cooling input such as ice or liquid nitrogen, activation of an alarm, and the like, may also be used as appropriate.

Controller

The control systems used in methods and apparatus can include a controller that receives inputs from the one or more sensors, processes them by comparing them to preset values for achieving the desired result, and, as necessary, sends outputs to the one or more actuators to move the system toward the desired result.

The controller may be, e.g., an electronic circuit or a programmable logic controller, located either on-site with the mixer or off-site, e.g., as part of a computer network. For example, the controller may be a Programmable Logic Controller (PLC) with a Human Machine Interface (HMI), for example a touch screen and onboard telemetry computer. The controller can be integrated into the overall mixer controller or it can be a separate unit that receives inputs from the mixer controller as appropriate.

An exemplary set of operations for a controller in response to inputs from various sensors and giving outputs to various actuators is illustrated below.

The system can include the following components: 1) Programmable Logic Controller (PLC) with attached Human Machine Interface (HMI), for example a touch screen and onboard telemetry computer. 2) Gas delivery manifold with, e.g., gas temperature sensor, gas pressure gauge, modulating control valve, open/close solenoid and orifice plate assembly. These components can all be combined in a singular unit, i.e. a flow controller. 3) Cement weight scale feeding into a concrete mixer to measure quantity of cement used in a batch. This quantity is used logically to determine the $CO_2$ dose based on cement content (further information below). 4) Proximity switch to trigger the delivery of $CO_2$ into the mixer 5) Relay switch attached to dust collector power source to shut off mixer dust collector during $CO_2$ delivery (if necessary). 6) One or more $CO_2$ sensors positioned around the mixer used to monitor carbon dioxide gas concentration outside the mixer. The data can be used logically to minimize wastage by controlling flow or monitor safety (further information below). 7) Concrete temperature sensor in or on mixer used to monitor the concrete temperature during the carbonation treatment. The data can be used logically to control the $CO_2$ dose as well as the flow rate (further information below). 8) Moisture sensor used to monitor concrete moisture in the mixer. This information can be used to logically control the $CO_2$ dose (further information below). 9) Concrete rheology sensor to monitor the consistency of the concrete. Information about the workability of the concrete can logically be used to signal admixture delivery or process end points. Not all of these components need be present, depending on the needs of the mix operation. For example, in a dry cast operation, a rheology sensor may not be used.

The steps of operation of the system are as follows:

1. A PLC is programmed, for example, through the HMI, to apply carbon dioxide treatment to a first batch. Process threshold settings for aspects such as $CO_2$ concentration in the air at a leak point and/or at a worker area, concrete temperature and/or rate of temperature change, concrete moisture and/or rate of moisture change, concrete rheology can be input at this time.

2. Batching starts by a signal from the mixing controller to the mixer. This follows logically after the previous step. The mixer controller software can communicate batch information to the PLC.

3. Materials are added to mixer (e.g. aggregates). This follows logically after the previous step as part of normal practice.

4. The cement is weighed. This follows logically after the previous step as part of normal practice. A cement mass (weight) sensor determines mass (weight) of cement used in the batch and feeds information to the PLC 5. The PLC makes a calculation to determine the required gas flow. This follows logically from an earlier step. The PLC calculates the amount of gas required for delivery to the current mix based upon a percentage dosage rate of gas mass to cement mass. The PLC calculation may refer to a predetermined set point. It may alternatively, or in addition, call upon historical data of previous combinations of mix size, mix type and $CO_2$ dosage rate, either from the mix site at which the current batch is being mixed, or from other mix sites, or a combination thereof. It can use information (either input or detected) about the batch size, cement mass, mix type and mixer volume. For example, it can use information about cement type or origin to determine whether, which, and/or how much admixture should be employed. The PLC can accept information required for calculations from sources including user input into the HMI, communication with the mixer controller software, and the cement mass sensor. The PLC calculations will depend upon acquiring all of the required data which can come from, e.g., the HMI in step 1, mix controller software in step 2, and/or the cement mass sensor in step 4.

6. Cement is dropped into the mixer. This follows logically after the previous step. The time that cement enters the mixer is detected. A proximity sensor can detect the cement deposit in the mixer through a physical movement (e.g. the opening of a door or gate). Alternatively, the cement addition time can be supplied synchronously from the mixer controller software. The time that the cement is placed into mixer is transmitted to the PLC.

7. The PLC starts the gas delivery. This can be concurrent with the previous step, at some predetermined time after the previous step, or even before the previous step, if it is desired to replace some or all of the air in the mixer with $CO_2$ prior to deposition of the cement. The PLC can send a signal to the mixer dust collector to be turned off for all or part of the $CO_2$ delivery or otherwise coordinated with some aspect of the gas delivery. The PLC sends signal to the solenoid in the $CO_2$ delivery system to open either in coordination with the cement insertion or at some time before or after the insertion.

8. The PLC surveys the sensors for any process conditions that signal the $CO_2$ delivery is to change/end according to preset conditions or for other measurable aspects. This follows logically after the previous step. A) Temperature sensor—the concrete temperature exceeds a threshold value or rate that can be set for correlation to a maximum allowable temperature rise or a target temperature rise. B) $CO_2$ leak sensors—the $CO_2$ sensors at the significant leak points of the mixer have detected a $CO_2$ content that exceeds a preset threshold or a relative value above a baseline measurement. C) $CO_2$ safety sensors—the $CO_2$ sensors monitoring the $CO_2$ content of the air in the general vicinity of the mixer have reached a threshold value. There can also be an oxygen sensor measuring the oxygen content of the air. These sensors are located in areas accessed by workers around the machine as opposed to leaks immediately from the mixer. D) Moisture sensor—the moisture content of the concrete has reached an absolute threshold with respect to a set point or otherwise has passed a relative measure with respect to the batch at hand. For example, a condition might acknowledge that the moisture content of the concrete inherently varies from batch to batch but would search for a decline in moisture content of, e.g., 0.5% with respect to the measurement expected if no $CO_2$ had been applied or the initial measurement, etc. E) Rheology—(relevant to wet mix) the workability of the concrete is measured and found to reach a threshold level. F) Timer on PLC—PLC may have a predefined maximum delivery time that may signal a stop condition in the event no other sensors have triggered a stop.

9. A gas flow modification condition is detected. The PLC receives a signal from a sensor and modifies the gas delivery in response. Follows logically from previous step. A) Any sensor may suggest the gas input flow is modified (e.g., reduced) as a threshold value is neared rather than simply attained or crossed. B) Temperature Sensor—if the sensor detects an increase in the temperature of the concrete that is greater than expected then a signal can be sent by the PLC to reduce the rate of input of carbon dioxide. Conversely, if the rate of temperature increase is lower than expected then the PLC can increase the rate input of carbon dioxide. In addition or alternatively, if a certain threshold temperature is reached, carbon dioxide delivery may be halted. C) $CO_2$ leak sensors—if the sensors detect an increase in $CO_2$ concentration at the mixer leak points a signal can be sent to the PLC, which reduces the input of carbon dioxide. For example, the leaking can be an indication that the head space of the mixer has been filled with $CO_2$ and any further addition will result in leaks or overspill. The $CO_2$ input may be reduced to a rate that is in proportion to the projected absorption rate of the carbon dioxide into the cement. Thereby any gas that is absorbed into the concrete is in turn replaced with new gaseous $CO_2$ to maintain an overall amount of gas in the mixer. D) Rheology sensor—if the sensor detects a decrease, e.g., a rapid decrease in the workability of the concrete, a signal can be sent by the PLC to reduce carbon dioxide input. Conversely, if the workability loss is less than expected, the PLC can increase the carbon dioxide input. Other outputs from the PLC may cause addition of admixture, water, or both to the mix.

10. A gas delivery stop condition achieved, PLC receives signal to stop gas delivery. Follows logically from previous step. Solenoid is closed. Gas delivery ends.

11. After the $CO_2$ delivery is complete the sensors may send signals to the controller that call for supplemental inputs to the mixer. Follows logically from previous step. A) Temperature sensor can detect a temperature rise that calls for the concrete temperature to be reduced through the addition of a cooling input such as ice or liquid nitrogen. B) Temperature sensor detects that the target $CO_2$ uptake of the concrete has been achieved which may prompt the addition of an appropriate admixture. C) Moisture sensor reading causes PLC to signal for additional mix water or other remedial measure such as an admixture. D) Rheology sensor input to PLC causes output for additional mix water addition, or an admixture addition, or both, to facilitate a workability increase or other remedial measure.

12. Batching and mixing is complete. Concrete is released to the remainder of the production cycle. Follows logically from previous step.

13. The PLC can perform calculations to learn for subsequent batches—particularly for the next time that same or similar combination of mix design and $CO_2$ dosage is used. Otherwise settings can be predicted for other $CO_2$ dosages to apply to that same mix design, or for smaller batches of that mix design with the same $CO_2$ dosage, etc. This can be concurrent with previous step. A) The data from $CO_2$ leak sensors can dictate that, for a future mix, the flow rate should be reduced if there were excessive leaks (too much gas is supplied) or increased because there are no leaks at all (not enough gas has been supplied) in the present mix. The PLC will make note of the updated or recalculated gas flow setting for future use. B) Temperature data can inform future cooling treatment usage. The PLC will make note of the temperature response in the wake of the applied temperature adjustment for adjustment of the cooling treatment in future batches. For example the future cooling treatment can be greater or lower if the current cooling treatment was found to be inadequate. C) Temperature data can inform future kinetic assessments of temperature rise vs time for a given combination of mix design and gas delivery condition. D) The moisture sensor data can inform future mix water adjustment required either to be included as part of the initial mix water or as late addition mix water. In the first case the total water addition might be approached incrementally whereas later mixes can use the end point determined in the first mix as a target setting. E) Rheological information can inform future admix usage. The PLC can correlate a quantified dose of admix with the response in workability metric. The proportion of admix to aspects such as, but not limited to, cement content, absorbed carbon dioxide (either measured directly after the fact or approximated by temperature increase) workability improvement can be recorded and recursively recalculated as additional data is acquired thereby improving the admix dosing logic. Further information regarding characteristics of the batch, such as flowability or strength at one or more time points, water absorption, and the like, may also be input.

14. Telemetry data can be logged and distributed by the PLC to a remote data storage. This can be concurrent with the end of gas delivery (step 10) or follow from later steps if additional information acquired after the end of delivery is part of the transmitted information.

Figure 1:
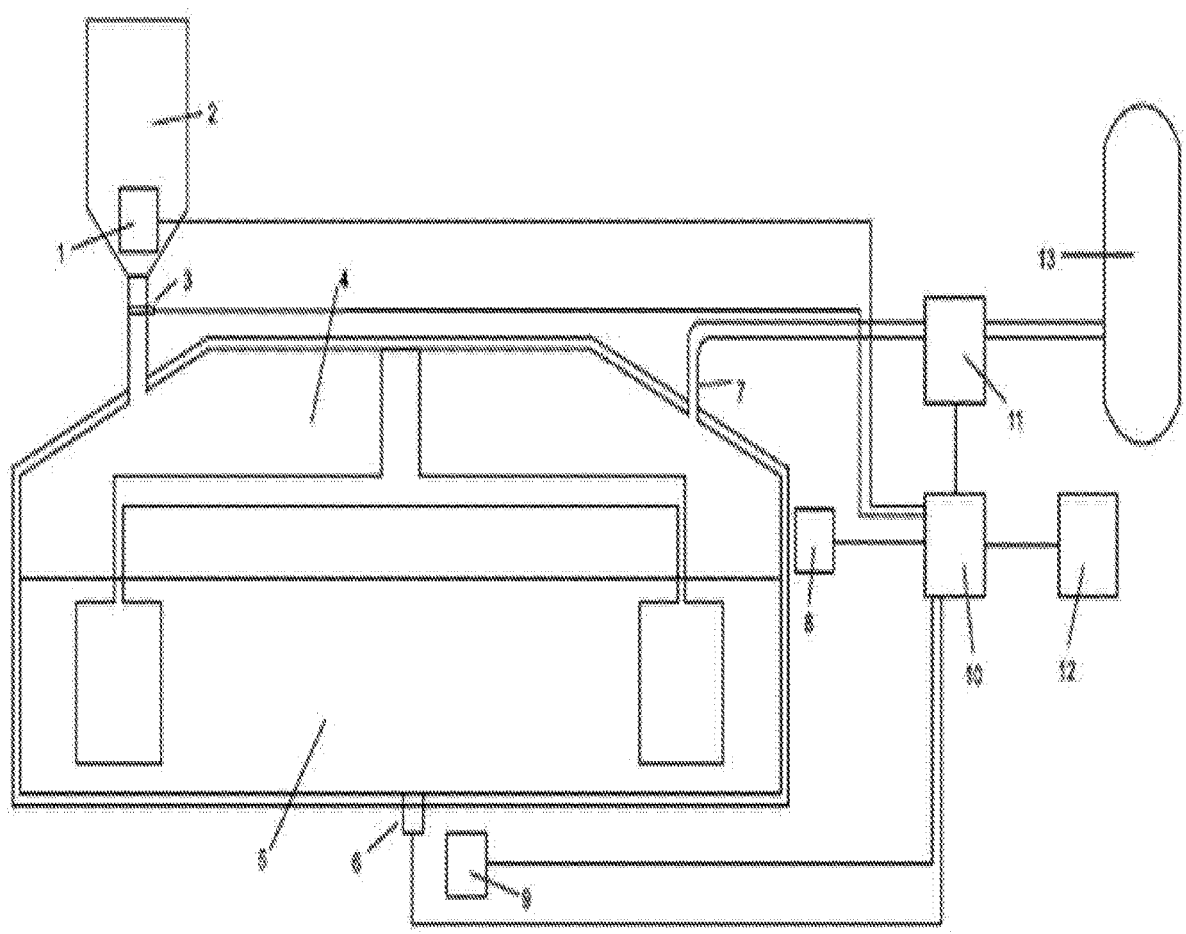
FIG. 1 provides a schematic view of a stationary mixer with apparatus for providing carbon dioxide to a hydraulic cement mix during mixer.
Figure 2:
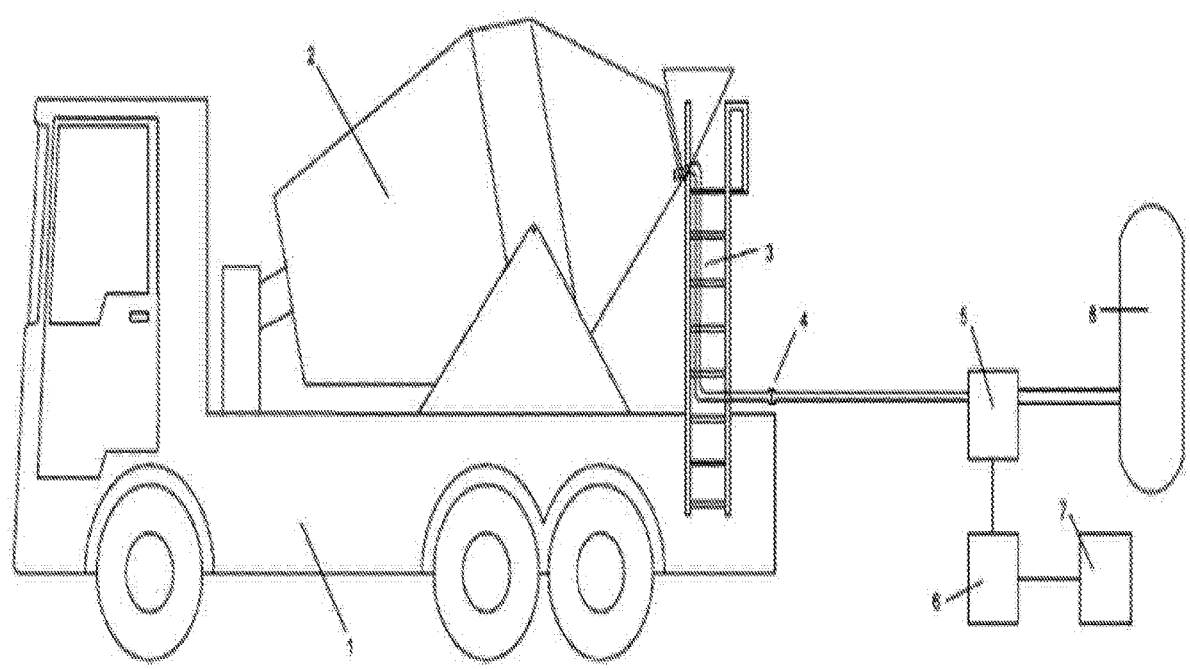
FIG. 2 provides a schematic view of a mobile mixer (ready mix truck) provided with a detachable carbon dioxide delivery system to deliver carbon dioxide to the mixing concrete.
Figure 3:
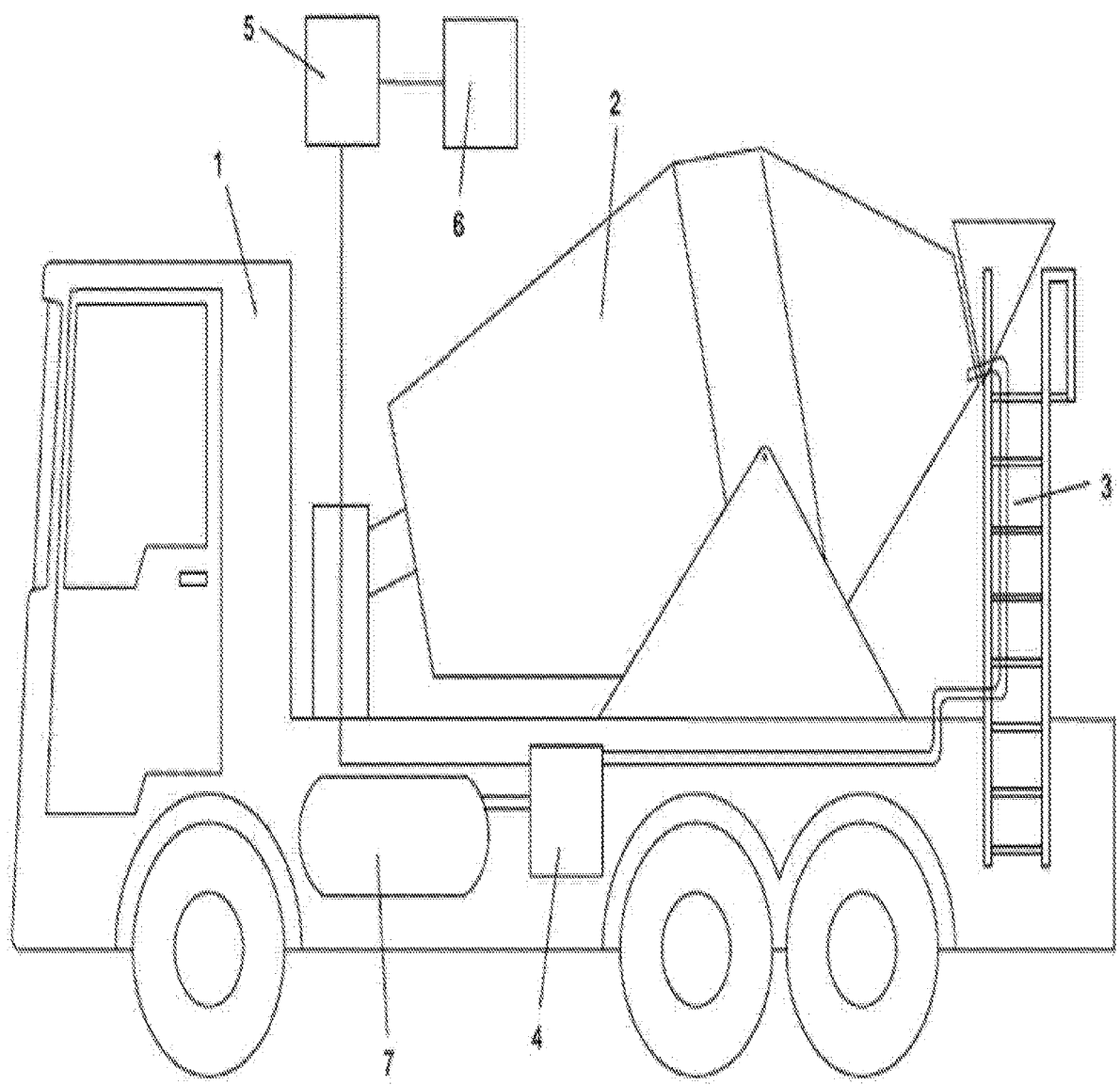
FIG. 3 provides a schematic view of a mobile mixer (ready mix truck) provided with an attached carbon dioxide delivery system to deliver carbon dioxide to the mixing concrete.

Exemplary mixers and control systems are illustrated in FIGS. 1, 2, and 3. FIG. 1 shows a stationary planetary mixer, e.g., for use in a precast operation. The cement scale 1 includes a mass sensor that sends data regarding the mass of cement dispensed from the cement silo 2 to the controller 10. Proximity sensor 3 senses when cement is released to the mixer and sends a signal to the controller; alternatively, the mix controller (not shown) can send a signal to the controller 10 when the cement is released. $CO_2$ delivery may commence upon release of the cement; alternatively, $CO_2$ delivery may commence before or after release. $CO_2$ sensors 8 and 9 are located at leak areas outside the mixer and send signals regarding atmospheric $CO_2$ content to the controller 10. In addition, temperature sensor 6 sends signals regarding the temperature of the concrete mix to the controller 10. Additional sensors, such as moisture and rheology sensors, or additional $CO_2$ sensors in worker areas in the vicinity of the mixer may be used (not shown) and send additional signals to the controller. Controller 10 processes the signals and sends output to an actuator 11 for controlling delivery of $CO_2$ from a $CO_2$ supply 13 via a conduit to the $CO_2$ gas mixer inlet 7, where it enters the mixer headspace 4 and contacts the mixing concrete 5. For example, in a basic case, the controller 10 may send a signal to the actuator 11 to open a valve for delivery of $CO_2$ upon receiving input from the proximity sensor 3 indicating that cement has been delivered to the mixer, and send a signal to the actuator 11 to close the valve upon receiving input from one or more of the $CO_2$ sensors 8 and 9 or the temperature sensor 6 indicating that the desired delivery of $CO_2$ to the mixer, or uptake of $CO_2$ into the concrete has been achieved. The controller may send output to additional actuators such as an actuator for controlling water addition or an actuator controlling admixture addition (not shown). An optional telemetry system 12 may be used to transmit information regarding the batch to a central location to be used, e.g., to store data for use in future batches and/or to use for modification of the same or similar mixes in other locations.

FIGS. 2 and 3 show a mobile cement mixer, in this case, a ready mix truck. FIG. 2 shows a ready mix truck 1 with a detachable carbon dioxide delivery system. Carbon dioxide is supplied from a carbon dioxide supply 8 via a conduit that is attachable to a conduit on the truck 2 at a junction 4. Controller 6 controls the supply of carbon dioxide to the drum of the truck 2 via an actuator 5. Sensors, such as $CO_2$ sensors may be located at leak areas outside and/or inside the drum 2 and send signals regarding atmospheric $CO_2$ content to the controller 6. In addition, one or more temperature sensors may sends signals regarding the temperature of the concrete mix to the controller 6. Additional sensors, such as moisture and rheology sensors, or additional $CO_2$ sensors in worker areas in the vicinity of the mixer may be used (not shown) and send additional signals to the controller. The controllers sends a signal to the actuator (e.g., valve) 5 to control addition of carbon dioxide to the drum 2. Additional actuators may be controlled by the controller, such as to control addition of an admixture to the drum 2. An optional telemetry system 7 may be used to transmit information regarding the batch to a central location to be used, e.g., to store data for use in future batches and/or to use for modification of the same or similar mixes in other locations. FIG. 3 shows a ready mix truck with attached carbon dioxide delivery system that travels with the truck 1. This can be useful to, e.g., optimize exposure of the cement mix to carbon dioxide. Carbon dioxide is supplied from a carbon dioxide supply 7 via a conduit 3 that is attachable the truck and delivers carbon dioxide to the drum of the truck 2. Controller 5 controls the supply of carbon dioxide to the drum of the truck 2 via an actuator 4. Sensors, such as $CO_2$ sensors may be located at leak areas outside and/or inside the drum 2 and send signals regarding atmospheric $CO_2$ content to the controller 5. In addition, one or more temperature sensors may sends signals regarding the temperature of the concrete mix to the controller 5. Additional sensors, such as moisture and rheology sensors, or additional $CO_2$ sensors in worker areas in the vicinity of the mixer may be used (not shown) and send additional signals to the controller. The controllers sends a signal to the actuator (e.g., valve) 4 to control addition of carbon dioxide to the drum 2. Additional actuators may be controlled by the controller, such as to control addition of an admixture to the drum 2. An optional telemetry system 6 may be used to transmit information regarding the batch to a central location to be used, e.g., to store data for use in future batches and/or to use for modification of the same or similar mixes in other locations. In certain embodiment the controller 5 is located remote from the truck and receives the signals from the telemetry system, and transmits signals which are received and acted upon by the actuator 4.

D. Mixers

The mixer in which the carbon dioxide is contacted with the cement mix, e.g., hydraulic cement mix during mixing may be any suitable mixer. The mixer may be relatively fixed in location or it may provide both mixing and transport to a different location from the mixing location.

In certain embodiments, the mixer is fixed or relatively fixed in location. Thus, for example, in certain embodiments the mixer is part of a pre-casting apparatus. For example, the mixer may be configured for mixing concrete before introducing the concrete into a mold to produce a precast concrete product. In certain embodiments, the mixer is configured to mix concrete before introducing the concrete into a mold, and the addition of carbon dioxide to the concrete mix, the components of the concrete mix, and, optionally, other ingredients such as one or more admixtures, are adjusted so that a desired level of flow of the concrete mix, generally very low or no flow, is combined with a desired level of compactability so that the concrete may be compacted within a certain range of parameters during and after delivery to a mold, and so that the final product possesses a desired hardening time, strength, shrinkage, and other characteristics as desired. For example, a gas tube to deliver carbon dioxide into the mixer may be placed with the gas line positioned in such a way that it does not interfere with the normal mixer operation. Gas is delivered in proportion to the amount of cement, for example in the range 0.5% to 2.5%, or any other suitable range as described herein. The gas delivery can be confined to the normal mixing time. In certain embodiments gas delivery may be triggered by a gate for the cement addition pipe. When the gate closes (signaling completion of cement addition) a magnetic proximity sensor detects the closed state and triggers the start of the carbon dioxide flow.

In certain embodiments in which the mixer is a fixed mixer, for example in a dry cast or wet cast pre-casting operation, the mixer is configured to mix concrete and to deliver it to a holding component, e.g., a hopper, which further delivers the concrete to a mold, optionally via a feedbox. Additional carbon dioxide can be added to the cement mix, e.g., hydraulic cement mix at the hopper and/or feedbox, if desired. See U.S. patent application Ser. No. 13/660,447 incorporated herein by reference in its entirety. In certain embodiments, no further carbon dioxide is added to the mix (apart from carbon dioxide in the atmosphere) after the concrete exits the mixer.

The addition of carbon dioxide may affect the compactability and thus the strength of the final object, e.g., precast object. In the case of a wet cast operation, flowability is also a consideration. Thus, in certain embodiments, the addition of carbon dioxide to the concrete mix, the components of the concrete mix, and, optionally, other ingredients such as one or more admixtures, are adjusted so that a desired level of compactability (strength) and/or flowability of the cement mix, e.g., hydraulic cement mix, e.g., concrete, is achieved, generally a level of compactability (strength) and/or flowability similar to the level that would be present without the addition of the carbon dioxide, so that the final product after the concrete is poured into the mold and compacted at possesses a desired strength, such as a desired 1-, 7-, 28 and/or 56-day strength, and/or so that the flowability is at a desired value. In the case of the pre-cast mixer, the addition of carbon dioxide, components of the concrete mix, and/or additional components such as one or more admixtures, may be adjusted so that compactability and/or 1-, 7-, 28 and/or 56-day strength of the final concrete mix is within 50, 40, 30, 20, 10, 8, 5, 4, 3, 2, 1, 0.5, or 0.1% of the value or values that would be achieved without the addition of carbon dioxide, or is within 50, 40, 30, 20, 10, 8, 5, 4, 3, 2, 1, 0.5, or 0.1% of a predetermined desired value. In certain embodiments, the addition of carbon dioxide, components of the concrete mix, and/or additional components such as one or more admixtures, may be adjusted so that compactability and/or 1-, 7-, and/or 28-day strength of the final concrete mix of the final concrete mix is within 10% of the compactability and/or 1-, 7-, and/or 28-day strength of the final concrete mix that would be achieved without the addition of carbon dioxide. In certain embodiments, the addition of carbon dioxide, components of the concrete mix, and/or additional components such as one or more admixtures, may be adjusted so that compactability and/or 1-, 7-, and/or 28-day strength of the final concrete mix is within 5% of the compactability and/or 1-, 7-, and/or 28-day strength of the final concrete mix that would be achieved without the addition of carbon dioxide. In certain embodiments, the addition of carbon dioxide, components of the concrete mix, and/or additional components such as one or more admixtures, may be adjusted so that compactability and/or 1-, 7-, and/or 28-day strength of the final concrete mix is within 2% of the compactability and/or 1-, 7-, and/or 28-day strength of the final concrete mix that would be achieved without the addition of carbon dioxide. Other limits and ranges of compactability and/or 1-, 7-, and/or 28-day strength of the final concrete mix, as described herein, may also be used. Any suitable measurement method for determining compactability and/or 1-, 7-, and/or 28-day strength of the final concrete mix may be used. In certain embodiments, in addition to the desired compactability and/or 1-, 7-, and/or 28-day strength of the final concrete mix, one or more additional characteristics are achieved, such as that shrinkage is within certain desired ranges, or above or below certain threshold numbers, as determined by standard methods in the art. In all cases, if the operation is a wet cast operation, additionally, or alternatively, flowability may be modulated, e.g., by use of one or more admixtures, for example so that flowability is within 50, 40, 30, 20, 10, 8, 5, 4, 3, 2, 1, 0.5, or 0.1% of the value or values that would be achieved without the addition of carbon dioxide, or within 50, 40, 30, 20, 10, 8, 5, 4, 3, 2, 1, 0.5, or 0.1% of a predetermined value. Any suitable admixture, as described herein, may be used. In certain embodiments the admixture comprises a set retarder. In certain embodiments, the admixture comprises a carbohydrate, such as a saccharide, e.g., a sugar or sugar derivative. In certain embodiments, the admixture is selected from the group consisting of fructose, sodium glucoheptonate, and sodium gluconate. In certain embodiments, the admixture is sodium gluconate, e.g., sodium gluconate delivered to achieve a percentage, per weight of cement, of 0.05-0.8%, 0.1-0.8%, or 0.1-0.6%, or 0.1-0.5%, or 0.2-0.5%, or 0.2-3%, or 0.2-2%, or 0.2-1%. In certain embodiments a second admixture is also used, such as any of the admixtures described herein.

In certain embodiments, the mixer is a transportable mixer. "Transportable mixer," as that term is used herein, includes mixers into which components of a cement mix, e.g., hydraulic cement mix are placed in one location and the cement mix, e.g., hydraulic cement mix is transported to another location which is remote from the first location, then used. A transportable mixer is transported by, for example, road or rail. As used herein, a transportable mixer is not a mixer such as those used in a pre-cast concrete operations. Thus, in certain embodiments, the mixer may be the drum of a ready-mix truck in which a concrete mix is prepared for delivery to a worksite. In this case, the mixer is configured to mix concrete and to deliver it to a worksite, and the addition of carbon dioxide to the concrete mix, the components of the concrete mix, and, optionally, other ingredients such as one or more admixtures, are adjusted so that a desired level of flow of the cement mix, e.g., hydraulic cement mix, i.e., concrete, generally a level of flow that is similar to the level that would be present without the addition of the carbon dioxide, or a predetermined flowability, is achieved, and so that the final product after pouring at the worksite possesses a desired hardening time, strength, shrinkage, and other characteristics as desired. In the case of the ready-mix mixer, the addition of carbon dioxide, components of the concrete mix, and/or additional components such as one or more admixtures, may be adjusted so that flowability of the final concrete mix is within 50, 40, 30, 20, 10, 8, 5, 4, 3, 2, 1, 0.5, or 0.1% of the flowability that would be achieved without the addition of carbon dioxide, or a predetermined flowability. In certain embodiments, the addition of carbon dioxide, components of the concrete mix, and/or additional components such as one or more admixtures, may be adjusted so that flowability of the final concrete mix is within 10% of the flowability that would be achieved without the addition of carbon dioxide, or a predetermined flowability. In certain embodiments, the addition of carbon dioxide, components of the concrete mix, and/or additional components such as one or more admixtures, may be adjusted so that flowability of the final concrete mix is within 5% of the flowability that would be achieved without the addition of carbon dioxide, or a predetermined flowability. In certain embodiments, the addition of carbon dioxide, components of the concrete mix, and/or additional components such as one or more admixtures, may be adjusted so that flowability of the final concrete mix is within 2% of the flowability that would be achieved without the addition of carbon dioxide, or a predetermined flowability. Other limits and ranges of flowability, as described herein, may also be used. Any suitable measurement method for determining flowability may be used, such as the well-known slump test. In certain embodiments, in addition to the desired flowability, one or more additional characteristics are achieved, such as that shrinkage and/or strength, such as compressive strength, at one or more times after pouring of the concrete are within certain desired ranges, or above or below certain threshold numbers, as determined by standard methods in the art. The addition of carbon dioxide, components of the concrete mix, and/or additional components such as one or more admixtures, may be adjusted so that 1-, 7-, 28, and/or 56-day strength of the final concrete mix is within 50, 40, 30, 20, 10, 8, 5, 4, 3, 2, 1, 0.5, or 0.1% of the value or values that would be achieved without the addition of carbon dioxide, or a predetermined strength value.

It will be appreciated that, depending on the mix design, dose of carbon dioxide, and/or other aspects of the mix or conditions under which the concrete is mixed and/or used, the carbonated concrete may have a greater compressive strength at one or more time points compared to uncarbonated concrete; this is especially likely when a low dose of carbon dioxide is used, such as a dose of less than 1% bwc (see Low Dose section. In this case, the addition of a particular dose of carbon dioxide may result in an increase in strength, e.g., compressive strength, such as an increase of at least 1, 2, 3, 4, 5, 7, 10, 15, 20, 30, 40, or 50% compared to uncarbonated concrete of the same mix design and under the same conditions at one or more times after mixing, such as at 24 hours, 3 days, 7 days, 28 days, 56 days, or the like; alternatively, or additionally, the amount of cement in the mix may be reduced so that the carbonated mix contains less cement than the uncarbonated mix but reaches an acceptable compressive strength at one or more desired times after mixing, such as within 20, 10, 5, 4, 3, 2, or 1% of the compressive strength of an uncarbonated mix with the normal amount of cement. In certain embodiments, the amount of cement in the mix may be reduced by at least 1, 2, 3, 4, 5, 6, 7, 8, 9, 10, 12, 15, 20, 25, or 30% compared to uncarbonated mix and still achieve the desired strength at the desired time(s). These considerations of increased strength and/or decreased use of cement apply to both transportable and stationary operations. In certain embodiments, the addition of carbon dioxide, components of the concrete mix, and/or additional components such as one or more admixtures, may be adjusted so that 1-, 7-, 28, and/or 56-day strength of the final concrete mix of the final concrete mix is within 10% of the 1-, 7-, 28 and/or 56-day strength of the final concrete mix that would be achieved without the addition of carbon dioxide, or a predetermined strength value. In certain embodiments, the addition of carbon dioxide, components of the concrete mix, and/or additional components such as one or more admixtures, may be adjusted so that 1-, 7-, 28 and/or 56-day strength of the final concrete mix is within 5% of the 1-, 7-, 28 and/or 56-day strength of the final concrete mix that would be achieved without the addition of carbon dioxide, or a predetermined strength value. In certain embodiments, the addition of carbon dioxide, components of the concrete mix, and/or additional components such as one or more admixtures, may be adjusted so that 1-, 7-, 28 and/or 56-day strength of the final concrete mix is within 2% of the 1-, 7-, 28 and/or 56-day strength of the final concrete mix that would be achieved without the addition of carbon dioxide, or a predetermined strength value. Other limits and ranges of 1-, 7-, 28 and/or 56-day strength of the final concrete mix, as described herein, may also be used. Any suitable measurement method for determining 1-, 7-, 28 and/or 56-day strength of the final concrete mix may be used. In certain embodiments, in addition to the desired 1-, 7-, 28 and/or 56-day strength of the final concrete mix, one or more additional characteristics are achieved, such as that shrinkage is within certain desired ranges, or above or below certain threshold numbers, as determined by standard methods in the art.

In embodiments in which an admixture is used, any suitable admixture, as described herein, may be used. In certain embodiments the admixture comprises a set retarder. In certain embodiments, the admixture comprises a carbohydrate, such as a saccharide, e.g., a sugar. In certain embodiments, the admixture is selected from the group consisting of fructose, sodium glucoheptonate, and sodium gluconate. In certain embodiments, the admixture is sodium gluconate, e.g., sodium gluconate at a percentage of 0.01-2%, or 0.01-1%, or 0.01-0.8%, or 0.01-0.5%, or 0.01-0.1%, or 0.1-0.8%, or 0.1-0.6%, or 0.1-0.5%, or 0.2-0.5%, or 0.2-3%, or 0.2-2%, or 0.2-1%. In certain embodiments, the admixture is fructose, e.g., fructose at a percentage of 0.01-2%, or 0.01-1%, or 0.01-0.8%, or 0.01-0.5%, or 0.01-0.1%, or 0.1-0.8%, or 0.1-0.6%, or 0.1-0.5%, or 0.2-0.5%, or 0.2-3%, or 0.2-2%, or 0.2-1%. In certain embodiments a second admixture is also used, such as any of the admixtures described herein.

One type of transportable mixer is a volumetric truck. A volumetric concrete truck is a truck that carries and mixes concrete onsite by mixing aggregate, cement and water at the job site, generally by using a belt to measure the ingredients and an auger to mix the concrete before discharging. A schematic of a truck can be seen in FIG. 147. As seen in FIG. 147, the concrete is mixed in an auger and then discharged. This auger is in a trough and is typically covered with a rubber mat. Thus, in this embodiment, the mixer is the augur, and $CO_2$ gas or gas/solid can be added to the mixing concrete from the top of the auger through a conduit. The rubber roof keeps the $CO_2$ enclosed in the trough and allows it to mix with the concrete before discharge. The $CO_2$ can be controlled by, e.g., using a flow meter and a solenoid. The system can be controlled manually, using a knob on the flow meter and manually opening the solenoid. It can also be controlled automatically by, e.g., getting a signal from the truck computer that corresponds to the rate at which cement is being metered into the mixing hopper and be triggered when the auger is moving. The source of carbon dioxide can be any source as described herein, for example, a liquid tank or a gas tank. In the latter case, a high pressure $CO_2$ cylinder can be mounted on the truck in order to supply the $CO_2$ for the concrete. The cylinder may also be heated (using a heating jacket) if the flow rate needed exceeds that possible by the natural boiling inside the cylinder. These trucks can do up to 60 $m^3$/hr (1 $m^3$/min), but typically only carry enough material for ~8 $m^3$ of concrete. This would mean a maximum $CO_2$ flow rate between 60-500 SLPM depending on cement content of the mix and $CO_2$ dose. Other aspects are as described above for transportable mixers.

It will be appreciated that, both in the case of a wet cast (such as readymix) or a dry cast, different mixes may require different treatment in order to achieve a desired flowability and/or compactability, and that mix types may be tested in advance and proper treatment, e.g., proper type and/or percentage of admixture determined. In certain cases admixture may not be required; indeed, with certain mix types and carbon dioxide concentrations, compactability (strength) or flowability may be within acceptable limits; e.g., strength may even be improved in certain mix types at certain levels of carbon dioxide addition. Also, the point in the procedure in which ingredients are introduced can affect one or more characteristics of the product, as can be determined in routine testing and mix adjustment.

The mixer may be closed (i.e., completely or substantially completely airtight) or open (e.g., the drum of a ready mix truck, or a precast mixer with various leak points). The mixer may be one of a plurality of mixers, in which different portions of a cement mix, e.g., hydraulic cement mix are mixed, or it may be a single mixer in which the entire cement mix, e.g., hydraulic cement mix, such as a concrete mix, except in some cases additional water, is mixed.

Methods of Carbon Dioxide Delivery

Any suitable mixer for mixing concrete in an operation to produce concrete for use in objects, such as for use in producing building materials, may be used. In some cases a mixer may be used where the desired dose or uptake of carbon dioxide may be achieved using gas delivery alone. For example, in most pre-cast mixers, the mixer is enclosed but not gas-tight (i.e., not open to the atmosphere, although not gas tight, such that leak points are available for, e.g., carbon dioxide sensors) and the head space and mixing times are such that a desired dose or uptake can be achieved with nothing more than gaseous carbon dioxide delivery.

In some cases, however, such as in a ready mix truck where head space is relative less than in a typical precast mixer, additional efficiency may be desired, or necessary, in order to achieve a desired carbon dioxide dose or uptake. In these cases, the use of carbon dioxide-charged mix water, or liquid carbon dioxide delivered so as to form a gas and a solid, or addition of solid carbon dioxide, or any combination thereof, may be used. The carbon dioxide may be delivered to the mixer as a liquid which, through proper manipulation of delivery, such as flow rate and/or orifice selection, becomes a mixture of gaseous carbon dioxide and solid carbon dioxide upon delivery, for example, in an approximate 1:1 ratio. The gaseous carbon dioxide is immediately available for uptake into the cement mix, e.g., hydraulic cement mix, while the solid carbon dioxide effectively serves as a time-delayed delivery of gaseous carbon dioxide as the solid gradually sublimates to gas. Additionally, or alternatively, carbon dioxide-charged mix water may be used. Carbon dioxide-charged water is routinely used in, e.g., the soda industry, and any suitable method of charging the mix water may be used. The water may be charged to achieve a carbon dioxide concentration of at least 1, 2, 3, 4, 5, 6, 7, 8, 9, or 10 g $CO_2$/L water. Carbon dioxide-charged mix water can deliver a significant portion of the desired carbon dioxide dose for a cement mix, e.g., hydraulic cement mix, for example, at least 5, 10, 15, 20, 25, 30, 35, 40, 45, 50, 55, 60, 65, 70, 75, 80, 85, 90, or 95% of the total carbon dioxide delivered to a batch of cement mix, e.g., hydraulic cement mix may be delivered in the mix water. In some cases, 100% of the carbon dioxide may be delivered in the mix water. In some cases, at least 20% of the carbon dioxide is delivered in the mix water. In some cases, at least 30% of the carbon dioxide is delivered in the mix water. Without being bound by theory, it is thought that the carbon dioxide thus delivered reacts rapidly with components of the cement mix, e.g., hydraulic cement mix, allowing further uptake of gaseous carbon dioxide by the water. Carbon dioxide may also be delivered in solid form, i.e., as dry ice, directly, as described elsewhere herein.

A ready mix operation is an example of a system where it may be desirable to use one or both of carbon dioxide-charged water and liquid carbon dioxide delivery. A ready mix truck drum is open to the atmosphere and has a relatively small head space in comparison to the mass of concrete, which is typically 6 to 10 cubic meters when the truck is batched to capacity, which it is as often as possible. Mixing time at the batching site may be relatively short. Therefore the use of carbonated mix water and liquid $CO_2$ may be used to ensure that a desired dose of $CO_2$ is delivered. For example, in a ready mix operation in which a carbon dioxide delivery of 1.5% is desired: The volume of gas to be added is ~2.66 $m^3$ of gas/$m^3$ of concrete (assuming 350 kg/$m^3$ of cement being carbonated at 1.5%). Mix water is typically represented by added water and excess moisture contained in the aggregate. If the free mix water (~160 L/$m^3$) is carbonated with $CO_2$ using existing carbonation technology, such as that used in the soda industry, to 10 g of $CO_2$/L of water this represents approximately ⅓ of the target carbon dioxide delivery of 1.5% bwc. Contact with cement results in rapid carbonation of the dissolved $CO_2$, and the water is quickly ready for additional carbon dioxide dissolution once it is in the truck and in contact with the cement. The use of carbon dioxide in the mix water reduces the total carbon dioxide to be added to the truck to 3.66 kg of $CO_2$ (or about 1.85 $m^3$ gas/$m^3$ concrete). This amount may still be too high to be universally delivered in atmospheric pressure gas form. Therefore liquid $CO_2$ injection into the truck can be used for the balance of the carbon dioxide supply. Liquid $CO_2$ injection of the remaining 3.66 kg $CO_2$/$m^3$ in the truck can be done using a controlled flow rate that is based upon sensors and a calibrated $CO_2$ uptake rate. See Control Mechanisms as described herein. Upon delivery through a nozzle the liquid transforms into a mixture of solid and gaseous carbon dioxide. The liquid delivery can result, e.g., in 1.75 kg of solid $CO_2$ snow (with a density of 1560 kg/$m^3$) and 1.9 kg of $CO_2$ gas (0.96 $m^3$ gas). The gas is immediately be available for uptake by the mix water while the solid $CO_2$ serves as a time delayed $CO_2$ delivery, as the solid gradually sublimates to gas. This process reduces the gaseous volume injected into the truck to approximately 29% of the volume needed if the entire $CO_2$ delivery had been via gaseous $CO_2$. In some cases part of the concrete mix, e.g., the aggregate, may also be wet. In that case, less mix water is used and correspondingly more liquid carbon dioxide. Moisture sensors, e.g., to sense the moisture content of the aggregate, may be used to provide information to allow for the adjustment, even on a batch-by-batch basis. This approach can allow for higher uptake rates and greater efficiency.

Exemplary embodiments include a method for producing a cement mix, e.g., hydraulic cement mix comprising (i) placing components of the cement mix, e.g., hydraulic cement mix in a mixer and mixing the components; and (ii) delivering liquid $CO_2$ via an opening in a conduit into the mixer in such a manner as to cause the liquid $CO_2$ to form a mixture of gaseous and solid $CO_2$ which then contact the cement mix, e.g., hydraulic cement mix. The delivery of the liquid may be controlled in such a manner, e.g., by adjusting flow rate and/or orifice, or other adjustable feature or measure, as to form a mixture of gaseous to solid carbon dioxide in a ratio in the range of 1:10 to 10:1, or 1:5 to 5:1, or 1:3 to 3:1, or 1:2 to 2:1, or 1:1.5 to 1.5:1, or 1:1.2 to 1.2 to 1. The cement mix, e.g., hydraulic cement mix comprises water and the water may be charged with $CO_2$ before delivery to the mixer as described herein, for example to a level of at least 2 g $CO_2$/L water, or at least 4 g $CO_2$/L water, or at least 6 g $CO_2$/L water, or at least 8 g $CO_2$/L water, or at least 9 g $CO_2$/L water, or at least 10 g $CO_2$/L water. The mixer may be any suitable mixer, such as a stationery mixer or a transportable mixer, e.g., the drum of a ready mix concrete truck. When the mixer is the drum of a ready mix concrete truck, the liquid $CO_2$ may be supplied to the mixer at a batching plant, or it may be supplied to the mixer during transport of the batch to a job site, or even at the job site itself, or a combination thereof. The method may further include monitoring a characteristic of the cement mix, e.g., hydraulic cement mix, a gas mixture in contact with the cement mix, e.g., hydraulic cement mix, a component of a cement mix, e.g., hydraulic cement mix apparatus, or a component exposed to the cement mix, e.g., hydraulic cement mix, and modulating the flow of liquid $CO_2$ according to the characteristic monitored. For example, $CO_2$ concentration, temperature, moisture content, rheology, pH, or a combination thereof may be monitored, as detailed elsewhere herein. When $CO_2$ is monitored, it may be monitored in a portion of gas outside the mixer, e.g. at a leak point or spill point.

Exemplary embodiments also include a method for producing a cement mix, e.g., hydraulic cement mix comprising (i) contacting components of the cement mix, e.g., hydraulic cement mix with $CO_2$-charged water, wherein the water is charged with $CO_2$ to a level of at least 2 g/L, 3 g/L, 4 g/L, 6 g/L, 8 g/L, 9 g/L, or 10 g/L, and mixing the components and the water. Embodiments further include a method of producing a carbonated cement mix, e.g., hydraulic cement mix comprising (i) determining a dose of $CO_2$ to be delivered to the cement mix, e.g., hydraulic cement mix; and (ii) delivering at least 10, 20, 30, 40, 50, 60, 70, 80, 90, or 100% of the dose of $CO_2$ as $CO_2$ dissolved in mix water for the cement mix, e.g., hydraulic cement mix. In certain embodiments the dose is 0.1-10%, or 0.5-5%, or 0.5-4%, or 0.5-3%, or 0.5-2%, or 1-5%, or 1-4%, or 1-3%, or 1-2% $CO_2$ bwc. In certain embodiments the dose is 1.5% $CO_2$ bwc. Delivery of carbon dioxide-charged mix water as described may be combined in some embodiments with delivery of gaseous and/or liquid carbon dioxide. Further embodiments in which carbonated mix water is used are described elsewhere herein.

Exemplary embodiments further include an apparatus for carbonating a cement mix, e.g., hydraulic cement mix comprising (i) a mixer for mixing the cement mix, e.g., hydraulic cement mix; (ii) a source of liquid $CO_2$; and (iii) a conduit operably connecting the source of liquid $CO_2$ to the mixer, wherein the conduit comprises an orifice through which the liquid $CO_2$ exits the conduit into the mixer. The conduit can include a system for regulating the flow of the liquid $CO_2$ where the system, the orifice, or both, are configured to deliver the liquid $CO_2$ as a combination of solid and gaseous $CO_2$, such as by regulating flow rate of the liquid $CO_2$ and/or orifice configuration, such as to produce a ratio of solid to gaseous $CO_2$ in the range of 1:10 to 10:1, or 1:5 to 5:1, or 1:3 to 3:1, or 1:2 to 2:1, or 1:1.5 to 1.5:1, or 1:1.2 to 1.2 to 1, for example, between 1:3 and 3:1, or between 1:2 and 2:1. The mixer can be a transportable mixer, such as a drum of a ready-mix truck. The source of liquid $CO_2$ and the conduit may remain at a batching facility after the transportable is charged, or may accompany the transportable mixer when the transportable mixer transports the cement mix, e.g., hydraulic cement mix. The apparatus may further include a system for delivering $CO_2$-charged water to the mixer comprising a source of $CO_2$-charged water and a conduit operably connected to the source and configured to deliver the water to the mixer, which may in some cases further include a charger for charging the water with $CO_2$. In certain cases the mixer is transportable and the system for delivering $CO_2$-charged water to the mixer is detachable from the mixer during transport, e.g., if the mixer is the drum of a ready mix truck the system for delivering and, optionally, charging $CO_2$-charged water remains at the batching facility.

Exemplary embodiments also include an apparatus for producing a carbonated cement mix, e.g., hydraulic cement mix comprising (i) a mixer for mixing the cement mix, e.g., hydraulic cement mix; and (ii) at least two of (a) a source of gaseous $CO_2$ operably connected to the mixer and configured to deliver gaseous $CO_2$ to the mixer; (b) a source of liquid $CO_2$ operably connected to the mixer and configured to deliver liquid $CO_2$ to the mixer and release the liquid $CO_2$ into the mixer as a mixture of gaseous and solid $CO_2$; and (c) a source of carbonated water operably connected to the mixer and configured to deliver carbonated water to the mixer.

E. Retrofitting Existing Apparatus

In certain embodiments, the methods of the invention include methods and apparatus for retrofitting an existing cement mix, e.g., hydraulic cement mix apparatus to allow for the contact of the mixing cement mix, e.g., hydraulic cement mix with carbon dioxide. As used herein, the term "retrofit" is used in its generally accepted sense to mean installing new or modified parts or equipment into something previously manufactured or constructed. The retrofit may modify the existing apparatus to perform a function for which it was not originally intended or manufactured. In the case of the present invention, a cement mix, e.g., hydraulic cement mix apparatus to be retrofitted is not originally constructed to allow addition of carbon dioxide to a cement mix, e.g., hydraulic cement mix during mixing of the cement mix, e.g., hydraulic cement mix. Preferably, the retrofitting requires little or no modification of the existing apparatus. The retrofitting may include delivering to a site where a pre-existing cement mix, e.g., hydraulic cement mix apparatus is located the components necessary to modify the existing cement mix, e.g., hydraulic cement mix apparatus to allow exposure of a cement mix, e.g., hydraulic cement mix to carbon dioxide during mixture. Instructions for one or more procedures in the retrofitting may also be transported or transmitted to the site of the existing cement mix, e.g., hydraulic cement mix apparatus.

The retrofitting may include installing components necessary to modify the existing cement mix, e.g., hydraulic cement mix apparatus to allow exposure of a cement mix, e.g., hydraulic cement mix to carbon dioxide during mixing. The components may include a conduit for delivery of carbon dioxide to a cement mix, e.g., hydraulic cement mix mixer. The components may further include a source of carbon dioxide. In systems in which a control system is included, the retrofit may include modifying the existing control system of the cement mix, e.g., hydraulic cement mix apparatus to perform functions appropriate to the controlled addition of carbon dioxide to the cement mix, e.g., hydraulic cement mix. Instructions for such modifications may also be transmitted or sent to the site of the existing cement mix, e.g., hydraulic cement mix apparatus controller. Such modifications can include, for example, modifying the existing controller settings to include timing the opening and closing of a gas supply valve to deliver a flow of carbon dioxide at a predetermined flow rate for a predetermined time from the carbon dioxide source via the conduit to the mixer at a certain stage in the hydraulic mix apparatus operations. They may also include modifying the controller to modify the timing and/or amount of water addition to the cement mix, e.g., hydraulic cement mix, addition of admixture, and any other suitable parameter. Alternatively, or in addition to, modifying the existing controller, the retrofitting may include providing one or more new controllers to the pre-existing cement mix, e.g., hydraulic cement mix apparatus. The retrofitting can include transporting the new controller or controllers to the site of the existing cement mix, e.g., hydraulic cement mix apparatus. In addition, one or more sensors, such as sensors for sensing the positions and/or states of one or more components of the existing cement mix, e.g., hydraulic cement mix apparatus, which were not part of the original manufactured equipment, may be installed. The retrofit may include transporting one or more sensors to the site of the existing cement mix, e.g., hydraulic cement mix apparatus. Actuators, which may be actuators in the retrofitted apparatus, e.g., a gas supply valve, or in the original equipment, e.g., to move or start or stop various operations such as addition of water, may be operably connected to the retrofitted controller in order to modify the operations of the cement mix, e.g., hydraulic cement mix apparatus according to the requirements of contacting the cement mix, e.g., hydraulic cement mix with carbon dioxide. The retrofit may include transporting one or more sensors to the site of the existing cement mix, e.g., hydraulic cement mix apparatus.

III. Methods

In certain embodiments, the invention provides methods for producing a carbonated cement mix in a mix operation in a cement mix apparatus comprising (i) contacting a cement mix comprising cement binder and aggregate in a mixer with carbon dioxide while the cement mix is mixing; (ii) monitoring a characteristic of the cement binder, the cement mix, a gas mixture in contact with the cement mix or the mixer, or a component of the cement mix apparatus; and (iii) modulating the exposure of the cement mix to the carbon dioxide or another characteristic of the cement mix operation, or a combination thereof according to the characteristic monitored in step (ii). In some cases, only exposure of the cement mix to the carbon dioxide is modulated; in other cases, only another characteristic of the cement mix operation is modulated; and in other cases, both are modulated.

The cement binder may be any suitable cement binder as described herein, i.e., a cement binder containing calcium species capable of reacting with carbon dioxide to form stable or metastable reaction products, such as carbonates. The cement binder may be a hydraulic cement, for example, a Portland cement. "Cement mix," as that term is used herein, includes a mix of a cement binder, e.g., a hydraulic cement, such as a Portland cement, with aggregate; "concrete" is generally synonymous with "cement mix" as those terms are used herein.

The mix operation may be any operation in which a cement mix/concrete is produced for any of the various uses of such a mix. Thus, the cement mix operation may be an operation in a mixer at a precast facility for producing a cement mix for use in a dry cast or wet cast operation. In other embodiments, the cement mix operation may be an operation in a mixer for a ready mix operation, e.g., the drum of a ready mix truck. Any other suitable cement mix operation may also be used, so long as it is amenable to addition of carbon dioxide to the cement mix during mixing, for example, a mixer on site at a construction site. Thus, additional examples include pug mill or twin shaft continuous mixers that can be used for roller compacted concrete (dry mix) or CTB (cement treated base) for road stabilization, which are continuous mix applications rather than batch. While some of the aspects of water proportioning might not be achievable there still exists the possibility to add $CO_2$ during the mixing step.

The characteristic monitored may be any suitable characteristic that provides useful feedback to inform modulation of exposure of the cement mix to carbon dioxide or another characteristic of the cement mix operation. In certain embodiments, the characteristic monitored is (a) mass of cement binder added to the cement mix, (b) location of the cement binder in the mix apparatus (e.g., coordinating carbon dioxide delivery with delivery of cement binder; may be achieved by sensing the location of the cement mix or by timing of the mix sequence, which can be input to the controller), (c) carbon dioxide content of a gas mixture within the mixer in contact with the cement mix, (d) carbon dioxide content of a gas mixture exiting from the mixer, (e) carbon dioxide content of gas mixture in the vicinity of the mix apparatus, (f) temperature of the cement mix or a component of the mix apparatus in contact with the cement mix, (g) rheology of the cement mix, (h) moisture content of the cement mix, or (i) pH of the cement mix. The location of water in the mix apparatus also be monitored, e.g., to determine when water addition is complete. These characteristics and methods and apparatus for monitoring them are as described elsewhere herein. When the mass of the cement binder is monitored, the total amount of carbon dioxide to be added to the cement mix may be modulated to accord with a predetermined desired exposure, e.g., if a 1.5% carbon dioxide/cement exposure is desired, the exact mass used in a particular batch may be used to determine the exact total carbon dioxide to be added to the batch (which may be used as is, or modified in response to other characteristics that are monitored). When location of the cement binder or water in the mix apparatus is monitored, the modulation of carbon dioxide flow may be a simple on/off, e.g., when the cement mix and/or water is determined to have entered the mixer, carbon dioxide flow may be turned on at that time or at a predetermined time after that time. In certain embodiments, the characteristic monitored in step (ii) comprises carbon dioxide content of a gas mixture exiting from the mixer, e.g., at a leak point of the mixer. In this embodiment, and/or in other embodiments in which a carbon dioxide content of a gas mixture is monitored, the exposure of the cement mix to carbon dioxide can be modulated when the carbon dioxide content of the gas mixture reaches a threshold value, and/or when the rate of change of the carbon dioxide content of the gas mixture reaches a threshold value. The modulation can be an increase in the rate of carbon dioxide addition to the cement mix, a decrease, or even a full stop. In certain embodiments, the characteristic monitored is the temperature of the cement mix or a component of the mix apparatus in contact with the cement mix. For example, a wall of the mixer may be monitored for temperature. The exposure of the cement mix to carbon dioxide can be modulated when the temperature of the cement mix or a component of the mix apparatus in contact with the cement mix, or a combination of a plurality of such temperatures, reaches a threshold value and/or when the rate of change of the temperature of the cement mix or a component of the mix apparatus in contact with the cement mix reaches a threshold value. If temperature is used as a measure for the threshold value, it may be an absolute temperature, or it may be a temperature relative to the temperature of the mix before the addition of carbon dioxide, e.g., a temperature that is a certain number of degrees above the starting temperature, for example 10-50° C. above the starting value, or 10-40° C. above the starting value, or 10-30° C. above the starting value. The exact difference between starting and threshold temperature may be predetermined for a particular mix recipe by determining the relationship between carbonation and temperature for that recipe, or for that particular cement binder in relation to other components of that recipe.

In certain embodiments, a plurality of characteristics of the cement binder, the cement mix, a gas mixture in contact with the cement mix or the mixer, or a component of the cement mix apparatus are monitored, e.g., at least 2, 3, 4, 5, 6, 7, 8, 9, or 10 characteristics, for example, at least 2 characteristics. In certain embodiments, at least 2 of (a) mass of cement binder added to the cement mix, (b) location of the cement binder in the mix apparatus, (c) carbon dioxide content of a gas mixture within the mixer in contact with the cement mix, (d) carbon dioxide content of a gas mixture exiting from the mixer, (e) carbon dioxide content of gas mixture in the vicinity of the mix apparatus, (f) temperature of the cement mix or a component of the mix apparatus in contact with the cement mix, (g) rheology of the cement mix, (h) moisture content of the cement mix, or(i) pH of the cement mix are monitored. In certain embodiments, at least 3 of (a) mass of cement binder added to the cement mix, (b) location of the cement binder in the mix apparatus, (c) carbon dioxide content of a gas mixture within the mixer in contact with the cement mix, (d) carbon dioxide content of a gas mixture exiting from the mixer, (e) carbon dioxide content of gas mixture in the vicinity of the mix apparatus, (f) temperature of the cement mix or a component of the mix apparatus in contact with the cement mix, (g) rheology of the cement mix, (h) moisture content of the cement mix, or(i) pH of the cement mix are monitored. In certain embodiments, at least 4 of (a) mass of cement binder added to the cement mix, (b) location of the cement binder in the mix apparatus, (c) carbon dioxide content of a gas mixture within the mixer in contact with the cement mix, (d) carbon dioxide content of a gas mixture exiting from the mixer, (e) carbon dioxide content of gas mixture in the vicinity of the mix apparatus, (f) temperature of the cement mix or a component of the mix apparatus in contact with the cement mix, (g) rheology of the cement mix, (h) moisture content of the cement mix, or(i) pH of the cement mix are monitored. In certain embodiments, at least 5 of (a) mass of cement binder added to the cement mix, (b) location of the cement binder in the mix apparatus, (c) carbon dioxide content of a gas mixture within the mixer in contact with the cement mix, (d) carbon dioxide content of a gas mixture exiting from the mixer, (e) carbon dioxide content of gas mixture in the vicinity of the mix apparatus, (f) temperature of the cement mix or a component of the mix apparatus in contact with the cement mix, (g) rheology of the cement mix, (h) moisture content of the cement mix, or (i) pH of the cement mix are monitored. In certain embodiments, at least 6 of (a) mass of cement binder added to the cement mix, (b) location of the cement binder in the mix apparatus, (c) carbon dioxide content of a gas mixture within the mixer in contact with the cement mix, (d) carbon dioxide content of a gas mixture exiting from the mixer, (e) carbon dioxide content of gas mixture in the vicinity of the mix apparatus, (f) temperature of the cement mix or a component of the mix apparatus in contact with the cement mix, (g) rheology of the cement mix, (h) moisture content of the cement mix, or(i) pH of the cement mix are monitored.

In certain embodiments, the method alternatively, or additionally, include monitoring the time of exposure of the cement mix to the carbon dioxide, the flow rate of the carbon dioxide, or both.

When an additional characteristic of the mix operation is modulated in response to the monitoring, it may be any suitable characteristic. In certain embodiments, the additional characteristic includes (a) whether or not an admixture is added to the cement mix, (b) type of admixture added to the cement mix, (c) timing of addition of admixture to the cement mix, (d) amount of admixture added to the cement mix, (e) amount of water added to the cement mix, (f) timing of addition of water to the cement mix, (g) cooling of the cement mix during or after carbon dioxide addition, or a combination thereof. If an admixture is used, it may be any suitable admixture for adjusting a characteristic of the cement mix, e.g., an admixture to adjust the rheology (flowability) of the mix, for example, in a wet cast operation. Examples of suitable admixtures are described herein, e.g., carbohydrates or carbohydrate derivatives, such as sodium gluconate.

The characteristic may be monitored, such as by one or more sensors. Such sensors may transmit information regarding the characteristic to a controller which processes the information and determines if a modulation of carbon dioxide exposure or another characteristic of the mix operation is required and, if so, transmits a signal to one or more actuators to carry out the modulation of carbon dioxide exposure or other characteristic of the mix operation. The controller may be at the site of the mix operation or it may be remote. Such sensors, controllers, and actuators are described further elsewhere herein. If a controller is used, it may store and process the information obtained regarding the characteristic monitored in step (ii) for a first batch of cement mix and adjust conditions for a subsequent second cement mix batch based on the processing. For example, the controller may adjust the second mix recipe, e.g., amount of water used or timing of water addition, or carbon dioxide exposure in the second batch to improve carbon dioxide uptake, or to improve rheology or other characteristics of the mix, e.g., by addition and/or amount of an admixture, and/or timing of addition of the admixture. In such embodiments in which one or more conditions of a second mix operation are adjusted, in certain embodiments the one or more conditions of the second mix operation includes (a) total amount of carbon dioxide added to the cement mix, (b) rate of addition of carbon dioxide, (c) time of addition of carbon dioxide to the cement mix, (d) whether or not an admixture is added to the cement mix, (e) type of admixture added to the cement mix, (f) timing of addition of admixture to the cement mix, (g) amount of admixture added to the cement mix, (h) amount of water added to the cement mix, (i)timing of addition of water to the cement mix, (j) cooling the cement mix during or after carbon dioxide addition, or a combination thereof. The controller can also receive additional information regarding one or more characteristics of the cement mix measured after the cement mix leaves the mixer, and adjusts conditions for the second cement mix batch based on processing that further comprises the additional information. In certain embodiments, the one or more characteristics of the cement mix measured after the cement mix leaves the mixer comprises (a) rheology of the cement mix at one or more time points, (b) strength of the cement mix at one or more time points, (c) shrinkage of the cement mix, (d) water absorption of the cement mix, or a combination thereof. Other characteristics include elastic modulus, density, and permeability. Any other suitable characteristic may be measured. The characteristic monitored can depend on the requirements for a particular mix batch, although other characteristics may also be monitored to provide data to the controller for future batches in which those characteristics would be required.

In embodiments in which a controller adjusts conditions for a second mix operation based on input from a first mix operation, the second mix operation may be in the same mix facility or it may be in a different mix facility. In certain embodiments, the controller, one or more sensors, one or more actuators, or combination thereof, transmits information regarding the characteristics monitored and conditions modulated to a central controller that receives information from a plurality of controllers, sensors, actuators, or combination thereof, each of which transmits information from a separate mixer to the central controller. Thus, for example, a first mix facility may have a first sensor to monitor a first characteristic of the first mix operation, and a second mix facility may have a second sensor to monitor a second characteristic of a second mix operation, and both may send information regarding the first and second characteristics to a central controller, which processes the information and transmit a signal to the first, second, or even a third mix operation to adjust conditions based on the first and second signals from the first and second sensors. Additional information that will be typically transmitted to the central controller includes mix components for the mixes at the first and second mix operations (e.g., type and amount of cement binder, amount of water and w/c ratio, types and amounts of aggregate, whether aggregate was wet or dry, admixtures, and the like) amount, rate, and timing of carbon dioxide addition, and any other characteristic of the first and second mix operations that would be useful for determining conditions to modulate future mix operations based on the characteristics achieved in past mix operations. Any number of mix operations may input information to the central controller, e.g., at least 2, 3, 4, 5, 6, 7, 8, 9, or 10 mix operations, or at least 15, 20, 25, 30, 40, 50, 60, 70, 80, 90, or 100 mix operations. The central controller may also receive any other information that may be suitable to informing decisions regarding mix operations to optimize one or more conditions of the mix operation and/or of the cement mix produced in the operation. For example, the central controller may receive information from experiments conducted with various types of cements (e.g., various types of Portland cements) carbonated under various conditions, and/or exposed to various admixtures, such as at different times, or in different concentrations, and the like, and the resulting characteristics of the cement mix, such as rheology at one or more time points, strength at one or more time points, and the like. Any other suitable information, such as information published in literature, or obtained in any manner, may be input into the central controller. The information the central controller receives can be processed and used to adjust cement mix operations at any mix operation to which the central controller can transmit outputs. Thus, the central controller can learn from numerous mix operations to optimize future operations and, over time, can accumulate a database to inform decisions in mix operations at a mix site even if a particular mix recipe and/or conditions have never been used at that site. The central controller can match to past mix recipes, or predict optimum conditions for a new mix recipe based on suitable algorithms using information in its database, or both.

In certain embodiments, the invention provides a method of carbonating a cement mix in a mixer that is not completely airtight in such a way as to achieve an efficiency of carbonation of at least 60, 70, 80, 90, 95, 96, 97, 98, or 99%, wherein efficiency of carbonation is the amount of carbon dioxide retained in the cement mix per the total amount of carbon dioxide to which the cement mix is exposed during mixing. The mixer may have leak points and other aspects that make it less than airtight, such as seen in a typical mixer for a precast operation. The mixer may be, e.g., the drum of a ready mix truck which has a large opening to the outside atmosphere. Such efficiency may be achieved, e.g., by using any of the methods to modulate the exposure of the cement mix to carbon dioxide as detailed above.

In certain embodiments, the invention provides a method for producing a cement mix, e.g., hydraulic cement mix comprising (i) contacting a cement mix, e.g., hydraulic cement mix comprising a first portion of water and hydraulic cement in a mixer with carbon dioxide while the cement mix, e.g., hydraulic cement mix is mixing; and (ii) adding a second portion of water to the cement mix, e.g., hydraulic cement mix. In some aspects of this embodiment, the contacting comprises directing a flow of carbon dioxide to the cement mix, e.g., hydraulic cement mix. The second portion of water may be added to the cement mix, e.g., hydraulic cement mix during said flow or after said flow has ceased, for example, after said flow has ceased. The method may include adding aggregate to the cement mix, e.g., hydraulic cement mix to produce a concrete mix; in certain embodiments, the aggregate comprises some or all of the first portion of water. The aggregate may be added before the contacting with the carbon dioxide. In certain embodiments, the method includes (iii) adding an admixture to the cement mix, e.g., hydraulic cement mix, such as an admixture that modulates the flowability of the cement mix, e.g., hydraulic cement mix. In embodiments in which an admixture to modulate flowability is added, the admixture may added in an amount to achieve a flowability in a predetermined range of flowabilities, such as a predetermined range of flowabilities that is determined by allowing for a margin from the flowability of the cement mix, e.g., hydraulic cement mixture without the addition of carbon dioxide. The admixture may be selected from the group consisting of a polycarboxylate superplasticer, a naphthalene HRWR, or any combination thereof. In certain embodiments, the admixture contains sodium gluconate, sucrose, glucose, molasses, corn syrup, EDTA, or a combination thereof. In certain embodiments, the admixture contains sodium gluconate. In certain embodiments, the admixture contains sucrose. In certain embodiments, the admixture contains glucose. In certain embodiments, the admixture contains molasses. In certain embodiments, the admixture contains corn syrup. In certain embodiments, the admixture contains EDTA. In certain embodiments, the cement mix, e.g., hydraulic cement mix comprises Portland cement. Whether or not the cement mix, e.g., hydraulic cement mix comprises Portland cement, in certain embodiments cement mix, e.g., hydraulic cement mix comprising the first portion of water comprises an amount of water so that the ratio of water to cement (w/c ratio) is equal to or less than 0.5. In certain of these embodiments, the first portion of water comprises an amount of water so that the w/c ratio is in the range 0.1 to 0.5, the carbon dioxide to which the cement mix, e.g., hydraulic cement mix is exposed may be at least 50% pure. The cement mix, e.g., hydraulic cement mix may be contacted with carbon dioxide by flowing carbon dioxide over the surface of the mixing cement mix, e.g., hydraulic cement mix. The flow of carbon dioxide directed to the cement mix, e.g., hydraulic cement mix, e.g., the surface of the mix, may last for 5 minutes or less, for example, the flow of carbon dioxide directed to the cement mix, e.g., hydraulic cement mix may last for 0.5-5 minutes. In certain embodiments, in which solid carbon dioxide is introduced into the cement mix, the solid carbon dioxide sublimates to gaseous carbon dioxide and the delivery may be extended to more than 20, 30, 40, 50, or 60 minutes. The method may further comprise monitoring a characteristic of the cement mix, e.g., hydraulic cement mix, a gas mixture in contact with the cement mix, e.g., hydraulic cement mix, a component of a cement mix, e.g., hydraulic cement mix apparatus, or a component exposed to the cement mix, e.g., hydraulic cement mix, and modulating the flow of carbon dioxide according to the characteristic monitored. For example, the method may further comprise monitoring a carbon dioxide concentration in a portion of gas adjacent to the cement mix, e.g., hydraulic cement mix, such as in a portion of gas in the mixer, or in a portion of gas outside the mixer, or both. The carbon dioxide concentration may be monitored by a sensor. The sensor may transmit a signal to a controller. The controller may process the signal and transmits a signal to an actuator according to the results of the processing, such as a controllable valve for controlling the flow of carbon dioxide to contact the cement mix, e.g., hydraulic cement mix. In addition to, or instead of carbon dioxide, a temperature of the cement mix, e.g., hydraulic cement mix, the mixer, or of another component exposed to the cement mix, e.g., hydraulic cement mix may be monitored, for example, the temperature of the mixer may be monitored, or the temperature of the cement mix, e.g., hydraulic cement mix inside the mixer may be monitored, or the temperature of a portion of the cement mix, e.g., hydraulic cement mix that is transported outside the mixer may be monitored. The contacting of the cement mix, e.g., hydraulic cement mix with carbon dioxide may be modulated according to the temperature monitored, for example, when the temperature being monitored, or a combination of temperatures being monitored, exceeds a threshold value. The threshold value may be a value determined relative to the initial temperature of the cement mix, e.g., hydraulic cement mix before addition of carbon dioxide, such as a threshold temperature or range of temperatures relative to the initial temperature as described herein. Alternatively, the threshold value may be an absolute value. The temperature may be monitored by a sensor. The sensor may transmit a signal to a controller. The controller may process the signal and transmit a signal to an actuator according to the results of the processing. The actuator may comprise a controllable valve for controlling the flow of carbon dioxide to contact the cement mix, e.g., hydraulic cement mix. The method of contacting the hydraulic cement with carbon dioxide may include, in any of these embodiments, controlling the contacting of the cement mix, e.g., hydraulic cement mix with the carbon dioxide is controlled to achieve a desired level of carbonation, such as a level as described herein, for example, at least 0.5, 1, 2, 3, or 4%. In certain embodiments, the exposure of the cement mix to carbon dioxide is modulated so as to provide an efficiency of carbon dioxide uptake of at least 60, 70, 80, 90, 95, 96, 97, 98, or 99%, for example, at least 70%.

In certain embodiments, the invention provides a method for producing a cement mix, e.g., hydraulic cement mix comprising (i) contacting a cement mix, e.g., hydraulic cement mix comprising water and hydraulic cement in a mixer with carbon dioxide while the cement mix, e.g., hydraulic cement mix is mixing, wherein the carbon dioxide is contacted with the surface of the cement mix, e.g., hydraulic cement mix by directing a flow of carbon dioxide to the surface of the mix from outside the mix, and wherein the flow lasts less than 5 min. In certain embodiments, the cement mix, e.g., hydraulic cement mix comprises aggregate. The cement mix, e.g., hydraulic cement mix may further comprise an admixture. In certain embodiments, the mixer is a transportable mixer, such as a drum of a ready-mix truck. In certain embodiments, the mixer is a mixer for pre-cast concrete. The method may further comprise controlling the flow of the carbon dioxide according to feedback from one or more sensors that monitor a characteristic selected from the group consisting of a characteristic of the cement mix, e.g., hydraulic cement mix, a gas mixture in contact with the cement mix, e.g., hydraulic cement mix, a component of a cement mix, e.g., hydraulic cement mix apparatus, or a component exposed to the cement mix, e.g., hydraulic cement mix.

In certain embodiments, the invention provides a method for producing a hydraulic cement mix comprising(i) contacting a cement mix, e.g., hydraulic cement mix comprising water and hydraulic cement in a mixer with carbon dioxide while the cement mix, e.g., hydraulic cement mix is mixing, wherein the carbon dioxide is contacted with the surface of the cement mix, e.g., hydraulic cement mix by directing a flow of carbon dioxide to the surface of the mix from outside the mix, and wherein the carbon dioxide is a component of a gaseous mixture that comprises at least 10, 20, 30, 40, 50, 60, 70, 80, 90, 95, or 99% carbon dioxide, such as at least 50% carbon dioxide. In certain embodiments, the hydraulic cement comprises aggregate. In certain embodiments, the hydraulic cement comprises an admixture. In certain embodiments, the mixer is a transportable mixer, such as a drum of a ready-mix truck. In certain embodiments, the mixer is a mixer for pre-cast concrete.

In certain embodiments, the invention provides a method for producing a cement mix, e.g., hydraulic cement mix comprising (i) contacting a cement mix, e.g., hydraulic cement mix in a mixer with carbon dioxide while the cement mix, e.g., hydraulic cement mix is mixing; and (ii) adding an admixture to the cement mix, e.g., hydraulic cement mix. The contacting may be achieved by directing a flow of carbon dioxide to the cement mix, e.g., hydraulic cement mix. In certain embodiments, the admixture is an admixture that modulates the flowability of the cement mix, e.g., hydraulic cement mix. In certain of these embodiments, the admixture may be added in an amount to achieve a flowability in a predetermined range of flowabilities, such as a predetermined range of flowabilities determined by allowing for a margin from the flowability of the cement mix, e.g., hydraulic cement mixture without the addition of carbon dioxide, for example, as described elsewhere herein. In certain aspects of the fourth embodiment, the admixture is selected from the group consisting of a polycarboxylate superplasticer, a naphthalene HRWR, or any combination thereof.

In certain embodiments, the invention provides a method for producing a cement mix, e.g., hydraulic cement mix comprising (i) contacting a cement mix, e.g., hydraulic cement mix in a mixer with carbon dioxide while the cement mix, e.g., hydraulic cement mix is mixing, wherein the carbon dioxide is exposed to the cement mix, e.g., hydraulic cement mix when the w/c ratio of the cement mix, e.g., hydraulic cement mix is less than or equal to 0.4. In certain embodiments, the contacting is achieved by directing a flow of carbon dioxide to the cement mix, e.g., hydraulic cement mix. In certain aspects of this embodiment, the w/c ratio of the cement mix, e.g., hydraulic cement mix is 0.05-0.4. The method may further comprise monitoring a characteristic of the cement mix, e.g., hydraulic cement mix, a gas mixture in contact with the cement mix, e.g., hydraulic cement mix, a component of a cement mix, e.g., hydraulic cement mix apparatus, or a component exposed to the cement mix, e.g., hydraulic cement mix, and modulating the flow of carbon dioxide according to the characteristic monitored. The method may comprise (ii) adding an admixture to the cement mix, e.g., hydraulic cement mix, such as an admixture that modulates the flowability of the cement mix, e.g., hydraulic cement mix, for example an admixture to modulate flowability of type and/or amount as described elsewhere herein.

In certain embodiments, the invention provides a method for producing a cement mix, e.g., hydraulic cement mix comprising(i) contacting a cement mix, e.g., hydraulic cement mix in a mixer with carbon dioxide while the cement mix, e.g., hydraulic cement mix is mixing at a first location, and (ii) transporting the cement mix, e.g., hydraulic cement mix to a second location where the cement mix, e.g., hydraulic cement mix is used. In certain aspects of this embodiment, said contacting is achieved by directing a flow of carbon dioxide to the cement mix, e.g., hydraulic cement mix. The second location may be at least 0.1 mile from the first location. The second location may be at least 0.5 mile from the first location. The method may comprise monitoring a characteristic of the cement mix, e.g., hydraulic cement mix, a gas mixture in contact with the cement mix, e.g., hydraulic cement mix, a component of a cement mix, e.g., hydraulic cement mix apparatus, or a component exposed to the cement mix, e.g., hydraulic cement mix, and modulating the flow of carbon dioxide according to the characteristic monitored. The method may comprise (ii) adding an admixture to the cement mix, e.g., hydraulic cement mix, such as an admixture that modulates the flowability of the cement mix, e.g., hydraulic cement mix.

In certain embodiments, the invention provides a method for producing a cement mix, e.g., hydraulic cement mix comprising (i) contacting a cement mix, e.g., hydraulic cement mix in a mixer with carbon dioxide while the cement mix, e.g., hydraulic cement mix is mixing with a flow of carbon dioxide directed to the cement mix, e.g., hydraulic cement mix, (ii) monitoring a characteristic of the cement mix, e.g., hydraulic cement mix, a gas mixture in contact with the cement mix, e.g., hydraulic cement mix, a component of a cement mix, e.g., hydraulic cement mix apparatus, or a component exposed to the cement mix, e.g., hydraulic cement mix; and (iii) modulating the exposure of the cement mix, e.g., hydraulic cement mix to the carbon dioxide according to the characteristic monitored in step (ii). The method may comprise monitoring a carbon dioxide concentration in a portion of gas adjacent to the cement mix, e.g., hydraulic cement mix, e.g., a portion of gas in the mixer, or a portion of gas outside the mixer. The carbon dioxide concentration may be monitored by a sensor. The sensor may transmit a signal to a controller. The controller may process the signal and transmit a signal to an actuator according to the results of the processing, for example, an actuator comprising a valve for controlling the flow of carbon dioxide to contact the cement mix, e.g., hydraulic cement mix. The method may comprise monitoring a temperature of the cement mix, e.g., hydraulic cement mix, the mixer, or of another component exposed to the cement mix, e.g., hydraulic cement mix is monitored. A temperature of the mixer may be monitored, or a temperature of the cement mix, e.g., hydraulic cement mix inside the mixer may be monitored, or a temperature of a portion of the cement mix, e.g., hydraulic cement mix that is transported outside the mixer may be monitored, or any combination thereof. The contacting of the cement mix, e.g., hydraulic cement mix with carbon dioxide may be modulated according to the temperature monitored. The contacting of the cement mix, e.g., hydraulic cement mix with the carbon dioxide may be modulated when the temperature being monitored, or a combination of temperatures being monitored, exceeds a threshold value, such as a value determined relative to the initial temperature of the cement mix, e.g., hydraulic cement mix before addition of carbon dioxide, such as a threshold value as described elsewhere herein. Alternatively, the threshold value may be an absolute value. The temperature may be monitored by a sensor. The sensor may transmit a signal to a controller. The controller may process the signal and transmit a signal to an actuator according to the results of the processing. The actuator may comprise a controllable valve for controlling the flow of carbon dioxide to contact the cement mix, e.g., hydraulic cement mix.

In certain embodiments, the invention provides a method for producing a cement mix, e.g., hydraulic cement mix comprising (i) contacting a first portion of cement mix, e.g., hydraulic cement mix comprising a first portion of water and hydraulic cement in a mixer while the cement mix, e.g., hydraulic cement mix is mixing; and (ii) adding a second portion of cement mix, e.g., hydraulic cement mix to the first portion. In certain aspects of this embodiment, said contacting is achieved by directing a flow of carbon dioxide to the first portion of cement mix, e.g., hydraulic cement mix.

In certain embodiments, the invention provides a method of retrofitting an existing cement mix, e.g., hydraulic cement mixing apparatus comprising a mixer, comprising operably connecting to the existing cement mix, e.g., hydraulic cement mixing apparatus a system for contacting a cement mix, e.g., hydraulic cement mix within the mixer with carbon dioxide during mixing of the cement mix, e.g., hydraulic cement mix. In certain aspects of this embodiment, the system to contact the cement mix, e.g., hydraulic cement mix in the mixer with carbon dioxide comprises a system to direct a flow of carbon dioxide to the cement mix, e.g., hydraulic cement mix during mixing of the cement mix, e.g., hydraulic cement mix. The method may also comprise operably connecting a source of carbon dioxide to a conduit for delivering the carbon dioxide to the mixer. The method may also comprise operably connecting the conduit to the mixer. The system may comprise an actuator for modulating delivery of carbon dioxide from the source of carbon dioxide through the conduit. The system may comprise a control system for controlling the actuator, operably connected to the actuator. The control system may comprises a timer and a transmitter for sending a signal to the actuator based on the timing of the timer. The method may comprise connecting the actuator to an existing control system for the cement mix, e.g., hydraulic cement mixing apparatus. The method may comprise modifying the existing control system to control the actuator. The actuator may be operably connected to or configured to be operably connected to the conduit, the mixer, a control system for the mixer, or to a source of carbon dioxide, or a combination thereof. The actuator may control a valve so as to control delivery of carbon dioxide to the mixer. The method may comprise adding to the existing cement mix, e.g., hydraulic cement mixing apparatus one or more sensors operably connected to, or configured to be operably connected to, a control system, for monitoring one or more characteristics of the cement mix, e.g., hydraulic cement mix, a gas mixture in contact with the cement mix, e.g., hydraulic cement mix, a component of the cement mix, e.g., hydraulic cement mixing apparatus, or a component exposed to the cement mix, e.g., hydraulic cement mix, for example, one or more sensors is a sensor for monitoring carbon dioxide concentration of a gas or a temperature.

IV. Apparatus and Systems

In one aspect, the invention provides apparatus and systems. The apparatus may include one or more of a conduit for supplying carbon dioxide from a carbon dioxide source to a mixer, a source of carbon dioxide, a mixer, one or more sensors, one or more controllers, one or more actuators, all as described herein.

For example, in certain embodiments the invention provides an apparatus for addition of carbon dioxide to a mixture comprising hydraulic cement, where the apparatus comprises a mixer for mixing the cement mix, e.g., hydraulic cement mix, and a system for delivering carbon dioxide to the cement mix, e.g., hydraulic cement mix in the mixer during mixing. In certain embodiments, the system for delivering carbon dioxide is configured to deliver carbon dioxide to the surface of the cement mix, e.g., hydraulic cement mix during mixing. The system may include a carbon dioxide source, a conduit operably connecting the source and the mixer for delivery of carbon dioxide to the mixer, a metering system for metering flow of carbon dioxide in the conduit, and an adjustable valve to adjust the flow rate. In addition, the apparatus may include one or more sensors to sense carbon dioxide content of gas in the mixer, or outside the mixer. The apparatus may also include one or more sensors for sensing the temperature of the cement mix, e.g., hydraulic cement mix, or the mixer or other component. The apparatus may further include a controller that is operably connected to the one or more sensors, e.g., to one or more temperature sensors, one or more carbon dioxide sensors, or a combination thereof, and which is configured to receive data from the one or more sensors. The controller may be configured to display the data, e.g., so that a human operator may adjust flow or other parameters based on the data. The controller may be configured to perform one or more operations on the data, and to send output to one or more actuators based on the results of the one or more operations. For example, the controller may be configured to send output to a an adjustable valve causing it to modulate the flow of carbon dioxide in the conduit, e.g., to stop the flow after a particular temperature, or carbon dioxide concentration, or both, has been achieved.

In certain embodiments the invention provides a system for retrofitting an existing cement mix, e.g., hydraulic cement mix apparatus to allow carbon dioxide to be contacted with a cement mix, e.g., hydraulic cement mix during mixing. The system may be configured to be transported from a site remote from the site of the existing cement mix, e.g., hydraulic cement mix apparatus to the site of the existing cement mix, e.g., hydraulic cement mix apparatus.

In certain embodiments the invention provides an apparatus for carbonating a cement mix comprising a cement binder and aggregate in a cement mix apparatus during a mix operation, comprising (i) a mixer for mixing the cement mix; (ii) a system for contacting the cement mix in the mixer with carbon dioxide operably connected to the mixer and comprising an actuator for modulating a flow of carbon dioxide to the mixer; (iii) a sensor positioned and configured to monitor a characteristic of the mix operation; and to transmit information regarding the characteristic to a controller; (iv) the controller, wherein the controller is configured (e.g., programmed) to process the information and determine whether or not and/or to what degree to modulate the flow of carbon dioxide to the mixer and to transmit a signal to the actuator to modulate the flow of carbon dioxide to the mixer. In addition to, or instead of, the actuator for modulating a flow of carbon dioxide, the system may include one or more actuators for modulating another characteristic of the system, and the controller may be configured to determine whether or not and to what degree to modulate the other characteristic, and transmit a signal to the actuator for modulating the other characteristic.

The mixer may be any suitable mixer so long as it can be configured with the remaining elements of the apparatus, such as mixers described herein. In certain embodiments, the mixer is a stationery mixer, such as a mixer used in a precast operation. In certain embodiments, the mixer is a transportable mixer, such as the drum of a ready mix truck. In embodiments in which the mixer is transportable, one or more of the elements of the control system for contacting the cement mix with carbon dioxide, sensing a characteristic, controlling one or more characteristics such as carbon dioxide flow, and actuators, may be configured to be transported along with the mixer, or may be configured to be detachable from the mixer, for example, to remain at a batching station for a ready mix truck. See, e.g. FIGS. 3 and 4, which show elements of the carbon dioxide delivery system in either non-transportable or transportable form. Elements of the control system may be similarly transportable or non-transportable. It will be appreciated that some parts of the system may be transported while others remain at, e.g. the batching station. For example, all carbon dioxide may be delivered at the batching station but certain characteristics of the cement mix, e.g., rheology, may be monitored while the truck in en route to the job site, and, if necessary, the cement mix may be modulated based on the monitoring, e.g., by addition of an admixture, or water, etc.

The system for contacting the cement mix in the mixer with carbon dioxide may be any suitable system, such as the systems described herein. In certain embodiments, the system is configured to deliver gaseous carbon dioxide to the cement mix. In certain embodiments, the system is configured to deliver liquid carbon dioxide to the cement mix in such a manner that the liquid carbon dioxide is converted to gaseous and solid carbon dioxide as it is delivered to the cement mix, as described herein. The system may be configured to deliver carbon dioxide to the surface of the mixing cement mix, or underneath the surface, or a combination thereof. In the case of a ready mix truck, the system for contacting the cement in the mixer with carbon dioxide may share a conduit with the water delivery system, by a T junction in the conduit, such that either water or carbon dioxide can be delivered to a final common conduit. See Examples 2 and 6.

The sensor may be any suitable sensor so long as it is configured and positioned to transmit relevant information to the controller. In certain embodiments, the characteristic of the mix operation that is monitored by the sensor comprises a characteristic of the cement binder, the cement mix, a gas mixture in contact with the cement mix or the mixer, or a component of the cement mix apparatus. In certain embodiments, the sensor is configured and positioned to monitor (a) mass of cement binder added to the cement mix, (b) location of the cement binder in the mix apparatus, (c) carbon dioxide content of a gas mixture within the mixer in contact with the cement mix, (d) carbon dioxide content of a gas mixture exiting from the mixer, (e) carbon dioxide content of gas mixture in the vicinity of the mix apparatus, (f) temperature of the cement mix or a component of the mix apparatus in contact with the cement mix, (g) rheology of the cement mix, (h) moisture content of the cement mix, or (i) pH of the cement mix. In certain embodiments, the characteristic monitored by the sensor comprises carbon dioxide content of a gas mixture exiting from the mixer; this can be monitored by a single sensor or by a plurality of sensors placed at various leak locations, in which case the controller uses information from the plurality of sensors. The controller can be configured to send a signal to the actuator to modulate the flow of carbon dioxide when the carbon dioxide content of the gas mixture reaches a threshold value. Alternatively, or in addition, the controller can be configured to send a signal to the actuator to modulate the flow of carbon dioxide when a rate of change of the carbon dioxide content of the gas mixture reaches a threshold value. In certain embodiments, the characteristic monitored by the sensor comprise the temperature of the cement mix or a component of the mix apparatus in contact with the cement mix. The controller can be configured to send a signal to the actuator to modulate the flow of carbon dioxide when the temperature of the cement mix or a component of the mix apparatus in contact with the cement mix reaches a threshold value. Alternatively, or in addition, the controller can be configured to send a signal to the actuator to modulate the flow of carbon dioxide when a rate of change of the temperature of the cement mix or a component of the mix apparatus in contact with the cement mix reaches a threshold value.

In certain embodiments, the apparatus comprises a plurality of sensors configured to monitor a plurality of characteristics a plurality of characteristics of the cement binder, the cement mix, a gas mixture in contact with the cement mix or the mixer, or a component of the cement mix apparatus e.g., at least 2, 3, 4, 5, 6, 7, 8, 9, or 10 characteristics, for example, at least 2 of (i) mass of cement binder added to the cement mix, (ii) location of the cement binder in the mixer, (iii) carbon dioxide content of a gas mixture within the mixer in contact with the cement mix, (iv) carbon dioxide content of gas mixture exiting from the mixer, (v) carbon dioxide content of gas mixture in the vicinity of the mixer, (vi) temperature of the cement mix or a component in contact with the cement mix, (vii) rheology of the cement mix, (viii) moisture content of the cement mix. In certain embodiments, a plurality of sensors is configured and positioned to monitor at least 3 of (i) mass of cement binder added to the cement mix, (ii) location of the cement binder in the mixer, (iii) carbon dioxide content of a gas mixture within the mixer in contact with the cement mix, (iv) carbon dioxide content of gas mixture exiting from the mixer, (v) carbon dioxide content of gas mixture in the vicinity of the mixer, (vi) temperature of the cement mix or a component in contact with the cement mix, (vii) rheology of the cement mix, (viii) moisture content of the cement mix. In certain embodiments, a plurality of sensors is configured and positioned to monitor at least 4 of (i) mass of cement binder added to the cement mix, (ii) location of the cement binder in the mixer, (iii) carbon dioxide content of a gas mixture within the mixer in contact with the cement mix, (iv) carbon dioxide content of gas mixture exiting from the mixer, (v) carbon dioxide content of gas mixture in the vicinity of the mixer, (vi) temperature of the cement mix or a component in contact with the cement mix, (vii) rheology of the cement mix, (viii) moisture content of the cement mix. In certain embodiments, a plurality of sensors is configured and positioned to monitor at least 5 of (i) mass of cement binder added to the cement mix, (ii) location of the cement binder in the mixer, (iii) carbon dioxide content of a gas mixture within the mixer in contact with the cement mix, (iv) carbon dioxide content of gas mixture exiting from the mixer, (v) carbon dioxide content of gas mixture in the vicinity of the mixer, (vi) temperature of the cement mix or a component in contact with the cement mix, (vii) rheology of the cement mix, (viii) moisture content of the cement mix. In certain embodiments, a plurality of sensors is configured and positioned to monitor at least 6 of (i) mass of cement binder added to the cement mix, (ii) location of the cement binder in the mixer, (iii) carbon dioxide content of a gas mixture within the mixer in contact with the cement mix, (iv) carbon dioxide content of gas mixture exiting from the mixer, (v) carbon dioxide content of gas mixture in the vicinity of the mixer, (vi) temperature of the cement mix or a component in contact with the cement mix, (vii) rheology of the cement mix, (viii) moisture content of the cement mix.

In addition to these sensors, or alternatively, the apparatus may include one or more sensors to monitor the time of exposure of the cement mix to the carbon dioxide, the flow rate of the carbon dioxide, or both. For example, a sensor may signal when a valve to supply carbon dioxide has opened, and, e.g., the flow rate of the carbon dioxide, and a timer circuit in the controller can determine total carbon dioxide dose.

Sensors may be wired to the controller or may transmit information wirelessly, or any combination thereof.

The apparatus may additionally, or alternatively, include an actuator configured to modulate an additional characteristic of the mix operation, where the actuator is operably connected to the controller and wherein the controller is configured to send a signal to the actuator to modulate the additional characteristic based on the processing of information from one or more sensors. This actuator can be configured to modulate addition of admixture to the cement mix, type of admixture added to the cement mix, timing of addition of admixture to the cement mix, amount of admixture added to the cement mix, amount of water added to the cement mix, timing of addition of water to the cement mix, or cooling the cement mix during or after carbon dioxide addition. In certain embodiments, the apparatus comprises a plurality of such actuators, such as at least 2, 3, 4, 5, 6, 7, or 8 such actuators.

The actuators may be wired to the controller, or may receive signals from the controller wirelessly.

The controller may be any suitable controller so long as it is capable of being configured to receive information from one or more sensors, process the information to determine if an output is required, and transmit signals to one or more actuators, as necessary, based on the processing; e.g., a computer. For example, the controller can be a Programmable Logic Controller (PLC), optionally with a Human Machine Interface (HMI), as described elsewhere herein. The controller may be located onsite with the mixer, or it may be remote, e.g., a physical remote controller or a Cloud-based controller. In certain embodiments, the controller is configured to store and process the information obtained regarding the characteristic monitored by the sensor for a first batch of cement mix and to adjust conditions for a subsequent second cement mix batch based on the processing to optimize one or more aspects of the mix operation. For example, the controller may adjust the second mix recipe, e.g., amount of water used or timing of water addition, or carbon dioxide exposure in the second batch to improve carbon dioxide uptake, or to improve rheology or other characteristics of the mix. In such embodiments in which one or more conditions of a second mix operation are adjusted, in certain embodiments the one or more conditions of the second mix operation includes (a) total amount of carbon dioxide added to the cement mix, (b) rate of addition of carbon dioxide, (c) time of addition of carbon dioxide to the cement mix, (d) whether or not an admixture is added to the cement mix, (e) type of admixture added to the cement mix, (f) timing of addition of admixture to the cement mix, (g) amount of admixture added to the cement mix, (h) amount of water added to the cement mix, (i) timing of addition of water to the cement mix, (j) cooling the cement mix during or after carbon dioxide addition, or a combination thereof. The controller can also receive additional information regarding one or more characteristics of the cement mix measured after the cement mix leaves the mixer, and adjusts conditions for the second cement mix batch based on processing that further comprises the additional information. In certain embodiments, the one or more characteristics of the cement mix measured after the cement mix leaves the mixer comprises (a) rheology of the cement mix at one or more time points, (b) strength of the cement mix at one or more time points, (c) shrinkage of the cement mix, (d) water absorption of the cement mix, or a combination thereof. Other characteristics include water content, carbon dioxide analysis to confirm carbon dioxide uptake, calcite content (e.g., as determined by infrared spectroscopy), elastic modulus, density, and permeability. Any other suitable characteristic may be measured.

In embodiments in which a controller adjusts conditions for a second mix operation based on input from a first mix operation, the second mix operation may be in the same mix facility or it may be in a different mix facility. In certain embodiments, the controller, one or more sensors, one or more actuators, or combination thereof, transmits information regarding the characteristics monitored and conditions modulated to a central controller that receives information from a plurality of controllers, sensors, actuators, or combination thereof, each of which transmits information from a separate mixer and mix operation to the central controller. In these embodiments, the apparatus may include a second controller that is the central controller, or the central controller may be the only controller for the apparatus. Thus, for example, a first mix facility may have a first sensor to monitor a first characteristic of the first mix operation, and a second mix facility may have a second sensor to monitor a second characteristic of a second mix operation, and both may send information regarding the first and second characteristics to a central controller, which processes the information and transmit a signal to the first, second, or even a third, fourth, fifth, etc., mix operation to adjust conditions based on the first and second signals from the first and second sensors. Additional information that will be typically transmitted to the central controller includes mix components for the mixes at the first and second mix operations (e.g., type and amount of cement binder, amount of water and w/c ratio, types and amounts of aggregate, whether aggregate was wet or dry, admixtures, and the like) amount, rate, and timing of carbon dioxide addition, and any other characteristic of the first and second mix operations that would be useful for determining conditions to modulate future mix operations based on the characteristics achieved in past mix operations. Any number of mix operations may input information to the central controller, e.g., at least 2, 3, 4, 5, 6, 7, 8, 9, or 10 mix operations, or at least 15, 20, 25, 30, 40, 50, 60, 70, 80, 90, or 100 mix operations. The central controller may also receive any other information that may be suitable to informing decisions regarding mix operations to optimize one or more conditions of the mix operation and/or of the cement mix produced in the operation. For example, the central controller may receive information from experiments conducted with various types of cements (e.g., various types of Portland cements) carbonated under various conditions, and/or exposed to various admixtures, such as at different times, or in different concentrations, and the like, and the resulting characteristics of the cement mix, such as rheology at one or more timepoints, strength at one or more timepoints, and the like. Any other suitable information, such as information published in literature, or obtained in any manner, may be input into the central controller, e.g., automatically and/or through a Human Machine Interface. The information the central controller receives can be processed and used to adjust cement mix operations at any mix operation to which the central controller can transmit outputs. Thus, the central controller can learn from numerous mix operations to optimize future operations and, over time, can accumulate a database to inform decisions in mix operations at a mix site even if a particular mix recipe and/or conditions have never been used at that site, or even predict optimum conditions for a mix recipe that has not been used at any of the sites to which the controller is connected. The central controller can match to past mix recipes, or predict optimum conditions for a new mix recipe based on suitable algorithms using information in its database, or both.

In certain embodiments in which the controller adjusts a second mix operation based on characteristics monitored in a first mix operation, the one or more characteristics of the mix operation may comprise total amount of carbon dioxide added to the cement mix, rate of addition of carbon dioxide, time of addition of carbon dioxide to the cement mix, whether or not an admixture is added to the cement mix, type of admixture added to the cement mix, timing of addition of admixture to the cement mix, amount of admixture added to the cement mix, amount of water added to the cement mix, timing of addition of water to the cement mix, cooling the cement mix during or after carbon dioxide addition, or a combination thereof.

The controller can be further configured, e.g., programmed, to receive and process information regarding one or more characteristics of the cement mix measured after the cement mix leaves the mixer, and to transmit signals to one or more actuators configured to adjust conditions for the second cement mix batch based on the processing to improve contact with the carbon dioxide or another characteristic of the mix operation in the second mix operation. The one or more characteristics of the cement mix measured after the cement mix leaves the mixer can be rheology of the cement mix at one or more time points, strength of the cement mix at one or more time points, water absorption, shrinkage, and the like. The characteristic monitored can depend on the requirements for a particular mix batch, although other characteristics may also be monitored to provide data to the controller for future batches in which those characteristics would be required.

The use of an apparatus that includes a control system, whether for a single mix operation or for a plurality of mix operations, can produce very high efficiencies of carbon dioxide uptake (ratio of carbon dioxide or carbon dioxide derivatives in the cement mix to total carbon dioxide delivered). In certain embodiments, the apparatus is configured to control one or more actuators such that an efficiency of carbonation of at least 60, 70, 80, 90, 95, 96, 97, 98, 99, or 99.5% is achieved. Such high efficiencies allow for greater sequestration of greenhouse gas without leakage into the atmosphere, as well as a more economical operation.

In certain embodiments, the invention provides a controller for controlling a cement mix mixing operation comprising carbonation of the cement mix in a mixer by exposing the cement mix to carbon dioxide, where the controller comprises (i) an input port for receiving a signal from a sensor that monitors a characteristic of the cement mix mixing operation; (ii) a processor for processing the signal from the sensor and formulating an output signal to modulate the exposure of the cement mix to carbon dioxide or to modulate a characteristic of the cement mix; and (iii) an output port for transmitting the output signal to an actuator that modulates the exposure of the cement mix to carbon dioxide or that modulates a characteristic of the cement mix. The input and output ports may be configured to be wired to the sensor or actuator, or to receive a wireless signal, or a combination of such ports may be used. In certain embodiments, the input port is configured to receive a plurality of signals from a plurality of sensors, and the processor is configured to process the plurality of signals and formulate an output signal to modulate the exposure of the cement mix to carbon dioxide or to modulate a characteristic of the cement mix. Thus, the input port may include a plurality separate ports that are wired to various sensors, or a wireless port that is configured to receive signals from a plurality of sensors, or a combination of one or more wired and wireless ports for one or more sensors. The controller can be is configured to formulate a plurality of output signals to modulate the exposure of the cement mix to carbon dioxide or to modulate a characteristic of the cement mix and the output port is configured to transmit the plurality of signals. Similar to an input port for a plurality of signals, this can be a wired output port with a plurality of ports, a wireless port configured to send a plurality of signals, or a combination of wired and wireless ports to send one or more signals each.

The controller may be configured to process any signal from any suitable sensor, such as described herein, and to send output to any suitable actuator, such as described herein. The controller may also be configured to send information to a central controller, or may itself be a central controller that is configured to receive input from, and send output to, a plurality of mix operations, also as described herein.

In certain embodiments, the invention provides a network comprising a plurality of spatially separate cement mix operations, such as at least 2, 3, 4, 5, 6, 7, 8, 9, or 10, or at least 20, 30, 40, 50, 70, or 100 separate mix operations, each of which comprises at least one sensor for monitoring at least one characteristic of its operation, and comprising a central processing unit, to which each sensor sends its information and which stores and/or processes the information. Alternatively, or in addition, information regarding at least one characteristic of the mix operation may be input manually into the central processing unit, e.g., through a HMI. One or more of the mix operations may be a mix operation in which the cement mix is carbonated, e.g., as described herein, such as a mix operation in which the cement is carbonated, i.e., exposed to carbon dioxide in such a way that the carbon dioxide is taken up by the cement mix, during mixing. The mix operations may also include sensors or other elements by which one or more characteristics of the cement mix is monitored, before, during, or after mixing, e.g., also as described herein, which transmit information to the central processor. The central processor may also be configured to output signals to one or more of the mix operations, or to other mix operations, based on the processing of the signals.

In certain embodiments, the invention provides an apparatus for producing a cement mix, e.g., hydraulic cement mix comprising (i) a mixer for mixing a cement mix, e.g., hydraulic cement mix; and (ii) a system for exposing the cement mix, e.g., hydraulic cement mix to carbon dioxide during mixing, wherein the system is configured to deliver carbon dioxide to the surface of the cement mix, e.g., hydraulic cement mix.

In certain embodiments, the invention provides an apparatus for mixing a cement mix, e.g., hydraulic cement mix comprising (i) a mixer for mixing the cement mix, e.g., hydraulic cement mix; (ii) a system for contacting the cement mix, e.g., hydraulic cement mix with carbon dioxide directed to the cement mix, e.g., hydraulic cement mix operably connected to the mixer; (iii) a sensor positioned and configured to monitor one or more characteristics of the cement mix, e.g., hydraulic cement mix, a gas mixture in contact with the cement mix, e.g., hydraulic cement mix, a component of a cement mix, e.g., hydraulic cement mix apparatus, or a component exposed to the cement mix, e.g., hydraulic cement mix; and(iv) an actuator operably connected to the sensor for modulating the flow of the carbon dioxide based on the characteristic monitored. In certain aspects of this embodiment, the system for contacting the cement mix, e.g., hydraulic cement mix with carbon dioxide comprises a system a system for contacting the cement mix, e.g., hydraulic cement mix with a flow of carbon dioxide directed to the cement mix, e.g., hydraulic cement mix.

In certain embodiments, the invention provides an apparatus for retrofitting an existing cement mix, e.g., hydraulic cement mixer comprising a conduit configured to be operably connected to a source of carbon dioxide and to the mixer, for delivering carbon dioxide from the source to the mixer. The apparatus may comprise the source of carbon dioxide. The apparatus may comprise an actuator for controlling delivery of carbon dioxide from a source of carbon dioxide through the conduit, wherein the actuator is operably connected or is configured to be operably connected to a control system. The apparatus may further comprise the control system. The control system may comprise a timer and a transmitter for sending a signal to the actuator based on the timing of the timer. The control system may be an existing control system for the mixer. The apparatus may comprise instructions for modifying the existing control system to control the actuator. The actuator may be operably connected to or configured to be operably connected to the conduit, the mixer, a control system for the mixer, or to a source of carbon dioxide, or a combination thereof. The actuator may control a valve so as to control delivery of carbon dioxide to the mixer. The apparatus may comprise one or more sensors operably connected to, or configured to be operably connected to, the control system for monitoring one or more characteristics of the cement mix, e.g., hydraulic cement mix, a gas mixture adjacent to the cement mix, e.g., hydraulic cement mix, or a component in contact with the cement mix, e.g., hydraulic cement mix. The one or more sensors may be a sensor for monitoring carbon dioxide concentration of a gas or a temperature.

In certain embodiments, the invention provides a system for exposing a cement mix, e.g., hydraulic cement mix within a transportable mixer to carbon dioxide comprising (i) a source of carbon dioxide that is more than 50% pure carbon dioxide; (ii) a transportable mixer for mixing a cement mix, e.g., hydraulic cement mix; and (iii) a conduit operably connected to the source of carbon dioxide and to the mixer for delivering carbon dioxide from the source of carbon dioxide to the cement mix, e.g., hydraulic cement mix. The system may further comprise an actuator operably connected to the conduit for controlling the flow of the carbon dioxide. The actuator may comprise a valve. The system may comprise a controller operably connected to the actuator, where the controller is configured to operate the actuator based on predetermined parameters, on feedback from one or more sensors, or a combination thereof. In certain embodiments the source of carbon dioxide and the conduit are housed in a portable unit that can be moved from one readymix site to another, to provide carbon dioxide to more than one readymix truck.

In certain embodiments, the invention provides a system for exposing a cement mix, e.g., hydraulic cement mix within a mixer to carbon dioxide comprising (i) a source of carbon dioxide; (ii) the mixer for mixing the cement mix, e.g., hydraulic cement mix; (iii) a conduit operably connected to the source of carbon dioxide and to the mixer for delivering carbon dioxide from the source of carbon dioxide to the cement mix, e.g., hydraulic cement mix; (iv) a sensor positioned and configured to monitor one or more one or more characteristics of the cement mix, e.g., hydraulic cement mix, a gas mixture adjacent to the cement mix, e.g., hydraulic cement mix, or a component in contact with the cement mix, e.g., hydraulic cement mix; and (v) an actuator operably connected to the sensor and to the system for exposing the cement mix, e.g., hydraulic cement mix to carbon dioxide, wherein the actuator is configured to alter the exposure of the cement mix, e.g., hydraulic cement mix to the carbon dioxide based on the characteristic monitored by the sensor. The mixer may be a stationary mixer. The mixer may be a transportable mixer.

V. Compositions

The invention also provides compositions, e.g., compositions that may be produced by the methods described herein. In certain embodiment the concrete mix is fluid, that is, capable of being mixed in the mixer and poured for its intended purpose. In certain embodiments the invention provides a composition that is a dry carbonated concrete mix that is fluid and compactable, e.g., sufficiently fluid and compactable to be placed in a mold for a pre-cast concrete product, that comprises hydraulic cement, e.g., OPC, and carbon dioxide and/or reaction products of carbon dioxide with the OPC and/or other components of the mix, and, optionally, one or more of aggregates and an admixture, such as an admixture to modulate the compactability of the carbonated concrete mix, and/or a strength accelerator. In certain embodiments the admixture comprises a set retarder, such as a sugar or sugar derivative, e.g., sodium gluconate. In certain embodiments the invention provides a composition that is a wet carbonated concrete mix that is fluid and pourable, e.g., sufficiently fluid and pourable to be poured in a mold at a construction site, that comprises hydraulic cement, e.g., OPC, and carbon dioxide and/or reaction products of carbon dioxide with the OPC and/or other components of the mix, and, optionally, one or more of aggregates and an admixture, such as an admixture to modulate the flowability of the carbonated concrete mix, and/or a strength accelerator. In certain embodiments the admixture comprises a set retarder, such as a sugar or sugar derivative, e.g., sodium gluconate.

In some methods, solid carbon dioxide (dry ice) is added to the cement mix, producing a composition comprising a cement mix, such as a hydraulic cement mix such as concrete, and solid carbon dioxide. The solid carbon dioxide may be present in an amount of greater than 0.01, 0.05, 0.1, 0.2, 0.3, 0.4, 0.5, 0.6, 0.7, 0.8, 0.9, 1.0, 1.1, 1.2, 1.3, 1.4, 1.5, 1.7, 2.0, or 2.5% bwc, or 0.01-5%, 0.01-2%, 0.01-1%, 0.01-0.5%, 0.1-5%, 0.1-2%, 0.1-1%, or 0.1-0.5%. In certain embodiments the invention provides a cement mix comprising gaseous carbon dioxide or carbon dioxide reaction products, such as carbonates, and solid carbon dioxide. The solid carbon dioxide may be present in an amount of greater than 0.01, 0.05, 0.1, 0.2, 0.3, 0.4, 0.5, 0.6, 0.7, 0.8, 0.9, 1.0, 1.1, 1.2, 1.3, 1.4, 1.5, 1.7, 2.0, or 2.5% bwc or 0.01-5%, 0.01-2%, 0.01-1%, 0.01-0.5%, 0.1-5%, 0.1-2%, 0.1-1%, or 0.1-0.5%. The gaseous carbon dioxide or carbon dioxide reaction products may be present in an amount of greater than 0.01, 0.05, 0.1, 0.2, 0.3, 0.4, 0.5, 0.6, 0.7, 0.8, 0.9, 1.0, 1.1, 1.2, 1.3, 1.4, 1.5, 1.7, 2.0, or 2.5% bwc, or 0.01-5%, 0.01-2%, 0.01-1%, 0.01-0.5%, 0.1-5%, 0.1-2%, 0.1-1%, or 0.1-0.5%. Carbon dioxide reaction products include carbonic acid, bicarbonate, and all forms of calcium carbonate (e.g., amorphous calcium carbonate, vaterite, aragonite, and calcite), as well as other products formed by the reaction of carbon dioxide with various components of the cement mix. The solid carbon dioxide may be added as a single block, or more than one block, such as more than 2, 3, 4, 5, 6, 7, 8, 9, 10, 20, 50, or 100 blocks. In some embodiments, the solid carbon dioxide is formed from release of liquid carbon dioxide into the mix.

The cement mix may contain an admixture, such as any admixture as described herein, e.g., a carbohydrate or carbohydrate derivative, such as sodium gluconate. The admixture may be present in an amount of greater than 0.01, 0.05, 0.1, 0.2, 0.3, 0.4, 0.5, 0.6, 0.7, 0.8, 0.9, 1.0, 1.1, 1.2, 1.3, 1.4, 1.5, 1.7, 2.0, or 2.5%; or greater than 0.01, 0.05, 0.1, 0.2, 0.3, 0.4, 0.5, 0.6, 0.7, 0.8, 0.9, 1.0, 1.1, 1.2, 1.3, 1.4, 1.5, 1.7, 2.0, or 2.5% and less than 0.05, 0.1, 0.2, 0.3, 0.4, 0.5, 0.6, 0.7, 0.8, 0.9, 1.0, 1.1, 1.2, 1.3, 1.4, 1.5, 1.7, 2.0, 2.5 or 3.0%, e.g., any range that may be expressed as the greater than and less than amounts. Exemplary ranges include 0.01-3.0%, 0.01-1.5%, 0.01-1%, 0.01-0.5%, 0.01-0.4%, 0.01-0.2%, 0.01-0.1%, 0.1-3.0%, 0.1-1.5%, 0.1-1%, 0.1-0.5%, 0.1-0.4%, 0.1-0.2%, or 0.1-0.1%.

It has been found that the addition of carbon dioxide to a cement mix during mixing results in the formation of nanocrystals of calcium carbonate. Earlier work has shown that adding exogenous nanocrystalline calcium carbonate (e.g., calcium carbonate with a particle size in a range of 50-120 nm) to a concrete mix improved the hydration of the mix; however, when exogenously supplied calcium carbonate is used, a large quantity, such as 10% bwc, is needed to achieve the desired effect, probably due to clumping of the added nanocrystals. In contrast, the calcium carbonate nanocrystals can be formed in situ, without clumping, and thus a much greater dispersion can be achieved; i.e., homogeneously dispersed nanocrystals as opposed to dispersion with clumping. Without being bound by theory, it is possible that the performance improvement observed due to the formation of carbonate reaction products in some carbonate concrete mixes is analogous to growing an in-situ nanoparticle $CaCO_3$ addition that would act as nucleation sites and impact later hydration product development.

Thus, for example, in certain embodiments, the incidence of discrete single nanocrystals of calcium carbonate of less than 500 nm, or less than 400 nm, or less than 300 nm, or less than 200 nm particle size, such as homogenously dispersed nanocrystals without clumping, or without substantial clumping, may be over 10, 20, 30, 40, 50, 60, or 80% of the calcium carbonate in the composition. "Particle size" refers to length of the longest dimension of the crystals, and may be determined, e.g., by scanning electron microscopy. The calcium carbonate may comprise less than 5%, 4%, 3%, 2.5%, 2.0%, 1.9%, 1.8%, 1.7%, 1.6% 1.5%, 1.4%, 1.3%, 1.2%, 1.1%, 1.0%, 0.9%, 0.8%, 0.7%, 0.6%, 0.5%, 0.4%, 0.3%, 0.2%, or 0.1% bwc of the composition, e.g., cement mix composition such as a hydraulic cement mix, e.g., concrete composition, in certain embodiments comprising, e.g., also comprising, at least 0.001%, 0.01%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.7%, 3.0%, or 4.0% bwc of the composition, e.g., cement mix composition such as a hydraulic cement mix, e.g., concrete composition. For example, in certain embodiments the calcium carbonate comprises 0.001-5.0% bwc of the composition; in certain embodiments the calcium carbonate comprises 0.001-4.0% bwc of the composition; in certain embodiments the calcium carbonate comprises 0.001-3.0% bwc of the composition; in certain embodiments, the calcium carbonate comprises 0.001-2.5% bwc of the composition; in certain embodiments the calcium carbonate comprises 0.001-2.0% bwc of the composition; in certain embodiments the calcium carbonate comprises 0.001-1.5% bwc of the composition; in certain embodiments the calcium carbonate comprises 0.001-1.3% bwc of the composition; in certain embodiments the calcium carbonate comprises 0.001-1.0% bwc of the composition; in certain embodiments the calcium carbonate comprises 0.001-0.8% bwc of the composition; in certain embodiments the calcium carbonate comprises 0.001-0.6% bwc of the composition; in certain embodiments the calcium carbonate comprises 0.001-0.5% bwc of the composition; in certain embodiments the calcium carbonate comprises 0.001-0.4% bwc of the composition; in certain embodiments the calcium carbonate comprises 0.001-0.3% bwc of the composition; in certain embodiments the calcium carbonate comprises 0.001-0.2% bwc of the composition; in certain embodiments the calcium carbonate comprises 0.001-0.1% bwc of the composition; in certain embodiments the calcium carbonate comprises 0.01-5.0% bwc of the composition; in certain embodiments the calcium carbonate comprises 0.01-4.0% bwc of the composition; in certain embodiments the calcium carbonate comprises 0.01-3.0% bwc of the composition; in certain embodiments the calcium carbonate comprises 0.01-2.5% bwc of the composition; in certain embodiments the calcium carbonate comprises 0.01-2.0% bwc of the composition; in certain embodiments the calcium carbonate comprises 0.01-1.5% bwc of the composition; in certain embodiments the calcium carbonate comprises 0.01-1.3% bwc of the composition; in certain embodiments the calcium carbonate comprises 0.01-1.0% bwc of the composition; in certain embodiments the calcium carbonate comprises 0.01-0.8% bwc of the composition; in certain embodiments the calcium carbonate comprises 0.01-0.6% bwc of the composition; in certain embodiments the calcium carbonate comprises 0.01-0.4% bwc of the composition; in certain embodiments the calcium carbonate comprises 0.01-0.3% bwc of the composition; in certain embodiments the calcium carbonate comprises 0.01-0.2% bwc of the composition; in certain embodiments the calcium carbonate comprises 0.01-

0.1% bwc of the composition; in certain embodiments the calcium carbonate comprises 0.1-5.0% bwc of the composition; in certain embodiments the calcium carbonate comprises 0.1-4.0% bwc of the composition; in certain embodiments the calcium carbonate comprises 0.1-3.0% bwc of the composition; in certain embodiments the calcium carbonate comprises 0.1-2.5% bwc of the composition; in certain embodiments the calcium carbonate comprises 0.1-2.0% bwc of the composition; in certain embodiments the calcium carbonate comprises 0.1-1.5% bwc of the composition; in certain embodiments the calcium carbonate comprises 0.1-1.3% bwc of the composition; in certain embodiments the calcium carbonate comprises 0.1-1.0% bwc of the composition; in certain embodiments the calcium carbonate comprises 0.1-0.8% bwc of the composition; in certain embodiments the calcium carbonate comprises 0.1-0.6% bwc of the composition; in certain embodiments the calcium carbonate comprises 0.1-0.4% bwc of the composition; in certain embodiments the calcium carbonate comprises 0.1-0.3% bwc of the composition; in certain embodiments the calcium carbonate comprises 0.1-0.2% bwc of the composition. In certain embodiments, the composition is a concrete composition comprising hydraulic cement, e.g., Portland cement, and aggregate, where the hydraulic cement comprises less than 35%, 30%, 25%, 23%, 20%, 18%, 15%, 13%, or 10% by weight of the concrete composition, in certain embodiments comprising, e.g., also comprising, at least 5%, 8%, 10%, 13%, 15%, 20%, 23%, 25%, or 30% by weight of the concrete composition. For example, in certain embodiments the hydraulic cement comprises 5-35% by weight of the concrete composition; in certain embodiments the hydraulic cement comprises 5-30% by weight of the concrete composition; in certain embodiments the hydraulic cement comprises 5-25% by weight of the concrete composition; in certain embodiments the hydraulic cement comprises 5-23% by weight of the concrete composition; in certain embodiments the hydraulic cement comprises 5-20% by weight of the concrete composition; in certain embodiments the hydraulic cement comprises 5-18% by weight of the concrete composition; in certain embodiments the hydraulic cement comprises 5-15% by weight of the concrete composition; in certain embodiments the hydraulic cement comprises 10-35% by weight of the concrete composition; in certain embodiments the hydraulic cement comprises 10-30% by weight of the concrete composition; in certain embodiments the hydraulic cement comprises 10-25% by weight of the concrete composition; in certain embodiments the hydraulic cement comprises 10-23% by weight of the concrete composition; in certain embodiments the hydraulic cement comprises 10-20% by weight of the concrete composition; in certain embodiments the hydraulic cement comprises 10-18% by weight of the concrete composition; in certain embodiments the hydraulic cement comprises 10-15% by weight of the concrete composition; in certain embodiments the hydraulic cement comprises 15-35% by weight of the concrete composition; in certain embodiments the hydraulic cement comprises 15-30% by weight of the concrete composition; in certain embodiments the hydraulic cement comprises 15-25% by weight of the concrete composition; in certain embodiments the hydraulic cement comprises 15-23% by weight of the concrete composition; in certain embodiments the hydraulic cement comprises 15-20% by weight of the concrete composition; in certain embodiments the hydraulic cement comprises 15-18% by weight of the concrete composition. The composition may be a wet concrete composition, for example, a flowable concrete composition, or it may be a concrete composition that has undergone set and/or hardening. In certain embodiment, it can be assumed for purposes of determining calcium carbonate content of a composition that all carbon dioxide in the composition has been converted to calcium carbonate, and that a value from a test for carbonation can be converted to a calcium carbonate value; for example, if a test of carbonation for a concrete mix shows an uptake of carbon dioxide of 0.6% bwc, it can be assumed that the composition is 1.4% bwc of calcium carbonate. Any suitable test for carbonation may be used, such as those described herein.

As crystal formation starts, crystal size for at least 10, 20, 30, 40, or 50% of the calcium carbonate in the composition may be less 100, 80, 60, 50, 40, or 30 nm. In addition, the polymorphic composition of the crystals may vary, depending on the time the composition has been reacting, the timing of addition of carbon dioxide, the use of crystal-modifying admixtures, and the like. In certain embodiments, at least 1, 5, 10, 20, 30, 40, or 50% of the calcium carbonate in the composition is amorphous calcium carbonate, or 0.01-50%, 0.1-50%, 1-50%, 5-50%, 10-50%, or 20-50%. In certain embodiments, at least 1, 5, 10, 20, 30, 40, or 50% of the calcium carbonate in the composition is vaterite, 0.01-50%, 0.1-50%, 1-50%, 5-50%, 10-50%, or 20-50%. In certain embodiments, at least 1, 5, 10, 20, 30, 40, or 50% of the calcium carbonate in the composition is aragonite, 0.01-50%, 0.1-50%, 1-50%, 5-50%, 10-50%, or 20-50%. In certain embodiments, at least 1, 5, 10, 20, 30, 40, or 50% of the calcium carbonate in the composition is calcite, or 0.01-99.9%, 0.1-99.9%, 1-99%, 5-99.9%, 10-99.9%, 30-99.9%, 50-99.9%, 0.01-90%, 0.1-90%, 1-90%, 5-90%, 10-90%, 30-90%, 50-90%, 0.01-80%, 0.1-80%, 1-80%, 5-80%, 10-80%, 30-80%, 50-80%. Any combination of amorphous calcium carbonate, vaterite, aragonite, and/or calcite may also be present, for example at the indicated percentages.

Compositions may also include one or more supplementary cementitious materials (SCMs) and/or cement replacements, as described elsewhere herein. In certain embodiments, a composition includes, in addition to cement, one or more SCMS and/or cement replacements, for example blast furnace slag, fly ash, silica fume, natural pozzolans (such as metakaolin, calcined shale, calcined clay, volcanic glass, zeolitic trass or tuffs, rice husk ash, diatomaceous earth, and calcined shale), waste glass, limestone, recycled/waste plastic, scrap tires, municipal solid waste ash, wood ash, cement kiln dust, or foundry sand, at a suitable percentage of the composition bwc, such as 0.1-100%, or 1-100%, or 5-100%, or 10-100%, or 20-100%, or 30-100%, or 40-100%, or 50-100%, or 0.1-80%, or 1-80%, or 5-80%, or 10-80%, or 20-80%, or 30-80%, or 40-80%, or 50-80%, or 0.1-50%, or 1-50%, or 5-50%, or 10-50%, or 20-50%, or 30-50%, or 0.1-40%, or 1-40%, or 5-40%, or 10-40%, or 20-40% bwc. In certain embodiments, the composition includes an SCM and in some of these embodiments the SCM is fly ash, slag, silica fume, or a natural pozzolan. In certain embodiment, the SCM is fly ash. In certain embodiments, the SCM is slag. Further embodiments in which SCM is used are described elsewhere herein.

Thus, in certain embodiments, the invention provides a fluid cement mix, e.g., hydraulic cement mix composition comprising (i) a wet cement mix, e.g., hydraulic cement mix comprising hydraulic cement and water in a w/c ratio of no more than 0.4, or 0.3, or 0.2 and (ii) carbon dioxide or carbonation product in an amount of at least 0.05% by weight of cement (bwc). The composition is in a mixable and/or flowable state, e.g., set and hardening have not progressed to the point where the mixture can no longer be mixed by the apparatus in which it is formed. The composition may further comprise (ii) an admixture for modulating the flowability of the cement mix, e.g., hydraulic cement mixture. The admixture may a polycarboxylate superplasticer, a naphthalene HRWR, or a combination thereof.

In certain embodiments, the invention provides a fluid cement mix, e.g., hydraulic cement mix composition comprising (i) a wet cement mix, e.g., hydraulic cement mix comprising hydraulic cement and water; (ii) carbon dioxide or carbonation product in an amount of at least 0.05% bwc; (iii) an admixture for modulating the flowability of the wet hydraulic cement mix. In certain embodiments the admixture comprises a polycarboxylate superplasticer, a naphthalene HRWR, or any combination thereof.

In certain embodiments, the invention provides a cement mix, e.g., hydraulic cement mix composition, which may be a fluid cement mix, comprising (i) a wet cement mix, e.g., hydraulic cement mix comprising hydraulic cement and water; (ii) carbon dioxide in solid, liquid, and/or gaseous form, or in aqueous solution as carbonic acid or bicarbonate, in an amount of 0.01-2% bwc; (iii) solid calcium carbonate in an amount of 0.01-2% bwc; and (iii) a supplementary cementitious material and/or cement replacement. In certain embodiments, the carbon dioxide comprises carbon dioxide in solid form. During mixing and later set and hardening, various intermediate compositions are produced, so that initial compositions may contain mostly carbon dioxide in gaseous, liquid, solid form or in solution with little calcium carbonate formation, and later compositions may contain mostly calcium carbonate with little carbon dioxide in gaseous, liquid, solid form or in solution. In certain embodiments, the SCM and/or cement replacement comprises 0.1-50%, or 1-50%, or 5-50%, or 10-50%, or 20-50%, or 1-40%, or 5-40%, or 10-50%, or 20-40% bwc in the composition. In certain embodiments, the SCM and/or cement replacement is blast furnace slag, fly ash, silica fume, natural pozzolans (such as metakaolin, calcined shale, calcined clay, volcanic glass, zeolitic trass or tuffs, rice husk ash, diatomaceous earth, and calcined shale), limestone, waste glass, recycled/waste plastic, scrap tires, municipal solid waste ash, wood ash, cement kiln dust, or foundry sand, or a combination thereof. In certain embodiments, an SCM is used and in certain of these embodiments, the SCM is blast furnace slag, fly ash, silica fume, or natural pozzolan, or a combination thereof. In certain embodiments, the SCM is blast furnace slag. In certain embodiments, the SCM is fly ash. In certain embodiments, the SCM is silica fume. In certain embodiments, the SCM is a natural pozzolan. In certain embodiments the hydraulic cement is Portland cement. The composition may further comprise an admixture. In certain embodiments, the admixture is a carbohydrate or carbohydrate derivative, such as sodium gluconate. The admixture may be present at any suitable concentration, such as 0.01-2%, or 0.01-1%, or 0.01-0.5%, or 0.01-0.4%, or 0.01-0.3%, or 0.01-0.2%, or 0.01-0.1%. The polymorphic composition of the calcium carbonate may include any of the polymorphs described herein. In certain embodiments, at least 1, 5, 10, 20, 30, 40, or 50% of the calcium carbonate in the composition is amorphous calcium carbonate, or 0.01-50%, 0.1-50%, 1-50%, 5-50%, 10-50%, or 20-50%. In certain embodiments, at least 1, 5, 10, 20, 30, 40, or 50% of the calcium carbonate in the composition is vaterite, or 0.01-50%, 0.1-50%, 1-50%, 5-50%, 10-50%, or 20-50%. In certain embodiments, at least 1, 5, 10, 20, 30, 40, or 50% of the calcium carbonate in the composition is aragonite, or 0.01-50%, 0.1-50%, 1-50%, 5-50%, 10-50%, or 20-50%. In certain embodiments, at least 1, 5, 10, 20, 30, 40, or 50% of the calcium carbonate in the composition is calcite, or 0.01-99.9%, 0.1-99.9%, 1-99%, 5-99.9%, 10-99.9%, 30-99.9%, 50-99.9%, 0.01-90%, 0.1-90%, 1-90%, 5-90%, 10-90%, 30-90%, 50-90%, 0.01-80%, 0.1-80%, 1-80%, 5-80%, 10-80%, 30-80%, 50-80%. Any combination of amorphous calcium carbonate, vaterite, aragonite, and/or calcite may also be present, for example at the indicated percentages.

In certain embodiments, the invention provides a set or hardened cement mix, e.g., hydraulic cement mix composition such as a set or hardened concrete, comprising (i) reaction products formed in a wet cement mix, e.g., hydraulic cement mix comprising hydraulic cement and water, such as reaction products of a Portland cement mix; (iii) calcium carbonate in an amount of 0.01-5% bwc, or 0.01-2% bwc, where the calcium carbonate is present as crystals or particles wherein at least 10, 20, 50, 70, or 90% of the particles are less than 1 µm, or less than 500 nm, or less than 400 nm, or less than 200 nm in average dimension; and (iii) a supplementary cementitious material and/or cement replacement and/or reaction products of supplementary cementitious material or cement replacement. In certain embodiments, the SCM and/or cement replacement comprises 0.1-50%, or 1-50%, or 5-50%, or 10-50%, or 20-50%, or 1-40%, or 5-40%, or 10-50%, or 20-40% bwc in the composition. In certain embodiments, the SCM and/or cement replacement is blast furnace slag, fly ash, silica fume, natural pozzolans (such as metakaolin, calcined shale, calcined clay, volcanic glass, zeolitic trass or tuffs, rice husk ash, diatomaceous earth, and calcined shale), limestone, waste glass, recycled/waste plastic, scrap tires, municipal solid waste ash, wood ash, cement kiln dust, or foundry sand, or a combination thereof. In certain embodiments, an SCM is used and in certain embodiments, the SCM is blast furnace slag, fly ash, silica fume, or natural pozzolan, or a combination thereof. In certain embodiments, the SCM is blast furnace slag. In certain embodiment, the SCM is fly ash. In certain embodiments, the SCM is silica fume. In certain embodiments, the SCM is a natural pozzolan. In certain embodiments the hydraulic cement or reaction products is Portland cement or Portland cement reaction products. The composition may further comprise an admixture. In certain embodiments, the admixture is a carbohydrate or carbohydrate derivative, such as sodium gluconate. The admixture may be present at any suitable concentration, such as 0.01-2%, or 0.01-1%, or 0.01-0.5%, or 0.01-0.4%, or 0.01-0.3%, or 0.01-0.2%, or 0.01-0.1%. The polymorphic composition of the calcium carbonate may include any of the polymorphs described herein. In certain embodiments, at least 1, 5, 10, 20, 30, 40, or 50% of the calcium carbonate in the composition is amorphous calcium carbonate, or 0.01-50%, 0.1-50%, 1-50%, 5-50%, 10-50%, or 20-50%. In certain embodiments, at least 1, 5, 10, 20, 30, 40, or 50% of the calcium carbonate in the composition is vaterite, or 0.01-50%, 0.1-50%, 1-50%, 5-50%, 10-50%, or 20-50%. In certain embodiments, at least 1, 5, 10, 20, 30, 40, or 50% of the calcium carbonate in the composition is aragonite, or 0.01-50%, 0.1-50%, 1-50%, 5-50%, 10-50%, or 20-50%. In certain embodiments, at least 1, 5, 10, 20, 30, 40, or 50% of the calcium carbonate in the composition is calcite, or 0.01-99.9%, 0.1-99.9%, 1-99%, 5-99.9%, 10-99.9%, 30-99.9%, 50-99.9%, 0.01-90%, 0.1-90%, 1-90%, 5-90%, 10-90%, 30-90%, 50-90%, 0.01-80%, 0.1-80%, 1-80%, 5-80%, 10-80%, 30-80%, 50-80%. Any combination of amorphous calcium carbonate, vaterite, aragonite, and/or calcite may also be present, for example at the indicated percentages.

In certain embodiments, the invention provides a cement mix, e.g., hydraulic cement mix composition, which may be a fluid cement mix, comprising (i) a wet cement mix, e.g., hydraulic cement mix comprising hydraulic cement and water; (ii) calcium carbonate that is nanocrystalline where the incidence of discrete single nanocrystals of less than 500 nm, or less than 400 nm, or less than 300 nm, or less than 200 nm, or less than 100 nm, or less than 50 nm particle size is over 10, 20, 30, 40, 50, 60, or 80% of the calcium carbonate; and (iii) a supplementary cementitious material and/or cement replacement. It will be appreciated that the nanocrystalline character of the composition as a whole may be determined by assaying the nanocrystalline character of one or more representative samples. In certain embodiments, the nanocrystalline calcium carbonate comprises 0.01-5%, or 0.01-2%, or 0.01-1%, or 0.01-0.5%, or 0.01-0.4%, or 0.01-0.3%, or 0.01-0.02%, or 0.01-0.1% of the composition bwc. In certain embodiments, the SCM and/or cement replacement comprises 0.1-50%, or 1-50%, or 5-50%, or 10-50%, or 20-50%, or 1-40%, or 5-40%, or 10-50%, or 20-40% bwc. In certain embodiments, the SCM and/or cement replacement is blast furnace slag, fly ash, silica fume, natural pozzolans (such as metakaolin, calcined shale, calcined clay, volcanic glass, zeolitic trass or tuffs, rice husk ash, diatomaceous earth, and calcined shale), limestone, waste glass, recycled/waste plastic, scrap tires, municipal solid waste ash, wood ash, cement kiln dust, or foundry sand, or a combination thereof. In certain embodiments, an SCM is used and in certain of these embodiments, the SCM is blast furnace slag, fly ash, silica fume, or natural pozzolan, or a combination thereof. In certain embodiments, the SCM is blast furnace slag. In certain embodiment, the SCM is fly ash. In certain embodiments, the SCM is silica fume. In certain embodiments, the SCM is a natural pozzolan. In certain embodiments the hydraulic cement is Portland cement. The composition may further comprise an admixture. In certain embodiments, the admixture is a carbohydrate or carbohydrate derivative, such as sodium gluconate. The admixture may be present at any suitable concentration, such as 0.01-2%, or 0.01-1%, or 0.01-0.5%, or 0.01-0.4%, or 0.01-0.3%, or 0.01-0.2%, or 0.01-0.1%. The polymorphic composition of the nanocrystals may include any of the polymorphs described herein. In certain embodiments, at least 1, 5, 10, 20, 30, 40, or 50% of the calcium carbonate nanocrystals in the composition is amorphous calcium carbonate nanocrystals, or 0.01-50%, 0.1-50%, 1-50%, 5-50%, 10-50%, or 20-50%. In certain embodiments, at least 1, 5, 10, 20, 30, 40, or 50% of the calcium carbonate nanocrystals in the composition is vaterite nanocrystals, or 0.01-50%, 0.1-50%, 1-50%, 5-50%, 10-50%, or 20-50%. In certain embodiments, at least 1, 5, 10, 20, 30, 40, or 50% of the calcium carbonate nanocrystals in the composition is aragonite nanocrystals, 0.01-50%, 0.1-50%, 1-50%, 5-50%, 10-50%, or 20-50%. In certain embodiments, at least 1, 5, 10, 20, 30, 40, or 50% of the calcium carbonate nanocrystals in the composition is calcite nanocrystals, or 0.01-99.9%, 0.1-99.9%, 1-99%, 5-99.9%, 10-99.9%, 30-99.9%, 50-99.9%, 0.01-90%, 0.1-90%, 1-90%, 5-90%, 10-90%, 30-90%, 50-90%, 0.01-80%, 0.1-80%, 1-80%, 5-80%, 10-80%, 30-80%, 50-80%. Any combination of amorphous calcium carbonate, vaterite, aragonite, and/or calcite may also be present, for example at the indicated percentages. It will be appreciated that the polymorphic makeup of the composition as a whole may be estimated by the polymorphic makeup of one or more representative samples of the composition.

EXAMPLES

Example 1

This example describes contacting a wet hydraulic cement mix (concrete) with carbon dioxide during mixing of the concrete.

A series of tests were conducted to contact wet concrete mix with carbon dioxide during mixing of the concrete.

Figure 4:
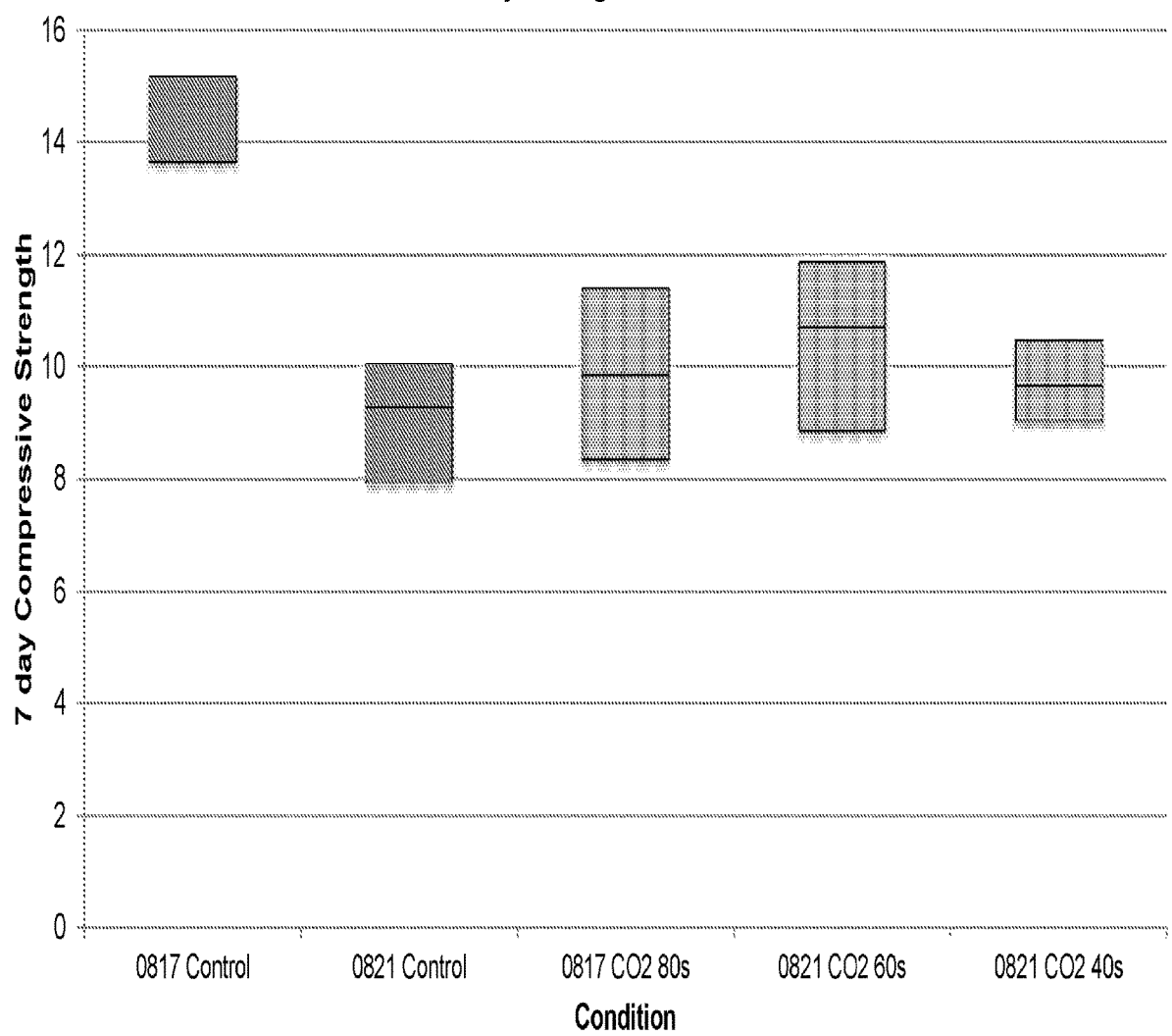
FIG. 4 shows 7-day compressive strengths of concrete prepared from wet mixes exposed to carbon dioxide at various doses.
Figure 5:
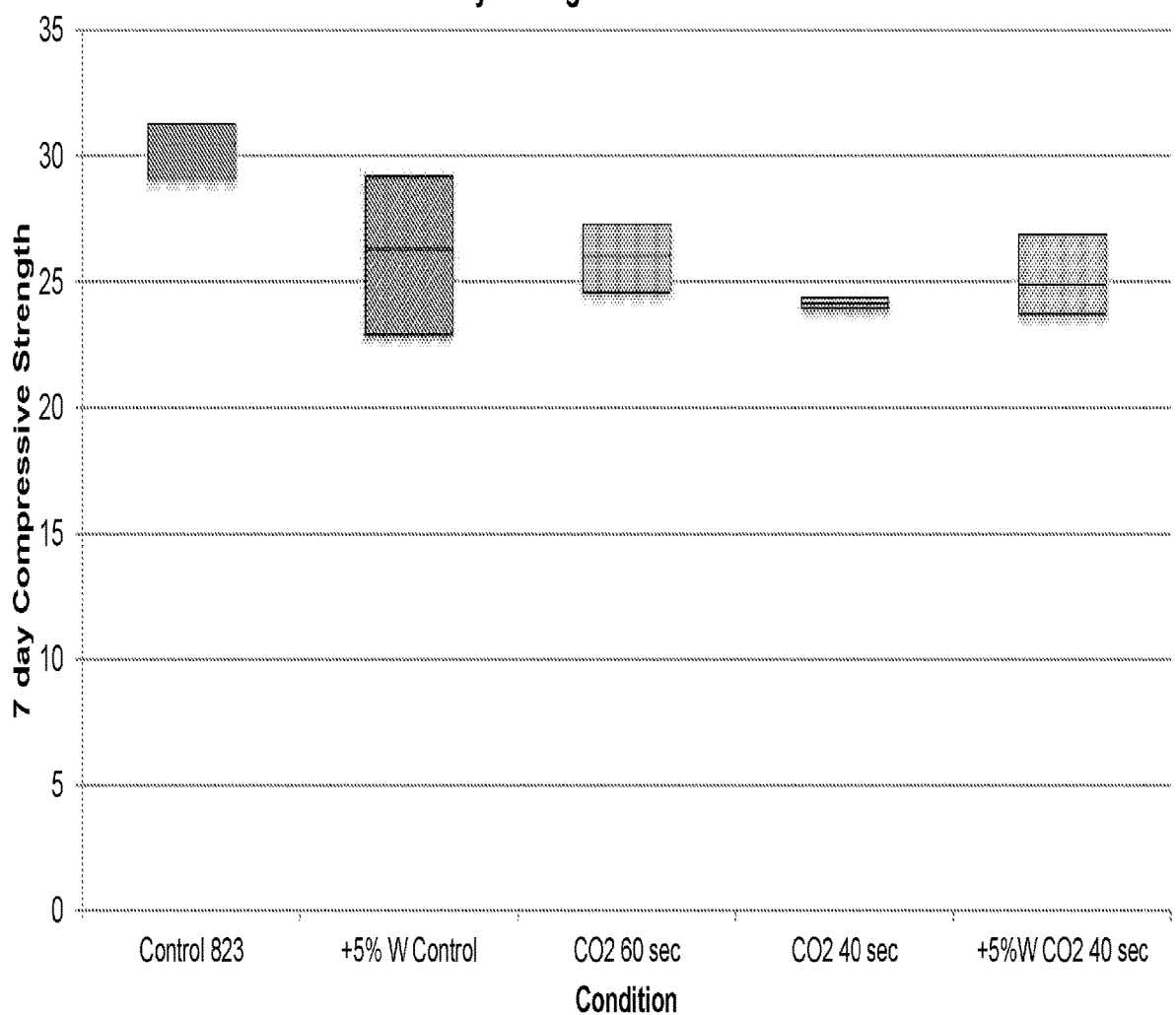
FIG. 5 shows 7-day compressive strengths of concrete prepared from wet mixes exposed to carbon dioxide at various doses and with various water contents.

In a first experiment, bagged readymix concrete (Quikrete or Shaw), 20 kg was mixed with water in a Hobart mixer. The cement content of the concrete was not known but was assumed to be 12-14%. A value of 14% was used in subsequent calculations. 0.957 kg of water, which was 57% of the final water, was added for a w/c ratio of 0.34 and the mixer was topped with a loose lid. The concrete mix was mixed for 1 minute. Then a gas mixture containing carbon dioxide at a concentration of 99.5% (Commercial grade carbon dioxide from Air Liquide, 99.5% CO2, UN1013, CAS:124-38-9) was delivered to contact the surface of the mixing concrete via a tube of approximately ¼" ID whose opening was located approximately 10 cm from the surface of the mixing concrete, at a flow rate of 20 liters per minute (LPM) for 40-80 sec, for a total amount of carbon dioxide of 13.3 L (40 sec) to 26.7 L (80 sec). The remaining water, 0.713 kg, was added to bring the mix to a w/c ratio of 0.6 while the concrete mix continued to be mixed after the carbon dioxide addition for approximately 2 minutes, for a total mix time of approximately 4 minutes, with carbon dioxide addition for 40, 60, or 80 sec during the mixing. In general, the mixing procedure was as follows: mix dry mix and add first water addition over 15 seconds; mix for remainder of one minute; deliver $CO_2$ while mixing for 40, 60 or 80 seconds; when the delivery was 40 seconds there was an additional 20 sec of post-$CO_2$ mixing to bring the step up to one minute, when the delivery was 60 or 80 seconds the next step began immediately after the $CO_2$ was stopped; add the second water addition and mix two minutes. In one test an additional 5% water was added. These tests were done with Shaw pre bagged mix, which required more water and was assumed to contain more cement (17%). The two water additions were 1.15 kg (58% giving 0.34 estimated w/c) and 0.850 kg (to give a total of 2.0 kg of water and estimated 0.59 w/c). In the case of 5% added water it was only applied on the second addition (1.150 kg or 55%, then 0.950 kg for a total of 2.1 kg and estimated 0.62 w/c). Control concrete mixes were prepared with the same final w/c ratio and mixing time, but no addition of carbon dioxide. The mixed concrete was poured into cylinders and strength tests were performed at 7 days. The results are shown in FIGS. 4 and 5, where the bars represent the data range (high to low) and the point in the middle corresponds to the average. The concrete mixes that had been exposed to carbon dioxide showed 7-day strengths comparable to the controls.

Figure 6:
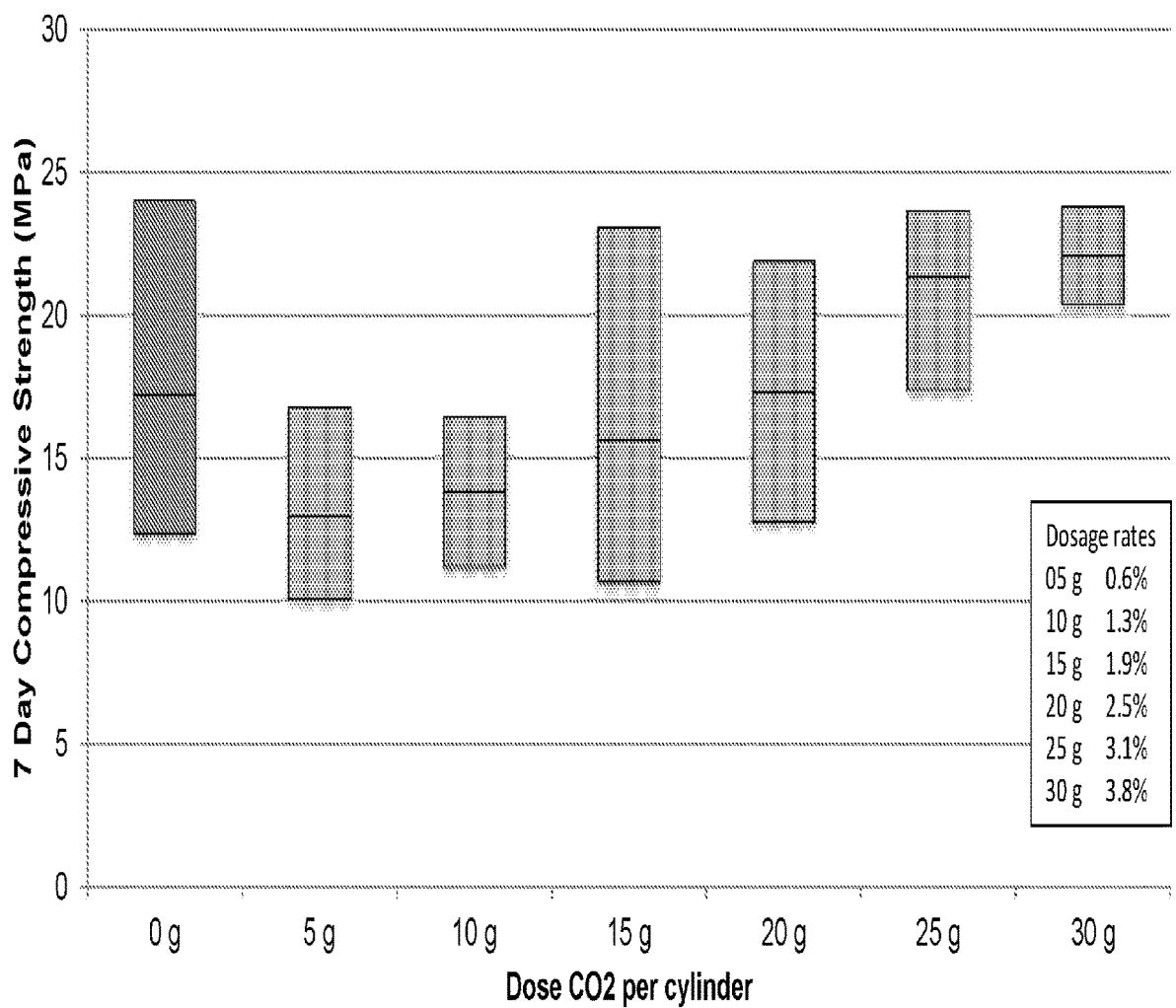
FIG. 6 shows 7-day compressive strengths of concrete prepared from wet mixes exposed to carbon dioxide at various doses.
Figure 7:
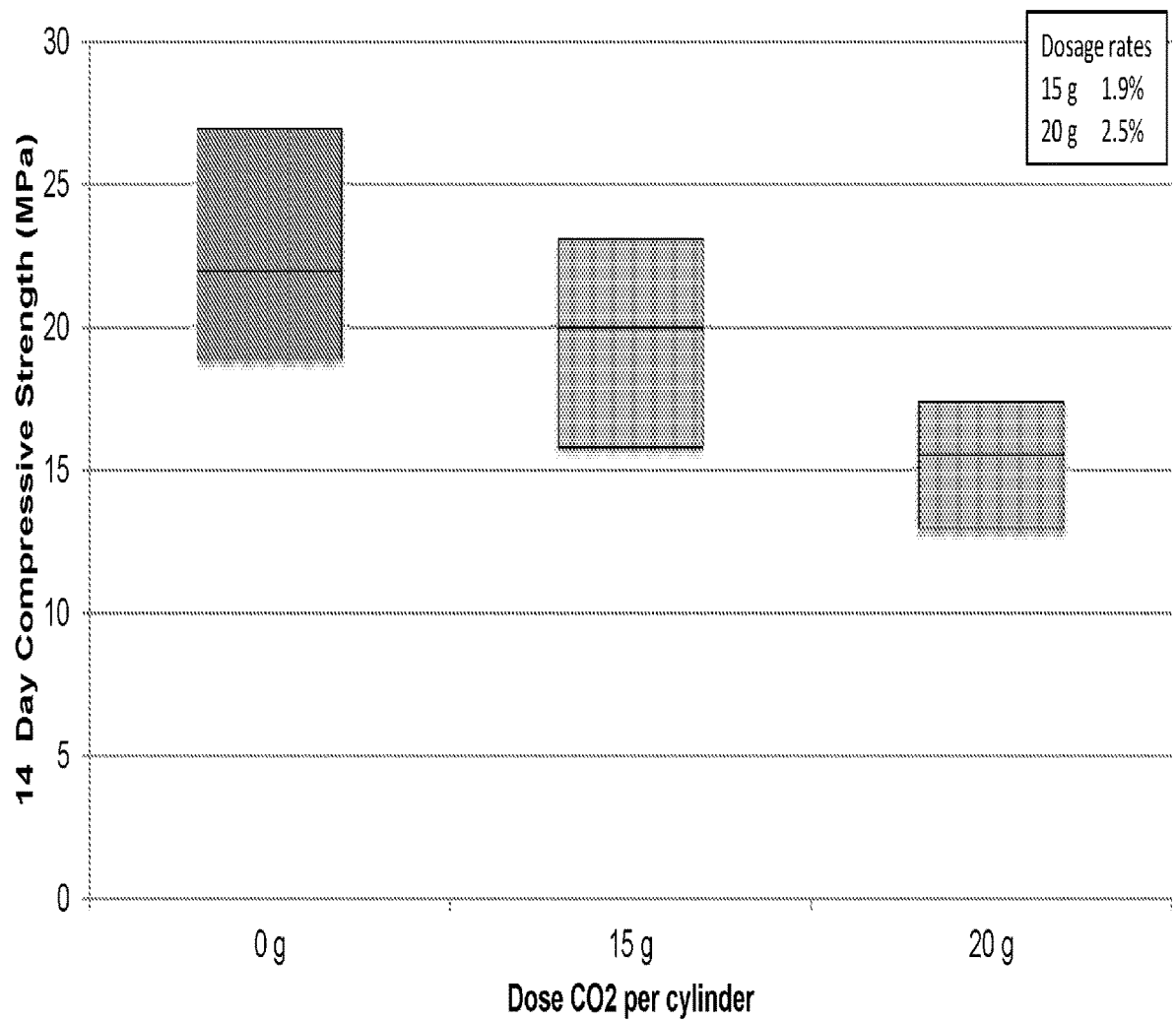
FIG. 7 shows 14-day compressive strengths of concrete prepared from wet mixes exposed to carbon dioxide at various doses.
Figure 8:
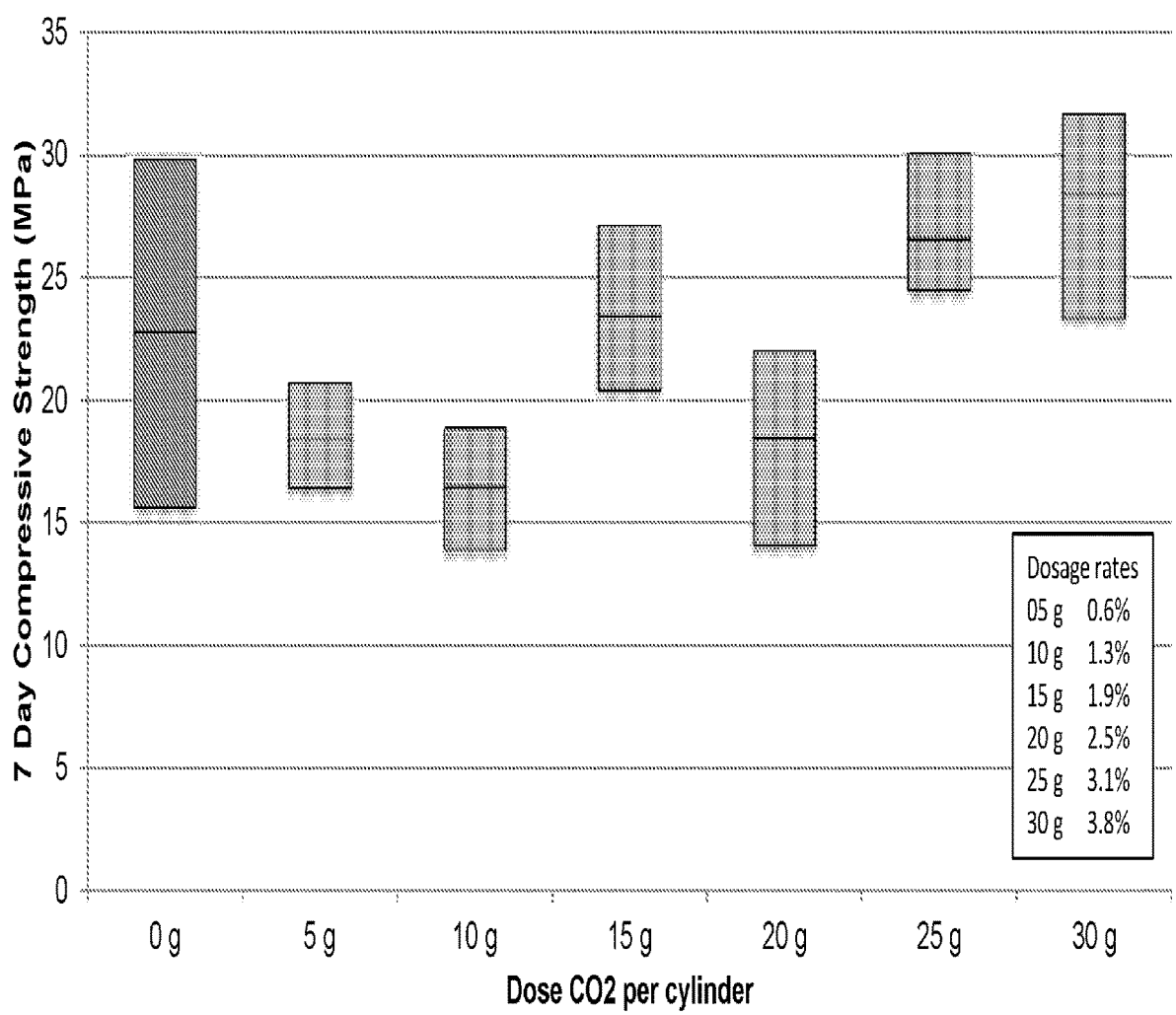
FIG. 8 shows 28-day compressive strengths of concrete prepared from wet mixes exposed to carbon dioxide at various doses.

In a second experiment, several batches were prepared. In each batch, approximately 20 kg of bagged readymix concrete (BOMIX bagged readymix) was mixed with water in a Hobart mixer. The cement content of the concrete was not known but was assumed to be 20%. A first water addition of 0.6 kg (30% of total water) was added for a w/c ratio of 0.15 and the mixer was topped with a loose lid. The concrete mix was mixed for a total of 1 minute. Then a gas mixture containing carbon dioxide at a concentration of 99.5% (Commercial grade carbon dioxide from Air Liquide, 99.5% CO2, UN1013, CAS:124-38-9) was delivered to contact the surface of the mixing concrete via a tube of approximately ¼" ID whose opening was located approximately 10 cm from the surface of the mixing concrete, at various flow rates for different batches, for 60 sec, to give different total carbon dioxide doses for different batches. The remaining water of 1.4 kg was added to bring the mix to a w/c ratio of 0.5 while the concrete mix continued to be mixed after the carbon dioxide addition for approximately 2 minutes, for a total mix time of approximately 4 minutes, with carbon dioxide addition for 60 sec during the mixing (one minute premix, 60 sec $CO_2$ dose, then add remainder of water and finish with two minutes mixing for 4 minutes total). Control concrete mixes were prepared with the same final w/c ratio and mixing time, but no addition of carbon dioxide. The mixed concrete was poured into 5 4 kg cylinders (100 mm diameter by 200 mm, or 4 inches by 8 inches) and strength tests were performed at 7, 14, and 28 days. The carbon dioxide dosage is expressed on a per-cylinder basis, and was 5, 10, 15, 20, 25, or 30 g per cylinder, depending on the batch, which was 0.6, 1.3, 1.9, 2.5, 3.1, or 3.8% carbon dioxide bwc, respectively. The results are shown in FIGS. 6, 7, and 8. The concrete mixes that had been exposed to carbon dioxide showed 7-day compressive strengths comparable to the controls, with a trend toward increasing 7-day strength with increasing carbon dioxide dose (FIG. 6). 14-day compressive strengths were comparable to or lower than controls at two doses, 15 and 20 g (FIG. 7). 28-day compressive strengths were comparable to the control, with a trend toward increasing 28-day strength with increasing carbon dioxide dose (FIG. 8).

Figure 9:
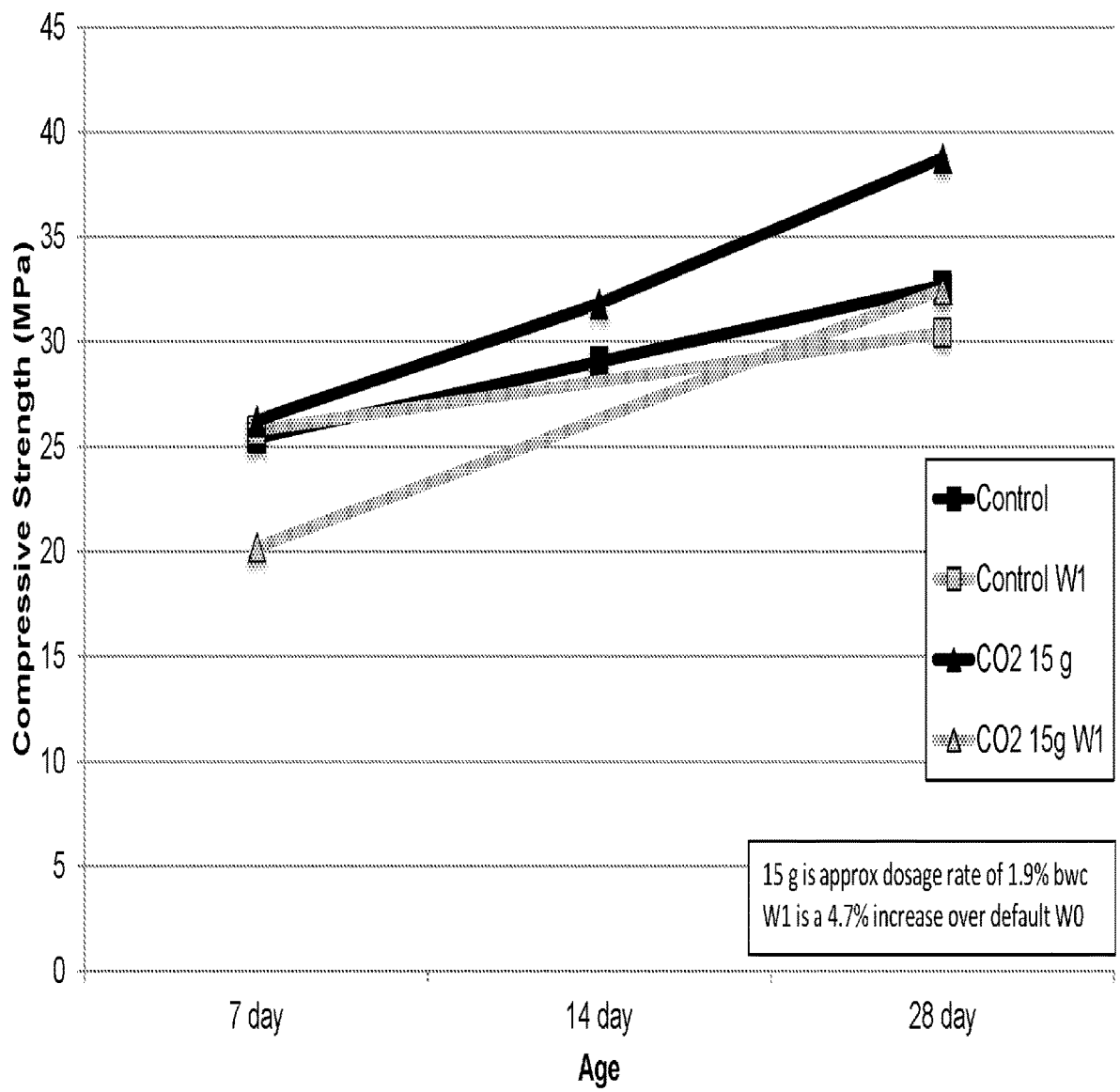
FIG. 9 shows 7-, 14-, and 28-day compressive strengths of concrete prepared from wet mixes exposed to carbon dioxide with two different water contents.
Figure 10:
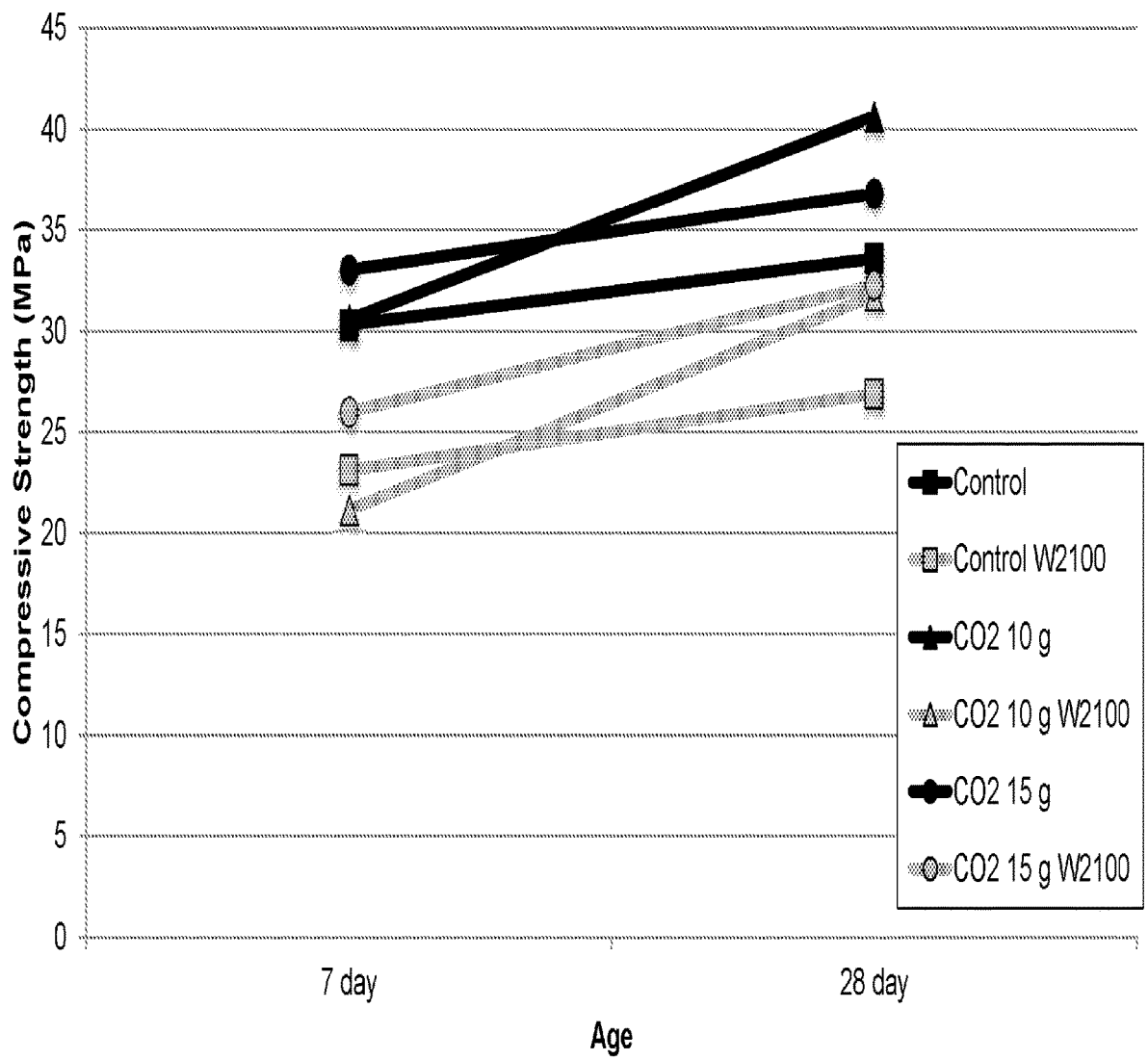
FIG. 10 shows 7- and 28-day compressive strengths of concrete prepared from wet mixes exposed to carbon dioxide at two different doses and two different water contents.
Figure 11:
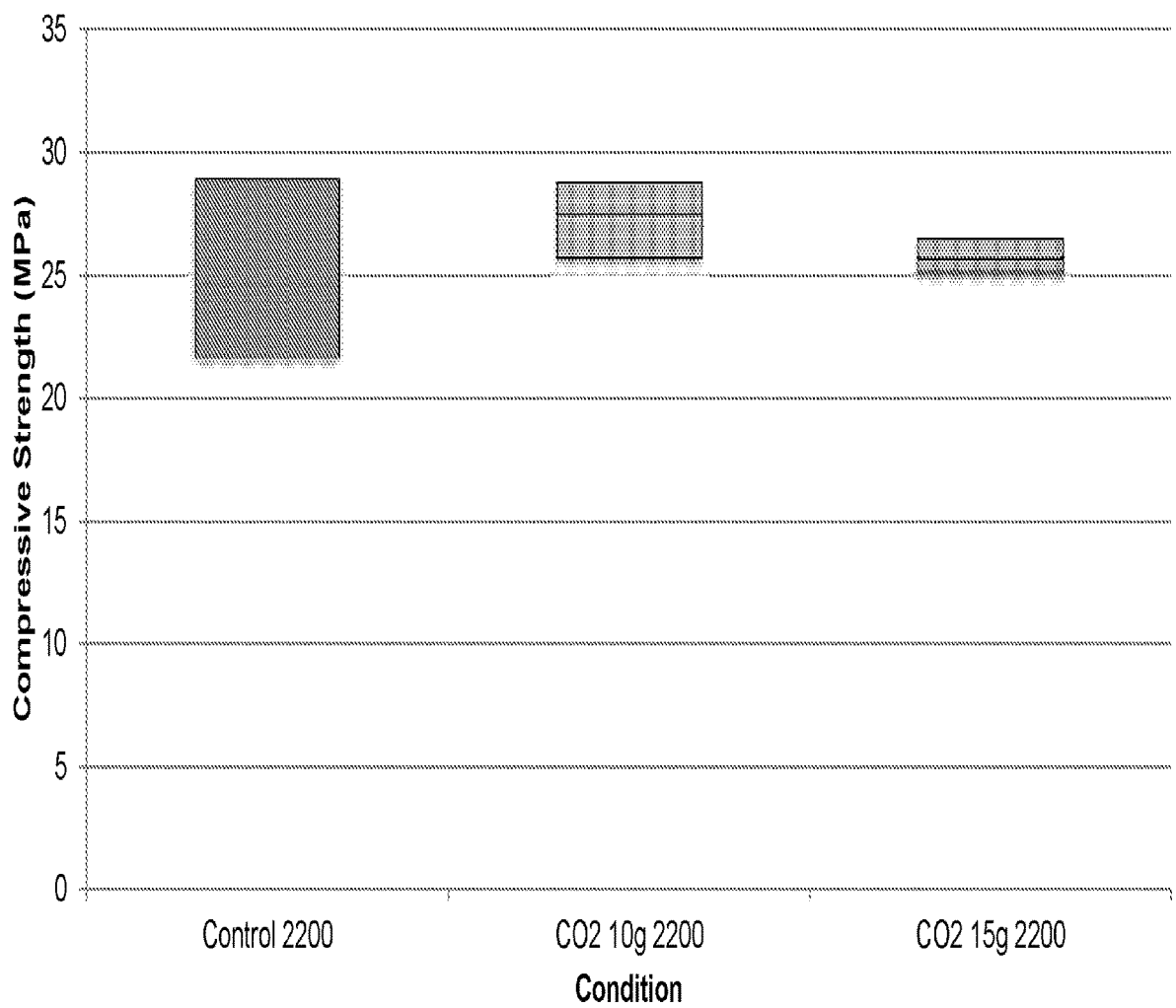
FIG. 11 shows 7-day compressive strengths of concrete prepared from wet mixes exposed to carbon dioxide at two different doses and higher water content.
Figure 12:
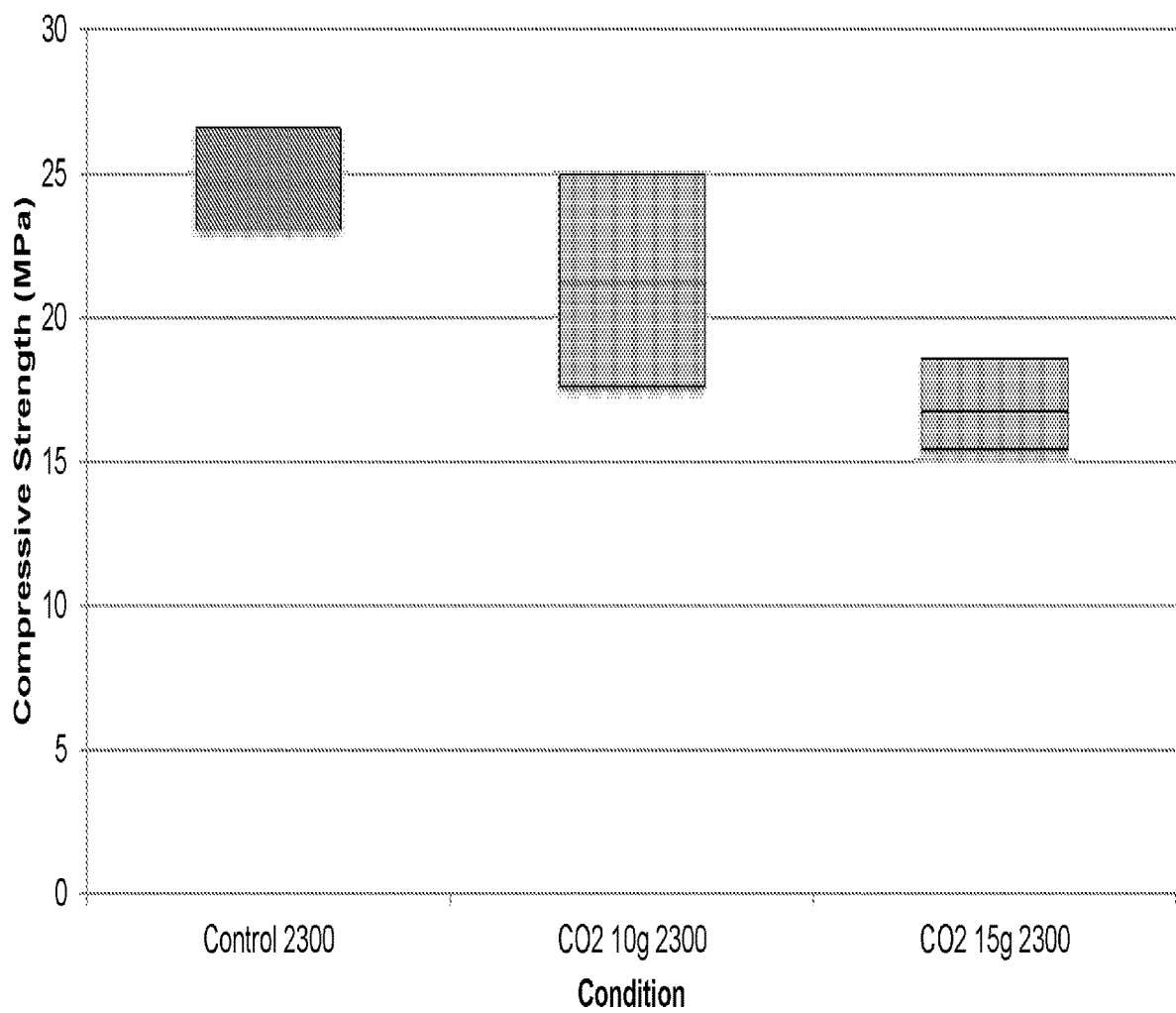
FIG. 12 shows 7-day compressive strengths of concrete prepared from wet mixes exposed to carbon dioxide at two different doses and higher water content.
Figure 13:
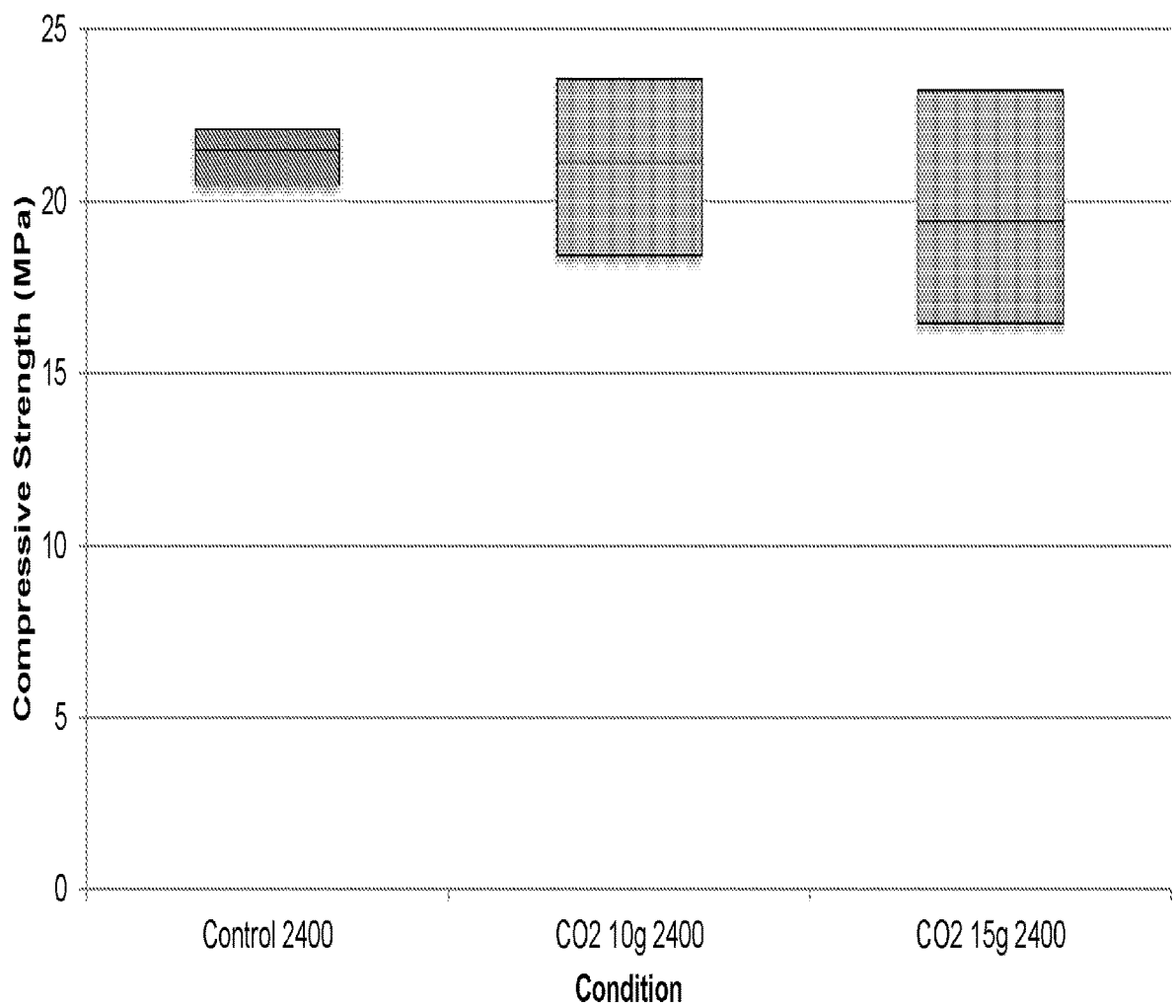
FIG. 13 shows 7-day compressive strengths of concrete prepared from wet mixes exposed to carbon dioxide at two different doses and higher water content.

In a third experiment, additional water was added to compensate for reduced flowability (slump) observed in the concrete mixes contacted with carbon dioxide in the previous experiments. Concrete mixes were prepared as in the second experiment, except the dosages of carbon dioxide used was 15 g per cylinder (1.9% carbon dioxide bwc). In addition, in one set of both control and carbon dioxide batches, the second water addition was increased to give a total water that was 4.7% increased over the default water addition 7-, 14-, and 28-day compressive strength tests were conducted. The results are shown in FIG. 9. Even with the additional water the concrete mix contacted with carbon dioxide showed a 28-day strength comparable to control.

Figure 14:
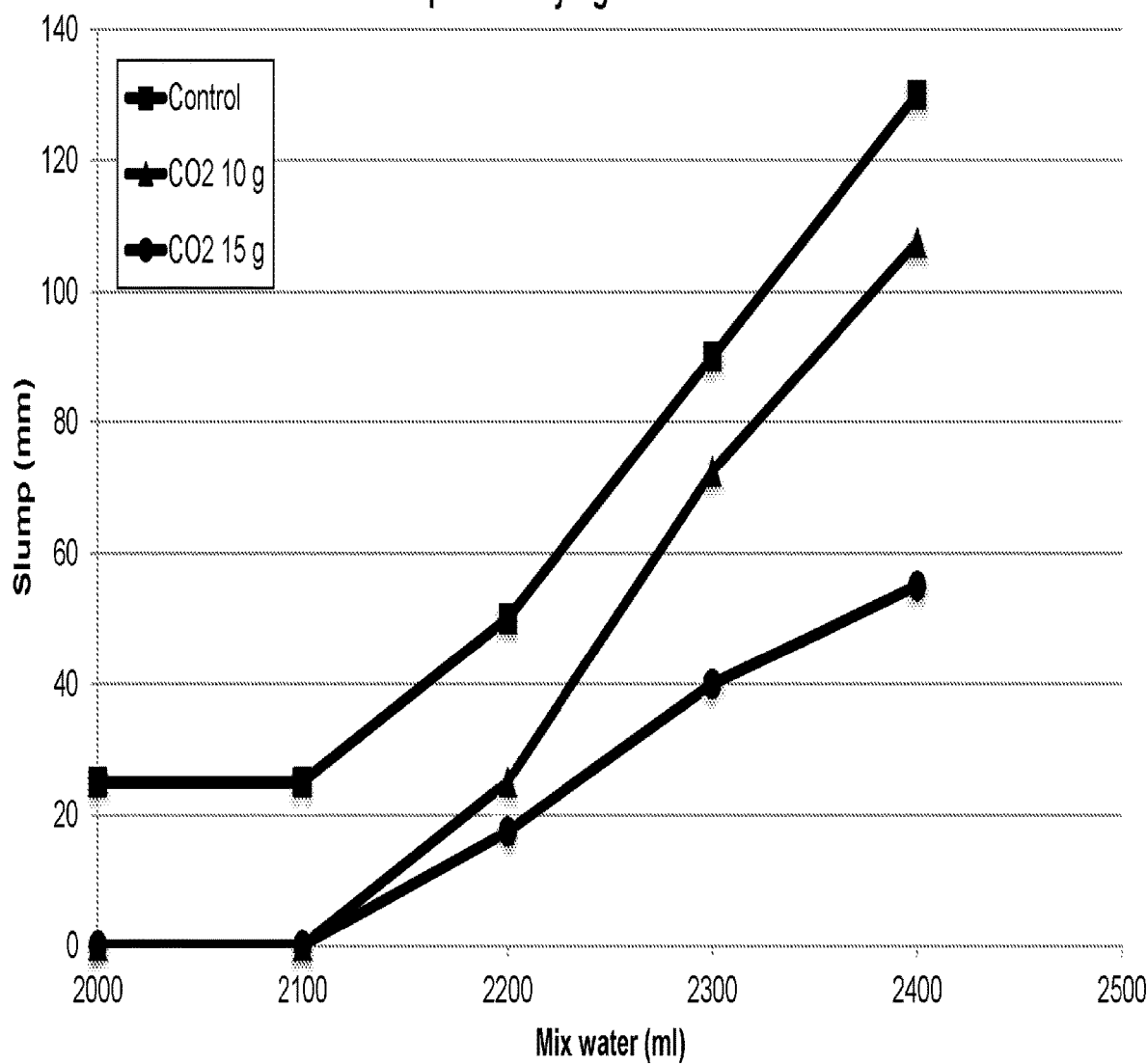
FIG. 14 shows slump of concrete wet mixes exposed to carbon dioxide at two different doses and five different water contents.

In a fourth experiment, various additional water amounts were investigated. Concrete mixes were prepared as in the second experiment, except the dosages of carbon dioxide used was 10 or 15 g per cylinder (1.3 or 1.9% carbon dioxide bwc, respectively). In addition, in sets of both control and carbon dioxide batches, the second water addition was increased to give a total water that was 2100, 2200, 2300, 2400, or 2500 ml/2 0 kg dry mix, compared to 2000 ml/kg for control batches. The amount of water on the first addition was 60% of the total water so the w/c at time of carbon dioxide was increased as mix water was increased. 7 and 28 day compressive strength tests were conducted. The results are shown in FIGS. 10-13. Slump tests were also conducted and the results are shown in FIG. 14. Additional water partially compensated for the decrease in slump with carbon dioxide addition, especially at the lower carbon dioxide dose. 7 day strength was comparable to control for most doses of water.

Example 2

This example describes retrofitting an existing readymix truck with a system for contacting a wet concrete mix in the drum of the truck with carbon dioxide while the concrete mix is mixing.

A readymix concrete truck was retrofitted for delivery of carbon dioxide to the mixing concrete mix. A flexible rubber tube of approximately ¾" diameter was brought to the readymix site and the readymix truck was retrofitted by running a flexible rubber tubing for delivery of carbon dioxide in parallel with existing tubing for delivery of water to allow delivery of carbon dioxide to the drum of the truck at the high end of the drum while a hydraulic cement mix, e.g., concrete, was mixing in the drum. The opening of the tube was positioned 0.5 to 2 m from the concrete in the truck. The truck was a six cubic meter transit mixer. A source of carbon dioxide was attached to the flexible rubber tubing. In this example, the source of carbon dioxide was a liquid carbon dioxide supply, heater (ethylene glycol), gas buffer tank, gas metering equipment, and gas output, to supply carbon dioxide of at least 99% concentration. The gas delivery trailer took liquid carbon dioxide, metered by a pressure regulator and ran it through a heat exchanger where hot liquid glycol (antifreeze) heated it to change the liquid carbon dioxide into a gas. The gas was stored in the receiver tanks on a mobile cart which can be wheeled out of the trailer to a location inside the plant. A touchscreen was used to program the correct dose of carbon dioxide to be delivered during the concrete making process. Valves and sensors were used to meter the gas correctly. Hoses were used to connect between the trailer, cart and manifolds and the manifolds attach to the concrete making machine to deliver the gas dose in the correct location. In industrial trials the gas line was ¾" diameter.

In another readymix truck retrofit, the truck was retrofitted by connecting the carbon dioxide source to the drum through the water line release. The water line went from the water tank on the truck to a T junction. Going up from the T sent the water into the drum. Going down from the T was a drain to empty the line onto the ground. The water supply was turned off when not in use, essentially connecting the outlet to the drum. By booking the gas supply into the outlet, in this example, the parallel line approach was avoided and it was only necessary to use a carbon dioxide supply and a conduit to connect to the T junction.

Example 3

This example describes the use of carbon dioxide to contact a mixing concrete mix in a readymix truck.

The retrofitted readymix truck described in Example 2 was used. The components of a batch of concrete were added to the drum of the truck, including cement mix and aggregate. While the hydraulic cement mix was mixing, carbon dioxide in a gaseous mixture that was at least 99% carbon dioxide was introduced into the drum at a flow rate of 750, 1500, or 2250 liters per minute for 180 seconds, for a total carbon dioxide dose of 0.5%, 1.0%, or 1.5% bwc, respectively. The drum remained open to the atmosphere during the carbon dioxide addition. After the flow of carbon dioxide had stopped, additional water was added to the mixing concrete to bring the w/c ratio of the concrete to 0.45. The truck received the concrete and the carbon dioxide at the batching bay, and delivered the concrete to an adjacent building where testing was done and samples were made. Tests were conducted for temperature, slump, and air content, and cylinders were made for strength and flexural strength.

In a second mixing example, carbon dioxide was added before any additional water was added to the mix, and the water in the mix during carbon dioxide addition was due to water in the aggregate mix, which had been exposed to water before addition. The aggregate was wet and with the addition of the wet aggregate the water content of the resulting hydraulic cement mix (concrete) was a w/c ratio of 0.17. Final mix water was achieved by adding water to the truck manually attain desired consistency.

Example 4

This example describes retrofitting a stationary pan mixer used to mix concrete for use in a precast concrete operation with a system for contacting the mixing concrete in the mixer with carbon dioxide. A gas line was attached to a carbon dioxide supply and run to a pan mixer for mixing concrete for delivery to a mold. The line was configured to allow a controllable flow of carbon dioxide from the carbon dioxide to the mixer for a predetermined time during mixing of the wet mix.

Example 5

This example describes the use of carbon dioxide to contact a mixing concrete mix in a stationary pan mixer and pouring the concrete into molds for precast concrete products. A retrofitted pan mixer as described in Example 4 was used to deliver carbon dioxide to a wet concrete mix in a mixer while the concrete was mixing, for 3 minutes, to obtain a dose of carbon dioxide of 0.5% to 2.5% bwc. The gas line was about 1 m from the concrete.

Example 6

This example describes the use of carbon dioxide to contact mixing concrete mix in two different ready mix operations.

In a first operation, the following mix was used:

30 MPA with a maximum 4" slump
 20 mm aggregate—2780 kg
 Sand—2412 kg
 Washed sand—615 kg
 Type 10 GU cement—906 kg
 Fly ash—192 kg
 Visco 2100-850 ml
 ViscoFlow—1650 ml
 Water—334 litres The carbon dioxide was added via a ¾" diameter rubber hose clipped to the side of the truck and disposed in the mixing drum to deliver $CO_2$ to the surface of the mixing concrete for 180 sec (controlled manually), at low, medium or high dose, to achieve 0.43, 0.55, and 0.64% $CO_2$ bwc, respectively. Because the aggregate was wet, $CO_2$ was added to the mix before the final addition of water; the w/c of the mix when $CO_2$ was added was calculated to be 0.16. Final water was added immediately after the $CO_2$ addition.

Figure 15:
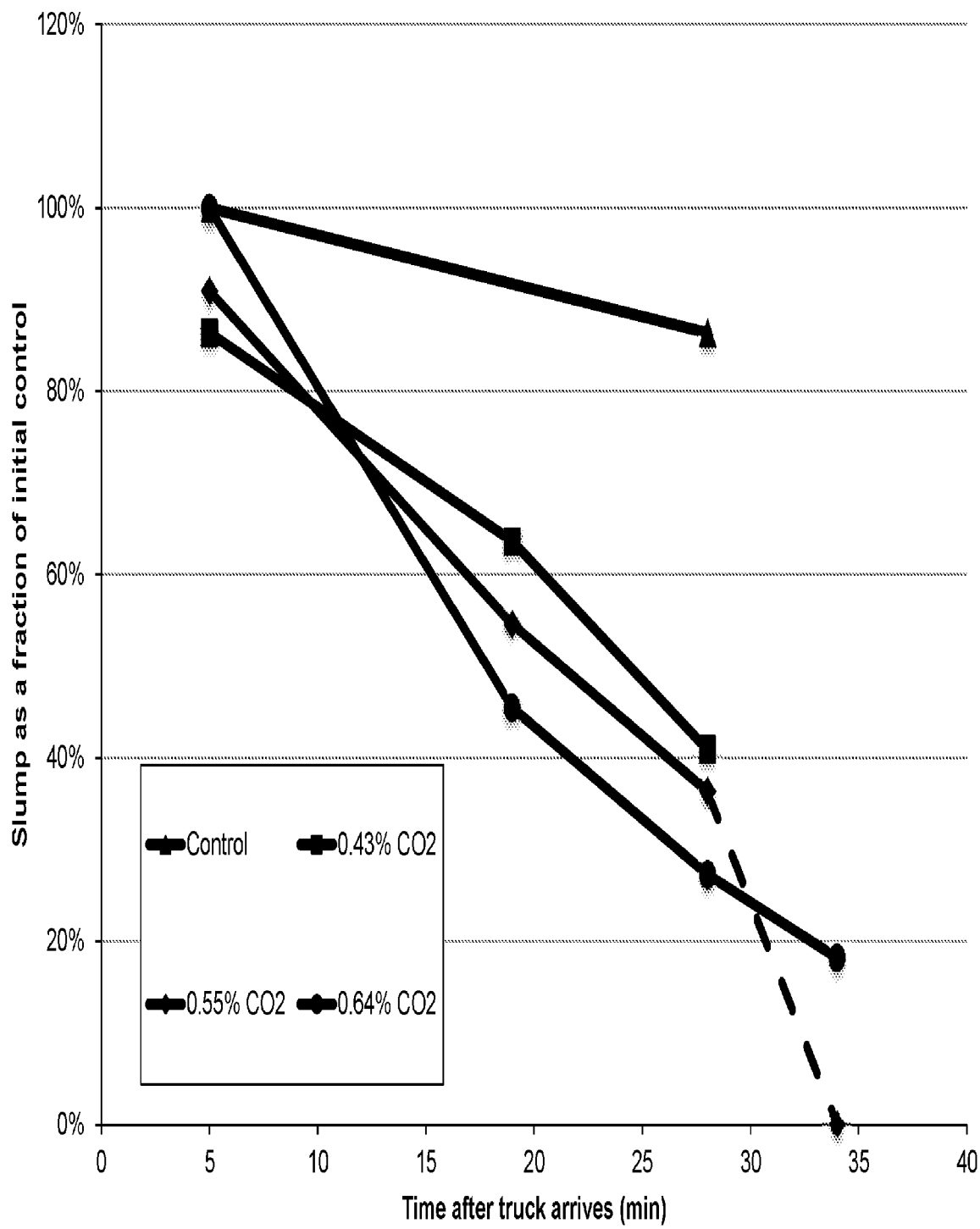
FIG. 15 provides a graphic illustration of slump at various times after truck arrival for carbonated concrete batches prepared in a ready mix operation.
Figure 16:
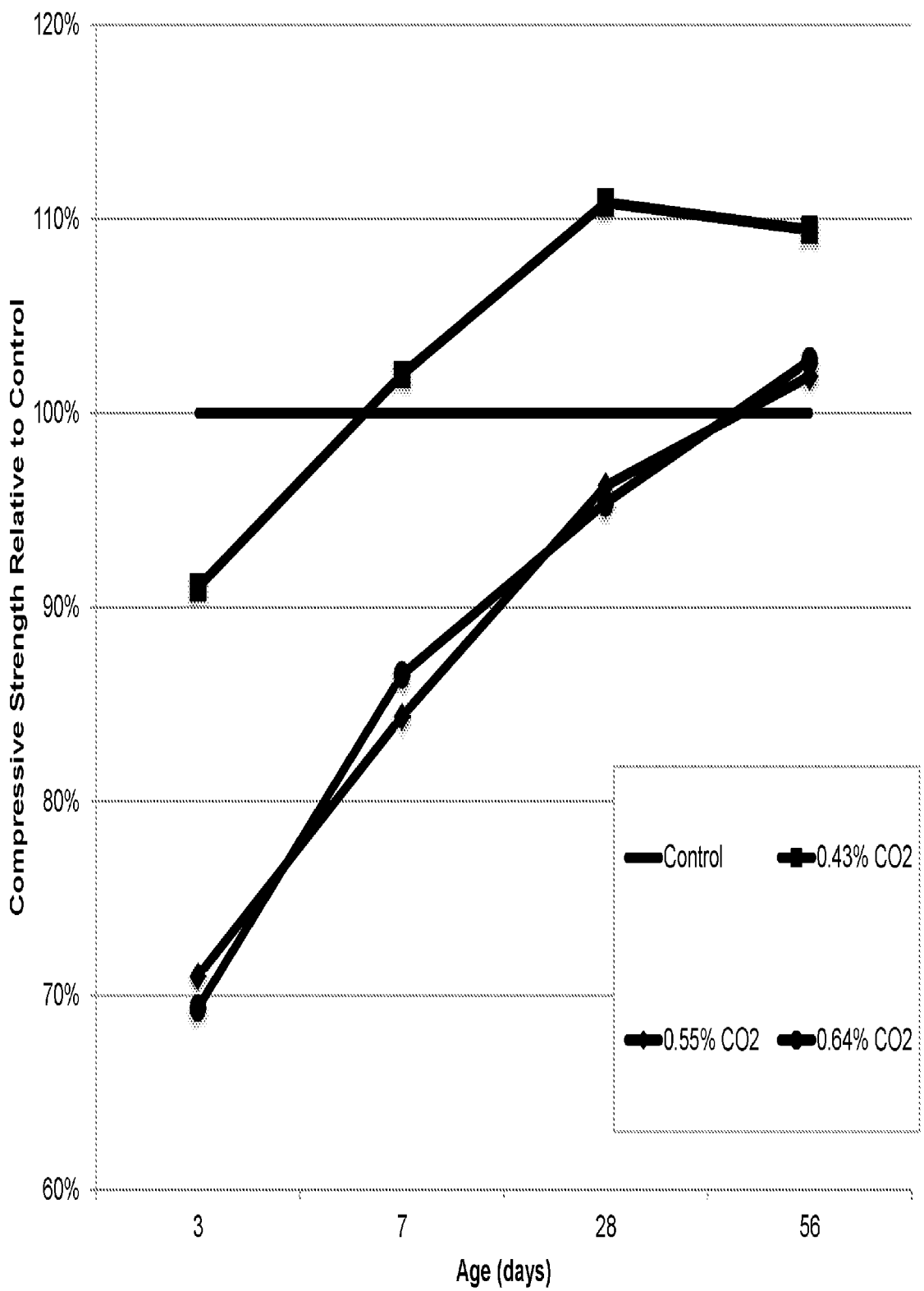
FIG. 16 provides a graphic illustration of compressive strength development in carbonated concrete prepared in a ready mix operation, compared to control, uncarbonated concrete, at 3, 7, 28, and 56 days.

The addition of $CO_2$ greatly reduced slump as time from arrival at site progressed, see FIG. 15. Carbonated concreted showed reduced strength at 7 days compared to control, increasing in strength over time so that by day 56 the carbonated concrete was stronger than uncarbonated at all doses tested. See FIG. 16. The addition of $CO_2$ caused an increase in temperature of the wet cement that was dose dependent, as shown in Table 2.

TABLE 2

Effect of $CO_2$ dose on temperature, ready mix

| Mix | Temperature (° C.) |
|---|---|
| Control | 15.2 |
| 0.43% $CO_2$ | 17.0 |
| 0.55% $CO_2$ | 18.4 |
| 0.64% $CO_2$ | 19.4 |

Figure 17A:
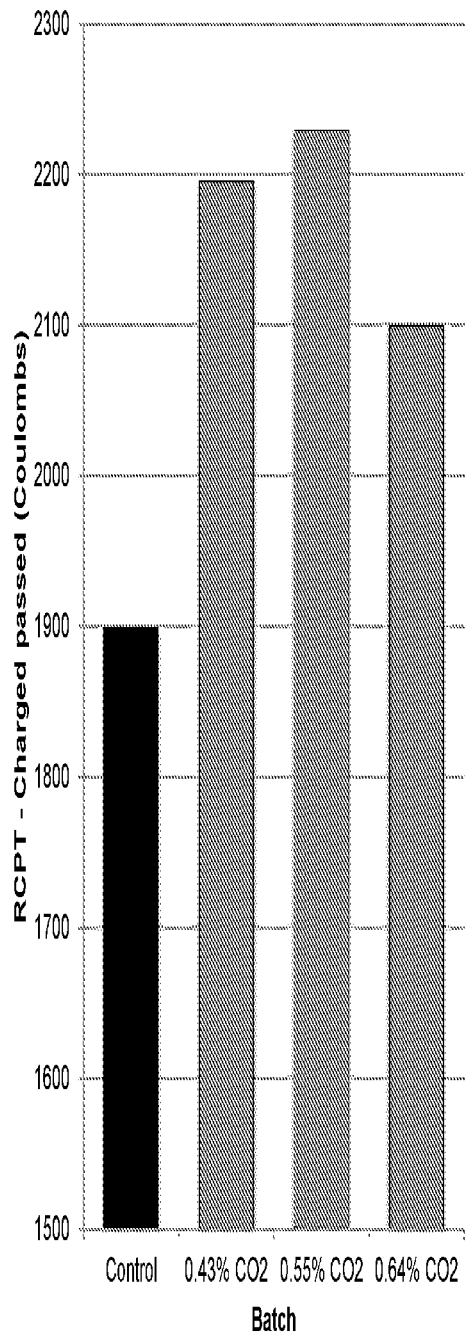
FIG. 17A provides a graphic illustration of Rapid chloride penetration tests.
Figure 17B:
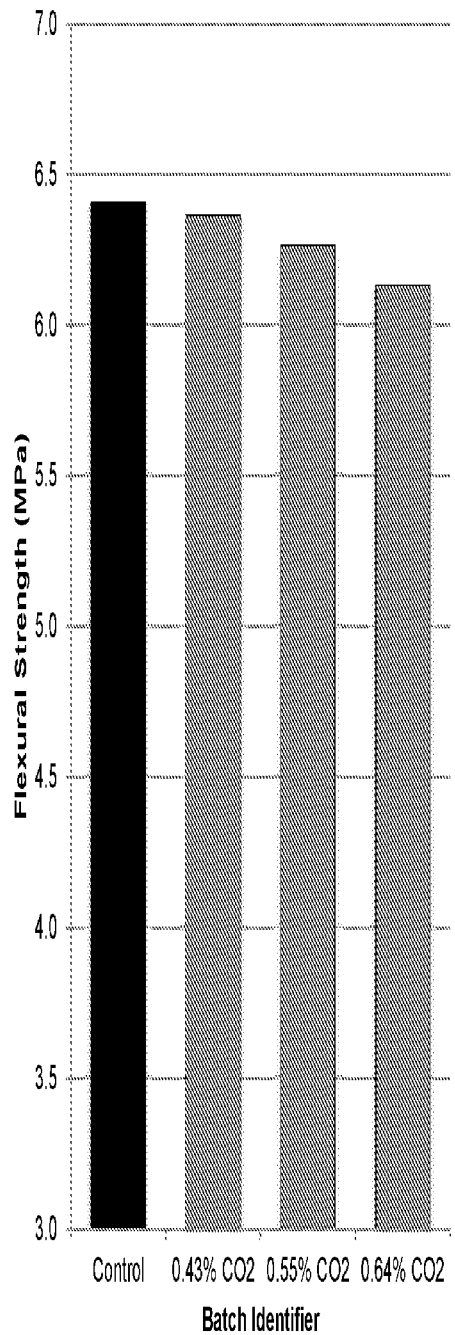
FIG. 17B provides a graphic illustration of Flexural strength tests on carbonated concrete prepared in a ready mix operation compared to control, uncarbonated concrete.

Rapid chloride penetration tests (RCPT, using ASTM C1202 Standard Test Method for Electrical Indication of Concrete's Ability to Resist Chloride Ion Penetration) and flexural strength tests were also performed. See FIG. 17. Although RCPT increased with carbonation (FIG. 17A), since the control concrete was at the high end of low (generally considered 1000 to 2000 coulombs) and the carbonated concrete was at the low end of moderate (generally considered to be 2000 to 4000 coulombs) the difference was not considered to be significant. Flexural strength decreased slightly with carbonation (FIG. 17B).

In a second operation, mixes were prepared to meet a pre-determined slump target of 5 inches, with additional water added to carbonated batches as necessary to achieve target slump. The following mix was used:

Sand—770 kg/m$^3$
20 mm Stone—1030 kg/m$^3$
Cement GU—281 kg/m$^3$
Fly Ash (F)—55 kg/m$^3$
Water—165 L/m$^3$
Daracem 50-1400 ml/m$^3$
Darex II—200 ml/m$^3$
Total—2301 kg
Water on $CO_2$ batches increased (unknown amount added after CO2 injection ends) to achieve target slump.

$CO_2$ was introduced into the mixing drum of the ready mix truck via a hose connected at a T-junction to an existing water line that discharged into the mixing drum. As in the previous operation, because the aggregate was wet, $CO_2$ was added to the mix before the final addition of water; the w/c of the mix when $CO_2$ was added was calculated to be 0.16. Final water was added immediately after the $CO_2$ addition. Two doses of $CO_2$ were used, 0.5% and 1.0% bwc, as well as an uncarbonated control. Additional water was added to the carbonated concrete to achieve target slump. The concrete was used in a precast operation on site and arrived 20-25 minutes after the mixing started.

The use of additional water brought the slump of the carbonated concrete to levels comparable to the uncarbonated control, as shown in Table 3:

TABLE 3

Slump, temperature, and air content of uncarbonated and carbonated ready mix concretes

| Mix | Air Content | Slump (in) | Temperature (° C.) |
|---|---|---|---|
| Control | 3.6% | 5.5 | 23.9 |
| 0.5% $CO_2$ | 4.2% | 4.5 | 26.2 |
| 1.0% $CO_2$ | 4.1% | 5 | 28.6 |

For the 0.5% carbonated concrete, two later slump measurements, at 20 min and 35 min after arrival at the job site, were both 5 inches. Further measurements were not obtained for the 1.0% sample.

Figure 18:
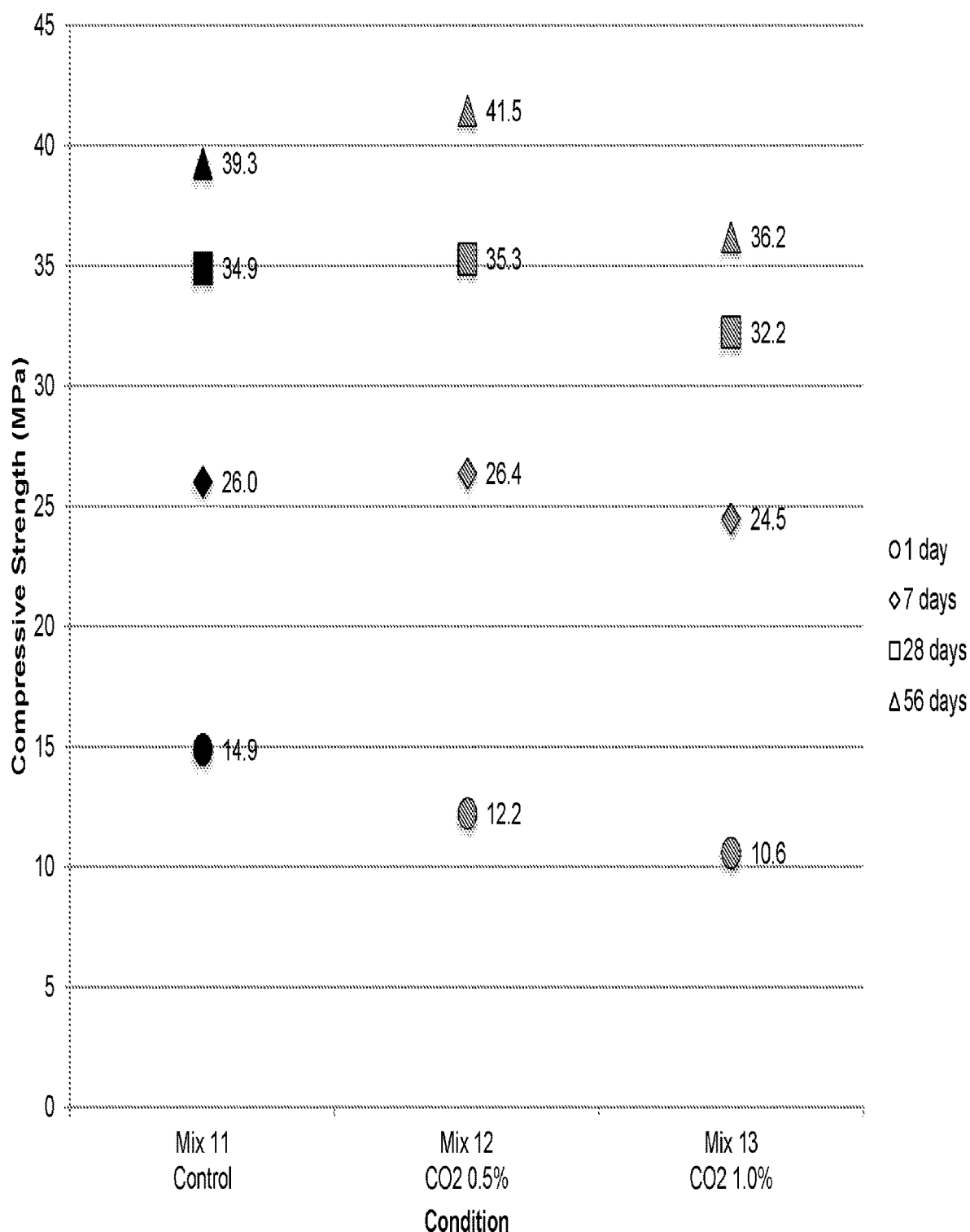
FIG. 18 provides a graphic illustration of compressive strengths at 1, 7, 28, and 56 days for concretes prepared in a ready mix operation with 0, 0.5, or 1.0% bwc carbon dioxide delivered to the concrete.

Compressive strengths of the batches are shown in FIG. 18. The 0.5% $CO_2$ mix showed 85% strength compared to control at 1 day, equivalent strength at 7 and 28 days, and 106% of control strength at 56 days. The 1.0% $CO_2$ mix showed 71% strength compared to control, and 94% at 28 and 56 days. The additional water added to achieve the target slump likely reduced compressive strength of the concrete.

In a third operation, an admixture, sodium gluconate, was used to restore flowability. The following mix was used:
Sand—770 kg/m$^3$
20 mm Stone—1030 kg/m$^3$
Cement GU—336 kg/m$^3$
Water—163 L/m$^3$
Daracem 55-1350 ml/m$^3$ $CO_2$ was introduced into the mixing drum of the ready mix truck via a hose connected at a T-junction to an existing water line that discharged into the mixing drum. As in the previous operation, because the aggregate was wet, $CO_2$ was added to the mix without a first water addition, and before the final addition of water; the w/c of the mix when $CO_2$ was added was calculated to be 0.16. Final water was added immediately after the $CO_2$ addition. Two doses of $CO_2$ were used, 1.0% and 1.5% bwc, as well as an uncarbonated control. Sodium gluconate was added to the 1.5% $CO_2$ batch at dose of 0.05% bwc, after the addition of $CO_2$. The concrete was used in a precast operation on site and arrived 20-25 minutes after the mixing started.

The use of the sodium gluconate brought the slump of the 1.0% carbonated concrete toward levels comparable to the uncarbonated control, as shown in Table 4:

TABLE 4

Slump, temperature, and air content of uncarbonated and carbonated ready mix concretes

| Mix | Air Content | Slump (in) | Temperature (° C.) |
|---|---|---|---|
| Control | 5.9% | 7 | 25.8 |
| 1.0% $CO_2$ | 5.9% | 4 | 28.1 |
| 1.5% $CO_2$ | 4.5% | 3 | 28.6 |

For the 1.0% carbonated concrete (with sodium gluconate), a later slump measurements, at 20 min after arrival at the job site, was 5.5 inches. For the 1.5% carbonated concrete (no sodium gluconate), a later slump measurements, at 15 min after arrival at the job site, was 3.0 inches. Carbon dioxide uptake of the 1.0% dose was 0.44% bwc, for an efficiency of 44%. Carbon dioxide of the 1.5% dose was 1.69% bwc, or 113% efficiency.

Figure 19:
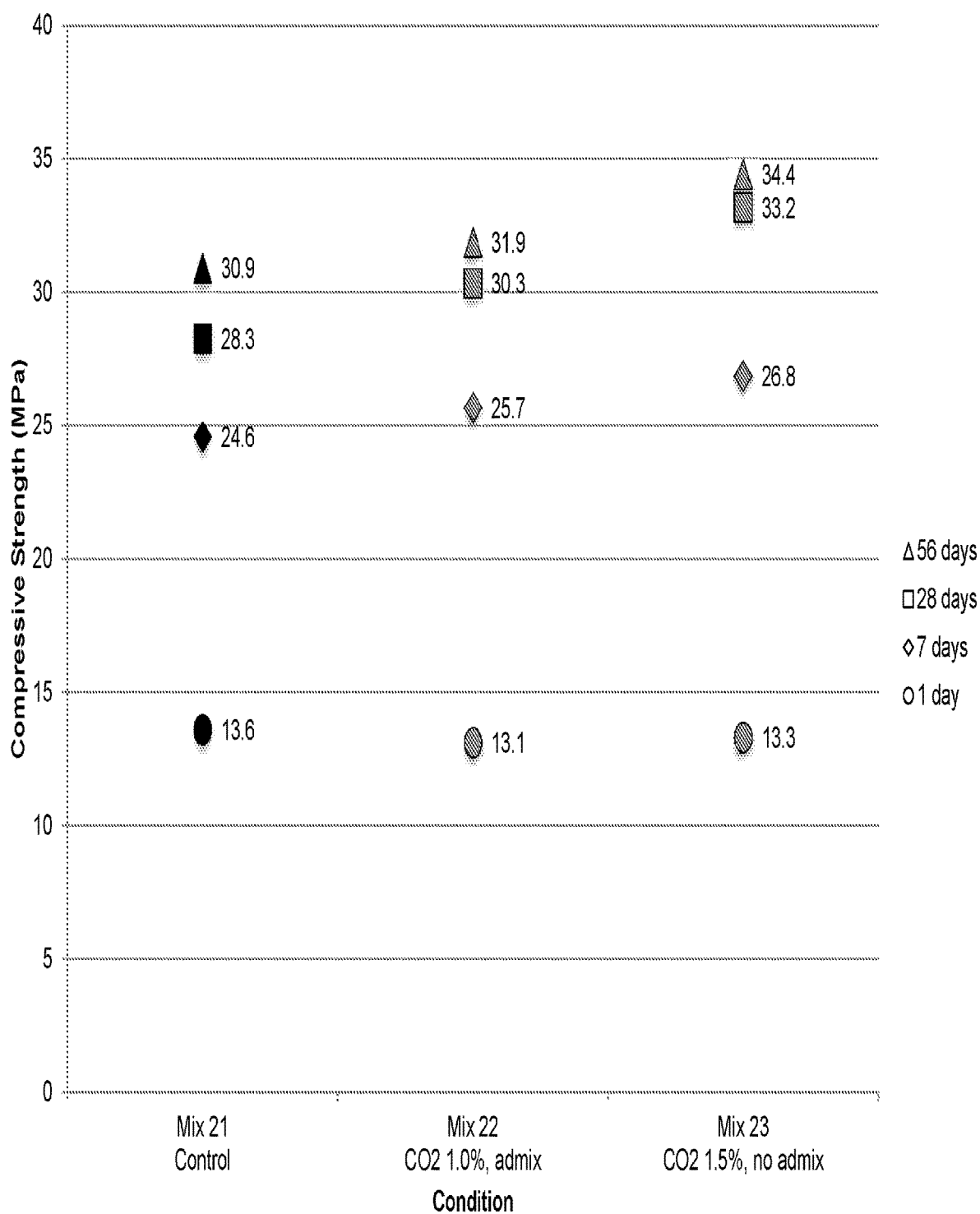
FIG. 19 provides a graphic illustration of compressive strengths at 1, 7, 28, and 56 days for concretes prepared in a ready mix operation with 0, 1.0, or 1.5% bwc carbon dioxide delivered to the concrete, and 0.05% sodium gluconate admixture added to the 1.5% batch.

Compressive strengths of the batches are shown in FIG. 19. The 1.0% concrete (with sodium gluconate) had a compressive strength of 96, 107, and 103% of control at 1, 28, and 56 days, respectively. The 1.5% concrete (no sodium gluconate) had a compressive strength of 98, 117, and 109% of control at 1, 28, and 56 days, respectively. The 1.5% CO2 concrete had a reduces slump but was still usable.

This example illustrates that carbonation can reduce slump in wet mix used in ready mix operations. Depending on the mix, the slump may be such that remedial measures, such as use of additional water, use of admixture, or both, are necessary; as illustrated by this example, these measures can restore slump to acceptable levels without major alteration in the strength of the concrete.

Example 7

This example describes the use of an admixture to modulate compactability/strength of a dry cast concrete mix. Several different tests were performed.

Work had identified that carbonation of fresh concrete prior to formation reduced the mass of an industrially produced carbonated dry mix product in certain mixes. Dry mix products are made to a constant dimension so lower mass resulted in lower density which can contribute to lower strength. A lab investigation pursued novel admixtures to address the density issue. Sodium gluconate was studied in a lab program. In conventional concrete sugars are known to be set retarders. The work investigated its use in conjunction with carbonated fresh concrete to see if the sodium gluconate would act in relation to the reaction products causing the density issue.

In a first test, the mix design was a dry mix concrete with the following proportions
1.75 kg cement
15.05 kg SSD (saturated surface dry) fine aggregate
7.00 kg SSD (saturated surface dry) coarse aggregate
1.19 kg mix water
Target water was 6.05% by mass of the concrete The admixtures used were: 1) Sodium gluconate to improve density—it was prepared as a solution of 36.8 g of sodium gluconate per 100 ml of water. It was dosed into the concrete as a mass of solid sodium gluconate by weight of cement; 2) Rainbloc 80-a water repellency admixture for Concrete Masonry Units; and 3) ProCast 150-an admixture for use in concrete masonry units. The two commercial admixtures were dosed based upon mL/100 kg cementitious materials as per manufacturer's specifications.

Samples were mixed according to the following procedure:
Aggregate is introduced first and mixed until homogenous.
Cement is introduced and mixed for 30 s until homogenous.
Mix water is added over 15 seconds.
The concrete is mixed for a total of 4 minutes starting from the water addition.
In the case of $CO_2$ batches the following modified sequence was used:
1 minute mixing all materials
Initial temperature is recorded
$CO_2$ gas is injected over the surface of the mixing concrete at 100 LPM for required time based on test plan. The gas is nominally retained in the bowl by use of a cover that accommodates the movement of the mixing mechanism. The mixing proceeds during the gas delivery.
Final temperature is recorded.
Admixtures are introduced to mix—always post carbonation
Mix for additional time to attain a total of 4 minutes mixing.
Concrete samples were formed according to the following procedure
Concrete was formed into standard 100 mm diameter cylinder molds
3.5 kg of dry mix materials were introduced into the molds and compacted using a specially designed pneumatic ram which applies 95-100 psi of pressure directly under vibration onto the cross section of the concrete mass A steel trowel was used to remove any excess materials from the top of the mold and level the surface of the test specimen.

The mass of the cylinder was recorded.

Test specimens were set to cure in a lime water bath, in accordance with ASTM C192

The first trial produced four concretes: 1) Control; 2) Control with 0.05% sodium gluconate; 3) CO2; 4) CO2 with 0.05% sodium gluconate. The cylinder unit mass (mass of a constant volume of concrete) was understood as an estimate of product density. 6 samples were produced.

With the control density as the standard, the control with sodium gluconate had a relative density of 98.8%, the carbonated concrete was 94.0% and the carbonated concrete with sodium gluconate was 93.4%. Thus, addition of 0.05% sg to control reduces cylinder density 1.2%, application of $CO_2$ reduces cylinder density 6%, and addition of 0.05% sg to $CO_2$ treated concrete did not improve cylinder density. The dose is too low.

Figure 20:
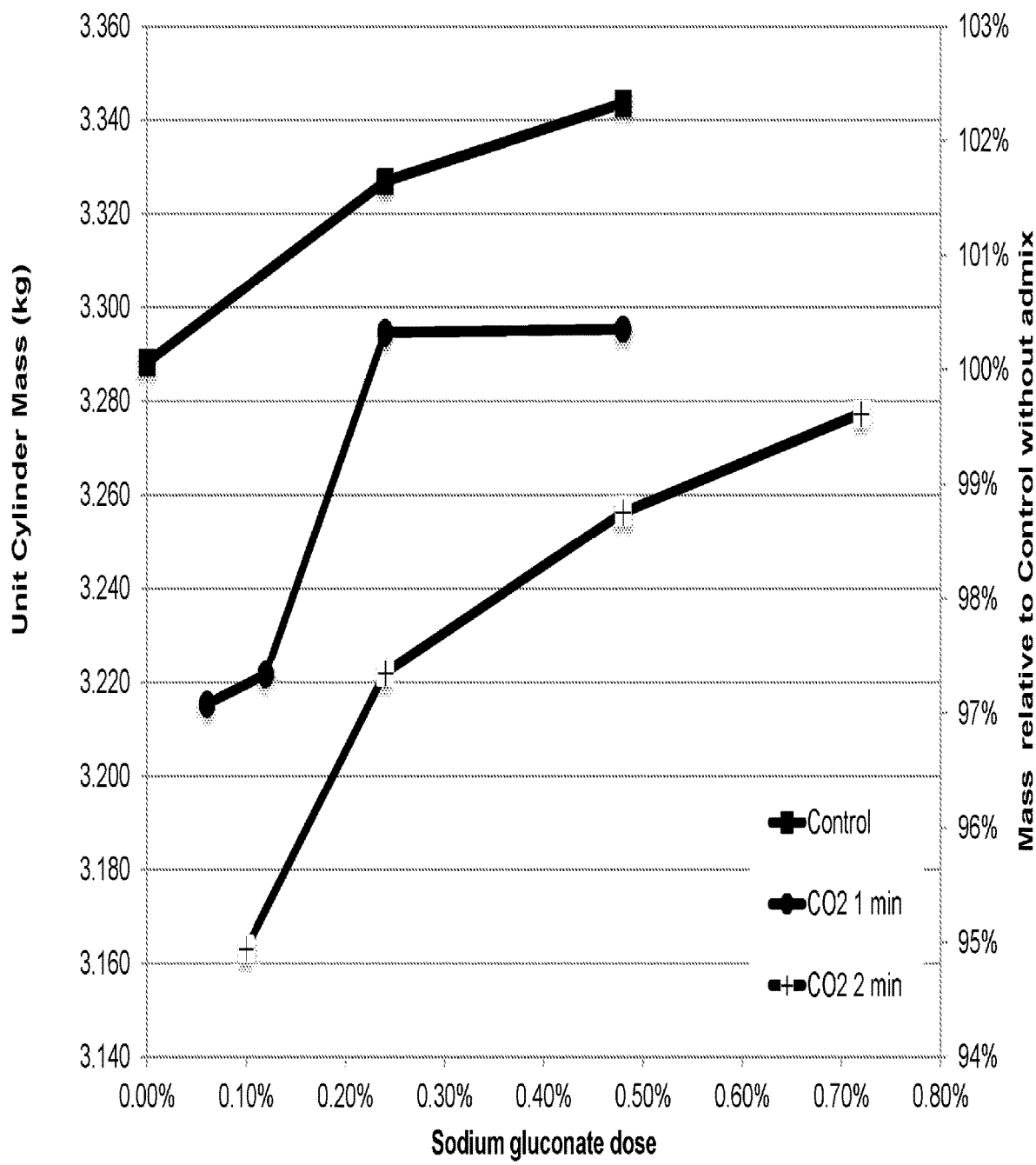
FIG. 20 provides a graphic illustration of cylinder mass for constant volume cylinders (density), a proxy for compressive strength, in dry cast concrete prepared as uncarbonated or carbonated for 1 or 2 minutes, with addition of sodium gluconate admixture at various concentrations.

In a second trial, the same conditions for sample preparation as for the first trial were used, with the following carbonation and sodium gluconate conditions:
Uncarbonated with 0, 0.24% and 0.48% sodium gluconate
$CO_2$ for 1 minute with 0.06%, 0.12%, 0.24% and 0.48% sodium gluconate
$CO_2$ for 2 minutes with 0.10%, 0.24%, 0.48% and 0.72% sodium gluconate The effects of various doses of sodium gluconate on density, which can be considered a proxy for strength, is shown in FIG. 20. Applying $CO_2$ decreased the cylinder unit mass (proxy for density). Increasing the amount of $CO_2$ absorbed by the concrete correspondingly increased the amounts of sodium gluconate to offset the density shortcoming. Increasing the sodium gluconate dose increased the density of all concretes over the range considered. The control concrete cylinder unit mass increased 1.7% at a dose of 0.48% sodium gluconate. For 1 min of $CO_2$ the sodium gluconate dosages of 0.24% and 0.48% both resulted in a cylinder mass equivalent to the control. For 2 minutes of $CO_2$ the cylinder mass was 99% of the control at a sodium gluconate dosage of 0.48% and matched the control cylinder mass when the dose reached 0.72%.

Figure 21:
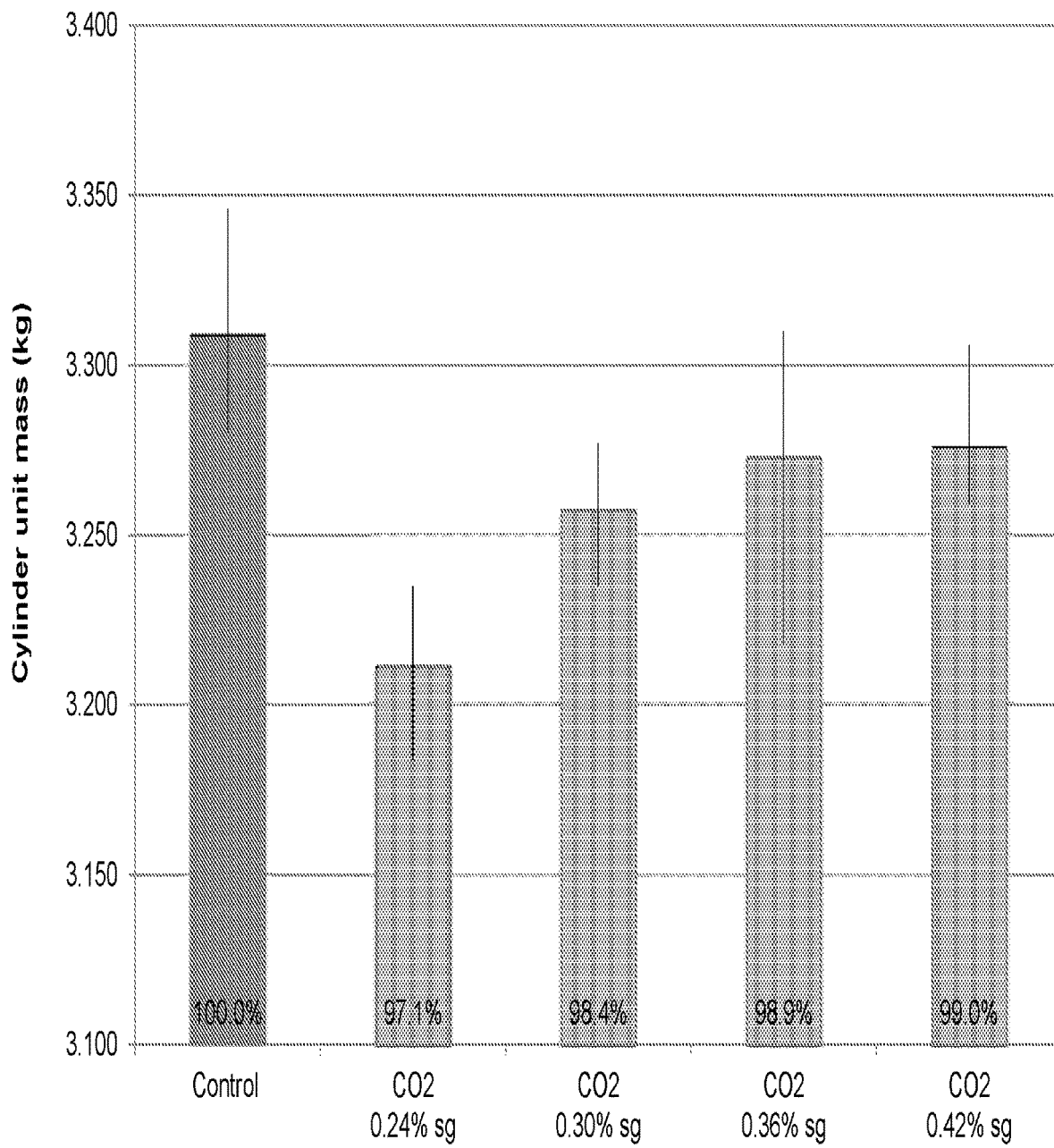
FIG. 21 provides a graphic illustration of cylinder mass for constant volume cylinders (density), a proxy for compressive strength, in dry cast concrete prepared as uncarbonated or carbonated for 90s at 50 LPM with addition of sodium gluconate admixture at 0.24, 0.30, 0.36, or 0.42% bwc.

In a third trial, the same conditions for sample preparation as for the first trial were used, with carbonation at 50 LPM for 90 seconds and the following sodium gluconate conditions:
Control
$CO_2$ with 0.24% sodium gluconate
$CO_2$ with 0.30% sodium gluconate
$CO_2$ with 0.36% sodium gluconate
$CO_2$ with 0.42% sodium gluconate Cylinder mass (density, assuming all cylinders are of equal volume) was measured, and compressive strength measured at 1, 3, and 7 days. Cylinder densities are shown in FIG. 21. Applying $CO_2$ decreased the cylinder unit mass (proxy for density). Increasing the sodium gluconate dose increased the density over the range considered. The effect plateaued somewhat at the higher doses suggested the preferred dose is potentially in the 0.30% to 0.42% range. Without gluconate the cylinder mass of a carbonated product is about 7% less than the control. A gluconate dose of 0.30% brought the mass to 3% under the control. A dose of 0.42% brought the mass to 4% less than the control. The compressive strengths of the sodium gluconate treated samples were comparable to those of the control sample at doses of 0.30% and above.

Figure 22:
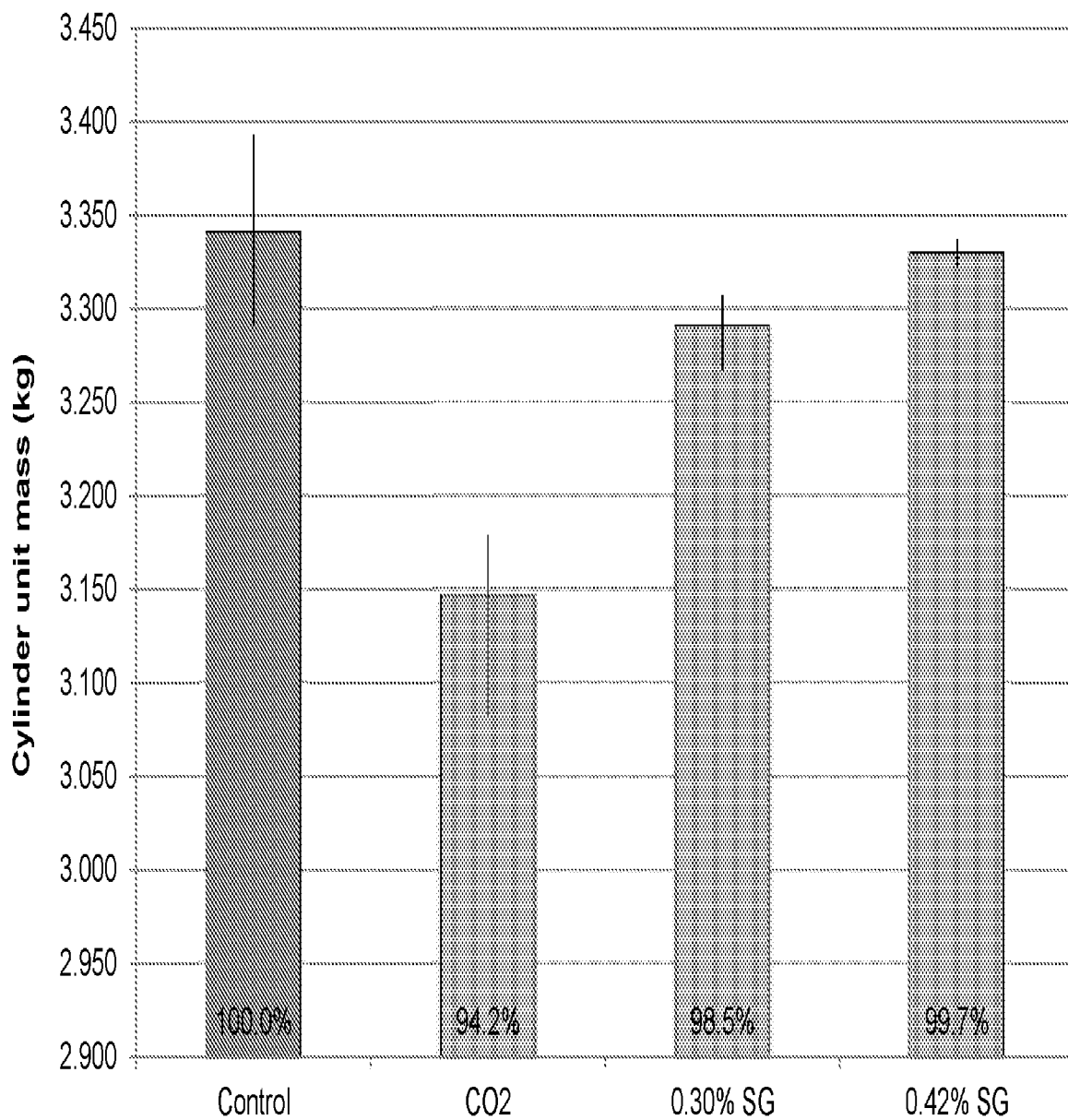
FIG. 22 provides a graphic illustration of cylinder mass for constant volume cylinders (density), a proxy for compressive strength, in dry cast concrete prepared as uncarbonated or carbonated for 90s at 50 LPM with addition of sodium gluconate admixture at 0.30 or 0.42% bwc.

In a fourth trial, the same conditions for sample preparation as for the first trial were used. Carbonation was at 50 LPM for 90 seconds and the following sodium gluconate conditions:
Control
$CO_2$
$CO_2$ with 0.30% sodium gluconate
$CO_2$ with 0.42% sodium gluconate All concretes contained Rainbloc (0.32%). It was added with the mix water. The cylinder unit mass (mass of a constant volume) was measured as a test of product density. 6 samples were produced. The strength was measured at 1, 3 and 7 days. Cylinder densities are shown in FIG. 22. The application of $CO_2$ reduced the density (by 6%) and strength of the concrete product. The use of sodium gluconate improved the density and strength. 0.3% sodium gluconate was sufficient to make carbonated concrete with 98.5% of the density of the control and equivalent strength. 0.42% sodium gluconate produced carbonated concrete with equivalent density and strength to the control. The optimum dose for this combination of cement and mix design proportions appears to be on the order of 0.42% sodium gluconate by weight of cement.

In a fourth trial, the same conditions for sample preparation as for the first trial were used. Carbonation was at 50 LPM for 90 seconds and the following sodium gluconate conditions:
Control
$CO_2$
$CO_2$ with 0.30% sodium gluconate
$CO_2$ with 0.42% sodium gluconate
$CO_2$ with 0.30% sodium gluconate with post-CO2 addition of Procast.

Figure 23:
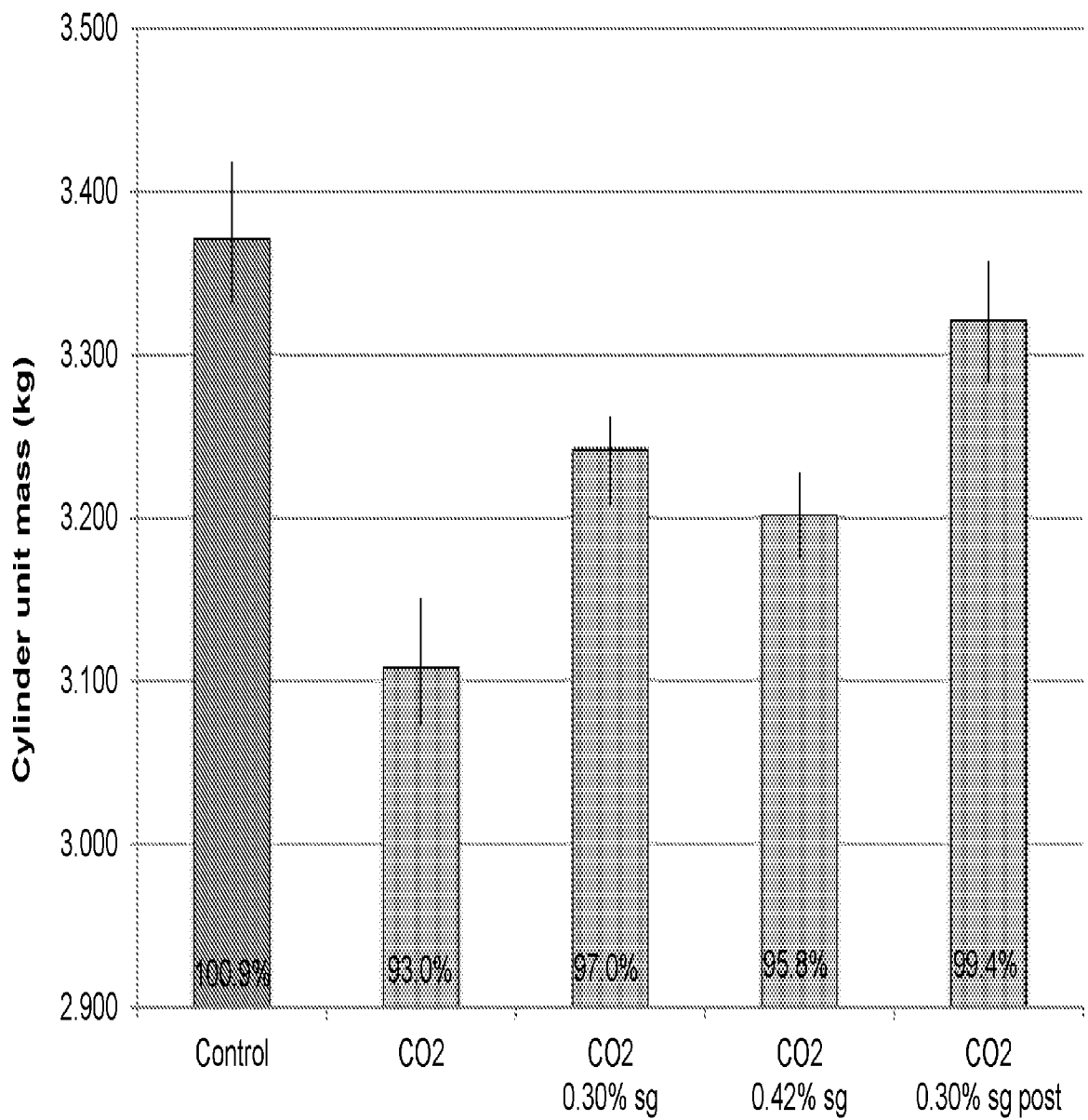
FIG. 23 provides a graphic illustration of cylinder mass for constant volume cylinders (density), a proxy for compressive strength, in dry cast concrete prepared as uncarbonated or carbonated for 90s at 50 LPM with addition of sodium gluconate admixture at 0.30 or 0.42% bwc. All samples included Rainbloc and Procast admixtures, with one 0.30% sample having Procast added after carbon dioxide delivery.

In contrast to the previous days the cement was a 70/30 blend of white cement and OPC. All batches contained Rainbloc (0.32%) and Procast 150 (0.64%). The Rainbloc was added with the mix water while the Procast 150 was tried both as part of the mix water and as an addition after the carbon dioxide treatment. The strength was measured at 1 (2 samples), and 7 days (4 samples). Cylinder densities are shown in FIG. 23. The carbonation treatment produced a compacted concrete product that was 7% less dense than the control. The density was improved by adding sodium gluconate. A dose of 0.30% sodium gluconate improved the density to 97% of the control. A further increase to 0.42% produced a concrete product with a density of 96%. As compared to the earlier trial that did not include Procast, it is clear that the optimum dosage is sensitive to the presence of other admixtures. Adding the Procast after the carbon dioxide treatment provided improved product density. The timing of the addition of admixtures with respect to the carbon dioxide application is important.

This example illustrates that an admixture, sodium gluconate, can return density and compressive strength of carbonated dry mix samples to those of uncarbonated samples, that the effect is dose-dependent, and that the timing of delivery of additional admixtures added to the mix can affect strength development.

Example 8

This example illustrates the effects of various admixtures on the workability of carbonated mortar mix, prepared as for a wet cast operation.

A mortar mix was prepared containing 535 g Portland cement (Holcim GU), 1350 g sand, and 267.5 g water. $CO_2$ gas was introduced at 20 LPM while mixing. The time of $CO_2$ delivery depended on the target $CO_2$ uptake, for example, to achieve 1.1% bwc the delivery took 3 to 4.5 min.

Three admixtures were used: sodium gluconate, fructose, sodium glucoheptonate. The admixtures were added to carbonated mortar at dosages of 0.05, 0.10 and 0.20% by weight of cement. The dosages reflect solid mass of additive delivered in a solution. The mortars were carbonated while mixing to an uptake of about 1.9% by weight of cement. The admixture was added after the carbonation: after carbonation the temperature of the sample was measured, then the admixture was added and the sample was remixed to homogenize.

The slump of the produced mortar was measured as an assessment of workability. Slump was measure immediately after the end of mixing using a Cement & Mortar Testing Equipments Transparence Acrylic Mini Slump Cone Test Apparatus (NL SCIENTIFIC INSTRUMENTS SDN. BHD. Malaysia.). Samples were rodded in two lifts.

Figure 24:
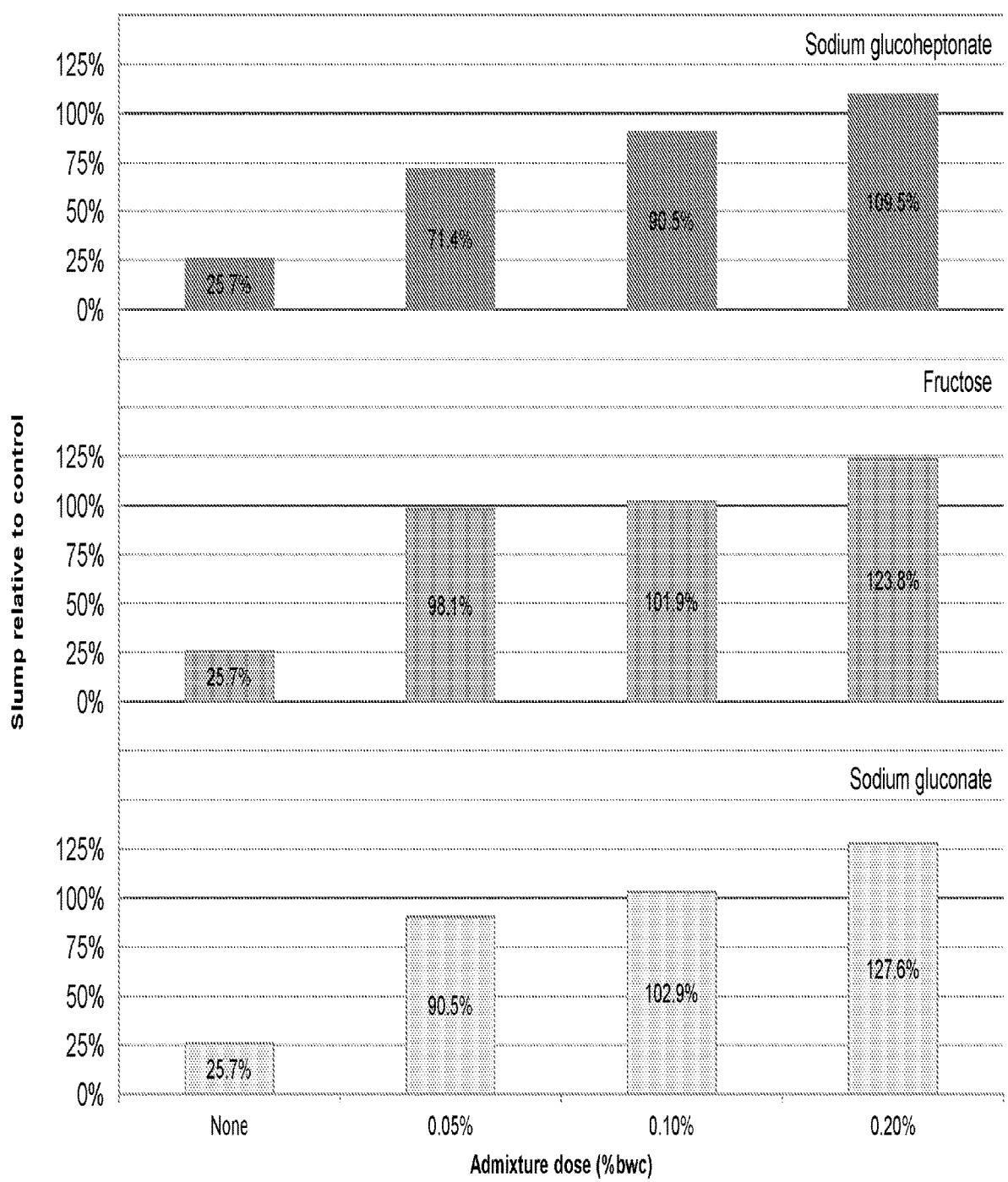
FIG. 24 provides a graphic illustration of slump, relative to untreated control, in carbonated mortar mixes treated with sodium glucoheptonate, fructose, or sodium gluconate at various concentrations.

Carbonation greatly decreased the mortar slump, while each of the admixtures, added after carbonation, improved slump. The carbonated slump matched the control upon addition of 0.05% fructose, 0.10% sodium gluconate or 0.2% sodium glucoheptonate. See FIG. 24.

Figure 25:
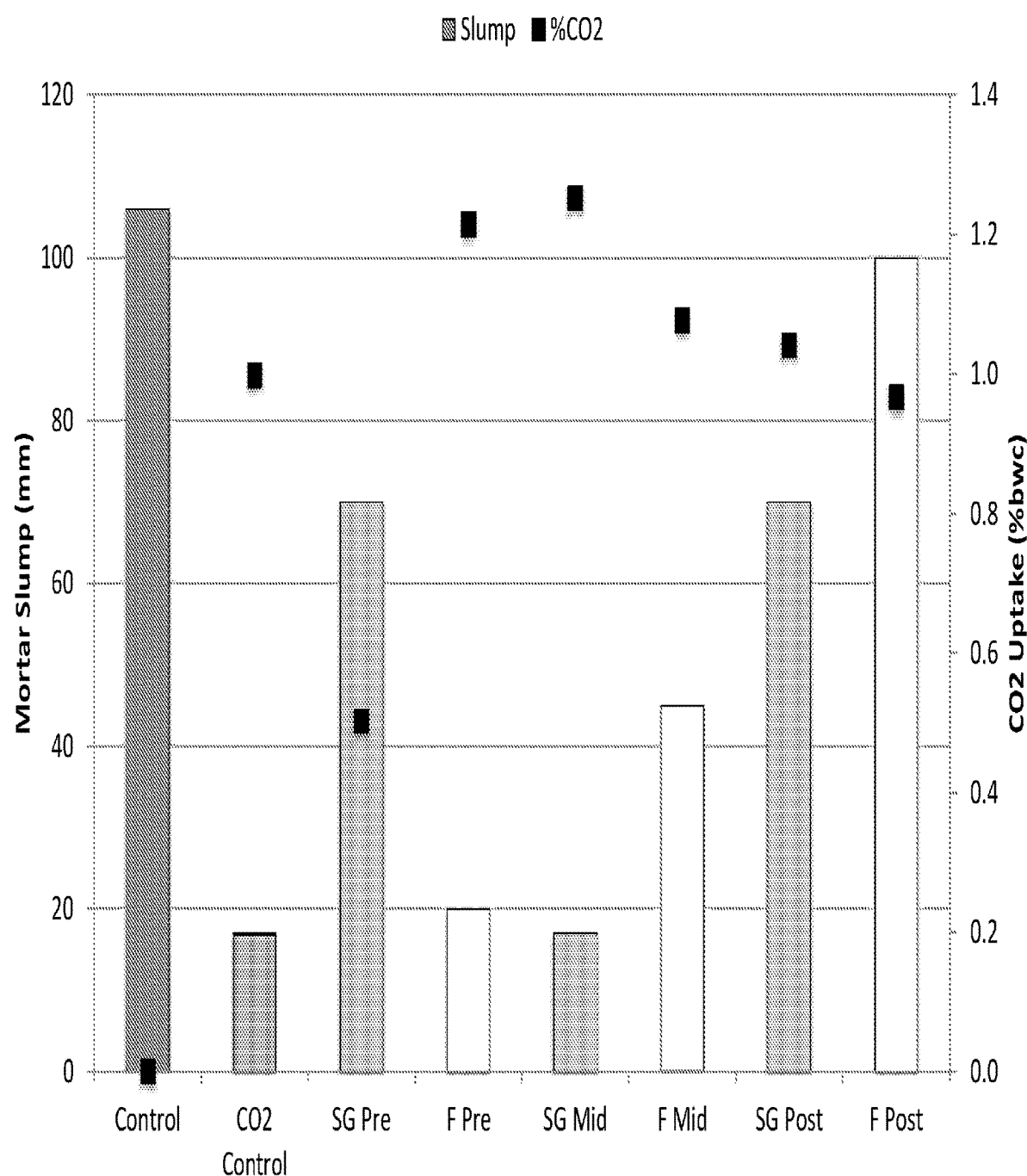
FIG. 25 provides a graphic illustration of effects on slump of fructose or sodium gluconate added to a mortar mix pre-, mid-, or post-carbonation.

In a second test, mortar mixes were prepared and carbonated as above, and either fructose or sodium gluconate was added before (Pre), during (Mid), or after (Post) carbonation, and the $CO_2$ uptake as well as slump was measured in the mortar mix. It was seen that the addition of admixture either Pre or Mid carbonation did not appreciably correct the decrease in slump caused by carbonation, whereas the addition of admixture Post carbonation greatly improved the slump (the apparent improvement in slump in the sodium gluconate Pre sample can be attributed to the anomalously low carbon dioxide uptake of this sample); this was true for both sodium gluconate and fructose. See FIG. 25.

Example 9

This example illustrates the effect of the time of addition of admix on workability and strength development in a carbonated mortar mix, as for a wet cast operation.

In a first test, mortar mix was prepared containing 535 g Portland cement (Holcim GU), 1350 g sand, and 267.5 g water. $CO_2$ gas was introduced at 20 LPM while mixing. The time of $CO_2$ delivery depended on the target $CO_2$ uptake, for example, to achieve 1.1% bwc the delivery took 3 to 4.5 min. Mortar cubes were created with C109M-12 Standard Test Method for Compressive Strength of Hydraulic Cement Mortars. All samples contained 0.10% bwc PCE (Mighty 21ES by Kao Chemicals) to assist casting of cubes.

Figure 26:
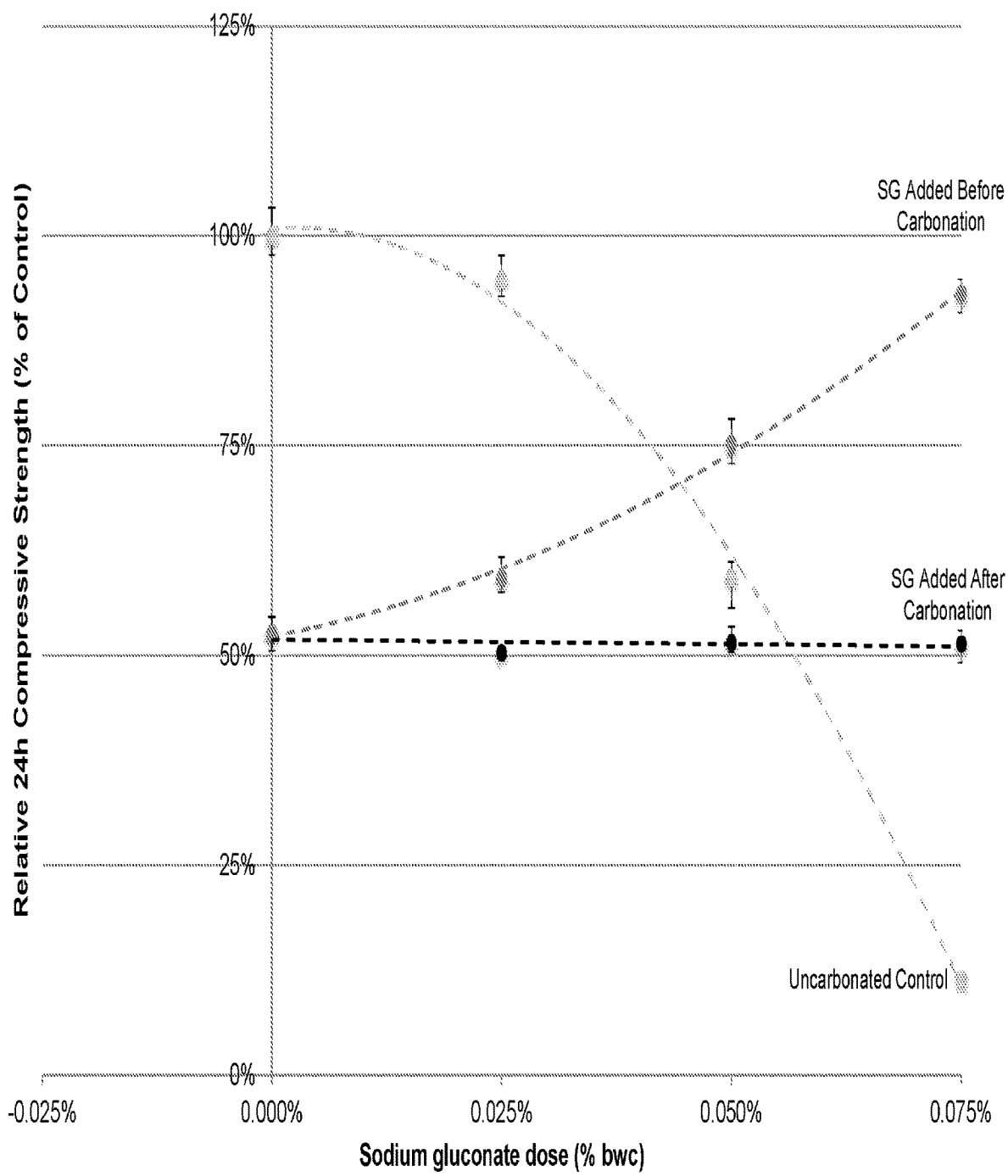
FIG. 26 provides a graphic illustration of effects on 24-hour compressive strength, compared to uncarbonated control, of a carbonated mortar preparation in which sodium gluconate was added either before or after carbonation at doses of 0, 0.025, 0.05, and 0.75%.

Sodium gluconate was added either before or after carbonation, at 0, 0.025, 0.05, and 0.075% bwc. Compressive strength at 24 hours was measured at 24 hours and compared to uncarbonated control. See FIG. 26. The sodium gluconate added after carbonation did not affect the 24-hour compressive strength, whereas sodium gluconate added before carbonation improved 24-hour compressive strength, but the mix was found to be stiff. The mix with sodium gluconate added after carbonation was workable, but strength development was adversely impacted.

In a second test, mortar was prepared and carbonated with or without sodium gluconate, added before or after carbonation, as in the first test, except the cement was Lehigh cement. The results were similar to those for mortar prepared with Holcim cement: When added after $CO_2$ the admix was a retarder and resulted in lower strengths at 24 hours. When added before the $CO_2$ the retarding effect was not evident and 24h strength was ~90% of control with relatively small SG dosages.

Example 10

This Example illustrates the effects of system temperature on carbon dioxide uptake in a wet mix.

In a first test, an experiment was conducted to look at the effect of the initial temperature of the materials on the carbonation behavior of fresh cement paste. Three target starting temperatures were considered, 7° C., 15° C. and 25° C. (actual temperatures were ±2° C.). Measurements include the mortar temperature, mini-slump (vertical slump and lateral spread), carbon dioxide uptake, and cube strength.

A mortar mix was prepared containing 535 g Portland cement (Holcim GU), 1350 g sand, and 267.5 g water. The mix was brought to 7, 15, or 25° C., and $CO_2$ gas was introduced at 20 LPM while mixing. The time of $CO_2$ delivery depended on the target $CO_2$ uptake, for example, to achieve 1.1% bwc the delivery took 3 to 4.5 min. $CO_2$ uptake at various time points was measured. Slump measurements were also taken at various time points.

Figure 27:
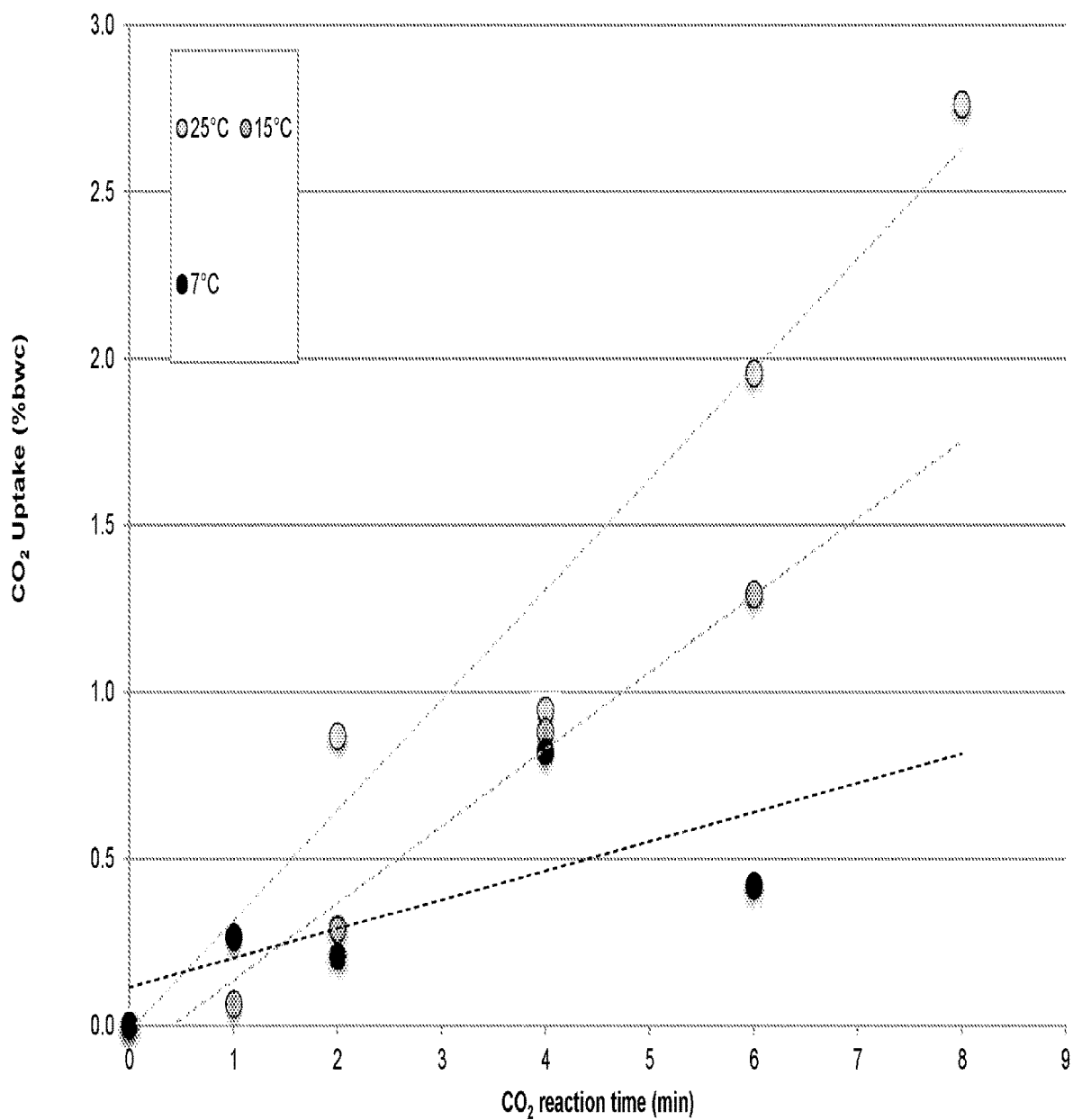
FIG. 27 provides a graphic illustration of the effects of temperature of materials on rate of carbon dioxide uptake in a mortar mix. Temperatures were 7° C., 15° C. and 25° C.

The effect of temperature on rate of carbon dioxide uptake is shown in FIG. 27, where the upper line and points are for 25° C., the middle line and points are for 15° C., and the lower line and points are for 7° C. Rate of uptake of carbon dioxide increased as temperature increased; the rate was 0.087% bwc/min at 7° C., 0.231 bwc/min at 15° C., and 0.331 bwc/min at 25° C. The rate of carbon dioxide uptake increased 278% as temperature increased from 7 to 25° C.

Figure 43:
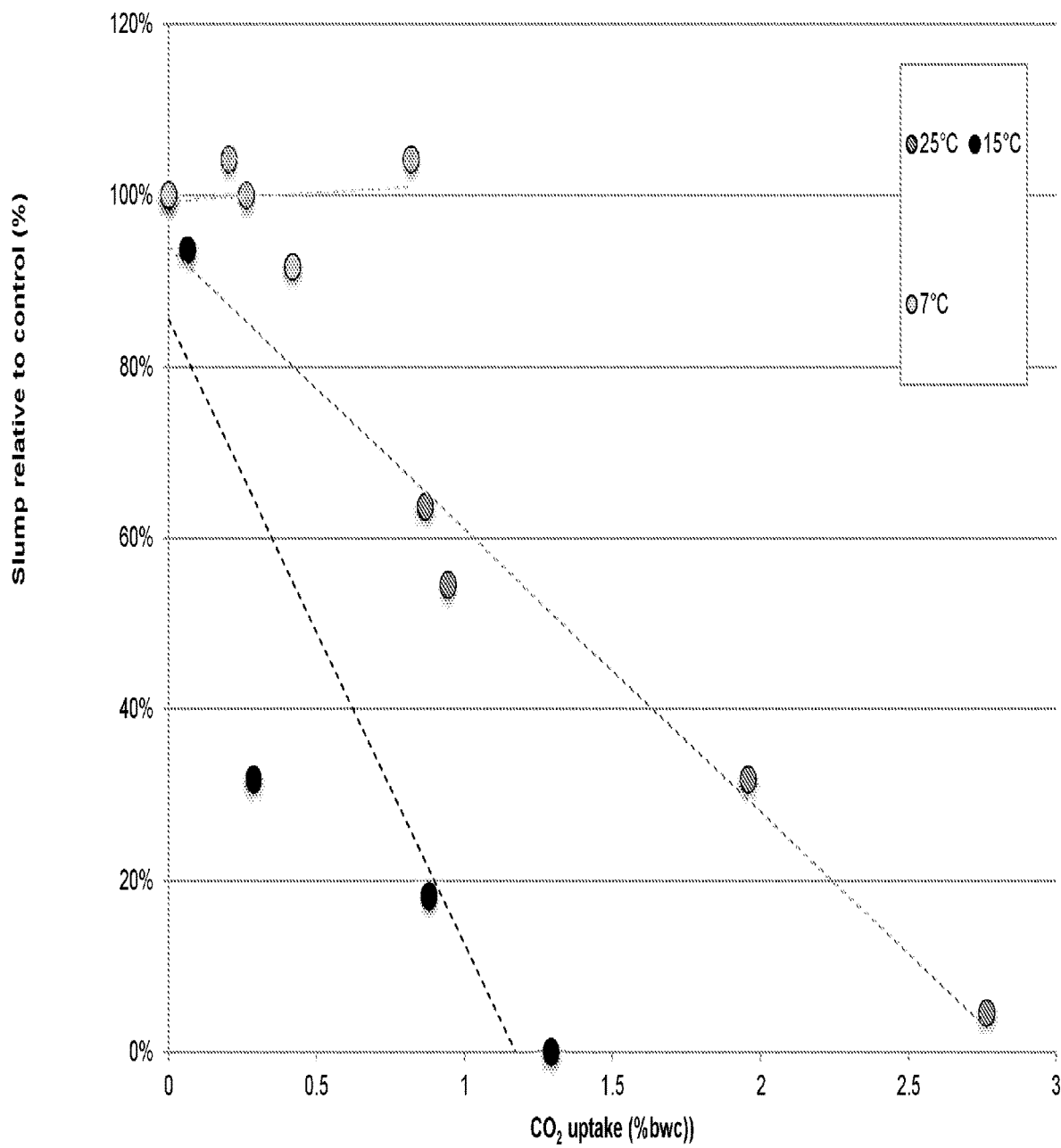
FIG. 43 provides a graphic illustration of the effects of temperature of materials on slump, relative to control, in carbonated mortar mixes. Temperatures were 7° C., 15° C. and 25° C.

The effect of temperature on slump is shown in FIG. 43. There was little effect on the workability with uptake of the mortar prepared at 7° C. (upper line and points). The workability of the mortar prepared at 15° C. declined rapidly with increasing uptake (lower line and points). The workability of the mortar prepared at 25° C. was between that of the two other mortars declining with uptake but taking higher uptakes than the 15° C. sample to reach zero workability (middle line and points).

Figure 28:
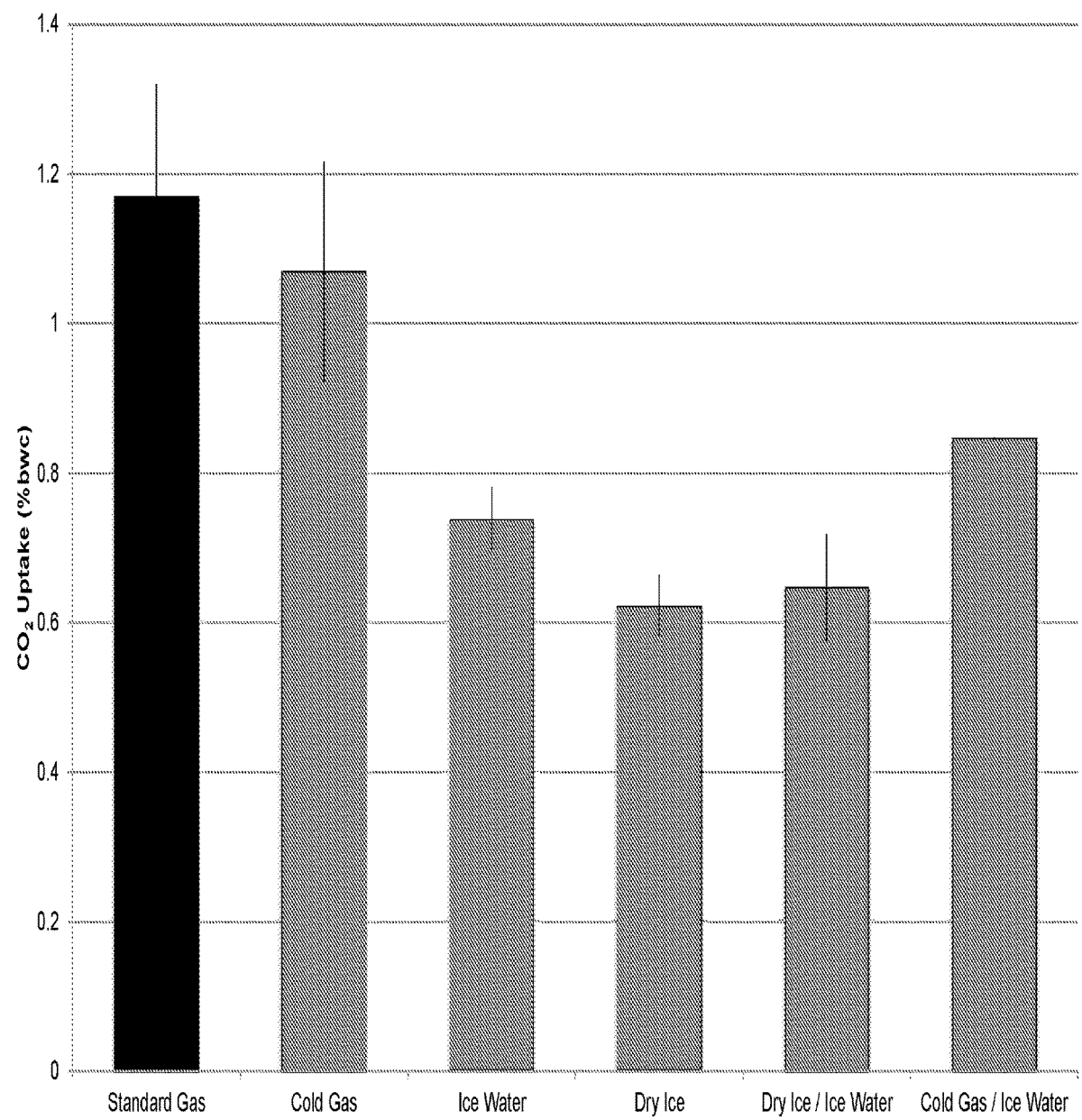
FIG. 28 provides a graphic illustration of the effects of heated or cold gases, or dry ice, on carbon dioxide uptake in a cement paste system.

In a second experiment, the effect of carbon dioxide temperature (heated or unheated (cold) or form (dry ice), in some cases combined with the use of ice water, on carbon dioxide uptake was measured in a cement paste system. Cement, mix water (untreated or ice water) and admix were mixed for 30 seconds in blender, and initial properties and temperature of the paste were evaluated. The paste was then carbonated while mixing in the blender. Carbonate while mixing in the blender, using heated gas, unheated gas (cold gas), or dry ice. Evaluate the final properties and temperature of the paste. FIG. 28 shows the results of the study. Heated or cold gases seemed to give approximately equivalent uptake. The mixes with cold temperature (cold mix water, dry ice) did not give improved carbon dioxide uptake.

Example 11

This example illustrates the beneficial effect of calcium containing compounds added before carbonation on 24 hour strength development in a carbonated mortar mix.

Figure 29:
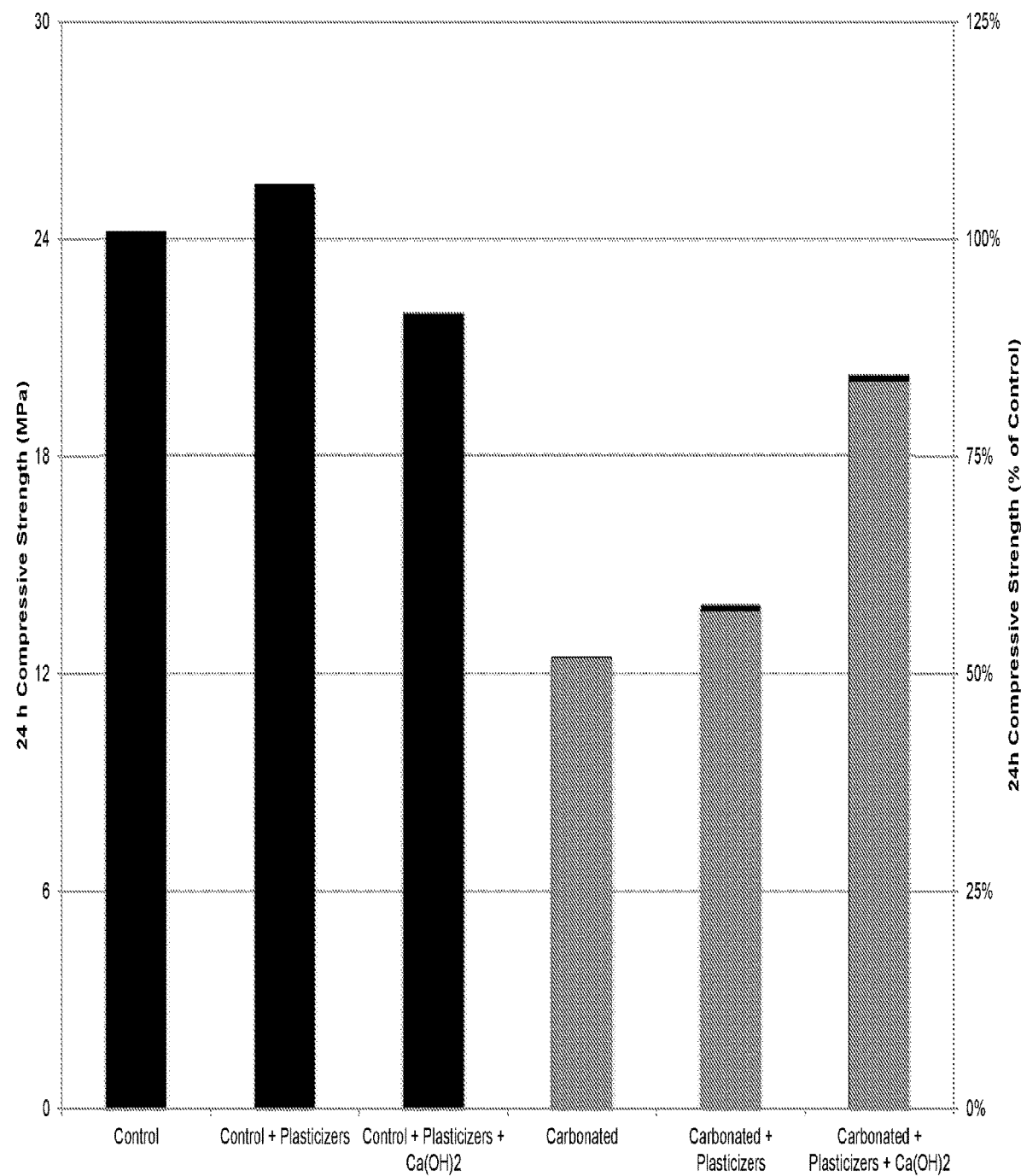
FIG. 29 provides a graphic illustration of the effects of plasticizers and calcium hydroxide on 24 hour compressive strength in carbonated and uncarbonated mortar mixes.

A mortar mix was prepared containing 535 g Portland cement (Holcim GU), 1350 g sand, and 267.5 g water. $CO_2$ gas was introduced at 20 LPM while mixing. The time of CO2 delivery depended on the target $CO_2$ uptake, for example, to achieve 1.1% bwc the delivery took 3 to 4.5 min. Mortar cubes were created with C109M-12 Standard Test Method for Compressive Strength of Hydraulic Cement Mortars. A plasticizer (0.10% Mighty ES+0.10% Sika VF) with or without Ca(OH)$_2$ (2.0% bwc) was added before carbonation, and effects on 24-hour compressive strength were measured. The results are shown in FIG. 29. Carbonation decreased the 24 hour strength of the mortar. The use of a plasticizer improved the strength of both carbonated and control mortars. The further addition of Ca(OH)$_2$ decreased the 24 hour strength of the control product but further increased the 24-hour strength of the carbonated product.

Figure 30:
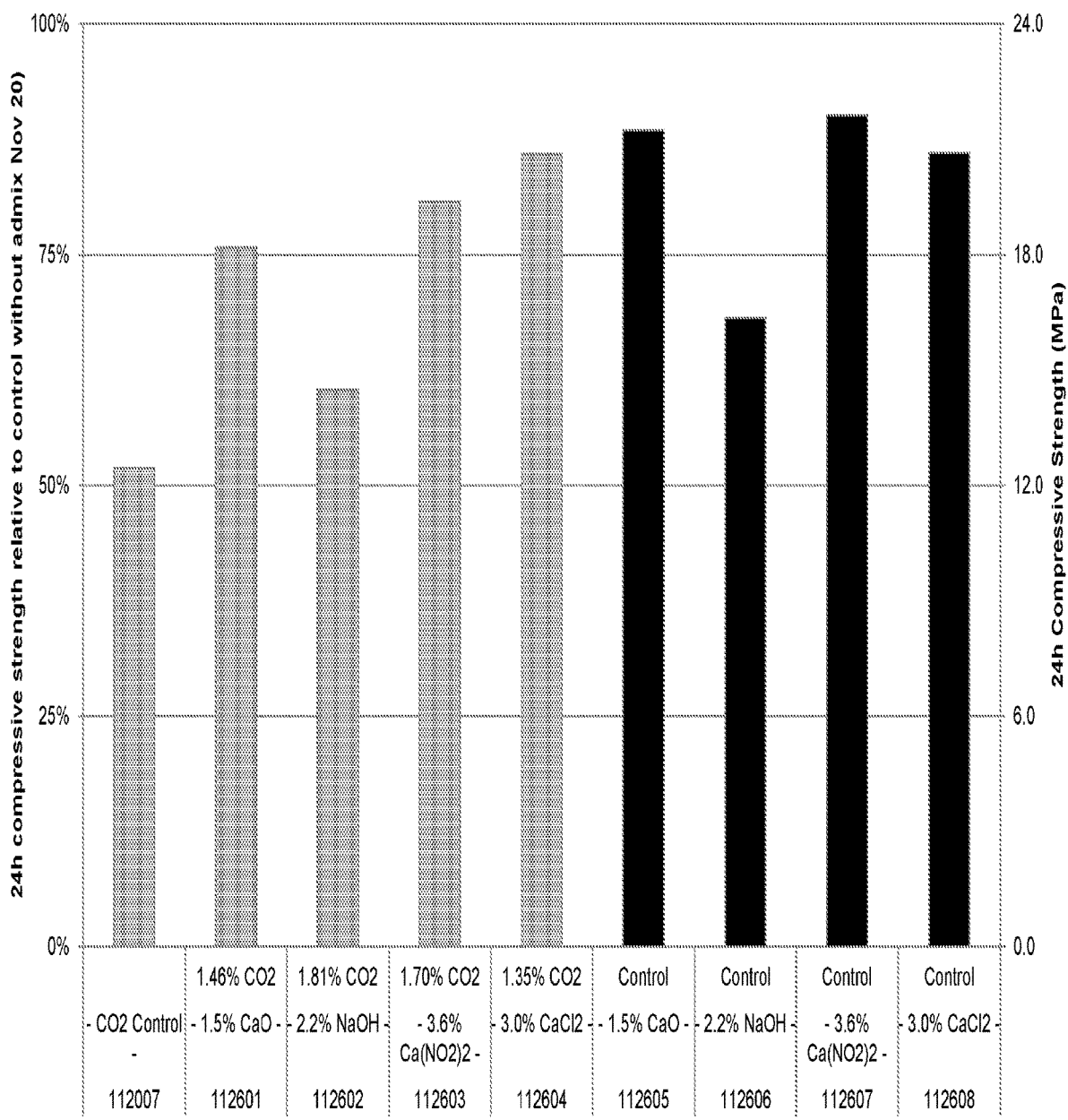
FIG. 30 provides a graphic illustration of the effects of CaO, NaOH, Ca(NO$_2$)$_2$, and CaCl$_2$ on 24 hour compressive strength in carbonated and uncarbonated mortar mix.

In a second experiment, CaO (1.5%), NaOH (2.2%), Ca(NO$_2$)$_2$, or CaCl$_2$ (3.0%) were added before carbonation to a mortar mix as above. Results are shown in FIG. 30. All calcium compounds showed benefits for strength development in the carbonated mortar mix, relative to carbonated mortar mix with no admixture added.

Example 12

This example illustrates that the timing of addition of an admixture used for conventional purposes, in this case an air entrainer, relative to carbonation, may be important to retain the effect of the admixture.

A calcium hydroxide slurry was used as a test system. 20 g of Ca(OH)$_2$ was mixed with 40 g water to form a slurry. CO$_2$ gas was injected into the slurry at 5 LPM. The temperature, an indicator of carbon dioxide uptake, was measured over a 9-minute period. The plain slurry contained no admixture, while the slurry with an air entrainer contained 2.5% (by mass of Ca(OH)$_2$ of a liquid solution of hydrocarbons used for air entrainment in concrete (AirEx-L, Euclid Chemical). The carbon content was quantified using a combustion infrared detection carbon analyzer (Eltra CS 800, Eltra GmbH, Germany). The net % CO$_2$ increase was calculated in comparison to a base uncarbonated system containing the components.

After 10 minutes of carbonation, the slurry without an additive showed a CO$_2$ uptake that was 25.5% of the original solid mass, while the slurry with the air entrainer additive had an uptake that was 36.2%; thus, the surfactant admixture increased the CO$_2$ uptake by 42.1%.

In a second test, various surfactants were tested for their effects on CO$_2$ uptake. Standard mortar mix, as in Example 8, was used, and the surfactants were dosed at 0.10% bwc. CO$_2$ as injected for 6 minutes during mixing. Initial and final temperatures were measured and net increase in CO$_2$ content was measured as above. The results are shown in Table 5.

TABLE 5

| | | | | | |
|---|---|---|---|---|---|
| Effects of surfactants on CO2 uptake | | | | | |
| Additive | Source | Initial Temp, ° C. | Final Temp, ° C. | Temp Change | Net CO$_2$ % | CO$_2$ increase |
| None | | 23.8 | 33 | 9.2 | 1.65 | Baseline |
| Sunlight | Dish soap | 24.1 | 41.4 | 17.3 | 2.89 | 75% |
| Sunlight | Dish soap | 24.1 | 41.9 | 17.8 | 3.34 | 102% |
| MB AE-90 | BASF | 23.4 | 33 | 9.6 | 1.80 | 9% |
| Solar:w | Guelph Soap | 23.8 | 35.2 | 11.4 | 2.17 | 31% |
| AirEX-L | Euclid | 23.8 | 40.6 | 16.8 | 2.84 | 72% |

In a third test, mortar batches as above, containing 0.1% bwc of a surfactant air entrainer (Euclid AirEx-L), or no surfactant (control) were exposed to CO$_2$ during mixing for 0, 2, 4, or 6 minutes, and the CO$_2$ uptake measured. There was greater uptake in the mortar treated with air entrainer than in control, untreated mortar at all time points, but the relative improvement was greater at the low exposure times: there was a 117% increase in CO$_2$ uptake compared to control at 2 min, a 104% increase in CO$_2$ uptake at 4 minutes, and a 28% increase in CO$_2$ uptake at 6 min.

Figure 31:
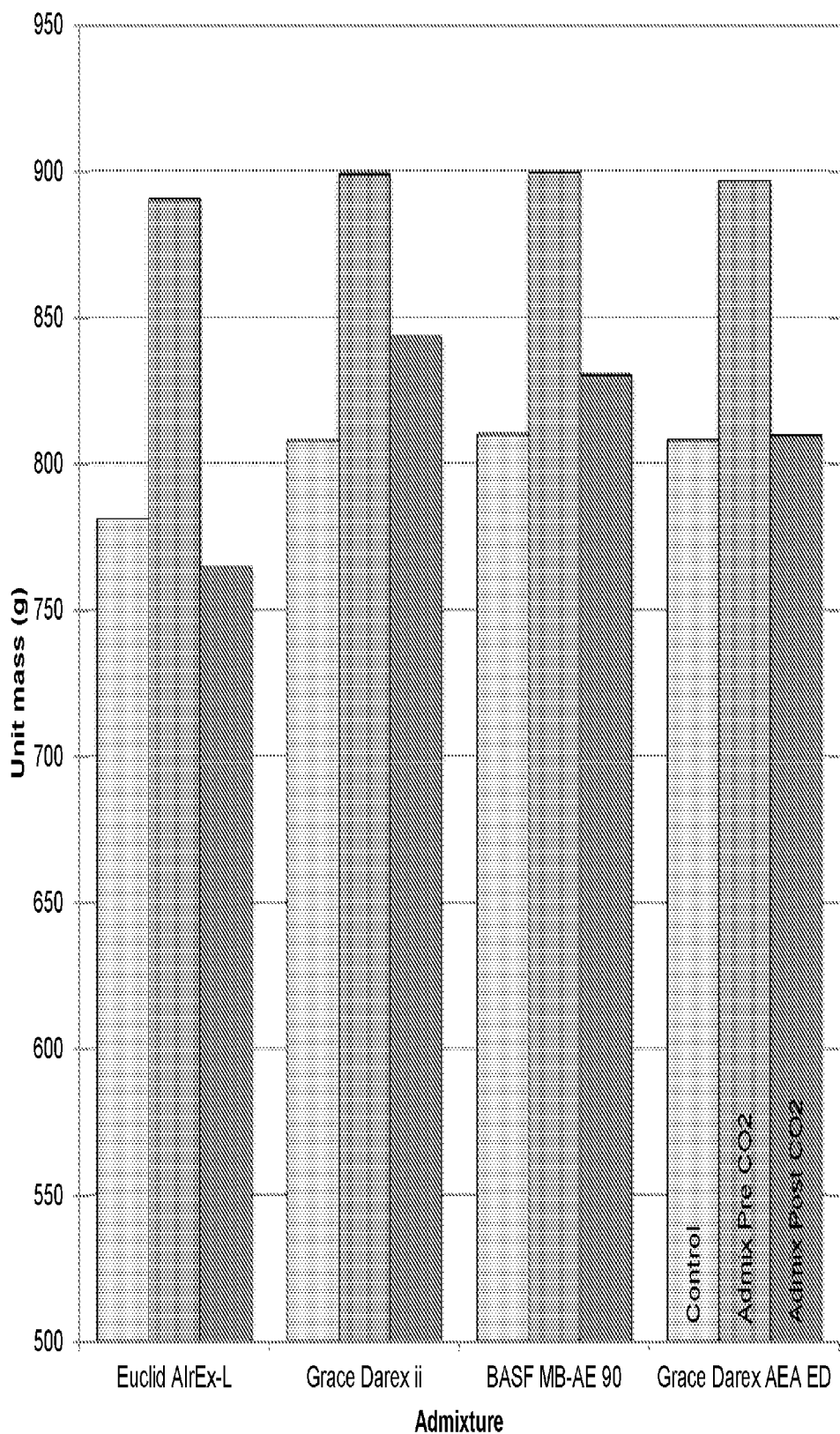
FIG. 31 provides a graphic illustration of the effect of carbon dioxide addition before or after the addition of an air entrainer on mortar density.

In a fourth test, the effect of CO$_2$ addition before or after addition of an air entrainer on mortar density was tested. A lower unit weight indicated a higher air content. Four air entrainers were used: Euclid Air-Ex-L, Grace Darex ii, BASF MB-AE 90, and Grace Darex AEA ED. The results are shown in FIG. 31. In all cases, addition of the air entrainer pre-CO$_2$ treatment led to an increase in density, whereas addition of the air entrainer post-CO$_2$ treatment resulted in a density the same as untreated mortar.

This Example illustrates that the timing of CO$_2$ treatment relative to addition an air entrainer affects rate of CO$_2$ uptake and density. If it is desired to maintain the density effect of the air entrainer, it should be added after CO$_2$ addition. In some cases, a two-dose approach could be used where an early dose of air entrainer is used to enhance CO$_2$ uptake, then a later dose to achieve desired effects on density.

Example 13

This Example describes tests of carbonation in a precast dry mix operation. Tests were conducted at a precast facility in which a concrete mix was carbonated at different stages of the casting process, in some cases using a sodium gluconate admixture at various concentrations. The effects of carbonation, with and without admixture, on strength and water absorption were measured.

The concrete mix shown in Table 6 was used.

TABLE 6

| | | |
|---|---|---|
| Standard Block Design | | |
| Component | Name | Amount |
| Coarse aggregate | Birdseye Gravel | 685 lb |
| Fine aggregate | Meyers Mat Torp Sand | 4320 lb |
| Fine aggregate | Silica Sand/Wedron 430 | 1250 lb |
| Cement | Illinois Product | 1000 lb |
| Admixture | Rainbloc 80 | 50 oz |
| Target water content | | 6.5% |

The aggregates, cement and water were added to a planetary mixer. Carbon dioxide was flowed into the mixer via a ¾ inch diameter rubber pipe for 180 s at a flow rate to achieve the desired carbonation. In some runs, carbon dioxide was added both at the mixer and at the feedbox. In a preliminary run, all water was added initially, but in subsequent runs, additional water was added about halfway through the 180s according to an assessment of the mix consistency prior to the completion of the mix and additional water was added as necessary to achieve a desired mix look. Batches with carbon dioxide delivered to the concrete required additional water nearly in proportion to the amount of carbon dioxide gas supplied. The concrete mix was placed in a mold to produce 8 inch blocks, which were tested for density, compressive strength at 7, 28, and 56 days, and water absorption (all according to ASTM C140, 5 blocks per test). The carbonation of the concrete was also determined: The samples for analyzing the carbon dioxide content of the concrete were created by taking a fresh sample from the production line, drying the concrete on a hot plate to remove the water, and subsequently sieving the material through a 160 μm sieve. Samples of the raw materials were examined to determine how much of each component passes a 160 µm sieve and the carbon content of the passing material. This information, along with the concrete mix design, allows for the calculation of a theoretical control carbon content against which analyzed samples can be compared. The carbon content was quantified using a combustion infrared detection carbon analyzer. The net % $CO_2$ increase was calculated in comparison to a base uncarbonated system containing the components.

In a first test, carbonation at both the feedbox and mixer or just the feedbox was tested. The variations examined are summarized in TABLE 7, below. Data for controls, which were prepared on other days (samples 500 and 700), are also presented.

TABLE 7

Standard Block Production Variables and Water Contents

| Code | Condition | Mode | Total Dose (% bwc) | w/c | Water fraction |
|---|---|---|---|---|---|
| 0600 | Control | Uncarbonated | — | 0.392 | 6.64% |
| 0601 | $CO_2$ | Feedbox 0.5% | 0.5% | 0.422 | 8.32% |
| 0602 | $CO_2$ | Mixer 0.5% | 0.5% | 0.430 | 8.25% |
| 0603 | $CO_2$ | Mixer 1.0% | 1.0% | 0.440 | 8.08% |
| 0604 | $CO_2$ | Mixer 1.0%, Feedbox 0.5% | 1.5% | 0.450 | 8.23% |
| 0605 | $CO_2$ | Mixer 1.5% | 1.5% | 0.455 | 8.39% |
| 0500 | Control | Uncarbonated | — | 0.406 | 8.88% |
| 0700 | Control | Uncarbonated | — | 0.426 | 7.45% |

FIG. 32 shows the results of tests for carbon dioxide uptake, compressive strength, water absorption, and density for the blocks produced in this test.

The efficiency of carbon dioxide uptake was greatest in the 1.5% bwc dose where carbon dioxide was delivered only to the mixer (batch 0605); delivery of 0.5% of the dose at the feedbox was consistently less efficient than delivery of all of the same dose at the mixer (batch 0601 compared to batch 0602; batch 0604 compared to batch 0605). A carbon dioxide uptake efficiency of 93% was achieved with a $CO_2$ dose of 1.5% delivered solely at the mixer (batch 0605). Consequently, in subsequent tests a dose of 1.5% $CO_2$, delivered solely at the mixer, was used.

The addition of $CO_2$ to the mix consistently improved compressive strength at 7, 28, and 56 days, at all doses tested, whether or not the $CO_2$ was added at the mixer, the feedbox, or both. The overall average compressive strengths of the two (uncarbonated) control sets (0500 and 0700) were 2843, 3199, and 3671 psi at 7, 28, and 56 days, respectively. At 7 days the first four batches made with $CO_2$ (0601, 0602, 0603, and 0604) showed a 30-36% strength benefit over the average control, and the final carbonated batch (0605) was 18% stronger. The strength benefit was maintained at 28 days with a benefit of the first four carbonated conditions ranging from 29037% and the final batch being 19% better than the average control. The 56 day results indicated the strength benefit had increased to 30-45% for the first four sets and 36% for the final set.

Water absorption was reduced through carbonation. Mixes 0601 to 0603 had a water absorption about 35% lower than that of uncarbonated control (0500 and 0700), and mixes 0604 and 0605, in which 1.5% $CO_2$ was added, had a water absorption of about 18% lower than control.

Density of the carbonated mixes varied with amount of carbon dioxide added. The density of the two lowest $CO_2$ (0.5%) batches (0601 and 0602) was about 2.5% higher than control, but the density of the batches carbonated at a dose of 1.0 or 1.5% (0603, 0604, and 0605) were equivalent to the density of the control.

Overall, this test indicated that carbonation of this mixture in a precast operation producing 8 inch blocks indicated that an efficiency of carbon dioxide uptake of over 90% could be achieved, producing blocks that were stronger than uncarbonated at all carbon dioxide doses and time points tested, culminating in a 56 day strength that averaged over 30% greater than control. Water absorption of the carbonated blocks was consistently lower than control, and the blocks carbonated at 1.0 and 1.5% $CO_2$ dose had a density the equivalent of uncarbonated blocks.

In a second test, the mix of TABLE 8 was used, with a dose of 1.5% $CO_2$, delivered at the mixer, and, in addition five different doses of a sodium gluconate admixture were delivered-0.1, 0.2, 0.3, 0.4, and 0.5% bwc. The sodium gluconate was delivered in water solution, dissolved one gallon of water (0.1, 0.2, and 0.3%) or in two gallons of water (0.4 and 0.5%). The sodium gluconate admixture was added about 75s after carbon dioxide delivery to the mixer started, and took about 90s to add. Admixture was added manually during the mixing cycle. The addition of admixture was begun during the carbon dioxide addition so as not to extend the mixing cycle. Carbonation, compressive strength, density, and water absorption were measured.

The investigated variables and water contents are summarized in Table 8. The overall results are summarized in FIG. 32.

TABLE 8

Standard Block, with sodium gluconate

| Code | Condition | Mode | $CO_2$ Dose (% bwc) | Sodium gluconate | w/c | Water fraction |
|---|---|---|---|---|---|---|
| 0700 | Control | — | — | — | 0.425 | 7.35% |
| 0701 | $CO_2$ | Mixer | 1.5 | 0.5% | 0.413 | 8.12% |
| 0702 | $CO_2$ | Mixer | 1.5 | 0.4% | 0.413 | 7.85% |
| 0703 | $CO_2$ | Mixer | 1.5 | 0.3% | 0.424 | 7.99% |
| 0704 | $CO_2$ | Mixer | 1.5 | 0.2% | 0.426 | 7.87% |
| 0705 | $CO_2$ | Mixer | 1.5 | 0.1% | 0.433 | 7.81% |
| 0706 | Control | — | — | — | 0.426 | 7.45% |

The efficiency of $CO_2$ delivery for batches produced in this test was found to range from 78% to 94%, across all batches. The gas injection parameters were held constant and the average efficiency was found to be about 85%.

Figure 33:
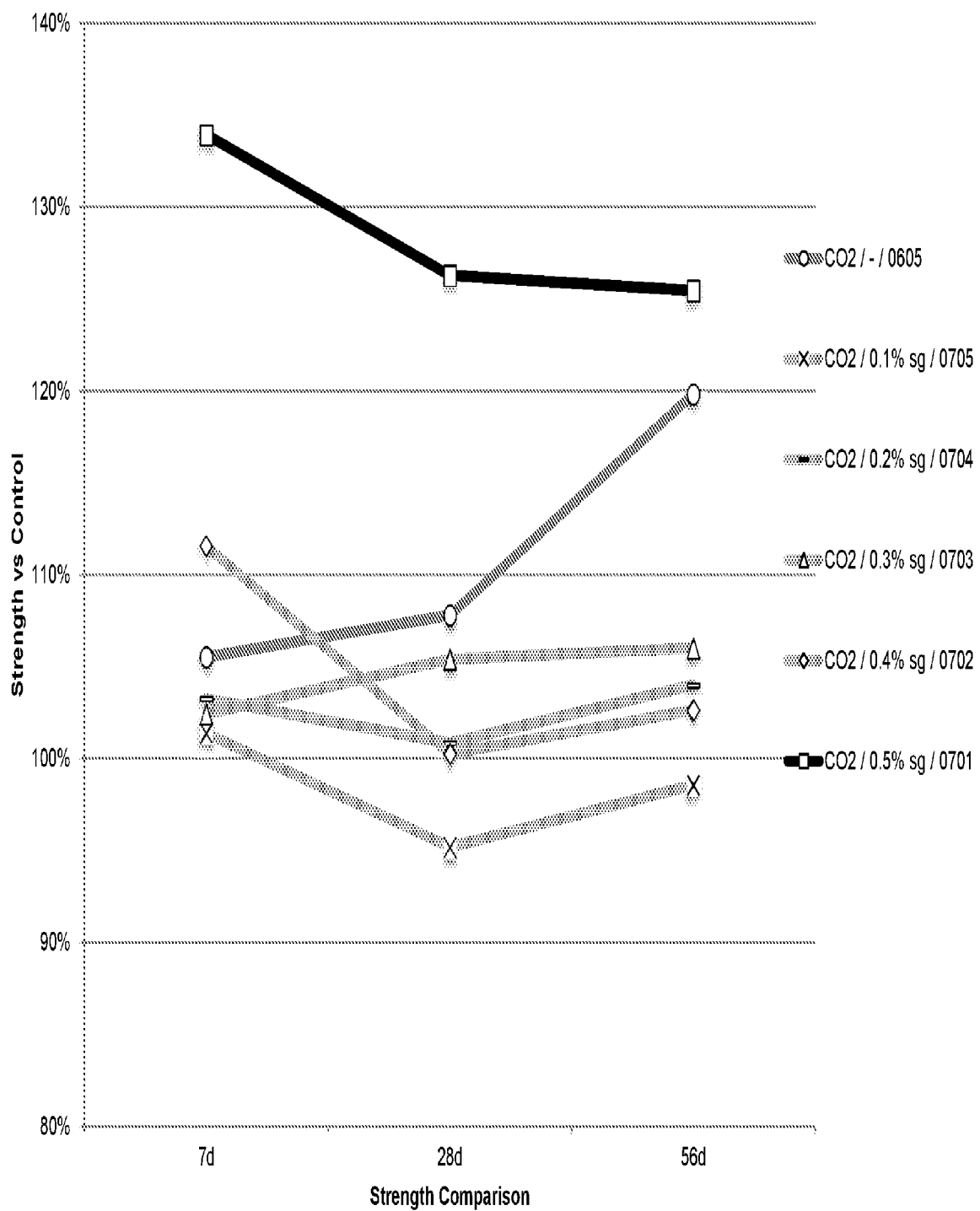
FIG. 33 is a graphic illustration of the effects of sodium gluconate dose on 7-, 28- and 56-day compressive strengths of carbonated blocks produced in a dry cast operation, with various doses of sodium gluconate, compared to uncarbonated control.

It was shown that the strength was sensitive to the admix dose. See FIG. 33. The control strength can be taken at 100% at all ages and the carbonated strengths are shown in relative comparison. For the lower doses the carbonated concrete strength was equivalent to the control strength at both 7 and 28 days. For a dose of 0.4% there was a 12% strength benefit at 7 days and equivalent performance at 28 and 56 days. For a dose of 0.5% there was a 34% strength benefit at 7 days, 28% at 28 days, and 25% at 56 days. These results indicate that there is a certain amount of admixture required in the concrete beyond which a strength benefit can be realized.

It is shown that the water absorption was again reduced for the carbonated products. All carbonated mixes were dosed with 1.5% $CO_2$ bwc and had similar uptakes. The water absorption was reduced 12% for the lowest and 31% for the highest admixture dose. The density showed some dependence on admixture dosage. The carbonation treatment with the small dose of admixture decreased the density from 131 to 128.5 lb/ft$^3$ (though it can be noted that the strength remained equivalent to the control). The density increased with admixture dose and equivalent density was found with a dose of 0.3% and density was 1.3% higher for the highest admix dose.

Emissions reduction: The carbon dioxide absorbed in the concrete can effectively reduce the embodied carbon emissions. If the block mass and mix design are known, then the total emissions related to the cement can be determined. In this Example, the 17.7 kg block is found to be 12.9% (by wet mass) cement and thus there are 2282 g of cement in each block. The cement was suggested by the supplier to be 94% clinker. If the emissions intensity of the clinker is assumed to be a generic 866 kg $CO_2$e/tonne of clinker produced then the clinker emissions for each block reach 1858 g. A generic carbonation uptake scenario can allow for an overall carbon dioxide absorption and net emissions offset to be calculated. The overall uptake efficiency in the present Example, taking into account all testing, was 88%. A 1.5% dose by weight of cement means that 34.2 g of $CO_2$ are dosed per block while the uptake efficiency means that 30.1 g are bound as stable carbonate reaction products in the block. The difference is a loss representing the 12% inefficiency. Under these assumptions, the absorbed amount of carbon dioxide represents a direct offset of about 1.62% of the emissions from the clinker production. A net sequestration consideration requires a detailed analysis including the emissions required to implement the technology. A reasonable estimate can be made by considering the energy to capture and compress the $CO_2$ and the distance the $CO_2$ had to be transported. Additional factors are relevant (such as the creation and transport of the hardware for the technology) but are considered minor in the face of the gas-related aspects. The closest industrial $CO_2$ source to the trial site was 63 miles away. The transportation emissions can be taken to be 222 g $CO_2$/tonne-mile of freight (United States Environmental Protection Agency, 2014). The energy required to capture carbon dioxide is on the order of 150 kWh/tonne. For 1000 blocks a 1.5% bwc dose would inject 34,250 g of $CO_2$. The total absorption would be 30,140 g of $CO_2$. The gas processing and transport is calculated with respect to the total injected amount. The carbon dioxide emissions associated with the energy required to capture and compress the $CO_2$ is 3,522 g. The transportation of the liquid $CO_2$ 63 miles resulted in carbon dioxide emissions of 479 g. No energy is required to vaporize the liquid $CO_2$ at the concrete plant if an atmospheric vaporizer is employed. The technology to carbonate 1000 blocks would result in $CO_2$ emissions of 4,001 g. The net utilization, 26,139 g, is then the difference between the total carbon dioxide absorbed and total process emissions. This means that 13.3% of the absorbed carbon dioxide cannot be associated with an environmental benefit due to the associated emissions. However, it suggests that the net efficacy of the $CO_2$ utilization is 86.7%. A sensitivity analysis can suggest how location-specific inputs can affect the sequestration efficacy. Certain locations are further from sources of industrial $CO_2$ than the present case. If the liquid $CO_2$ transport distance was increased to 600 miles (reasonable in markets where industrial gases are shipped from distant areas) then the increase in transport emissions reduces the estimated efficacy to 73.2%. However, if the distance was kept at 63 miles then the effect of grid emissions on carbon dioxide processing emissions can be examined. An example of low grid emissions can be found in New York where parts of the state see 548.37 lb $CO_2$e/MWh (248.7 g CO2e/kWh). The reduced gas processing emissions would increase the sequestration efficacy to 94.2%. An example of very low grid emissions can be found in Quebec at 5.1 lb $CO_2$e/MWh (2.3 g $CO_2$e/kWh), where the efficacy would reach 98.4%. On the other hand, Colorado has high grid emissions of 1906.27 lb $CO_2$e/MWh (864.7 g $CO_2$e/kWh). The efficacy would decrease to 83.7%. These estimates are consistent with a previously examined case. On the order of 80-90% of the carbon dioxide absorbed by the concrete would represent a net removal of $CO_2$ from the atmosphere while the balance would be offset by the emissions required to employ the technology.

This example illustrates that carbon dioxide can be added to a precast concrete mix in a dry cast operation at the mixer stage and the products formed are generally stronger, show lower water absorption, and equivalent density when compared to non-carbonated products. The addition of a sodium gluconate admixture resulted in a dose-dependent effect on strength, water absorption and density, and indicated that an optimum dose for admixture can be achieved to optimize these parameters.

Example 14

In this example the same precast equipment was used in the same facility as in Example 13, but using three different concrete mixes: a limestone mix, a lightweight mix, and a sandstone mix. This example illustrates the importance of adjusting carbonation mix parameters to mixes with different characteristics.

Three different mix designs were used, shown in TABLES 9, 10, and 11.

TABLE 9

Limestone Block Mix Design

| Component | Name | Amount |
|---|---|---|
| Coarse aggregate | Sycamore FA-5 | 3152 lb |
| Coarse aggregate | Sycamore FM-20 | 5145 lb |
| Fine aggregate | Silica Sand/Wedron 430 | 745 lb |
| Cement | Illinois Product | 351 lb |
| Cement | White Cement | 819 lb |
| Admixture | Rainbloc 80 | 59 oz |
| Admixture | Frocast 150 | 117 oz |
| Target water content | | 8.6% |

TABLE 10

Lightweight Block Mix Design

| Component | Name | Amount |
|---|---|---|
| Coarse aggregate | Birdseye Gravel | 1030 lb |
| Coarse aggregate | Gravelite | 1500 lb |
| Fine aggregate | Screening Sand | 2200 lb |
| Fine aggregate | Meyers Mat Torp Sand | 1500 lb |
| Cement | Illinois Product | 725 lb |
| Admixture | Rainbloc 80 | 34 oz |
| Target water content | | 7.9% |

TABLE 11

Sandstone Block Mix Design

| Component | Name | Amount |
|---|---|---|
| Coarse aggregate | Sycamore FA-20 | 3750 lb |
| Fine aggregate | Meyers Mat Torp Sand | 1800 lb |
| Cement | Illinois Product | 730 lb |
| Admixture | Rainbloc 80 | 37 oz |
| Target water content | | 7.0% |

Limestone Mix Test.

In a first test, the limestone mix of TABLE 9 was used. Conditions were as for the second test of Example 13, with $CO_2$ added at a dose of 1.5% in the mixer. Addition of 0.4% sodium gluconate was tested. The addition of the Procast admixture that is normally part of the mixing sequence for the limestone mix design was delayed to be added after the carbon dioxide injection was complete. The investigated variables and water contents are summarized in Table 12. The overall results are summarized in FIG. 34.

TABLE 12

Limestone Mix Production Variables and Water Contents

| Mix Code | Mix Design | Condition | Mode | $CO_2$ Dose (% bwc) | Admix | w/c | Water fraction |
|---|---|---|---|---|---|---|---|
| 0805 | Limestone | Control | — | — | — | 0.225 | 7.75% |
| 0806 | Limestone | $CO_2$ | Mixer | 1.5 | 0.4% | 0.514 | 8.53% |

The limestone mix design was examined in only a limited production run partly due to the perceived difficulty of accurately assessing the net amount of absorbed carbon dioxide against the high carbon content of the limestone background, at least when using the current analytical methods and procedures.

The compressive strength data showed that the carbonated limestone blocks averaged 2349 psi at 7 days and were slightly weaker (7%) than the control blocks. The 28 day strength was 2518 psi and 14% lower than the control. The 56 day strength averaged 2762 psi and 9% weaker than the control though this gap could be narrowed to 6% if an outlier point was removed. The dose of admixture in this test was determined using the Illinois Product cement and no advance tests on the Federal White cement used in the limestone mix design were performed. Subsequent lab development has made it clear that the effect and dosage of the admixture is sensitive to cement type. The integration of the carbonation technology may require a small investigative series of trial runs to determine both if the admixture is desired and what the proper dose should be. The success at demonstrating the admixture usage, for the Illinois Product cement, in the lab prior to the pilot suggests that preliminary optimization screening could be accomplished for any mix for which the materials were available.

In terms of water absorption, it was found that the carbonated limestone block had a higher absorption and lower density than the control blocks. The absorption was increased 18% and the density was decreased 2%. The results agree with the lower strength of the carbonated limestone blocks and support the need to fine tune the inputs used when carbonating this mix.

Lightweight mix test. In a second test, the lightweight mix of Table 10 was used. Conditions were as for the second test of Example 13, with $CO_2$ added at a dose of 1.5% in the mixer. Addition of sodium gluconate at three different levels, 0.35, 0.4, and 0.45% was tested. The investigated variables and water contents are summarized in Table 13. The overall results are summarized in FIG. 35.

TABLE 13

Lightweight Mix Design Production Variables and Water Contents

| Mix Code | Mix Design | Condition | Mode | $CO_2$ Dose (% bwc) | Admix | w/c | Water fraction |
|---|---|---|---|---|---|---|---|
| 0801 | Lightweight | Control | — | — | — | 0.745 | 6.96% |
| 0901 | Lightweight | $CO_2$ | Mixer | 1.5 | — | 0.691 | 12.25% |
| 0902 | Lightweight | $CO_2$ | Mixer | 1.5 | 0.35% | 0.703 | 13.79% |
| 0802 | Lightweight | $CO_2$ | Mixer | 1.5 | 0.40% | 0.758 | 8.80% |
| 0903 | Lightweight | $CO_2$ | Mixer | 1.5 | 0.45% | 0.707 | 13.99% |

Preliminary results suggest that an increase in $CO_2$ content similar to what has been observed for the Standard Block occurred for carbonated Lightweight mixes in all cases. However, due to inherent difficulties performing carbon quantification for these mix designs a definitive analysis was not performed, and actual numbers obtained, in some cases over 100%, are not reliable.

Figure 36:
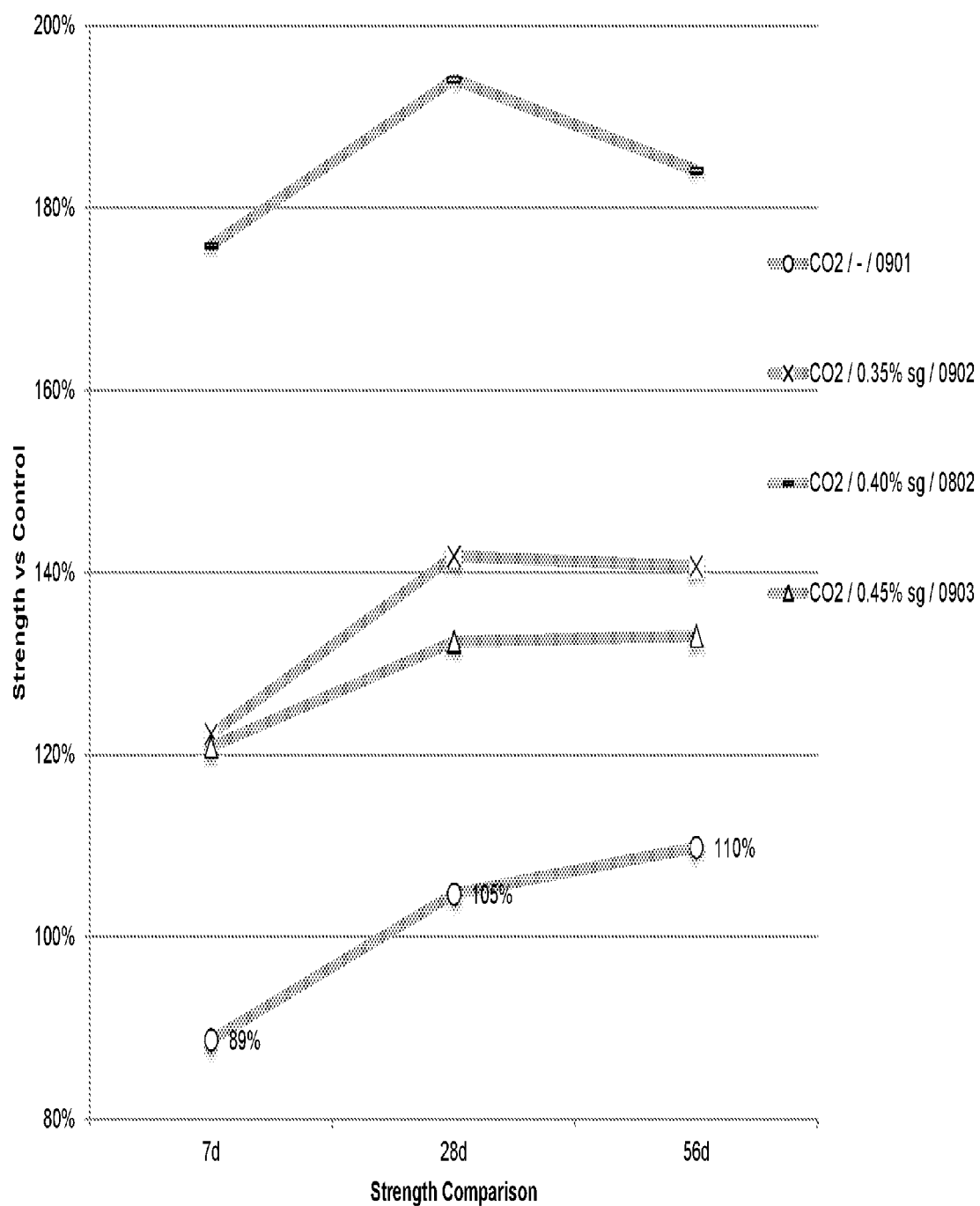
FIG. 36 provides a graphic illustration of 7-, 28-, and 56-day compressive strengths of lightweight blocks produced in a dry cast operation with carbonation and various doses of sodium gluconate.

The compressive strength data for the lightweight mix is summarized in FIG. 36. The testing broke three blocks from the control set and five blocks from each of the carbonated sets. The control (uncarbonated, no sodium gluconate) strength can be taken at 100% at all ages and the carbonated (with and without sodium gluconate) strengths are shown in relative comparison. The carbonated batch with no sodium gluconate was slightly behind the control at 7 days but developed strength at a faster rate thereafter. The admixture batches were found to be stronger at the first measurement and maintained at least this level or benefit through the remainder of the test program.

The lightweight block production found an optimal or near-optimal amount of admixture. With no admixture used the strength was 11% behind the control strength at 7 days, 5% ahead at 28 days and 10% ahead at 56 days. The carbonated concrete with low admixture dose was 22%, 42% and 41% stronger than the uncarbonated control at 7, 28 and 56 days respectively. The 0.40% dose produced concrete that was 76%, 94% and 84% stronger at the three ages while the 0.45% dose of admixture resulted in 21%, 32% and 33% improvements. These results are different than those for Standard Block in Example 13, where an optimal dose of sodium gluconate was not necessarily reached even at 0.5%, and illustrates the usefulness of pre-testing, or otherwise optimizing, admixture dose and other conditions specific to a specific mix design. See Example 15 for a further testing of this.

$CO_2$ injection had little effect on the lightweight block density or water absorption when no sodium gluconate was used. Across the dosages of admixture the water absorptions were decreased about 10% for the 0.35% and 0.45% doses and 34% for the middle dose of 0.4%, compared to uncarbonated control without sodium gluconate. Conversely, the density increased when sodium gluconate was used. It was up 1-2% for high and low doses and 7% higher for the middle dose, compared to uncarbonated control without sodium gluconate. While the middle dose carbonated blocks were the strongest and had the lowest water absorption they were also the highest density. Promising strength and absorption results were found with the other two admixture dosages and accompanied by a small density increase. Admixture usage will generally benefit from pre-testing or other predictive work to optimize conditions to obtain the desired result, e.g., in the case of lightweight blocks, a combination of strength, density, water absorption, and other properties as desired.

Sandstone Mix Test.

In a third test, the sandstone mix of Table 11 was used. Conditions were as for the second test of Example 13, with $CO_2$ added at a dose of 1.5% in the mixture Addition of 0.35, 0.4, and 0.45% sodium gluconate was tested. The investigated variables and water contents are summarized in Table 14. The overall results are summarized in FIG. 37.

TABLE 14

Sandstone Mix Design Production Variables and Water Contents

| Mix Code | Design | Condition | Mode | $CO_2$ Dose (% bwc) | Admix | w/c | Water fraction |
|---|---|---|---|---|---|---|---|
| 0803 | Sandstone | Control | — | — | — | 0.672 | 6.55% |
| 0904 | Sandstone | $CO_2$ | Mixer | 1.5 | — | 0.697 | 6.93% |
| 0905 | Sandstone | $CO_2$ | Mixer | 1.5 | 0.35% | 0.736 | 7.00% |
| 0804 | Sandstone | $CO_2$ | Mixer | 1.5 | 0.40% | 0.710 | 7.29% |
| 0906 | Sandstone | $CO_2$ | Mixer | 1.5 | 0.45% | 0.718 | 7.02% |

Preliminary analysis of the Sandstone samples found $CO_2$ contents to be higher in all carbonated mixes relative to the control. The average efficiency of $CO_2$ delivery for batches produced was found to range from 20% to 90% at a 1.5% by weight of cement $CO_2$ dose. From the preliminary analysis batch 0905 appears to contain a smaller amount of captured $CO_2$ compared to other batches produced under similar conditions. Further analysis is currently underway to confirm this result. The average efficiency of $CO_2$ delivery considering all Sandstone batches is approximately 66%, however rises to approximately 81% if batch 0905 is omitted from the calculation.

Figure 38:
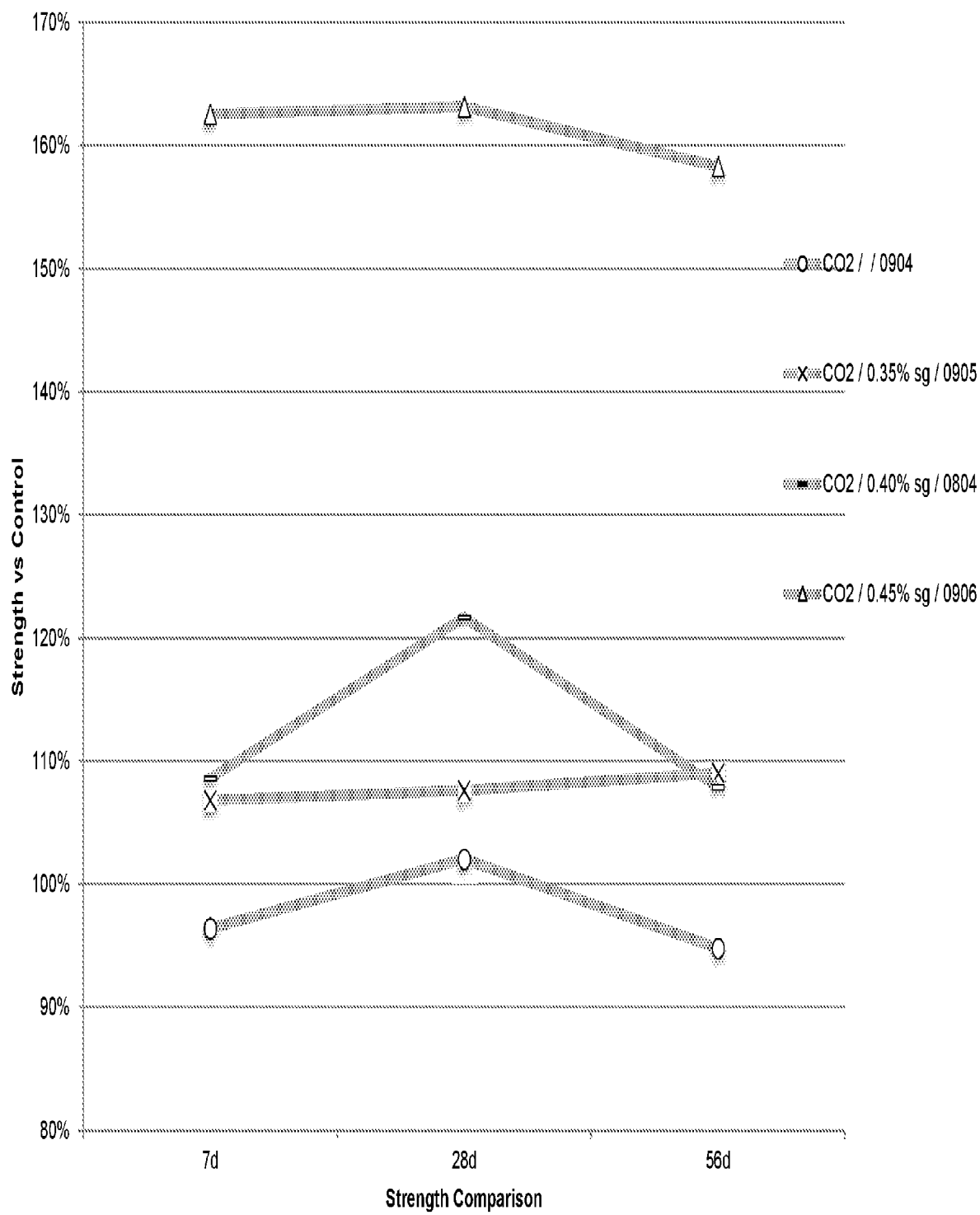
FIG. 38 provides a graphic illustration of 7-, 28-, and 56-day compressive strengths of sandstone blocks produced in a dry cast operation with carbonation and various doses of sodium gluconate.

The compressive strength data for the sandstone mix is summarized in FIG. 38. The testing broke three control blocks and five carbonated blocks. The data is plotted to show every individual break with the average compressive strength highlighted. The sandstone carbonated blocks with no admixture had a strength that was functionally equivalent to the control (carbonated, no admixture) strength (4% behind at 7 days, 2% ahead at 28 days and 5% behind at 56 days). Of three doses of admixture, strength increased with admixture dosage suggesting that the dosage was reaching an optimum across the range considered. The 7 day strength benefit was 7%, 9% and 63% on the three admixture dosages considered. The benefit at 28 days was 8%, 22% and 63% respectively. At 56 days was 9%, 8% and 58% respectively. The strength increase with admixture dose across the range of dosages mirrors the data with the Standard Block of Example 13 wherein some "threshold" amount of admix seems to be crossed in relation to the amount of carbon dioxide present in the concrete.

The carbonation treatment without using the admixture increased the water absorption 12% and decreased the density 3%. The use of admixture brought the metrics back in line with the control at the lowest dose and offered significant improvement at the highest dose. The water absorption was reduced 19% and the density was increased 3% for the carbonated blocks with 0.45% dose of the admixture. As with other mixes, the final desired properties of the blocks will determine whether admixture, such as sodium gluconate, is used, and under what conditions, e.g., at what concentration, which can be pre-determined by preliminary testing or by other appropriate test.

This example illustrates the importance of tailoring carbonation conditions, e.g., admixture usage, to the exact mix design being considered, in that the three mixes used showed differing responses to sodium gluconate as an admixture, and also had different requirements. For example, in the lightweight mix, density is an important consideration and may dictate that a lower dose of admixture be used than that that produces maximum strength development and/or minimum water absorption. For other mixes, other considerations may play a dominant role in determining carbonation conditions, such as use of admixture.

Example 15

This example illustrates the use of a sodium gluconate admixture with a medium weight mix design, where the admixture dose was pre-determined based on results from the batches tested in Examples 13 and 14.

A Medium Weight mix design was used at the same facility and with the same equipment as in Examples 13 and 14. The mix design is given in Table 15.

TABLE 15

Medium Weight Mix Design (target w/c = 0.78)

| Ingredient | Amount | Fraction |
|---|---|---|
| Birdseye Gravel | 1030 lbs | 12.8% |
| Illinois Product Cement | 675 lb | 8.4% |
| McCook Block Sand | 1800 lbs | 22.3% |
| Meyers Torp Sand | 2270 lbs | 28.1% |
| Screening | 2300 lbs | 28.5% |
| RainBloc 80 | 34 z | — |

Figure 39:
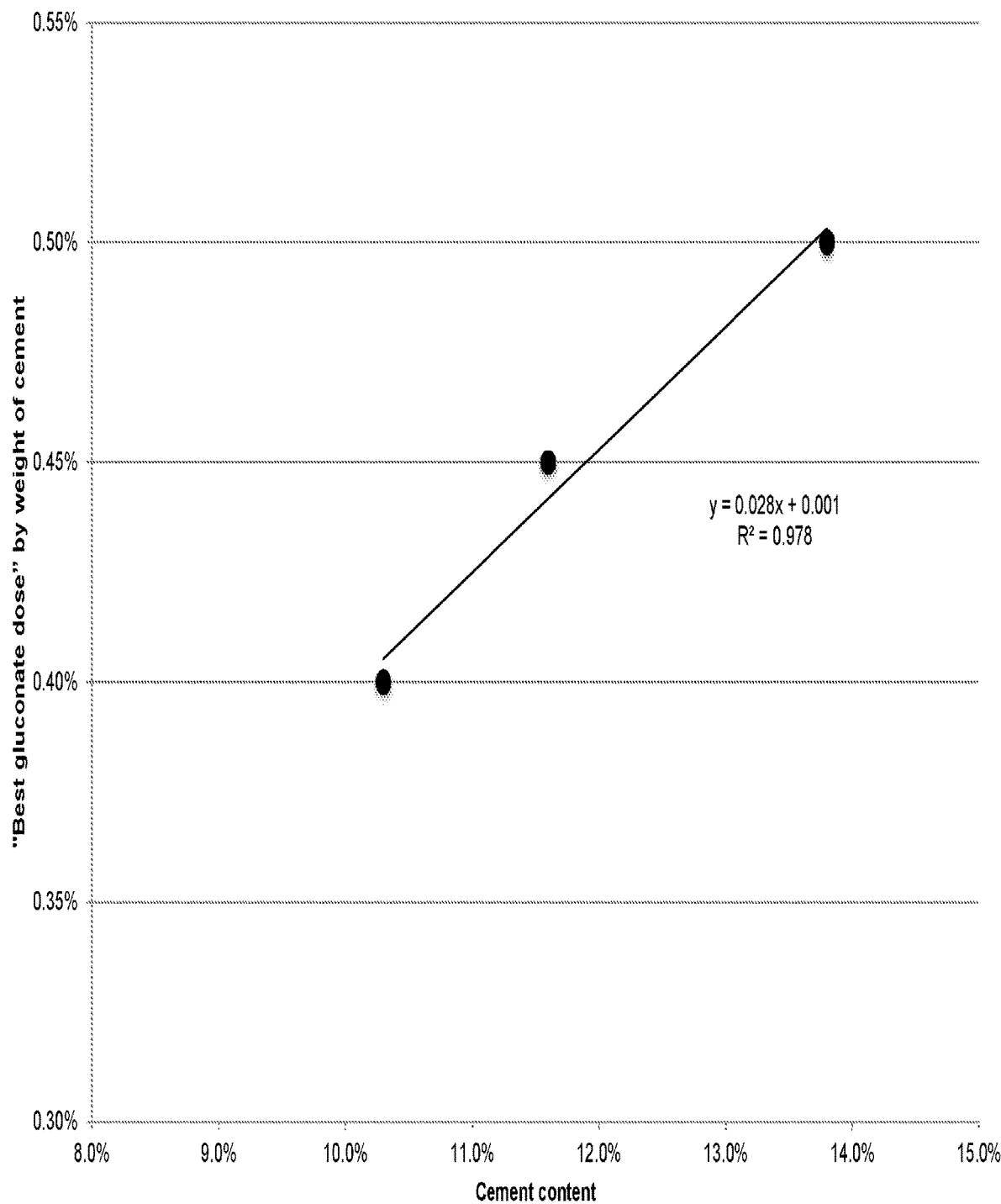
FIG. 39 provides a graphic illustration of the relationship between optimum dose of sodium gluconate and cement content in carbonated dry cast blocks.

It was found that the best dose of sodium gluconate in the Standard, Lightweight, and Sandstone mixes used in Examples 13 and 14 was linearly related to cement content. See FIG. 39. Based on this relationship, and adjusted for the fact that the $CO_2$ dose was to be 1.0% rather than 1.5% used in the Standard, Lightweight, and Sandstone, a sodium gluconate dose of 0.25% bwc was used. Blocks were produced as described in Example 13, with uncarbonated-sodium gluconate (control), uncarbonated+sodium gluconate, carbonated−sodium gluconate, and carbonated+sodium gluconate, and tested for compressive strength and density. The blocks were also submitted for third party testing which also included water absorption (Nelson Testing Laboratories, Schaumberg, Ill.).

Figure 40:
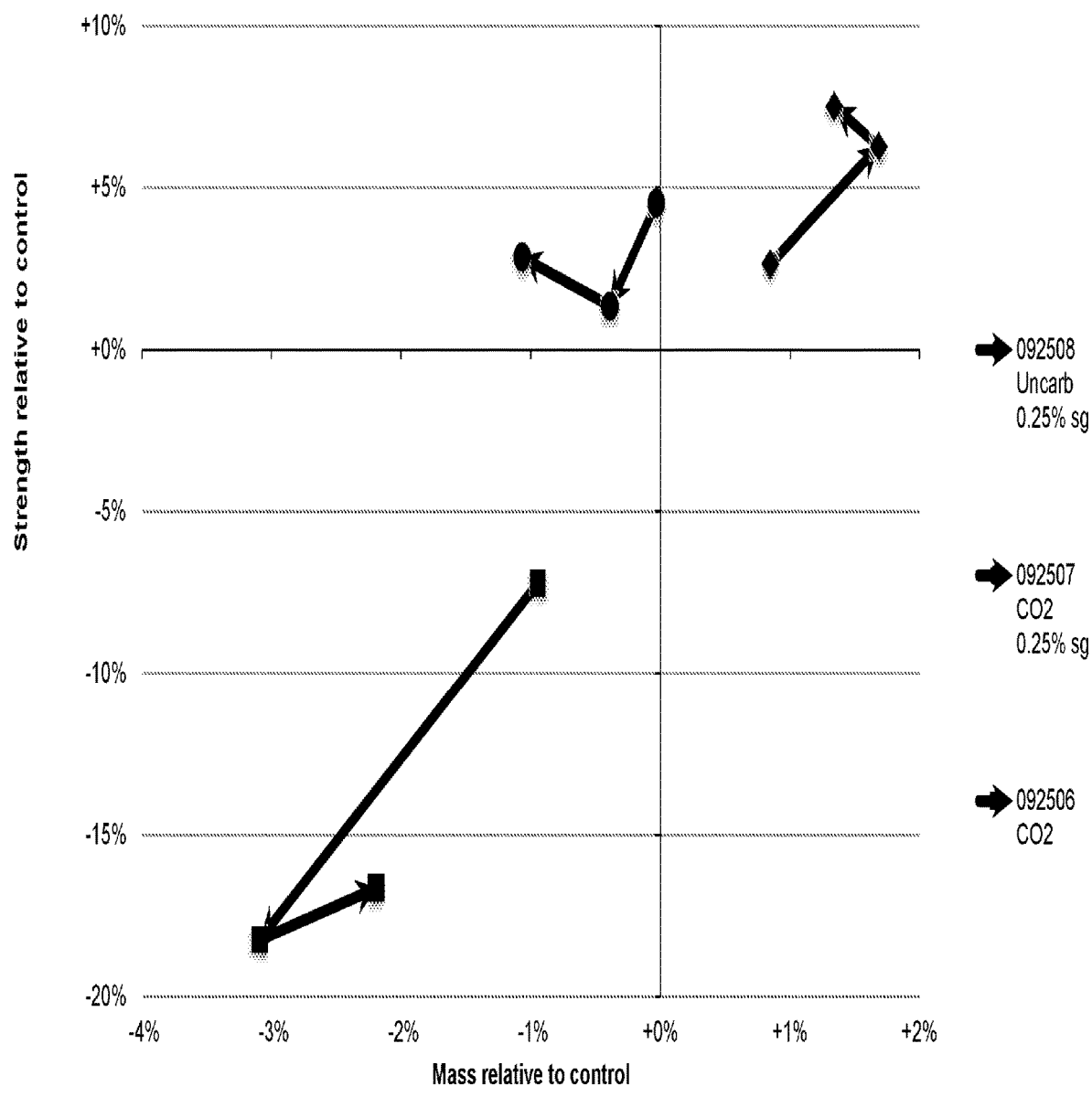
FIG. 40 provides a graphic illustration of compressive strength and density of carbonated and uncarbonated precast medium weight blocks, with or without treatment with 0.25% sodium gluconate.

Compressive strength and mass results for 7, 28, and 56 days are summarized in FIG. 40. The direction of the arrows represents time of measurement, from 7 to 56 days. The uncarbonated blocks with sodium gluconate were slightly denser and stronger than uncarbonated blocks without sodium gluconate at all time points tested, while the carbonated blocks without sodium gluconate were lower in strength and mass than uncarbonated without sodium gluconate, and the carbonated with sodium gluconate were both stronger and lighter than the uncarbonated without sodium gluconate.

The results of third party testing are shown in FIG. 41. Three block data sets were used, with all batches meeting ASTM C90 specification. $CO_2$ alone made the blocks 6% weaker than control, but using $CO_2$ plus sodium gluconate made it 8% stronger than control. $CO_2$ alone increased water absorption by 7% compared to control, but $CO_2$ plus sodium gluconate resulted in blocks with 4% lower water absorption compared to control. Shrinkage was increased for both $CO_2$ and $CO_2$ plus gluconate sets, but for the sodium gluconate batch it was effectively equivalent to the control.

This example demonstrates that a pre-determined sodium gluconate dose for a new mix, based on previous results, was sufficient to produce carbonated blocks comparable in mass and shrinkage, greater in compressive strength, and lower in water absorption than uncarbonated blocks without sodium gluconate.

Example 16

The following protocols were used in EXAMPLES 17 to 21, with modifications as indicated in particular examples.
Mortar Mix
1. Prepare the mixing bowl by dampening the sides with a wet cloth, be sure to remove any pooling water from the bowl before introducing raw materials.
2. Weigh the necessary amount of water for your test and add the water to the damp, empty mixing bowl.
3. Add sand to mixer
4. Blend sand and water for 30 seconds on Speed #2
5. Scrape the sides of the bowl with pre wet rubber spatula to remove any materials sticking to the sides of the mixing bowl
6. Add the required cementitious materials to the mixing bowl
7. Blend Sand, water and cementitious materials for 30 seconds at Speed #2
8. Record the time that cementitious materials are added to the mix
9. Scrape the sides of the mixing bowl with a pre wet rubber spatula
10. Record the temperature
11. If you are not carbonating, skip to step 14
12. Carbonate at a flow rate of 20 liters per min for desired duration.
13. Record final temperature
14. Scrape the sides of the bowl with pre wet rubber spatula
15. Introduce necessary admixtures—the mixing sequence and dosing details of the admixtures and additives may vary according to test. Record time and dosage.
16. After each admixture or sugar is added, blend for 30 seconds
17. Measure slump using the Japanese slump cone. Record slump and spread (two measurements).
18. For slump retention, return to bowl, wait, remix 30 sec before next slump.
19. Produce a sample for calorimetry
20. Fill three mortar cubes molds with mortar (Procedure ASTM C109/C109M-12 Standard Test Method for Compressive Strength of Hydraulic Cement Mortars)
21. Cover mortar cubes with a plastic garbage bag or damp cloth and demold only after 18+/−8 hours have passed
22. Break cubes at 24 hours +/−30 minutes (use time that cement was introduced intot the mix as an indicator of when samples should be broken)
Concrete Mix
Wet inside mixer, add all stone and sand, mix 30 seconds to homogenize
Add all cementitious materials, mix one minute to homogenize
Add all batch water over a period of 30 seconds, mix all materials for one minute
Take initial temperature
Control batch—mix for 4 minutes and take final temperature. Add admixtures as required, mix one minute
Carbonated mix—inject $CO_2$ gas at 80 LPM, enclose mixer, mix while carbonating for required time
Remove cover and record final temperature, Add admixtures as required, mix one minute
Record slump (ASTM C143) and cast 6 compressive strength cylinders (ASTM C192)
Take two samples for moisture/carbon quantification bake off, one sample for calorimetry
Demould cylinders after 28+/−8 hours and place them in a lime water bath curing tank at a temperature of 23° C.+/−3° C.
Test compressive strength 24 hours (3 samples) and 2 at 7 days (2 samples)

Example 17

Figure 42:
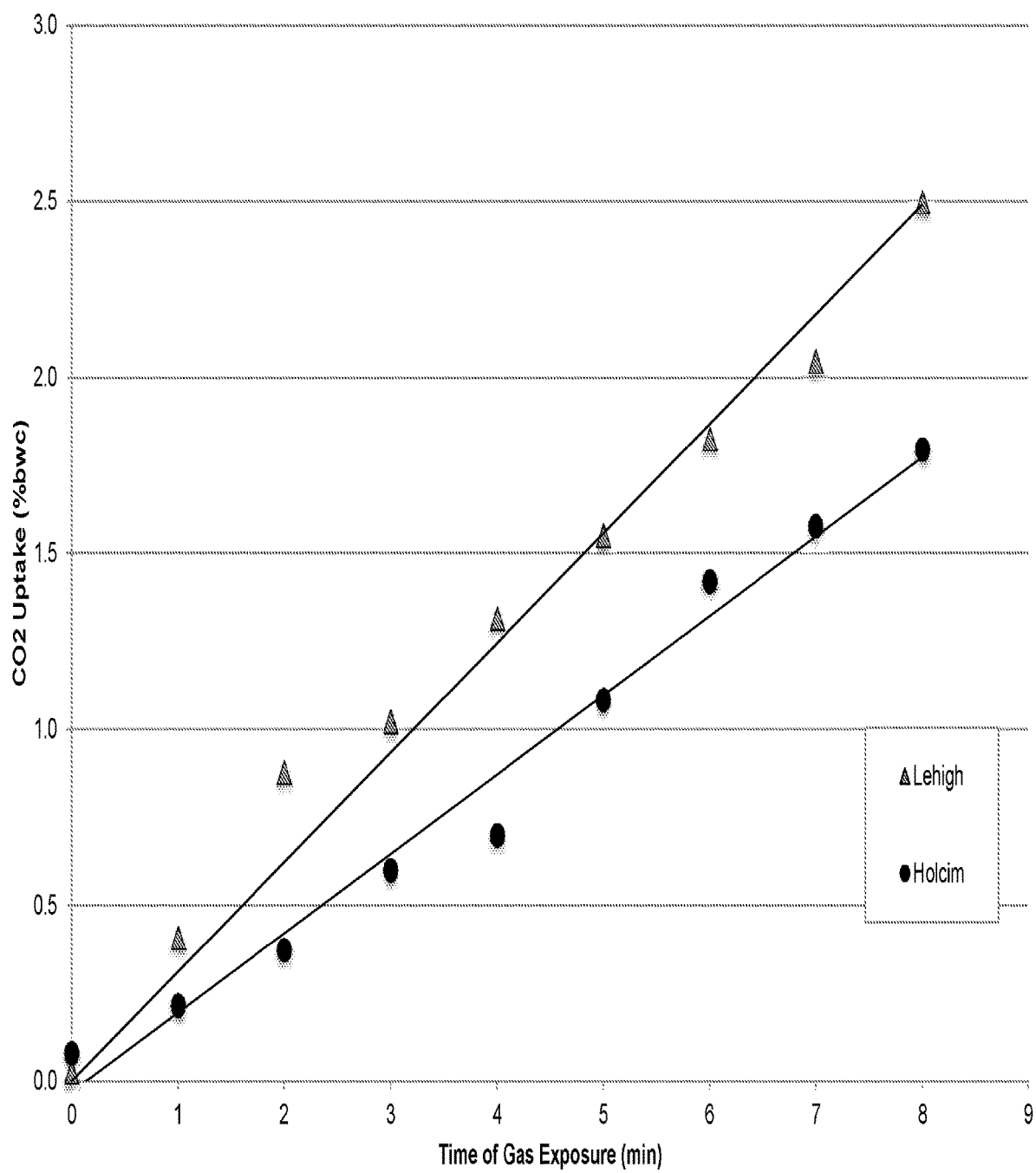
FIG. 42 provides a graphic illustration of the effect of cement type on carbon dioxide uptake in a mortar mix.

In this example the carbon dioxide uptake of cements from two different sources, Lehigh and Holcim, were compared.
Mortar mix made under a 20 LPM flow of $CO_2$ gas. Samples were removed from the batch of mortar every 60s until the 8 minute point. The carbon dioxide content was measured and a curve constructed relating the length of exposure to $CO_2$ gas to the approximate amount of $CO_2$ uptake. Two cements were compared. Mix design was 1350 g EN sand, 535 g of cement, 267.5 g of water. w/c=0.5.
The results are shown in FIG. 42. Carbon dioxide uptake increased with time, as expected, but the rate of increase was different for the two different cements. At a w/c of 0.5, the mortar paste can absorb carbon dioxide but to exceed 1% uptake would take 3 to 5 minutes, depending on the cement type used.
This Example illustrates that a w/c of 0.5 allows carbon dioxide uptake, but at a rate that may not be compatible with mix times in some settings, and that the source of the cement can affect the properties of a hydraulic cement mix made with the cement regarding carbon dioxide uptake.

Example 18

Figure 44:
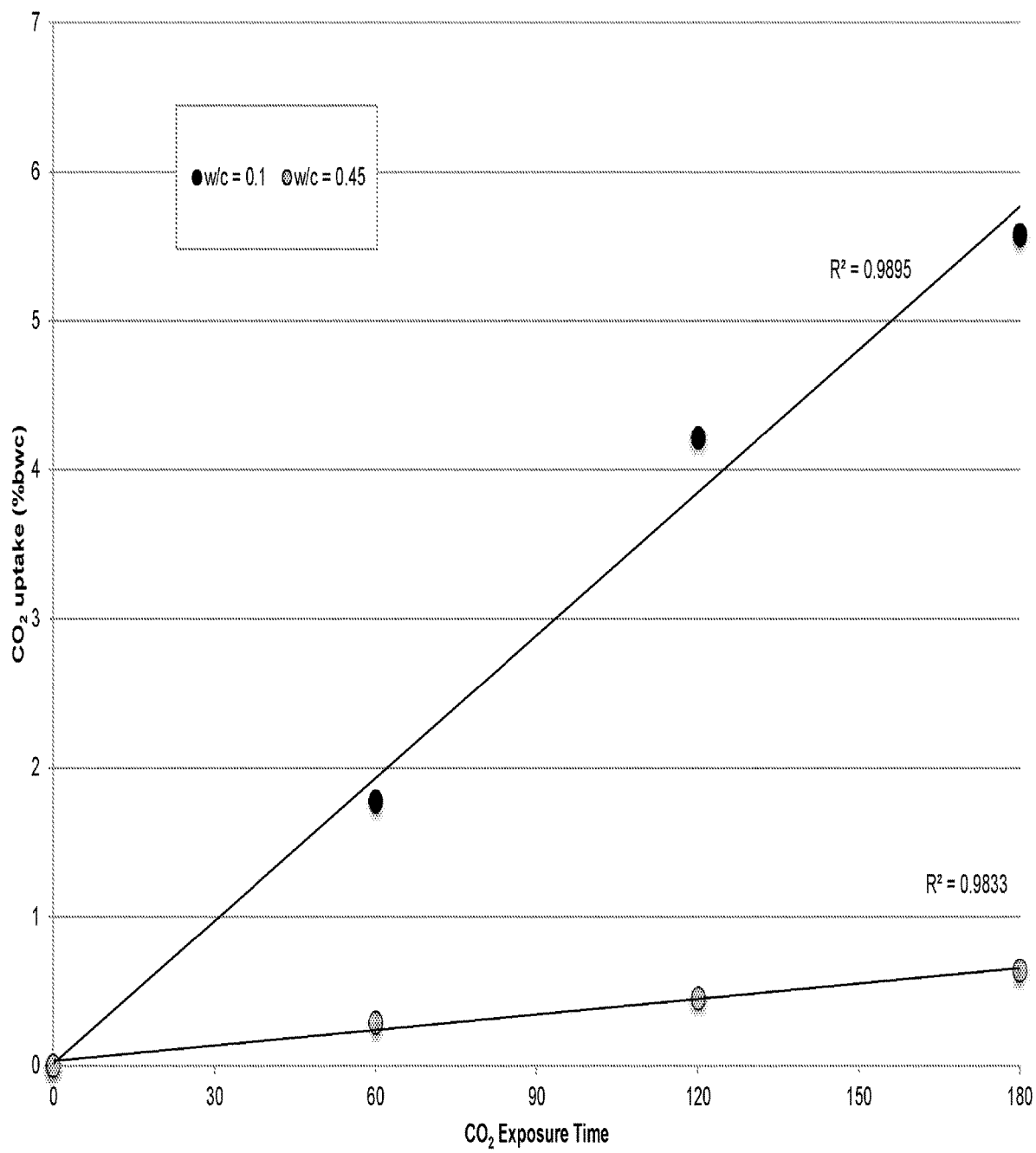
FIG. 44 provides a graphic illustration of the effect of w/c ratio on carbon dioxide uptake in a mortar mix.
Figure 45:
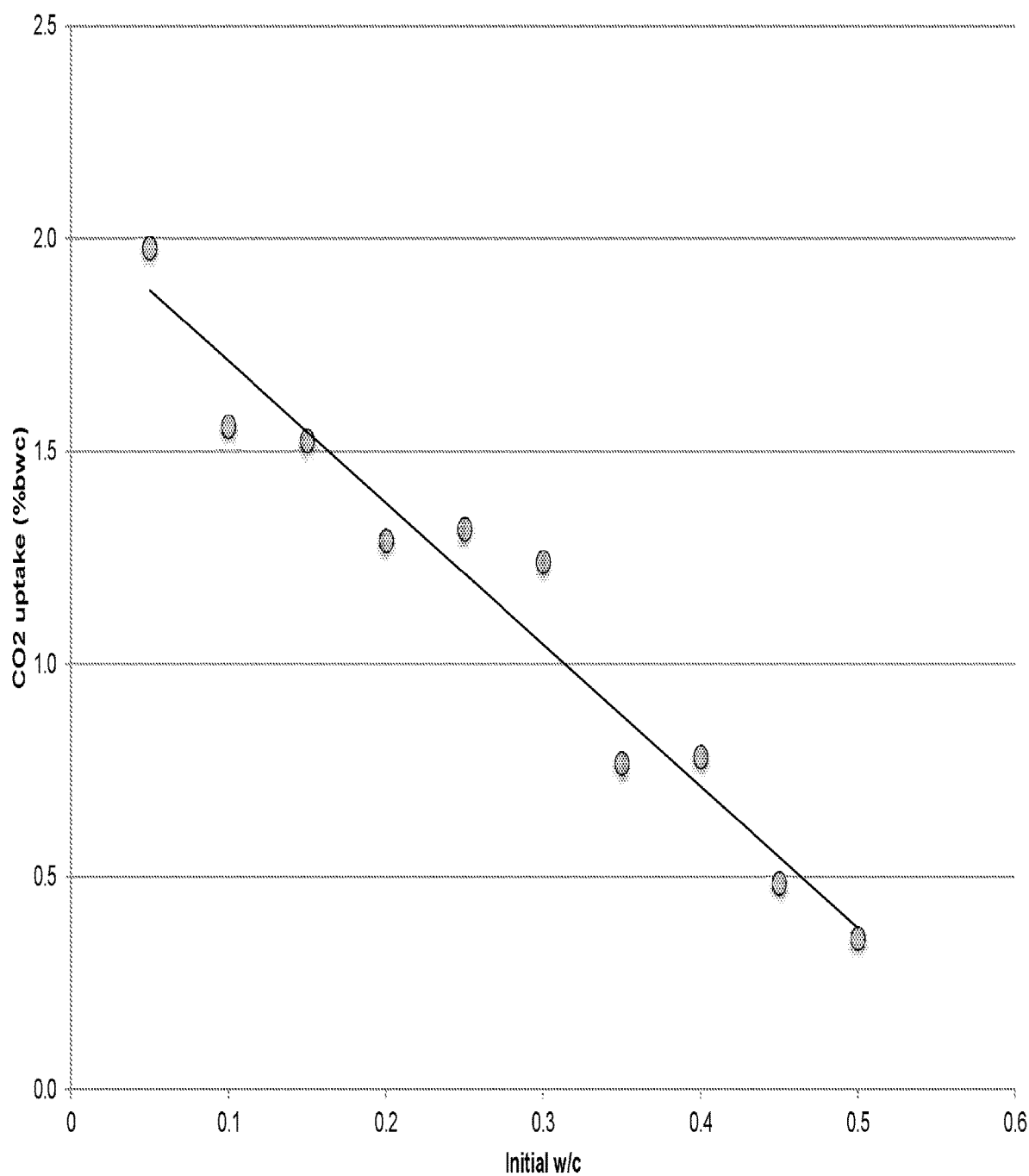
FIG. 45 provides a graphic illustration of the effect of w/c ratio on carbon dioxide uptake in a mortar mix.

In this Example, the effect of w/c ratio on carbon dioxide uptake was studied.
In a first study, a test performed with mortar. The total mix was 990 g of Ottawa sand, 440 g cement, with 206 g of total water. Water, sand and cement were mixed, with the water added in two stages. $CO_2$ was supplied for various times at 10 LPM after the first water addition, which brought the mix to either 0.1 or 0.45 w/c, and the remaining water was then added and mixing completed. Carbon uptake at various time points was measured, as shown in FIG. 44. The rate of carbon dioxide uptake was higher for the paste with w/c 0.1 at time of reaction than for w/c of 0.45.
In a second study, a series of tests were performed on mortar. Mortar mix made under a 20 LPM flow of $CO_2$ gas. The carbon dioxide content was measured and a curve constructed relating the w/c of the mortar mix at the time of carbon dioxide addition to the approximate amount of $CO_2$ uptake. Mix design was 1350 g EN sand, 535 g of cement (Holcim GU), 267.5 g of water. Total w/c=0.5 Water was added in two stages. One portion before carbonation, the remaining portion after 1 min of carbonation. The amount before carbonation ranged from 10% to 100% of total (w/c=0.05 to 0.50). The effect of w/c on carbonation at 1 minute is shown in FIG. 45 and Table 16.

TABLE 16

Effect of w/c in mortar on carbon dioxide uptake

| initial w/c | Uptake | Relative to 0.05 level |
|---|---|---|
| 0.50 | 0.00 | |
| 0.05 | 1.98 | 100% |
| 0.10 | 1.56 | 79% |
| 0.15 | 1.52 | 77% |
| 0.20 | 1.29 | 65% |
| 0.25 | 1.32 | 67% |
| 0.30 | 1.24 | 63% |
| 0.35 | 0.77 | 39% |
| 0.40 | 0.78 | 40% |
| 0.45 | 0.48 | 24% |
| 0.50 | 0.35 | 18% |

Drier mortar systems showed higher rates of uptake than did wet systems. 1.98% uptake at 0.05 w/c declined to 0.35% at 0.50 w/c.

Figure 46:
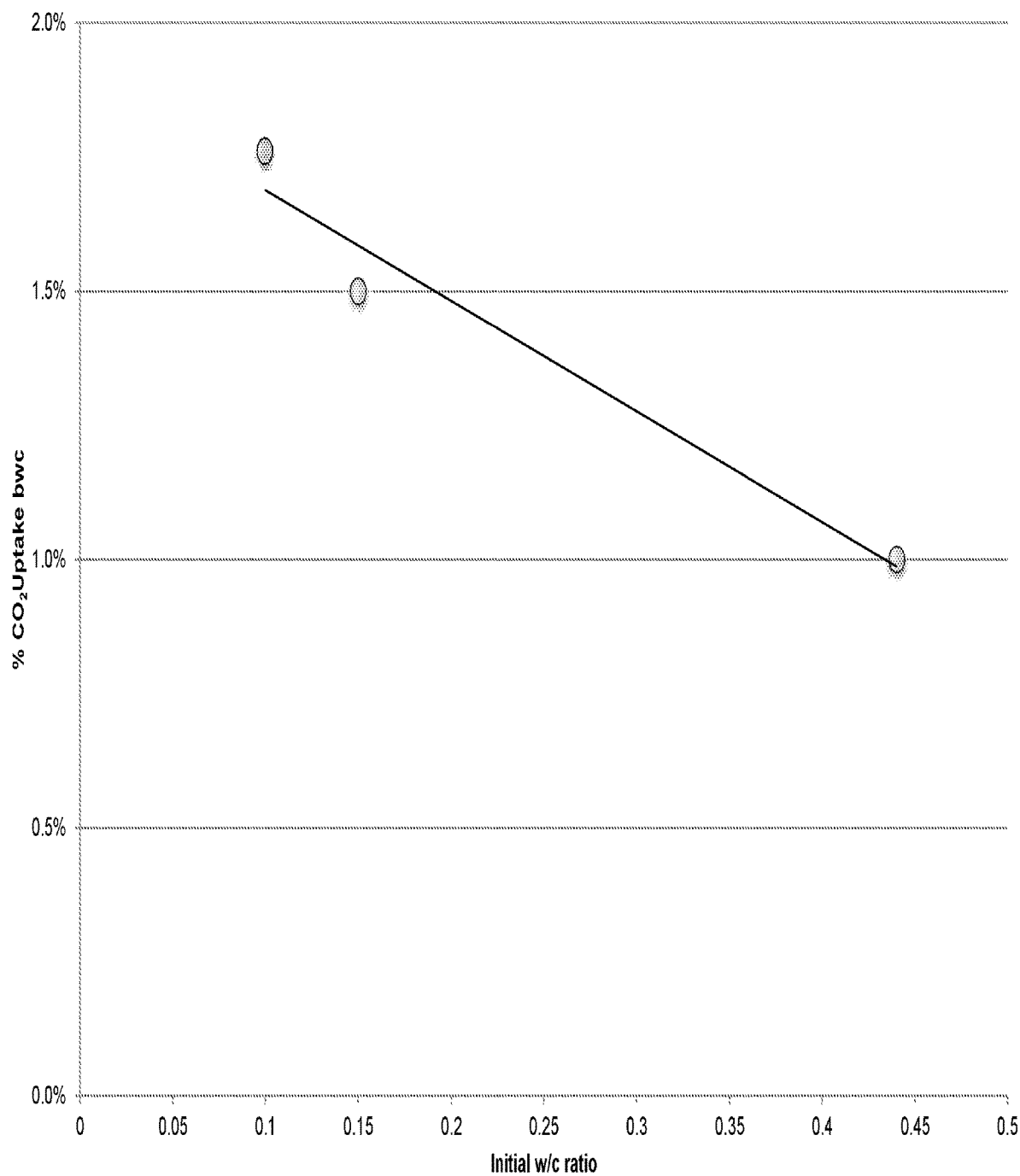
FIG. 46 provides a graphic illustration of the effect of w/c ratio on carbon dioxide uptake in a concrete mix.

In a third test, a trial concrete mix was prepared with split water additions. The total mix was 300 kg/m³ cement, 60 fly ash, 160 water, 1030 stone, 832 sand. The water was added in two stages. $CO_2$ supplied for 180 seconds at 80 LPM after the first water addition. Remaining water then added and mixing completed. The w/c at carbon dioxide addition was 0.1, 0.15, or 0.45. The results are shown in FIG. 46. As with mortars, the carbon uptake increased with lower w/c when the carbon dioxide is delivered.

Example 19

This example illustrates that temperature rise during carbonation of a hydraulic cement mix is highly correlated with degree of carbonation and can be used as an indicator of degree of carbonation in a specific system.

Figure 47:
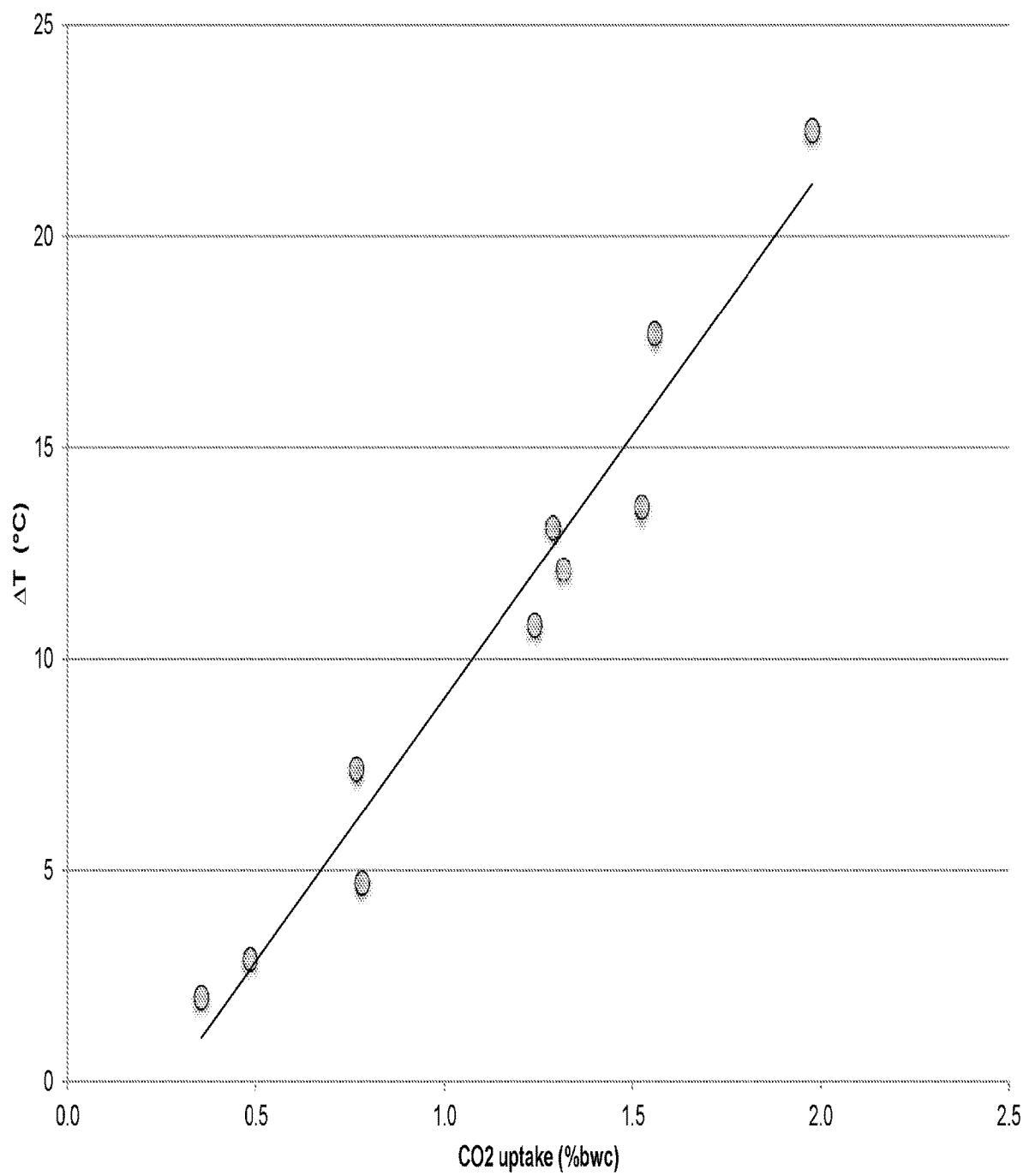
FIG. 47 provides a graphic illustration of the relationship between carbon dioxide uptake and temperature rise in a mortar mix at various w/c.

In a first test, the mortar used in the second test of Example 17 also had temperature measurements taken at the various time points. The results are shown in FIG. 47. There was a linear relationship between degree of carbonation and temperature increase in this system, in which w/c was varied and carbon dioxide exposure was kept constant.

Figure 48:
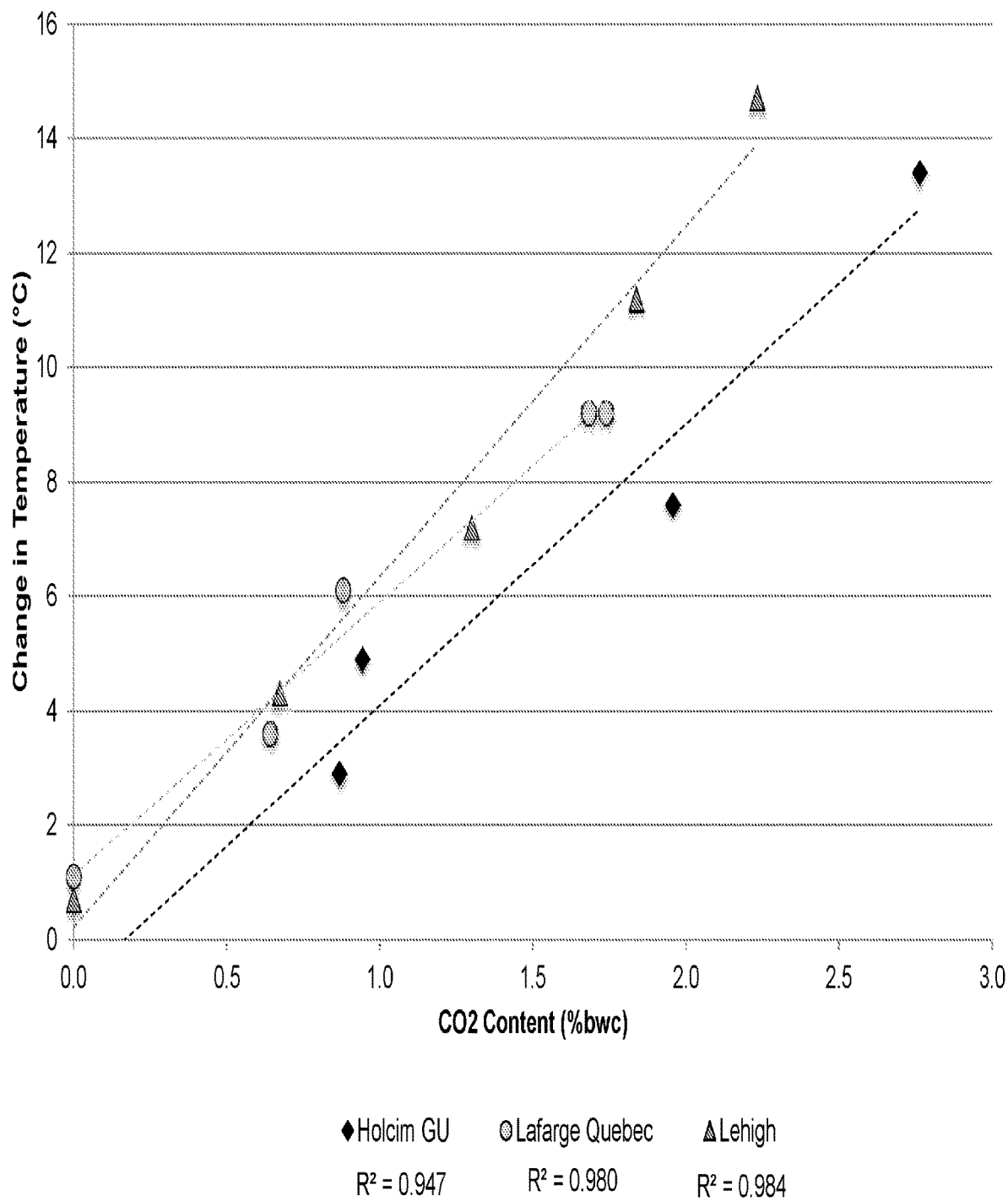
FIG. 48 provides a graphic illustration of the relationship between carbon dioxide uptake and temperature rise in mortar mixes prepared from cements from Holcim GU, Lafarge Quebec, and Lehigh, at w/c of 0.5.

In a second test, temperature vs. carbon dioxide uptake was studied in mortars prepared with three different cements, Holcim GU, Lafarge Quebec, and Lehigh. Mortar was prepared at a w/c=0.5 and carbonated for various times at 20 LPM CO2. The results are shown in FIG. 48. There was also a linear relationship between degree of carbonation and temperature rise in this system, in which w/c was kept constant at 0.5 and time of carbon dioxide exposure was varied. The relationship was relatively constant over different cement types. The slopes of the line differ in the two tests, which were conducted in two different systems, reflecting the specificity of temperature rise with carbonation to a particular system.

These results indicate that in a well-characterized system, temperature increase may be used as a proxy indicator for carbon dioxide uptake.

Example 20

This example illustrates the effects of different admixtures on slump and compressive strength in concrete.

Figure 49:
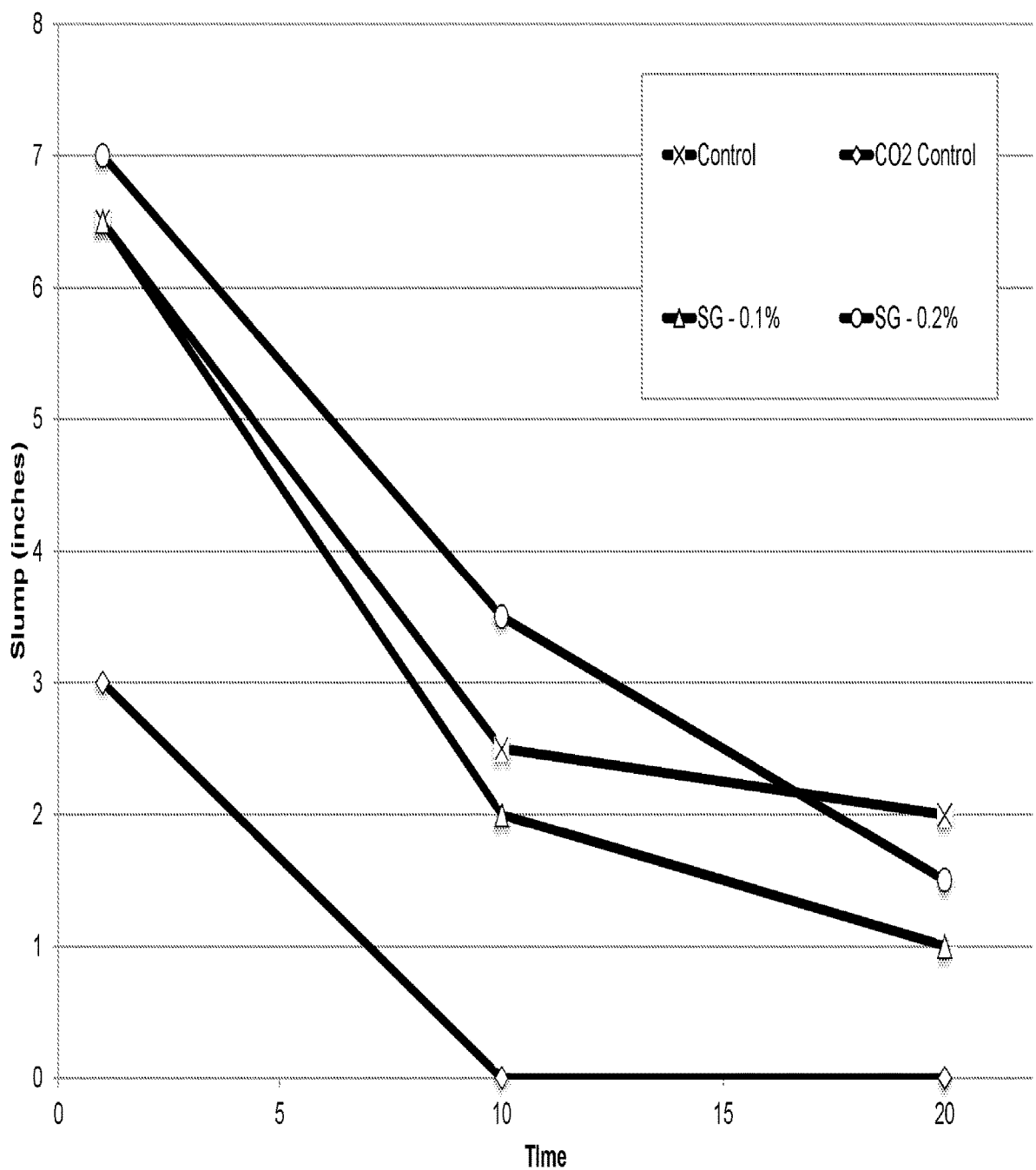
FIG. 49 provides a graphic illustration of the effects of sodium gluconate at 0, 0.1%, or 0.2%, added after carbonation to a concrete mix on slump at 1, 10, and 20 minutes.

In a first test, sodium gluconate at 0, 0.1% or 0.2% was added to a concrete mix after carbonation and the effects slump at 1, 10 and 20 minutes after mixing were measured, and compared to control, uncarbonated concrete. The results are shown in FIG. 49 and Table 17. The slump of the carbonated concrete is less than half of the control at 1 min and declines to no slump at 10 min. Adding 0.1% sodium gluconate after carbonation gave a slump equal to the control at 1 min, 80% at 10 min and 50% at 20 min. Adding 0.2% also provided high slump than the lower dose at all intervals, before being 75% of the control at 20 min.

TABLE 17

Effects of sodium gluconate on concrete slump

| | Control | CO$_2$ Control | SG - 0.1% | SG - 0.2% |
|---|---|---|---|---|
| 1 min | 100% | 46% | 100% | 108% |
| 10 min | 100% | 0% | 80% | 140% |
| 20 min | 100% | 0% | 50% | 75% |

Figure 50:
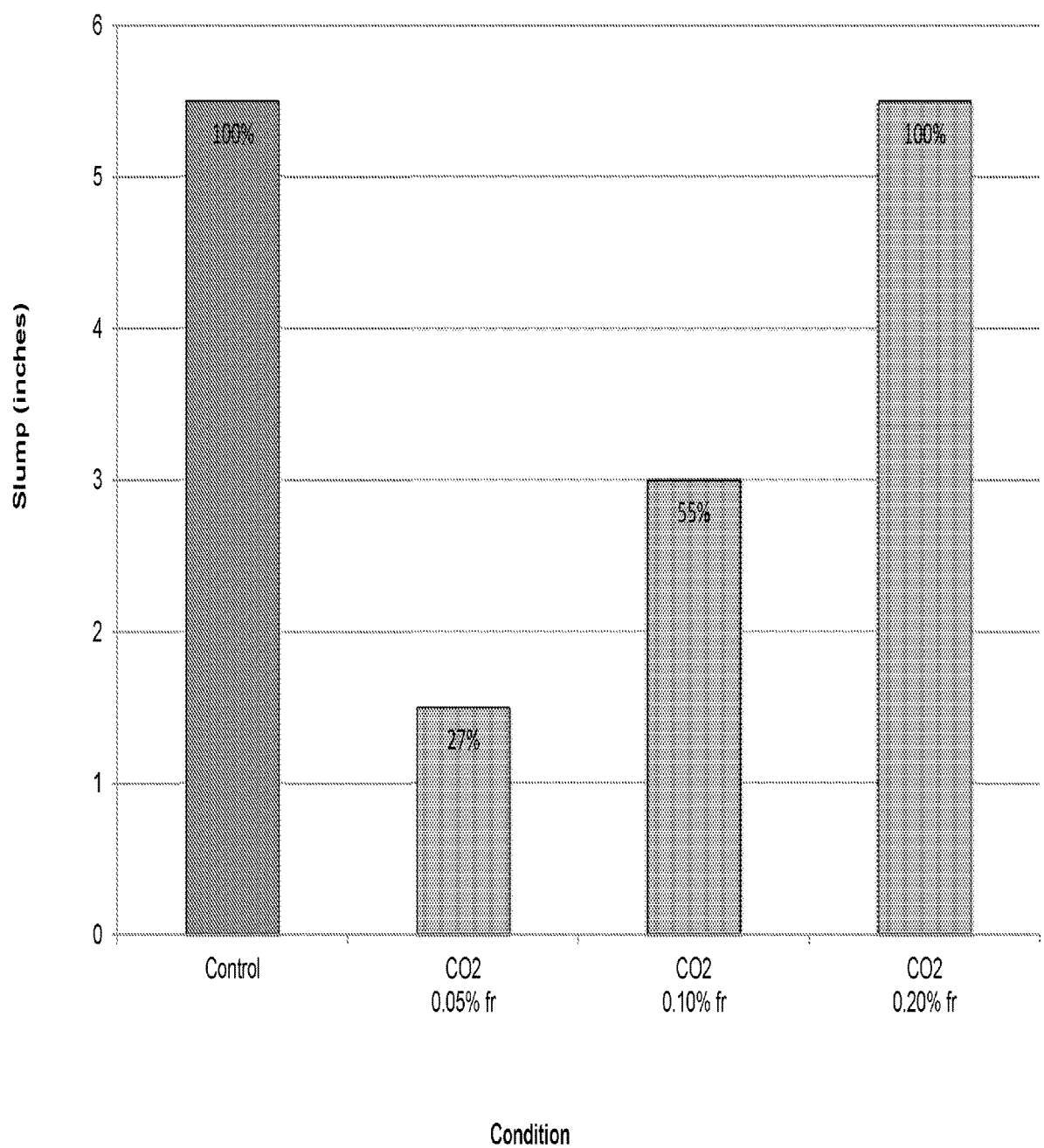
FIG. 50 provides a graphic illustration of the effects of fructose on initial slump of carbonated concrete mix.
Figure 51:
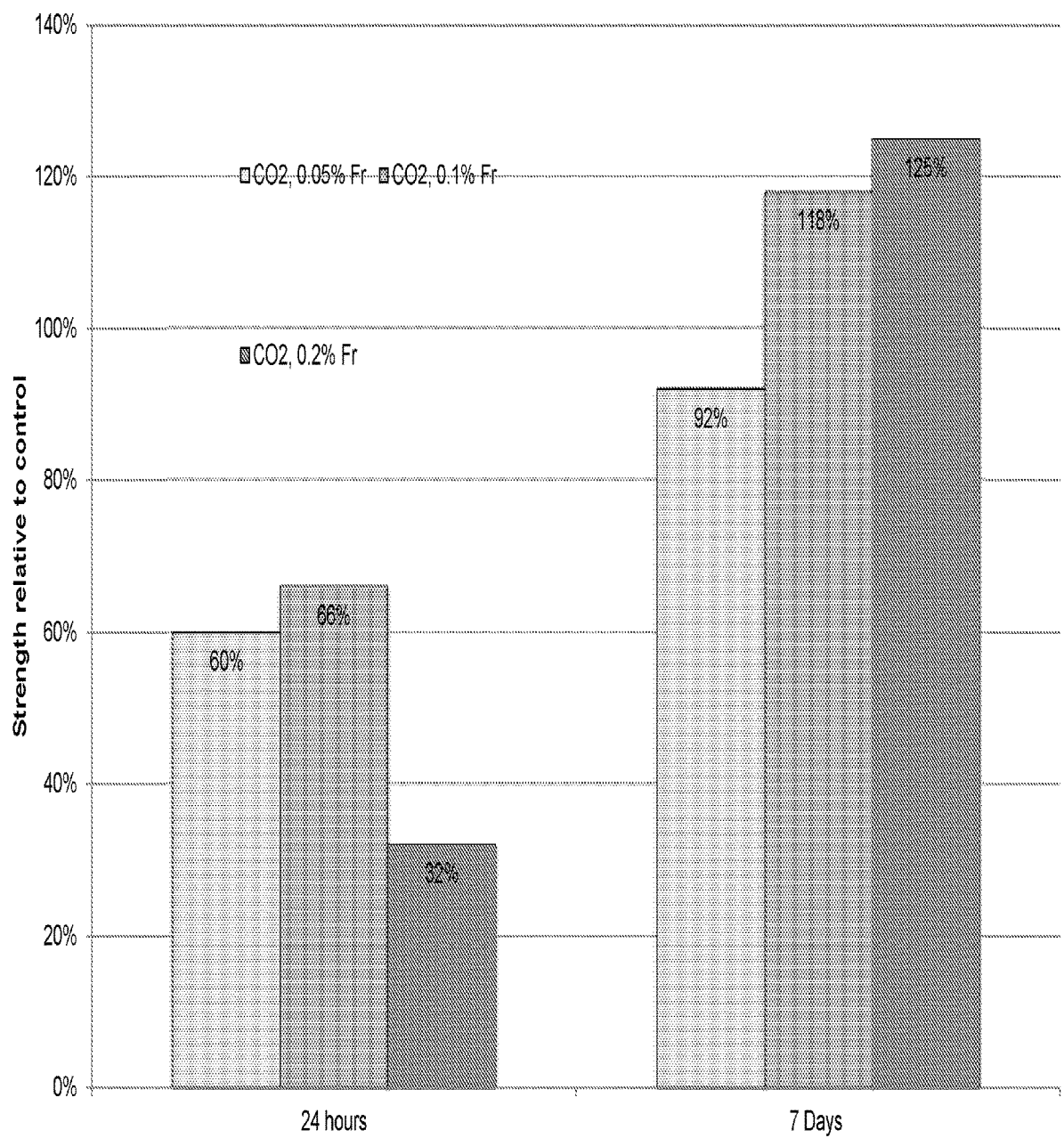
FIG. 51 provides a graphic illustration of the effects of fructose on 24-hour and 7-day compressive strength in a carbonated concrete mix.

In a second test, the effects of fructose at various concentrations on initial slump of a concrete mix were tested. Fructose was added after carbonation. Total mix was 4.22 kg cement, 1 kg fly ash, 3.11 kg water, 16.96 kg stone, 14.21 kg sand. The results are shown in FIG. 50. Carbonation reduced the slump of the concrete. In response, fructose was added after carbonation is proportions of 0.05, 0.10 and 0.20% by weight of cement. The dosages reflect solid mass of additive delivered in a solution. The $CO_2$ content was quantified as 1.3%, 1.4% and 1.5% by weight of cement for the three carbonated batches respectively. 0.20% fructose was sufficient to restore the slump to be equivalent to the control. However, fructose had a strength retarding effect, as shown in FIG. 51. Strength at 24 hours was significantly less than uncarbonated control, but strengths at 7 days was acceptable, with higher strengths associated with higher fructose contents.

Example 21

In this example, a variety of different cements were tested in a mortar mix to determine variations in response to carbonation.

Six cements were tested: Holcim GU (Hol), Lafarge Quebec (LQc), Lafarge Brookfield (LBr), Lehigh (Leh), Illinois Product (Ipr), and Northfield Fed White (NWh). The properties and chemistries of the different cements are given in Table 18.

TABLE 18

Properties and chemistries of different cements

| Metric | Hol | LQc | LBr | Leh | IPr | NWh |
|---|---|---|---|---|---|---|
| Surface Area - Blaine (m²/kg) | 423 | 417 | 392 | 425 | 501 | 408 |
| Free CaO (%) | 0.31 | 0.94 | 0.16 | 1.45 | 1.45 | 1.47 |
| CaO (%) | 62.22 | 60.56 | 62.68 | 61.55 | 62.61 | 65.36 |
| Na$_2$Oe (%) | 0.28 | 0.38 | 0.18 | 0.11 | 0.41 | 0.08 |
| SiO$_2$ (%) | 20.30 | 19.18 | 20.10 | 19.53 | 19.12 | 21.41 |
| Al$_2$O$_3$ (%) | 4.62 | 4.72 | 5.24 | 4.45 | 5.47 | 4.38 |
| TiO$_2$ (%) | 0.22 | 0.21 | 0.26 | 0.32 | 0.29 | 0.08 |
| P$_2$O$_5$ (%) | 0.14 | 0.26 | 0.05 | 0.25 | 0.13 | 0.01 |
| Fe$_2$O$_3$ (%) | 2.50 | 2.74 | 2.27 | 3.00 | 2.23 | 0.20 |
| MgO (%) | 2.21 | 2.80 | 1.48 | 3.21 | 2.70 | 0.90 |
| Na$_2$O (%) | 0.22 | 0.32 | 0.11 | 0.06 | 0.34 | 0.06 |
| K$_2$O (%) | 0.92 | 0.84 | 1.09 | 0.70 | 1.01 | 0.28 |
| Mn$_2$O$_3$ (%) | 0.05 | 0.09 | 0.07 | 0.18 | 0.19 | 0.01 |
| SrO (%) | 0.08 | 0.24 | 0.06 | 0.04 | 0.07 | 0.03 |
| SO$_3$ (%) | 3.63 | 3.79 | 4.10 | 2.96 | 3.88 | 3.94 |

TABLE 18-continued

Properties and chemistries of different cements

| Metric | Hol | LQc | LBr | Leh | IPr | NWh |
|---|---|---|---|---|---|---|
| BaO (%) | 0.06 | 0.05 | 0.13 | 0.05 | 0.05 | 0.08 |
| ZnO (%) | 0.04 | 0.07 | 0.00 | 0.02 | 0.01 | 0.00 |
| $Cr_2O_3$ (%) | 0.01 | 0.03 | 0.01 | 0.01 | 0.01 | 0.00 |
| Loss on ignition to 975° C. (%) | 2.52 | 4.08 | 2.38 | 3.54 | 1.98 | 3.00 |

The mortar mix was EN 196 Sand 1350 g, Cement 535 g, Water 267.5 g, w/c Ratio 0.5. $CO_2$ was added to the mixing bowl at 20 LPM for durations of 0, 2, 4, 6, and 8 minutes. Temperature change, slump, flow-spread, $CO_2$ uptake, and 24 hr cube strength were measured. The results are given in Table 19.

TABLE 19

Properties of carbonated mortars made with different cements

| | | Hol | LQc | LBr | Leh | IPr | NWh |
|---|---|---|---|---|---|---|---|
| 0 min $CO_2$ | $CO_2$ Uptake (% bwc) | 0.00 | 0.00 | 0.00 | 0.00 | 0.00 | 0.00 |
| | Delta T (° C.) | 0.0 | 1.1 | 1.2 | 0.7 | 1.3 | 1.0 |
| | Slump (mm) | 110 | 115 | 100 | 110 | 95 | 105 |
| | Slump (% of Control) | 100% | 100% | 100% | 100% | 100% | 100% |
| | Work (mm) | 157 | 185 | 144 | 165 | 130 | 180 |
| | Strength (MPa) | 20.2 | 15.0 | 25.1 | 16.0 | 33.4 | 20.4 |
| | Strength (% of Control) | 100% | 100% | 100% | 100% | 100% | 100% |
| 2 min $CO_2$ | $CO_2$ Uptake (% bwc) | 0.87 | 0.64 | 0.47 | 0.67 | 0.55 | 0.69 |
| | Delta T (° C.) | 2.9 | 3.6 | 2.8 | 4.3 | 3.7 | 6.5 |
| | Slump (mm) | 70 | 105 | 40 | 50 | 10 | 30 |
| | Slump (% of Control) | 64% | 91% | 40% | 45% | 11% | 29% |
| | Work (mm) | 83 | 140 | 58 | 60 | 10 | 35 |
| | Strength (Mpa) | 9.9 | 7.6 | 12.0 | 13.1 | 31.3 | 17.3 |
| | Strength (% of Control) | 49% | 38% | 48% | 65% | 94% | 85% |
| 4 min $CO_2$ | $CO_2$ Uptake (% bwc) | 0.94 | 0.88 | 1.10 | 1.30 | 1.79 | 0.88 |
| | Delta T (° C.) | 4.9 | 6.1 | 7.6 | 7.2 | 9.3 | 9.3 |
| | Slump (mm) | 60 | 70 | 20 | 45 | 0 | 8 |
| | Slump (% of Control) | 55% | 61% | 20% | 41% | 0% | 8% |
| | Work (mm) | 75 | 78 | 21 | 45 | 0 | 10 |
| | Strength (MPa) | 9.9 | 8.1 | 11.2 | 10.9 | 27.5 | 16.4 |
| | Strength (% of Control) | 49% | 40% | 45% | 54% | 82% | 80% |
| 6 min $CO_2$ | $CO_2$ Uptake (% bwc) | 1.96 | 1.74 | 4.06 | 1.84 | 2.71 | 1.57 |
| | Delta T (° C.) | 7.6 | 9.2 | 9.7 | 11.2 | 13.2 | 12.7 |
| | Slump (mm) | 35 | 70 | 0 | 35 | 0 | 0 |
| | Slump (% of Control) | 32% | 61% | 0% | 32% | 0% | 0% |
| | Work (mm) | 35 | 89 | −6 | 37 | 0 | 0 |
| | Strength (MPa) | 8.8 | 6.4 | 11.2 | 13.4 | 29.5 | — |
| | Strength (% of Control) | 43% | 32% | 45% | 66% | 88% | — |
| 8 min $CO_2$ | $CO_2$ Uptake (% bwc) | 2.76 | 1.68 | 1.27 | 2.23 | 3.75 | 2.07 |
| | Delta T (° C.) | 13.4 | 9.2 | 14.8 | 14.7 | 22.2 | 17.3 |
| | Slump (mm) | 5 | 40 | 0 | 15 | 0 | 0 |
| | Slump (% of Control) | 5% | 35% | 0% | 14% | 0% | 0% |
| | Work (mm) | 5 | 44 | −8 | 13 | 0 | 0 |
| | Strength (MPa) | 8.2 | 6.8 | 13.9 | 14.5 | — | — |
| | Strength (% of Control) | 41% | 34% | 56% | 72% | — | — |

Figure 52:
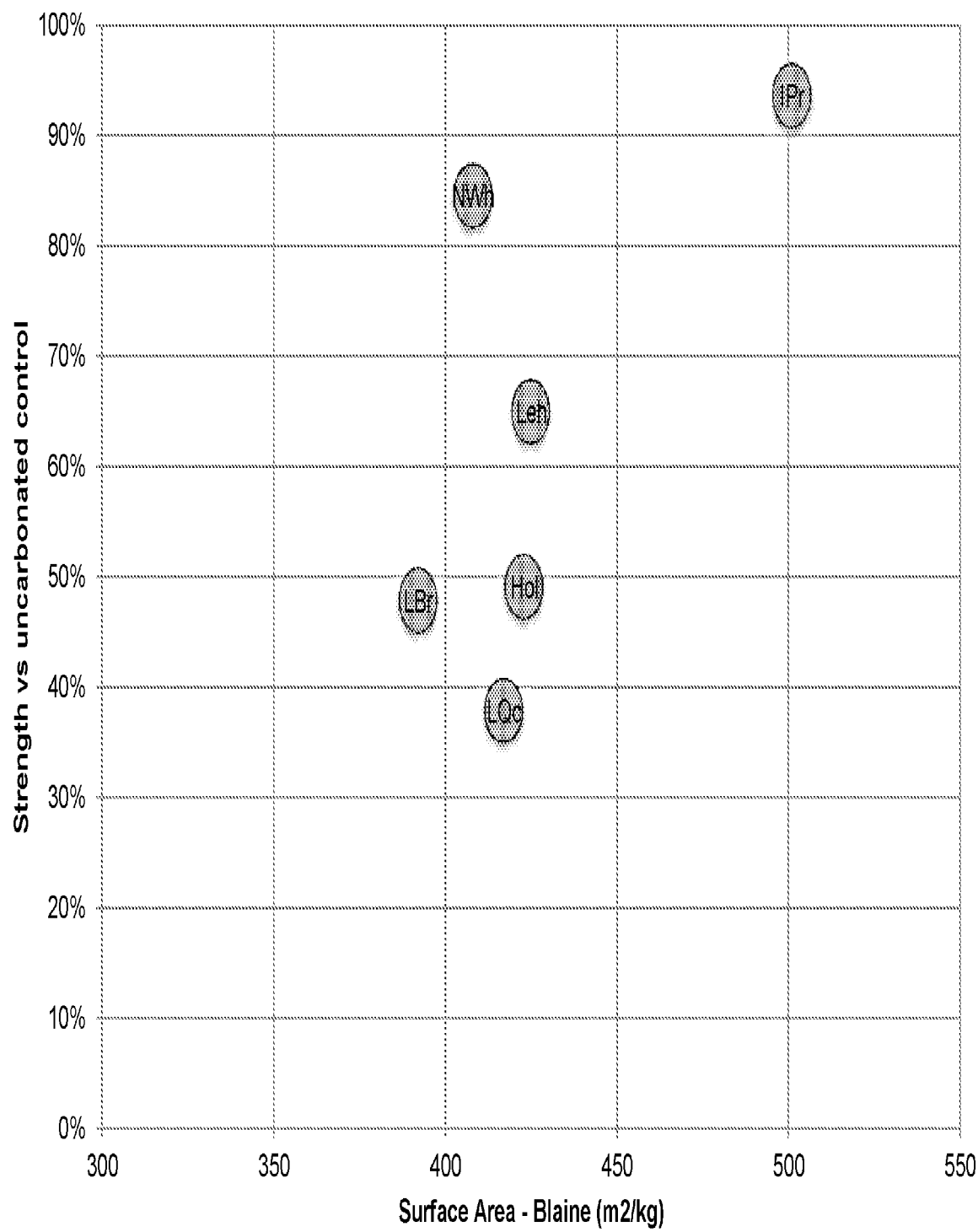
FIG. 52 provides a graphic illustration of the relationship between surface area compressive strength at 24 hours of carbonated mortars produced with different cements.

There was considerable variation among the mortars made from the different cements in slump and strength. The Illinois Product was notable for its higher compressive strength at all time points tested. Without being bound by theory, this may be due to its greater surface area (see TABLE 18), which allows it to absorb carbon dioxide with relatively less proportional impact on strength development. Strength vs. surface area of carbonated mortar mixes with various surface areas is shown in FIG. 52.

Example 22

In this example, various admixtures were added to cement paste mixes exposed to carbon dioxide and their effects on slump after mixing were determined. The paste mix was 500 g cement, 250 g water. Holcim GU cement. 1% bwc CO2 was dosed, with mixing for one minute. The results are shown in TABLE 20.

TABLE 20

Effects of admixtures on slump of carbonated mortar

| Condition (all doses expressed as % by weight of cement) | Paste Spread (cm) 1 Min after mixing | Paste Spread (cm) 10 Min after mixing |
|---|---|---|
| Control | 11.5 | 13.75 |
| 1% $CO_2$ | 8.75 | 5 |
| 1% $CO_2$ + 1% $Na_2SO_4$ | 9.75 | 4.25 |
| 1% $CO_2$ + 3% $Na_2SO_4$ | 7.25 | 4 |
| 1% $CO_2$ + 5% $Na_2SO_4$ | 4.75 | 4 |
| 1% $CO_2$ + 0.04% Citric Acid | 6.75 | 4 |
| 1% $CO_2$ + 0.10% Gluconate | 6.5 | 4.25 |
| 1% $CO_2$ + 0.15% Gluconate | 9.25 | 9.75 |
| 1% $CO_2$ + 0.20% Gluconate | 9.25 | 10.25 |
| 1% $CO_2$ + 0.05% Gluconate - After Carbonation | 9.75 | 4.75 |
| 1% $CO_2$ + 0.10% Gluconate - After Carbonation | 10.75 | 11.775 |

TABLE 20-continued

Effects of admixtures on slump of carbonated mortar

| Condition<br>(all doses expressed as<br>% by weight of cement) | Paste Spread (cm)<br>1 Min after mixing | Paste Spread (cm)<br>10 Min<br>after mixing |
|---|---|---|
| 1% $CO_2$ + 0.15% Gluconate -<br>After Carbonation | 13.5 | 14 |

Example 23

In this Example, sensors for carbon dioxide and moisture were used in a mixing operation.

A precast operation was performed using the following mix components:

| Aggregate | Fine | Shaw Resources Sand | 602 kg |
| Aggregate | Coarse | ⅜" Coldstream | 200 kg |
| Aggregate | Coarse | Granodiorite | 839 kg |
| Cement | Cement | Maxcem | 286 kg |
| Admix | | Rheopel Plus | 400 ml |
| Admis | | Rheofit 900 | 350 |

Two carbon dioxide sensors were used, Sensor 1 positioned adjacent to an access hatch to the mixer and Sensor 2 positioned at the ejection location of the mixer, at a door that discharges onto a belt. $CO_2$ dose was increased or decreased depending on the overspill, as detected by the two sensors.

They are involved in a two stage injection approach.
1. Fill—high flowrate to fill the mixer with $CO_2$
2. Supply—lower flowrate to maintain a supply as $CO_2$ is absorbed by the concrete.

The PLC was programmed as follows to make changes based on the readings of the $CO_2$ sensors:

Sensor 1 to be placed by door, sensor 2 placed by mixer exit (measure each sensor separately)

If sensor 1 exceeds X ppm during flow 1, go to flow 2
If sensor 1 exceeds X ppm during flow 2, reduce flow by reduce percentage
If sensor 2 exceeds Y ppm ever, reduce max mix time by reduce time
If either sensor exceeds 5000 ppm for more than 5 mins, pop-up alarm on screen
If either sensor exceeds 5000 ppm for more than 10 mins, shut off system
If either sensor exceeds 9000 ppm, shut system off X and Y were programmable under each recipe (this allows change if a plant has a high $CO_2$ baseline due to dust etc.). Flow 1 was programmable and was the flow that was used to fill the headspace quickly (usually ~1500 LPM). Flow 2 was calculated by the PLC and was based on max mix time, $CO_2$ dose and the total already in the headspace. Max mix time was programmable and was the total desired injection time. Reduce percentage and reduce time were programmable and were determine by what percentage to reduce either the flowrate (thus reducing total CO2 dosage) or the max mix time (thus increasing flowrate to inject in shorter time).

Figure 53:
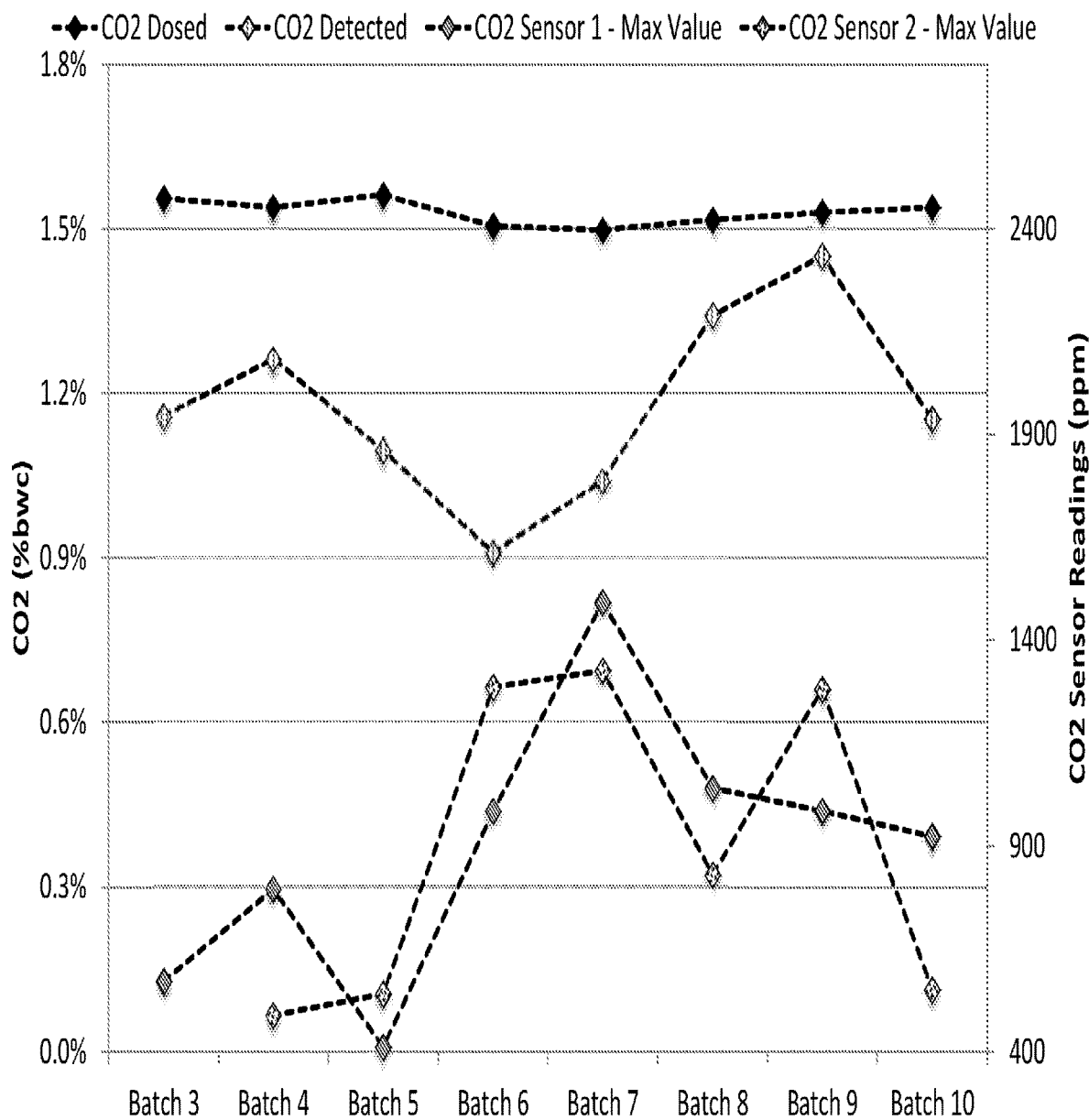
FIG. 53 provides a graphic illustration of carbon dioxide dosing (top line), carbon dioxide uptake (second line from top), and carbon dioxide detected at two sensors (bottom two lines) in a precast mixing operation where carbon dioxide flow was adjusted according to the carbon dioxide detected by the sensors.

The system was used over several batches and the results are shown in FIG. 53. The top line of FIG. 53 indicates the actual $CO_2$ dosed, and the second line indicates $CO_2$ detected in the mix. The efficiency of uptake varied from 60 to 95%. The bottom two lines indicate maximum values detected at Sensor 1 (all batches including Batch 3) and Sensor 2 (Batches 4-10). Average values may produce a better result.

This example demonstrates that carbon dioxide sensors may be used to adjust the flow of carbon dioxide in a cement mixing operation, producing uptake efficiencies up to 95%.

Example 24

This example demonstrates the use of solid carbon dioxide (dry ice) as a delivery mode for carbon dioxide in mixing concrete.

A solid particle of carbon dioxide will sublimate when in contact with the mix water, thereby releasing carbon dioxide gas over the period of time required to consume the particle. To achieve an extended dosing of carbon dioxide, e.g., in a readymix truck, solid carbon dioxide can be added in the desired mass and quantity, and in appropriate shape and size, to effectively provide a given dose of carbon dioxide over a desired length of time. The shape and size of the solid carbon dioxide will determine the total surface area of the solid; the greater the surface area, the greater the rate of sublimation of the dry ice.

Two dosing procedures were used. In the first, dry ice in the form of one inch pellets was used. In the second, a square slab with a 2" by 2" cross section was cut to the appropriate length to provide the desired dose. Mixing was performed in either a small drum mixer (17 liters) or large drum mixer (64 liters), and the mixing was conducted with a cover unless otherwise indicated.

Pellet Delivery:

A mix design of 400 kg/m³ cement, 175 kg/m³ water, 1040 kg/m³ stone, and 680 kg/m³ sand was used. Cement in one batch was 26.14 kg.

In a first batch, $CO_2$ at 0.5% bwc dose of pellets (34 g) was added with the other mix materials and the concrete was mixed for 2 minutes. Uptake was found to be 014% bwc, and a 1° C. temperature increase was noted. The dry ice pellets had not completely sublimed after 2 min of mixing.

In a second batch, $CO_2$ at 1.0% bwc dose of pellets (68 g) was added with the other mix materials and the concrete was mixed for 4 minutes. $CO_2$ uptake was 0.3% bwc with a 1° C. temperature increase. After 4 min of mixing, all the dry ice pellets had completely sublimed.

In a third batch, $CO_2$ at 2.75% bwc dose of pellets (186 g) was added with the other mix materials and the concrete was mixed for 4 minutes. $CO_2$ uptake was 0.6% bwc with a 2° C. temperature rise; all dry ice pellets were sublimed after 4 min of mixing.

With the use of pellets, uptake increased with increasing pellet dose, and pellets of this size and in these doses took 2 to 4 min to completely sublime. $CO_2$ uptake was low efficiency, and the gas uptake was associated with mix stiffening.

Slab Delivery:

In a first test, the same mix design as for the pellet tests was used. The 2×2" slab was cut to 5.5" long for a dose of 2% $CO_2$ bwc. In a first batch, water was added in two additions. A first addition of water to w/c of 0.2 was performed, the dry ice slab was added and mixed for 40 seconds. Final water was added to the total water amount and the concrete was mixed for an additional 6 min. The $CO_2$ uptake was 0.95% and no temperature increase was observed. In a second batch, 4 serial addition of slabs of dry ice were performed. All water was added to the mix (w/c 0.44) then a dry ice slab was added for a dose of 2% bwc. The concrete was mixed for 6 min. $CO_2$ uptake was 0.67% and no temperature increase was observed. An additional slab of dry ice was added to the mix, at 2% bwc for a total dose of 4% bwc, and a further 6 minutes of mixing was performed. $CO_2$ uptake was 1.67%, and no temperature increase was observed. An additional slab of dry ice was added to the mix, at 2% bwc for a total dose of 6% bwc, and a further 6 minutes of mixing was performed. $CO_2$ uptake was 2.33%, and a 3.5° C. temperature increase was observed. An additional slab of dry ice was added to the mix, at 6% bwc for a total dose of 12% bwc, and a further 6 minutes of mixing was performed. $CO_2$ uptake was 3.44%, and a 5° C. temperature increase was observed. In this test, in which mixing was at full speed, all the carbon dioxide was completely sublimed at the end of each mixing time. Subsequent tests were performed at lower speed representative of a truck in transit rather than a truck in initial mixing stage.

In a second test, the same mix design as for the pellets was used except the final proportion of water was 200 kg/m$^3$. Slow mixing (~1 RPM) in a 65 L mixer was performed, with a dry ice slab added 2 min after the initial cement and water contact, for a dose of 2% bwc. Mixing was continued for a total of 36 min. $CO_2$ uptake was 0.95%, and a 3.5° C. temperature increase was observed. The slump of the concrete mix prior to $CO_2$ addition was 6", and 3" after 36 min of mixing under $CO_2$.

In a third test, the same mix design as for the pellet tests was used. Water was added to an initial w/c of 0.2, a dry ice slab was added for a dose of 0.2% bwc, and the concrete mix was mixed for 40s at full speed (45 rpm), then the remainder of the water was added, to a w/c of 0.45 and the mix was mixed for 36 min of slow (transit, ~1 RPM) mixing of the batch in a 65 L mixer. $CO_2$ uptake was 0.75%, and a 1.5° C. temperature increase was observed. Slump was 5.5" after 36 min of mixing. A control slump (without carbon dioxide) was assumed to be ~6". Then another 2% bwc of dry ice slab was added, and the concrete was mixed at high speed for an additional 11 min. $CO_2$ uptake was 1.66%. Slump decreased from 5.5" to 2.5."

In a fourth test, the same mix design as for the pellet tests was used, except water was 195 kg/m$^3$. Two batches were run in which dry ice at a dose of 2% bwc was added 2 minutes after the initial cement and water contact. In the first batch, the concrete was mixed with cover on at a fast transit mix (~2 RPM) for 30 min. $CO_2$ uptake was 1.3% bwc, and a 5° C. temperature increase was observed. Slump was 0" after mixing, compared to 6.5" slump in control (no carbon dioxide). In the second batch, mixing was done with cover off at a fast transit mix for 29 min. $CO_2$ uptake was 0.7% bwc, and a 0.2° C. temperature increase was observed. Slump was 3" after 29 min mixing, compared to 6.5" slump in control (no carbon dioxide).

This example demonstrates that the size and shape of dry ice can be used to control delivery, and that various times of addition, mix rates, water contents, and other variables may be manipulated to modulate the amount of carbon dioxide taken up by the concrete and the effect of the carbon dioxide on such factors as slump.

Example 25

This example illustrates the use of low-dose carbon dioxide to provide accelerated hydration, early strength development and set, with minimal impact on rheology and later-age strength.

Mortar Tests

In a first set of tests, mortars were prepared. Mortars were prepared with 1350 g sand, 535 g cement, and 267.5 g water, and homogenized in a paddle-style mixer by mixing on low speed for ~2 min, then samples were removed for $CO_2$ analysis and calorimetry. The mortar was then exposed to $CO_2$ gas at a flow rate of ~0.15 LPM for 2 minutes and additional samples were removed. This same mortar was exposed to 3-7 successive rounds of carbonation total, with samples removed between each round.

Figure 54:
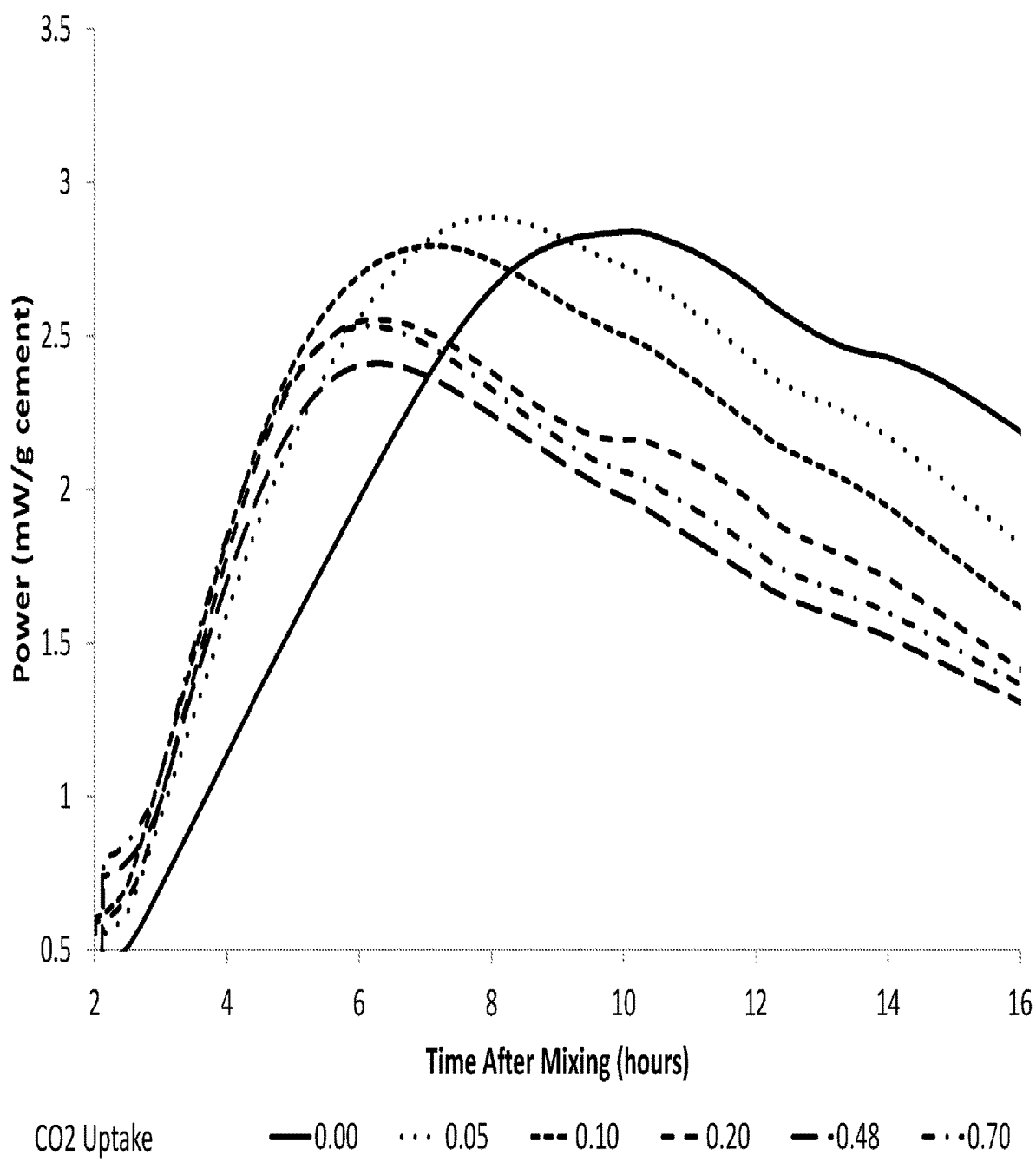
FIG. 54 shows isothermal calorimetry curves in mortar prepared with Holcim GU cement carbonated at low levels of carbonation.
Figure 55:
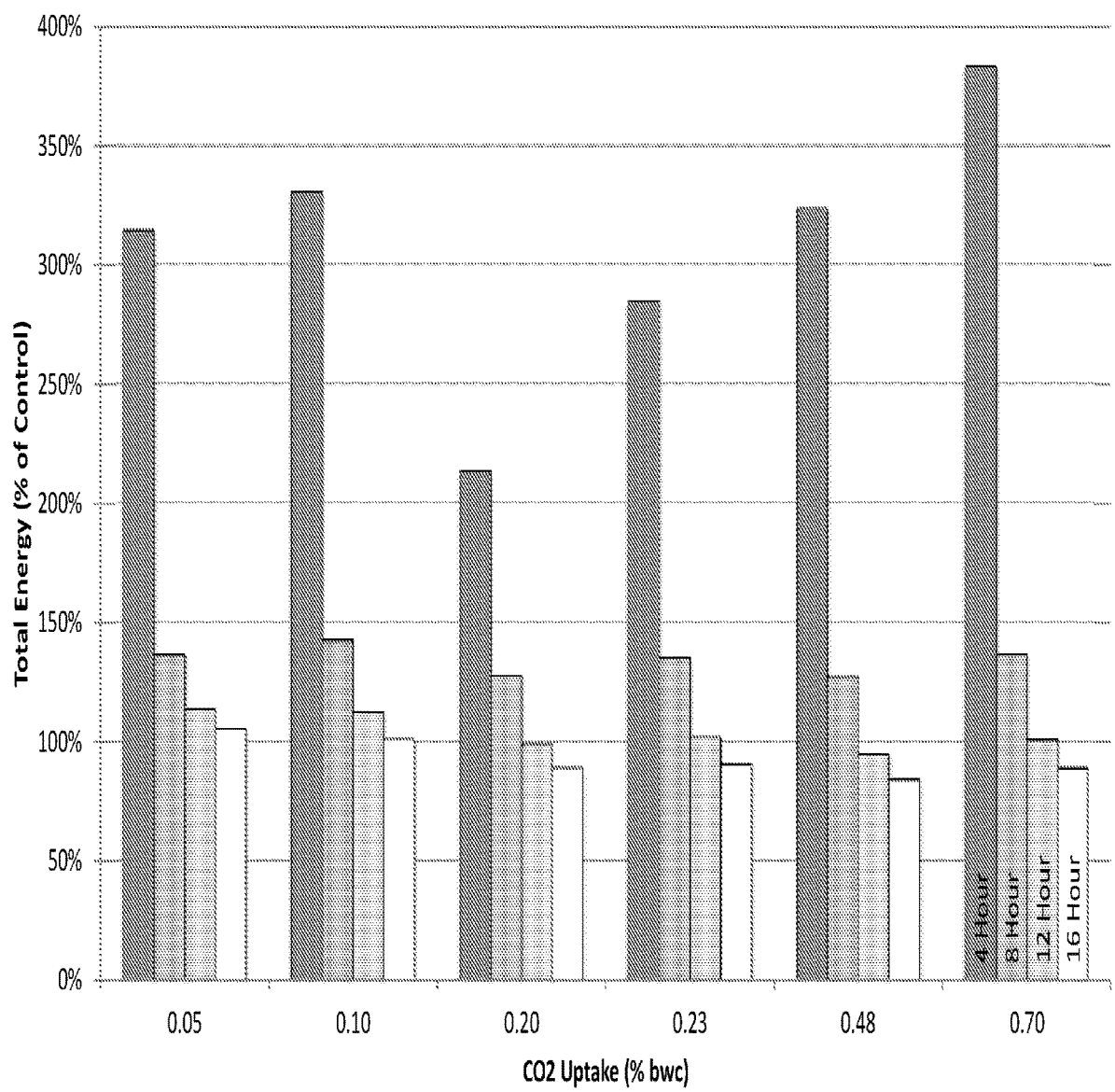
FIG. 55 shows total heat evolution at various time points in mortar prepared with Holcim GU cement carbonated at low levels of carbonation.
Figure 56:
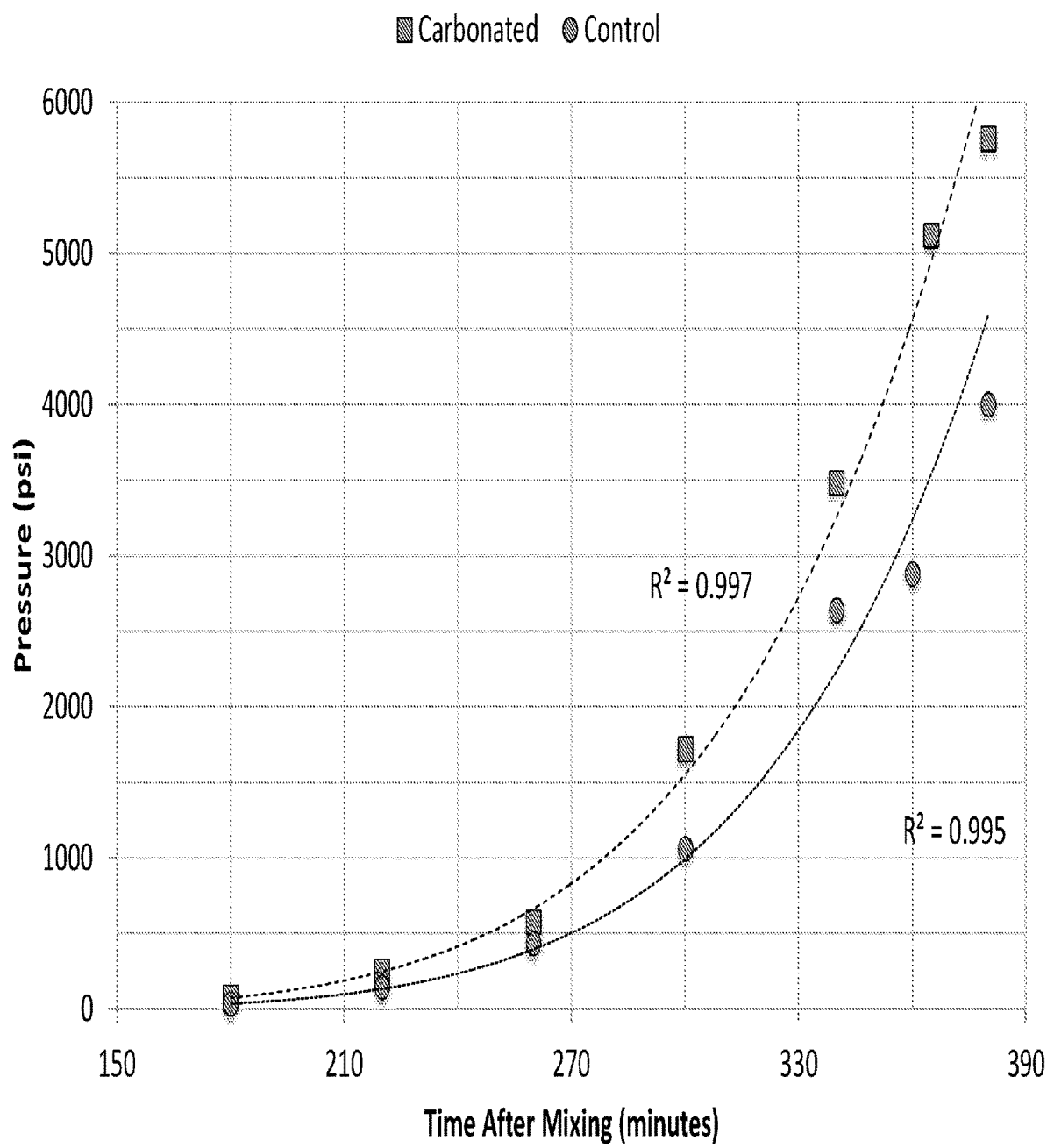
FIG. 56 shows set, as represented by penetrometer readings, in mortar prepared with Holcim GU cement carbonated at a low level of carbonation.

In one test, Holcim GU cement was used. The levels of carbonation of the mortar achieved in succeeding rounds of carbon dioxide exposure were 0, 0.05, 0.10, 0.20, 0.48, and 0.70% bwc. FIG. 54 presents data on isothermal calorimetry power curves for the different levels of carbonation, showing that by carbonating the mortar the rate of cement hydration could be accelerated (curves shift to the left and become steeper with carbonation). The total heat evolution was also improved at early ages with carbonation of the mortars (FIG. 55). In addition, the onset of both initial and final set was accelerated by carbonation, as indicated by penetrometer measurements and shown in FIG. 56. For these measurements, mortar was prepared as follows: 5x batch size in Hobart (normal batch scaled up 500% to use in a larger mixer)1337.5 g water, 2675 g cement 5175 g sand. Combined in Hobart mixer and homogenized. Carbonated at 1.0 LPM for 5 rounds of 2 minutes (i.e. 0, 2, 4, 6, 8, 10 minutes samples). Penetrometer measurement performed on last sample (10 minutes total $CO_2$ exposure). Expected dose for 1 LPM for 10 min is about 20 g of $CO_2$, for a total dose is about 0.74% bwc. From Eltra: carbon dioxide uptake estimated at 0.10% bwc. The low uptake may have been due to head space/flow rate. A Control was then cast for comparison afterwards. 2x batch size in Kitchen Aid (smaller mixer): 1070 g cement, 535 g water, 2070 g sand.

Figure 57:
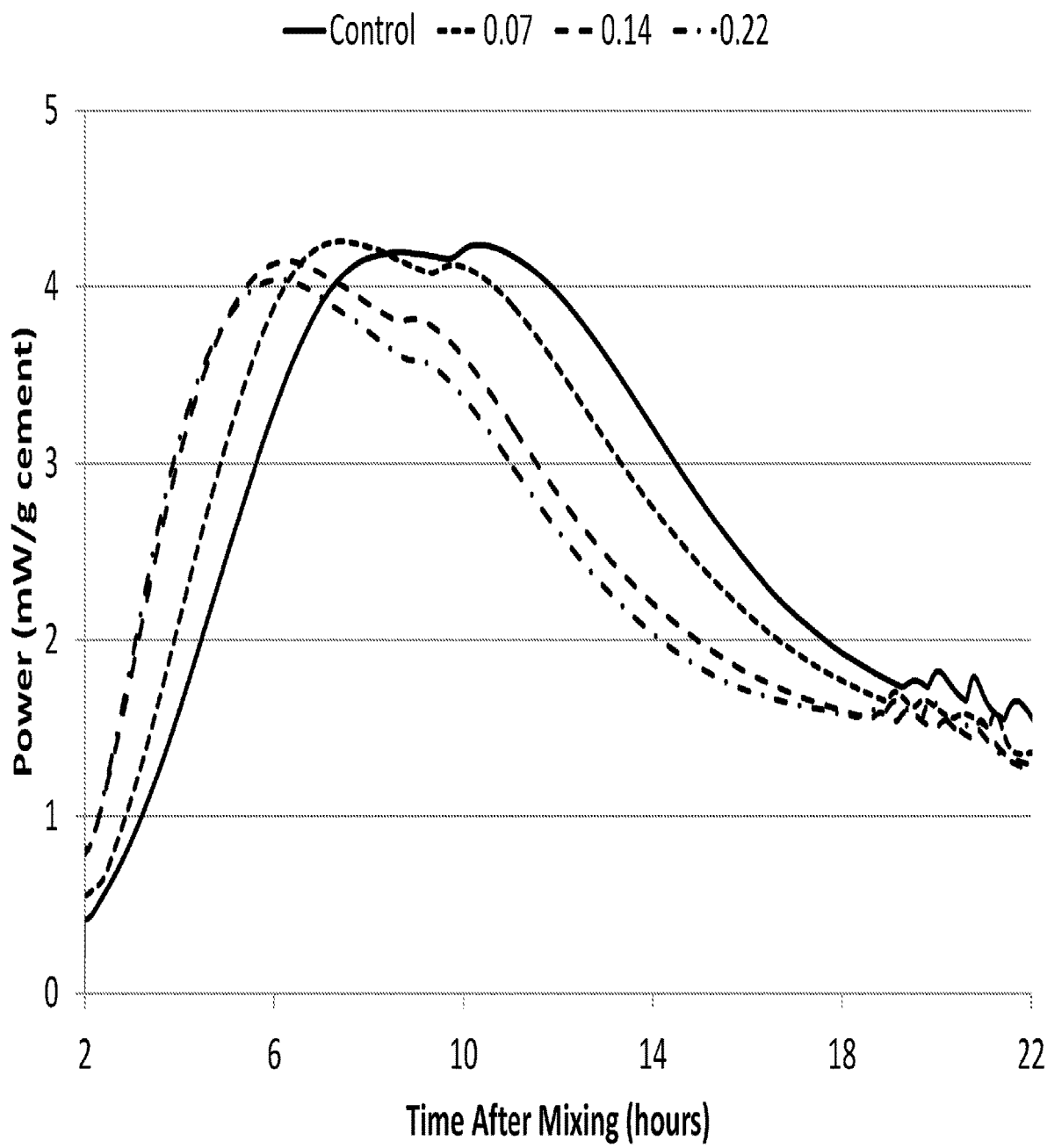
FIG. 57 shows isothermal calorimetry curves in mortar prepared with Lafarge Brookfield GU cement carbonated at low levels of carbonation.
Figure 58:
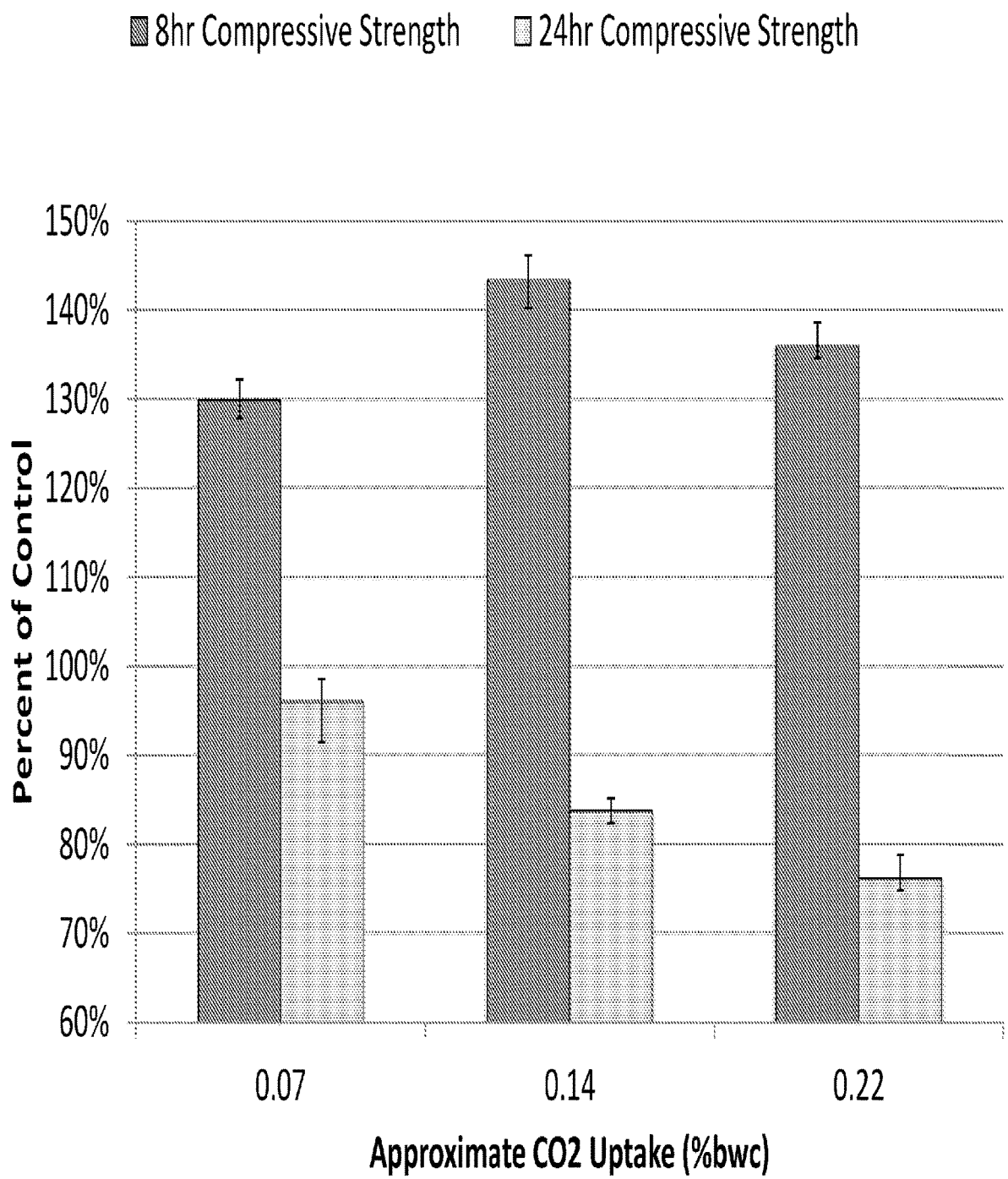
FIG. 58 shows 8 hour and 24 hour compressive strengths in mortar prepared with Lafarge Brookfield GU cement carbonated at low levels of carbonation.

Similar results were seen for mortars prepared with Lafarge Brookfield GU cement dosed at 0, 0.07, 0.14, and 0.22% bwc carbon dioxide, as shown for hydration in FIG. 57, as well as early strength development as shown in FIG. 58.

Concrete Tests

Tests were extended to concretes. In a typical experiment a batch of concrete was prepared with the following proportions: 16.0 kg sand, 23.80 kg stone, 9.18 kg cement, 3.15 kg water. The concrete was homogenized in a drum-style mixer by mixing on low speed for ~2 min and samples were removed for $CO_2$ analysis and calorimetry. The concrete was then exposed to $CO_2$ gas at a flow rate of ~2.0 LPM for 2 minutes and additional samples were removed. This same concrete was exposed to three successive rounds of carbonation in total, with samples removed between each round. Total $CO_2$ uptake for succeeding rounds was 0, 0.10, 0.15, and 0.20% bwc.

Figure 59:
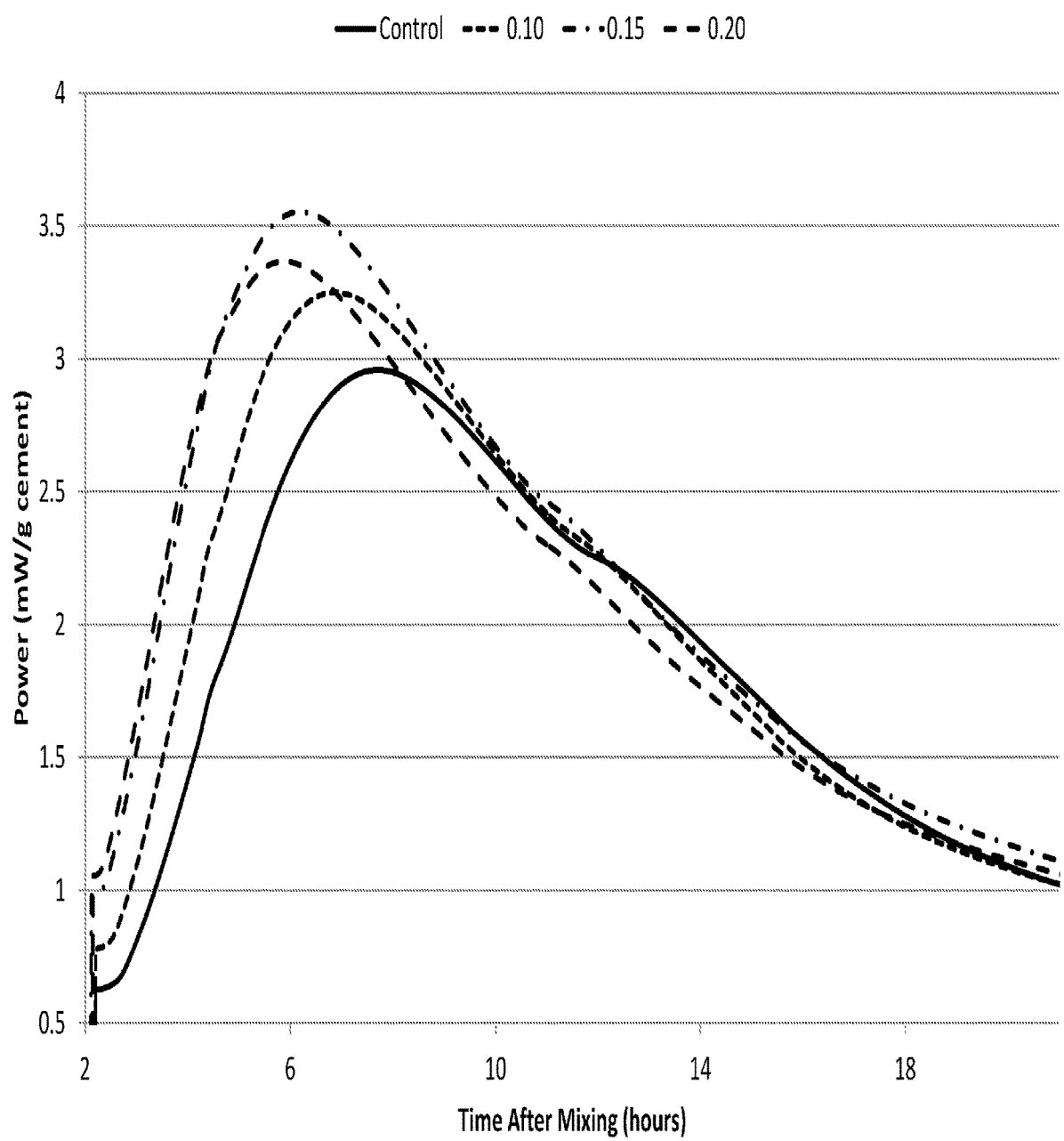
FIG. 59 shows isothermal calorimetry curves in concrete prepared with Lafarge Brookfield GU cement carbonated at low levels of carbonation.
Figure 60:
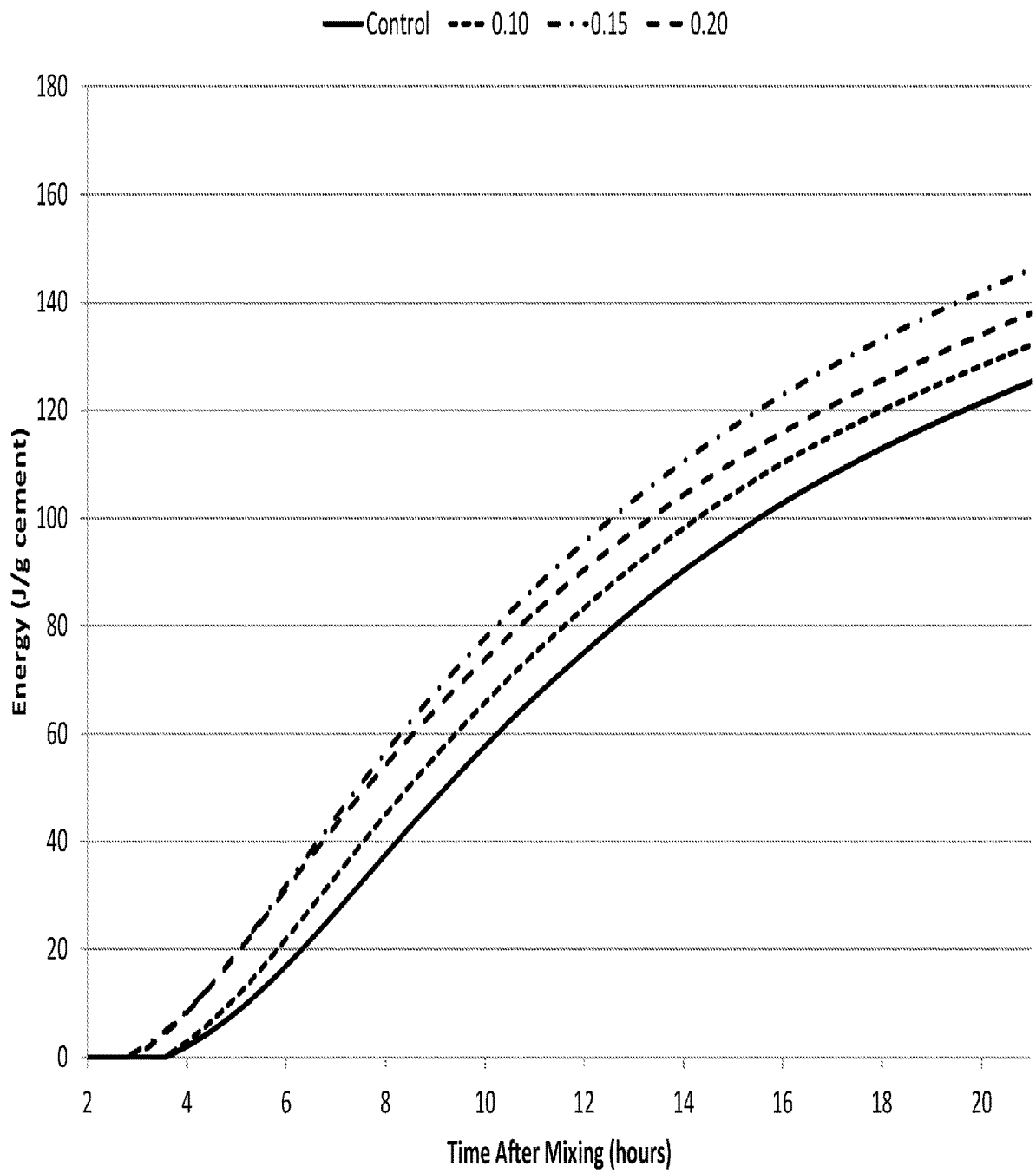
FIG. 60 shows calorimetry energy curves in concrete prepared with Lafarge Brookfield GU cement carbonated at low levels of carbonation.
Figure 61:
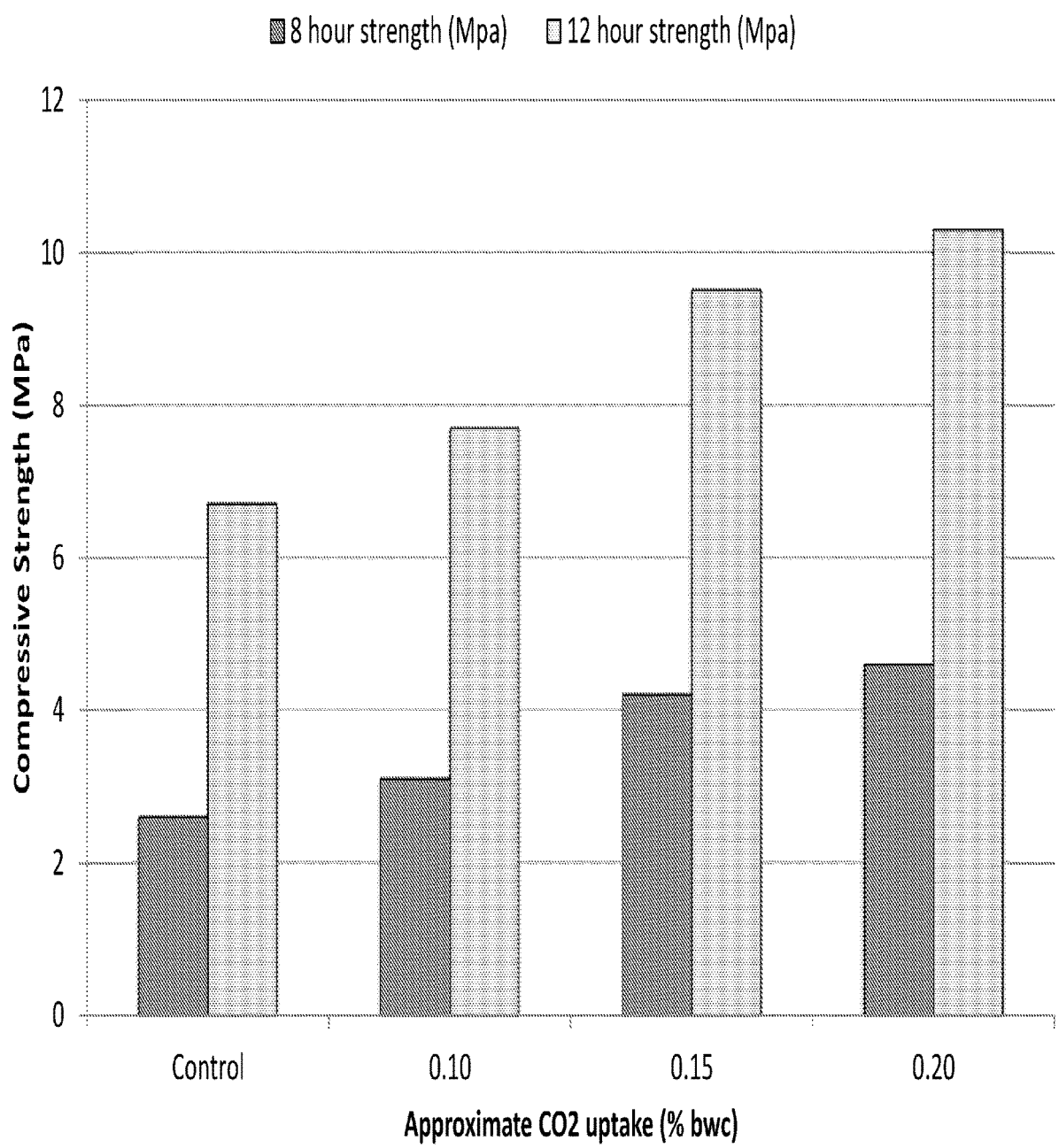
FIG. 61 shows 8 hour and 12 hour compressive strengths in concrete prepared with Lafarge Brookfield GU cement carbonated at low levels of carbonation.
Figure 62:
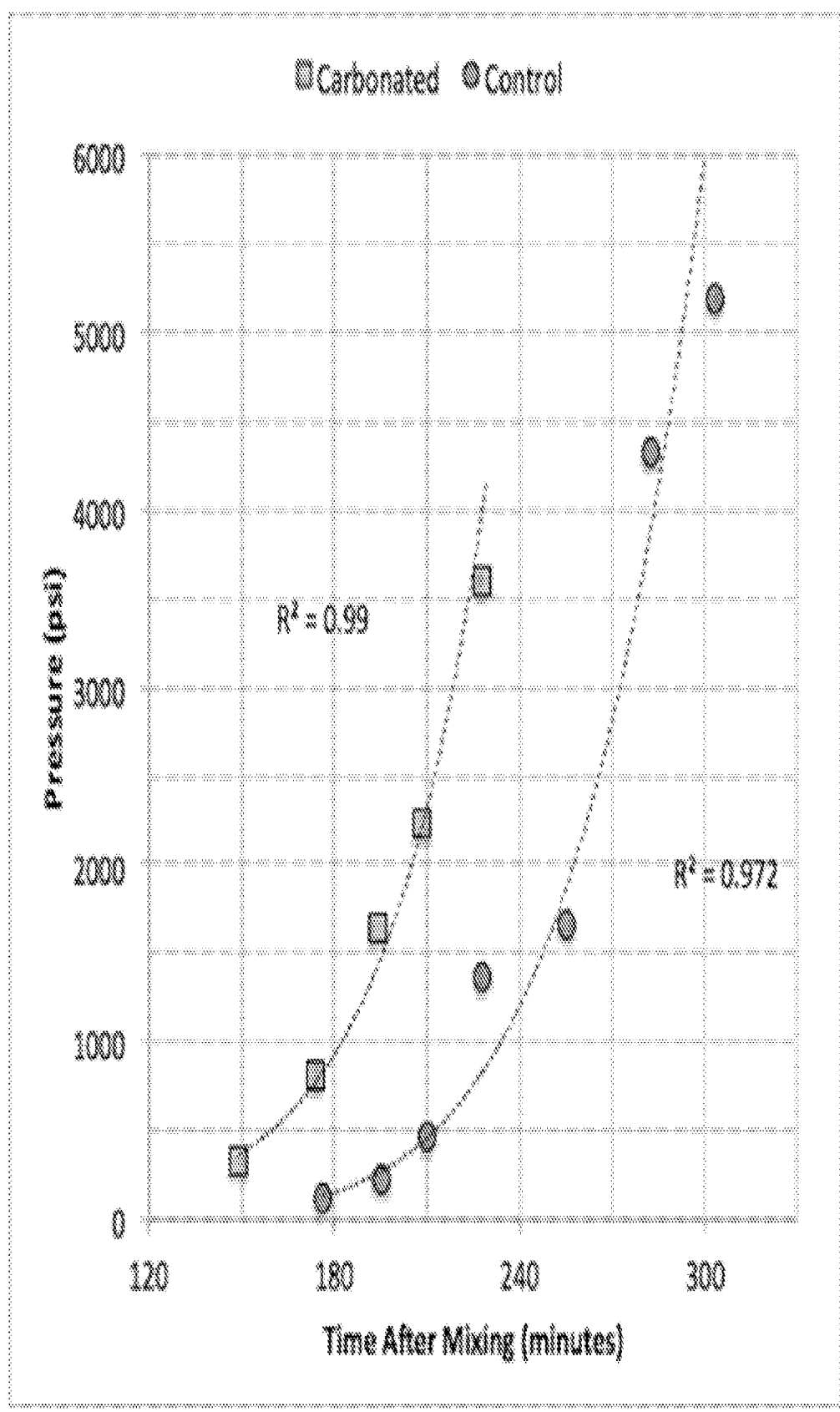
FIG. 62 shows set, as represented by penetrometer readings, in mortar prepared with Lafarge Brookfield GU cement carbonated at a low level of carbonation.

In a first series, LaFarge Brookfield GU cement was used in the concrete. calorimetry power curves show acceleration of concrete. See FIG. 59. calorimetry energy curves show an increased amount of heat released at all ages in the carbonated concrete. See FIG. 60. Early strength development was also accelerated in the carbonated concretes. See FIG. 61. In addition, set time measurements confirmed that the observed acceleration of hydration translated into accelerated initial (500 psi) and final (4000 psi) set in the carbonated concrete. FIG. 62 shows penetrometer readings over time for carbonated concrete (approximately 0.20% bwc $CO_2$ uptake) compared to uncarbonated.

Figure 63:
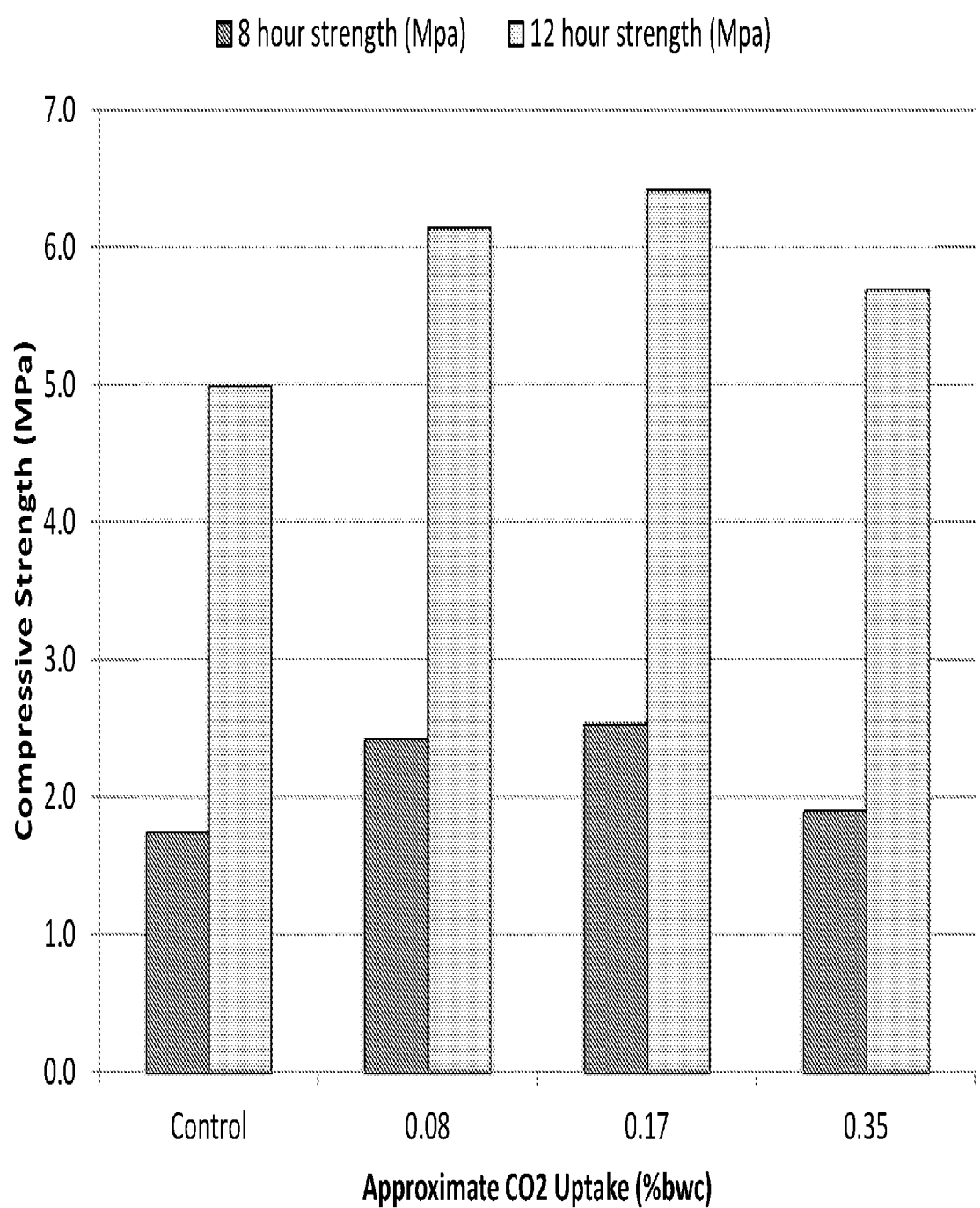
FIG. 63 shows 8 hour and 12 hour compressive strengths in concrete prepared with St. Mary's Bowmanville GU cement carbonated at low levels of carbonation.

Similar results were obtained in a second series, where concrete was produced with St. Mary's B cement; for example, carbonation at 0.08, 0.17, and 0.35% bwc all produced increased 8-hour and 12-hour compressive strength compared to uncarbonated control. See FIG. 63.

Other concretes were produced using St. Mary's HE cement and Holcim GU cement (carbonated at a single level of $CO_2$ uptake). The concretes were carbonated at a constant carbon dioxide exposure of delivered carbon dioxide at a rate of 0.10-0.15% bwc per minute over three minutes (2 min with carbon dioxide flow and one minute of lid on mixing after delivery) for a total dose of 0.20-0.30% carbon dioxide bwc. Carbonation level was 0.15% bwc in the Holcim GU mixture and 0.26% bwc in the St Mary's HE mixture. See Table 21.

TABLE 21

Properties of low dose carbonated concretes

| Cement ID | Initial Set Acceleration (minutes) | Final Set Acceleration (minutes) | Strength at 8 hr (% of control) | Strength at 8 hr (MPa) |
| --- | --- | --- | --- | --- |
| St. Mary's HE | 55 | 41 | 133 | 2.2 |
| Holcim GU | 61 | 70 | 149 | 1.3 |

In an industrial trial, a truck carrying 2 m3 of concrete was delivered to the lab, with a mix design of 1930 kg sand, 2240 kg stone, 630 kg LaFarge Brookfield GU cement, and 238 kg water. A sample of uncarbonated concrete was first removed from the truck to cast control samples. The truck was then subjected to 6 separate doses of 0.05% bwc $CO_2$. Enough concrete was removed to satisfy casting demands following each dose (~60 L). The fresh properties of the concrete are shown in Table 22.

TABLE 22

Fresh properties of readymix concrete at low dose carbonation

| Sample # | Sample ID | Total $CO_2$ dose (bwc) | Time of discharge | Temp at discharge (° C.) | Slump (inches) | Air Content (%) | Defoamer Dose (% bwc) | Mighty 21ES dose (% bwc) |
| --- | --- | --- | --- | --- | --- | --- | --- | --- |
| 1 | Control | 0 | 8:45 | 14.7 | 3.5 | 1.5 | 0.10 | 0.10 |
| 2 | $CO_2$-1 | 0.05 | 8:50 | 16.4 | 3.5 | n/a | 0.10 | 0.10 |
| 3 | $CO_2$-2 | 0.10 | 9:04 | 16.7 | 3.5 | n/a | 0.10 | 0.10 |
| 4 | $CO_2$-3 | 0.15 | 9:12 | 18.0 | 3.0 | n/a | 0.10 | 0.10 |
| 5 | $CO_2$-4 | 0.20 | 9:26 | 18.4 | 3.0 | n/a | 0.10 | 0.10 |
| 6 | $CO_2$-5 | 0.25 | 9:35 | 18.5 | 1.5 | n/a | 0.10 | 0.10 |
| 7 | $CO_2$-6 | 0.30 | 9:50 | 18.7 | 2.0 | n/a | 0.10 | 0.15 |

Figure 64:
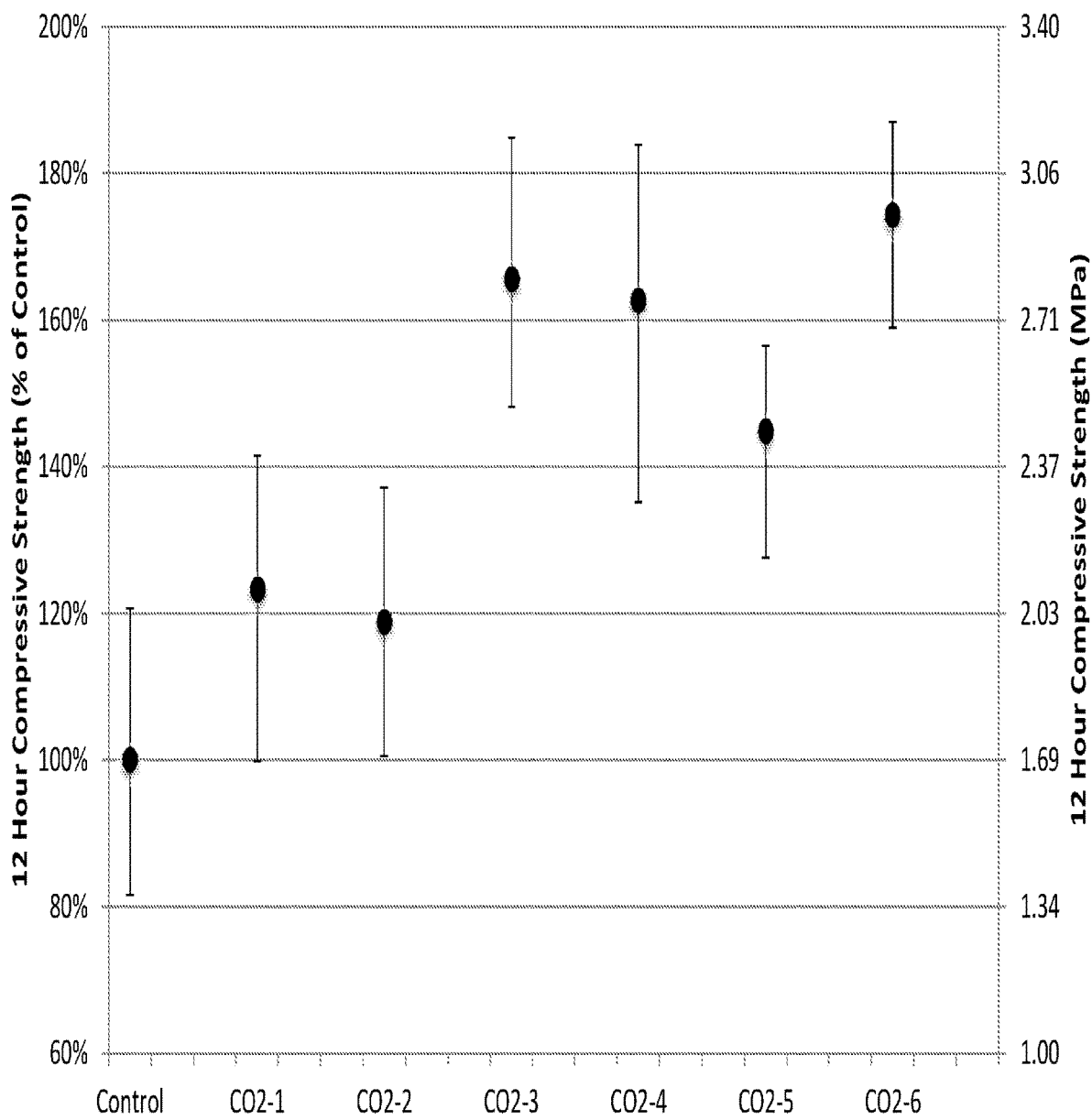
FIG. 64 shows 12-hour compressive strengths of concrete carbonated at various low doses of carbonation.
Figure 65:
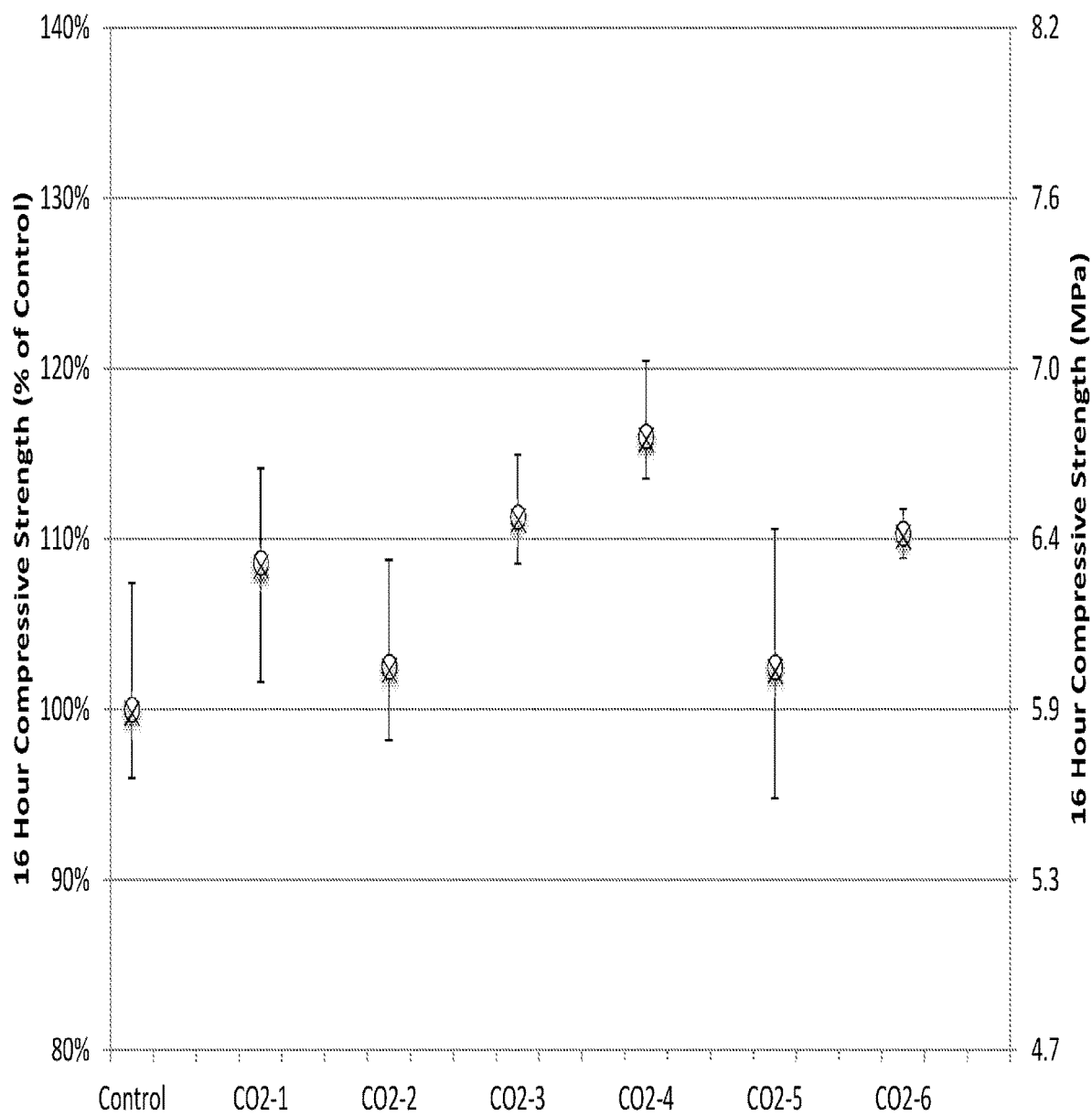
FIG. 65 shows 16-hour compressive strengths of concrete carbonated at various low doses of carbonation.
Figure 66:
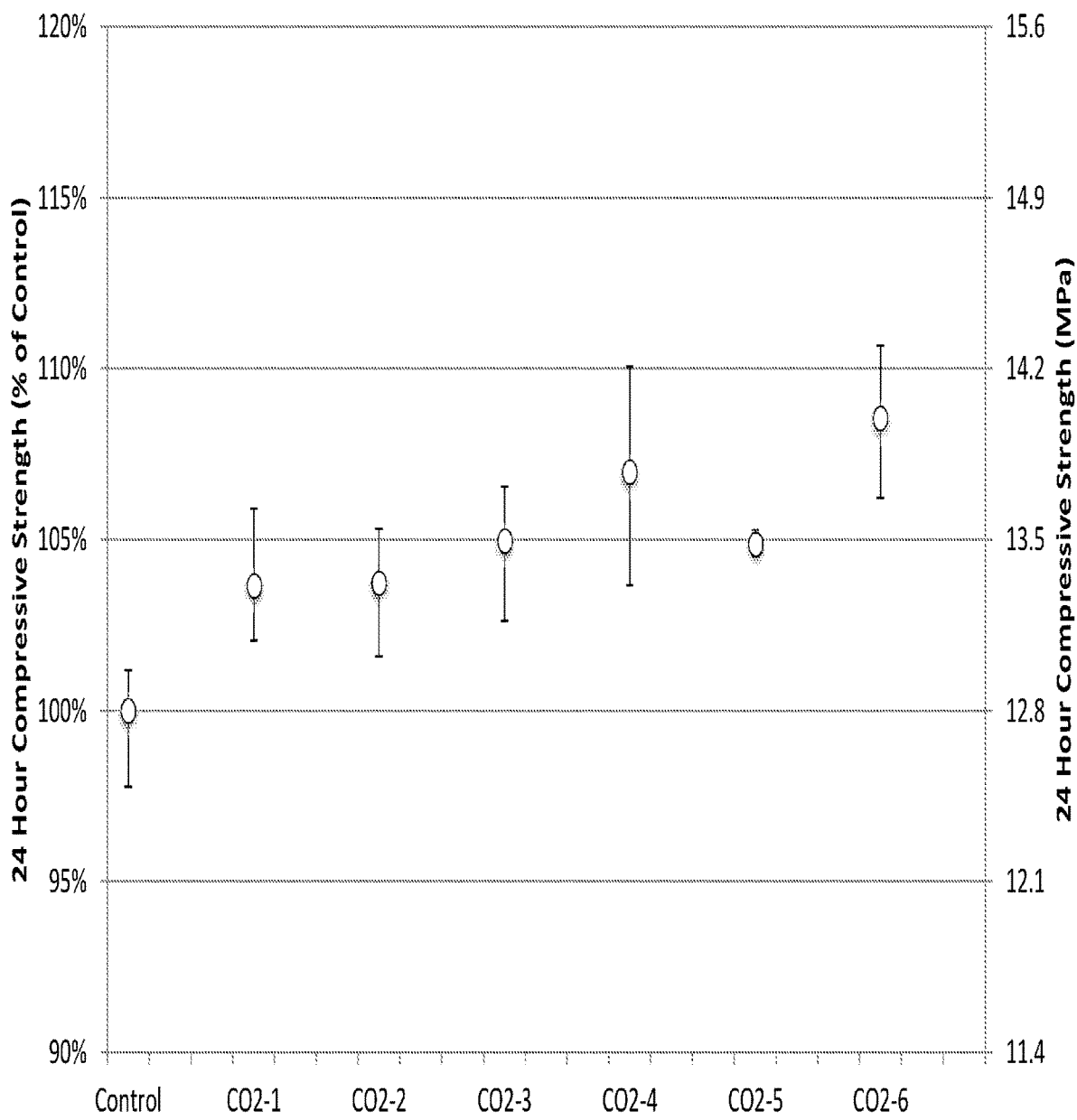
FIG. 66 shows 24-hour compressive strengths of concrete carbonated at various low doses of carbonation.
Figure 67:
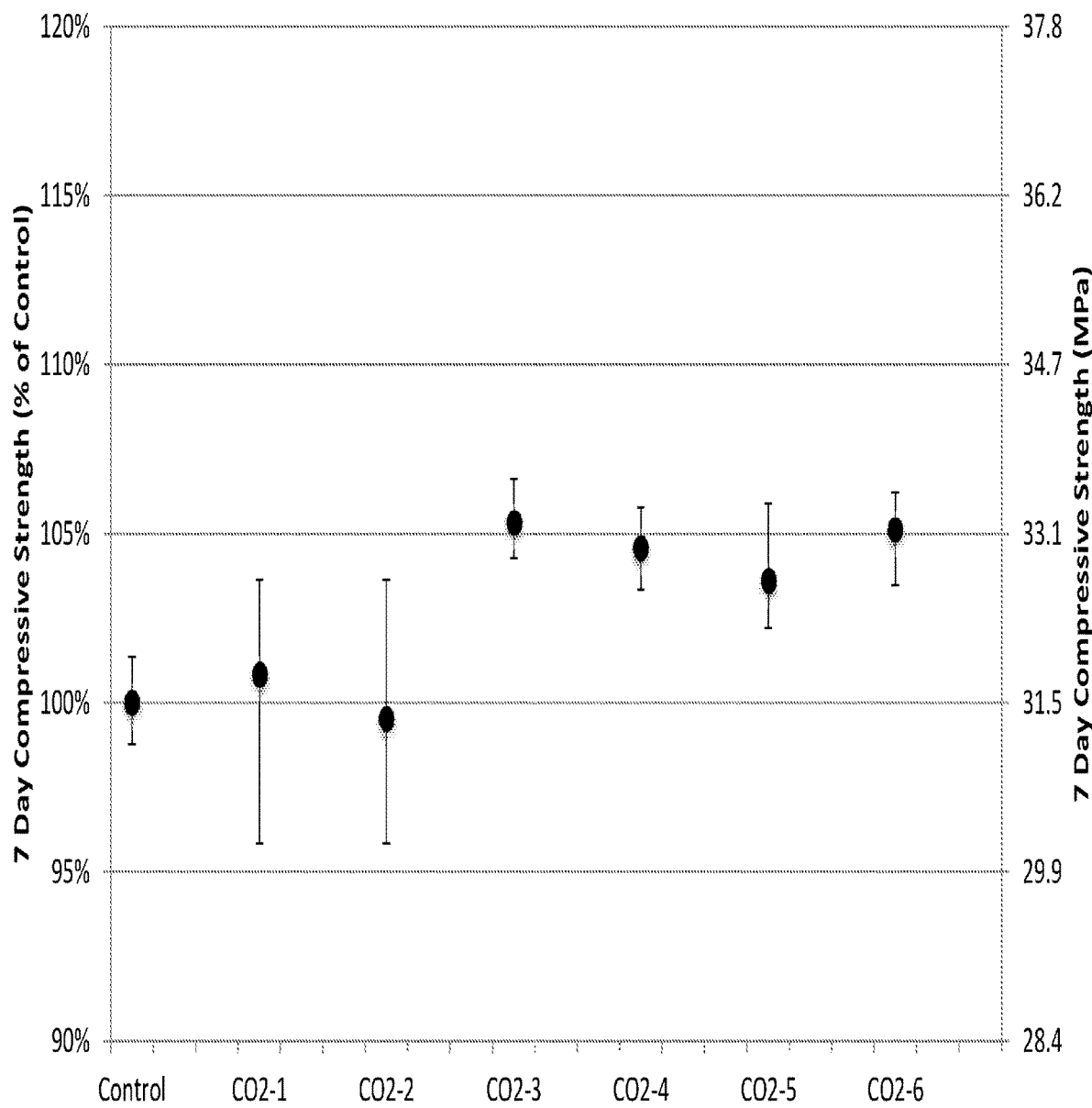
FIG. 67 shows 7-day compressive strengths of concrete carbonated at various low doses of carbonation.

In general, the compressive strength of the concrete specimens increased with each additional round of carbonation. This was most evident at early ages (up to 74% increase at 12 hours) but persisted until later ages (5% compressive strength increase at 7 days). See FIGS. 64 (12 hours), 65 (16 hours), 66 (24 hours), and 67 (7 days).

This example illustrates that the use of low-dose carbon dioxide in mortar and concrete mixes can accelerate set and strength development compared to uncarbonated mortar and concrete mixes.

Example 26

This example demonstrates the use of sodium gluconate in a dry mix concrete, either carbonated or uncarbonated.

The mix was 200 g stone, 1330 g sand, 330 g Holcim GU cement, and 130 g water. The mixing cycle was:

Mix aggregates and water for 30s
Add cement and mix 30s
60s mixing, with carbonation if called for
add admixtures and mix 30s
Compact cylinders using Proctor hammer Dosages employed were 0, 0.02%, 0.04% and 0.06% sodium gluconate by mass of cement.

Figure 68:
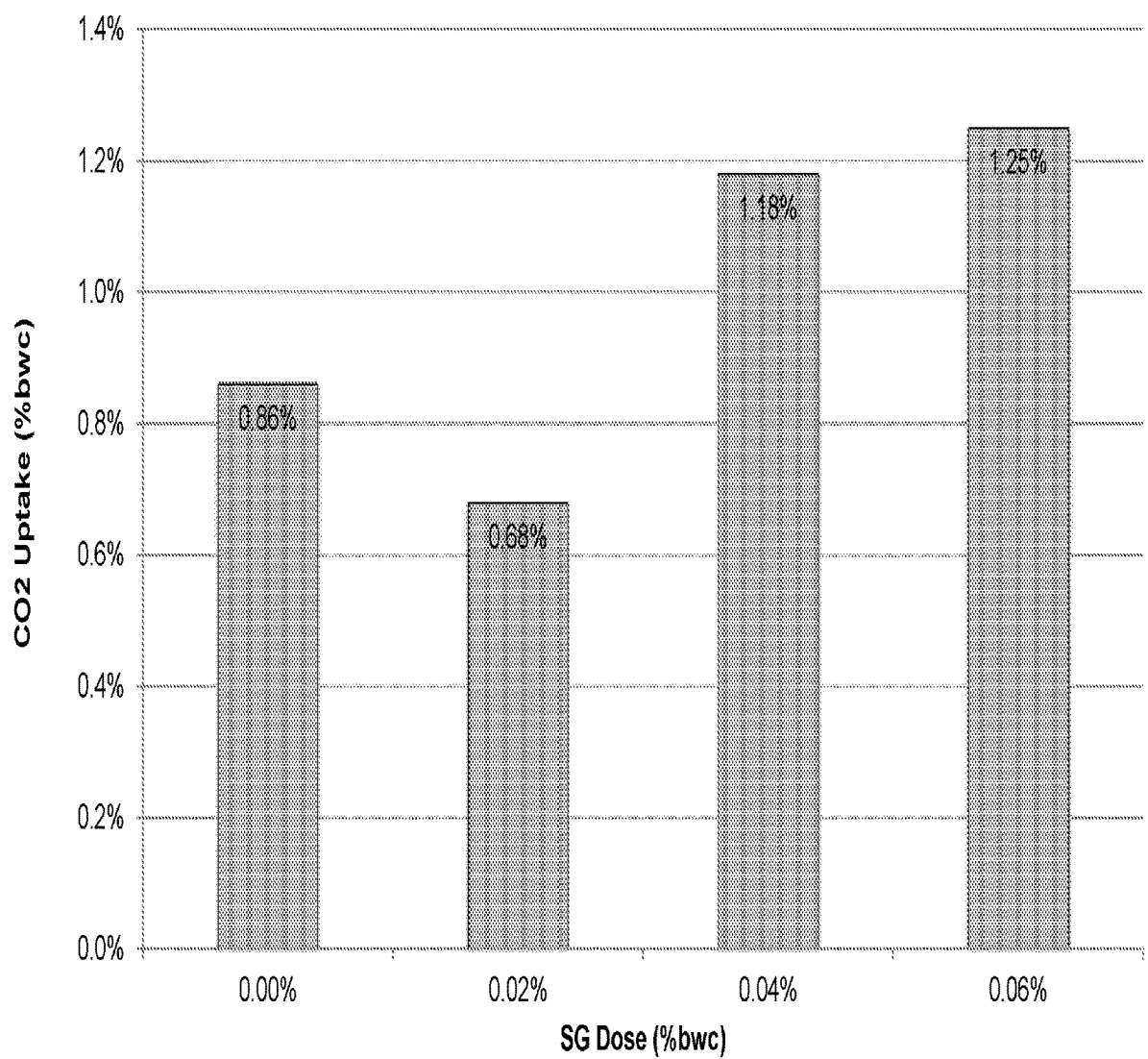
FIG. 68 shows carbon dioxide uptake of dry mix concrete at various doses of sodium gluconate.
Figure 69:
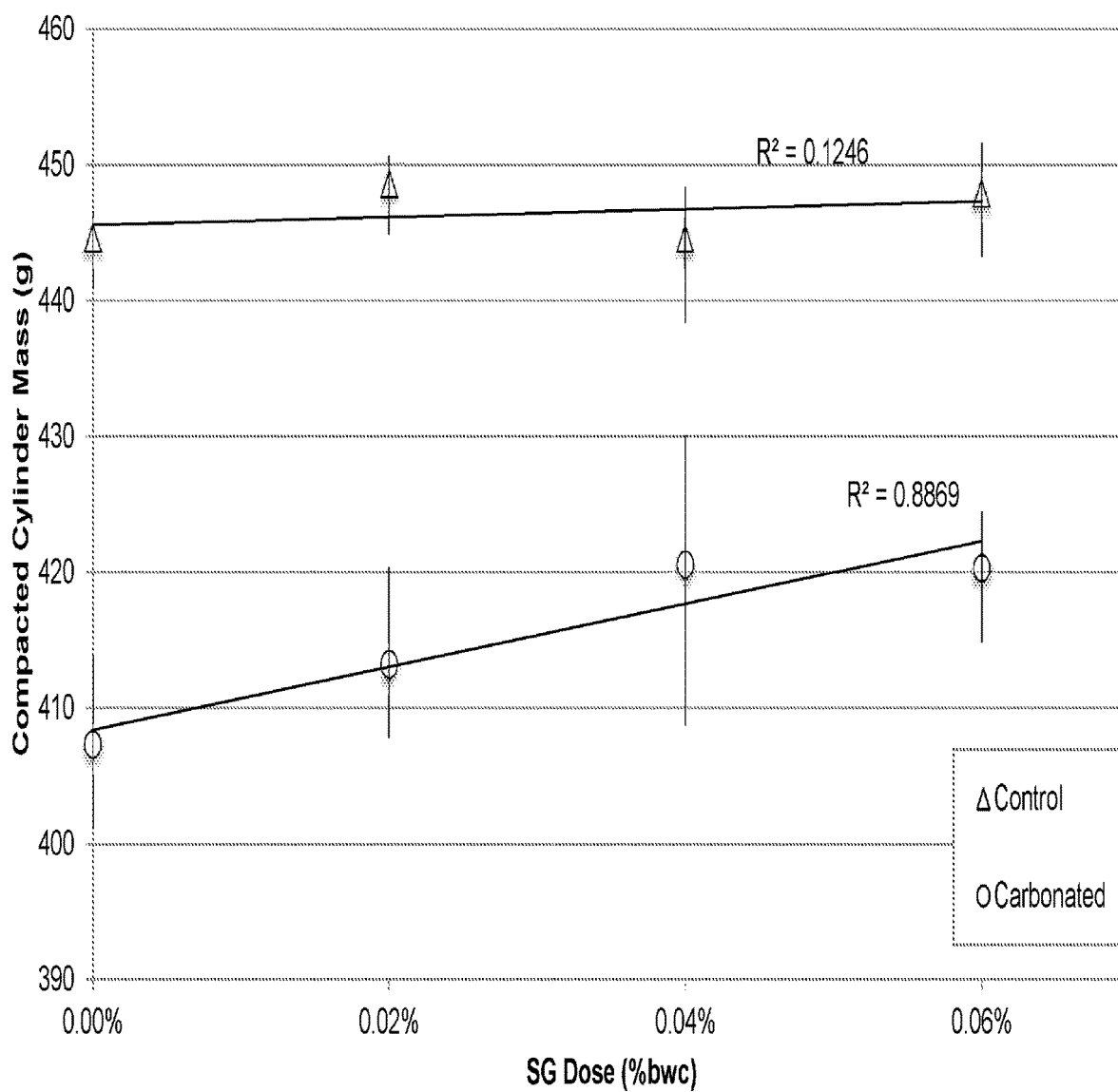
FIG. 69 shows compacted cylinder mass (a proxy for density) related to sodium gluconate dose in carbonated and uncarbonated dry mix concrete.
Figure 70:
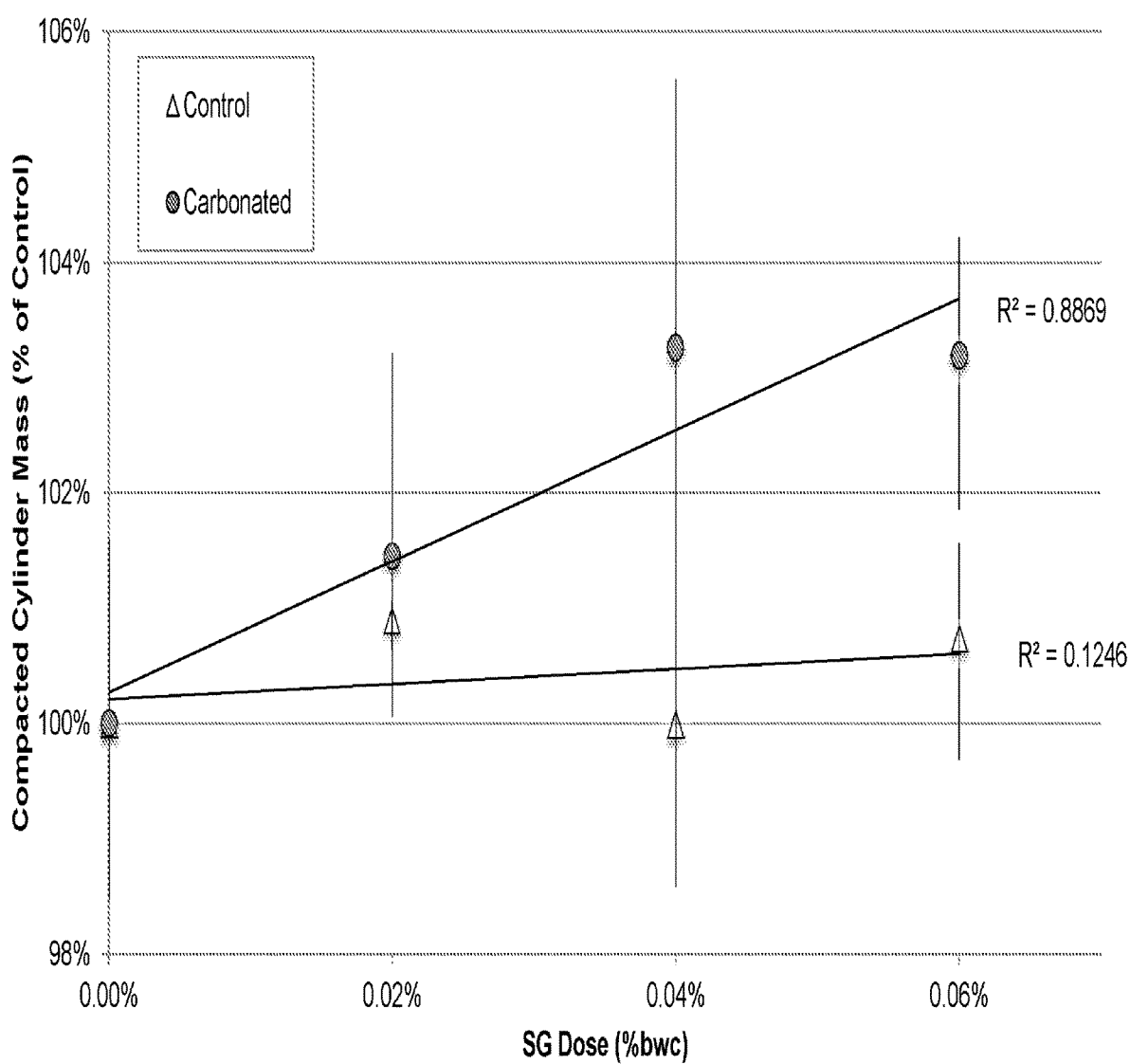
FIG. 70 shows the data of FIG. 69 normalized to control.
Figure 71:
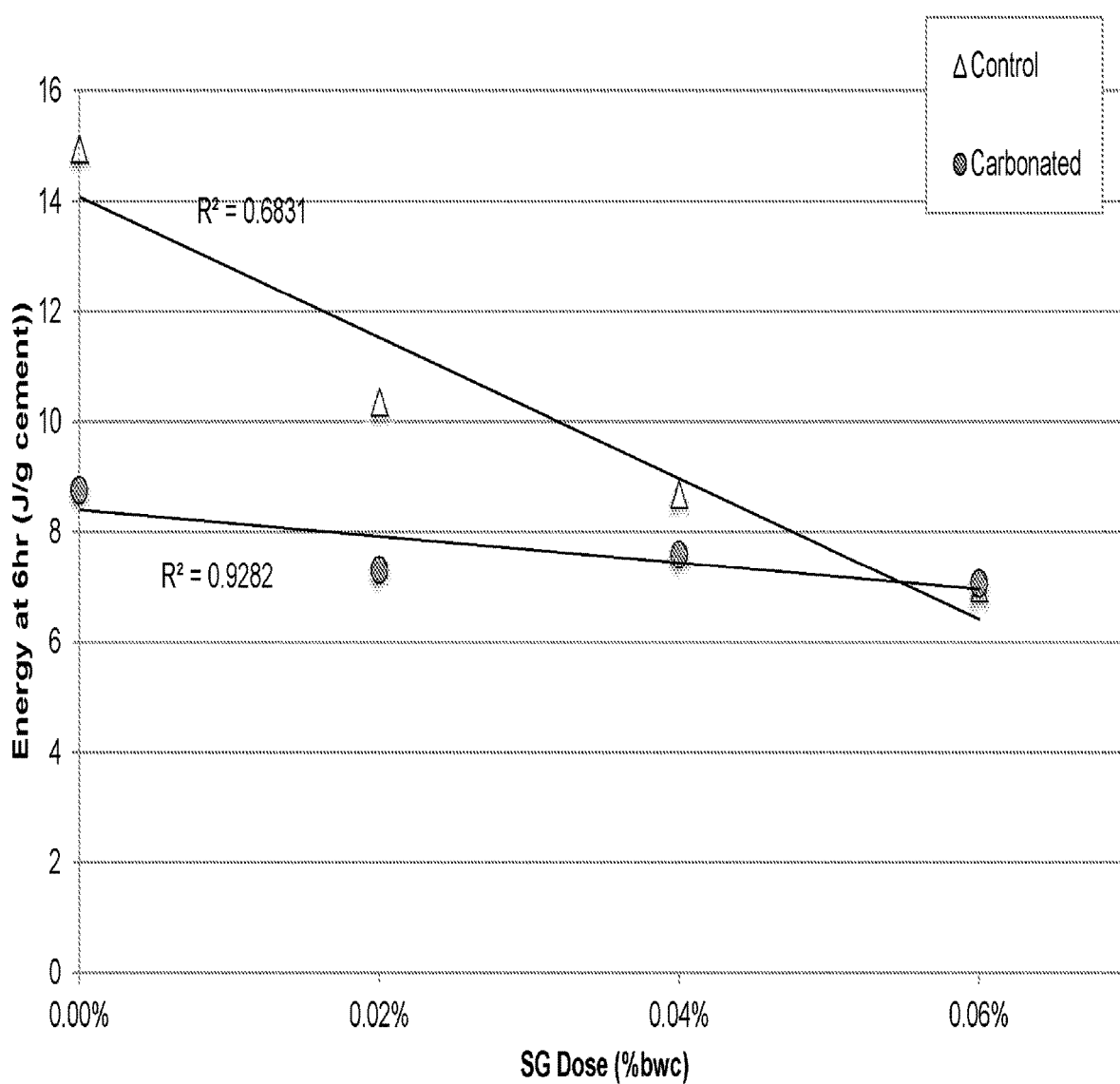
FIG. 71 shows 6 hour energy released related to sodium gluconate dose in carbonated and uncarbonated dry mix concrete.
Figure 72:
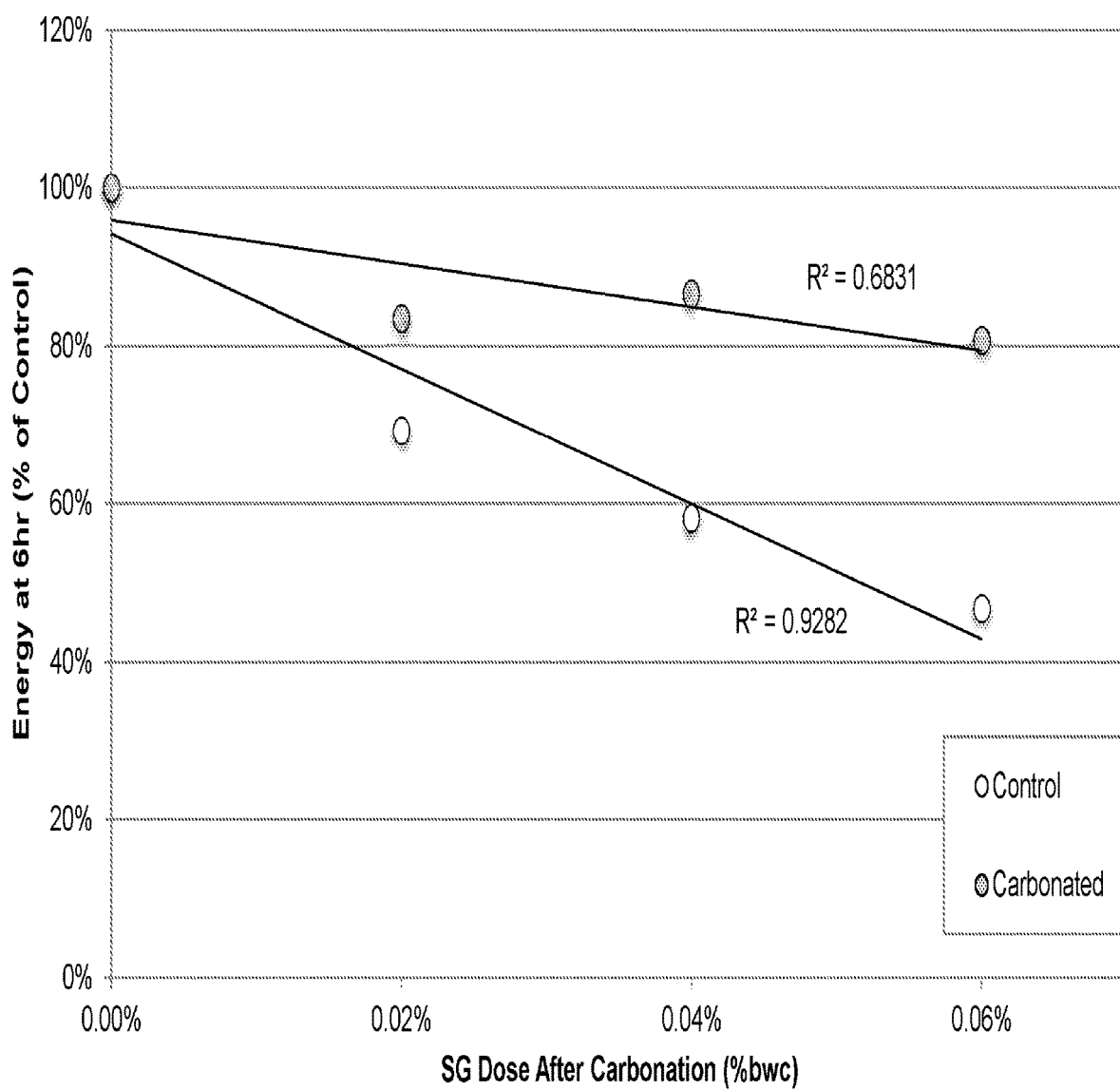
FIG. 72 shows the data of FIG. 71 normalized to control.

FIG. 68 shows the $CO_2$ uptake of carbonated specimens. The masses of the cylinders prepared, a proxy for density since all cylinder volumes are substantially the same, showed that carbonation resulted in an 8.4% mass deficit in comparison to the control, but that the addition of sodium gluconate increased the mass of the carbonated specimens, proportional to the dose, so that at a dose of 0.06% sodium gluconate, the mass deficit was reduced to 5.5%, whereas none of the three sodium gluconate doses had an effect on the compaction of the control samples. See FIGS. 69 and 70. Retardation was quantified through calorimetry by determining the amount of energy released through the first 6 hours following the mix start. Carbonation caused a decrease in energy released, as did the addition of sodium gluconate; in carbonated specimens the reduction in energy released was 19% at the highest sodium gluconate dose, whereas in uncarbonated specimens the reduction in energy released was 53% at the highest sodium gluconate dose. See FIGS. 71 and 72.

Example 27

This example demonstrates the effects of increasing free lime on carbon dioxide uptake and hydration.

Figure 73:
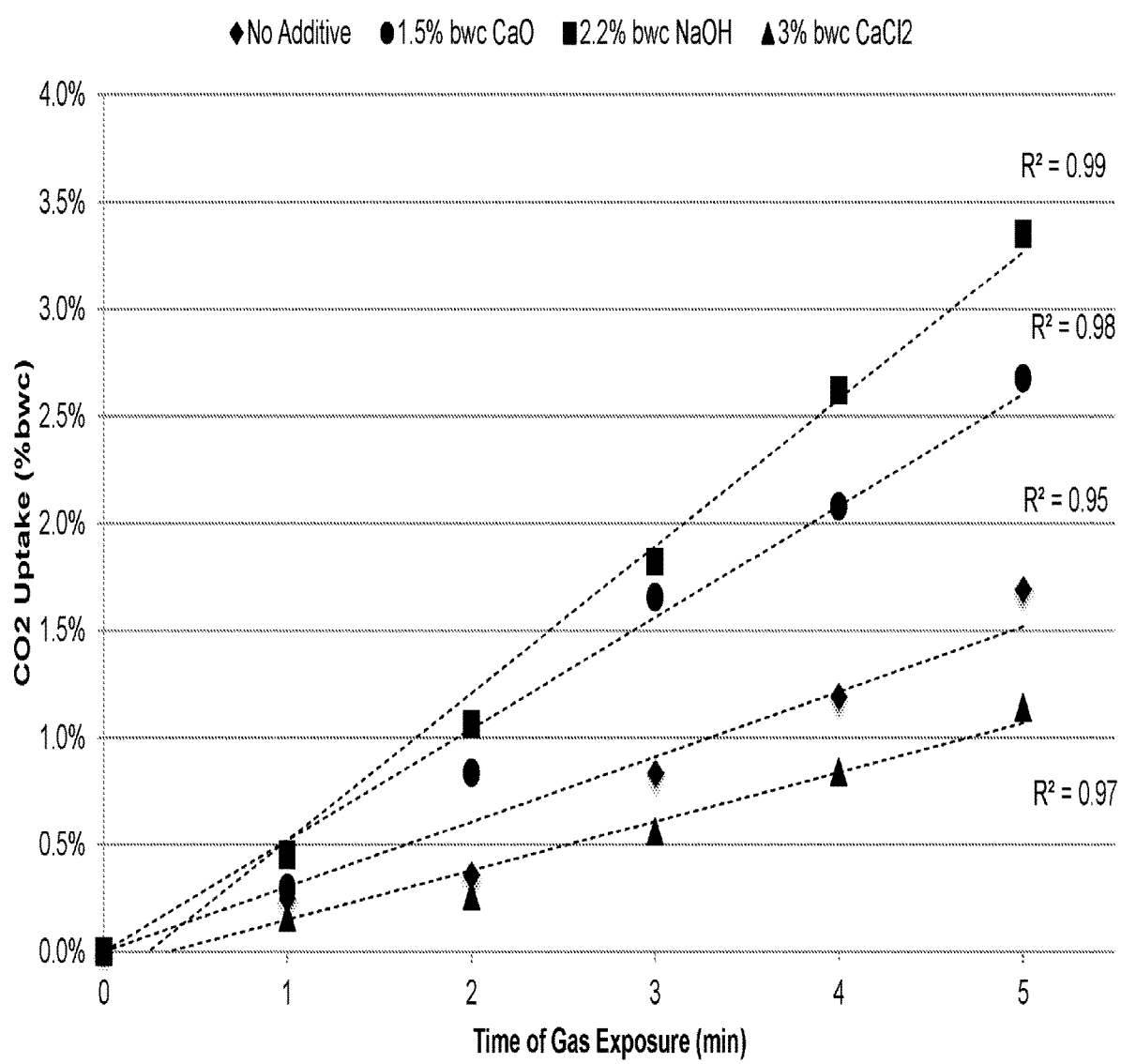
FIG. 73 shows rates of $CO_2$ uptake in mortars prepared with added CaO, NaOH, or CaCl2, or no additive.

In a first test, mortars were prepared with added CaO (1.5% bwc), NaOH (2.2% bwc), or $CaCl_2$ (3% bwc), carbonated, and compared to control. A standard mortar mix of 535 g cement, 2350 g sand, and 267.5 g water was used. The sand and water were combined and mixed for 30s, followed by cement addition (with added powder if used) and an additional 60s mixing. Initial temperature was recorded, then the mortar was mixed for 60s under 20 LPM $CO_2$ flow, mixing was stopped and temperature recorded and sample removed for $CO_2$ analysis, then mixing and $CO_2$ exposure was resumed for another 60s and sampling occurred, for a total of 5 min of $CO_2$ exposure. The results are shown in FIG. 73. Addition of the alkali species, free lime (CaO) or NaOH, increased the rate of $CO_2$ uptake, while the addition of $CaCl_2$ decreased the uptake rate. The rates of uptake were: 0.34% $CO_2$ uptake/min (no additive); 0.56% $CO_2$ uptake/min (CaO), a 66% increase; 0.69% $CO_2$ uptake/min (NaOH), a 104% increase; and 0.23% $CO_2$ uptake/min (CaCl2), a 34% decrease.

In a second test, two test mortars were compared, one conventional mortar and one that included an addition of 1.5% CaO bwc. The mortar mixes were as in the first test. The cement used had a free lime content of 0.31% bwc before addition of extra CaO; this is considered to be a low free lime level. The mixing mortar was subjected to 0, 30, 60, or 90s of $CO_2$ at 20 LPM, and hydration was measured by calorimetry. Energy release was followed up to 24 hours at 6 hour intervals.

Figure 75:
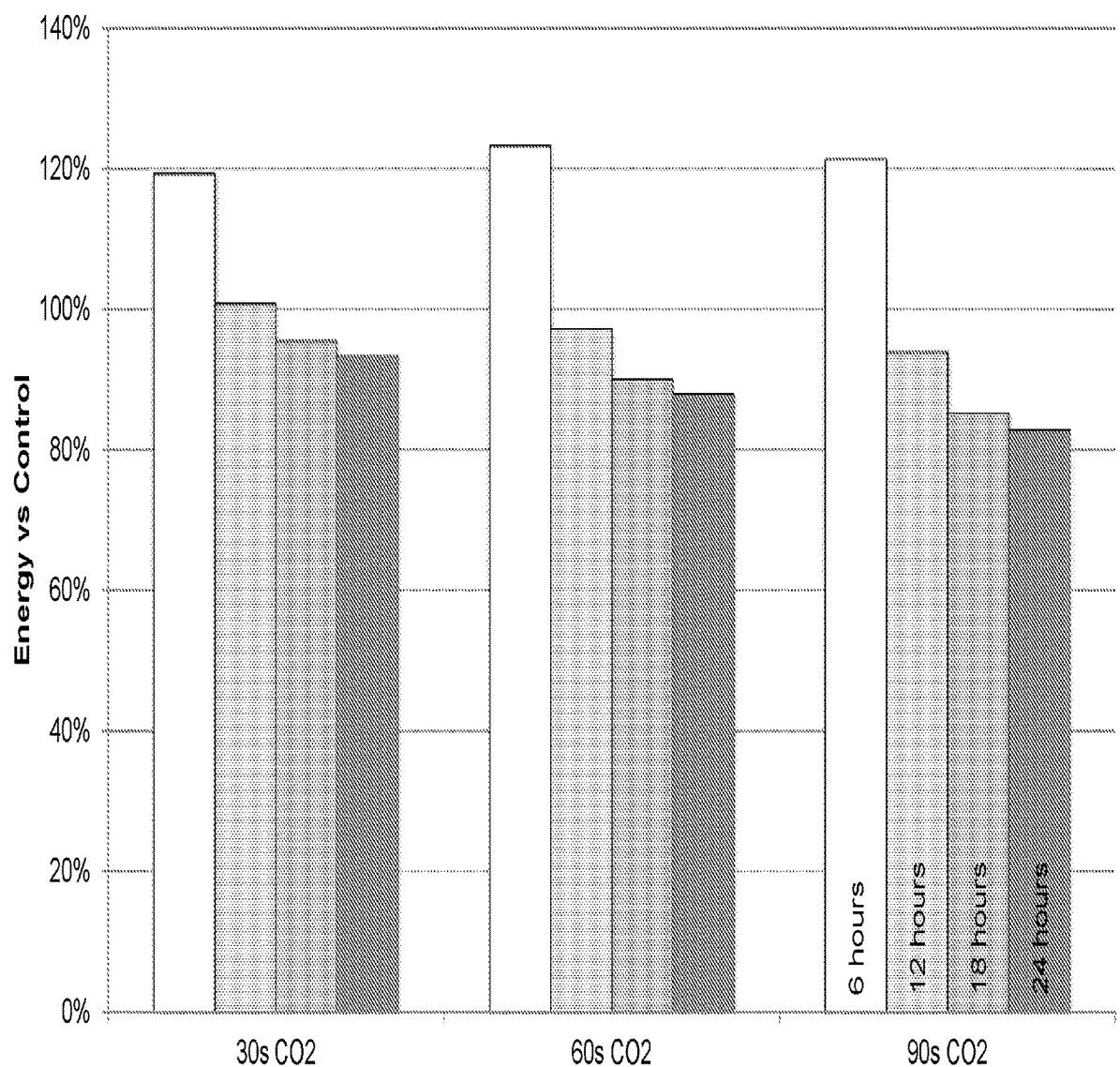
FIG. 75 shows relative comparison of energy released by mortar mixes with no added CaO subjected to carbonation, compared to uncarbonated control.
Figure 76:
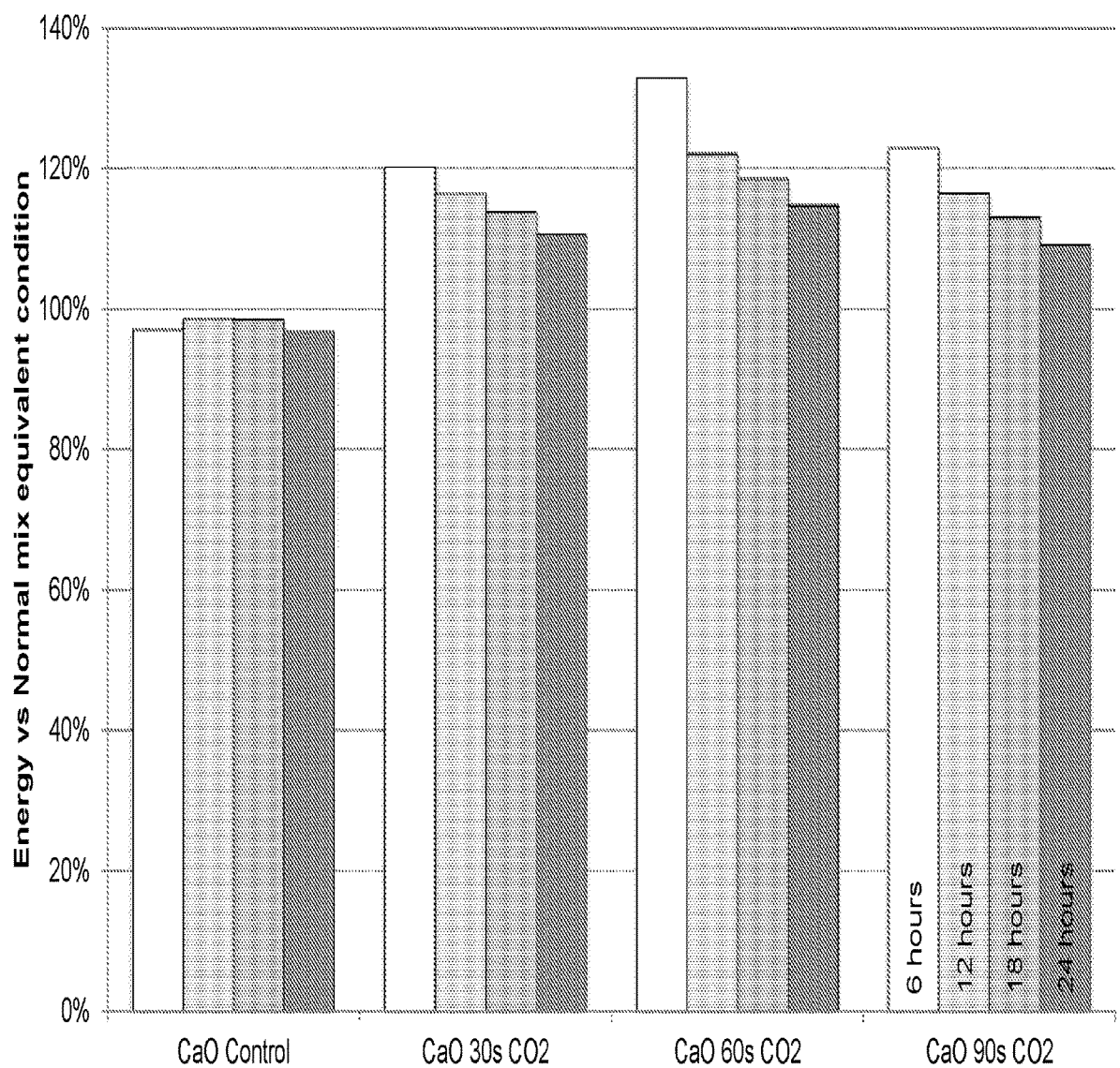
FIG. 76 shows a relative comparison of energy released by CaO-doped mortar mixes exposed to carbon dioxide for various times, compared to mortar mixes with no added CaO exposed to carbon dioxide for the same time periods.

The results are presented in FIG. 74. When control (no CaO addition) carbonated vs. uncarbonated mortars were compared, energy release with 30s $CO_2$ was 19% greater in the carbonated compared to uncarbonated at 6 hours, declining to 7% lower at 24 hours; energy release with 60s $CO_2$ was 23% greater in the carbonated compared to uncarbonated at 6 hours, declining to 12% lower at 24 hours; energy release with 90s $CO_2$ was 21% greater in the carbonated compared to uncarbonated at 6 hours, declining to 17% lower at 24 hours. See FIG. 75. In general, addition of CaO to the mix both increased $CO_2$ uptake for a given time of exposure, and increased the energy release at a given time point, compared to samples without CaO addition. When compared to a control mortar that contained no added CaO, mortars with added CaO showed energy release at 97-99% of control at all time points in uncarbonated samples; in samples exposed to 30s $CO_2$, mortars with added CaO showed energy release 20% higher than mortars with no added CaO at 6 hours, decreasing to 11% higher at 24 hours, and $CO_2$ uptake was 56% greater than in mortars with no added CaO; in samples exposed to 60s $CO_2$, mortars with added CaO showed energy release 33% higher than mortars with no added CaO at 6 hours, decreasing to 15% higher at 24 hours, and uptake was 151% greater than in mortars with no added CaO; in samples exposed to 90s $CO_2$, mortars with added CaO showed energy release 23% higher than mortars with no added CaO at 6 hours, decreasing to 9% higher at 24 hours, and uptake was 151% greater than in mortars with no added CaO. See FIG. 76.

This example demonstrates that free lime (CaO) addition to a mortar both improves the rate of carbon dioxide uptake as well as hydration, when compared to mortar without added free lime Examples 28-32 are directed to delivery of low doses of carbon dioxide to ready mix trucks, as a gas (Example 27) or liquid that converts to solid and gas (Examples 29-32), under various conditions.

Example 28

This example is an illustration of low dose of gaseous carbon dioxide treatment of a concrete mix in the drum of a ready mix truck at a time significantly after the batching of the concrete, and its effects on early strength.

The carbon dioxide was dosed into the drum of a ready mix truck. Carbon dioxide was gaseous. The carbon dioxide was added to the mix beginning approximately 70 min after batching, in multiple stages to give a concrete mix with increasingly greater doses of carbon dioxide so that the final addition was approximately 135 min post batching. Thus the dosing of $CO_2$ was well after mixing started, akin to supplying $CO_2$ to a truck in transit or at a job site rather than during batching.

Mix design was 30 MPa slab mix, 2 m³ load, truck less than half full
Sand 1930 kg
Stone 2240 kg
GU Cement 630 kg
Water 238 kg Admixes were added at the test site prior to any sampling—defoamer 0.10% bwc, superplasticizer (Mighty ES) 0.10% bwc. Mighty ES was increased for final sample.

$CO_2$ was added to the drum from a gas tank with a regulator. Flow was ~80 LPM for 2 minutes for each $CO_2$ dose. Line Pressure was 70 psi. Truck faster mix (25 RPM) "post dose" for ~60s. Transit mix (slow, 5 RPM) remaining time.

Dosing was in a serial fashion on the same batch of concrete-dose, sample, next dose, sample, next dose, etc.

Time of discharge indicates when concrete was sampled. Dosing would have occurred within the five minutes immediately preceding.

Table 23 shows the conditions for each sample:

TABLE 23

| Conditions for various samples of low dose carbon dioxide | | | | | | | |
|---|---|---|---|---|---|---|---|
| Sample ID | Control | CO2-1 | CO2-2 | CO2-3 | CO2-4 | CO2-5 | CO2-6 |
| Time of Discharge (min) | 74 | 79 | 93 | 101 | 115 | 124 | 139 |
| Total $CO_2$ Dose (% bwc) | 0 | 0.05% | 0.10% | 0.15% | 0.20% | 0.25% | 0.30% |
| Temperature (° C.) | 14.7 | 16.4 | 16.7 | 18 | 18.4 | 18.5 | 18.7 |
| Slump (inches) | 3.5 | 3.5 | 3.5 | 3 | 3 | 1.5 | 2 |
| Air Content (%) | 1.5 | n/a | n/a | n/a | n/a | n/a | n/a |
| Defoamer (% bwc) | 0.10% | 0.10% | 0.10% | 0.10% | 0.10% | 0.10% | 0.10% |
| Mighty ES (% bwc) | 0.10% | 0.10% | 0.10% | 0.10% | 0.10% | 0.10% | 0.15% |
| $CO_2$ Uptake (% bwc) | — | | | inconclusive | | | |

Figure 77A:
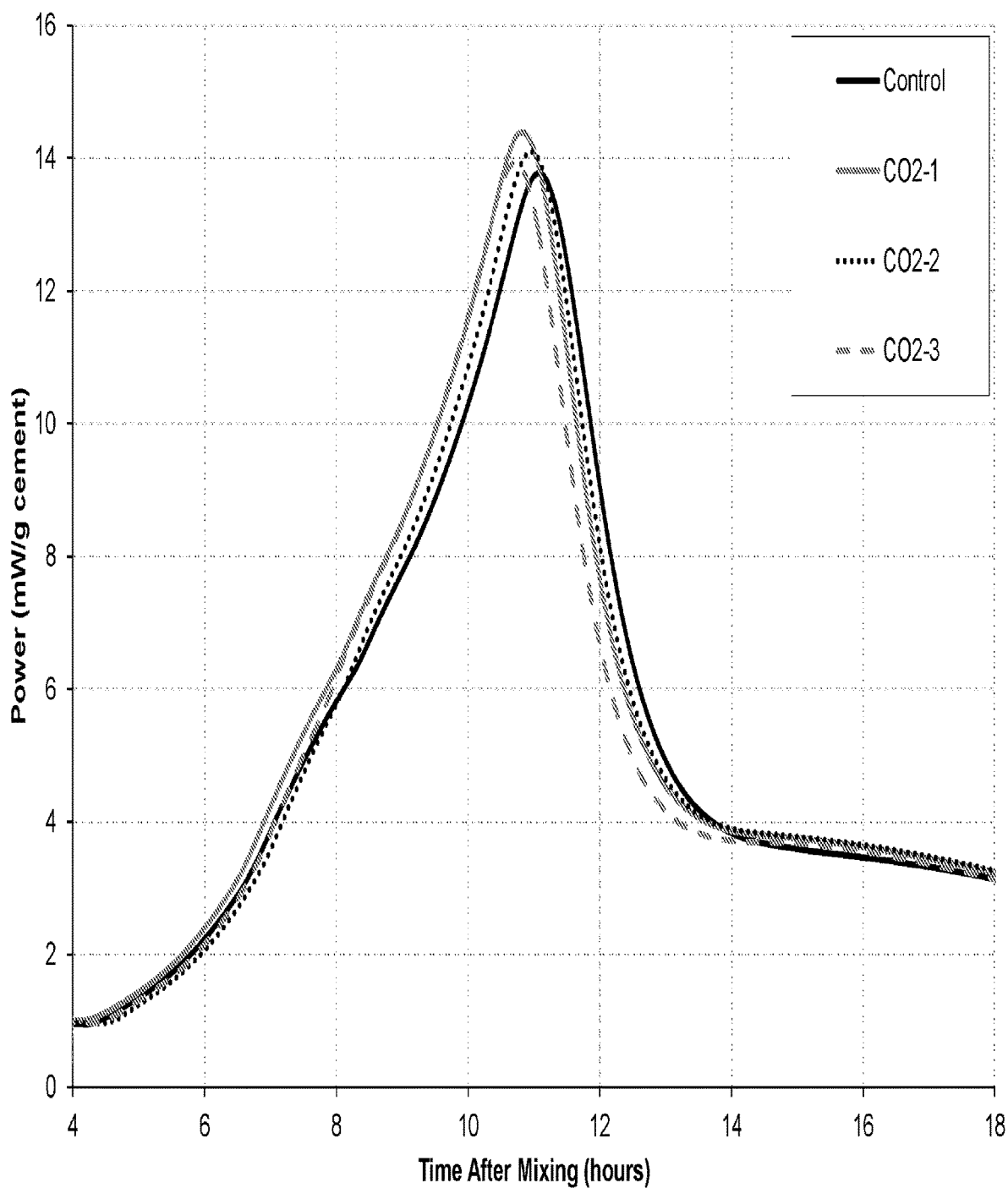
FIG. 77A shows calorimetry data for the CO2-1, -2, and -3 mixes of Example 28, and uncarbonated control, power vs. time.
Figure 78A:
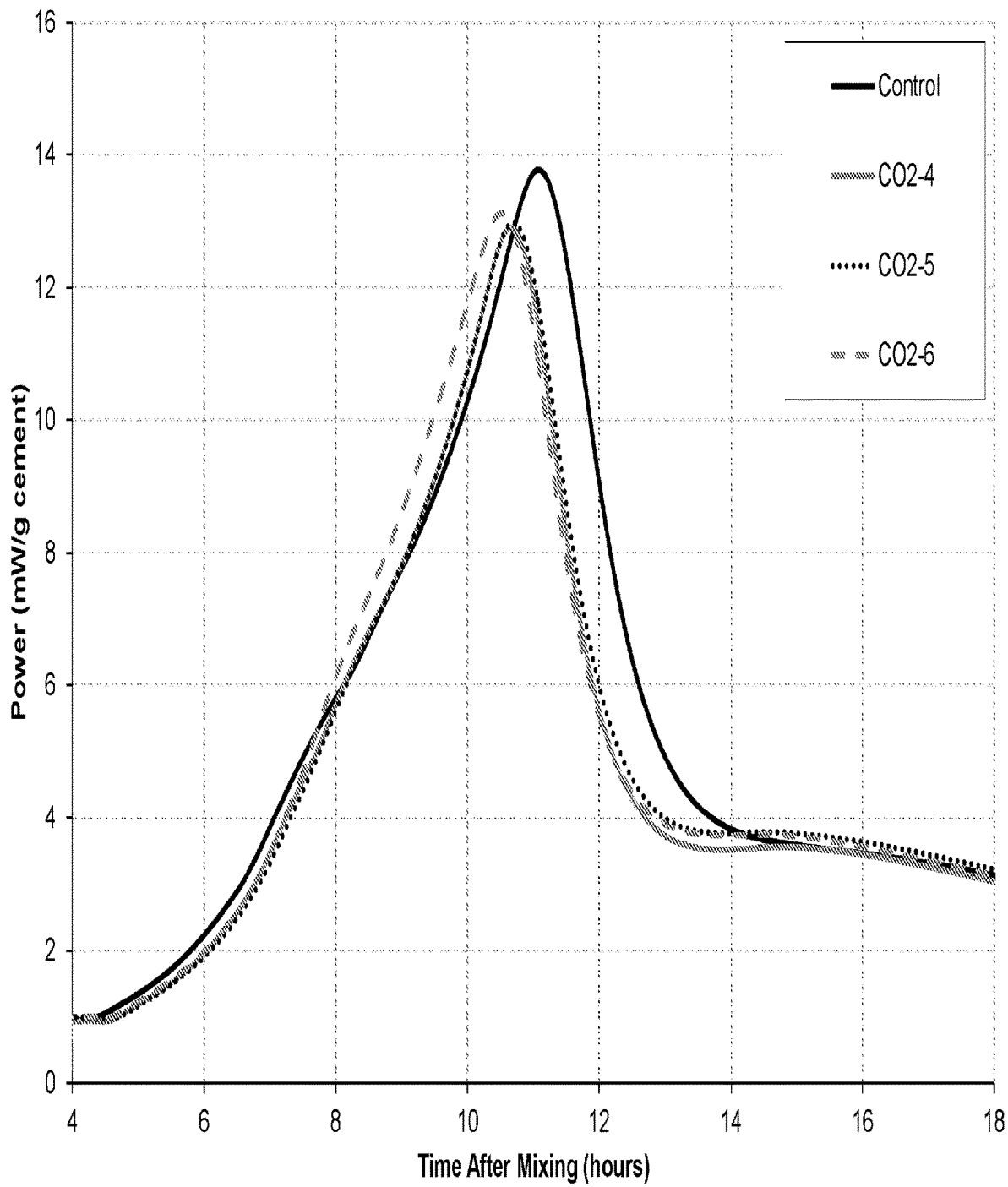
FIG. 78A shows calorimetry data for the CO2-4, -5, and -6 mixes of Example 28, and uncarbonated control, power vs. time.

12-hour, 16-hour, 24-hour, 7-day, 28-day strengths are shown in Tables 24 (absolute values) and 25 (values relative to control, uncarbonated concrete). Three specimens were taken at each age as 4"×8" cylinders with reusable end caps. Specimens were kept in moist curing storage until testing calorimetry data is shown in FIGS. 77A (power vs. time) and 77B (energy vs. time) for Control, CO2-1, 2, and 3 and in FIGS. 78A (power vs. time) and 78B (energy vs. time) for Control, CO2-4, 5, and 6.

TABLE 24

Compressive strengths, absolute (MPa)

| ID | Control | CO2-1 | CO2-2 | CO2-3 | CO2-4 | CO2-5 | CO2-6 |
|---|---|---|---|---|---|---|---|
| 12 hr | 1.7 | 2.0 | 2.0 | 2.7 | 2.7 | 2.4 | 2.9 |
| 16 hr | 5.9 | 6.4 | 6.0 | 6.5 | 6.8 | 6.0 | 6.5 |
| 24 hr | 12.8 | 13.3 | 13.3 | 13.5 | 13.7 | 13.5 | 13.9 |
| 7 d | 31.5 | 31.7 | 31.3 | 33.1 | 32.9 | 32.6 | 33.1 |
| 28 d | 37.3 | 37.9 | 38.7 | 38.0 | 38.9 | 38.7 | 39.1 |

TABLE 25

Compressive strengths, relative to uncarbonated

| ID | Control | CO2-1 | CO2-2 | CO2-3 | CO2-4 | CO2-5 | CO2-6 |
|---|---|---|---|---|---|---|---|
| 12 hr | 100% | 123% | 119% | 166% | 163% | 145% | 174% |
| 16 hr | 100% | 109% | 103% | 111% | 116% | 102% | 110% |
| 24 hr | 100% | 104% | 104% | 105% | 107% | 105% | 109% |
| 7 d | 100% | 101% | 100% | 105% | 105% | 104% | 105% |
| 28 d | 100% | 101% | 104% | 102% | 104% | 104% | 105% |

The set also slightly accelerated in highest $CO_2$ dose.

The results show that in all cases, even at the lowest dose of CO2 (0.05% CO2 delivered, bwc), there was an increase in early strength. In general, the strength benefit of $CO_2$ broadly corresponded to increasing dose. The benefit was most pronounced at the earliest ages, thought there was still a small benefit at 7 and 28 days.

This example demonstrates that very low doses of carbon dioxide, added to concrete mixes after batching, cause marked increases in early strength development. This was true even for the lowest dose of carbon dioxide, 0.05%; at such low doses carbonation of the concrete may not be detectable, but nonetheless the carbon dioxide is acting in a manner similar to an admixture, in this case as a potent accelerant of early strength development.

Example 29

This example is an illustration of low dose of gaseous and solid carbon dioxide treatment of concrete in the drum of a ready mix truck, from a liquid source of carbon dioxide, at a time significantly after the batching of the concrete, and its effects on early strength.

The 30 MPa slab mix design of Example 28 was used. 2 cubic meters of concrete were produced, truck was less than half full. Admixes added at test site TK-ADVA 140 superplasticizer 0.20% bwc, sodium gluconate 0.05% bwc.

The $CO_2$ supplied as a liquid, from a dewar with a hose attached with a fitting on the end and an orifice of defined size, 5/64 inch. The dosing was calculated based on a series of assumptions and is approximate. The assumptions were: 1) that the carbon dioxide was 100% liquid in the line upstream of the orifice, i.e., no phase 2 flow; 2) the flow was based on an equation (not directly measured); and 3) that there was no pressure drop in the line, that it was a constant 300 psi. The tube was directed into the drum of the ready mix truck so as to deliver the gaseous and solid carbon dioxide to the surface of the mixing concrete.

Table 26 shows the conditions for each sample. Staged dosing was performed, with the first dose was delivered approximately 45 min after batching, and the final dose approximately 110 min after batching. Thus, as with Example 28, dosing with $CO_2$ was well after mixing started, akin to supplying $CO_2$ to a truck in transit or at a job site rather than during batching.

TABLE 26

Conditions for each sample

| Sample ID | Control | CO2-1 | CO2-2 | CO2-3 | CO2-4 | CO2-5 | CO2-6 |
|---|---|---|---|---|---|---|---|
| Time of Discharge (min) | 28 | 48 | 63 | 78 | 88 | 99 | 113 |
| Total $CO_2$ Dose (% bwc) | 0 | 0.10% | 0.20% | 0.30% | 0.40% | 0.50% | 0.60% |
| Temperature (° C.) | 19.5 | 20.7 | 20.8 | 21.2 | 21.5 | 22.3 | 23.2 |
| Slump (inches) | 7 | 4.5 | 3.75 | 4 | 3 | 2.75 | 2 |
| Air Content (%) | 1.8 | — | — | — | — | — | 1.8 |
| $CO_2$ Uptake (% bwc) | 0.00 | −0.09 | 0.01 | −0.01 | 0.01 | 0.07 | 0.10 |

Figure 79A:
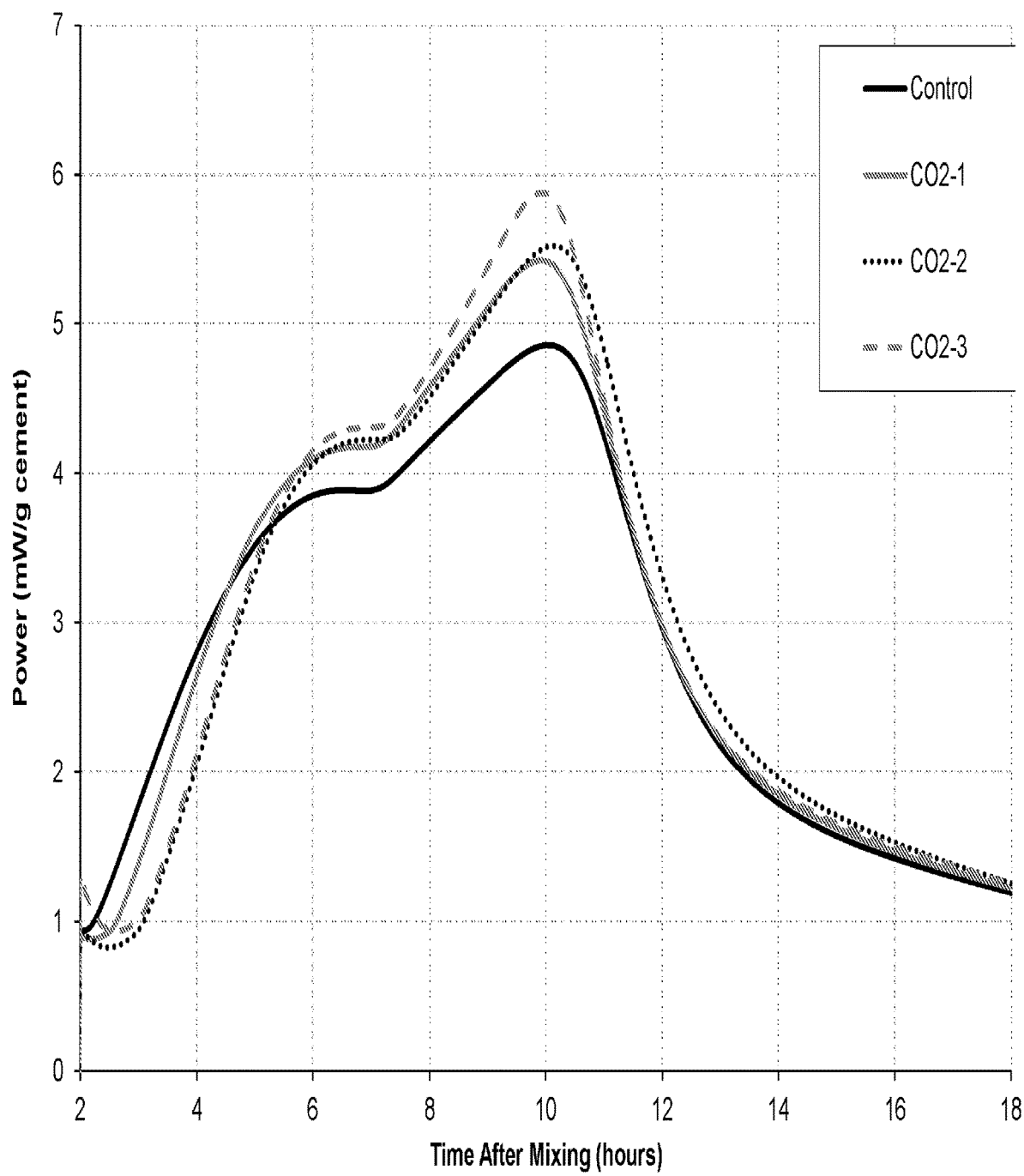
FIG. 79A shows calorimetry data for the CO2-1, -2, and -3 mixes of Example 29, and uncarbonated control, power vs. time.
Figure 79B:
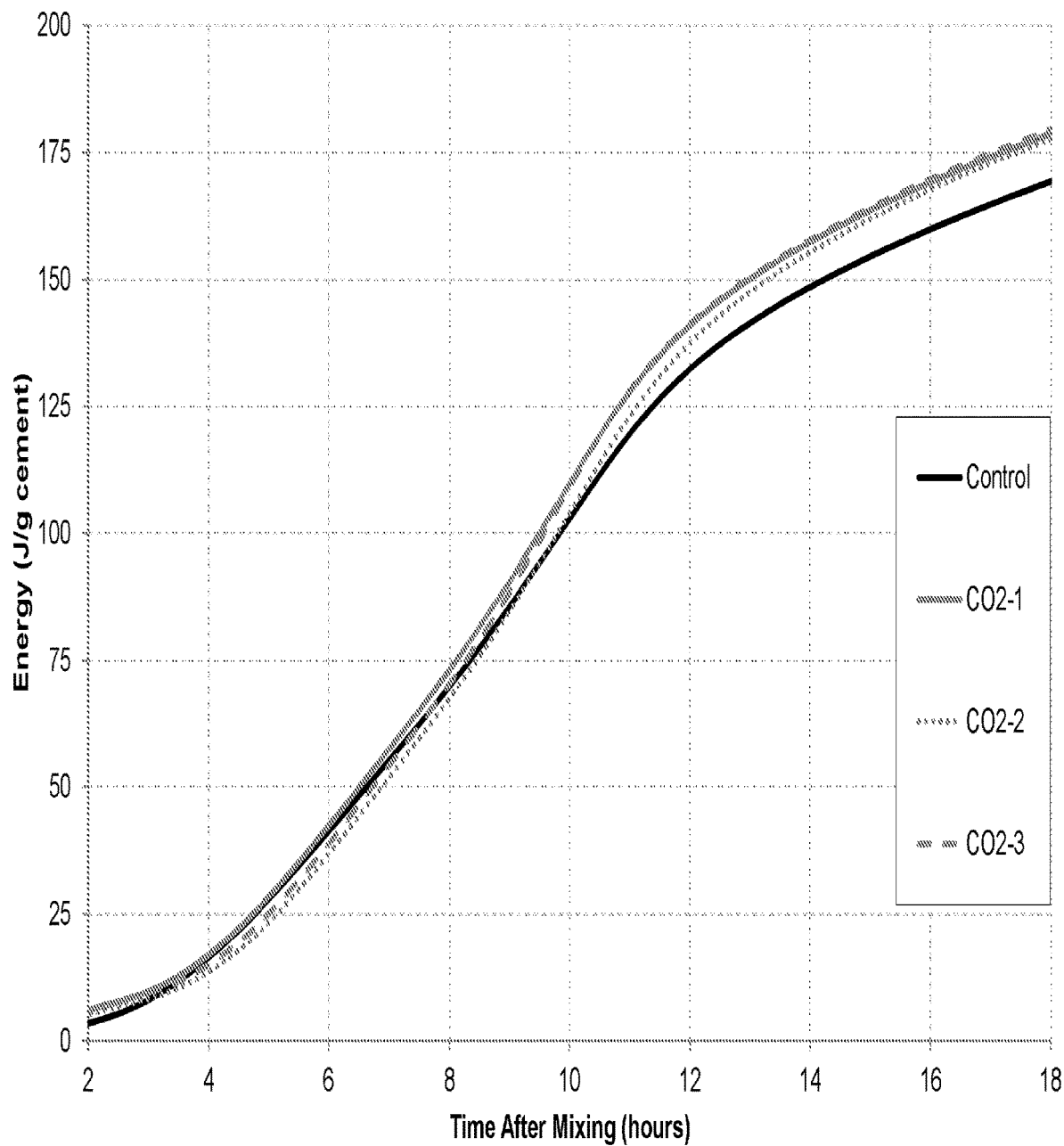
FIG. 79B shows calorimetry data for the CO2-1, -2, and -3 mixes of Example 29, and uncarbonated control.
Figure 80A:
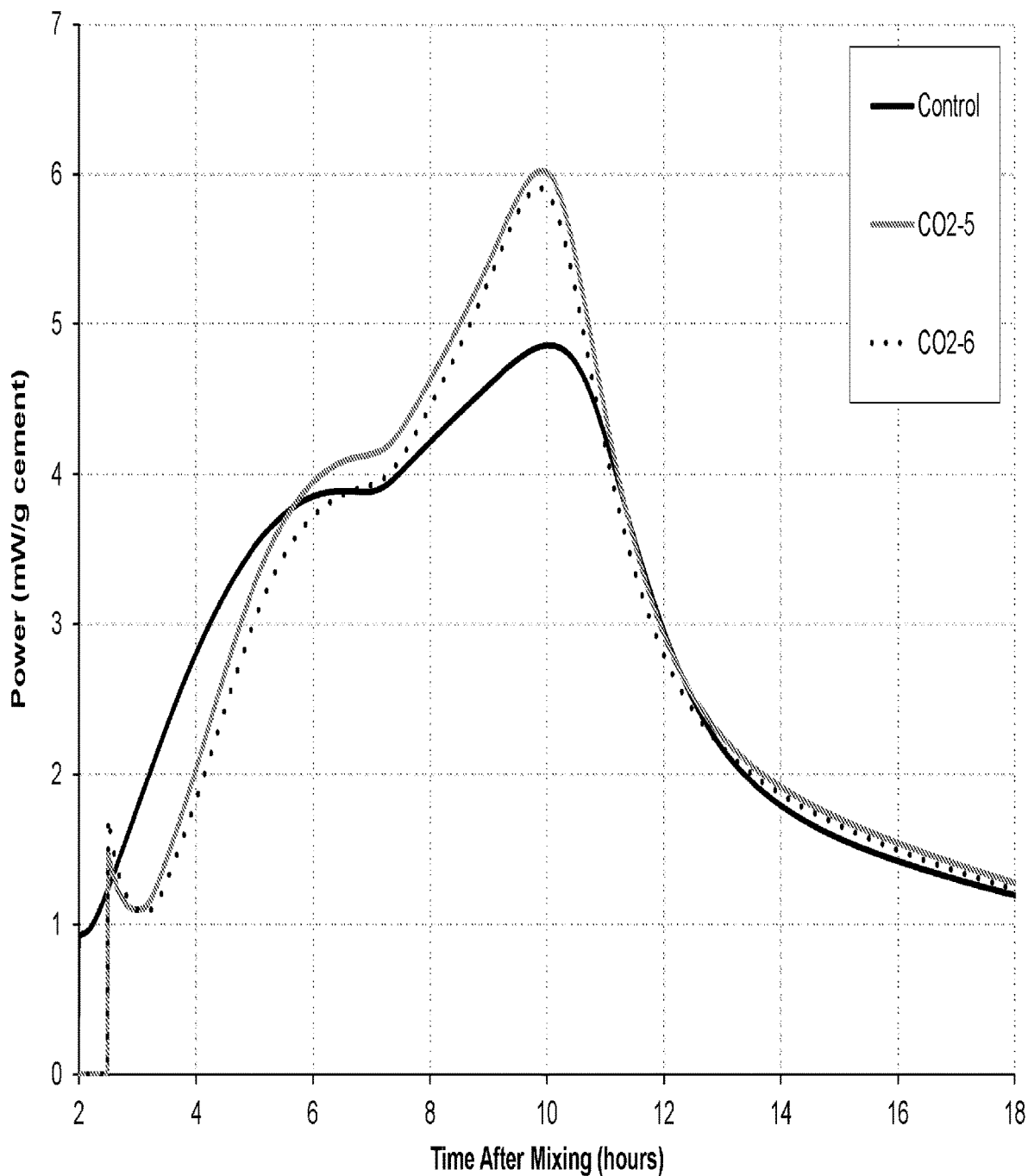
FIG. 80A shows calorimetry data for the CO2-5,and -6 mixes of Example 29, and uncarbonated control, power vs. time.
Figure 82:
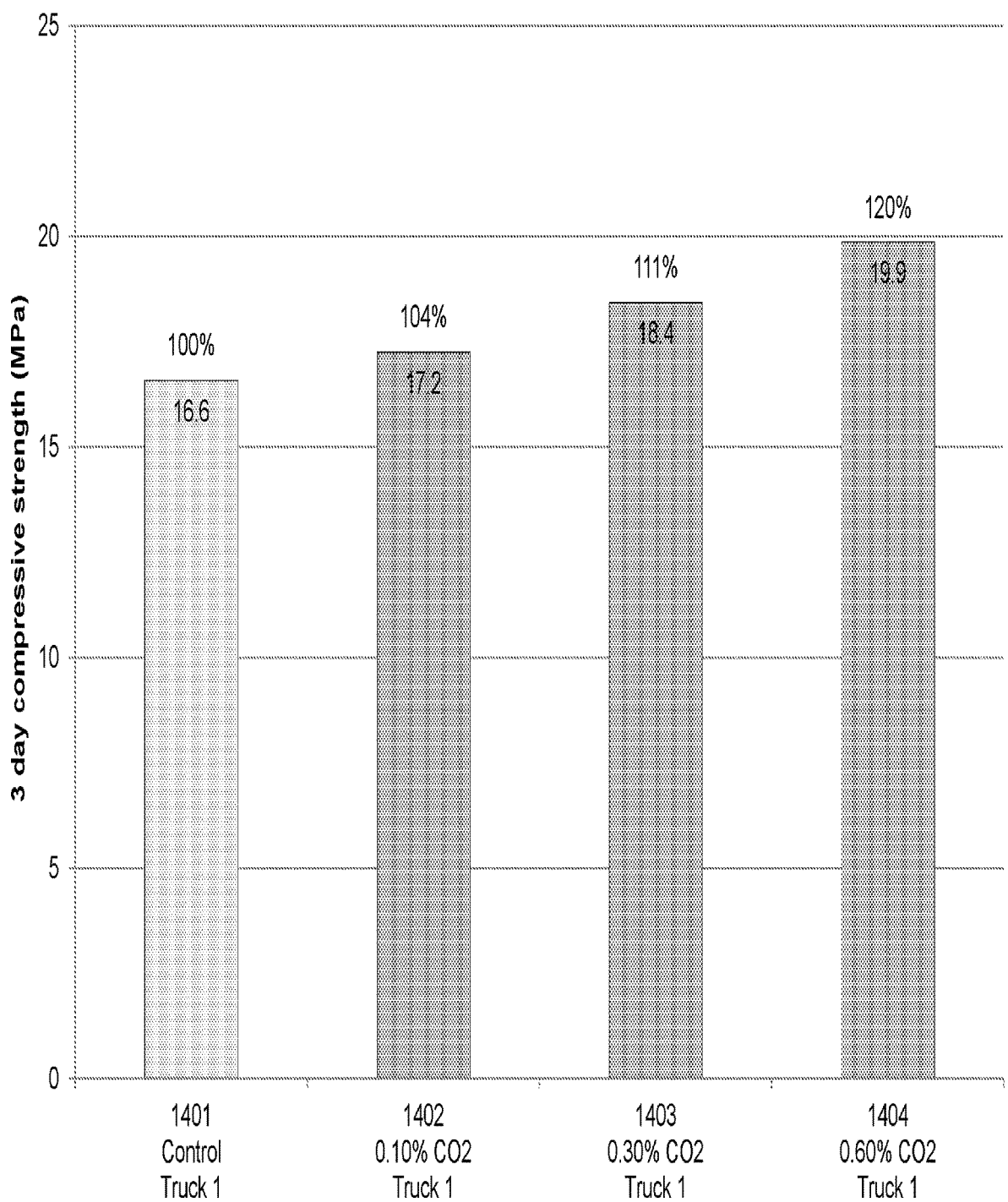
FIG. 82 shows compressive strengths at 3 days for control and three different doses of carbon dioxide of the first day of the trial of Example 30.
Figure 83:
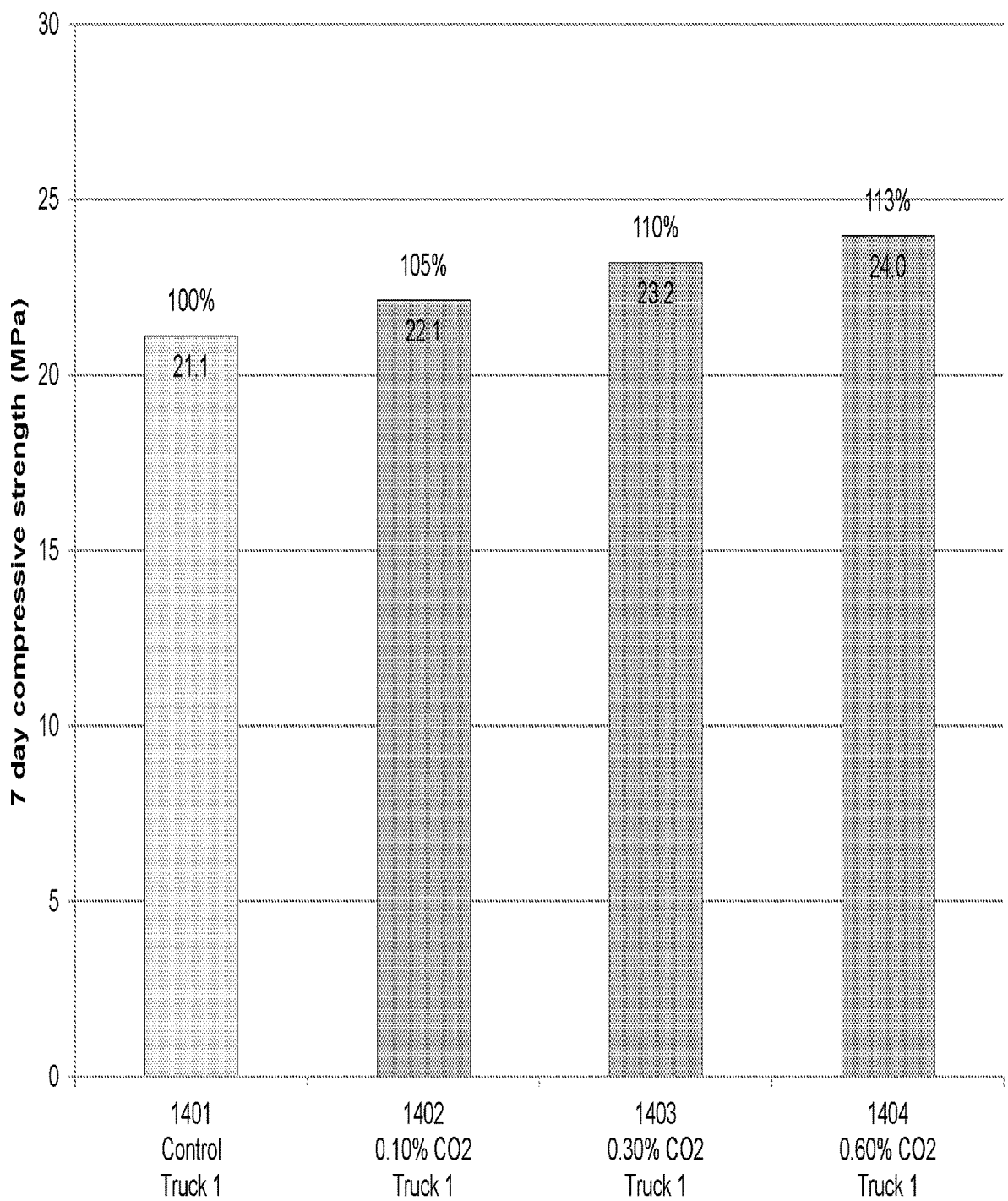
FIG. 83 shows compressive strengths at 7 days for control and three different doses of carbon dioxide of the first day of the trial of Example 30.
Figure 84:
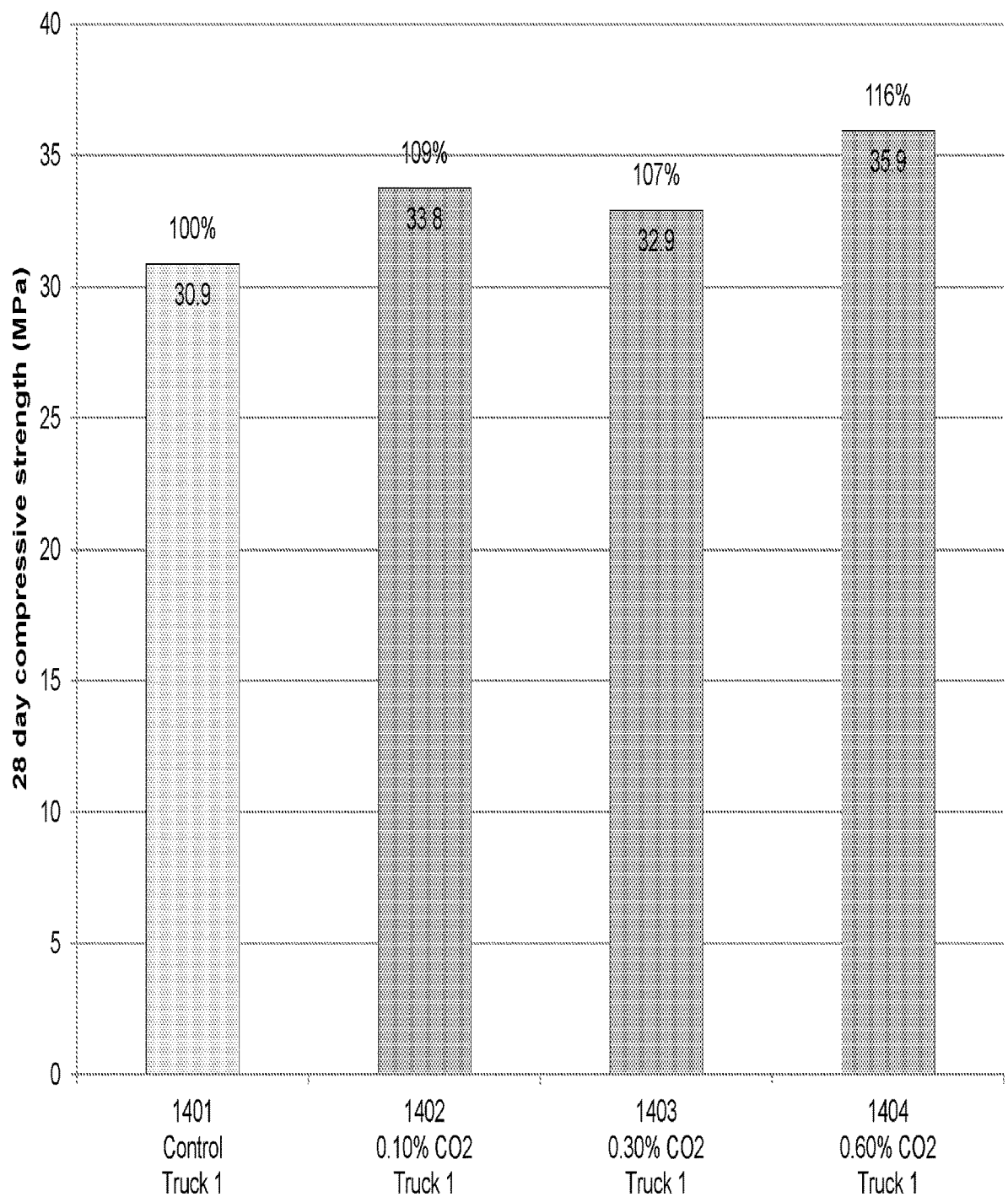
FIG. 84 shows compressive strengths at 28 days for control and three different doses of carbon dioxide of the first day of the trial of Example 30.
Figure 85:
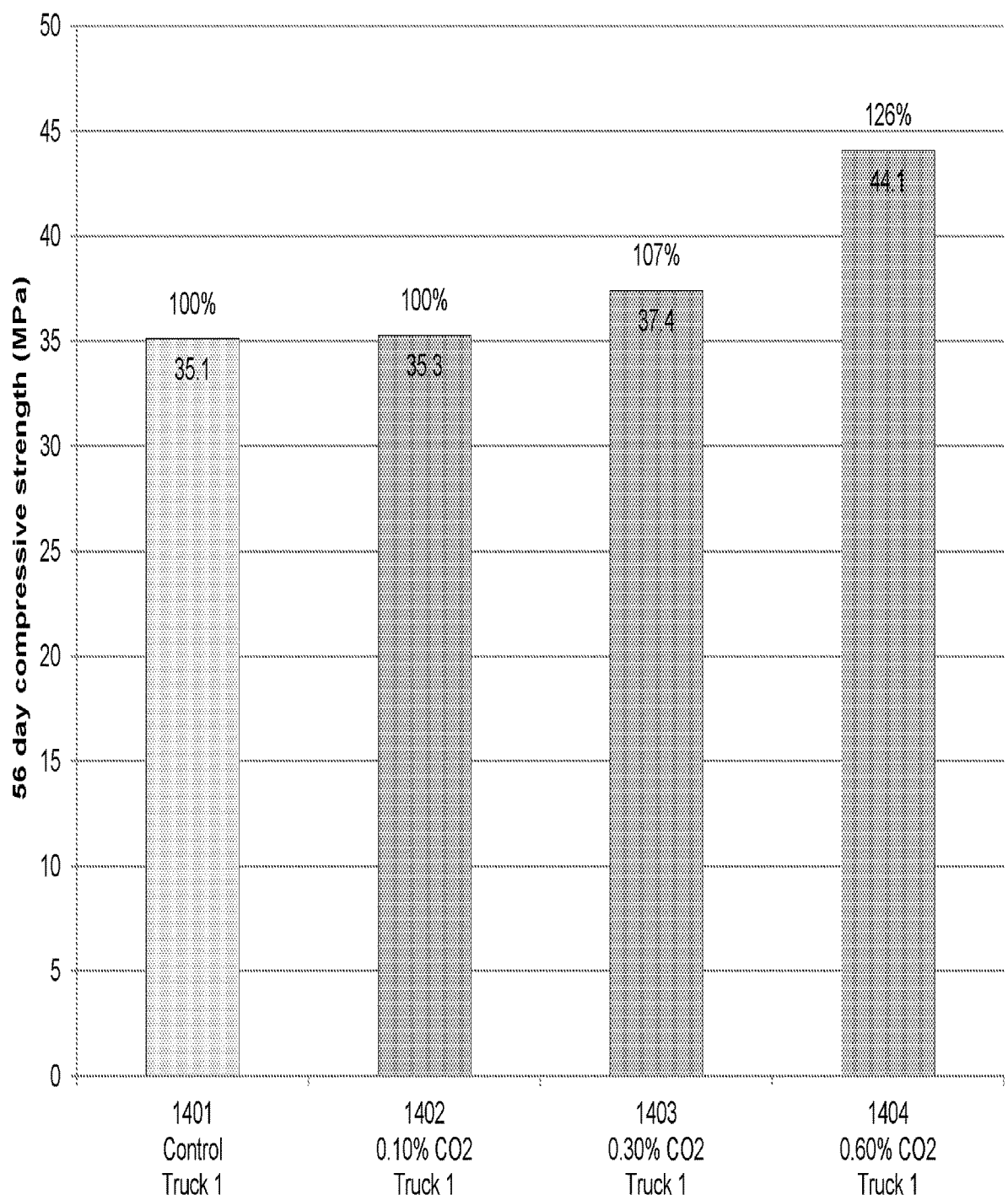
FIG. 85 shows compressive strengths at 56 days for control and three different doses of carbon dioxide of the first day of the trial of Example 30.
Figure 87:
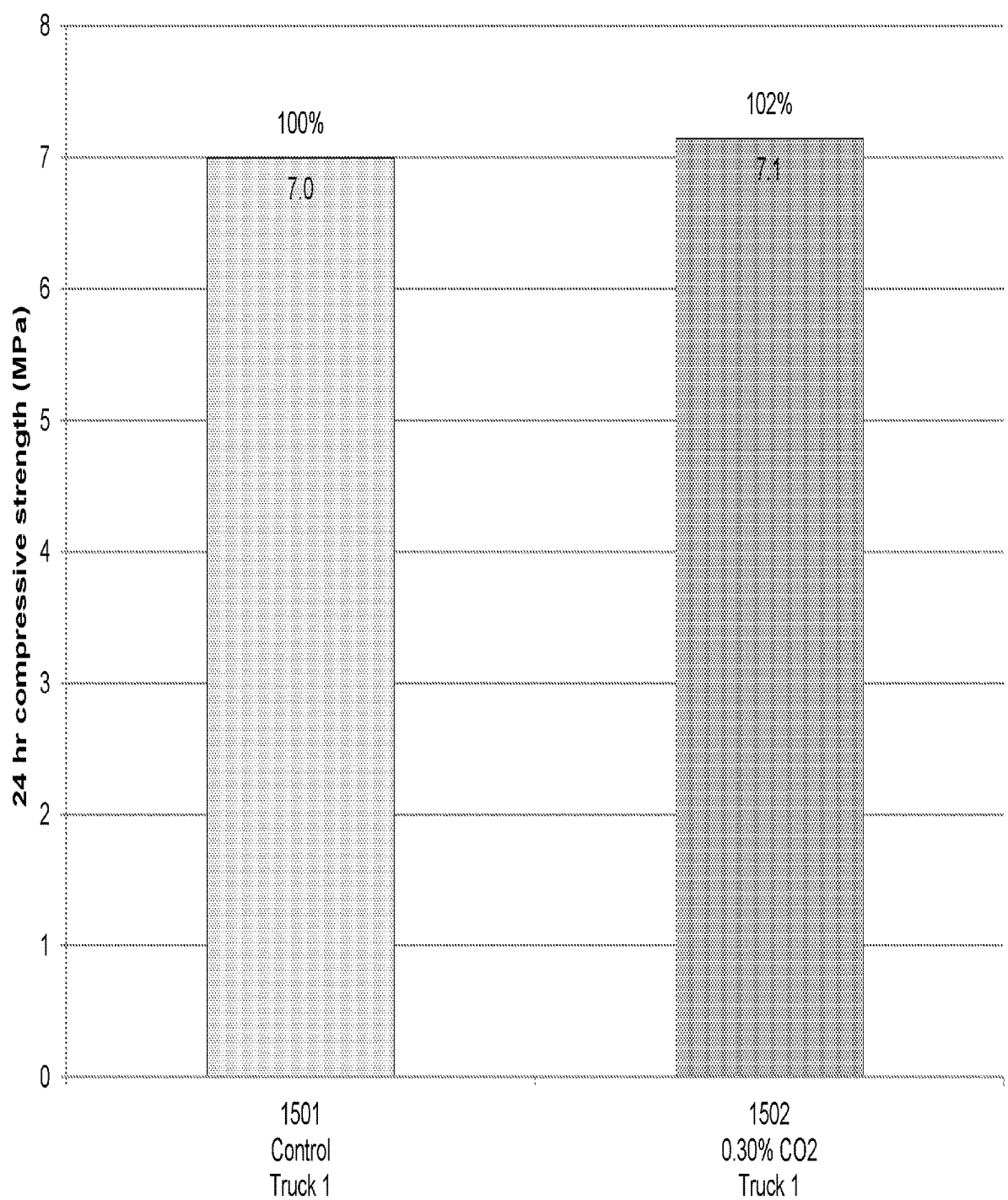
FIG. 87 shows compressive strengths at 24 hours for control and one dose of carbon dioxide of the second day of the trial of Example 30.
Figure 88:
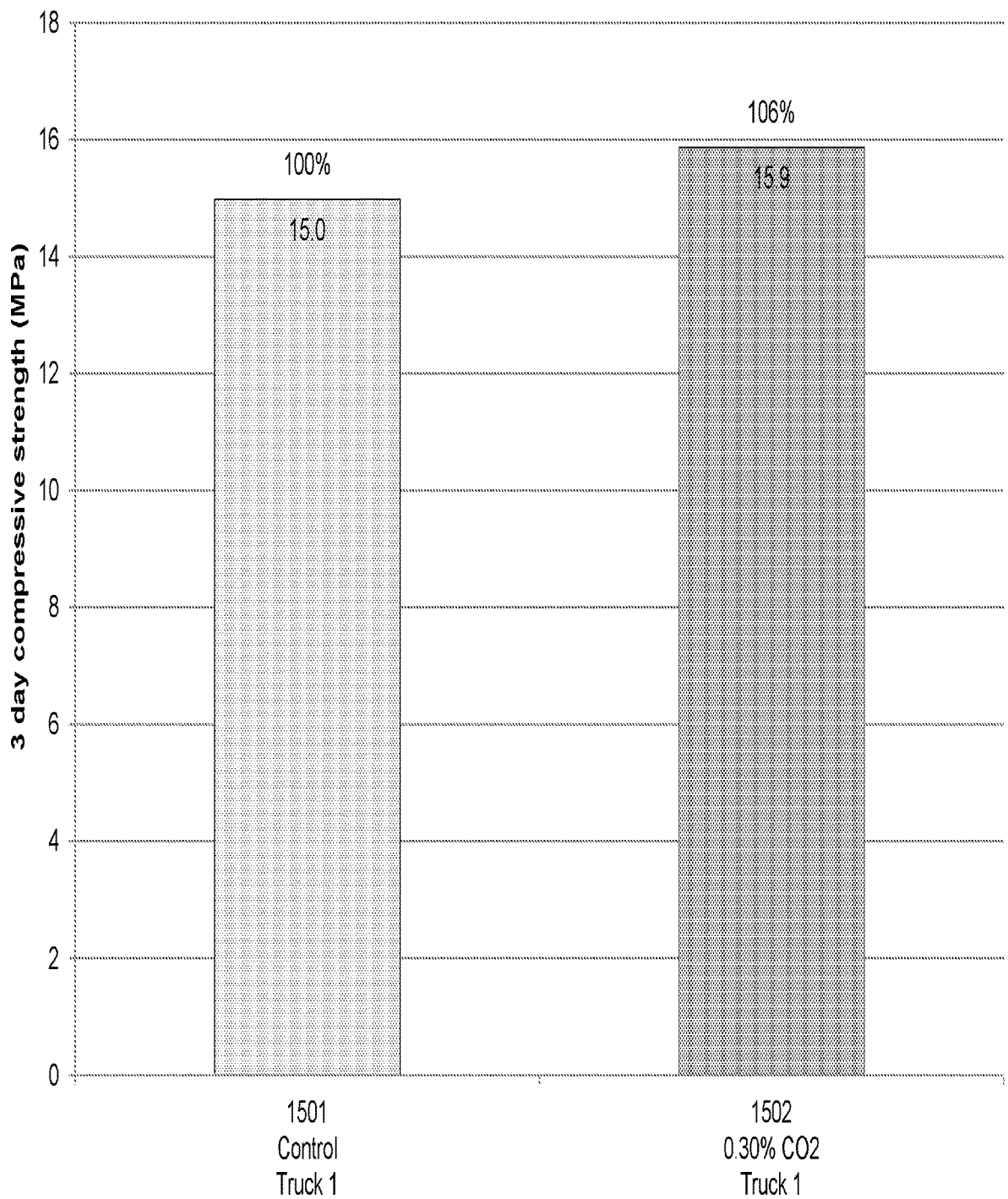
FIG. 88 shows compressive strengths at 3 days for control and one dose of carbon dioxide of the second day of the trial of Example 30.
Figure 89:
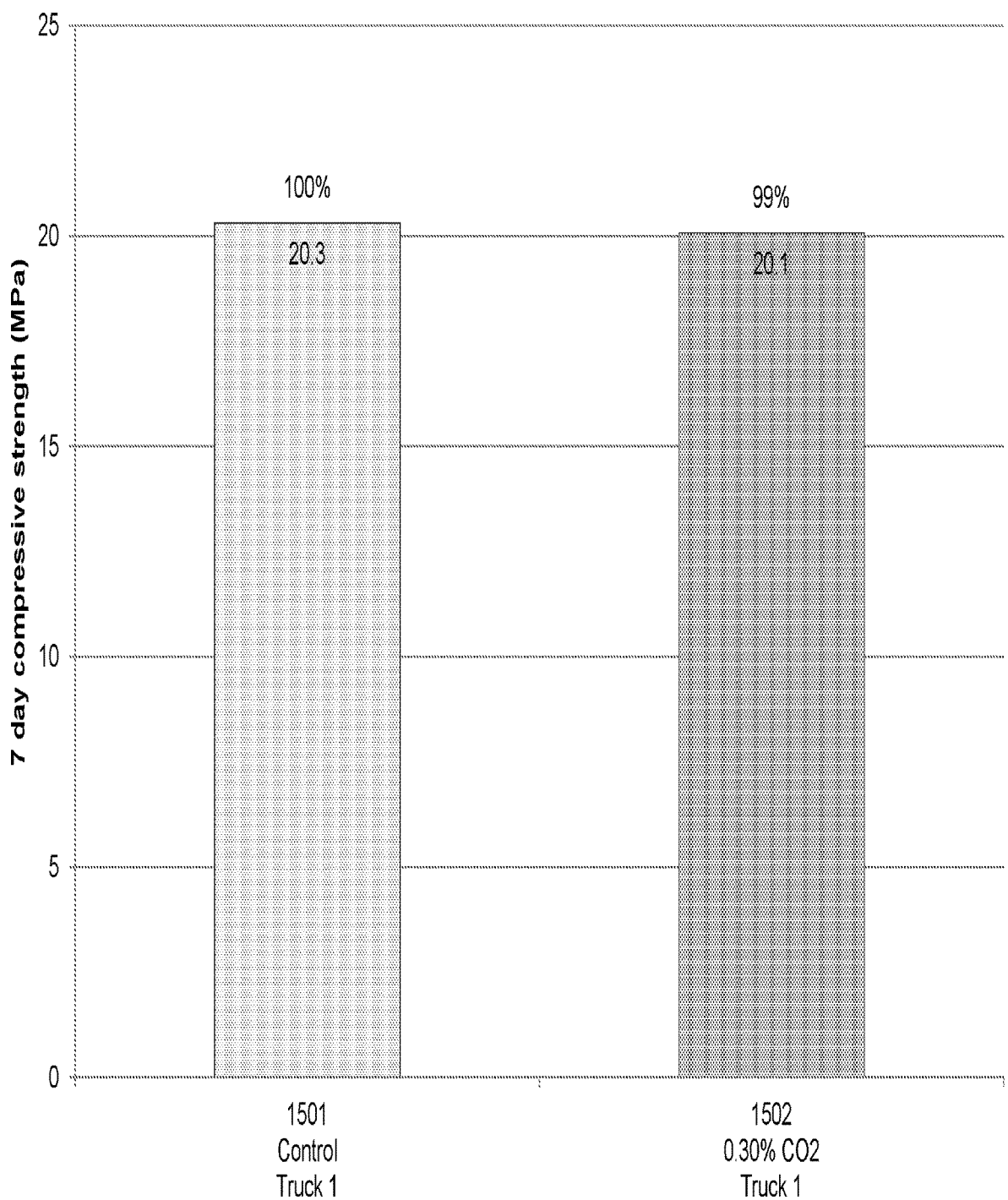
FIG. 89 shows compressive strengths at 7 days for control and one dose of carbon dioxide of the second day of the trial of Example 30.
Figure 90:
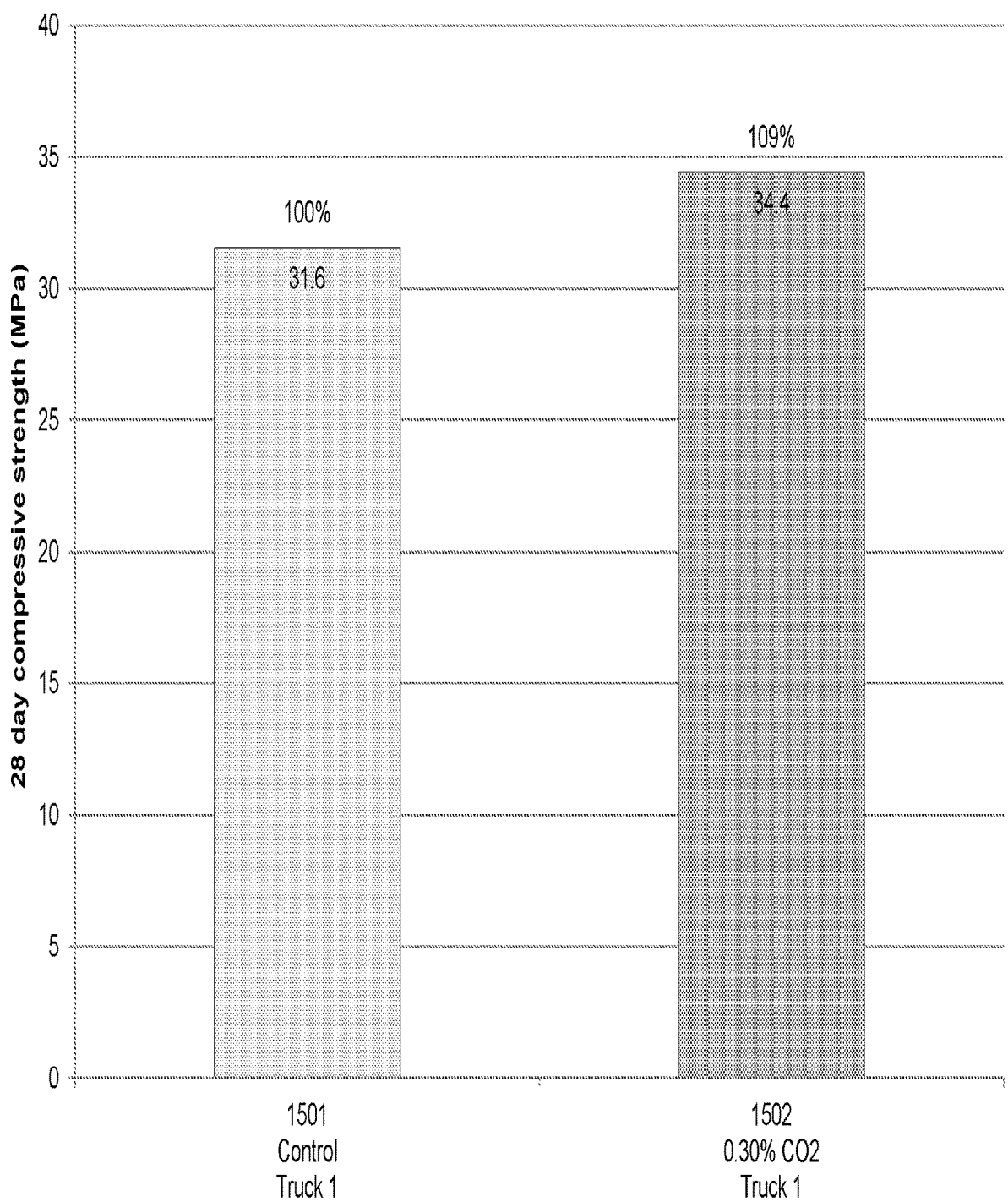
FIG. 90 shows compressive strengths at 28 days for control and one dose of carbon dioxide of the second day of the trial of Example 30.
Figure 91:
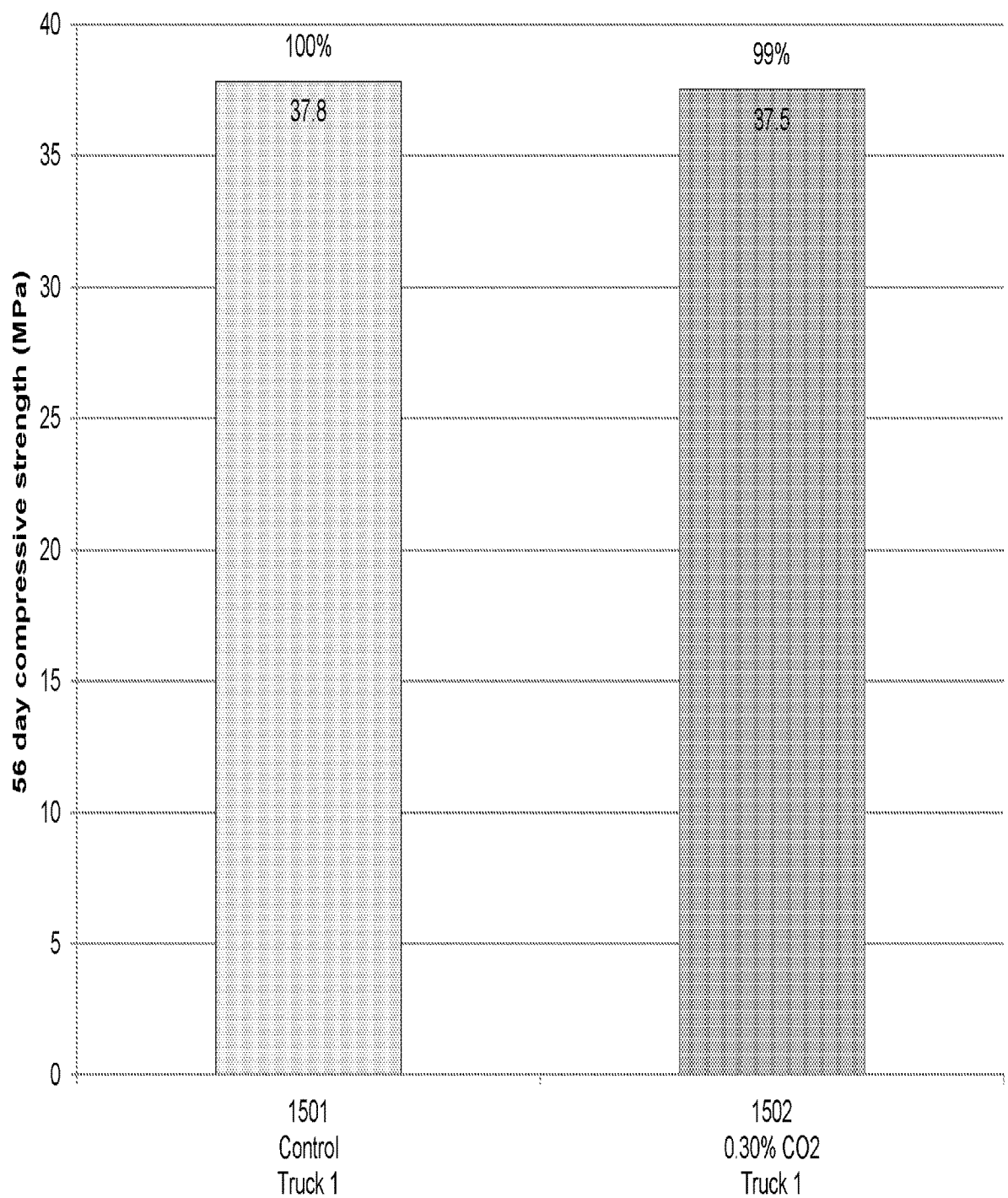
FIG. 91 shows compressive strengths at 56 days for control and one dose of carbon dioxide of the second day of the trial of Example 30.

8-hr, 12-hour, 24-hour, 7-day, and 28-day strengths are shown in Tables 27 (expressed as absolute strengths) and 28 (expressed as relative to uncarbonated control). Three specimens were taken at each age as 4×8" cylinders with reusable end caps. Specimens were kept in moist curing storage until testing. calorimetry data is shown in FIGS. 79A (power vs. time) and 79B (energy vs. time) for control, CO2-1, 2, and 3 and in FIG. 80A (power vs. time) and 80B (energy vs. time) for control, CO2-5 and 6.

TABLE 27

Compressive strengths, absolute (MPa)

|  | Control | CO2-1 | CO2-2 | CO2-3 | CO2-4 | CO2-5 | CO2-6 |
|---|---|---|---|---|---|---|---|
| 8 hr | 1.8 | 1.9 | 1.7 | 1.8 | 1.8 | 1.8 | 1.9 |
| 12 hr | 6.1 | 6.4 | 6.1 | 6.4 | 6.3 | 6.8 | 7.0 |
| 24 hr | 13.9 | 14.1 | 14.9 | 14.9 | 15.2 | 15.6 | 15.4 |

TABLE 27-continued

| | Compressive strengths, absolute (MPa) | | | | | | |
|---|---|---|---|---|---|---|---|
| | Control | CO2-1 | CO2-2 | CO2-3 | CO2-4 | CO2-5 | CO2-6 |
| 7 day | 24.8 | 25.7 | 27.0 | 26.1 | 28.0 | 27.7 | 28.7 |
| 28 day | 34.5 | 34.0 | 34.0 | 33.8 | 35.6 | 35.8 | 35.8 |

TABLE 28

| | Compressive strengths, relative to uncarbonated | | | | | | |
|---|---|---|---|---|---|---|---|
| | Control | CO2-1 | CO2-2 | CO2-3 | CO2-4 | CO2-5 | CO2-6 |
| 8 hr | 100% | 107% | 91% | 97% | 100% | 98% | 104% |
| 12 hr | 100% | 104% | 100% | 105% | 103% | 112% | 114% |
| 24 hr | 100% | 101% | 107% | 108% | 110% | 113% | 111% |
| 7 day | 100% | 104% | 109% | 105% | 113% | 112% | 116% |
| 28 day | 100% | 99% | 99% | 98% | 103% | 104% | 104% |

Calorimetry shows that the carbonation treatment has increased the heat release associated with the hydration of aluminates, see FIGS. 79A, B and 80A, B, and Tables 27 and 28, supporting the use of calorimetry as an alternative or additional marker to strength measurements in determining desired or optimal dosing conditions for carbonation of a concrete mix.

Strength benefit of $CO_2$ broadly corresponded to increasing dose. Set was slightly accelerated in highest $CO_2$ dose.

This example demonstrates that dosing carbon dioxide into a ready mix drum by using a liquid to solid/gas conversion as the carbon dioxide is dosed is viable.

Example 30

This example is an illustration of low dose of gaseous and solid carbon dioxide treatment of concrete in the drum of a ready mix truck, from a liquid source of carbon dioxide, at a time significantly after the batching of the concrete, and its effects on early strength. The concrete mix included an SCM (slag). Two trials were conducted on consecutive days. On the first day the carbon dioxide was dosed at various times up to about 70 minutes after batching. On the second day the carbon dioxide was dosed much earlier after batching, at about 20 minutes.

One truck of 4 $m^3$ of concrete was batched filled with a 25 MPa floor mix design, below:

| Component | Mass (kg/$m^3$) |
|---|---|
| Sand | 959 |
| Stone | 1080 |
| Cement | 212 |

-continued

| Component | Mass (kg/$m^3$) |
|---|---|
| Slag | 53 |
| Water | 155 |
| SuperP (mL) | 190 |

On the first day of the trial, one truck received three serial doses of $CO_2$ after the control sample. On the second day of the trial, there was only one dose of $CO_2$. The injection of $CO_2$ proceeded for 30-90 seconds with an additional 90-180 seconds of high speed mixing after the injection was completed. The requested load of concrete was first batched into the truck before transport to the wash rack where the batch received final water adjustments by the truck operator. Upon completion of the batch adjustments a sample of uncarbonated (control) concrete was removed, a slump test was performed, and test specimens were cast. The truck was then subjected to three sequential doses of carbon dioxide with assessment of slump and casting of the treated concrete between each round. The time between the start of mixing and the carbon dioxide application was recorded. All of the test samples came from the same truck to maximize the experimental results from a single batch and to minimize any batch-to-batch variation that may have arisen. The sequential dosing of carbon dioxide was pursued to determine an optimum dose.

Whereas the trial of example 29 involved a tube held in position, the trials from hereafter used a rigid injector tube. A clamp allowed it to be fixed to the truck structure and held in place. This type of system is similar to a portable system for dosing carbon dioxide that could be mounted on the truck itself, so that dosing can be done at any time before, during or after batching, as a single dose or as staged doses.

Conditions are summarized in Table 29

TABLE 29

| | | | Conditions in trial | | | | |
|---|---|---|---|---|---|---|---|
| Truck (day) | Sample Code | Condition | Estimated Discharge Time (min) | Total $CO_2$ Dose (% bwc) | $CO_2$ Uptake (% bwc) | Slump (inches) | Temp (° C.) |
| 1 | 1401 | Control | 23 | — | — | 3.5 | 23.9 |
| | 1402 | $CO_2$ | 45 | 0.10% | inconclusive | 3.0 | — |
| | 1403 | $CO_2$ | 59 | 0.30% | inconclusive | 3.0 | 25.6 |
| | 1404 | $CO_2$ | 74 | 0.60% | inconclusive | 2.0 | 26.5 |

TABLE 29-continued

| | | | Conditions in trial | | | | |
|---|---|---|---|---|---|---|---|
| Truck (day) | Sample Code | Condition | Estimated Discharge Time (min) | Total $CO_2$ Dose (% bwc) | $CO_2$ Uptake (% bwc) | Slump (inches) | Temp (° C.) |
| 2 | 1501 | Control | 10 | — | — | 2.5 | 23.7 |
| | 1502 | $CO_2$ | 20 | 0.30% | inconclusive | 2.0 | 24.9 |

Trials were run on two consecutive days. Compressive strengths at 1, 3, 7, 28, and 56 for samples taken on the first day are shown in FIGS. 81-85 and calorimetry for first-day samples is shown in FIGS. 86A (power vs. time) and 86B (energy vs. time). Three specimens were used for 1 day, two specimens at all other ages. 4×8" cylinders were subjected to end grinding to create planar faces and kept in moist curing storage prior to testing. For the second day, FIGS. 87-91 show strength at 1, 3, 7, 28, and 56 days and FIGS. 92A (power vs. time) and 92B (energy vs. time) show calorimetry. It can be seen that for both days, shifts in the calorimetry curves match the increases in strength, with the greatest shift seen for the dose of carbon dioxide on a given day that gave the greatest acceleration of strength development, see, e.g., FIG. 86A. Three specimens were used for 1 day, two specimens at all other ages. 4×8" cylinders were subjected to end grinding to create planar faces and kept in moist curing storage prior to testing.

The carbon dioxide injection did not appear to have any effect on the induction period. The acceleratory stage of hydration for each sample was underway by 4 hours. By 7 hours the heat evolution of the carbonated samples occurred at an increased rate (as noted in a shift to the left of the shape of the curves) where the effect was greater with the greater dose of carbon dioxide. Further, the heat release at the peak of the early hydration was found to increase in magnitude and be shifted to earlier times as the carbon dioxide dose increased. An alternate interpretation of the data considers the total energy released with time. The energy release relative to the control can be quantified at various ages and used as a metric of hydration progress. It is shown that at 6 hours the carbonated batches had released about 10% less energy than the control. The low dose had matched the control by 11 hours and remained equivalent thereafter. The second dose of $CO_2$ reached 101% of the control at 9 hours before improving to 12% better at 12 hours and finishing at 6% more energy released through 20 hours. The highest dose reached 102% of the control at 10 hours, 13% greater at 12 hours and 4% increase through 20 hours. It is observed that the carbon dioxide may have slightly slowed the hydration in the first 8 hours but in the 10 to 14 hour range an accelerating effect could be realized in the two higher doses. This potentially corresponds to a performance benefit such as a higher strength at these times.

Resistance testing was also performed, following AASHTO TP 95-11 "Surface Resistivity Indication of Concrete's Ability to Resist Chloride Ion Penetration" Electrical resistivity and assessed risk of chloride penetration were measured.

Standards are summarized in Table 30, below.

TABLE 30

| | ASTM and AASTO standards | |
|---|---|---|
| Chloride Penetration | ASTM C1202 56 day RCPT Coulombs | AASHTO TP95-11 28 day Electrical Resistivity $\Omega$m |
| High | >4000 | <45.93 |
| Moderate | 2000-4000 | 45.93-91.86 |
| Low | 1000-2000 | 91.86-183.7 |
| Very Low | 100-1000 | 183.7 to 1837 |
| Negligible | <100 | >1837 |

Results are summarized in Table 31.

TABLE 31

Resistivity results for carbonated concretes

| | Average Bulk Electrical Resistivity ($\Omega$m) and Chloride Penetration Risk for five test ages (days) | | | | |
|---|---|---|---|---|---|
| Sample | 1 | 3 | 7 | 28 | 56 |
| 1401 | 8.9 | 19.3 | 33.6 | 78.7 | 106.5 |
| 1402 | 8.8 | 18.9 | 25.5 | 74.1 | 112.0 |
| 1403 | 8.7 | 18.8 | 24.7 | 67.1 | 97.7 |
| 1404 | 8.9 | 20.3 | 24.1 | 70.2 | 101.8 |
| 1401 | High | High | High | Moderate | Low |
| 1402 | High | High | High | Moderate | Low |
| 1403 | High | High | High | Moderate | Low |
| 1404 | High | High | High | Moderate | Low |
| 1501 | 9.1 | 16.2 | 22.9 | 54.7 | 85.0 |
| 1502 | 8.9 | 16.1 | 22.0 | 50.8 | 82.8 |
| 1501 | High | High | High | Moderate | Moderate |
| 1502 | High | High | High | Moderate | Moderate |

The $CO_2$ treatment did not impact the resistivity with values for the control & $CO_2$ "moderate" at 28 days and "low" at 56 days.

The use of staggered vs. single batch indicates that the staggered batch (1403), when compared to the single dose (1502), both at 0.30%, produced a more robust increase in strength. This may be due to the batching, or it may be due to the time the carbon dioxide was applied after mixing (60 min vs 20 min), or both. The highest benefit was in the batch with the three-stage dose (1404), with benefit from 13 to 26% across the test period. calorimetry results showed acceleration and greater energy release for the staggered samples.

This example demonstrates that carbon dioxide at low doses increases early strength with benefits maintained at later time points, that the carbon dioxide did not affect resistivity, and that the time after batching of carbon dioxide addition and/or staging may affect the magnitude of the increase in early strength. Finally, the Example illustrates the use of carbon dioxide in a mix containing an SCM (slag), with beneficial results seen for the carbonated vs. uncarbonated concrete.

Example 31

This example is a repeat of Example 30, with some modifications. The same mix design was used (i.e., concrete with SCM). One truck of 4 m³ of concrete received three serial doses of $CO_2$ after the control sample. The injection of $CO_2$ proceeded for 30-90 seconds with an additional 90-180 seconds of high speed mixing after the injection was completed. The same carbon dioxide injection system as Example 30 was used. The trial of Example 31 was a repeat of Example 30 to increase confidence in the results. However, while delivering a $CO_2$ injection to a truck stopped at the wash rack (as in Example 30) is potentially feasible, breaking the delivery into multiple doses represents a possible delay that is preferably avoided and is not universally applicable. Many examples exists wherein concrete is batched and mix centrally thereby precluding the need for a wash rack and a related pause. Thus Example 31 included an alternate $CO_2$ injection mode (sample code 805, below) wherein the gas was added during the initial batching/mixing phase.

The second truck had one dose of $CO_2$, equivalent to two doses of the first truck (0.30% carbon dioxide bwc) but was dosed during mixing. Conditions for the samples in the trial are given in Table 32.

TABLE 32

Conditions for samples

| Truck | Sample Code | Condition | Est Discharge Time (min) | Total $CO_2$ Dose (% bwc) | $CO_2$ Uptake (% bwc) | Slump (inches) | Temp (° C.) |
|---|---|---|---|---|---|---|---|
| 1 | 801 | Control | 21 | — | — | 3.5 | 22.4 |
|   | 802 | $CO_2$ | 30 | 0.10% | inconclusive | 3.0 | 24.0 |
|   | 803 | $CO_2$ | 46 | 0.30% | inconclusive | 2.5 | 24.7 |
|   | 804 | $CO_2$ | 55 | 0.60% | inconclusive | 1.5 | 27.3 |
| 2 | 805 | CO2 | — | 0.3% | — | 3.0 | 23.3 |

Figure 93A:
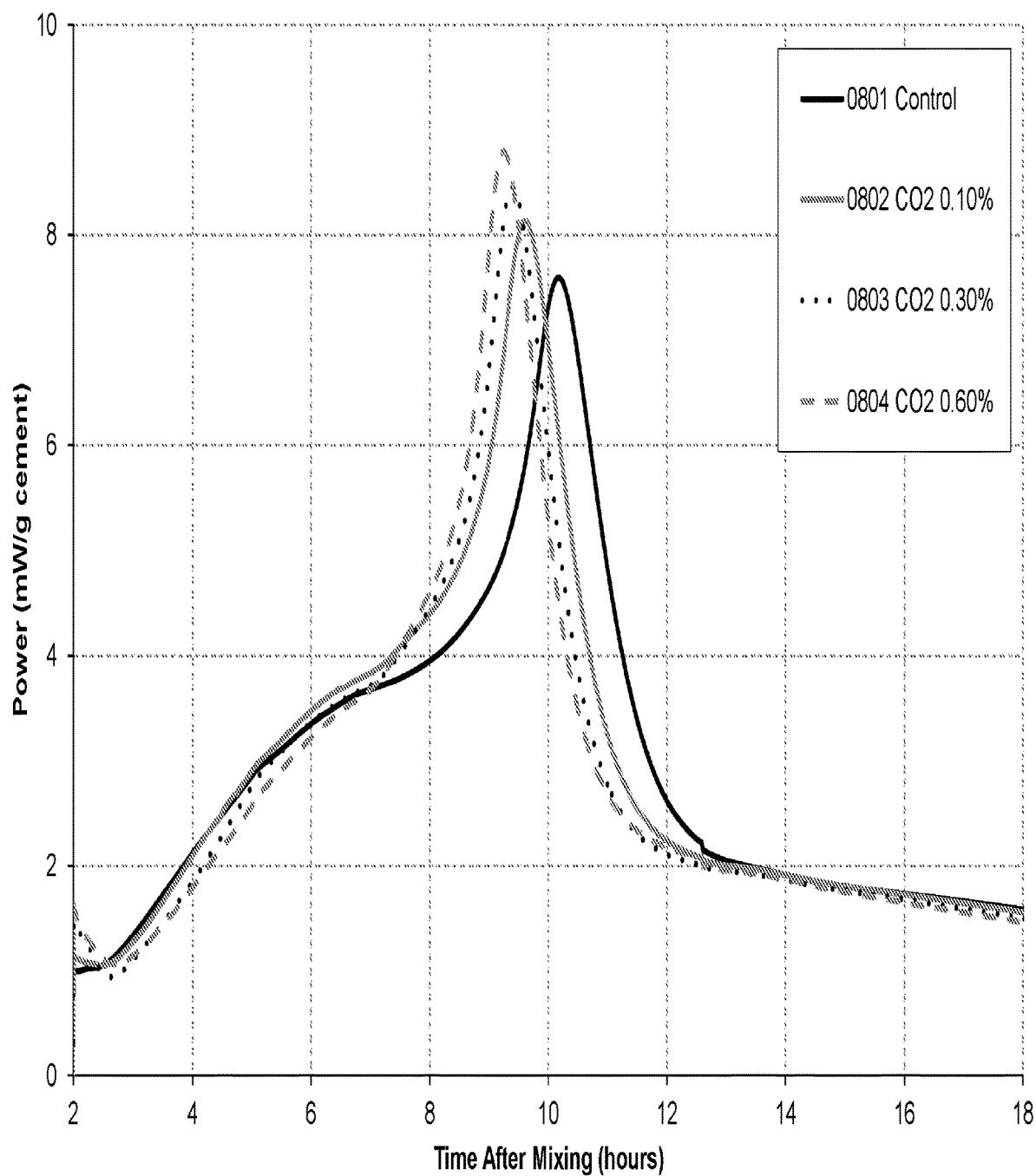
FIG. 93A shows calorimetry data for the three doses of carbon dioxide of Example 31, and uncarbonated control, power vs. time.
Figure 93B:
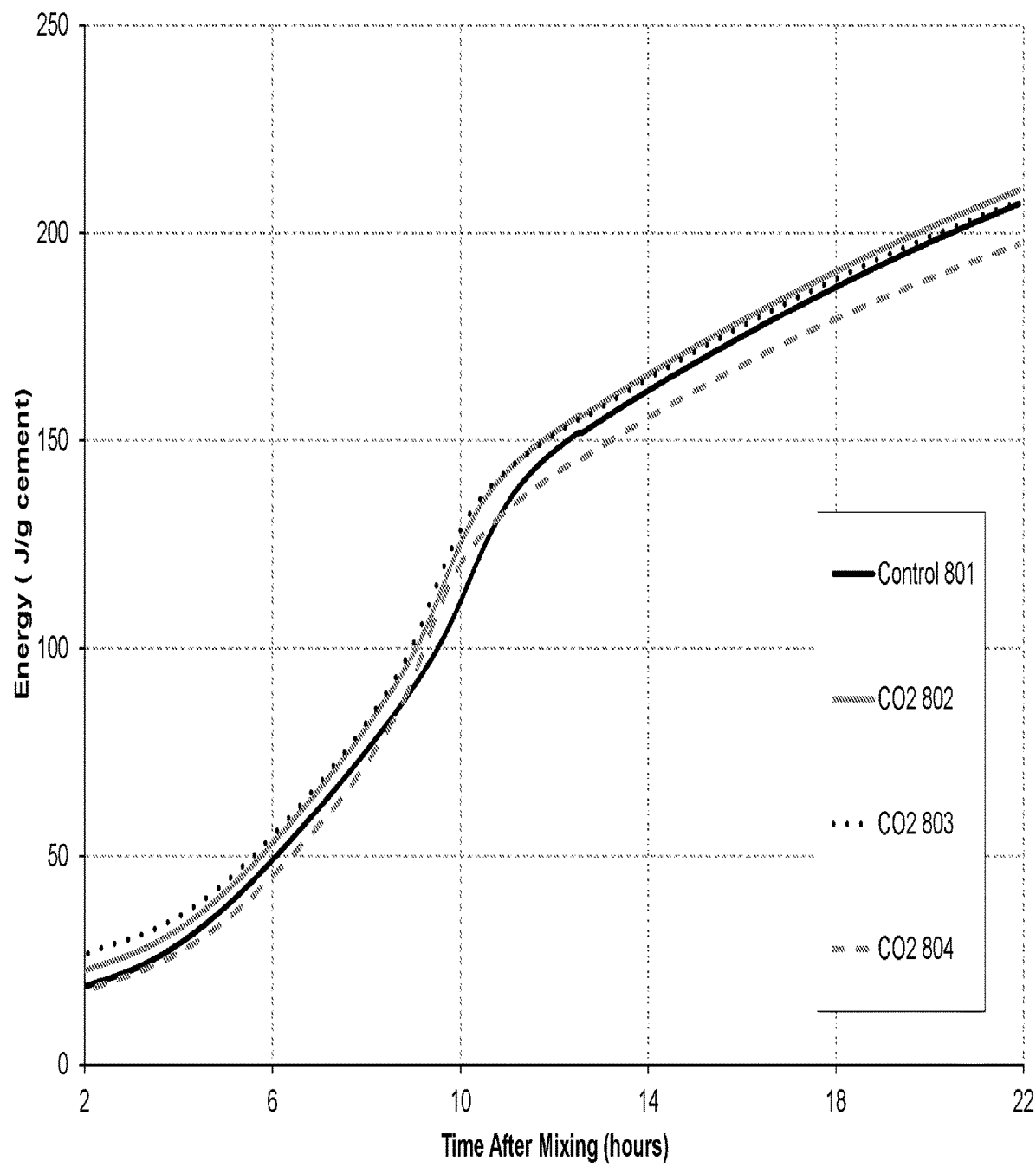
FIG. 93B shows calorimetry data for the three doses of carbon dioxide of Example 31, and uncarbonated control, energy vs. time.

Absolute compressive strengths are shown in Table 33 and compressive strengths relative to uncarbonated control are shown in Table 34. FIGS. 93A (power vs. time) and 93B (energy vs. time) show calorimetry data for the various carbon dioxide doses.

TABLE 33

Compressive strengths, absolute
Compressive Strength (MPa)

|  | Control 0801 | CO2 0802 | CO2 0803 | CO2 0804 | CO2 0805 |
|---|---|---|---|---|---|
| 1 day | 8.0 | 8.0 | 8.6 | 8.7 | 9.2 |
| 3 day | 14.8 | 15.8 | 16.6 | 16.1 | 18.6 |
| 7 day | 19.2 | 20.4 | 21.4 | 22.1 | 23.2 |
| 28 day | 30.8 | 32.0 | 33.9 | 32.8 | 35.5 |
| 56 day | 32.8 | 27.9 | 37.9 | 36.4 | 38.7 |
| 91 day | 36.9 | 38.4 | 39.1 | 39.5 | 42.5 |

TABLE 34

Compressive strengths, relative
Strength Relative to the Control

|  | Control 0801 | CO2 0802 | CO2 0803 | CO2 0804 | CO2 0805 |
|---|---|---|---|---|---|
| 1 day | 100% | 99% | 106% | 108% | 114% |
| 3 day | 100% | 107% | 112% | 109% | 126% |
| 7 day | 100% | 106% | 111% | 115% | 121% |
| 28 day | 100% | 104% | 110% | 107% | 115% |
| 56 day | 100% | 85% | 116% | 111% | 118% |
| 91 day | 100% | 103% | 106% | 107% | 115% |

As in Example 30, when carbon dioxide was dosed in stages, an increasing early (1 day) strength benefit was seen with increasing dose, though the effect was not consistent at the later time points. However, unlike Example 30, the single dose sample, 0805, was superior in strength at every time point to the same dose, delivered in two stages (0803). In this Example, the single dose was given during batching rather than after batching. This method outperformed all of the staged doses at every time point.

Calorimetry trends were consistent with Example 30, that is, doses giving the greatest acceleration of strength also showed the greatest shift in the calorimetry curves. The data considered as energy shows the magnitude of the effect from the carbon dioxide. The lowest dose released 20% more energy than the control through 2 hours. The benefit declined to 7% at 7 hours before increasing to 13% at 10 hours and thereafter the declining to be equivalent to the control. The middle dose of $CO_2$ was 41% higher than the control at 2 hours with the benefit declining to 9% at 8 hours. The energy release jumped to 16% ahead of the control at 10 hours before declining to be equivalent to the control. For the highest dose the energy was between 92% and 99% of the control in the first 9 hours before spiking to be 9% ahead and thereafter declining to be equivalent to the control. It is evident that the lower doses of $CO_2$ had an effect on the very early hydration and all doses had an effect notably around the 10 hour mark. The shape of the power curves suggests that this time period is consistent with the end of the acceleration period when the initial silicate hydration starts to slow down.

The batch that was dosed with $CO_2$ during batching (805) showed a calorimetry response that appeared to show some retardation relative to the control (data not shown). Heat evolution was slower across the 7 to 13 hour interval. After lagging to 83% of the control through 11 hours the hydration accelerated and was 5% ahead at 15 hours thereafter increasing to 7% at 20 hours.

Bulk resistivity measurements were taken according to the protocol used in Example 31. The results are shown in Table 34A.

TABLE 34A

Bulk Resistivity (Ω · m) and chloride penetrability risk for test specimens at five different ages

| Sample Code | Condition | 1 day | 3 day | 7 day | 28 day | 91 day |
|---|---|---|---|---|---|---|
| 801 | Control | 9.6 | 14.9 | 21.0 | 58.3 | 123.4 |
| 802 | 0.1% $CO_2$ | 9.6 | 16.4 | 21.6 | 56.8 | 122.2 |
| 803 | 0.3% $CO_2$ | 9.2 | 15.9 | 20.9 | 59.6 | 123.7 |
| 804 | 0.6% $CO_2$ | 9.2 | 16.1 | 20.7 | 50.3 | 112.9 |
| 805 | 0.3% $CO_2$ | 10.1 | 18.0 | 23.3 | 61.8 | 129.8 |
| 801 | Control | High | High | High | Moderate | Low |
| 802 | 0.1% $CO_2$ | High | High | High | Moderate | Low |
| 803 | 0.3% $CO_2$ | High | High | High | Moderate | Low |
| 804 | 0.6% $CO_2$ | High | High | High | Moderate | Low |
| 805 | 0.3% $CO_2$ | High | High | High | Moderate | Low |

The bulk resistivity measurements were consistent with what was observed in Example 31 insofar as the assessments of the carbonated batches were equivalent to the control. The chloride penetrability risk for all samples was assessed to be moderate at 28 days and low at 91 days.

This example confirms the consistent benefit of low dose carbon dioxide on early strength development and demonstrates the effect of time of carbon dioxide addition on the magnitude of the strength benefit. The carbon dioxide addition during batching would be equivalent of dosing done at the yard, whereas the other times of carbon dioxide addition during the staged addition are akin to dosing during transit and/or at the job site.

Example 32

In this example, carbon dioxide was added to concrete in ready mix trucks almost immediately after batching, using the same dose in two different trucks but different time for delivery of the carbon dioxide. A mix design was used containing an SCM, in this case, fly ash.

Three trucks were used, each 8.5 m³, thus these were full trucks;
The mix design was:
Sand 868 kg
Stone 1050 kg
Cement 282 kg
Fly ash 68 kg $CO_2$ was supplied as a liquid using a wand directing it into the drum. In this Example the system would be equivalent to a permanent system at the batching plant.

The $CO_2$ was supplied to the concrete immediately after the truck left the batch house. There was approximately 4 min of batching/mixing in the house, 2 min reorientation of the truck, and then the $CO_2$ was added, as a single dose per truck. This would be the equivalent of a dosing scheme at the batching plant. Only one dose was given per truck, which was the same dose for each truck but given over two different time periods. Conditions for the trucks in the trial are given in Table 35.

TABLE 35

Conditions for samples in trial

| Truck | Condition | Total $CO_2$ Dose (% bwc) | $CO_2$ Uptake (% bwc) | Slump (inches) | Temp (° C.) |
|---|---|---|---|---|---|
| 1 | Control | — | — | 5.5 | 21.1 |
| 2 | $CO_2$-1 | 0.50% over 4 min | inconclusive | 2.0 | 20.7 |
| 3 | $CO_2$-2 | 0.50% over 2 min | inconclusive | 6.0 | 21.6 |

Figure 94B:
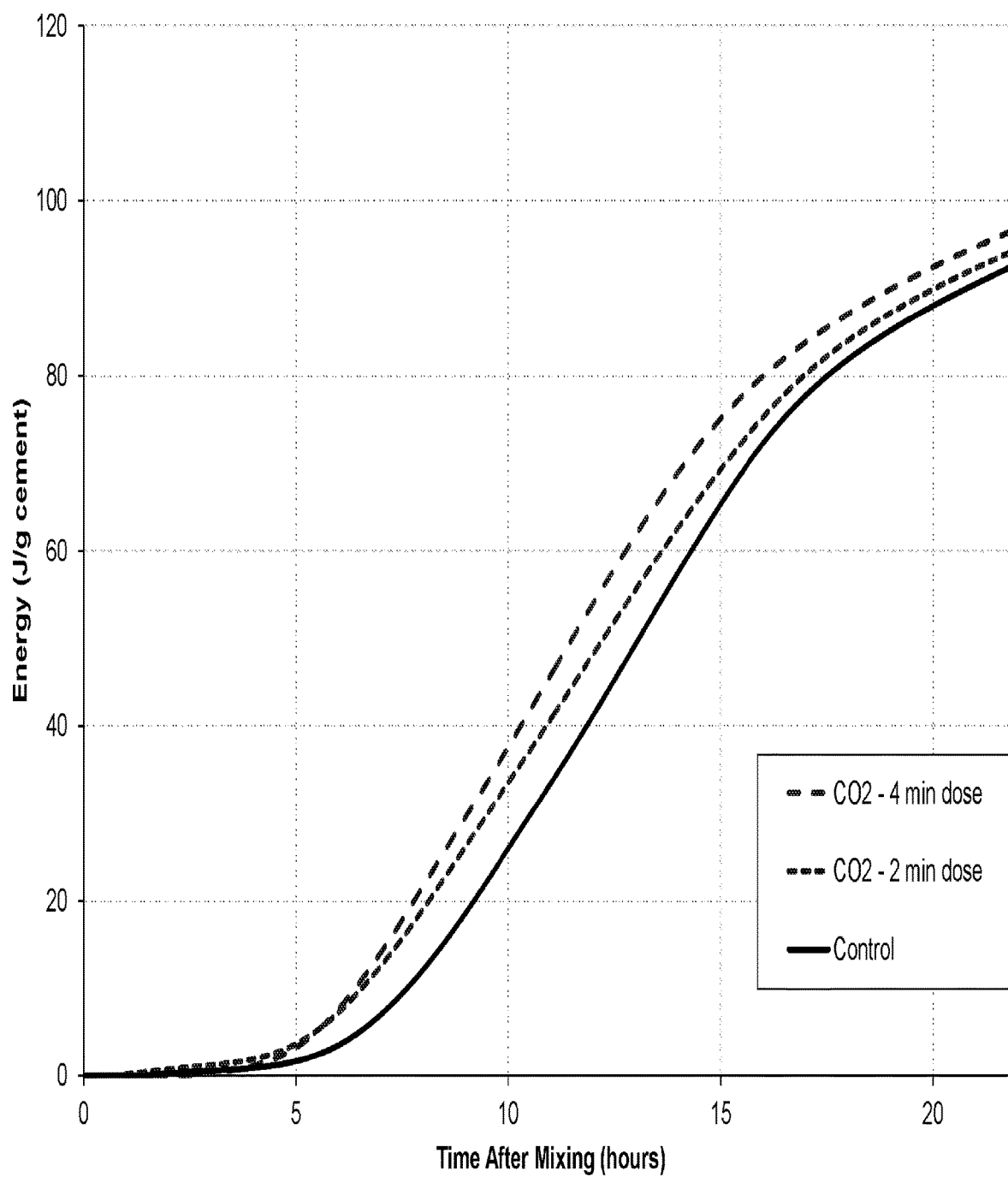
FIG. 94B shows calorimetry data for the two doses of carbon dioxide of Example 32, and uncarbonated control, energy vs. time.

Compressive strengths were measured at 1, 4, 7, and 28 days. Absolute compressive strengths are given in Table 36; compressive strengths relative to control are given in Table 37. Calorimetry data is shown in FIGS. 94A (power vs. time) and 94B (energy vs. time). Three specimens were used at all ages as 4×8" cylinders with reusable end caps. Moist curing storage was used prior to testing.

TABLE 36

Compressive strengths, absolute
Compressive Strength (MPa)

|  | Control | CO2-1 | CO2-2 |
|---|---|---|---|
| 1 day | 15.2 | 18.9 | 14.2 |
| 4 day | 31.4 | 33.4 | 28.3 |
| 7 day | 31.7 | 37.6 | 33.1 |
| 28 day | 44.9 | 47.8 | 42.0 |

TABLE 37

Compressive strengths, relative to control
Strength Relative to control

|  | Control | CO2-1 | CO2-2 |
|---|---|---|---|
| 1 day | 100% | 125% | 93% |
| 4 day | 100% | 107% | 90% |
| 7 day | 100% | 119% | 105% |
| 28 day | 100% | 106% | 94% |

The strength at every time point was superior in the concrete from the truck dosed over 4 min (CO2-1) compared to the truck dosed over 2 min (CO2-2), possibly because the slower delivery allowed the fresh concrete more time to react without swamping the system.

The example illustrates that another possibility for carbon dioxide dosing can be after water is added to the mix and mixing starts, but within minutes after mixing starts. In facilities with a wash rack, where the truck is rinsed prior to departure and the consistency of the concrete is checked, a truck may pause for about ten minutes. This offers an opportunity for carbon dioxide dosing in this time frame. This Example also illustrates the use of the low dose carbon dioxide with a mix containing an SCM, and beneficial results in early strength development compared to uncarbonated control. Finally, this example further illustrates that changes in calorimetry data correlate with early strength changes.

Example 33

In this example, a method for screening a particular cement to determine optimal carbon dioxide dosing was performed.

The mix design was Sand 1350 g, Cement 535 g, Water 267.5 g

The procedure was:
Combine sand and water in kitchen aid mixer—mix 30s on setting #2
Add cement—mix 30s on setting #2
Remove uncarbonated sample for calorimetry and $CO_2$ analysis
Carbonate for 2 minutes at 0.15 LPM
Remove sample #2 for calorimetry and $CO_2$ analysis
Repeat steps 4 and 5 as many times as desired In this example, Lafarge Brookfield cement was used, but the procedure may be used for any cement to screen for optimal carbon dioxide dosing.

Figure 95:
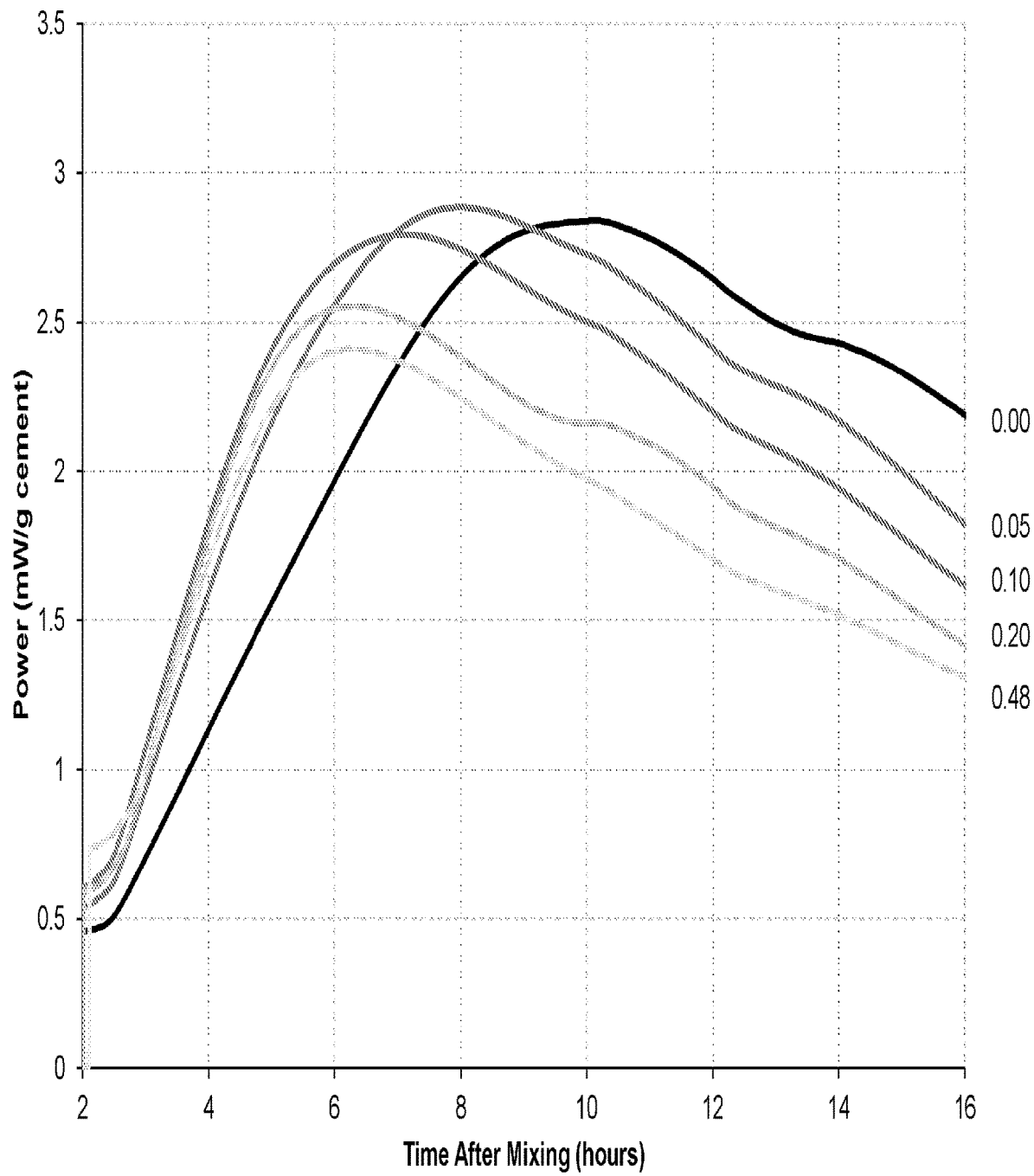
FIG. 95 shows calorimetry curves for 5 mortars with varying levels of $CO_2$ uptake (1 sample before carbonation followed by 5 rounds of carbonation, each for 2 min at 0.15 LPM) of Example 33.
Figure 96:
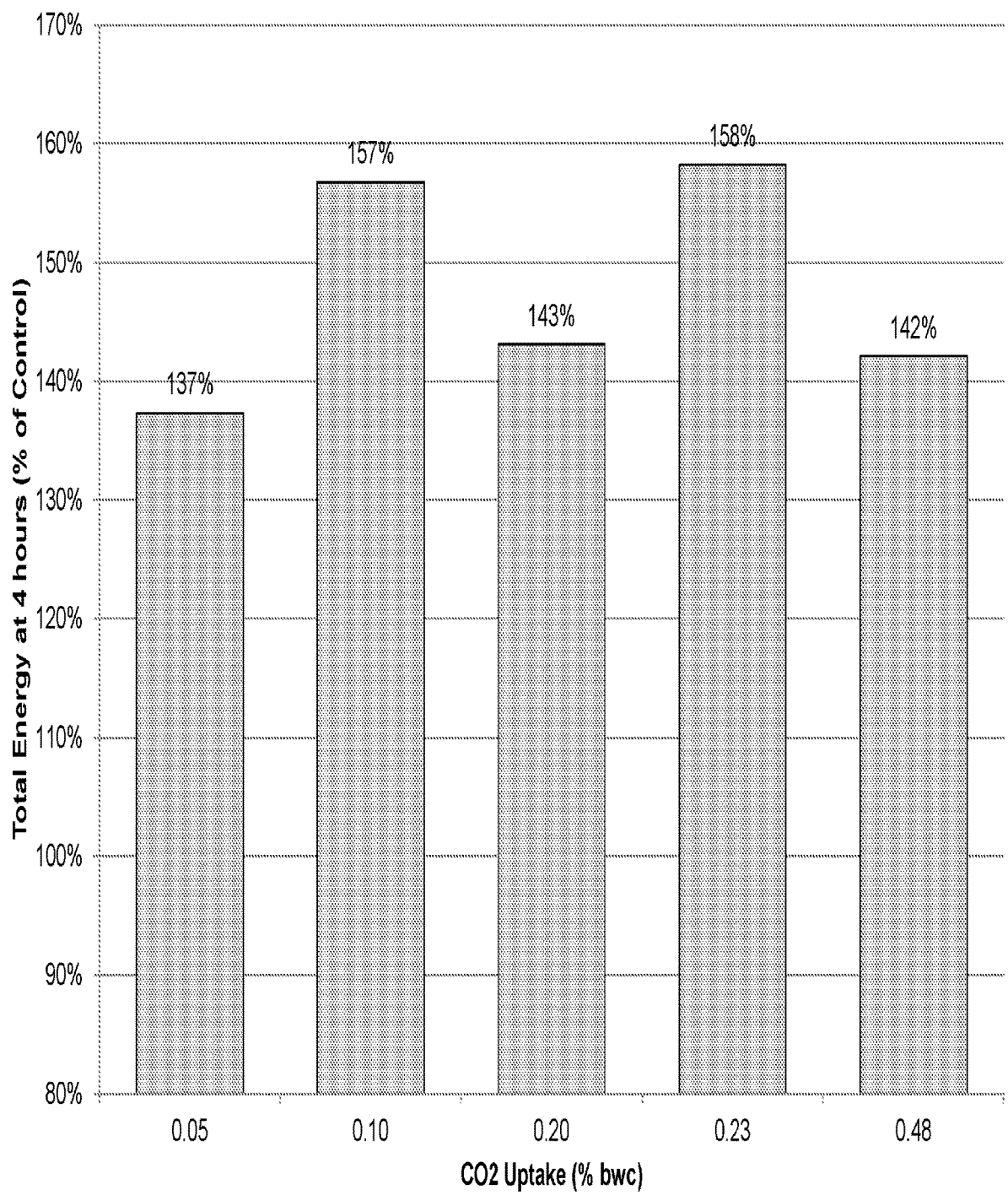
FIG. 96 shows total energy released at 4 hours after mixing for the 4 different levels of carbonation of Example 33, compared to uncarbonated control.
Figure 97:
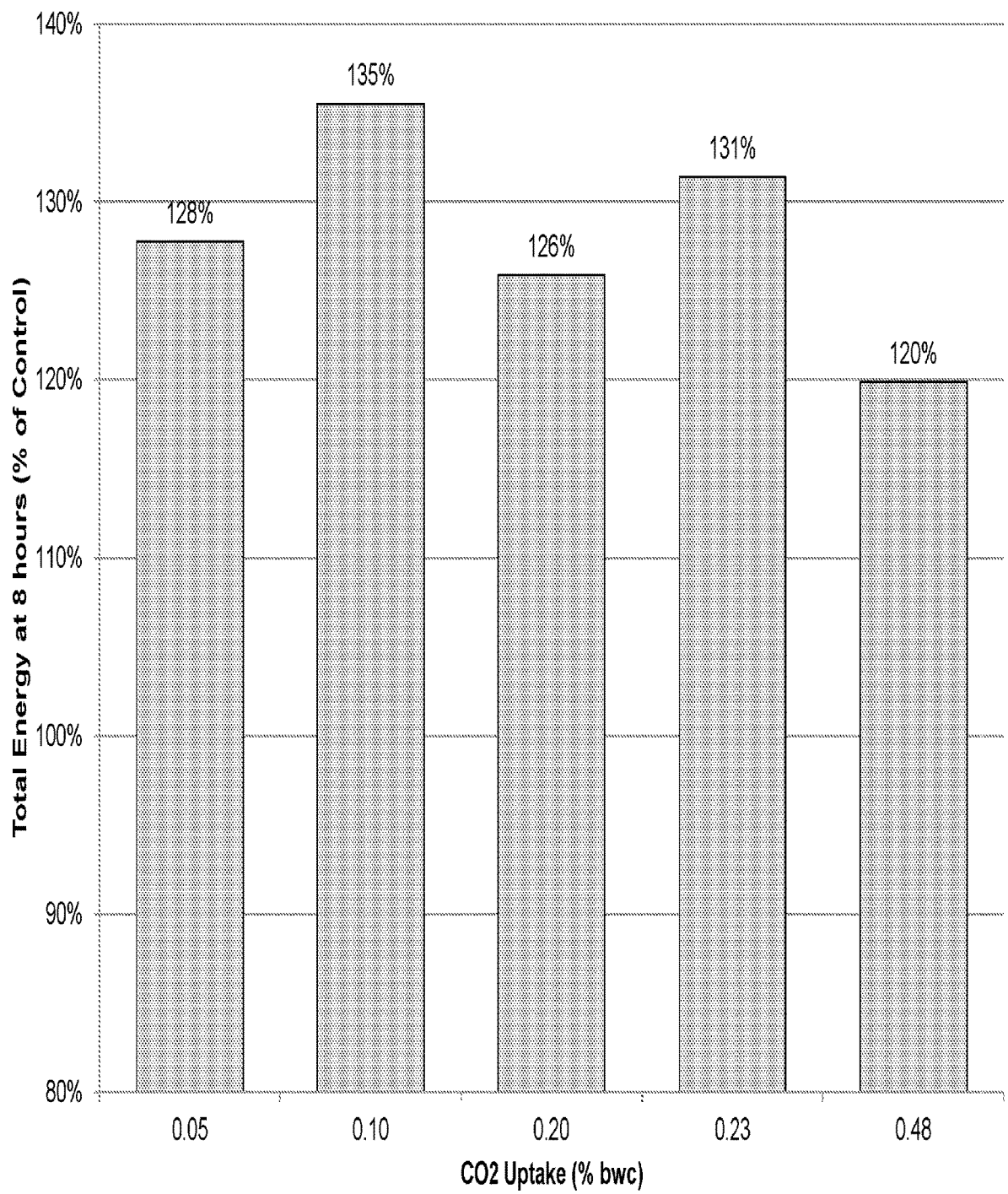
FIG. 97 shows total energy released at 8 hours after mixing for the 4 different levels of carbonation of Example 33, compared to uncarbonated control.
Figure 98:
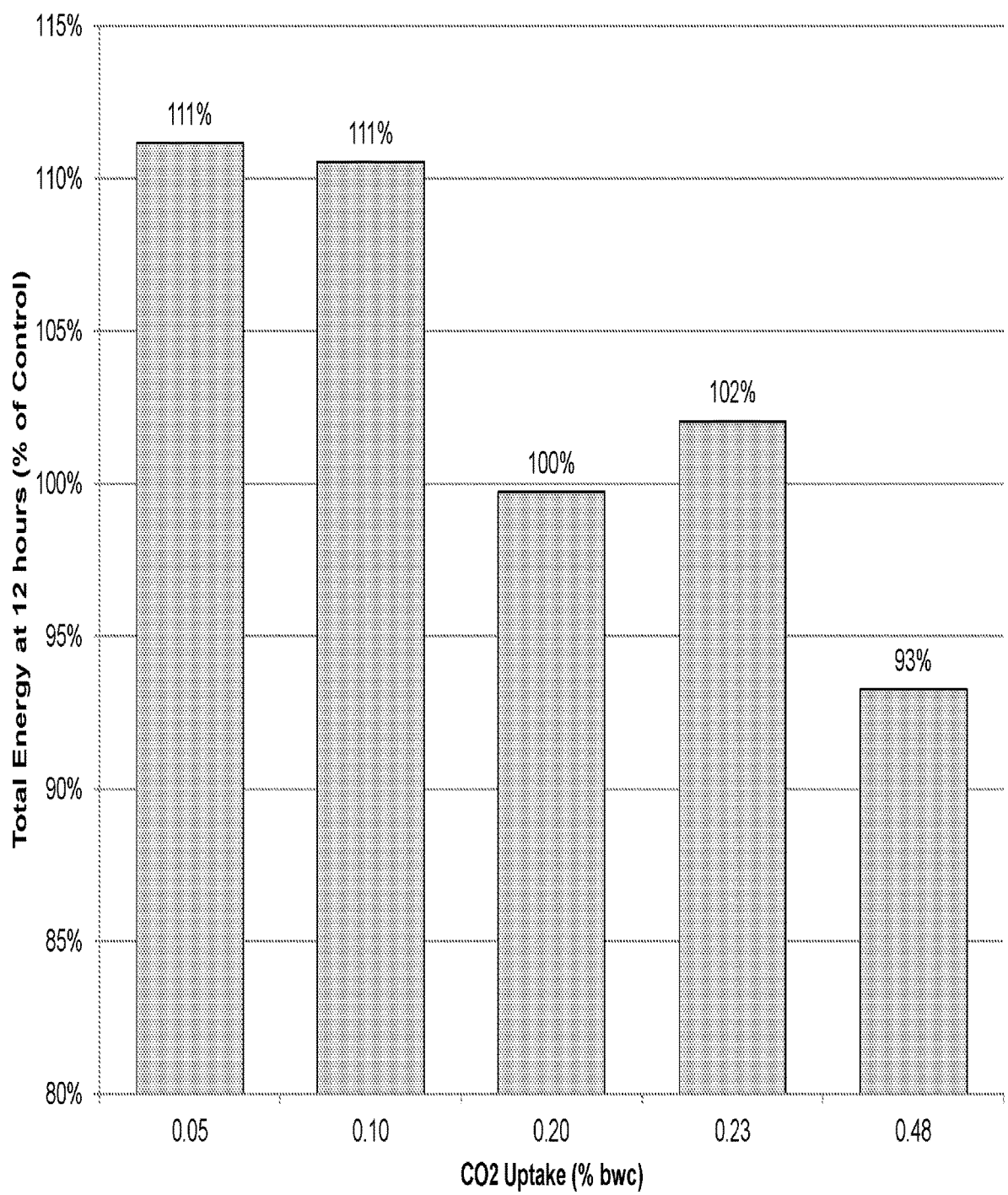
FIG. 98 shows total energy released at 12 hours after mixing for the 4 different levels of carbonation of Example 33, compared to uncarbonated control.
Figure 99:
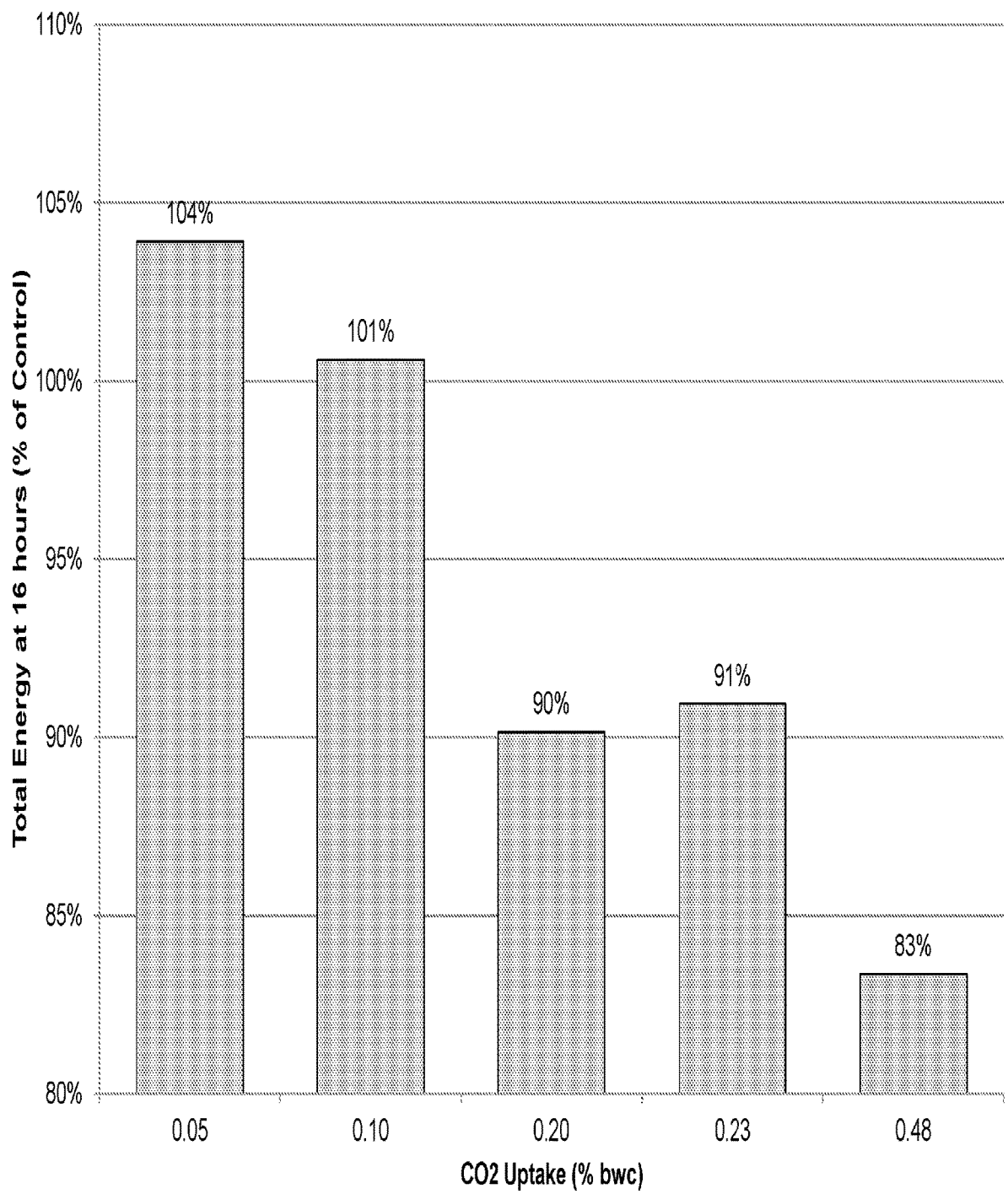
FIG. 99 shows total energy released at 16 hours after mixing for the 4 different levels of carbonation of Example 33, compared to uncarbonated control.

An increase in heat released at early ages (acceleration) was observed for all $CO_2$ doses. Lower uptakes are better at later ages; higher doses had negative impact on total energy. See FIGS. 95-99. FIG. 95 shows calorimetry curves (power vs. time) for 5 mortars with varying levels of $CO_2$ uptake (1 sample before carbonation followed by 5 rounds of carbonation, each for 2 min at 0.15 LPM). FIGS. 96-99 give the results of the analysis of energy released relative to the uncarbonated control at 4, 8, 12, and 16 hours.

This example illustrates a method for rapidly determining optimal carbon dioxide dose for a particular cement to be used in, e.g., a concrete mix, by using calorimetry as an alternative or additional marker to strength development.

Example 34

In this example, delivery of $CO_2$ via carbonated water was tested with the carbonated water being used as the sole water source for a concrete.

If some or all of the mix water in a wet mix concrete is carbonated, it can contain an amount of $CO_2$ that can be sufficient to obtain a desired dose of carbon dioxide in the concrete by the use of carbonated mix water alone, depending on the desired dose; this is certainly true for many low dose mixes. For example, consider a mix that is 350 kg/m³ of cement. A dose of $CO_2$ of 0.5% bwc would be 1.75 kg of $CO_2$. At w/c of 0.45 there is 157.5 kg of water in a cubic meter. So a dose of $CO_2$ of 0.5% would be 11.1 g $CO_2$/L water. This amount of carbon dioxide could be carried by carbonated water at about 94 psi and 25° C. Cooler water could carry more, particularly if a fraction of the water is to remain uncarbonated. Lower doses than 0.5% are easily achievable using carbonation of the mix water, or a portion of the mix water.

Thus, we explored the use of carbonated water as a carrier of the low dose of $CO_2$.

Mix Procedure A—Control
1. Combine 1350 g sand and 53.5 g water in bowl—mix 30s
2. Add 535 g cement to bowl—mix 30s
3. Add 214 g water to bowl over ~10s—mix 30s
4. Mix mortar for additional 2 minutes Mix Procedure B—$CO_2$
1. Combine 1350 g sand and 535 g cement in bowl—mix 30s
2. Add 267.5 g carbonated water to bowl—mix 30s. Carbonated water was Perrier water.
3. Mix mortar for additional 2 minutes In this trial, the mix water in the carbonated case was added as one addition, and all of the mix water was carbonated.

Figure 100:
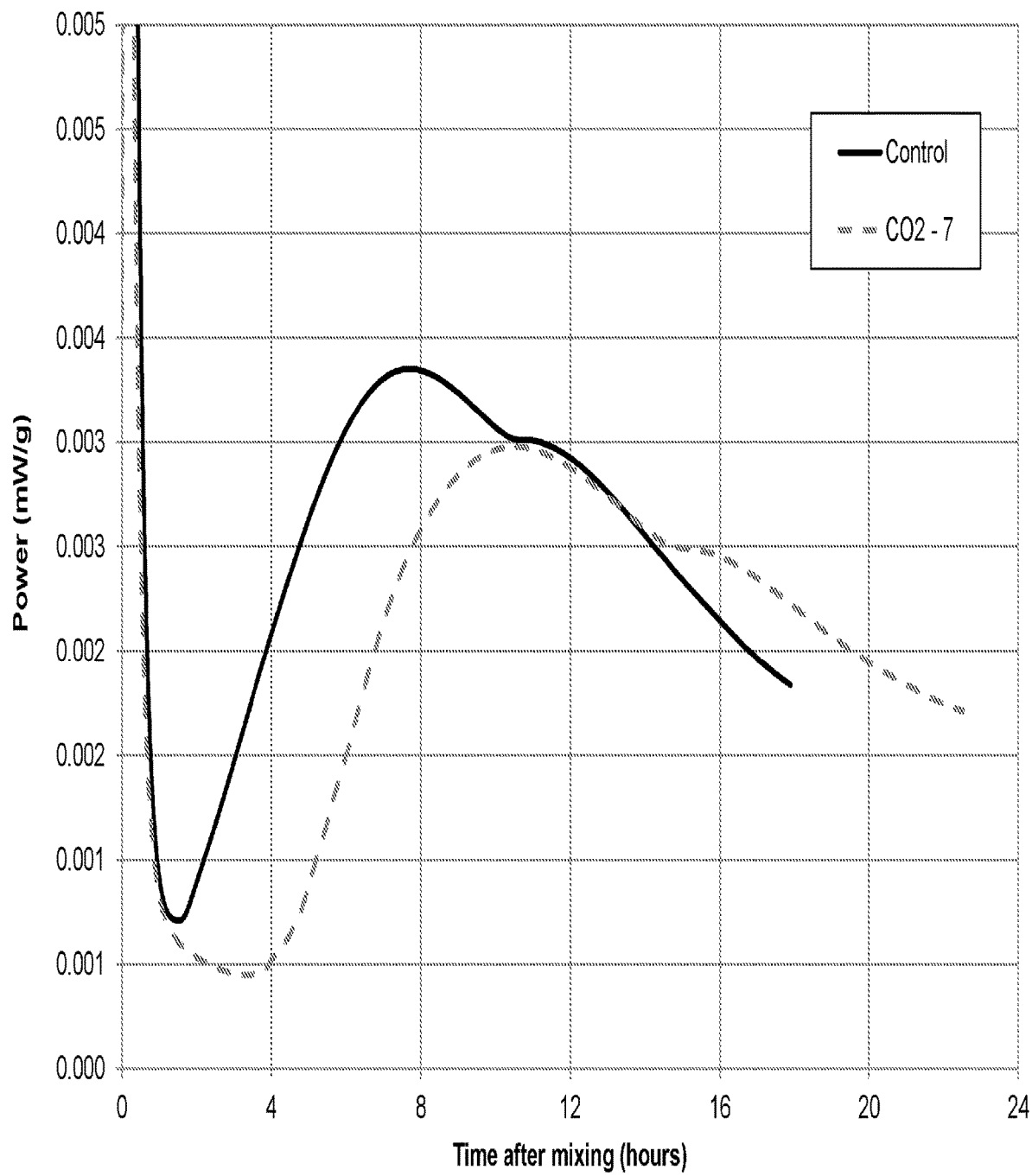
FIG. 100 shows calorimetry as power vs. time for a mortar mix made with carbonated mix water vs. uncarbonated mix water, as described in Example 34.
Figure 101:
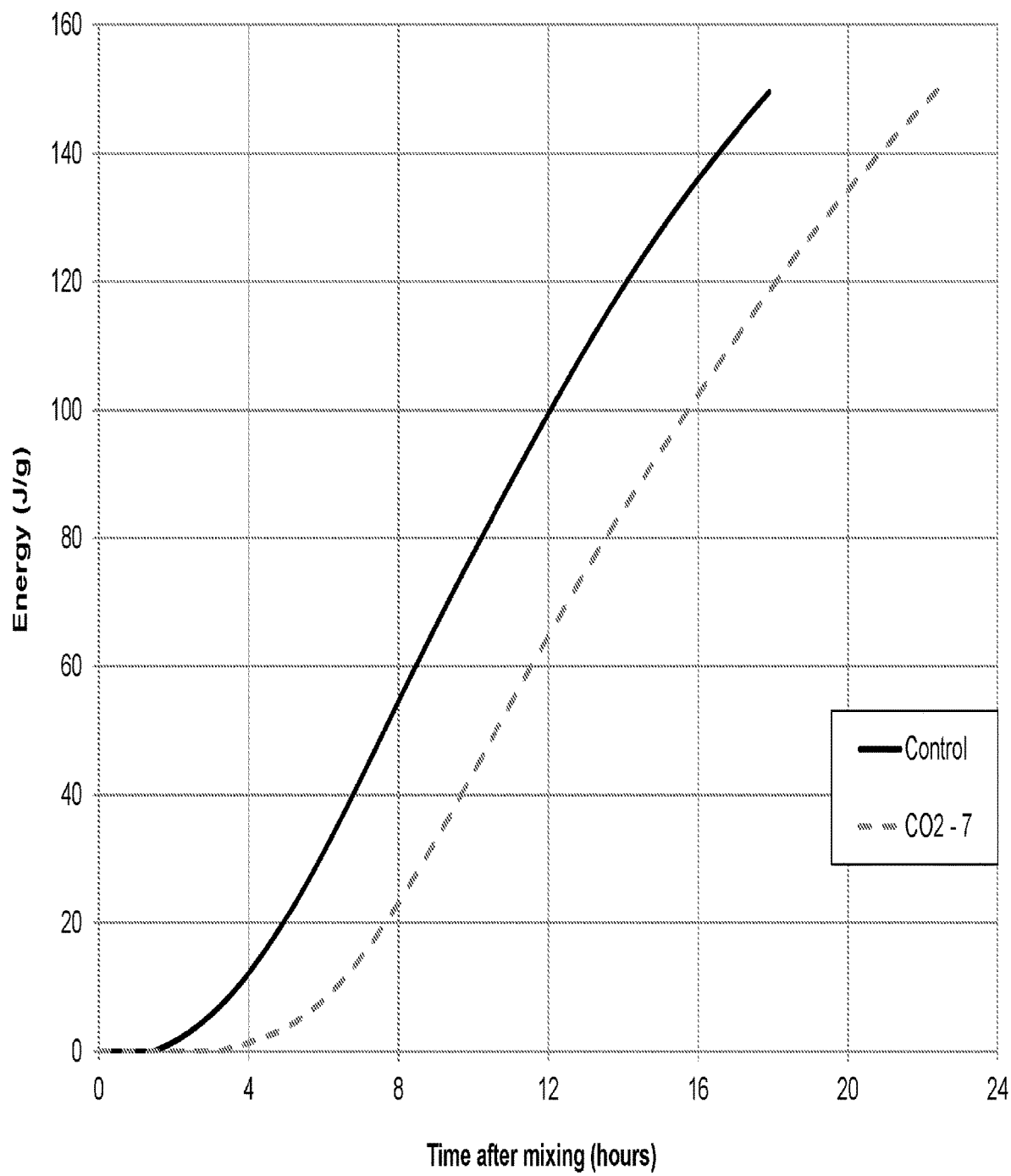
FIG. 101 shows calorimetry as energy released vs. time for a mortar mix made with carbonated mix water vs. uncarbonated mix water, as described in Example 34.

Surprisingly, calorimetry indicated retardation of about 2 to 4 hours. See FIGS. 100 (power vs. time) and 101 (energy vs. time). The time at which the carbonated mix water is introduced may be important, and that a "pre wet" step before the carbonated water addition can be used in order to "prime" the reactions in the hydrating cement so that when the carbonated water is then added the desired effect on strength acceleration is seen.

Example 35

In this example the effects of low dose carbonation on reversing the retardation of early strength development in concretes containing an SCM, in this case, fly ash, was studied.

The procedure was as follows:
Combine 1350 g sand and 267.5 g water in bowl-mix 30s
Add 428 g cement and 107 g fly ash (80/20 blend)-mix 60s
Remove sample for calorimetry and bakeoff
Dose $CO_2$ at 0.15 LPM for 2 minutes
Remove sample for calorimetry and bakeoff
Dose $CO_2$ at 0.15 LPM for 2 minutes (4 minutes total $CO_2$ dose)
Remove sample for calorimetry and bakeoff
Dose $CO_2$ at 0.15 LPM for 2 minutes (6 minutes total CO2 dose)
Remove sample for calorimetry and bakeoff
Cements used in the trials were: Argos, Cemex, Holcim, Titan Roanoake.
Fly ashes used in the trials were: Venture Belews creek, SEFA Wateree.

Figure 102:
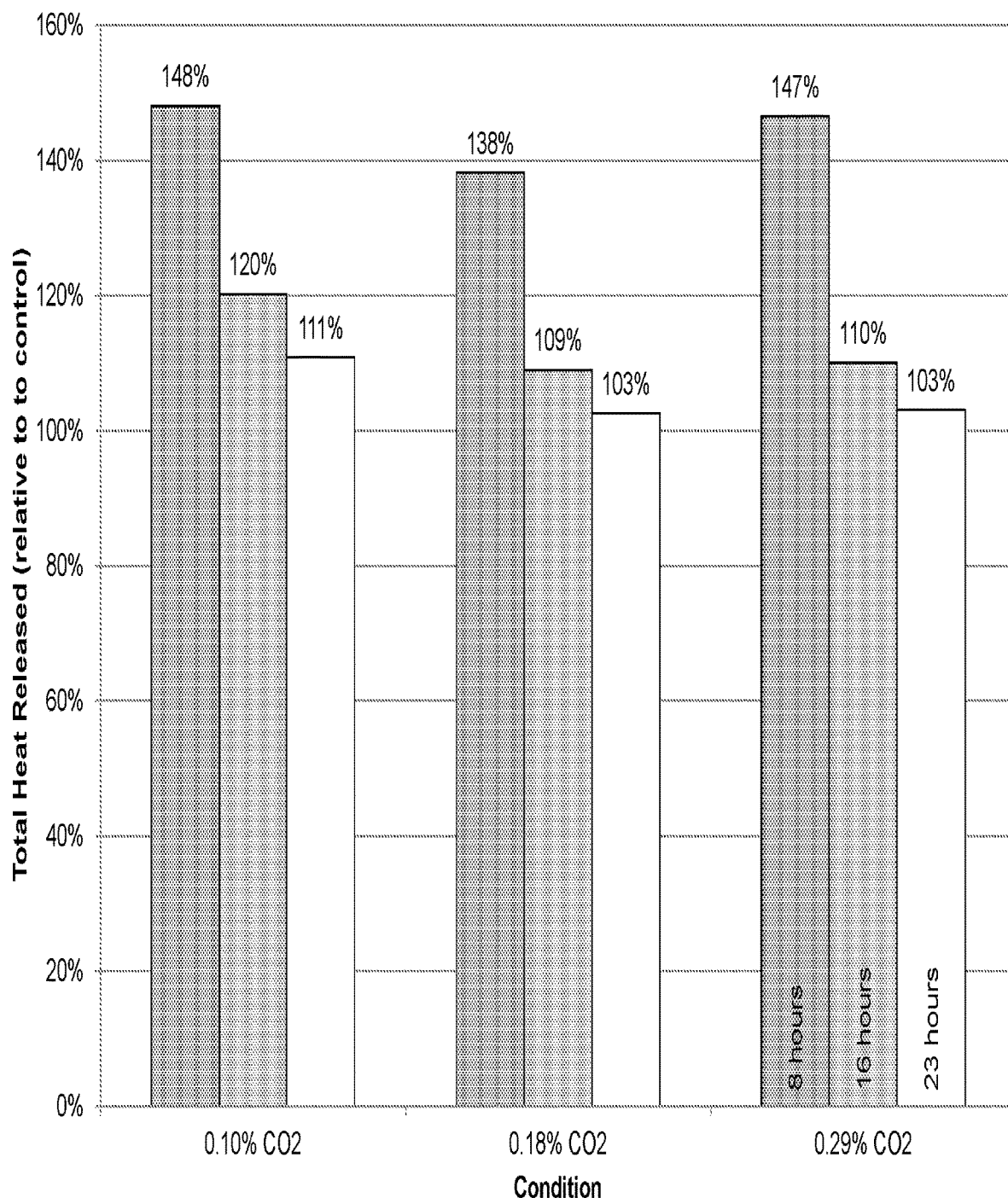
FIG. 102 shows results for an Argos cement+Venture FA mix under three different carbonation conditions, at three different times, as total heat released relative to a control, uncarbonated mix, as described in Example 35.
Figure 103:
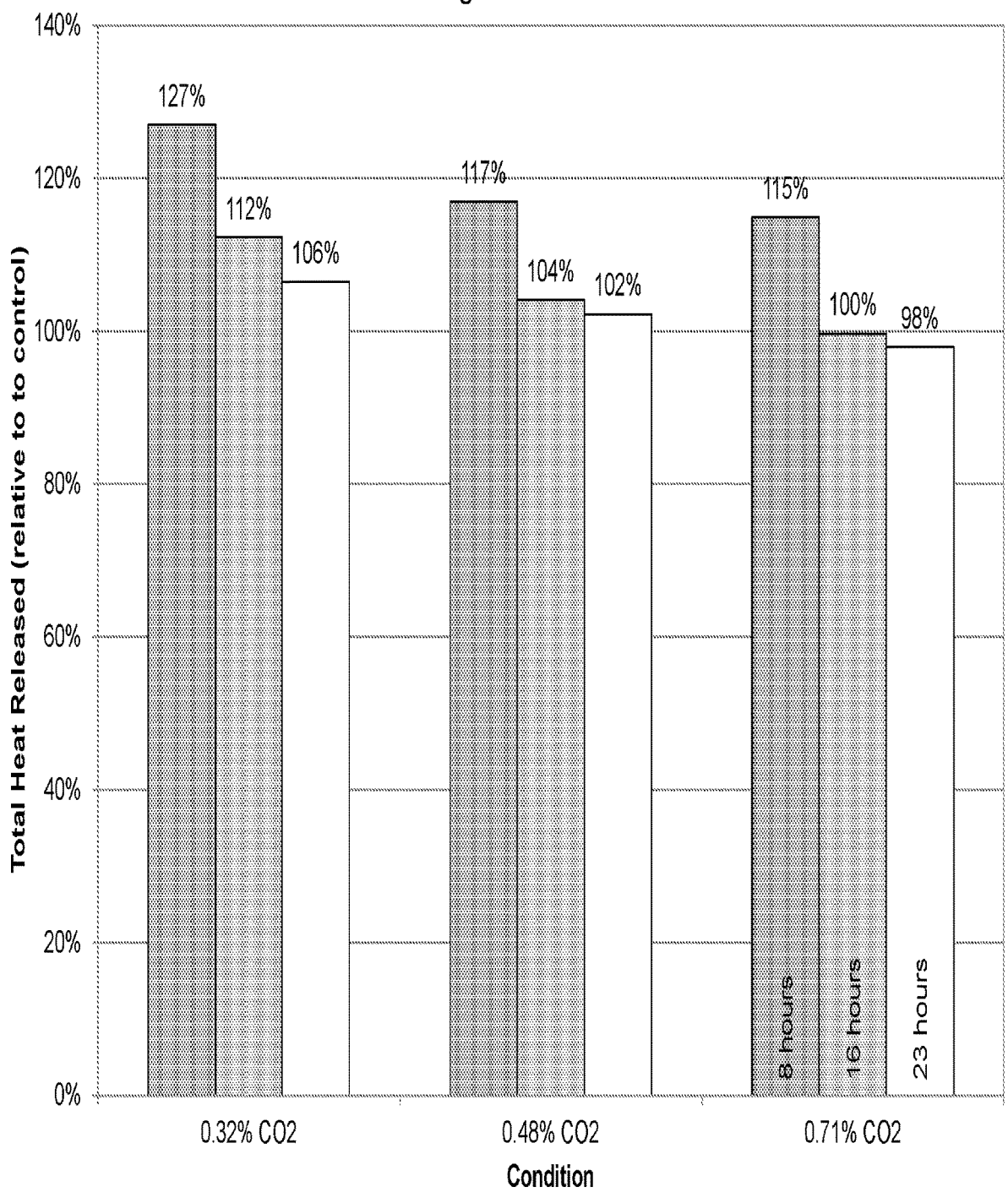
FIG. 103 results for a Cemex cement+Venture FA mix under three different carbonation conditions, at three different times, as total heat released relative to a control, uncarbonated mix, as described in Example 35.
Figure 104:
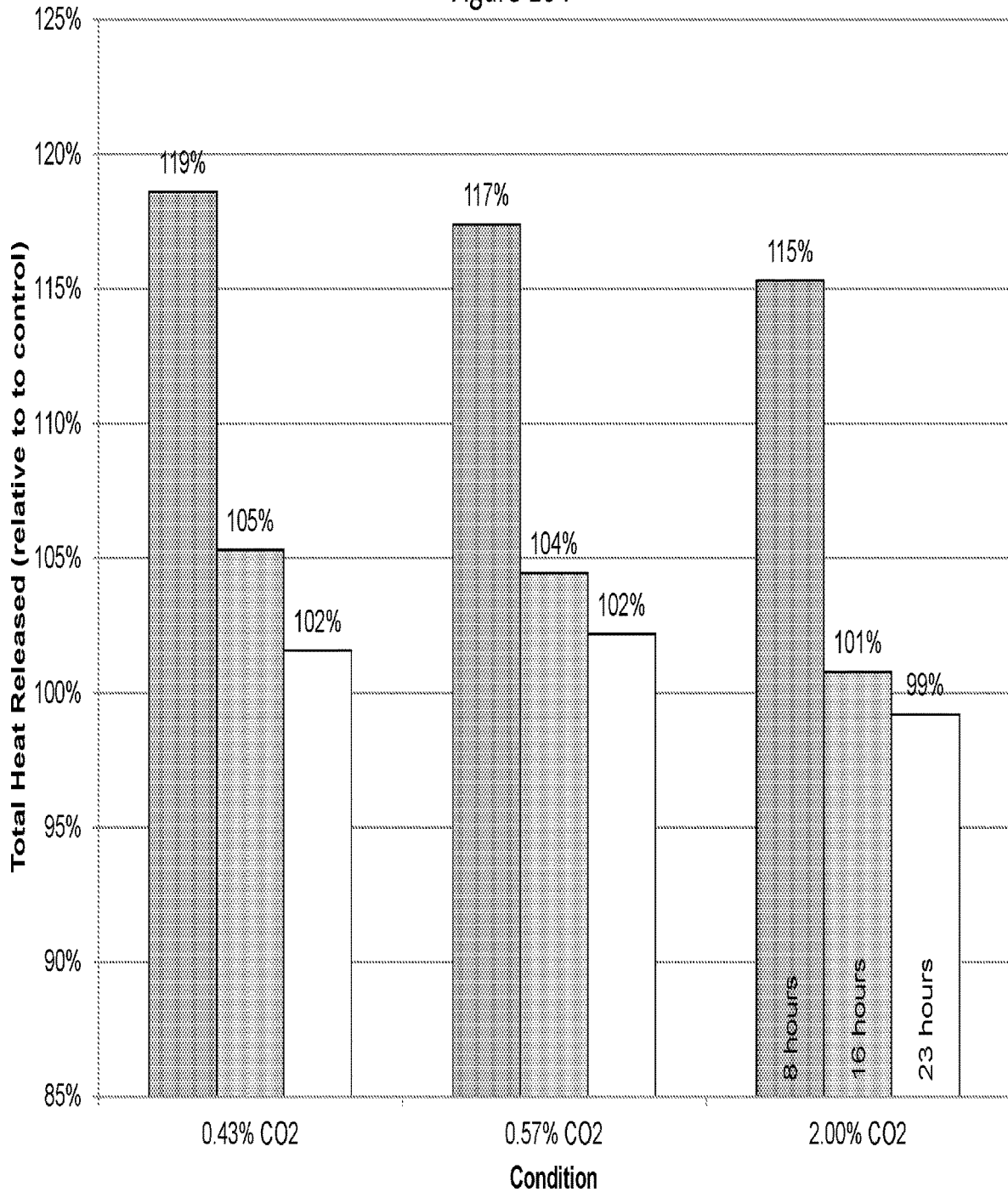
FIG. 104 shows results for a Holcim cement+Venture FA mix under three different carbonation conditions, at three different times, as total heat released relative to a control, uncarbonated mix, as described in Example 35.
Figure 105:
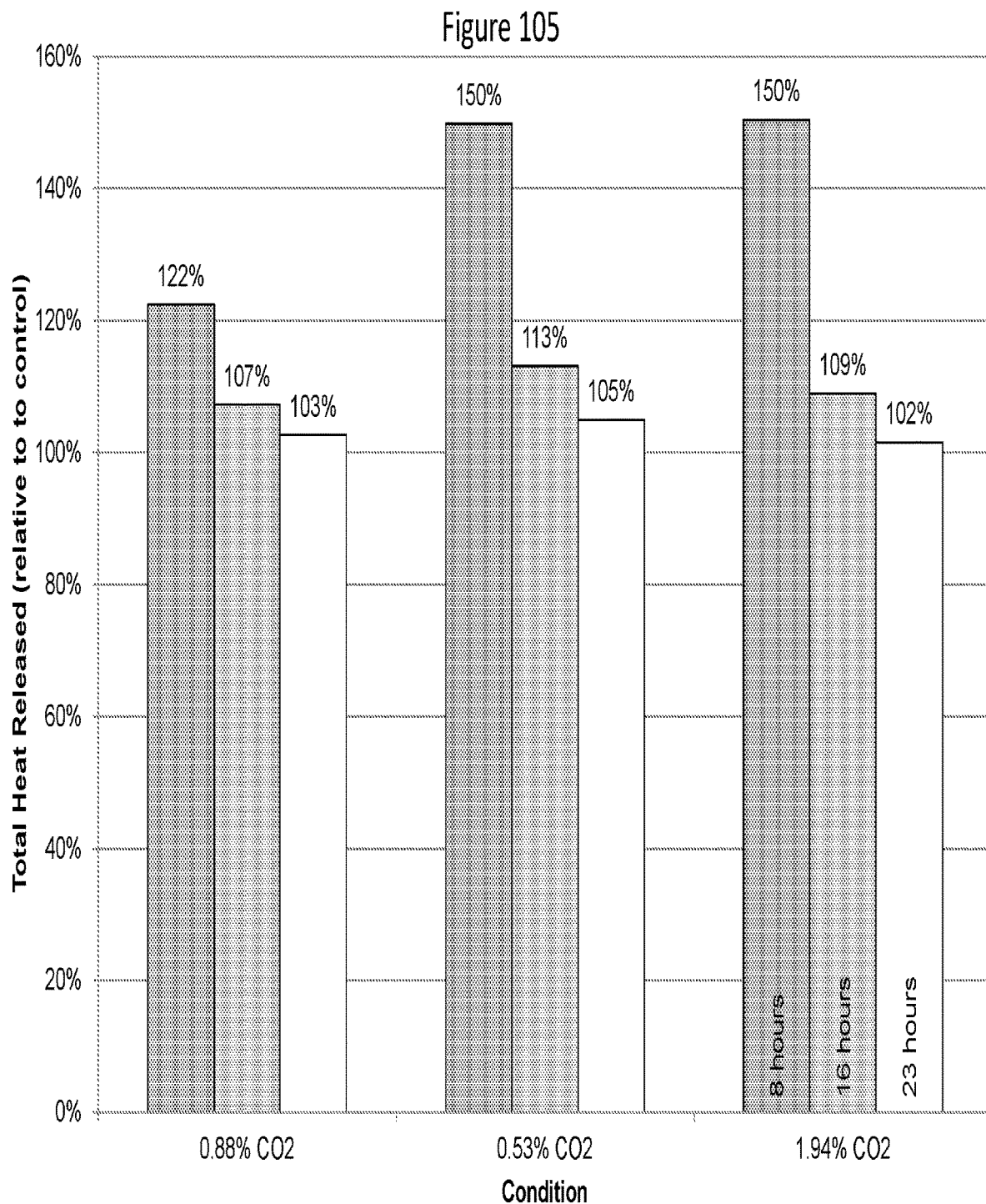
FIG. 105 shows results for a Titan Roanoake cement+Venture FA mix under three different carbonation conditions, at three different times, as total heat released relative to a control, uncarbonated mix, as described in Example 35.
Figure 106:
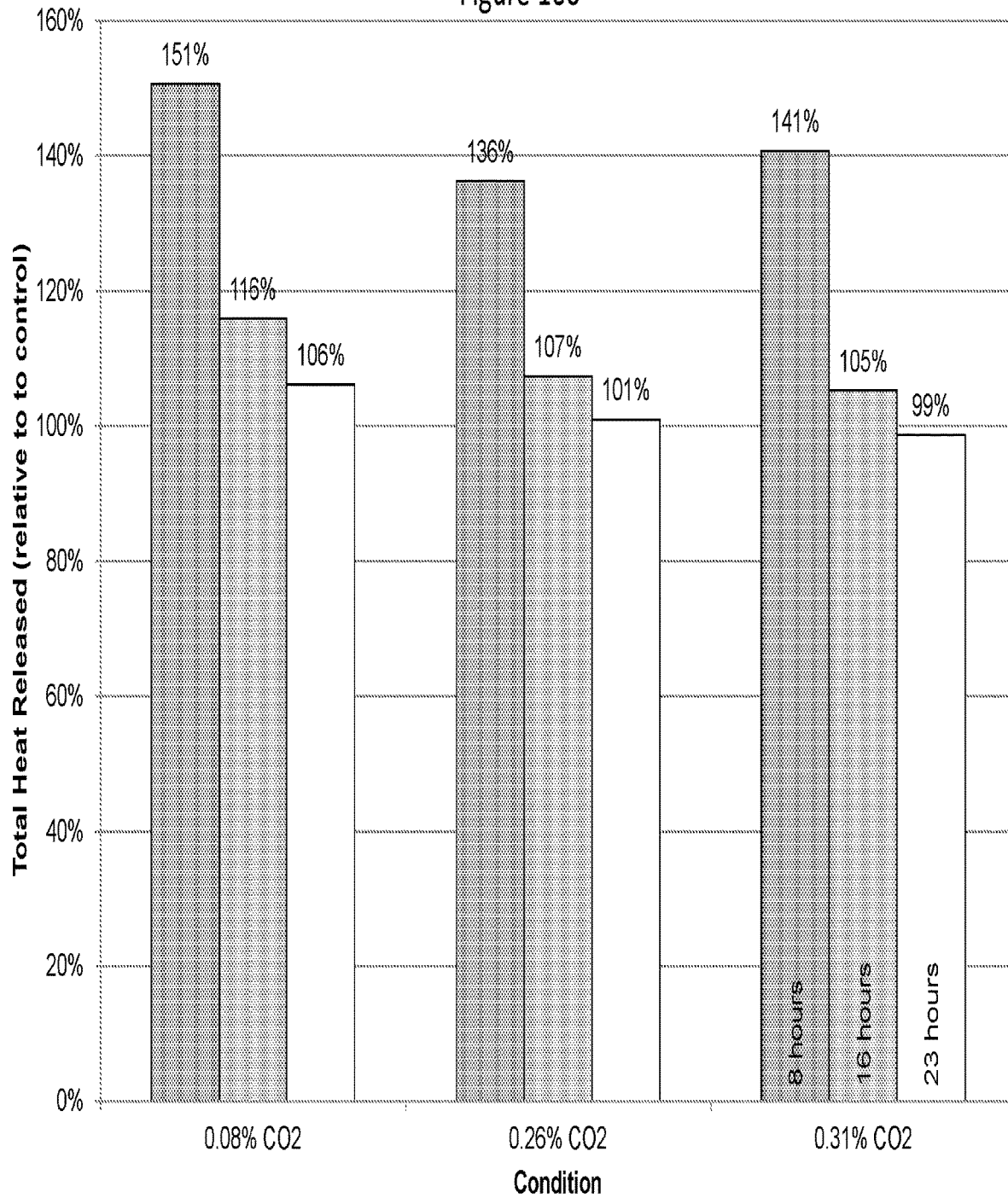
FIG. 106 shows results for an Argos cement+SEFA FA mix under three different carbonation conditions, at three different times, as total heat released relative to a control, uncarbonated mix, as described in Example 35.
Figure 107:
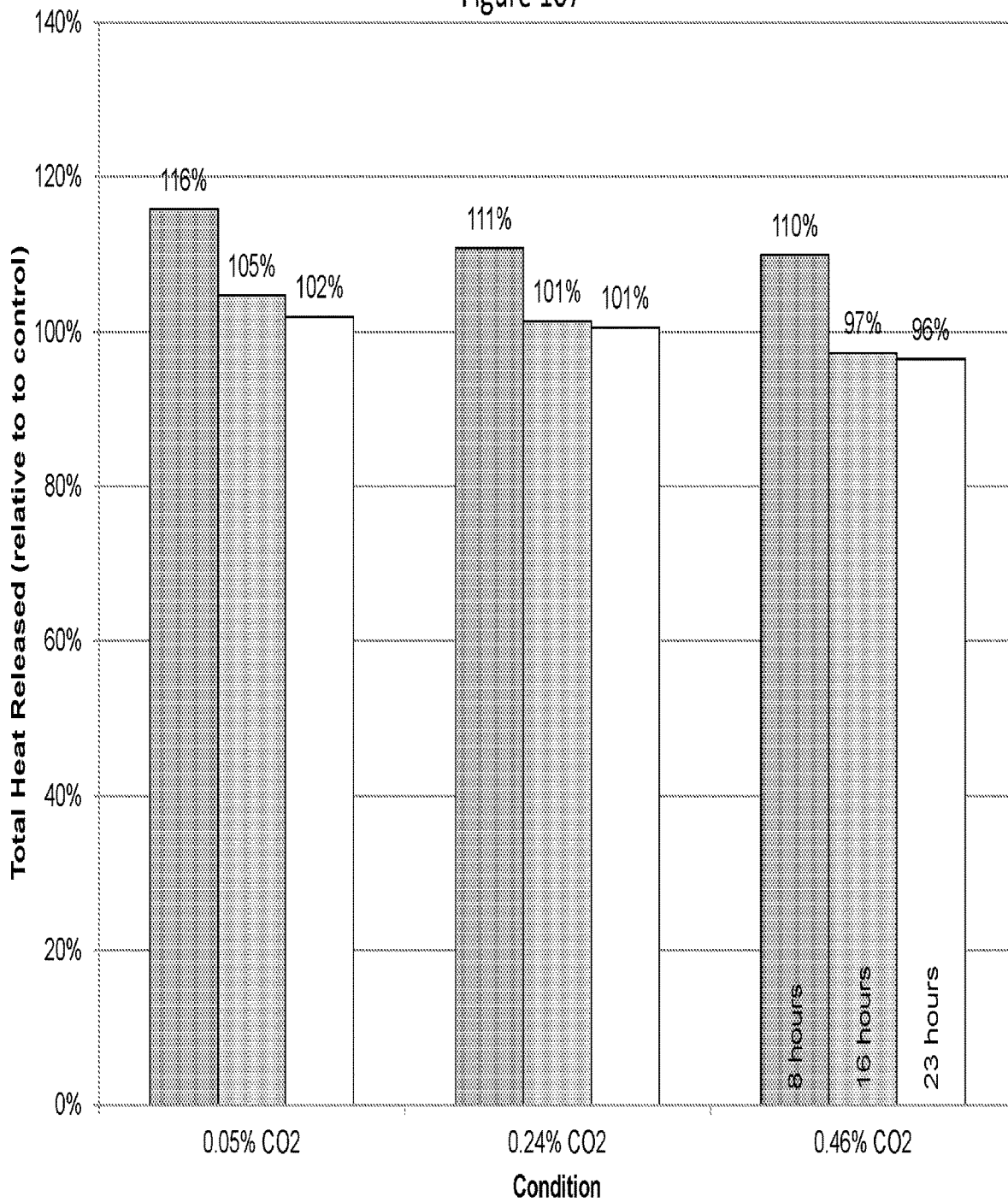
FIG. 107 shows results for a Cemex cement+SEFA FA mix under three different carbonation conditions, at three different times, as total heat released relative to a control, uncarbonated mix, as described in Example 35.
Figure 108:
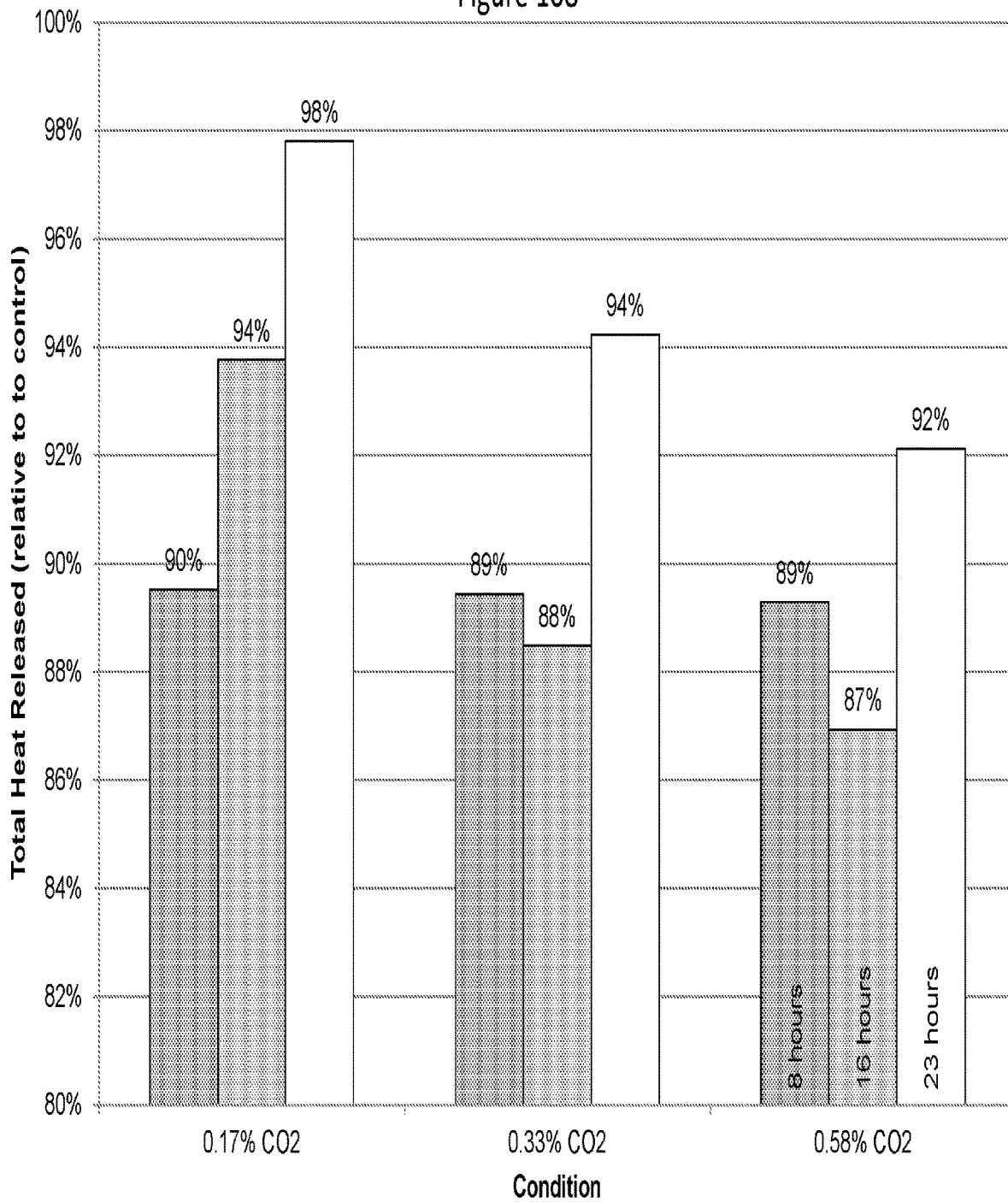
FIG. 108 shows results for a Holcim cement+SEFA FA mix under three different carbonation conditions, at three different times, as total heat released relative to a control, uncarbonated mix, as described in Example 35.
Figure 109:
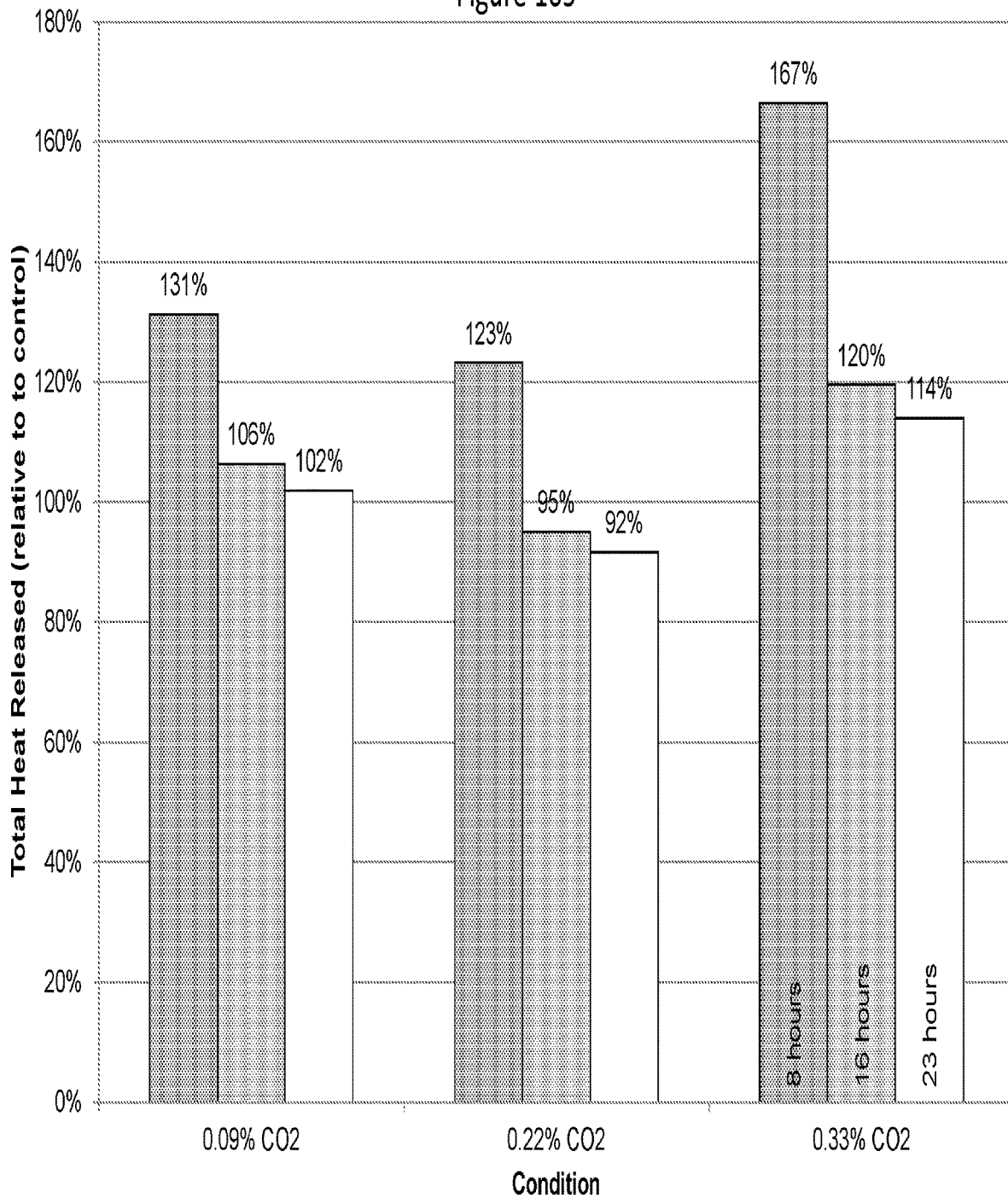
FIG. 109 shows results for a Titan Roanoake cement+SEFA FA mix under three different carbonation conditions, at three different times, as total heat released relative to a control, uncarbonated mix, as described in Example 35.

The results are shown in FIGS. 102-109. In each Figure, the $CO_2$ uptake for the particular mix is given for the three different carbon dioxide doses, and calorimetry, reported as total energy released at a discrete time interval (8, 16, and 23 hours after mixing) is shown, as a percent of uncarbonated control. FIG. 102 shows results for an Argos cement+Venture FA mix. FIG. 103 shows results for a Cemex cement+Venture FA mix. FIG. 104 shows results for a Holcim cement+Venture FA mix. FIG. 105 shows results for a Titan Roanoake cement+Venture FA mix. FIG. 106 shows results for an Argos cement+SEFA FA mix. FIG. 107 shows results for a Cemex cement+SEFA FA mix. FIG. 108 shows results for a Holcim cement+SEFA FA mix. FIG. 109 shows results for a Titan Roanoake cement+SEFA FA mix. In summary, for Venture ash: In all four cements an increased heat of hydration release was observed at 8 and 16 hours. Generally equivalent at 23 hours. For SEFA ash: Observed similar effect as Venture ash in 3 cements. Holcim was behind at the early ages and equivalent at 23 hours.

The greater energy release detected by calorimetry in the carbonated samples indicates probable early strength increase. This is important in SCM mixes, because producers in many markets stop using fly ash or slag during colder weather due to slower strength development.

Greater strength increases for the carbonated batches allows producers to use fly ash or slag in colder weather when slower strength development associated with SCMs would otherwise cause them to opt against using fly ash or slag.

This example demonstrates the use of low dose carbonation to accelerate strength development in concrete mixes utilizing an SCM, thus potentially partially or completely offsetting the retardation of strength development seen in these mixes when they are not carbonated.

Example 36

In this example the effects of low dose carbonation on reversing the retardation of early strength development in concretes containing an SCM, in this case, fly ash, was further studied.

One fly ash was used, Class F Trenton fly ash. Two ordinary portland cements were used, St Mary's Bowmanville (STMB) and Roanoake. The blend fraction was 80% cement, 20% fly ash The procedure was as follows:
Combine 1350 g of sand and 267.5 g of water in bowl and for mix 30s
Add 428 g of cement 107 g of fly ash and mix for 30s
For carbonated mortar, mix an additional 2, 4 or 6 minutes with a $CO_2$ flow rate of 0.15 LPM For control mortar mix an additional 4 minutes
Cast samples The batch was then sampled and calorimetry performed as described herein. Values derived from calorimetry were used as an alternative marker to strength development, also as described herein.

Figure 110:
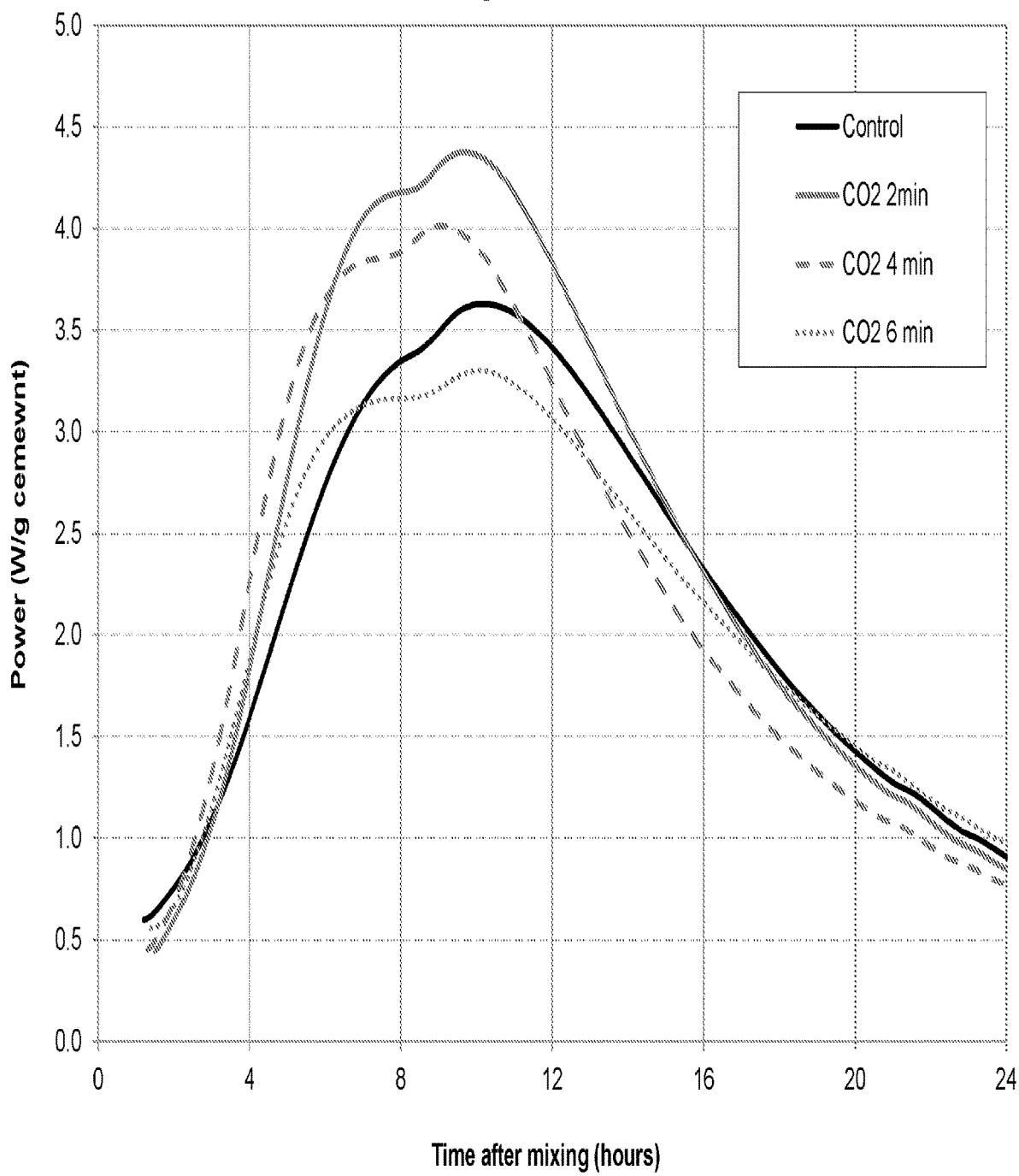
Figure 111:
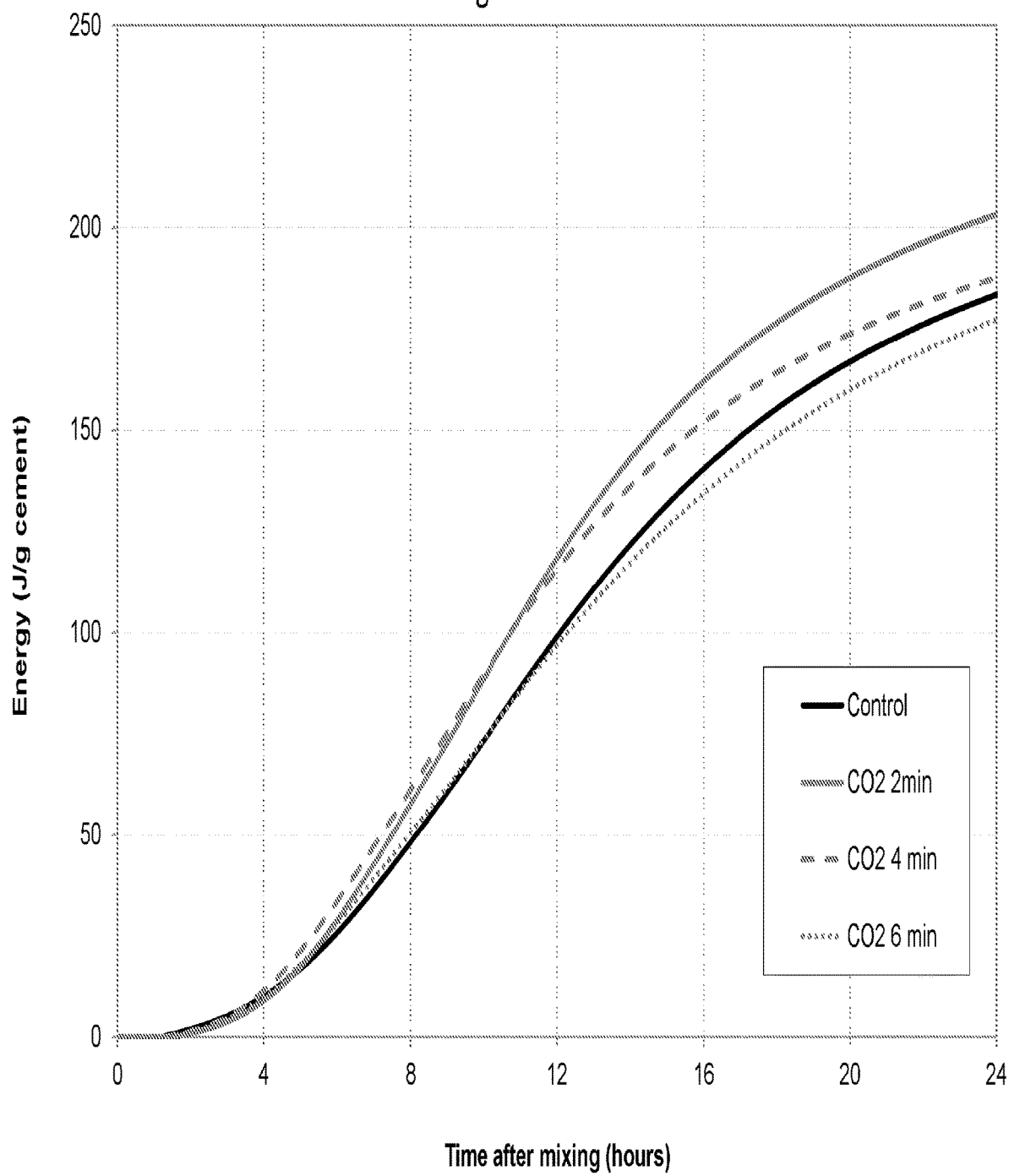
Figure 112:
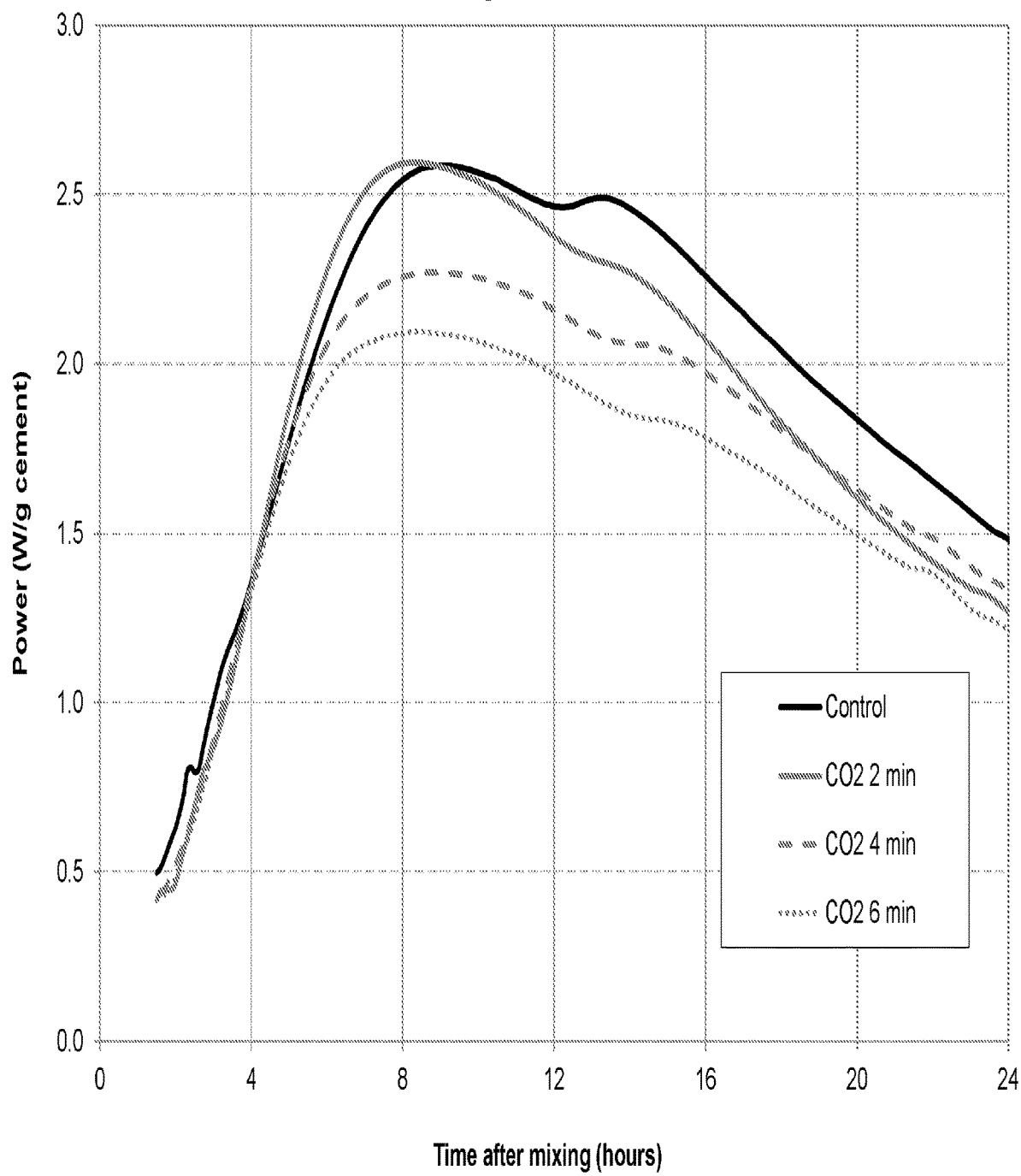
Figure 113:
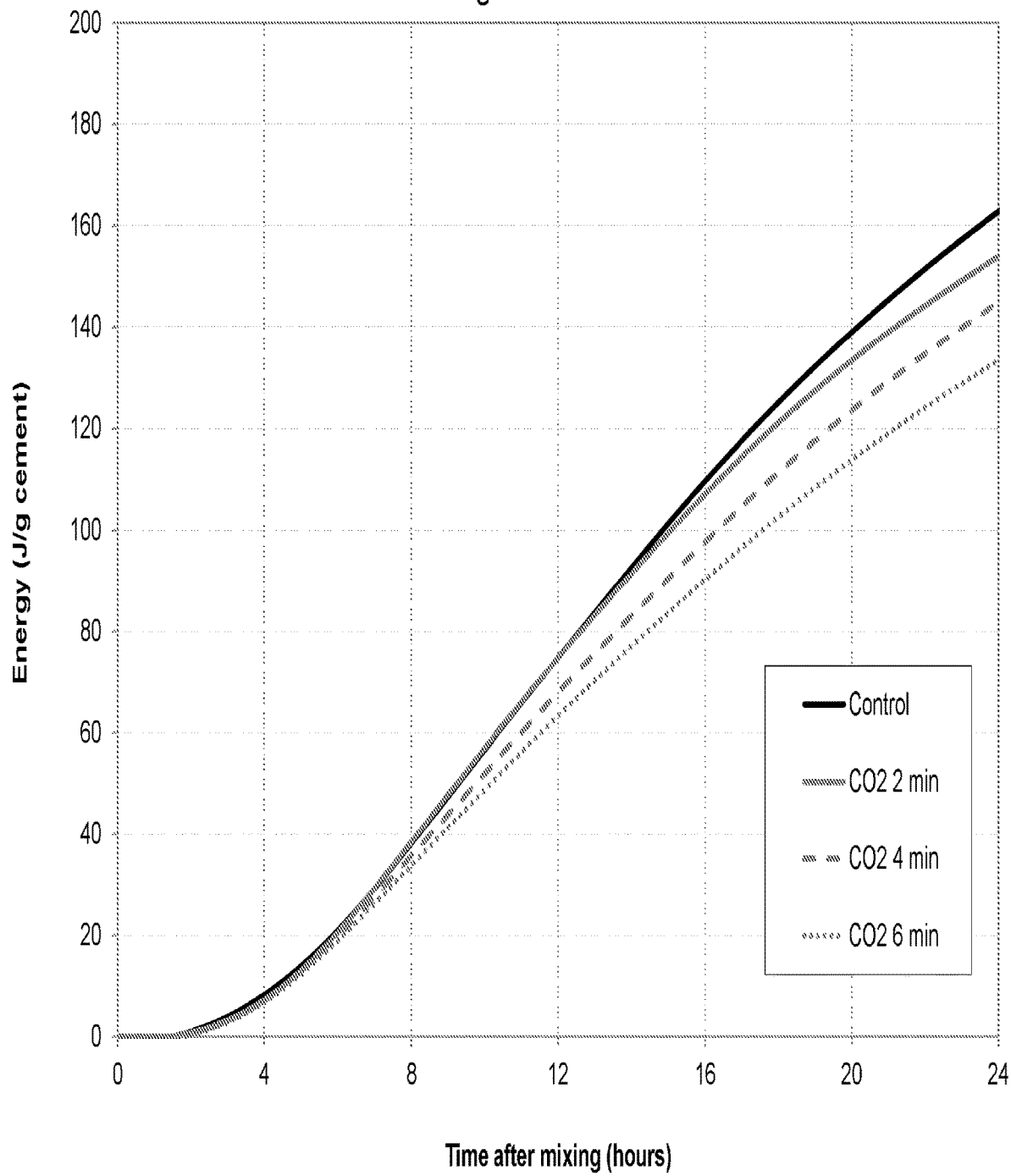

The calorimetry results for the Roanoake-Trenton blend are shown in FIGS. 110 (power) and 111 (energy) and in Table 38 (energy relative to control). The results for STMB cement are shown in FIGS. 112 (power) and 113 (energy) and in Table 39 (energy relative to control).

TABLE 38

Energy, via calorimetry, relative to control at specific time intervals for an 80/20 blend of Roanoake cement and Trenton fly ash

| Time After Mixing (h) | Control | $CO_2$ 2 min | $CO_2$ 4 min | $CO_2$ 6 min |
|---|---|---|---|---|
| 1 | — | — | — | — |
| 2 | 100% | 49% | 73% | 67% |
| 3 | 100% | 74% | 95% | 86% |
| 4 | 100% | 90% | 113% | 99% |
| 5 | 100% | 103% | 126% | 107% |
| 6 | 100% | 112% | 130% | 109% |
| 7 | 100% | 117% | 130% | 107% |
| 8 | 100% | 120% | 127% | 105% |
| 9 | 100% | 121% | 125% | 102% |
| 10 | 100% | 121% | 122% | 100% |
| 11 | 100% | 120% | 120% | 99% |
| 12 | 100% | 120% | 117% | 98% |
| 13 | 100% | 119% | 114% | 97% |
| 14 | 100% | 117% | 112% | 96% |
| 15 | 100% | 116% | 110% | 96% |
| 16 | 100% | 115% | 108% | 96% |
| 17 | 100% | 114% | 107% | 96% |
| 18 | 100% | 114% | 106% | 96% |
| 19 | 100% | 113% | 105% | 96% |
| 20 | 100% | 112% | 104% | 96% |
| 21 | 100% | 112% | 104% | 96% |
| 22 | 100% | 112% | 103% | 96% |
| 23 | 100% | 111% | 103% | 96% |
| 24 | 100% | 111% | 102% | 97% |

TABLE 39

Energy, via calorimetry, relative to control at specific time intervals for an 80/20 blend of St Mary's Bowmanville cement and Trenton fly ash

| Time After Mixing (h) | Control | $CO_2$ 2 min | $CO_2$ 4 min | $CO_2$ 6 min |
|---|---|---|---|---|
| 1 | — | — | — | — |
| 2 | 100% | 80% | 68% | 48% |
| 3 | 100% | 83% | 81% | 73% |
| 4 | 100% | 88% | 88% | 83% |
| 5 | 100% | 94% | 93% | 89% |
| 6 | 100% | 98% | 95% | 91% |
| 7 | 100% | 100% | 95% | 90% |
| 8 | 100% | 101% | 94% | 88% |
| 9 | 100% | 101% | 92% | 87% |
| 10 | 100% | 101% | 92% | 86% |
| 11 | 100% | 100% | 91% | 85% |
| 12 | 100% | 100% | 91% | 85% |
| 13 | 100% | 99% | 90% | 84% |
| 14 | 100% | 99% | 90% | 83% |
| 15 | 100% | 98% | 89% | 83% |
| 16 | 100% | 98% | 89% | 82% |
| 17 | 100% | 97% | 89% | 82% |
| 18 | 100% | 97% | 89% | 82% |
| 19 | 100% | 96% | 89% | 82% |
| 20 | 100% | 96% | 89% | 82% |
| 21 | 100% | 96% | 89% | 82% |
| 22 | 100% | 95% | 89% | 82% |
| 23 | 100% | 95% | 89% | 82% |
| 24 | 100% | 95% | 89% | 82% |

There was strong acceleration observed in the Roanoake-Trenton blend. The 2 min dose (0.06% bwc $CO_2$ uptake) saw more energy released than the control at ages beyond 5 hours, with at least 20% more energy observed through the interval of 8 to 12 hours. Total energy released at 24 hours was 111% of the control. The 4 min dose (0.26% bwc $CO_2$ uptake) saw more energy released than the control at all times greater than 4 hours with the benefit exceeding 10% from 6 hours to 15 hours. The maximum reached 30% more at 6 to 7 hours. Total energy released at 24 hours was 102% of the control. The 6 min dose (0.38% bwc $CO_2$ uptake) released slightly more energy that the control through the ages 5 to 9 hours (max 9% ahead at 6 hours). Total energy released at 24 hours was 97% of the control.

In contrast, there was no acceleration observed in the St Mary's-Trenton blend. The 2 min dose (0.14% bwc $CO_2$ uptake) saw less energy released than the control at all ages except the interval of 7 to 12 hours when it was equivalent. Total energy released at 24 hours was 95% of the control. The 4 min dose (0.27% bwc $CO_2$ uptake) saw less energy released than the control at all ages. The maximum was 95% in the interval of 6 to 7 hours. Total energy released at 24 hours was 89% of the control. The 6 min dose (0.48% bwc $CO_2$ uptake) saw less energy released than the control at all ages. The maximum was 91% at 6 hours. Total energy released at 24 hours was 82% of the control.

This Example is a further demonstration of the effects of mix type on the carbonation results, with markedly different results being obtained depending on the cement used in the mix—virtually no effect of carbonation in the STMB-Trenton mix, and a pronounced effect in the Roanoake-Trenton mix. The effect of carbonation in a given mix is best studied in that mix; this may be especially important in cement/SCM blends, in which both the specific type of cement and the specific type of SCM may contribute reactive species that influence the course and/or effect of carbonation. This Example also illustrates that, with the proper cement/SCM mix, carbonation of the mix, e.g., with low doses of carbon dioxide, can accelerate the development of early strength, as indicated by calorimetry; in some cases the acceleration can be quite marked, even at a relatively low dose of carbon dioxide. Finally, a given mix may demonstrate different time courses of acceleration of strength development; this can be useful in certain field conditions when a particular operation is desired to be carried out at a particular time after the mix is poured, e.g., removal of molds, finishing, and the like, which require a certain strength of the concrete. Earlier times of accelerated strength development could be desired to, e.g., shorten the time that the concrete is in the mold, while later times of accelerated strength development could be desired to, e.g., allow concrete finishing to occur earlier.

Example 37

In this Example the use of bicarbonate as a source of carbonate in the carbonation of cement mixes was studied.

As described elsewhere herein, and without being bound by theory, the relevant reactions in carbonation of cement mixes or other mixes containing the requisite reactive species are:

1. Dissolution of gas in water to form dissolved carbon dioxide:

$CO_2(g) \rightarrow CO_2(\text{solution})$

2. Reaction of dissolved carbon dioxide with water to form carbonic acid:

$H_2O + CO_2(\text{solution}) \rightarrow H_2CO_3(aq)$

3. Reaction of carbonic acid with hydroxide or other base to form bicarbonate:

$H_2CO_3(aq) + OH^-(aq) \rightarrow HCO_3^-(aq) + H_2O(l)$

4. Reaction of bicarbonate with hydroxide or other base to form carbonate:

$HCO_3^-(aq) + OH^-(aq) \rightarrow CO_3^{2-}(aq) + H_2O(l)$

5. Reaction of carbonate with calcium (or alternative ion) to form solid carbonate:

$CO_3^{2-}(aq) + Ca^{2+}(aq) \rightarrow CaCO_3(s)$

There are a number of points where the conditions under which the reactions are taking place can affect various steps in the carbonation. The dissolution of carbon dioxide in water, 1, is affected by temperature, the presence or absence of catalysts, and other factors. Similarly, the formation of carbonic acid, 2, is affected by the pH of the water, etc., as is the reaction of carbonic acid with hydroxide or other base to form bicarbonate, 3. The base for the reaction of 3 need not be a strong base, as the $pK_a$ for this reaction is relatively low, around 7 or so, so that the reaction could be occurring even in the mix water in embodiments in which carbon dioxide is added to the mix water. The processes of 1 and 2 may be circumvented by using carbon dioxide-charged water (e.g., mix water) in a test; depending on the pH of the mix water, process 3 may also be partially or completely circumvented as well. The use of bicarbonate solution does circumvent all of processes 1, 2, and 3, allowing just carbonation of the cement mix to be tested.

In the present Example, a bicarbonate solution is used as a source of substrate to be converted o carbonate in tests of carbonation of cement mixes. By removing the variables associated with dissolution and conversion to carbonic acid and bicarbonate, just the effects of the cement and other reactive components of the mix may be analyzed, to get a rapid and accurate picture of cement and other effects alone. It is possible to determine whether or not carbonation is effective with a given cement or cement mix, and to determine the optimum or desired level of carbonation to be achieved, since all or substantially all of the bicarbonate is converted to carbonate in the reactions in the mixing cement mix. The effects of various doses on the timing of strength increase can also be observed. In this way, the focus in the field can be shifted to achieving the desired carbonation, given the conditions of mix water, mix time, timing of batch operations, source of carbon dioxide, potential feedback control, and the like, to achieve consistent and efficient carbonation in the field. Lab results can be used in preliminary field test to confirm the carbonation dose and to demonstrate the effectiveness of carbonation, before relying on delivery of carbon dioxide to the cement mix in the field.

Where one $CO_2$ molecule forms a single bicarbonate molecule, an effective $CO_2$ dose as sodium bicarbonate can be calculated as follows:

$CO_2(\text{as bicarb}) = (\text{dose } CO_2)^*(\text{Molar Mass Sodium Bicarbonate/Molar Mass } CO_2)$ Thus: $CO_2(\text{as bicarb}) = (\text{dose } CO_2)^*(84/44) = (\text{dose } CO_2)^*1.91$ For example, a 0.10% bwc $CO_2$ dose would require a 0.191% bwc dose of sodium bicarbonate Two different cements were used in the tests, Lafarge Brookfield (LAFB) and St Mary's Bowmanville (STMB), with the batch plan shown in Table 40

TABLE 40

Dosage plan for bicarbonate testing

| Batch | Mass Cement (g) | Water 1 (g) | Water 2 (g) | Mass NaHCO₃ (g) | Dosage NAHCO₃ (% bwc) | Equivalent CO₂ dose (bwc) | Total Water Mass (g) |
|---|---|---|---|---|---|---|---|
| 1 | 535 | 53.5 | 250 | 0 | — | — | 303.5 |
| 2 | 535 | 53.5 | 250 | 0.5 | 0.09% | 0.05% | 303.5 |
| 3 | 535 | 53.5 | 250 | 1.0 | 0.18% | 0.10% | 303.5 |
| 4 | 535 | 53.5 | 250 | 2.0 | 0.37% | 0.20% | 303.5 |

The Mix Procedure was as Follows:

Add sodium bicarbonate (NaHCO₃) into water 2 and stir thoroughly to dissolve

Combine sand and water 1 (10% of cement mass) in bowl and mix 30s

Add cement to bowl and mix 30s

Add water 2 over designated timeframe (4 minutes)

Mix an additional 30s

The batch was then sampled and calorimetry performed as described herein. Values derived from calorimetry were used as an alternative marker to strength development, also as described herein.

Figure 114:
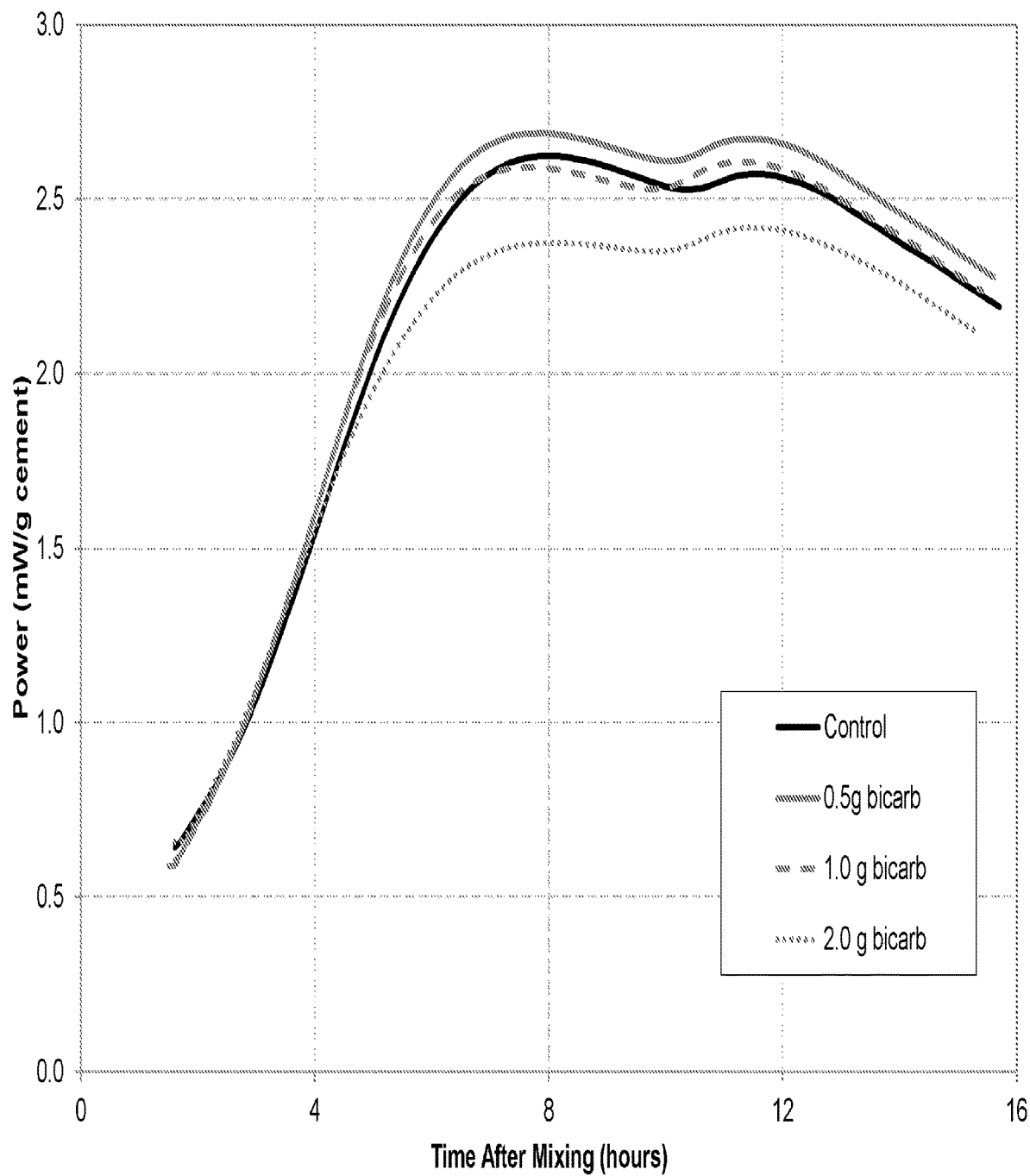
Figure 115:
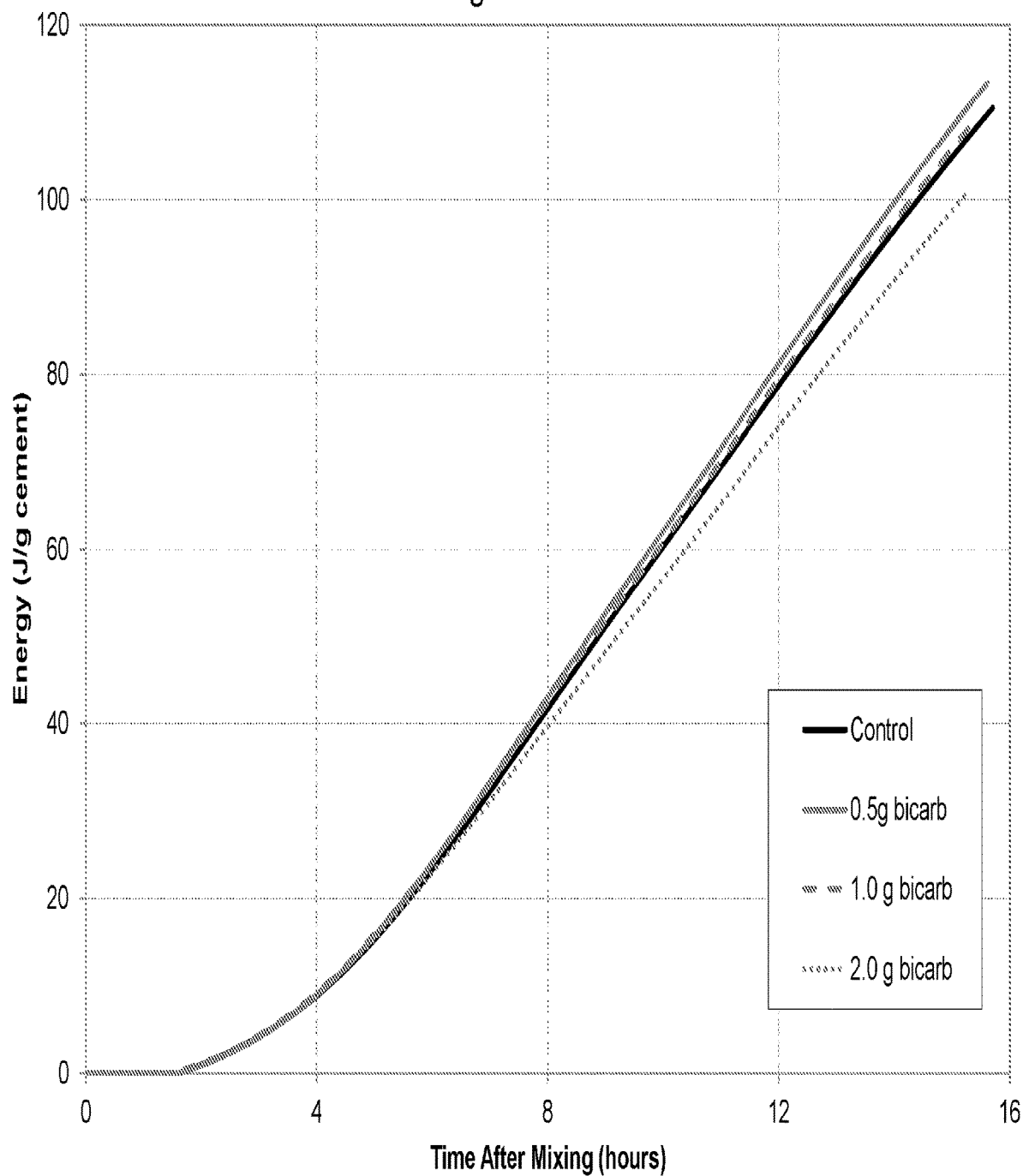
Figure 116:
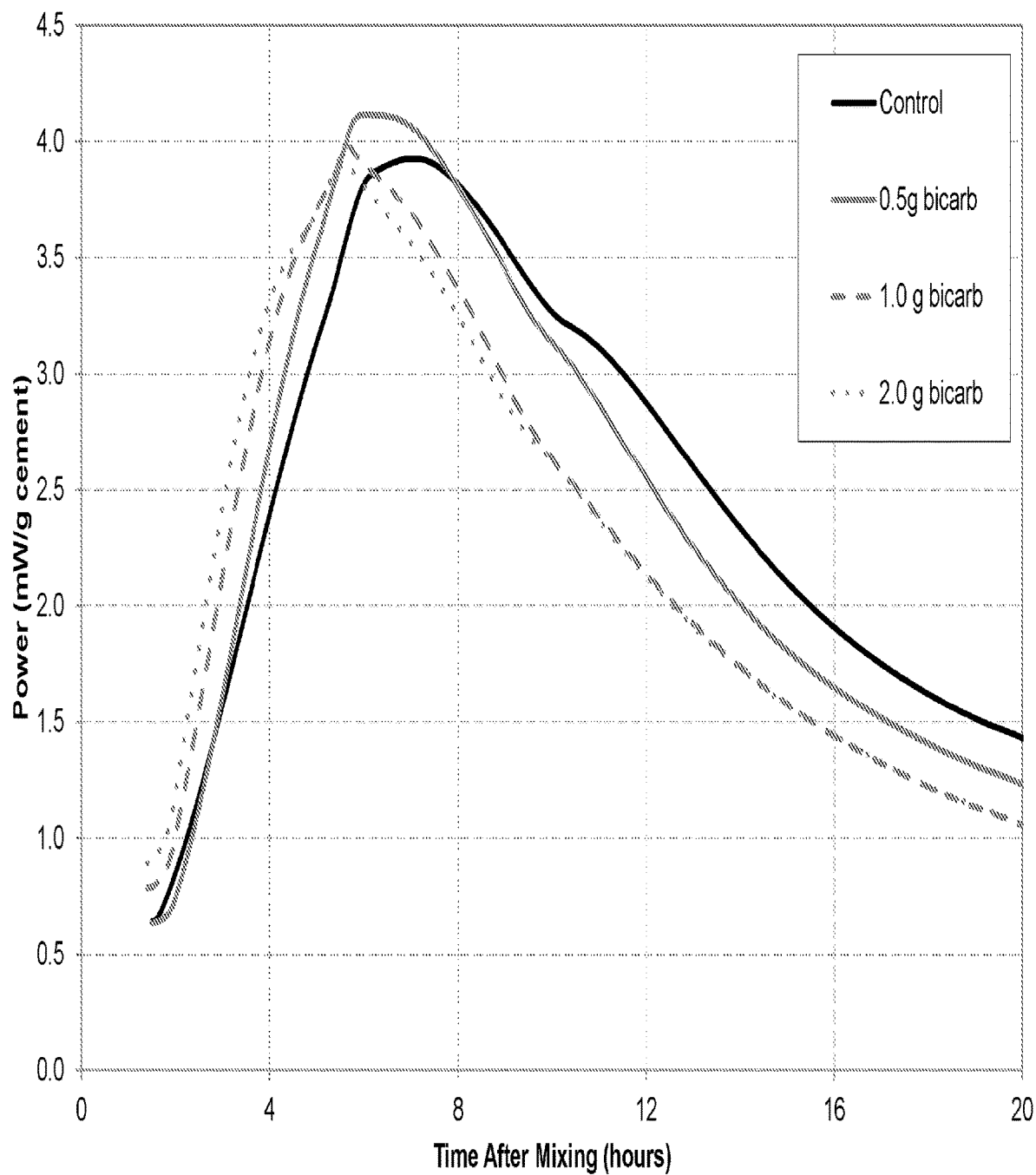
Figure 117:
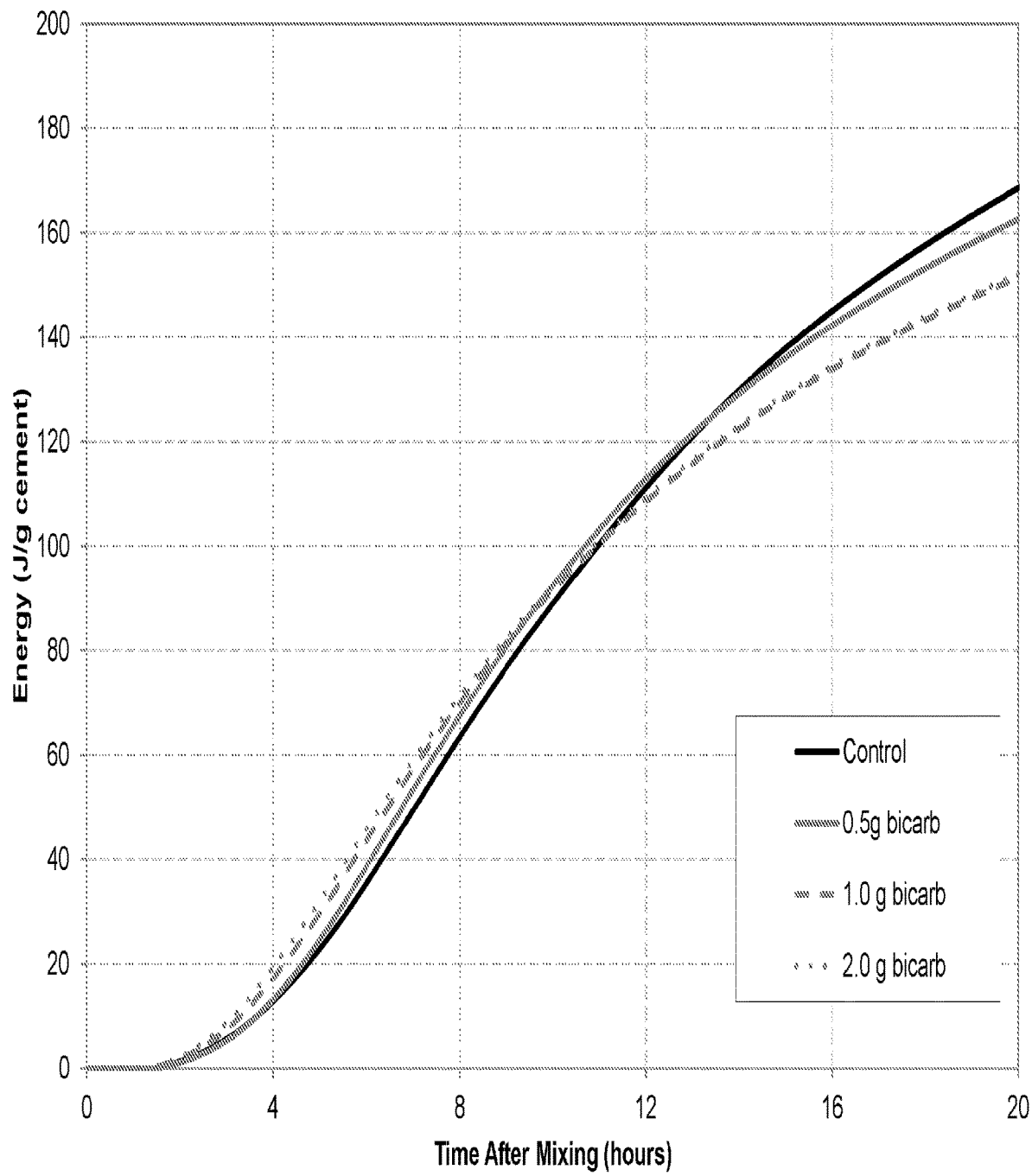

The results for STMB cement are shown in FIGS. 114 (power) and 115 (energy) and in Table 41 (energy relative to control). The results for LAFB cement are shown in FIGS. 116 (power) and 117 (energy) and in Table 42 (energy relative to control).

TABLE 41

Energy, via calorimetry, relative to control at specific time intervals for STMB cement mixed with sodium bicarbonate

| Time After Mixing (h) | Control | 0.09% bicarb | 0.18% bicarb | 0.37% bicarb |
|---|---|---|---|---|
| 1 | — | — | — | — |
| 2 | 100% | 95% | 116% | 100% |
| 3 | 100% | 99% | 104% | 102% |
| 4 | 100% | 101% | 104% | 102% |
| 5 | 100% | 103% | 104% | 101% |
| 6 | 100% | 103% | 103% | 98% |

TABLE 41-continued

Energy, via calorimetry, relative to control at specific time intervals for STMB cement mixed with sodium bicarbonate

| Time After Mixing (h) | Control | 0.09% bicarb | 0.18% bicarb | 0.37% bicarb |
|---|---|---|---|---|
| 7 | 100% | 103% | 103% | 97% |
| 8 | 100% | 103% | 102% | 95% |
| 9 | 100% | 103% | 101% | 94% |
| 10 | 100% | 103% | 101% | 94% |
| 11 | 100% | 103% | 101% | 94% |
| 12 | 100% | 103% | 101% | 94% |
| 13 | 100% | 103% | 101% | 94% |
| 14 | 100% | 103% | 101% | 94% |
| 15 | 100% | 103% | 101% | 94% |

TABLE 42

Energy, via calorimetry, relative to control at specific time intervals for LAFB cement mixed with sodium bicarbonate

| Time After Mixing (h) | Control | 0.09% bicarb | 0.18% bicarb | 0.37% bicarb |
|---|---|---|---|---|
| 1 | — | — | — | — |
| 2 | 100% | 92% | 141% | 163% |
| 3 | 100% | 95% | 133% | 155% |
| 4 | 100% | 103% | 134% | 151% |
| 5 | 100% | 107% | 130% | 140% |
| 6 | 100% | 109% | 123% | 129% |
| 7 | 100% | 108% | 116% | 120% |
| 8 | 100% | 106% | 110% | 112% |
| 9 | 100% | 105% | 106% | 107% |
| 10 | 100% | 104% | 103% | 104% |
| 11 | 100% | 103% | 100% | 101% |
| 12 | 100% | 102% | 98% | 98% |
| 13 | 100% | 100% | 96% | 96% |
| 14 | 100% | 99% | 94% | 95% |
| 15 | 100% | 99% | 93% | 94% |
| 16 | 100% | 98% | 92% | 93% |
| 17 | 100% | 98% | 92% | 92% |
| 18 | 100% | 97% | 91% | 91% |
| 19 | 100% | 97% | 90% | 91% |
| 20 | 100% | 96% | 90% | 90% |

The results confirm those of previous Examples that show that the effects of carbonation are highly dependent on cement type used. In the batches in which STMB cement was used, the bicarbonate had almost no effect on the calorimetry, at any dose, whereas in the LAFB batches, carbonation at all doses caused an increase in early hydration, similar to Example 33, with the effect being dose-dependent. 2.0 g of bicarbonate was the best of three doses with a 63% increase in energy at two hours gradually declining to 12% at 8 hours.

This Example demonstrates the use of bicarbonate in testing of carbonation of different cement mixes, in order to examine effects of carbonation alone, without dissolution and early reaction effects, and demonstrates that different cements react differently to carbonation. The results of the use of bicarbonate with the LAFB and STMB cements were in agreement with results from carbonation using carbon dioxide with these cements, confirming that bicarbonate can be used as a carbonation testing tool.

Example 38

In this Example, carbonated mix water was used as the source of carbon dioxide for carbonation of cement mixes, and the effects of delaying the addition of the carbonated mix water, or duration of addition of the carbonated mix water were tested.

In a first test, carbonated mix water was added at the beginning of mixing or after a short delay. This allows the testing to concern itself with timing of the $CO_2$ in the mixing process rather than with a gas-to-solution reaction, i.e., to circumvent reactions 1 and 2 shown in Example 37 Carbonated water was Perrier.

The mix procedure was as follows:

Combine sand, tap water 1 (53.5 g), carbonated water 1 (either no carbonation or carbonated) and cement in bowl—mix 60s Add both tap water 2 and carbonated water 2 (carbonated) to bowl over 10s—mix 60s Mix mortar for an additional 1 min Cast for strength, $CO_2$ and calorimetry The batch plan was as shown in Table 43.

TABLE 43

Carbonated timing work batches

| Batch | Cement (g) | Tap Water 1 (g) | Carb Water 1 (g) | Tap Water 2 (g) | Carb. Water 2 (g) | Total pre-wet |
|---|---|---|---|---|---|---|
| 1 | 535 | 267.5 | 0 | 0 | 0 | 267.5 |
| 2 | 535 | 53.5 | 0 | 214 | 0 | 53.5 |
| 3 | 535 | 53.5 | 214 | 0 | 0 | 267.5 |
| 4 | 535 | 53.5 | 0 | 0 | 214 | 53.5 |

The batch was then sampled and calorimetry performed as described herein. Values derived from calorimetry were used, also as described herein.

Figure 118:
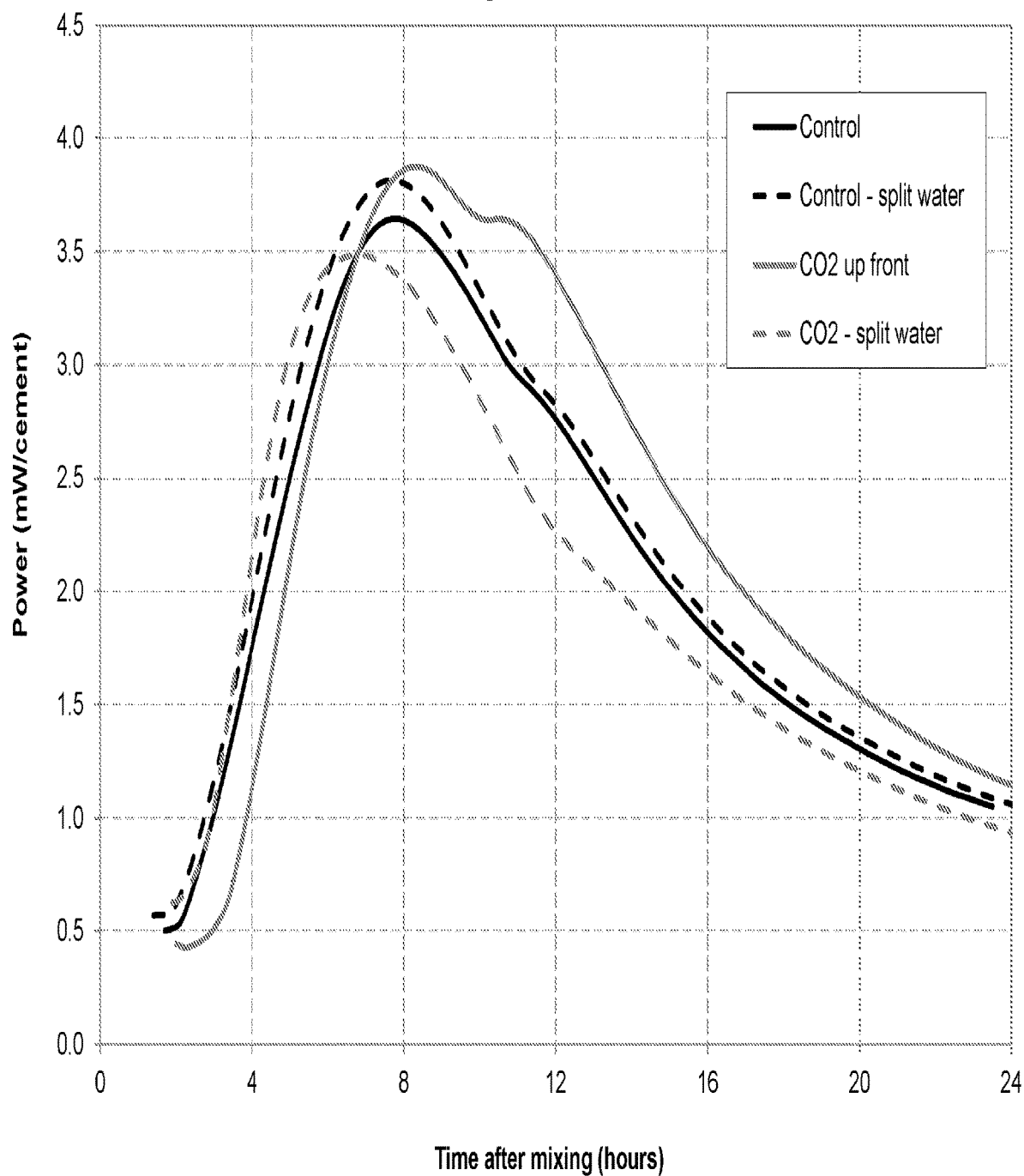
Figure 119:
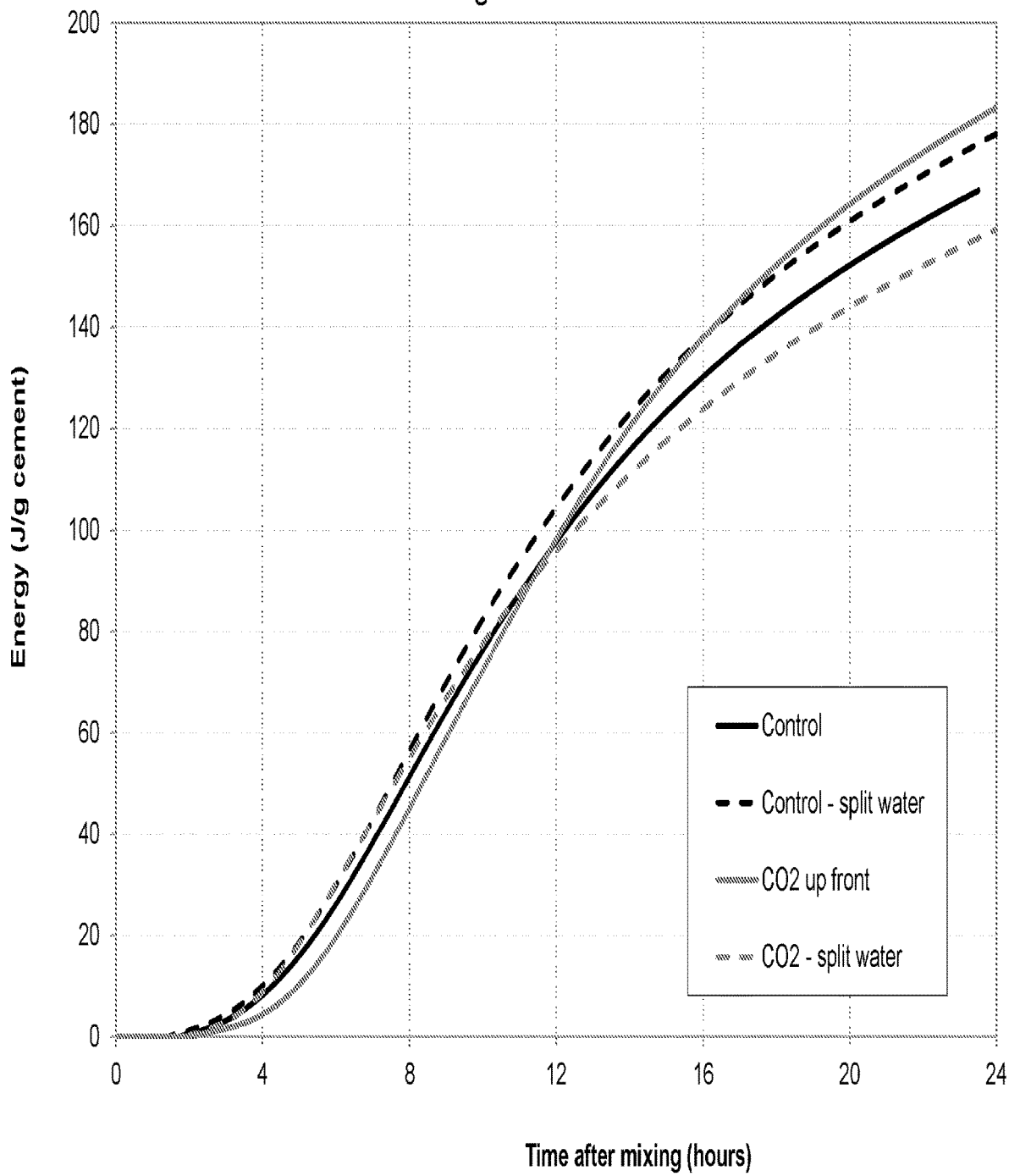
Figure 120:
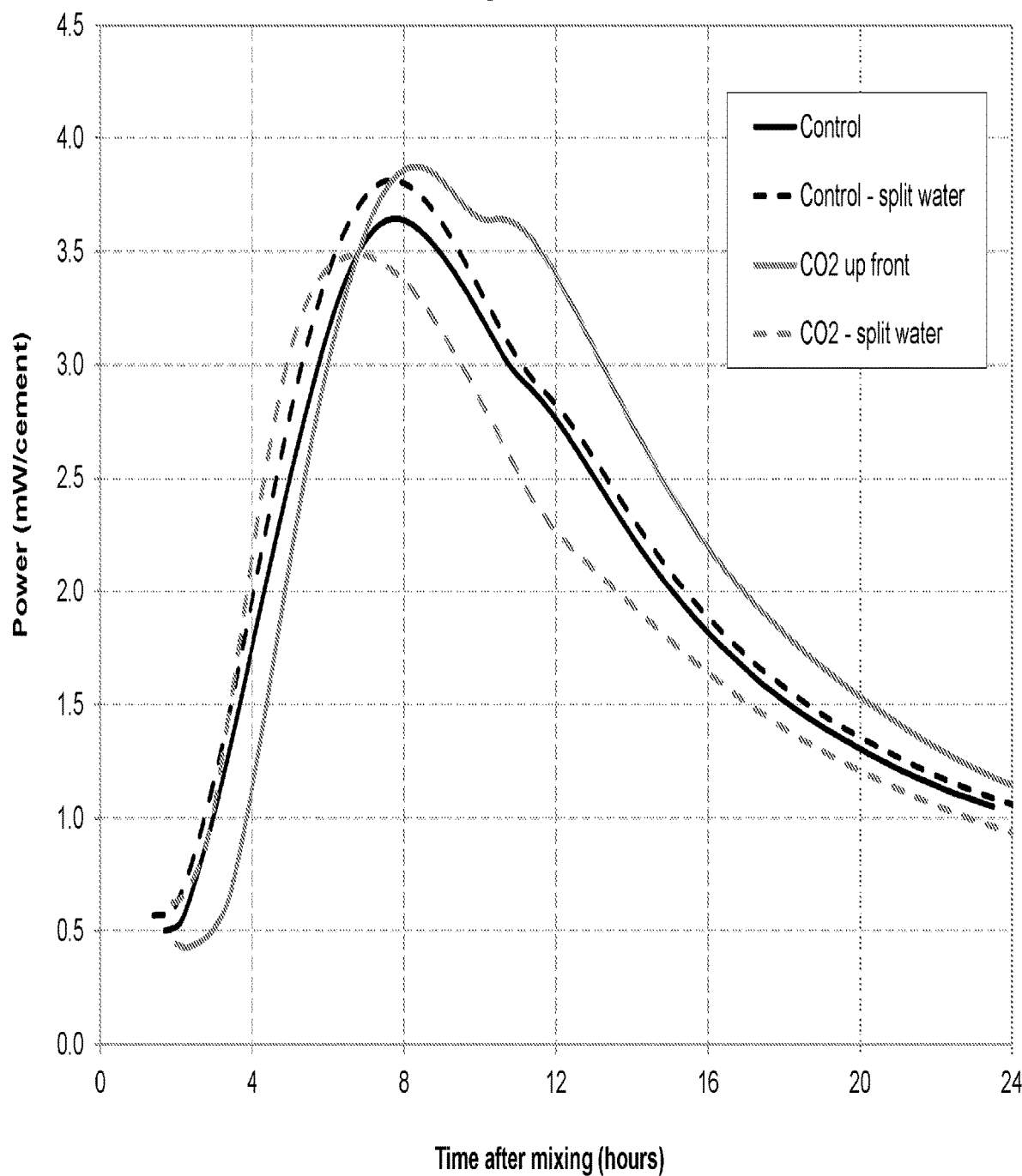
Figure 121:
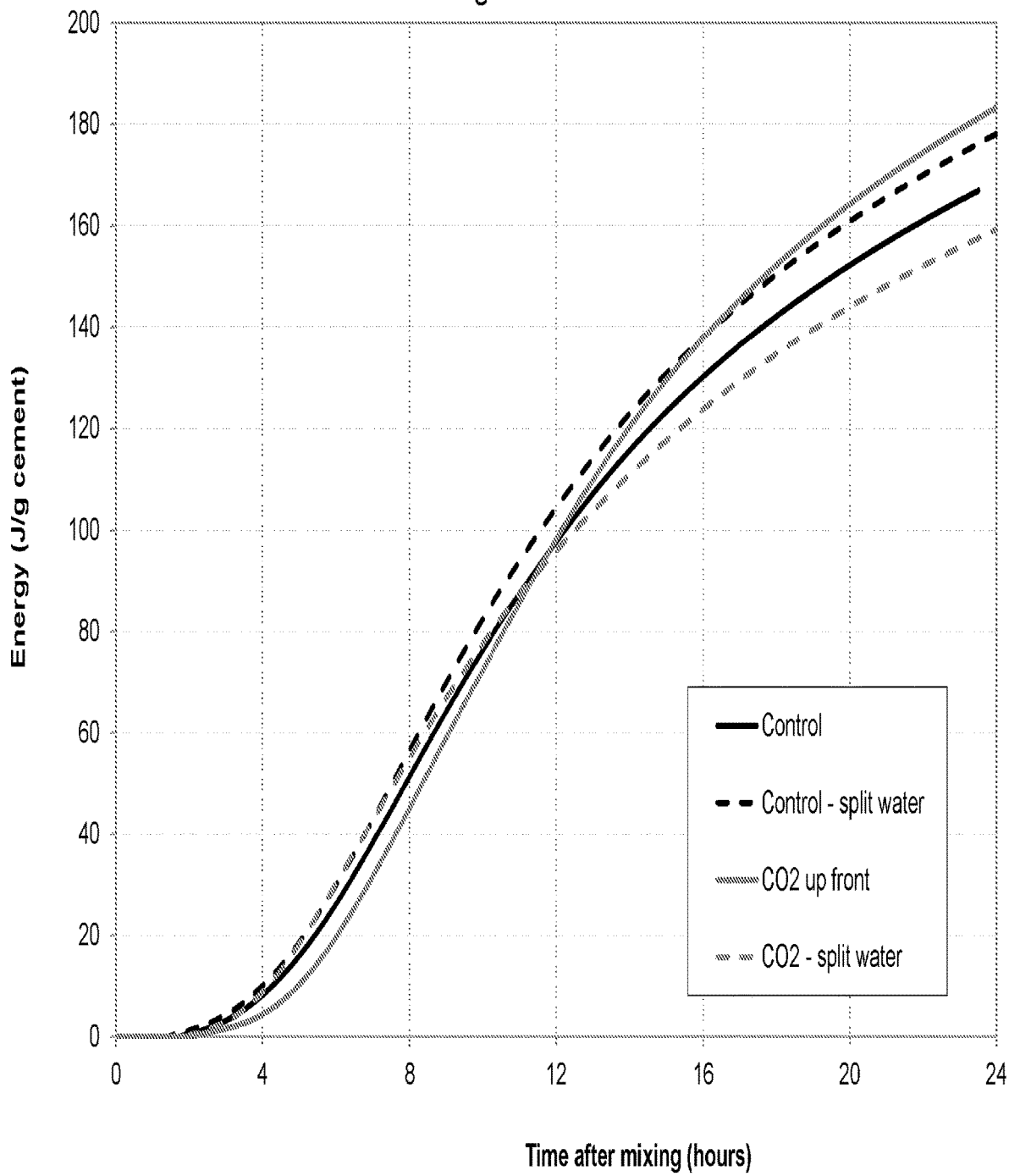

The results for STMB cement are shown in FIGS. 118 (power) and 119 (energy) and in Table 44 (energy relative to control). The results for LAFB cement are shown in FIGS. 120 (power) and 121 (energy) and in Table 45 (energy relative to control).

TABLE 44

Energy, via calorimetry, relative to control at specific time intervals for STMB cement subjected to different mix water compositions and timings.

| Time After Mixing (h) | Control | Control - split water | CO2 up front | CO2 - split water |
|---|---|---|---|---|
| 2 | 100% | 94% | 0% | 134% |
| 3 | 100% | 103% | 37% | 122% |
| 4 | 100% | 103% | 46% | 124% |
| 5 | 100% | 103% | 54% | 125% |
| 6 | 100% | 103% | 62% | 123% |
| 7 | 100% | 103% | 70% | 119% |
| 8 | 100% | 103% | 76% | 116% |
| 9 | 100% | 103% | 81% | 112% |
| 10 | 100% | 103% | 85% | 110% |
| 11 | 100% | 103% | 88% | 108% |
| 12 | 100% | 103% | 90% | 106% |
| 13 | 100% | 103% | 91% | 104% |
| 14 | 100% | 103% | 92% | 103% |
| 15 | 100% | 103% | 93% | 101% |
| 16 | 100% | 103% | 93% | 100% |
| 17 | 100% | 103% | 94% | 99% |
| 18 | 100% | 103% | 94% | 98% |
| 19 | 100% | 103% | 94% | 97% |

TABLE 45

Energy, via calorimetry, relative to control at specific time intervals for LAFB cement subjected to different mix water compositions and timings.

| Time After Mixing (h) | Control | Control - split water | CO2 up front | CO2 - split water |
|---|---|---|---|---|
| 2 | 100% | 227% | 0% | 41% |
| 3 | 100% | 137% | 51% | 94% |
| 4 | 100% | 122% | 53% | 107% |
| 5 | 100% | 117% | 65% | 115% |
| 6 | 100% | 114% | 75% | 115% |
| 7 | 100% | 112% | 82% | 111% |
| 8 | 100% | 110% | 88% | 107% |
| 9 | 100% | 109% | 92% | 104% |
| 10 | 100% | 108% | 95% | 102% |
| 11 | 100% | 107% | 98% | 100% |
| 12 | 100% | 107% | 101% | 98% |
| 13 | 100% | 106% | 103% | 97% |
| 14 | 100% | 106% | 104% | 96% |
| 15 | 100% | 106% | 105% | 95% |
| 16 | 100% | 106% | 106% | 95% |
| 17 | 100% | 106% | 107% | 95% |
| 18 | 100% | 106% | 107% | 95% |
| 19 | 100% | 106% | 108% | 95% |
| 20 | 100% | 106% | 108% | 95% |
| 21 | 100% | 106% | 108% | 95% |
| 22 | 100% | 106% | 108% | 94% |
| 23 | 100% | 106% | 108% | 94% |

For the STMB cement, the addition of carbonated water as part of the mix water showed a retardation up to 10 hours (less than 85% of the energy released by the control) before reaching 93% of the energy released by the control at ages greater than 15 hours. In contrast, the delayed addition of the same amount of mix water showed that energy release was more than 15% ahead of the control through the first 8 hours of hydration before being equivalent to the control after 15 hours. There was no appreciable difference in the uncarbonated system whether the water was added all at once or in an 80/20 split.

For the LAFB cement the addition of carbonated water as part of the mix water showed a retardation across the first 7 hours (wherein less than 85% of the energy released by the control) before reaching an 8% increase in energy released versus the control at ages greater than 19 hours. For the delayed addition of the same amount of carbonated water the hydration energy release was more than 15% ahead of the control by the $5^{th}$ and $6^{th}$ hours of hydration before being slightly behind the control after 15 hours. In this case, the 80/20 split addition of uncarbonated mix water showed a marked acceleration at early time points, as compared to the all at once addition.

These results demonstrate again that results vary depending on the cement used. Both the STMB and the LAFB showed a marked retardation of hydration, as shown by calorimetry, when the carbonated mix water was added without a delay; however, the LAFB cement had recovered and even accelerated hydration by 12 hours, whereas the STMB did not recover in the 23 hours tested. In both STMB and LAFB, delaying the addition of the carbonated mix water resulted in acceleration of hydration, but at different times and to different degrees. For STMB, there was marked acceleration at the first hour time point, continuing to 15 hours. In contrast, the acceleration of hydration in the LAFB system was not apparent until 4 hours and ended by 11 hours, and was moderate compared to that of STMB.

In a second test, the delay until addition of carbonated water and the amount of carbonated water were kept constant, and the overall duration of addition of the water was varied. LAFB cement was used. The carbonated water was Perrier. The mix procedure was as follows:

Combine sand and water 1 in bowl—mix 30s
Add cement to bowl—mix 30s
Add both water 2 and carbonated water over designated timeframe (2-5 minutes)
Mix mortar for total of 2 minutes
Note for batches 4 and 5 the total mix time was 5 minutes
The batch plan was as shown in Table 46.

TABLE 46

Batch plan for various durations for addition of carbonated water.

| Batch | Mass Cement (g) | Water 1 (g) | Carbonated water Dose (g) | Total Water Mass (g) | Addition time |
|---|---|---|---|---|---|
| 1 | 535 | 53.5 | 250 | 303.5 | 30 seconds |
| 2 | 535 | 53.5 | 250 | 303.5 | 60 seconds |
| 3 | 535 | 53.5 | 250 | 303.5 | 120 seconds |
| 4 | 535 | 53.5 | 250 | 303.5 | 180 seconds |
| 5 | 535 | 53.5 | 250 | 303.5 | 300 seconds |

The calorimetry results are shown in FIGS. 122 (power) and 123 (energy) and in Table 47 (energy relative to control).

TABLE 47

Energy, via calorimetry, relative to control at specific time intervals for LAFB cement with different durations of time for carbonated water addition

| Time After Mixing (h) | 0.5 min | 1 min | 2 min | 3 min | 5 min |
|---|---|---|---|---|---|
| 1 | — | — | — | — | — |
| 2 | — | — | — | — | — |
| 3 | 100% | 109% | 122% | 186% | 228% |
| 4 | 100% | 117% | 141% | 192% | 229% |
| 5 | 100% | 116% | 137% | 166% | 191% |
| 6 | 100% | 111% | 125% | 140% | 156% |
| 7 | 100% | 107% | 117% | 124% | 135% |
| 8 | 100% | 104% | 112% | 114% | 122% |
| 9 | 100% | 102% | 109% | 108% | 114% |
| 10 | 100% | 101% | 107% | 104% | 109% |
| 11 | 100% | 101% | 106% | 102% | 106% |
| 12 | 100% | 100% | 105% | 100% | 104% |
| 13 | 100% | 100% | 104% | 99% | 102% |
| 14 | 100% | 99% | 104% | 98% | 101% |
| 15 | 100% | 99% | 103% | 97% | 100% |
| 16 | 100% | 99% | 103% | 97% | 100% |
| 17 | 100% | 99% | 102% | 97% | 99% |

As compared to the quickest addition of carbonated water, the slower the addition the greater the benefit. Benefits were observed mostly in hydration periods up to 9 hours after mixing.

This Example demonstrates that varying the duration of addition of carbonated mix water to a cement mix can have marked effects on early hydration.

Example 39

In this Example, carbonated mix water was derived from artificial wash water and used as the source of carbon dioxide for carbonation of cement mixes.

In concrete production, process water is produced in various stages of the production and packaging process, such as truck cleanout and other processes, where the process water has a high pH that can be necessary to reduce before the water can be discharged. Current treatment methods include the use of HCl, but the process is difficult to control and has safety issues involved with handling a concentrated acid. An alternative method utilizes carbon dioxide addition to the process water. The carbon dioxide forms carbonic acid, a weak acid, that is converted to bicarbonate and ultimately carbonate (e.g., calcium carbonate). As the pH is lowered by these reactions, it eventually reaches 7 or 8, and the precipitated calcium carbonate dissolves, creating calcium bicarbonate. Because of the pKas of the various reactions, the system is buffered and it is easier to achieve the desired pH for discharge. Thus, certain embodiments provide treatment of process water from a manufacturing process that produces high-pH process water, such as concrete manufacture, with carbon dioxide, such as carbon dioxide produced in lime and/or cement manufacture to lower the pH of the process water. This Example tests whether the carbonated wash water could then be used as mix water in the concrete batching process.

The following procedure was used:

A synthetic "wash water" was prepared by mixing a 2% cement by weight solution with 0.20% bwc sodium gluconate, in water. The gluconate was added since the addition of a retarder is a conventional part of the wash process to prevent the concrete from setting up in the ready-mix truck prior to washing.

The mixture was shaken periodically and allowed to sit for 24 hr.

Combine sand (1350 g) and water 1-mix 30s

Add cement (STMB, 535 g)-mix 30s

Add both water 2 and wash water to bowl—mix 2 minutes

Cast samples

The testing compared unfiltered vs filtered wash water, in both uncarbonated and carbonated variations. Wash water was carbonated by treating it in a home soda making device according to the manufacturer's instructions to make carbonated water. The wash water was filtered through filter paper to remove suspended solids. Batching is shown in Table 48. The carbonated wash water represented over 60% of the total water used in the cement mixes.

TABLE 48

Carbonated wash water work batches

| Batch | Cement (g) | Water 1 (g) | Wash Water (g) | Water 2 (g) | Total Water (g) | Wash water |
|---|---|---|---|---|---|---|
| 1 | 535 | 53.5 | 171.2 | 42.8 | 267.5 | Filtered, uncarbonated |
| 2 | 535 | 53.5 | 171.2 | 42.8 | 267.5 | Filtered, carbonated |
| 5 | 535 | 53.5 | 171.2 | 42.8 | 267.5 | Unfiltered, uncarbonated |
| 6 | 535 | 53.5 | 171.2 | 42.8 | 267.5 | Unfiltered, carbonated |

The calorimetry results are shown in FIGS. 123 (power) and 124 (energy) and in Tables 49 (unfiltered) and 50 (filtered).

TABLE 49

Energy, via calorimetry, relative to uncarbonated control at specific time intervals for STMB cement with filtered simulated wash water used as 80% of the mix water

| Time After Mixing (h) | Filtered, uncarbonated | Filtered, carbonated |
|---|---|---|
| 2 | 100% | 194% |
| 3 | 100% | 110% |
| 4 | 100% | 111% |
| 5 | 100% | 109% |
| 6 | 100% | 109% |
| 7 | 100% | 108% |
| 8 | 100% | 107% |
| 9 | 100% | 105% |
| 10 | 100% | 103% |
| 11 | 100% | 102% |
| 12 | 100% | 101% |
| 13 | 100% | 100% |
| 14 | 100% | 99% |
| 15 | 100% | 98% |
| 16 | 100% | 96% |
| 17 | 100% | 96% |
| 18 | 100% | 95% |

TABLE 50

Energy, via calorimetry, relative to uncarbonated control at specific time intervals for STMB cement with unfiltered simulated wash water used as 80% of the mix water

| Time After Mixing (h) | Unfiltered, uncarbonated | Unfiltered, carbonated |
|---|---|---|
| 2 | 100% | 28% |
| 3 | 100% | 62% |
| 4 | 100% | 77% |
| 5 | 100% | 88% |
| 6 | 100% | 95% |
| 7 | 100% | 99% |
| 8 | 100% | 101% |
| 9 | 100% | 102% |
| 10 | 100% | 103% |
| 11 | 100% | 103% |
| 12 | 100% | 104% |
| 13 | 100% | 103% |
| 14 | 100% | 103% |
| 15 | 100% | 103% |
| 16 | 100% | 102% |
| 17 | 100% | 102% |
| 18 | 100% | 102% |

When the wash water was filtered the carbonation treatment resulted in some early hydration acceleration (94% more energy released through 2 hours, 10% through 3 hours, 11% through 4 hours) before trending downwards to be 8% lower at 22 hours. When the wash water was unfiltered the carbonation treatment resulted in early hydration retardation (not until 6 hours was the energy within 10% of the control) before the energy release became comparable to the control.

This Example illustrates that carbonated wash water can be used as part or all of the mix water in a cement mix with acceleration of hydration in the subsequent mix compared to uncarbonated control. The use of carbonated wash water can allow the simultaneous treatment of the wash water, its disposal in a cement mx, and a beneficial or at least neutral effect on the subsequent mix. If the carbon dioxide comes from the cement making process itself, it also represents an avenue for decreasing the carbon footprint of the overall cement process.

Example 40

In this Example, the effect of carbonation on early hydration was tested for two different low temperature conditions.

Industrially produced concrete can vary in temperature, both at the batching facility and at the job site. Typically, a concrete mix is required to be between 10-30° C. at time of delivery, though it can potentially be hotter or colder at time of batching In this test, a series of mortar samples were carbonated at low temperatures to observe if the effect of $CO_2$ on cement was sensitive to mix temperature. Two temperature ranges were used, 5 to 10° C. and 10 to 15° C. Isothermal calorimetry was performed in the same temperature range as mixing.

The procedure was as follows:

Combine 1350 g of sand and 267.5 g of water in bowl and for mix 30s

Add 535 g of cement and mix for 30s

For carbonated mortar, mix an additional 2, 4 or 6 minutes with a $CO_2$ flow rate of 0.15 LPM For control mortar mix an additional 4 minutes Cast samples Two ordinary portland cements were used: St Mary's Bowmanville (STMB) or Lafarge Brookfield (LAFB)

For LAFB cement mortars, FIGS. 125 and 126 show power and energy curves, respectively at 5 to 10° C., and FIGS. 127 and 128 and show power and energy curves, respectively at 10 to 15° C., while Table 51 shows summary of energy compared to control system at 5 to 10° C. and Table 52 shows summary of energy compared to control system at 10 to 15° C.

For STMB cement mortars, FIGS. 129 and 130 show power and energy curves, respectively at 5 to 10° C., and FIGS. 131 and 132 and show power and energy curves, respectively at 10 to 15° C., while Table 53 shows summary of energy compared to control system at 5 to 10° C. and Table 54 shows summary of energy compared to control system at 10 to 15° C.

TABLE 51

Energy, via calorimetry, relative to control at specific time intervals for LAFB cement hydrated at a temperature between 10 and 15° C.

| Time After Mixing (h) | Control 10° C. | CO2 2 min | CO2 4 min | CO2 6 min |
|---|---|---|---|---|
| 1 | 100% | 106% | 160% | 0% |
| 2 | 100% | 84% | 108% | 36% |
| 3 | 100% | 82% | 95% | 73% |
| 4 | 100% | 89% | 102% | 97% |
| 5 | 100% | 95% | 107% | 107% |
| 6 | 100% | 97% | 107% | 107% |
| 7 | 100% | 99% | 105% | 104% |
| 8 | 100% | 100% | 102% | 100% |
| 9 | 100% | 100% | 101% | 98% |
| 10 | 100% | 100% | 99% | 95% |
| 11 | 100% | 100% | 97% | 93% |
| 12 | 100% | 100% | 95% | 91% |
| 13 | 100% | 100% | 94% | 89% |
| 14 | 100% | 99% | 92% | 88% |
| 15 | 100% | 99% | 92% | 87% |
| 16 | 100% | 99% | 91% | 86% |
| 17 | 100% | 99% | 90% | 86% |
| 18 | 100% | 98% | 90% | 85% |
| 19 | 100% | 98% | 89% | 85% |
| 20 | 100% | 98% | 89% | 84% |
| 21 | 100% | 98% | 88% | 84% |
| 22 | 100% | 98% | 88% | 84% |
| 23 | 100% | 97% | 88% | 83% |
| 24 | 100% | 97% | 87% | — |

TABLE 51

Energy, via calorimetry, relative to control at specific time intervals for LAFB cement hydrated at a temperature between 5 and 10° C.

| Time After Mixing (h) | Control 5° C. | CO2 2 min | CO2 4 min | CO2 6 min |
|---|---|---|---|---|
| 1 | — | — | — | — |
| 2 | 100% | 80% | 45% | 22% |
| 3 | 100% | 73% | 46% | 38% |
| 4 | 100% | 73% | 40% | 35% |
| 5 | 100% | 75% | 45% | 41% |
| 6 | 100% | 78% | 57% | 53% |
| 7 | 100% | 80% | 69% | 64% |
| 8 | 100% | 83% | 79% | 74% |
| 9 | 100% | 85% | 86% | 81% |
| 10 | 100% | 88% | 92% | 86% |
| 11 | 100% | 89% | 95% | 90% |
| 12 | 100% | 90% | 99% | 93% |
| 13 | 100% | 91% | 102% | 96% |
| 14 | 100% | 92% | 104% | 98% |
| 15 | 100% | 93% | 106% | 100% |
| 16 | 100% | 93% | 107% | 101% |
| 17 | 100% | 94% | 109% | 102% |
| 18 | 100% | 94% | 110% | 103% |
| 19 | 100% | 94% | 110% | 103% |
| 20 | 100% | 94% | 111% | 104% |
| 21 | 100% | 95% | 111% | 104% |
| 22 | 100% | 95% | — | — |
| 23 | — | — | — | — |
| 24 | — | — | — | — |

TABLE 53

Energy, via calorimetry, relative to control at specific time intervals for STMB cement hydrated at a temperature between 5 and 10° C.

| Time After Mixing (h) | Control 5° C. | CO2 2 min | CO2 4 min | CO2 6 min |
|---|---|---|---|---|
| 1 | — | — | — | — |
| 2 | 100% | 62% | 67% | 76% |
| 3 | 100% | 56% | 64% | 68% |
| 4 | 100% | 57% | 67% | 74% |
| 5 | 100% | 60% | 72% | 83% |
| 6 | 100% | 64% | 78% | 91% |
| 7 | 100% | 68% | 83% | 97% |
| 8 | 100% | 72% | 88% | 100% |
| 9 | 100% | 75% | 91% | 102% |
| 10 | 100% | 79% | 93% | 103% |
| 11 | 100% | 82% | 95% | 103% |
| 12 | 100% | 84% | 96% | 103% |
| 13 | 100% | 86% | 97% | 102% |
| 14 | 100% | 88% | 98% | 102% |
| 15 | 100% | 89% | 99% | 102% |
| 16 | 100% | 90% | 100% | 102% |
| 17 | 100% | 92% | 101% | 102% |
| 18 | 100% | 93% | 102% | 103% |
| 19 | 100% | 94% | 103% | 103% |
| 20 | 100% | 95% | 104% | 103% |
| 21 | 100% | 96% | 105% | 103% |
| 22 | 100% | 96% | 105% | 103% |
| 23 | 100% | 97% | — | — |
| 24 | — | — | — | — |

TABLE 54

Energy, via calorimetry, relative to control at specific time intervals for STMB cement hydrated at a temperature between 10 and 15° C.

| Time After Mixing (h) | Control 10° C. | CO2 2 min | CO2 4 min | CO2 6 min |
|---|---|---|---|---|
| 1 | — | — | — | — |
| 2 | 100% | 26% | 47% | 61% |
| 3 | 100% | 54% | 80% | 87% |
| 4 | 100% | 67% | 100% | 103% |
| 5 | 100% | 75% | 109% | 110% |
| 6 | 100% | 80% | 112% | 111% |
| 7 | 100% | 83% | 112% | 109% |
| 8 | 100% | 85% | 109% | 106% |
| 9 | 100% | 88% | 107% | 104% |
| 10 | 100% | 90% | 106% | 103% |
| 11 | 100% | 92% | 105% | 102% |
| 12 | 100% | 93% | 104% | 101% |
| 13 | 100% | 94% | 103% | 100% |
| 14 | 100% | 94% | 102% | 99% |
| 15 | 100% | 94% | 100% | 98% |
| 16 | 100% | 95% | 99% | 98% |
| 17 | 100% | 95% | 99% | 98% |
| 18 | 100% | 95% | 98% | 97% |
| 19 | 100% | 96% | 98% | 97% |
| 20 | 100% | 96% | 97% | 97% |
| 21 | 100% | 96% | 97% | 97% |
| 22 | 100% | 96% | 96% | 97% |
| 23 | 100% | 96% | 96% | 97% |
| 24 | 100% | 97% | 96% | 97% |

For the LAFB mortar, at both temperatures, the middle (4 min) dose produced the greatest enhancement of hydration, and at both temperatures the effect started earlier than the effect for the highest dose (6 min); in the 10 to 15 temperature, there was already a 60% increase in hydration at the one hour time point for the 4 min dose of carbon dioxide. For the STMB mortar, the middle and high doses produced roughly equivalent moderate increases in hydration at both temperatures, but the start of the effect was markedly different for the two doses at the lower temperature, beginning at about 9 hours for the 6 min dose and at 17 hours for the 4 min. dose.

This Example demonstrates that carbonation of a cement mix can have an effect on early strength development in concretes to be batched and used at low temperatures, and that the optimal dose can be temperature- and cement type-dependent. In addition, the timing of onset of increased strength development can be manipulated by manipulating the dose in some circumstances.

Example 41

This Example demonstrates the in situ formation of nanocrystals of calcium carbonate under specific carbonation conditions in cement.

Oil Well Cement

Laboratory scale experiments were performed on a model system in order to better understand the impacts of the carbon dioxide. The testing used oil well cement due to its low initial calcite content (below detection limits on XRD). Therefore small quantities of carbonate reaction product development could be readily distinguished.

Samples were generated by mixing 250 g of water with 500 g of untreated oil well cement in a blender for 30 seconds. The blender was flooded with continuous supply of 100% $CO_2$ gas for a one minute during blending. Samples were flash frozen with liquid nitrogen following the mixing period and then freeze dried to arrest the hydration and carbonation reactions. The early hydration was examined by sampling the batch at five distinct times (t=immediately after the end of mixing, 5 minutes, 4 hours, 10 hours, and 24 hours after the end of mixing). A parallel set of samples for an uncarbonated (control) system were also prepared. Quantitative X-ray Diffraction (QXRD) was employed to characterize the constituents of the prepared samples. Total inorganic carbon was used to quantify the carbon dioxide.

GU Cement

An investigation was conducted to characterize the carbonate reaction products through carbonation of a simple cement system. A high degree of carbonation was achieved to allow for direct observation of the crystalline reaction products.

The experiment mixed 450 g of GU cement and 50 g of distilled deionized water in an airtight, resealable plastic bag. The materials were hand-agitated through the bag until homogenously blended and the cement was moistened (30 seconds). The bag was inflated with 100% $CO_2$ gas and sealed. The system was allowed to react until all of the carbon dioxide had reacted (over several minutes) and the bag had deflated. This process was repeated a total of ten times over the course of 1 hour. A separate bag was prepared identically, but no carbon dioxide gas was added into the plastic bag. Carbonate content was quantified by QXRD and the microstructure was imaged using SEM.

Oil Well Cement QXRD Results

The QXRD results of the oil well cement samples are summarized in Table 55 (hydrated samples) and Table 56 (carbonated series). Results are presented as percentage mass fraction per normalized starting mass. Statistical analysis of the data collected through QXRD suggested that the percentage error is controlled by analytical error. An equation representing this distribution was used to calculate all errors based on absolute abundance. The developments of C3S, calcite, ettringite, calcium hydroxide, and amorphous content were tracked. The Rietveld identification of amorphous content was interpreted, in part, to represent C—S—H gel. While the amorphous content of the anhydrous samples would not adhere to this interpretation, the C—S—H development would generally be associated with the net increase in amorphous content as hydration proceeds.

TABLE 55

Phase Abundance Summary (wt %) via QXRD for hydrated oil well cement series

| Phase | Anhydrous | 0 min | 5 min | 4 hours | 10 hours | 24 hours |
|---|---|---|---|---|---|---|
| C3S | 54.9 ± 1.2 | 54.5 ± 1.2 | 53.4 ± 1.2 | 49.9 ± 1.2 | 46.0 ± 1.2 | 26.4 ± 1.0 |
| Calcite | n/d | n/d | n/d | n/d | 0.9 ± 0.4 | 1.0 ± 0.4 |
| Amorphous | 8.6 ± 0.7 | 8.39 ± 0.7 | 7.6 ± 0.7 | 13.5 ± 0.8 | 20.0 ± 0.9 | 34.1 ± 1.1 |
| Ettringite | 0.6 ± 0.3 | 0.7 ± 0.4 | 1.1 ± 0.4 | 1.4 ± 0.4 | 1.8 ± 0.5 | 4.4 ± 0.6 |
| Gyspum | 4.0 ± 0.6 | 3.3 ± 0.6 | 4.5 ± 0.6 | 3.6 ± 0.6 | 3.3 ± 0.6 | 0.9 ± 0.4 |
| Ca(OH)$_2$ | n/d | n/d | n/d | n/d | n/d | 6.0 ± 0.7 |

TABLE 56

Phase Abundance Summary (wt %) via QXRD for carbonated oil well cement series

| Phase | Anhydrous | 0 min | 5 min | 4 hours | 10 hours | 24 hours |
|---|---|---|---|---|---|---|
| C3S | 54.9 ± 1.2 | 53.7 ± 1.2 | 52.3 ± 1.2 | 51.6 ± 1.2 | 42.3 ± 1.1 | 27.9 ± 1.0 |
| Calcite | n/d | 0.8 ± 0.4 | 0.5 ± 0.3 | 1.0 ± 0.4 | 1.5 ± 0.4 | 2.8 ± 0.5 |
| Amorphous | 8.6 ± 0.7 | 10.4 ± 0.8 | 11.2 ± 0.8 | 13.0 ± 0.8 | 25.4 ± 1.0 | 38.3 ± 1.1 |
| Ettringite | 0.6 ± 0.3 | 0.6 ± 0.3 | 0.5 ± 0.3 | 0.7 ± 0.4 | 1.1 ± 0.4 | 2.5 ± 0.5 |
| Gypsum | 4.0 ± 0.6 | 4.1 ± 0.6 | 4.5 ± 0.6 | 4.3 ± 0.6 | 3.0 ± 0.6 | n/d |
| $Ca(OH)_2$ | n/d | n/d | n/d | n/d | 1.0 ± 0.4 | 5.2 ± 0.6 |

The progress of C3S dissolution and reaction is monitored by the change in its relative abundance (decrease) with time. The carbonated case is shown to be parallel the hydrated case wherein the two values are equivalent within the range of error at the initial measurement, 5 minutes and 4 hours. A greater amount C3S has reacted in the carbonated sample (potentially 8% more) at 10 hours but by 24 hours the C3S in the two conditions is again functionally equivalent. The carbon dioxide is shown to only have a small effect on the overall C3S dissolution or reaction kinetics given that that total reaction of C3S was largely the same. The increased reaction of C3S in the carbonated oil well cement at 10 hours as observed by the QXRD agreed with the field ready-mix concrete calorimetry (previous Examples) wherein greater energy was released in the 7 to 11 hour interval. This stage of hydration is associated with the end of the acceleration period when the initial silicate hydration starts to slow down. It is possible that the carbonate reaction products are providing a seeding role to boost the hydration or are otherwise affecting the kinetics of the hydration reaction.

Initial concentrations of calcite in the anhydrous cement were below detection limits. Calcite appears in the hydrated system after 600 min at a level of 0.90±0.40%. It was unchanged through to the end of the analysis. The large relative error (44%) is due to the uncertainty at such low concentrations of calcite. In the carbonated sample an increase calcite concentration is observed immediately following the carbon dioxide gas injection 0.80±0.37% by weight calcite. This level of calcite remains relatively constant in the system through the first 4 hours. In the sample at 10 hours the concentration of calcite increases to 1.52±0.45% by weight before ultimately reaching its maximum observed concentration of 2.83±0.55% at 24 hours. The amount of calcite in the system appears to increase but it is recognized that no additional carbon dioxide was added to the system after the initial mixing. The observed increase with time is likely attributable to the calcite reaction products initially being poorly crystalline or too small (xrd-invisible) before developing increased crystallinity or size wherein they could be detected through xrd.

The amorphous content of the carbonated sample is 24% higher than that of the hydrated control immediately after carbonation. At 5 minutes it is 47% greater. It fell 4% behind at 4 hours before accelerating to 27% ahead at 10 hours and 12% ahead at 24 hours. The small lag at 4 hours was mirrored by the C3S content whose consumption was shown to be slightly less for the carbonated paste at 4 hours. The amorphous content, as it would parallel C—S—H content and taken as a proxy for hydration progress, mirrors some of the field observations. The field calorimetry provided evidence of a pivot wherein hydration was slightly behind at 4 hours and notably ahead at 10 hours before showing a strength benefit at 24 hours.

The ettringite content of the carbonated paste was found to be lower than in the hydrated paste. If the quantification is considered as a net increase over the trace found in the anhydrous state then the carbonated paste contained 90% less ettringite at 4 hours, 56% at 10 hours and 49% at 24 hours. The implication is that the ettringite was slower to form in the carbonated sample.

The gypsum content of both samples did not conclusively change through the four hour samples. The decrease, via consumption during hydration, was greater in the carbonated sample than the hydrated sample. It appeared that all of the gypsum had been consumed in the carbonated sample at 24 hours but less than 80% had reacted in the hydrated sample.

The first detection of calcium hydroxide was in the 10 hour sample, but only in the carbonated paste. At 24 hours the carbonated sample had 88% of the portlandite that was detected in the control paste.

The small dose of carbon dioxide creates nano-calcite but does not prevent the conventional hydration reaction pathways from proceeding. The calcium silicates continue to hydrate, while portlandite and ettringite continue to form.

Oil Well Cement Total Inorganic Carbon Analysis

Total Inorganic Carbon (TIC) measurements were conducted for the three states (anhydrous, hydrated and carbonated). The analysis would account for carbon in amorphous nanoparticles of calcite that would be insufficiently crystalline and/or too small to be observed through QXRD.

The TIC for the anhydrous cement was 0.098%. Upon the carbonation treatment the carbon had increased to 0.264%. At the equivalent age the carbon content of the hydrated sample was 0.097% and unchanged from the anhydrous sample. The TIC data proves that carbon dioxide had entered the system even if the QXRD was only detecting some of the ultimate value. A net increase of 0.166% was observed. This represents 0.377% $CO_2$ by weight of cement.

GU Cement SEM

The production of a heavily carbonated paste sample succeeded in increasing the calcite content (normalized over the anhydrous state) from 6.7% in the anhydrous to 37.7% in the carbonated. Converting the calcite in % $CaCO_3$ to % $CO_2$, shows that the carbonated sample had a net $CO_2$ content of 13.6% by weight of the anhydrous cement. This level of carbonation ensures that the reaction products are found in considerably greater abundance than what is achieved in the industrial case. Nonetheless, it serves as an effective system for analysis given that the reaction products are easy to observe in a neat paste system that has a high degree of reaction.

The electron microscopy of the carbonated sample (shown in the micrograph of FIG. 137) revealed that numerous rhombohedral nanocrystals were present in the system. The primary dimension of the particles generally exceeded 10 nm and was predominantly less than 150 nm. The sizes of the particles were too small to allow for an effective direct chemical assessment through EDS. However, the particle geometry is consistent with calcite and the QXRD identified the presence of large amounts of calcite so the conclusion is made that the carbonation process has achieved in situ formation of nano-crystalline calcite. The production method (extensive and aggressive carbonation) resulted in reaction products that are likely in larger sizes and in greater quantities than what would have been found in the industrial samples.

This Example revealed that the hydration pathways were broadly the same with and without carbonation. The conventional hydration phases formed after the carbonation reaction occurred. The impact of the carbonation may have been to increase the formation of C—S—H in the 10 to 24 hour timeframe. Nanocrystalline, homogeneously distributed calcium carbonate was formed in situ in the process.

Example 42

This Example outlines a liquid $CO_2$ injection system, for example, to accommodate dry batch ready mix plants for efficient delivery of $CO_2$ into the concrete trucks and seamless installation of components. The system applies to operations that utilize a loading boot to deposit materials into the drum of a ready-mix truck; a loading boot is generally a flexible, enclosed shoot that can be positioned into the hopper of the ready-mix truck and guides materials into the drum of the truck.

The system uses components in addition to the standard boot components.

Additional Component Descriptions:
Rigid pipe, e.g., steel pipe (for example, ID=2¼")
Flexible hose, e.g., flexible rubber hose (for example, ID=1½")
Vacuum jacketed hose (for example, ID=¾")
5-port, 4-way air solenoid valve
Telescopic air cylinder rod
Plastic slider
¾" 90° FNPT swivel elbow
¼" Rubber air hose (×2)

The liquid $CO_2$ injection system includes a flexible hose, e.g., a rubber hose, housed in a steel pipe. The flexible hose may be made of any suitable material that possesses sufficient flexibility for the operations of the system, as well as the ability to withstand the temperatures of the solid and gaseous carbon dioxide that pass through it. The steel pipe is aligned so that it does not extend further than the bottom of the aggregate bin (see FIG. 135), however, the hose extends through the loading boot and into the concrete truck's chute through the action of a telescopic air cylinder rod (or rotary device), or other device suitable for extending the hose, during injection. Once extended into the chute of the concrete truck, the hose aligns itself with the central axis of the truck to maximize concrete $CO_2$ uptake, but not so far as to be in contact with the destructive fins of the truck.

The steel pipe is installed directly above the loading boot and is mounted to, or near, the cement hopper. See FIG. 135 for an idea of where the steel pipe should be mounted.

The pipe is positioned so that it is free of falling materials entering the truck through the loading boot. Inside the steel pipe is a telescopic air cylinder and rod that determines the position of the flexible hose. The rod is controlled by an air solenoid valve that permits the flow of air to the air cylinder at two separate ports, one to retract the rod and the other to extend it. The rod is connected to a plastic slider that sits inside the steel pipe. A 90° female NPT swivel elbow is installed in the plastic slider that will be used to connect the flow of $CO_2$ from the $CO_2$ supply system to the flexible rubber hose. A long slot is cut on the side of the steel pipe to allow the $CO_2$ line to follow the rubber hose into its extended position. A vacuum jacketed hose is used from the elbow to ensure the $CO_2$ line connected to the plastic slider remains flexible even after injection. Due to the extreme cold of liquid $CO_2$ a regular hydraulic line would freeze during injection and would become completely rigid. The vacuum jacketed hose is slightly longer than the distance the rubber hose must travel from its retracted to extended position, after this a copper line or insulated hydraulic hose is permitted to the $CO_2$ supply system.

The injection system can be controlled manually or by any suitable control system, such as a direct logic system, as described below.

Direct Logic

The air solenoid valve has one input port and two output ports. Each output port controls one end of the telescopic air cylinder and are wired to a single pole, double throw (SPDT) relay switch. When the relay switch does not have power it permits the flow of air through the first solenoid valve output and keeps the air cylinder rod retracted. The use sends a continuous 120 VAC signal from their system to the injection system to commence the injection sequence. Once the signal is received by the injection system the relay switch receives power, closes one output port and opens the other. This causes air to flow through the second output on the air solenoid valve and allows the rod to extend. A delay is used in the mix recipe to ensure $CO_2$ does not start injecting until the rod is completely extended and the flexible rubber hose is in its correct position inside the truck. At this point the injection system begins permitting the flow of $CO_2$ through the system and into the concrete truck. See FIG. 136 for a schematic of the air cylinder rod inside the steel pipe in its retracted and extended position. It should be noted that rotary solenoids, or other suitable device, could also be used to extend the flexible rubber hose into the truck, e.g., if space is an issue. This design can be custom fitted to meet the requirements from most if not all ready mix producers. Cleanliness permitting, the air solenoid valve can also be mounted outside of the steel pipe and run alongside it to reduce the length.

The user's system counts pulse signals that are sent from the injection system that equate to a predetermined mass of $CO_2$. Once the required dosage of $CO_2$ is achieved, the user ceases the continuous 120 VAC signal and the relay switch loses power. This causes the air cylinder rod to retract and remove the flexible hose from the concrete truck. The injection sequence is not complete until the rod is sufficiently retracted to be out of the way of the trucks and falling materials. This is achieved by a visible message on the Human Machine Interface (HMI) screen when the retracted rod triggers a proximity sensor (or time dependent).

Injection Sequence

The air solenoid valve is triggered once all materials have passed though the loading boot and into the concrete truck. It is typically the last step in the batching sequence. The injection sequence is generally not complete until the rod has been sufficiently retracted and out of the way of other materials entering the loading boot. At this time a message will be displayed to the plant's batcher that loading is complete and the driver can leave from under the loading boot.

Typical injection sequence:
1. A concrete truck drives under the loading boot and receives all of its materials (aggregate, cement, water, etc.)

2. The user sends a continuous 120 VAC signal to the injection system once all materials have been loaded to commence the injection of $CO_2$
3. The injection system uses a single pole, double throw (SPDT) relay switch to control an air solenoid valve
   a. When the relay switch is normally closed, one port of the air cylinder rod is powered to remain in its retracted position
   b. Once the signal is received from the user (continuous 120 VAC signal which stays on for the entire injection duration) the relay switch opens and sends power to the other port on the air cylinder rod to fully extend the rod
4. The air cylinder rod moves the plastic slider inside the steel pipe, which pushes the rubber hose through the boot and into the truck's chute
5. After a pre-determined delay (generally, the time it takes for the rod to fully extend) the injection system begins injecting $CO_2$ into the truck
6. The user receives pulses that equate to a mass of injected $CO_2$. Once the truck has received its required dosage, the continuous 120 VAC user signal is removed and the relay switch goes back to normally closed
7. The air cylinder rod retracts, pulling the rubber hose back into the steel pipe away from any falling materials in the boot
8. Once the rod is sufficiently retracted, an "Injection Complete" message displays on the HMI screen signaling to the driver that he is clear to pull his truck out from under the boot Example 43

This Example provides information on pore water composition in cement slurries treated with various amount of carbon dioxide to carbonate the slurry.

A slurry was made by combining 500 g of cement and 500 g of water in a blender and mixing for 30s. Combining cement and water was considered the start of the experiment. In the case of the control and lowest $CO_2$ dosages samples were removed 2 minutes after the experiment started. Where required $CO_2$ was introduced to the blender headspace over 2 minutes while mixing. This occurred 5 minutes after the experiment started. In all cases samples were removed from the blender at 8 and 30 minutes after the start of the experiment, representing the period after carbonation. Samples were filtered through a 0.22 µm filter cartridge to remove particulate producing a clear filtrate. The filtrate was acidified using nitric acid and submitted for chemical analysis.

The results are shown in FIGS. 138 and 139. The silicon concentration of the pore water at an early time point (8 min) increased with increasing dose of carbon dioxide; even a dose of carbon dioxide as low as 0.05% bwc produced a noticeable increase in pore water silicon concentration at this time; however, by 30 min, the silicon concentration in the pore water was virtually the same no matter what the dose of carbon dioxide used. Power curves generally shifted to the left with increasing dose of carbon dioxide.

Example 44

In this Example, the effects of various degrees of carbonation on early and late set time were examined in two different types of cement.

The mix design was: 2700 g sand, 1070 g cement, and 535 g water. The mixing procedure was as follows: Add sand & water—mix 30s; add half of cement—mix 30s; add other half of cement—mix 30s; mix for additional 2 minutes applying $CO_2$, if required. $CO_2$ was applied at a flow rate of 20 SLPM for periods of 15-120s to achieve desired level of carbonation. Testing Procedure: Transfer all mix to set time cylinder and allow to sit for ~2 hrs; perform standard set time test in accordance with ASTM C40.

The results are shown in FIGS. 140 and 141. Both initial (FIG. 140) and final (FIG. 141) set were accelerated by carbonation, and, generally, the greater the degree of carbonation, the greater the acceleration of set. This was true for both Illinois Product cement and St. Mary's Bowmanville cement, though the magnitude of the effect was different for each.

This Example illustrates that carbonation of a cement mix during mixing can accelerate set in a manner that is generally dependent on the degree of carbonation, and also that the magnitude of the effect on set time varies depending on the type of cement used.

Example 45

In this Example the effects of addition of SCM to carbonated mixes was investigated.

In a first test, the binder in the mix design was cement only: 1350 g sand; 535 g cement; 241 g water; 3 mL ADVA 140 admixture. In a second test, the binder in the mix design was cement and fly ash: 8100 g sand; 2407 g cement; 802.5 g class C fly ash; 1445 g water; 8.4 mL Zyla 620 admixture. In each case, two different cements were used. The mixes were carbonated at three different doses of carbon dioxide and the 24-hour compressive strength was compared to non-carbonated mix.

In the mixes with cement only as binder, all doses of carbon dioxide resulted in a lower 24-hour compressible strength compared to control for both types of cement (FIG. 142). In contrast, in the mixes with cement and class C fly ash as binder, all doses of carbon dioxide resulted in higher 24-hour compressive strength compared to control for both types of cement (FIG. 143).

This Example demonstrates that the effect of carbon dioxide is highly mix-dependent, and, in particular, subtle changes in mix chemistry (addition of fly ash) results in noticeable changes to strength response at 24 hours. A strength improvement was realized when the mix contained fly ash.

Example 46

In this Example, data from 12 different industrial trials were combined and presented graphically.

Industrial tests of carbonation of concrete mixes were conducted in 12 different industrial locations. In most cases, at least two or three different doses of carbon dioxide were used; the results for the best dose are shown. Thus, the conditions can be considered "semi-optimized," as a careful determination of the optimum dose was generally not done. The outcomes represent a variety of injection modes (e.g., during batching or at a wash rack, single or serial dose); for each different injection mode, the results for the best dose are represented. FIG. 144 represents strength results, outliers in circles, inner darker band represents middle 50% of results, outer darker band represents 90% of all results, average result noted. At all time points (1, 3, 7, and 28 days) the average compressive strength of the carbonated concrete (best dose in each trial; best dose size varied with mix design, trial conditions) was 8-12% greater than uncarbonated control. The highest outlier was about 190% of control compressive strength (1 day) whereas the lowest outlier was about 98% of control compressive strength (1 day and 28 days). FIG. 145 represents slump—the average result for CO2 conditions were 0.57" lower than the control, median was 0.50" lower. This difference was acceptable and within normal variation. FIG. 146 represents air—average results for CO2 conditions was 0.40% lower than the control, median was 0.20% lower. This difference was acceptable and within normal variation.

This Example demonstrates that carbonation of concrete mixes during mixing consistently produces a mix that has greater compressive strength, both early and late, compared to non-carbonated mix, with acceptable slump and air characteristics, so long as an optimum dose for the mix and conditions is chosen.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for carbonating a cement mix comprising
   (i) delivering a first portion of mix water to a mixer, wherein the mixer is a drum of a ready-mix truck that is open to the atmosphere;
   (ii) delivering cement to the mixer to mix with the first portion of water to form a cement mix, wherein the cement is delivered to the mixer via a first conduit;
   (iii) after the delivery of the first portion of the water, and during, or within 2 minutes after, the delivery of the cement to the mixer, commencing delivery of carbon dioxide to the cement mix in the mixer while the cement mix is mixing, wherein the carbon dioxide comprises gaseous carbon dioxide, and wherein the carbon dioxide is delivered to the mixer via a second conduit, positioned inside the first conduit;
   (iv) halting delivery of carbon dioxide to the mixer after a desired dose of carbon dioxide is delivered to the mixing cement mix in the mixer;
   (v) delivering a second portion of mix water to the cement mix during or after delivery of carbon dioxide to the mixer.

2. The method of claim 1 wherein the delivery of carbon dioxide has a duration of less than or equal to 5 minutes.

3. The method of claim 1 wherein the delivery of carbon dioxide has a duration of less than or equal to 2 minutes.

4. The method of claim 1 wherein the dose of carbon dioxide is 0.01-1.5% by weight cement.

5. The method of claim 1 wherein the carbon dioxide comprises solid carbon dioxide.

6. The method of claim 1 wherein the water/cement (w/c) ratio of the cement mix is less than 0.5 when the carbon dioxide is delivered.

7. The method of claim 1 wherein the w/c ratio of the cement mix is less than 0.4 when the carbon dioxide is delivered.

8. The method of claim 1 wherein the carbon dioxide is delivered to the mixer via an opening of the second conduit wherein the opening is positioned to direct carbon dioxide to a point where a wave of concrete folds over onto the mixing concrete.

9. The method of claim 8 wherein at least part of the first and/or second conduit is flexible material.

10. The method of claim 4 wherein the dose of carbon dioxide is 0.01-1% by weight cement.

11. The method of claim 4 wherein the dose of carbon dioxide is 0.01-0.5% by weight cement.

12. The method of claim 5 wherein the ratio of gaseous to solid carbon dioxide is 1:2 to 2:1 solid:gaseous carbon dioxide.

* * * * *